US012657050B2

(12) United States Patent
Spittle

(10) Patent No.: US 12,657,050 B2
(45) Date of Patent: Jun. 16, 2026

(54) FULLY CUSTOMIZABLE EAR WORN DEVICES AND ASSOCIATED DEVELOPMENT PLATFORM

(71) Applicant: Sonical Sound Solutions, San Mateo, CA (US)

(72) Inventor: Gary Spittle, San Mateo, CA (US)

(73) Assignee: Sonical Sound Solutions, San Mateo, CA (US)

( * ) Notice: Subject to any disclaimer, the term of this patent is extended or adjusted under 35 U.S.C. 154(b) by 82 days.

(21) Appl. No.: 18/291,797

(22) PCT Filed: Jul. 26, 2022

(86) PCT No.: PCT/US2022/074159

§ 371 (c)(1),
(2) Date: Jan. 24, 2024

(87) PCT Pub. No.: WO2023/010014

PCT Pub. Date: Feb. 2, 2023

(65) Prior Publication Data

US 2025/0094211 A1 Mar. 20, 2025

Related U.S. Application Data

(60) Provisional application No. 63/226,129, filed on Jul. 27, 2021.

(51) Int. Cl.
*G06F 9/48* (2006.01)
*G06F 3/16* (2006.01)

(52) U.S. Cl.
CPC ............ *G06F 9/4843* (2013.01); *G06F 3/162* (2013.01)

(58) Field of Classification Search
CPC ........ G06F 9/4843; G06F 3/165; G06F 3/162; G06F 9/5027; G06F 2209/508;
(Continued)

(56) References Cited

U.S. PATENT DOCUMENTS 5,647,008 A 7/1997 Farhangi et al.
6,473,512 B1 * 10/2002 Juneau ................. G01N 33/573
381/328

(Continued)

FOREIGN PATENT DOCUMENTS

KR 100754220 B1 9/2007
WO WO-2022026481 A1 2/2022

OTHER PUBLICATIONS

International Search Report and Written Opinion received for International Patent Application No. PCT/US2021/043336 mailed on Nov. 3, 2021, 14 pages.
(Continued)

*Primary Examiner* — Yogeshkumar Patel
(74) *Attorney, Agent, or Firm* — Morrison & Foerster LLP

(57) ABSTRACT

Disclosed herein is an audio system that can be customized by the user (including the developer) and that may allow the user to control more than just the sound levels and may allow the user to select more than one of a few pre-determined settings. Disclosed herein is a development platform that allows manufacturers (including the developers) to test various different parameters, settings, algorithms, functions, processes, accessories, and the like. The development platform allows the manufacturer to simulate the performances from possible options for the audio system, and then load the selected option from the development platform to the audio system. Additionally, the development platform that enables the end user to have the same level of control and ability to access, upload, and control plugins on the end user's device(s).

19 Claims, 144 Drawing Sheets

(58) Field of Classification Search
    CPC ........ H04R 5/04; H04R 5/033; H04R 1/1083;
                H04R 25/505; H04R 25/552; H04R
                25/558; H04R 3/04; H04R 2460/01;
            H04S 7/304; H04S 2420/01; G10L 21/02
    See application file for complete search history.

(56) References Cited

U.S. PATENT DOCUMENTS

| | | | |
|---|---|---|---|
| 8,781,147 | B1 | 7/2014 | Giuroiu |
| 10,031,000 | B2 | 7/2018 | Tripathi et al. |
| 12,407,984 | B2 | 9/2025 | Spittle |
| 2004/0167998 | A1 | 8/2004 | Core |
| 2007/0213990 | A1 | 9/2007 | Moon et al. |
| 2010/0242014 | A1* | 9/2010 | Zhu ...................... G06F 9/5044 |
| | | | 717/162 |
| 2013/0243227 | A1* | 9/2013 | Kinsbergen ......... H04M 1/6016 |
| | | | 381/314 |
| 2013/0294621 | A1 | 11/2013 | Kim et al. |
| 2015/0346001 | A1 | 12/2015 | Tripathi et al. |
| 2018/0067786 | A1* | 3/2018 | Nguyen Trung ....... G06F 9/544 |
| 2018/0103330 | A1 | 4/2018 | Balslev |
| 2019/0098367 | A1 | 3/2019 | Jung et al. |
| 2019/0124464 | A1 | 4/2019 | Kaburlasos et al. |
| 2019/0220299 | A1 | 7/2019 | Rosenboom |
| 2020/0220419 | A1 | 7/2020 | Corcoran et al. |
| 2023/0111979 | A1 | 4/2023 | Christmas et al. |
| 2023/0300532 | A1* | 9/2023 | Spittle .................... G06F 3/165 |
| | | | 381/1 |

OTHER PUBLICATIONS

International Search Report and Written Opinion received for International Patent Application No. PCT/US2022/074159 mailed on Oct. 4, 2022, 13 pages.
Profita et al. (2018). "Wear It Loud How and Why Hearing Aid and Cochlear Implant Users Customize Their Devices," ACM Transactions on Accessible Computing (TACCESS), 11(3):13, 32 pages.

* cited by examiner

106

1000

936

938

User Interface

502 ⌐
Tap and
Hold

503 ⌐ Apps Have Voice Tag Associated
504 ⌐ Ear Bud Captures Users Voice

501 ⌐ Security - Ear Print
Finger Print
Multi factor
authentication

Real Time Download

Tablet/Phone — 600

601 — Code + Data [Encrypted]

603 — License Validation Key Check with Device

3801A — Resource Validation
3801B — Hardware Capabilities
3801C — Available Resources
— Compute
— Memory 3803 — Ear Buds

3805

609

3807

Music

Hearing

605 — Register Tasks
3809 — Add to Scheduler
607 — Hook to Interfaces

3811

Charging Pod

Contains Calibration
Measurement
for Mics & Speakers        3813
Using Reference
Mics & Speakers
Sensor Tests Touch Screen    3815
Android    3817
Apps/Plugins    3819
Wifi/Cellular    3821
Update Ear Buds    3823
Portable U.I.    3825

User Control of
Ambient Sound
in Real Time

Binaural Ear Matching.

Cloud — 1303

Database of Ears — 4415

Database of HRTFS / HRIRS — 1305

Find Closest Match - Based on Multiple — 4417
Dimensions Taken
from Images

Create Interrelated — 1307
Set of Binaural HRTF / HRIRS

Left    Right

Ear Clip — 1301
Reference
for Size

Take Photos of PINNA. — 1300

Download — 1308
to User

Ear Clips
for Size
Dimension

4413 — Take Photos of Head

Speech

Noise

Speech

201 ⟍
False
Pinna

203 ⟍
Dish
Shape

6002 ⟍
Non
Symetric
Shape
Left & Right are
Different Shape

6000

6000A    6000
6000B

204 ⟍
Reflect Sound
Into Ear
Left & Right Ear
are Different

209 ⟍

207 ⟍
Spiral
Mic
Placement
All Distances
are Different

205

× 
×
Reduce Ambiguity
6006 ⟋

6008 ⟍
Left & Right
Mic Placements
are Different

Basic Bidirectional Processing

With Unmix of Mono Stream

Basic Bidirectional Processing

With Unmix of Mono Stream Binaural Render

Basic Bidirectional Processing
With Unmix of Mono Stream

Code Transfer

FULLY CUSTOMIZABLE EAR WORN DEVICES AND ASSOCIATED DEVELOPMENT PLATFORM

CROSS-REFERENCE TO RELATED APPLICATIONS

The application is a national stage application under 35 U.S.C. § 371 of International Application No. PCT/US2022/074159, filed internationally on Jul. 26, 2022, which claims the benefit under 35 U.S.C. § 119(e) of U.S. Provisional Application No. 63/226,129, filed Jul. 27, 2021, the contents of which are incorporated herein by reference in their entirety for all purposes.

FIELD OF THE DISCLOSURE

This disclosure relates generally to ear worn devices, compute and signal processing platforms for ear worn devices and development platforms for developing the ear worn devices.

BACKGROUND OF THE DISCLOSURE

The human brain uses auditory cues to understand the sounds around us. The sound levels, spectral content, and spatial locations from sounds allow the human brain to understand the auditory scene. In some instances, the human may be a user of an audio system that includes ear worn devices. An ear worn device may be used for many different applications, such as listening to music (e.g., headphones), communications (e.g., headsets), and hearing (e.g., hearing assistance devices). Although sound technology for ear worn devices has improved over the past few years, current ear worn devices still do not deliver complete and fully-customized sound experiences to the user.

Generally, for example, the current ear worn devices do not adequately consider the scene that the user may be located in when using the ear worn devices. To handle background noise from the scene, instead of allowing the user to be made aware of the background noise, the current ear worn devices completely cancel out the background noise. Cancellation of the background noise may make the auditory scene appear unnatural.

Additionally, the current ear worn devices are typically not equipped to differentiate between different sounds or remove/control sounds that may have dangerous sound pressure levels. Instead, all of the current ear worn devices allow the user to adjust only the sound levels and possibly select one of a few different pre-determined settings (e.g., stereo, quadrophonic, surround sound, etc.), or configuration modes (e.g., quiet, noisy, airplane, restaurant, etc.). Each pre-determined setting may include a plurality of parameters, which are programmed by the manufacturer and cannot be independently adjusted by the user. In other words, when a user selects a first pre-determined setting, the user is forced to select all the parameters of the first pre-determined setting. The user may select a different second pre-determined setting, but is yet again forced to select all of the parameters of the second-predetermined setting. Thus, the limited options with current ear worn devices limits the user's sound experience.

The user may have difficulty having an in-person conversation when located in a loud scene. The user may be able to adjust the sound levels, but such adjustment may create an incorrect perception of the auditory scene. The user may not be able to distinguish between sounds the user wants to be more noticeable (e.g., sounds from a pot of boiling water) and sounds the user does not want to be as noticeable (e.g., sounds from a conversation the user is not engaged in). These limitations are a few created by current ear worn devices. As a result, the user cannot customize the sounds transmitted to and received from the user's ears. What is needed is an audio system that can be customized by the user (including the developer) and that may allow the user to control more than just the sound levels and may allow the user to select more than one of a few pre-determined settings. A user's ears are exposed to many different acoustic conditions during a day. We use multiple applications and devices that create sound and want our attention. It is essential that an ear worn device can be flexible in its operation to cope with all these different scenarios.

Additionally, manufacturers may not be able to customize audio systems for certain users. The current development platforms used by manufacturers are limited in terms of the parameters, settings, algorithms, functions, processes, accessories, and the like that may be tested to determine how to best configure the audio system for optimal performance and to meet users' needs.

A typical audio system may include a main processor that performs all the processing. Because the main processor has to perform all of the processing for the audio system, performance of the entire audio system may be compromised. What is needed is an architecture comprising a main processor that performs some functions (less than all of the processing) and an audio subsystem that offload certain processing functions from the main processor.

BRIEF SUMMARY OF THE DISCLOSURE

Disclosed herein is an audio system that can be customized by the user (including the developer) and that may allow the user to control more than just the sound levels and may allow the user to select more than one of a few pre-determined settings.

The audio system may include dedicated chipsets that optimize the processing efficiency of the audio systems to facilitate more advanced customization of audio processing. The chipsets may allow for the coexistence and/or cooperation of various components that allow for more specialized and end-user-specific customization.

Disclosed herein is a development platform that allows manufacturers (including the developers) to configure and test various different parameters, settings, algorithms, functions, processes, accessories, and the like. The development platform allows the manufacturer to simulate the performances from possible options for the audio system, and then load the selected option from the development platform to the audio system. Additionally, the development platform enables the end user to have the same level of control and ability to access, upload, and control plugins on the end user's device(s).

An operating system for an audio system is disclosed. The operating system comprises: one or more processing cores, wherein processing for the audio system is distributed across the one or more processing cores, wherein the operating system is programmed to: manage resource loading for the one or more processing cores; manage processing of one or more data streams, the management of the processing of the one or more data streams comprising: identifying one or more processing resources as not meeting one or more criteria, and reconfiguring corresponding one or more data streams when the one or more processing resources do not meet the one or more criteria; manage data communication within the audio system; and manage tasks according to a specified order. Additionally or alternatively, in some embodiments, the one or more criteria comprise the one or more processing resources as being one or more of: unavailable, untimely, incapable, or having lower performance than another processing resource. Additionally or alternatively, in some embodiments, the operating system is further capable of switching one or more processes from software to hardware, hardware to software, hardware to hardware-software, or software to hardware-software. Additionally or alternatively, in some embodiments, the one or more processing cores comprise at least two processing cores programmed to handle dedicated functions. Additionally or alternatively, in some embodiments, the operating system is programmed to manage a noticeboard, wherein the noticeboard stores information posted by one or more plugins. Additionally or alternatively, in some embodiments, the management of the data communication within the audio system is performed by a transfer manager, the transfer manager programmed to receive, initiate, or prioritize data transfer operations through an audio bus of the audio subsystem. Additionally or alternatively, in some embodiments, the operating system is capable of dynamically changing the management of the resource loading for the one or more processing cores. Additionally or alternatively, in some embodiments, the one or more processing cores are assigned to different circuits. Additionally or alternatively, in some embodiments, the one or more processing cores comprise at least two processing cores having the same processing functions, wherein the at least two processing cores are distinct and independent from each other. Additionally or alternatively, in some embodiments, the at least two processing cores are included in separate devices. Additionally or alternatively, in some embodiments, the one or more processing cores comprise at least two processing cores having the same processing functions, wherein the at least two processing cores communicate one or more data streams between each other. Additionally or alternatively, in some embodiments, the at least two processing cores are included in separate devices. Additionally or alternatively, in some embodiments, the operating system is capable of being dynamically reprogrammed to perform or no longer perform one or more processing functions. Additionally or alternatively, in some embodiments, the dynamically reprogramming the operating system to no longer perform the one or more processing functions causes one or more resources to become available. Additionally or alternatively, in some embodiments, the operating system is capable of managing a plurality of processing functions, wherein the processing functions comprise one or more of: applications, plugins, data processing algorithms, neural network processing algorithms, drivers, software functions, or hardware functions, wherein at least two of the plurality of processing functions are processed concurrently. Additionally or alternatively, in some embodiments, the operating system is further programmed to: assign the management of one or more of: the resource loading, the processing of the one or more data streams, the data communication to another system or subsystem of the audio system, or the tasks. Additionally or alternatively, in some embodiments, the operating system is further programmed to: assign or manage one or more applications to another system or subsystem of the audio system. Additionally or alternatively, in some embodiments, the management of the resource loading comprises: monitoring and tracking resource usage of processing functions; and assigning the processing functions based on the resource usage and available resources. Additionally or alternatively, in some embodiments, the processing of the one or more data streams comprises: one or more processing steps performed by an activation function logic, a gating function logic, a bypass function logic, or a muting function logic. Additionally or alternatively, in some embodiments, the management of the data communication comprises communications that are accessible using application programming interfaces (APIs). Additionally or alternatively, in some embodiments, the management of the tasks comprises dynamically adjusting the specified order of the tasks based on at least relative properties of the tasks.

BRIEF DESCRIPTION OF THE DRAWINGS

FIG. 49B illustrates an exemplary form of spatial signal processing used to inform the ultra-low latency filters which sounds should be maintained and which sounds should be removed, according to some embodiments of the disclosure.

FIG. 49C illustrates an exemplary sound sources can be mapped to different regions around a listener, according to some embodiments of the disclosure.

FIG. 49D illustrates exemplary neural networks that are trained using spatial cue information for each frequency band to determine the appropriate filtering parameters to apply, according to some embodiments of the disclosure.

FIG. 50A illustrates a diagram of an exemplary normal conversation, according to some embodiments of the disclosure.

FIG. 50B illustrates an exemplary listener moving the ears closer to the person speaking and/or rotate the head to decrease the distance between the ear and the speech coming from the speaker's mouth, according to some embodiments of the disclosure.

FIG. 51 illustrates an exemplary communications channel from the mouth of a person speaking to the ear of the user, according to some embodiments of the disclosure.

FIG. 52A illustrates a block diagram of exemplary signal processing for the manipulation of ITD and IID, according to some embodiments of the disclosure.

FIG. 52B illustrates exemplary audio signal processing that may include spectral band remapping, according to some embodiments of the disclosure.

FIG. 53 illustrates a diagram of an exemplary connections associated with a driver manager, according to some embodiments of the disclosure.

FIG. 54 illustrates an exemplary architecture that enables system information sharing, according to some embodiments of the disclosure.

FIG. 55A illustrates a diagram of an exemplary GUI developed independently from connectivity, according to some embodiments of the disclosure.

FIG. 55B illustrates a diagram of an exemplary GUI developed independently from connectivity, according to some embodiments of the disclosure.

Figure 56:
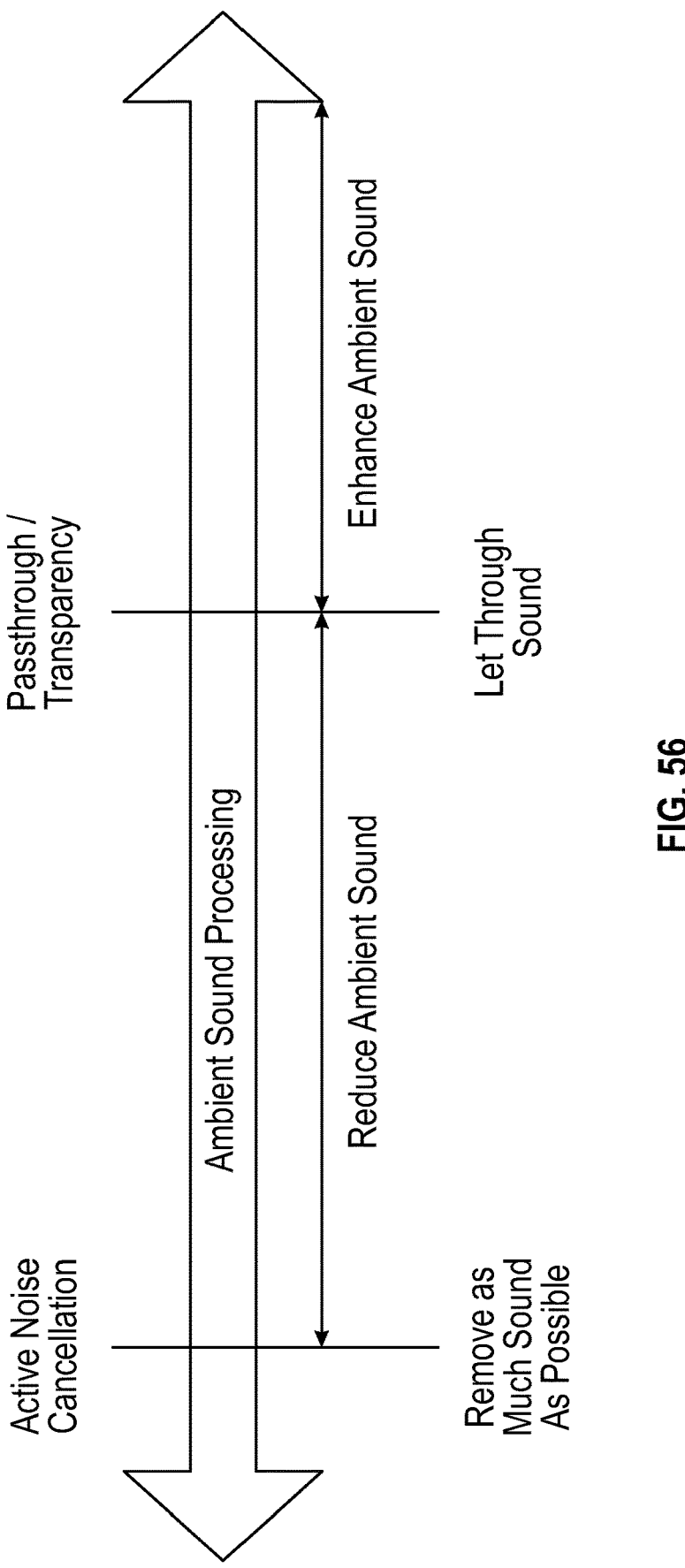

FIG. 56 illustrates an exemplary range of ambient awareness, according to some embodiments of the disclosure.

Figure 57A:
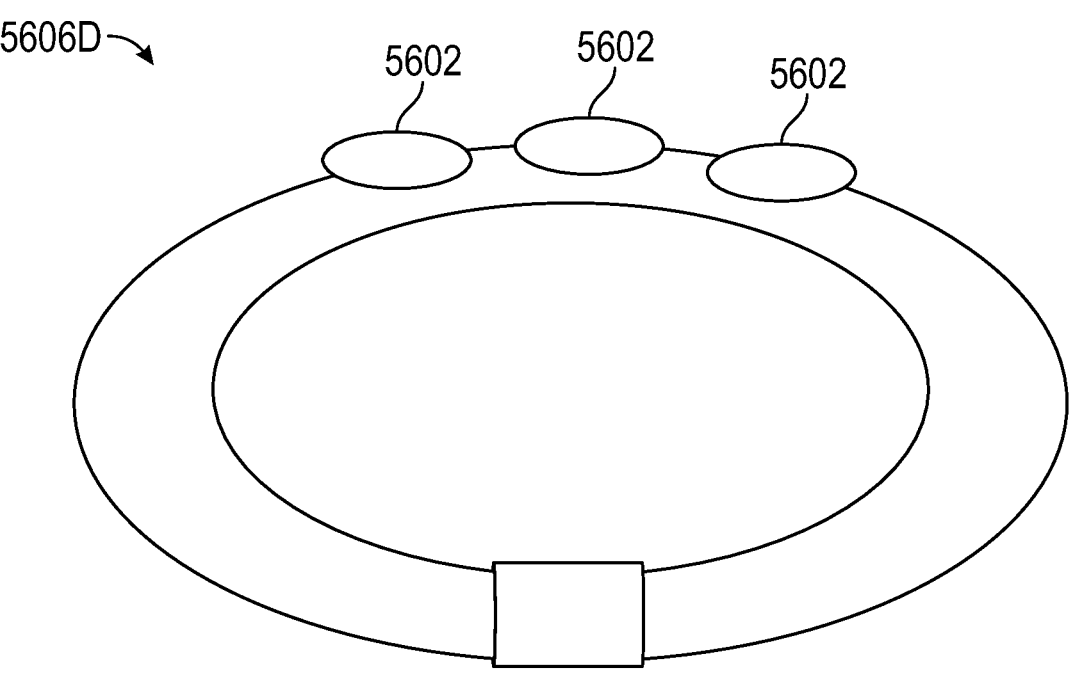

FIG. 57A illustrates an exemplary electronic device programmed to receive user input for the audio system, according to some embodiments of the disclosure.

Figure 57B:
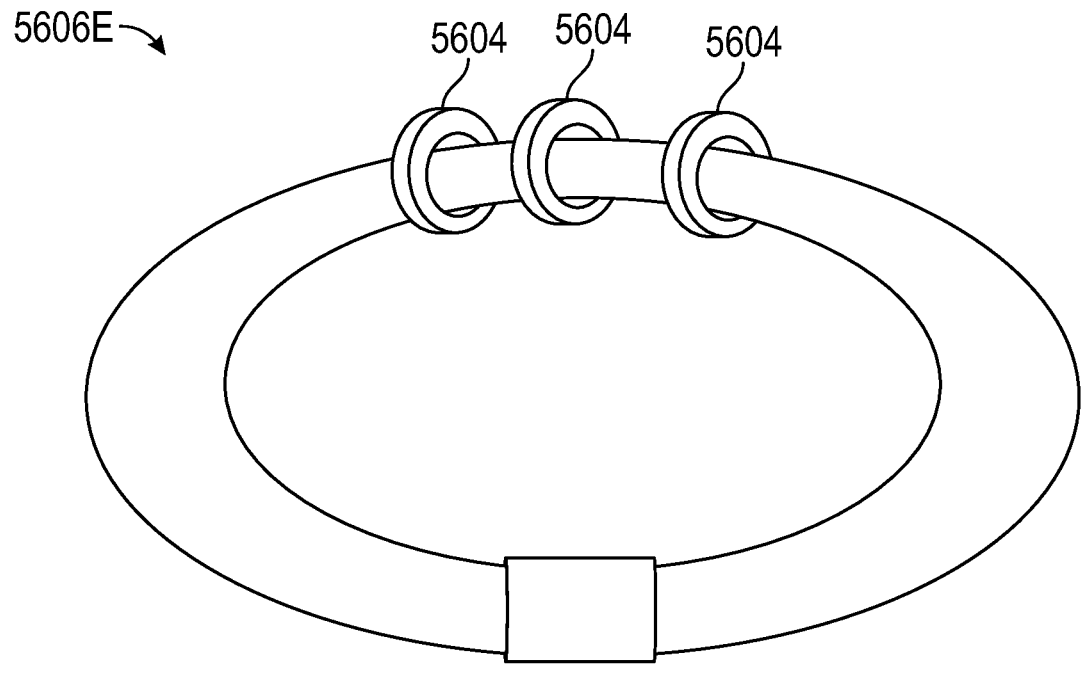

FIG. 57B illustrates an exemplary electronic device programmed to receive user input for the audio system, according to some embodiments of the disclosure.

Figure 57C:
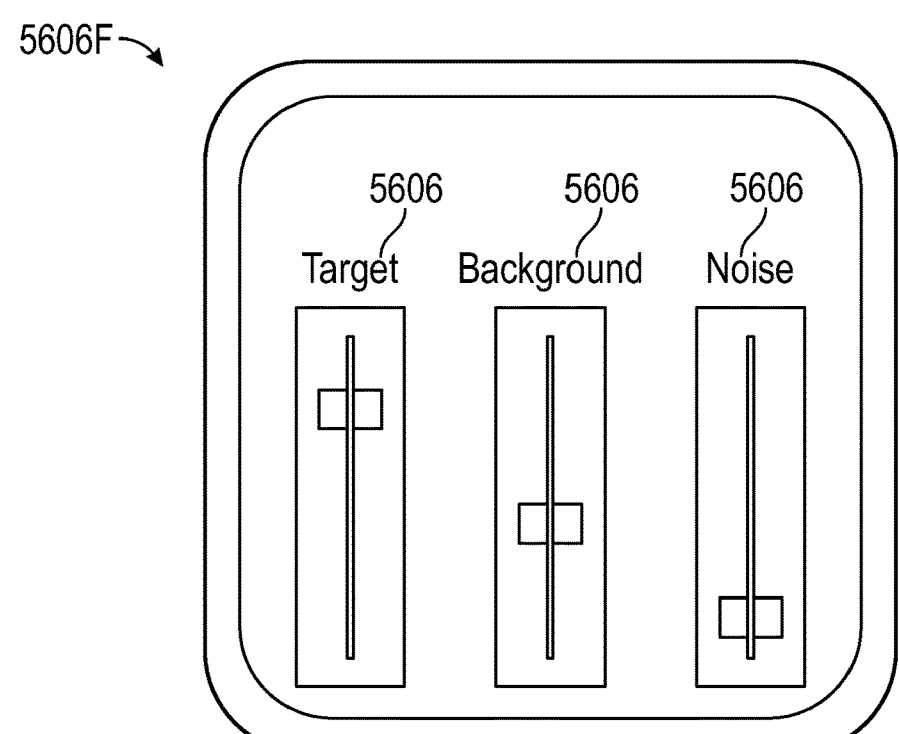

FIG. 57C illustrates an exemplary electronic device programmed to receive user input for the audio system, according to some embodiments of the disclosure.

Figure 57D:
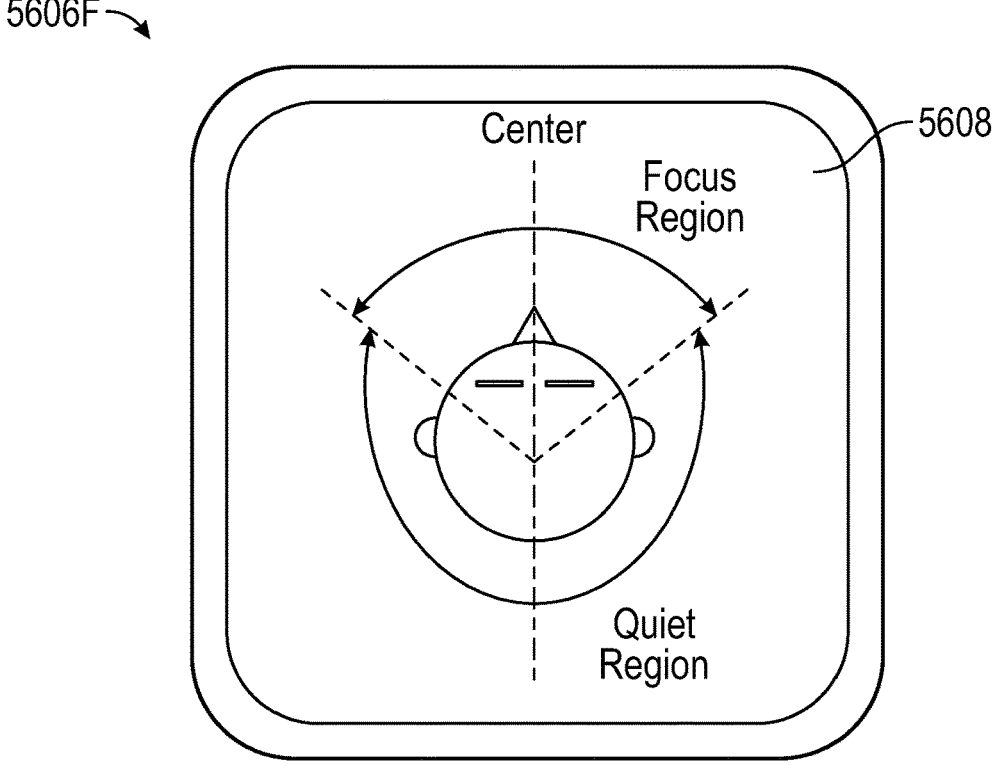

FIG. 57D illustrates an exemplary user interface for an electronic device used for controlling the focus region for the ear pieces, according to some embodiments of the disclosure.

Figure 57E:
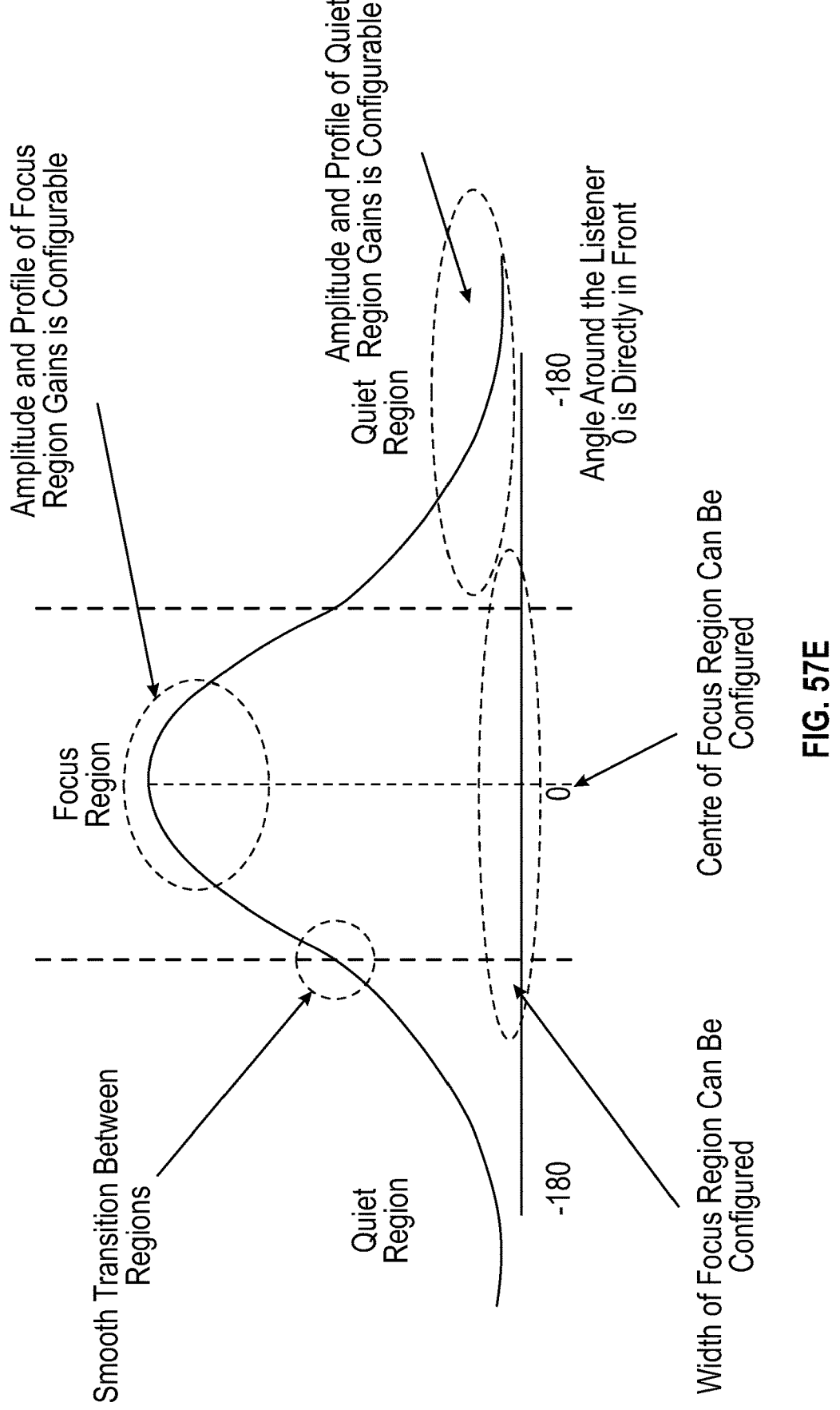

FIG. 57E illustrates an exemplary audio system programmed to create a smooth amplitude transition between the focus region and the regions outside of the focus region, according to some embodiments of the disclosure.

Figures 58A, 58B:
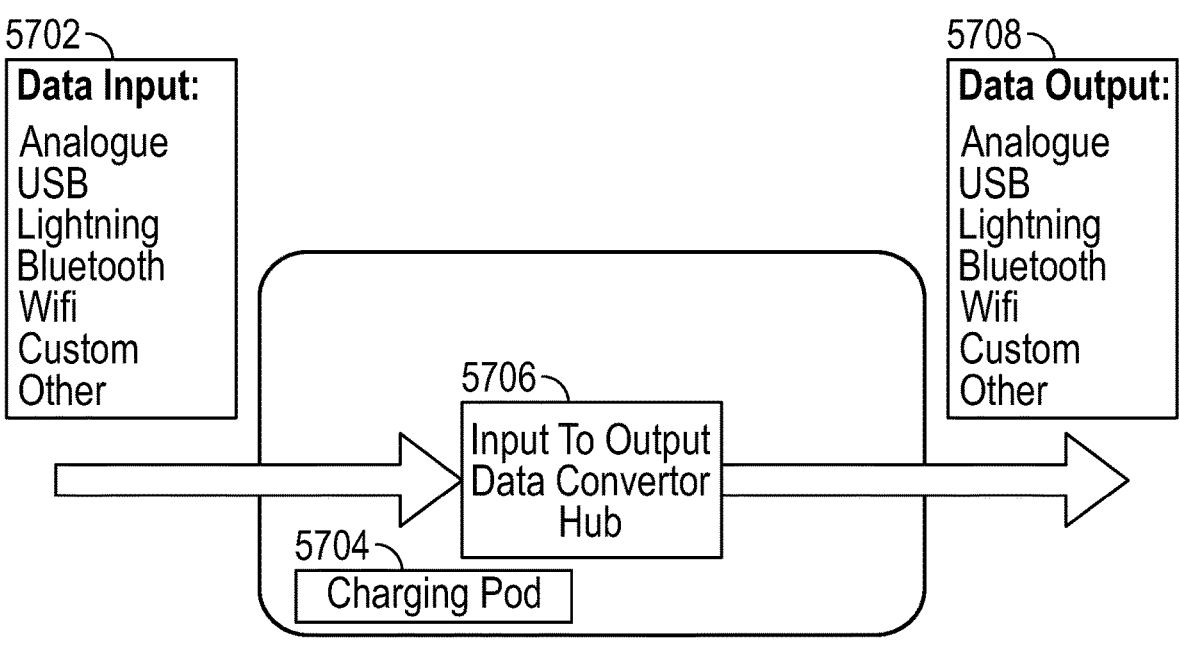

FIG. 58A illustrates an exemplary charging pod acting as a data gateway, according to some embodiments of the disclosure.

FIG. 58B illustrates exemplary ear buds located in the charging pod for data transfers, according to some embodiments of the disclosure.

Figure 59:
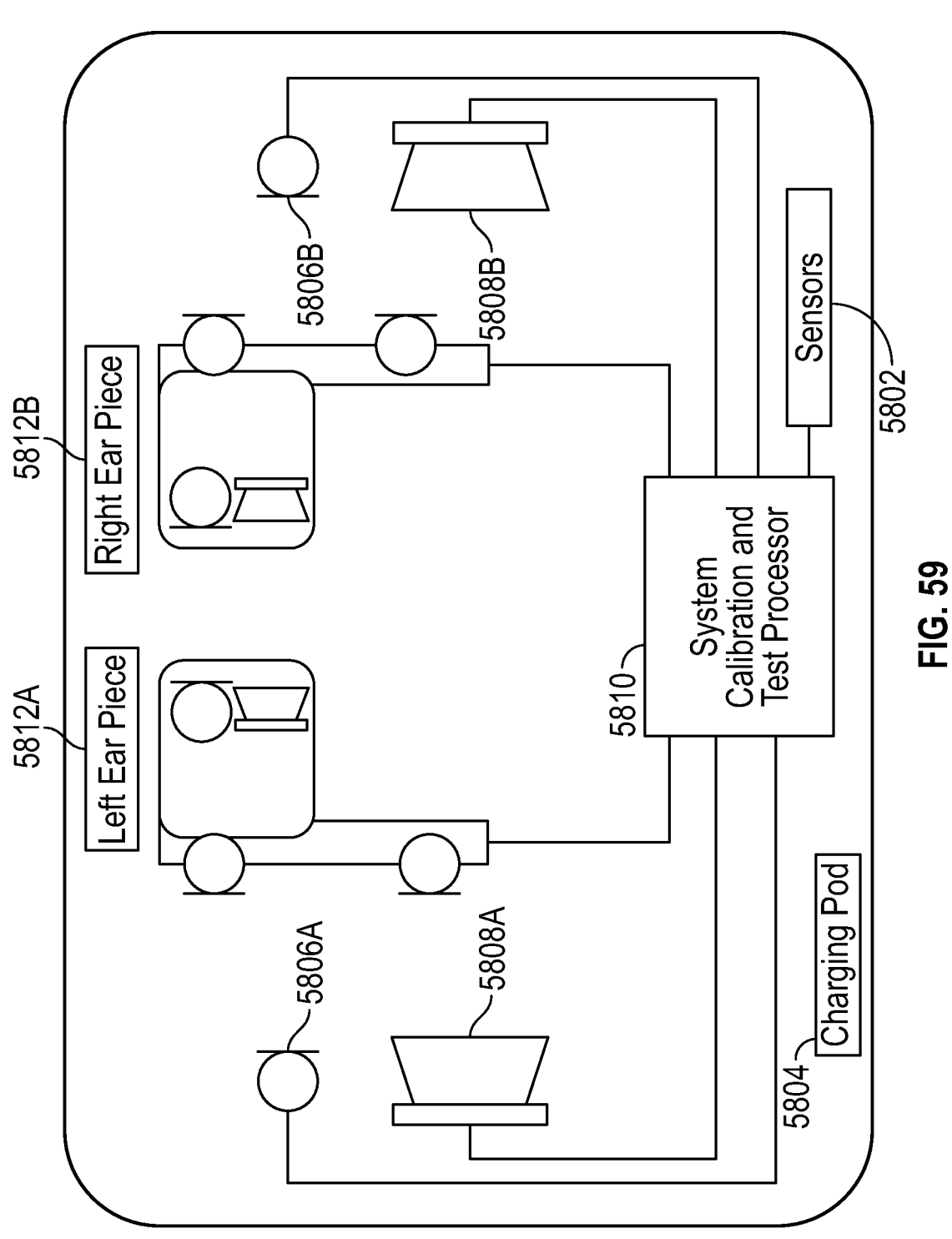

FIG. 59 illustrates an exemplary charging pod, according to some embodiments of the disclosure.

Figure 60A:
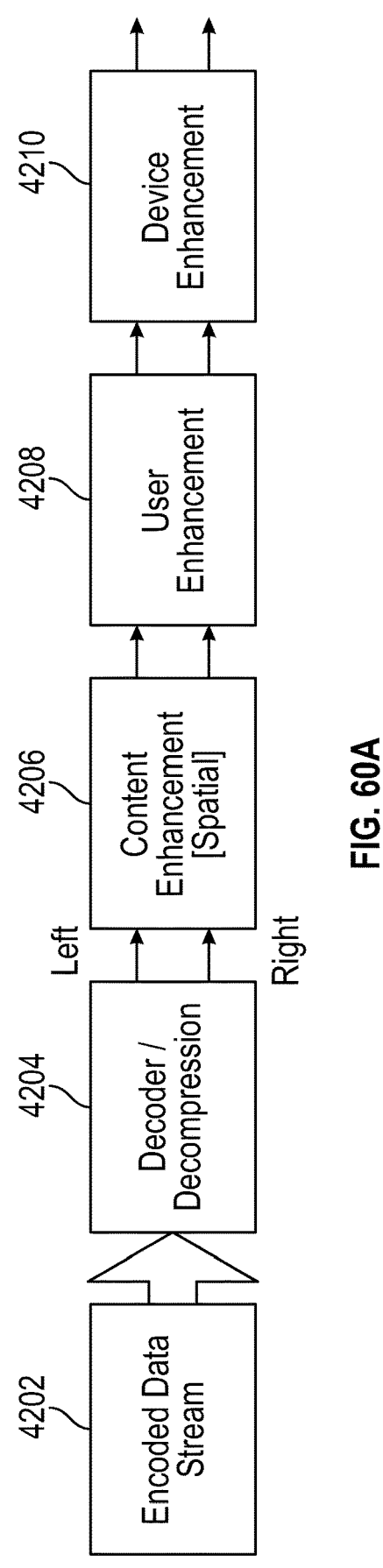

FIG. 60A illustrates an exemplary encoded data stream, decoder/decompression, content enhancement, user enhancement, and device enhancement, according to some embodiments of the disclosure.

Figure 60B:
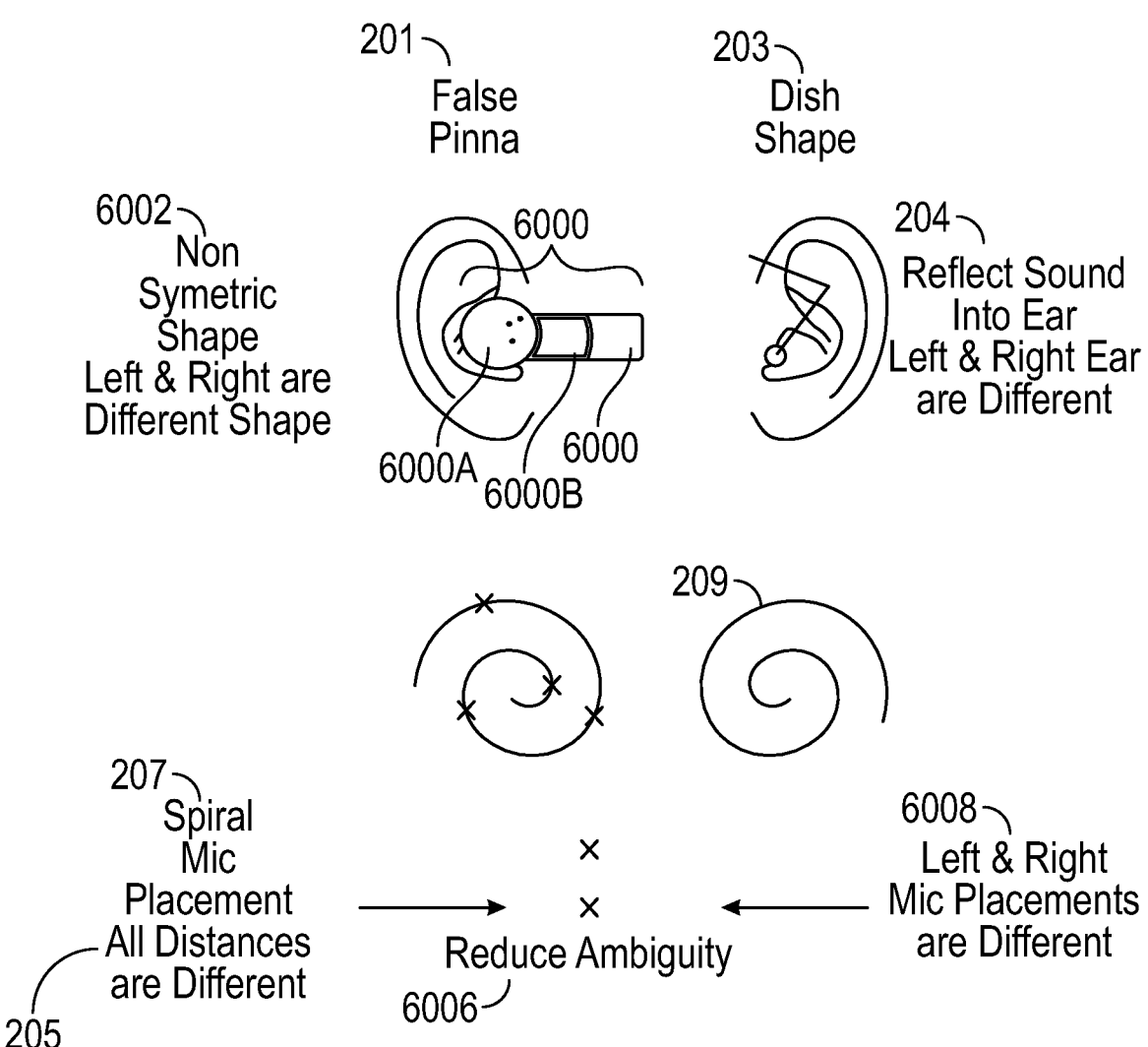

FIG. 60B illustrates exemplary modifications to the mechanical design of an earbud, according to some embodiments of the disclosure.

Figure 61:
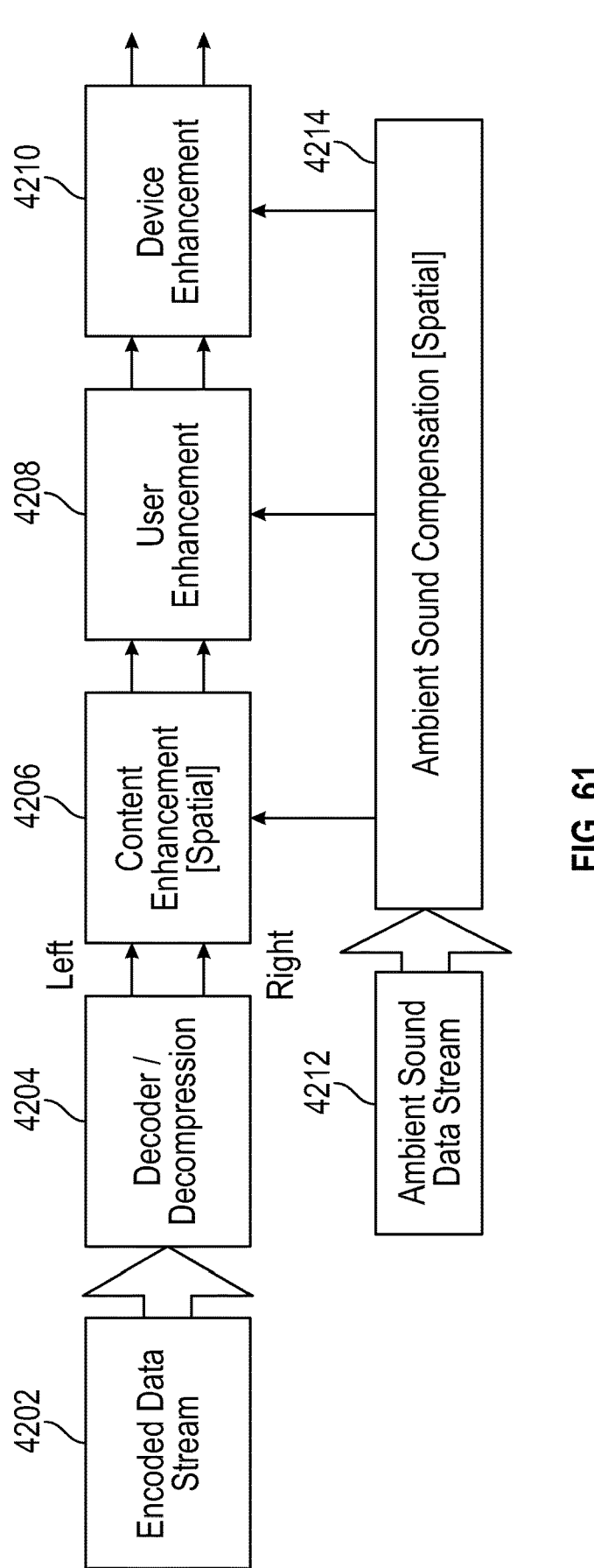

FIG. 61 illustrates exemplary ambient sound data stream being input into ambient sound compensation, according to some embodiments of the disclosure.

Figure 62:
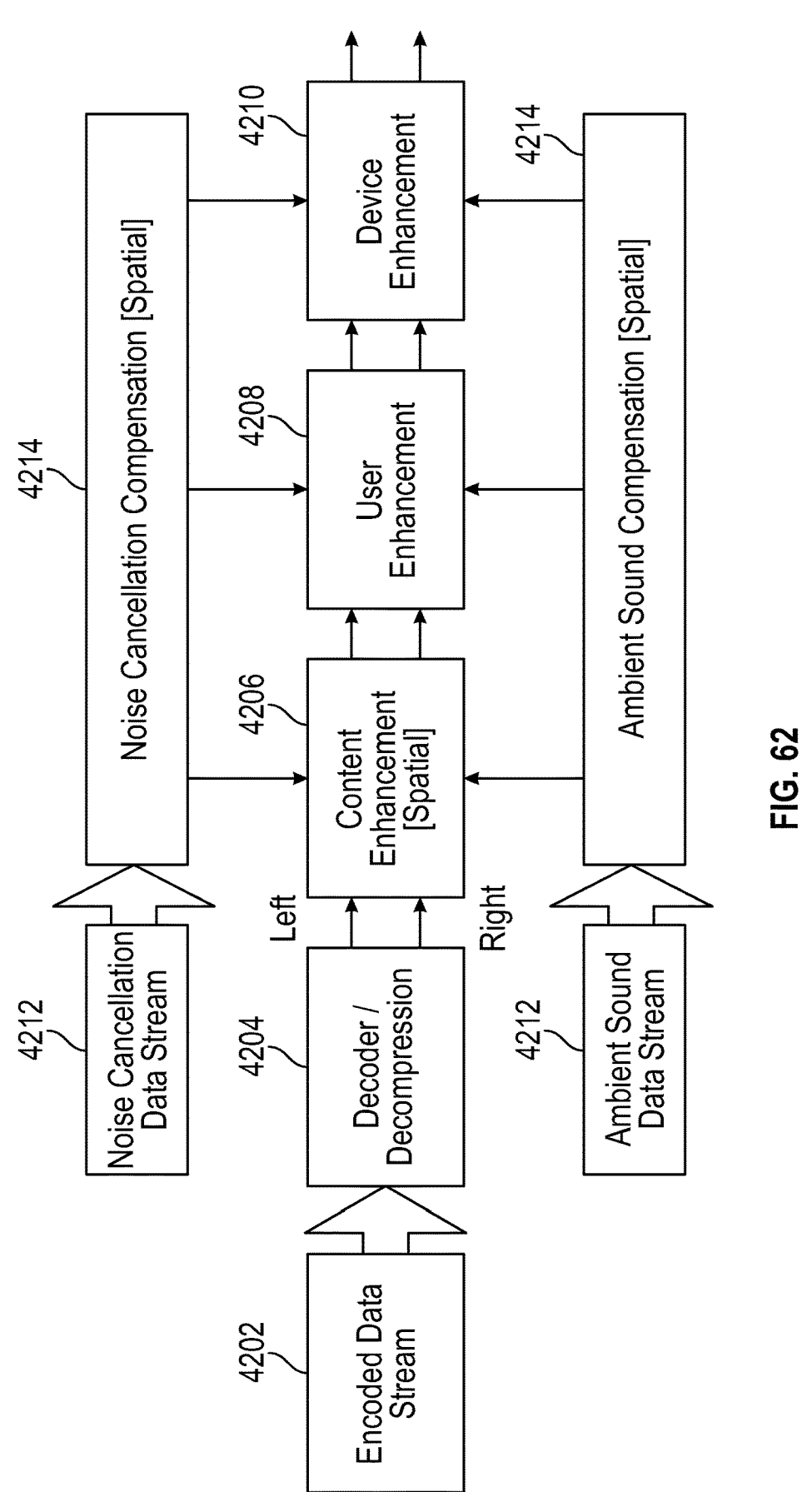

FIG. 62 illustrates an exemplary extension to the basic core architecture of plugins, according to some embodiments of the disclosure.

Figure 63:
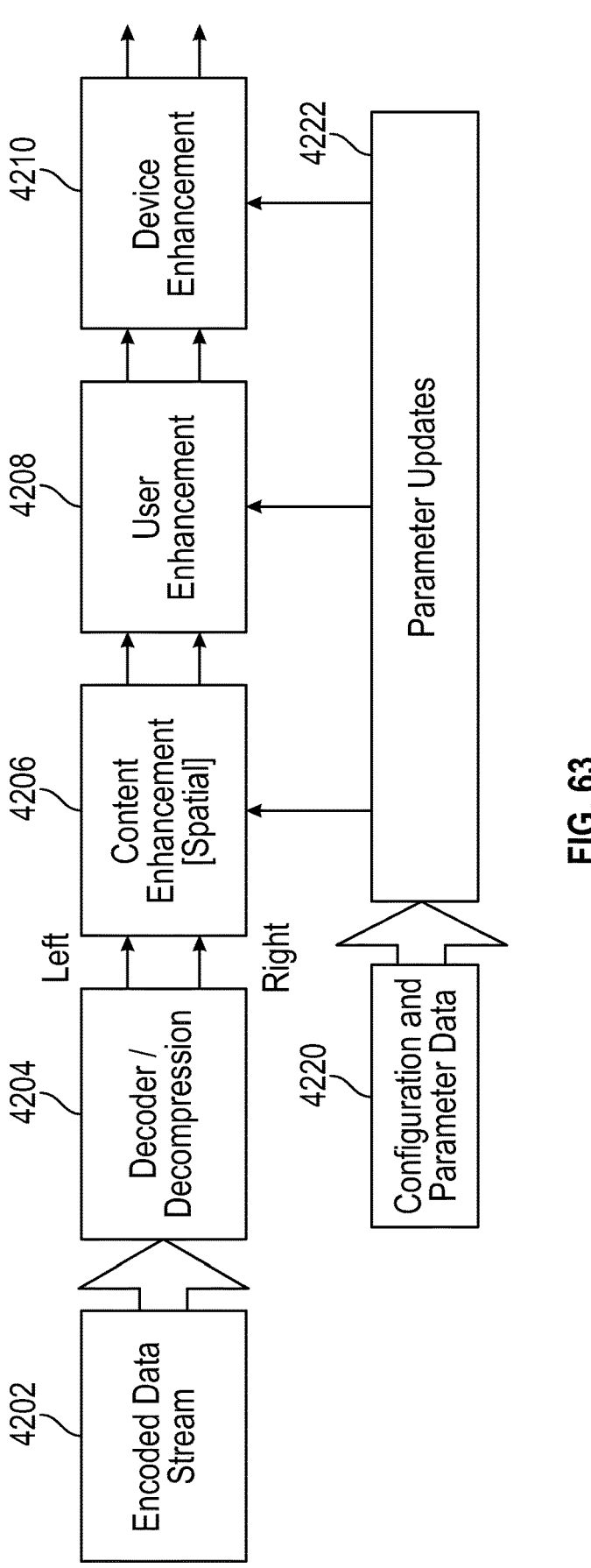

FIG. 63 illustrates an exemplary extension to the system architecture to enable the update of parameters across multiple plugins and processors simultaneously using configuration and parameter data, according to some embodiments of the disclosure.

Figure 64:
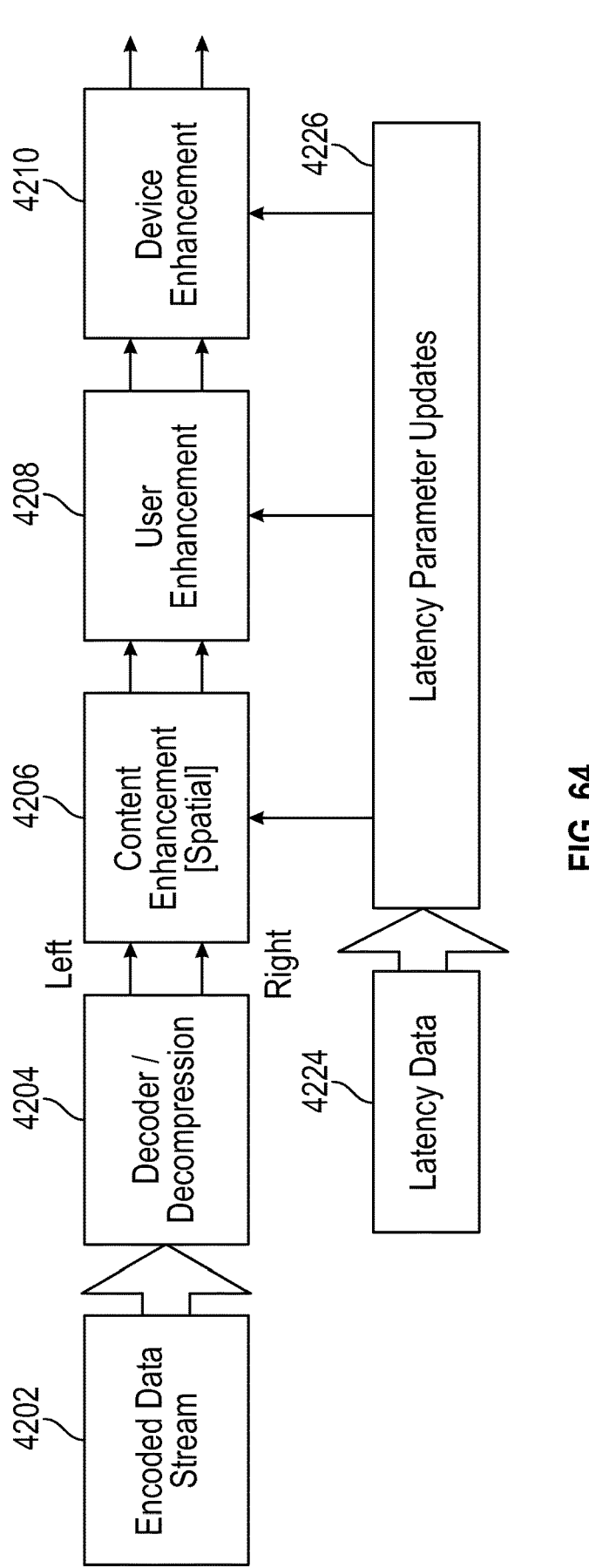

FIG. 64 illustrates an exemplary extension to the system architecture is to inform the plugins in the system when latency needs to be addressed to meet a particular signal processing chain accumulative delay target, according to some embodiments of the disclosure.

Figure 65A:
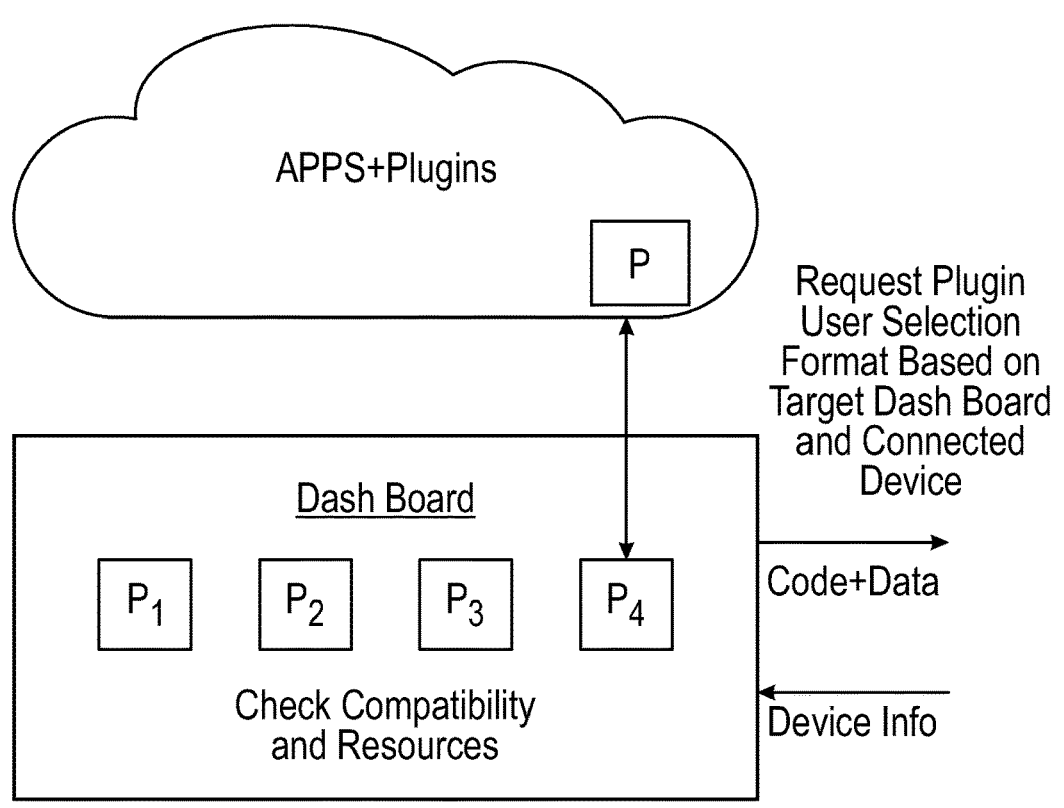
Figure 65B:
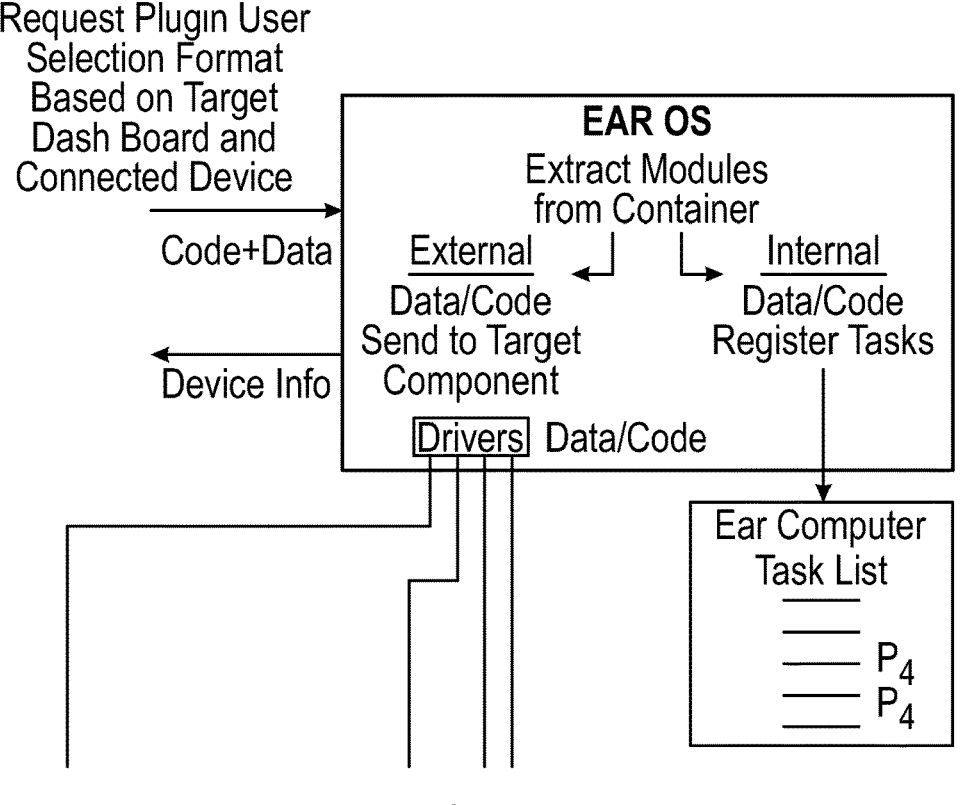
Figure 65C:
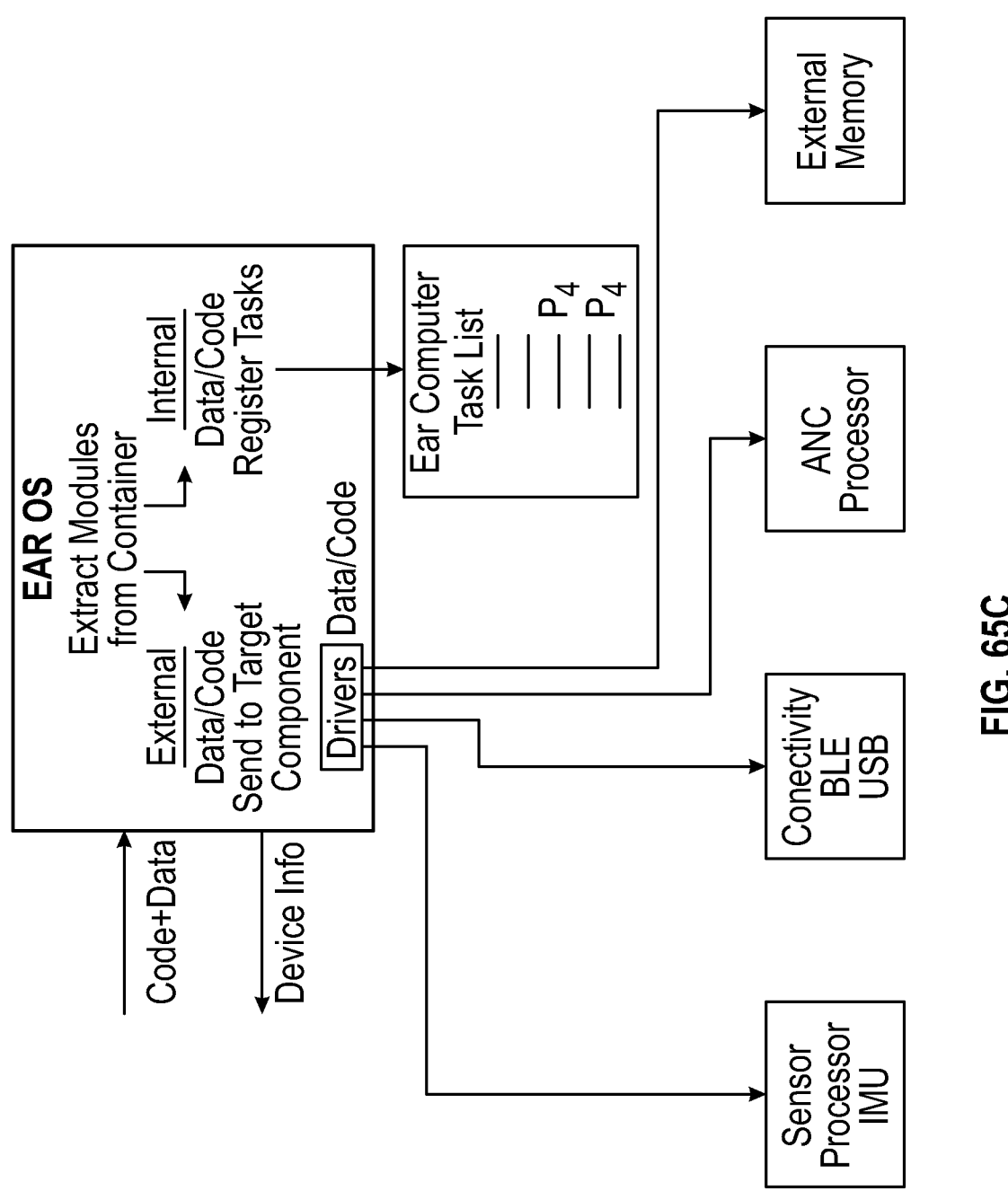

FIGS. 65A-65C illustrates exemplary system architectures and information transfers, according to some embodiments of the disclosure.

Figure 66A:
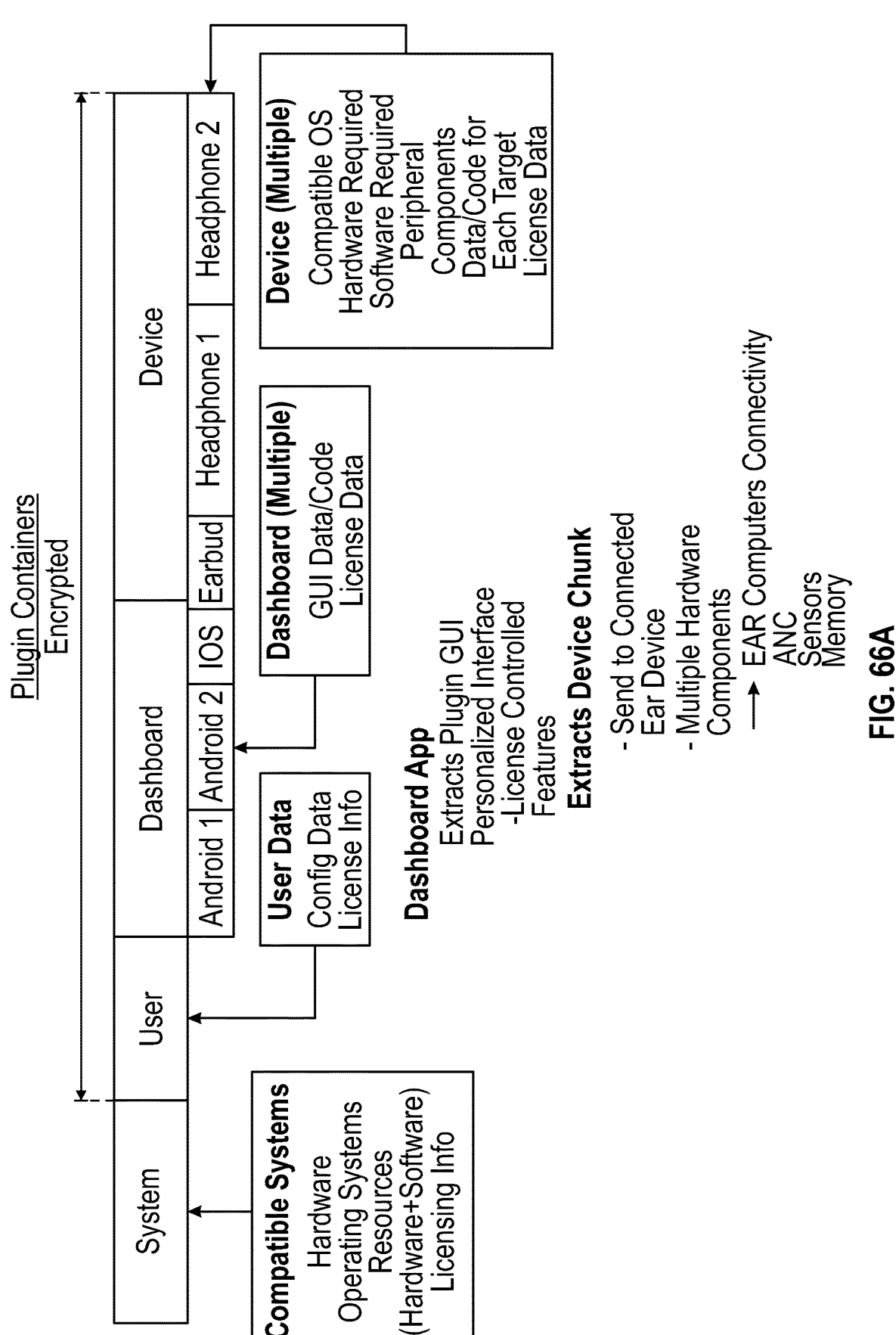
Figure 66B:
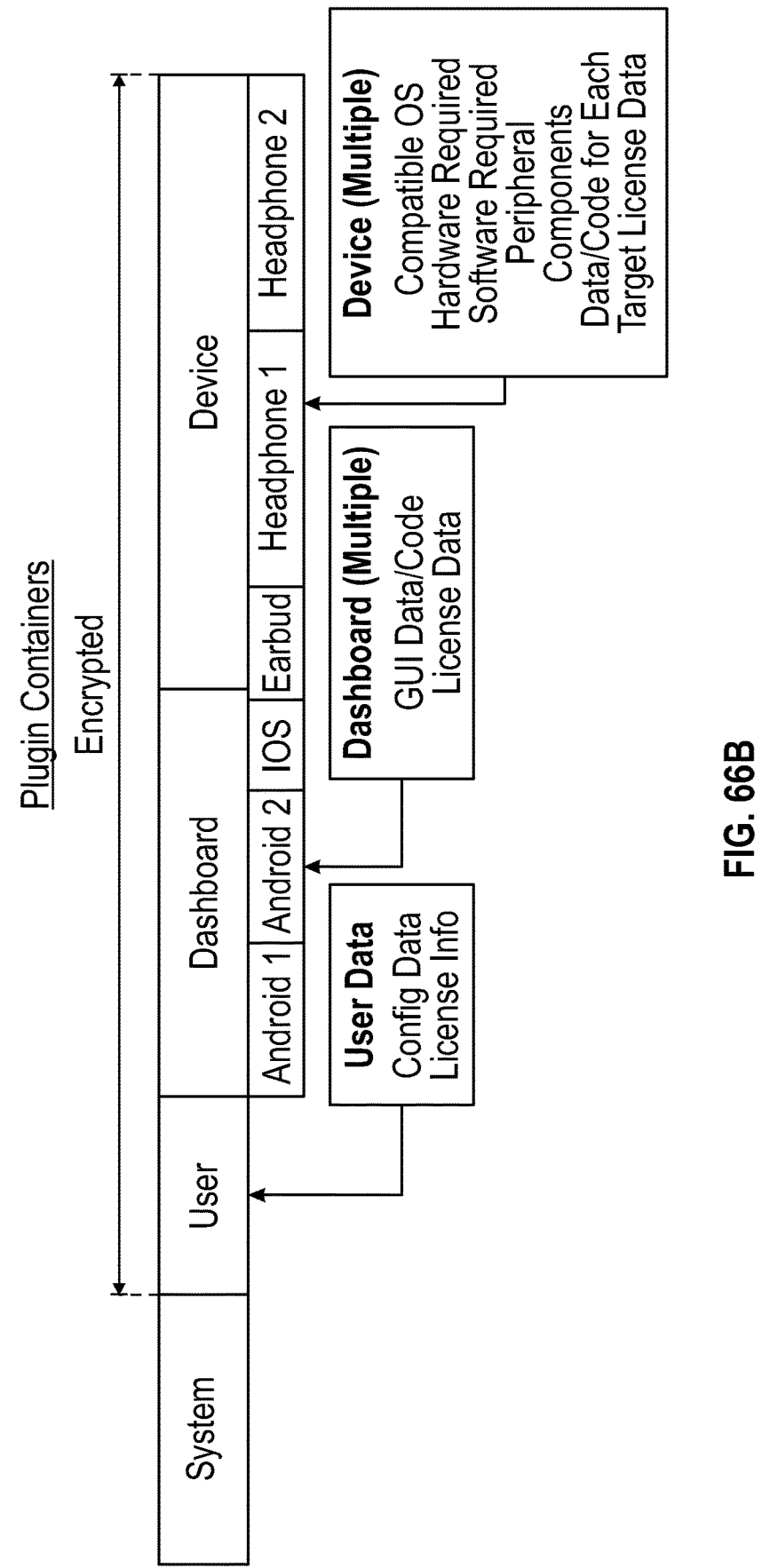
Figure 66C:
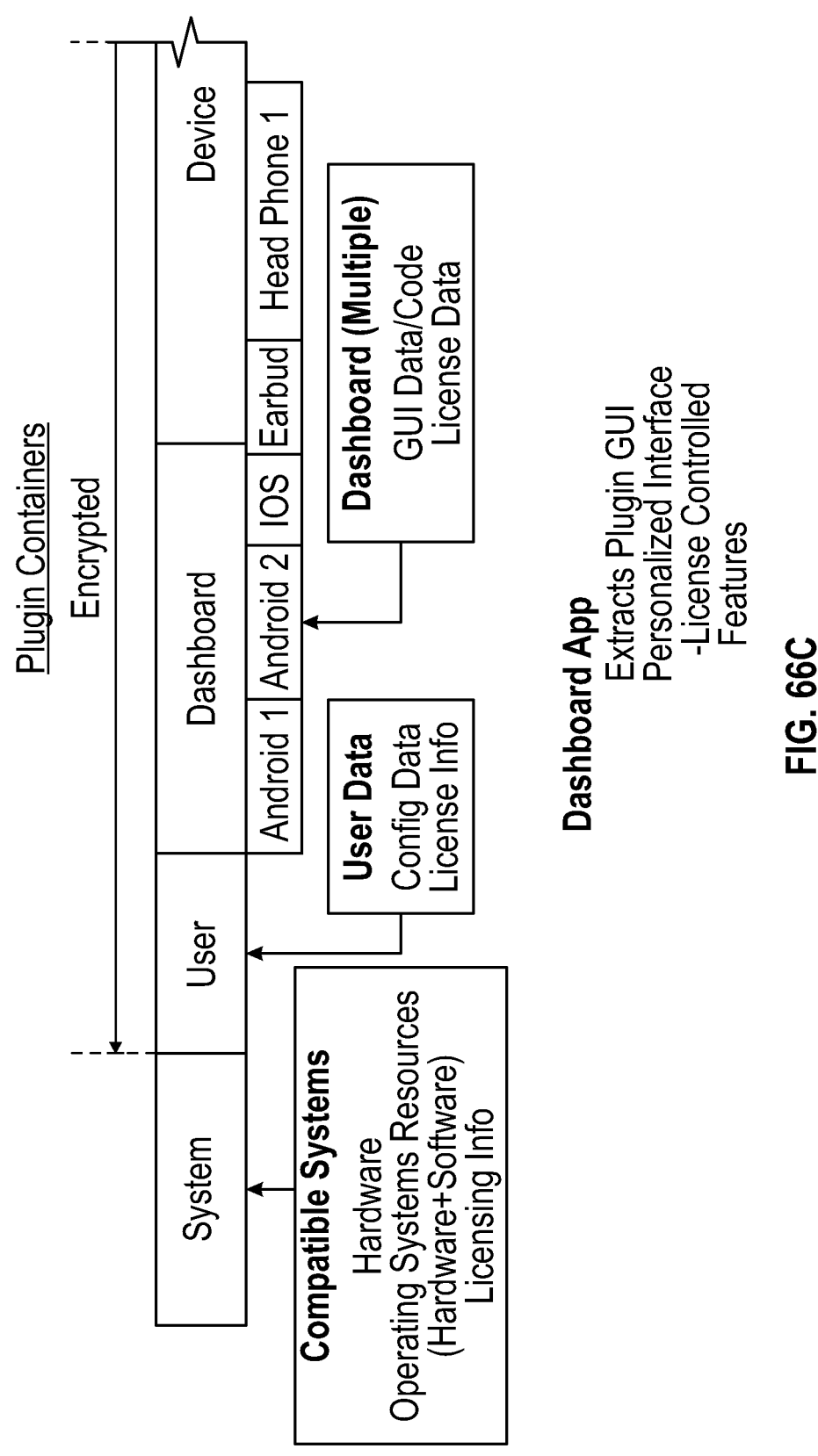

FIGS. 66A-66C illustrates an exemplary container, according to some embodiments of the disclosure.

Figure 67:
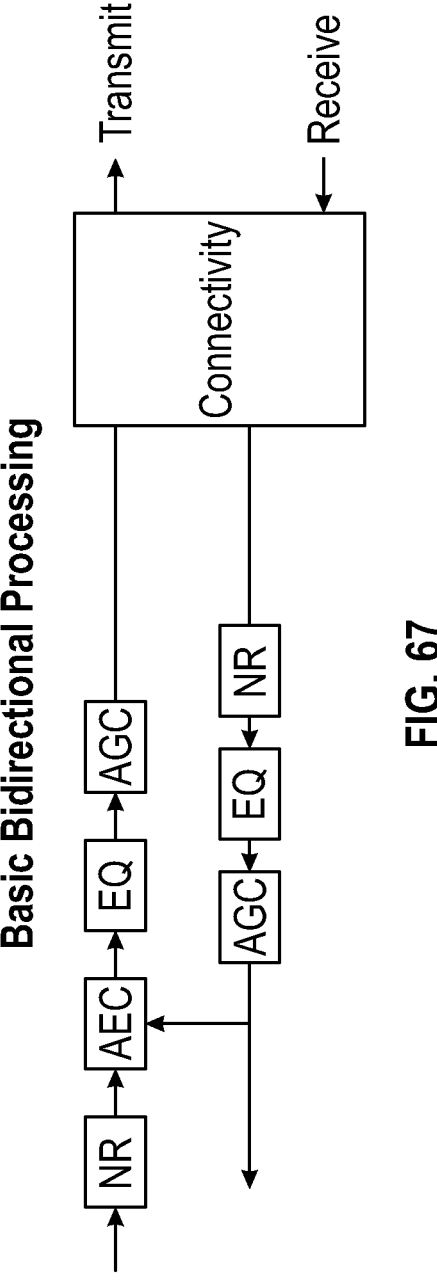

FIG. 67 illustrates an example of speech processing for a phone call, according to some embodiments of the disclosure.

Figures 68, 69:
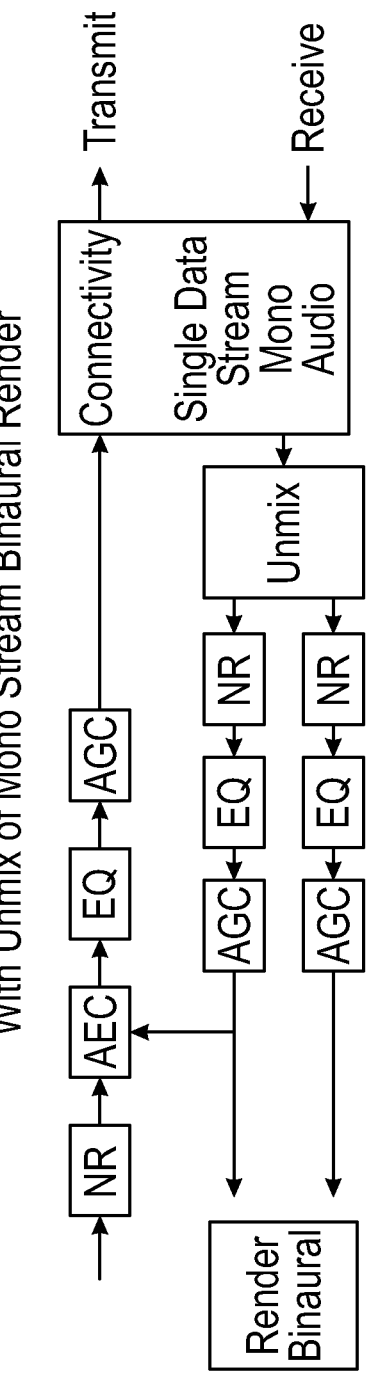

FIG. 68 illustrates an exemplary single receive stream, according to embodiments of the disclosure, according to some embodiments of the disclosure.

FIG. 69 illustrates an exemplary increase in spatial separation of the talkers to help intelligibility and make the audio more pleasant to listen to rather than a plain mono signal that is perceived to be located in the middle of the listener's head, according to some embodiments of the disclosure.

Figures 70, 71:
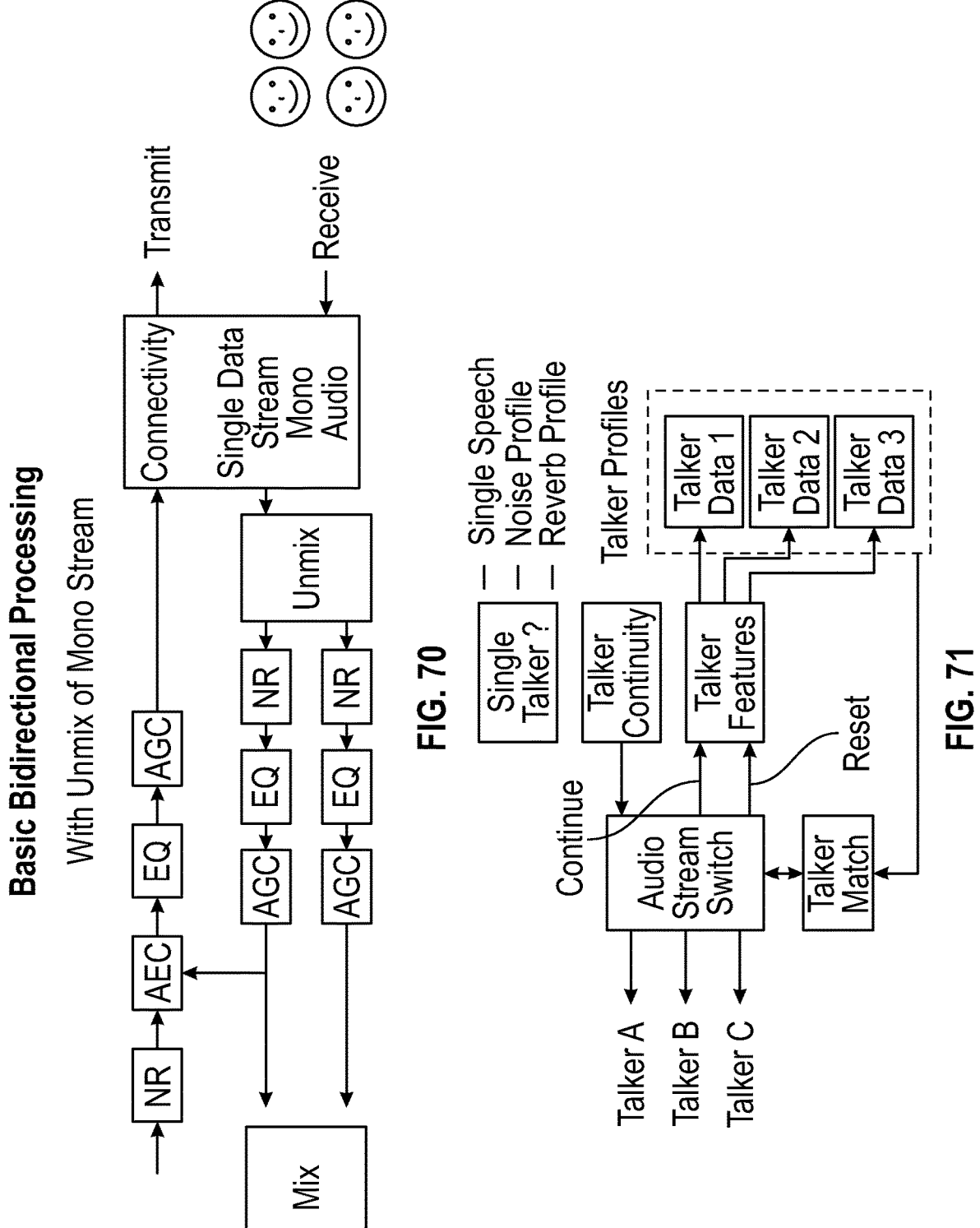

FIG. 70 illustrates exemplary multiple participants could use separate individual connections into a conference call, or all in a single room or any combination of these, according to some embodiments of the disclosure.

FIG. 71 illustrates an exemplary unmixing processing, according to some embodiments of the disclosure.

Figure 72:
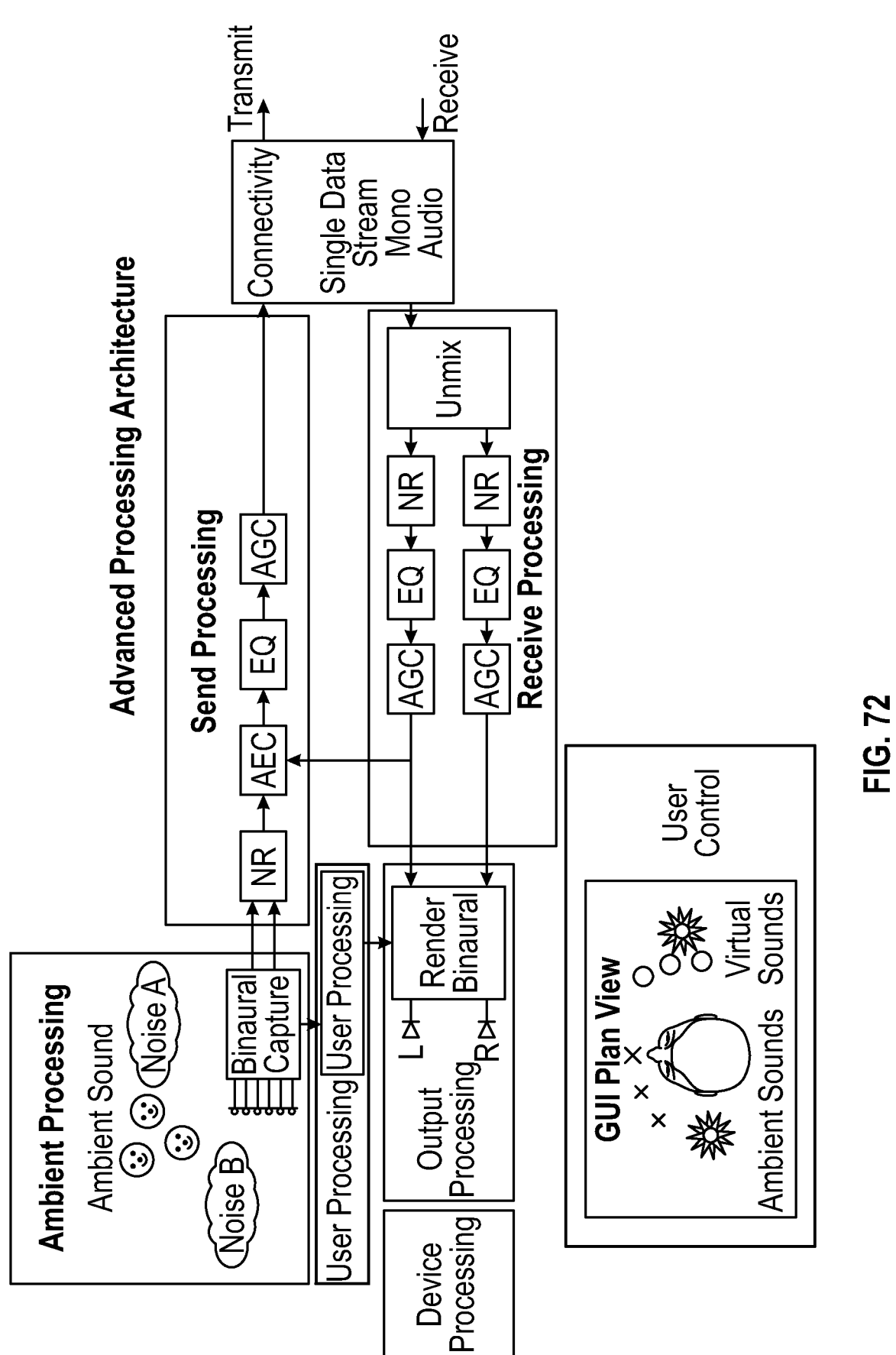

FIG. 72 illustrates exemplary preparation of audio for the output rendering processing for creating a better scene of talkers for the listener to experience, according to some embodiments of the disclosure.

Figure 73:
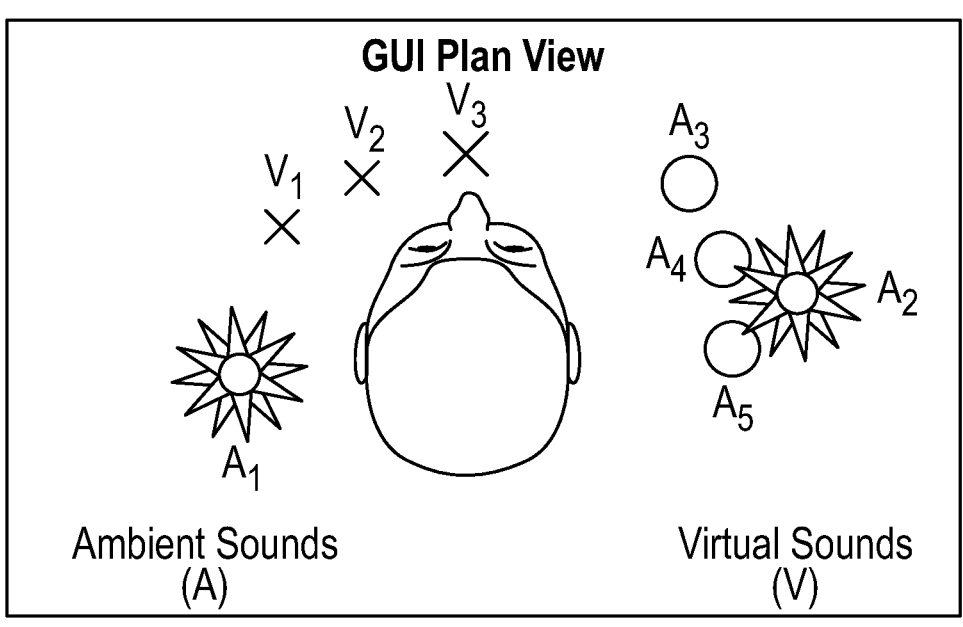

FIG. 73 illustrates an exemplary graphical user interface showing the locations of real ambient sounds that causes noise or distractions, according to some embodiments of the disclosure.

Figure 74:
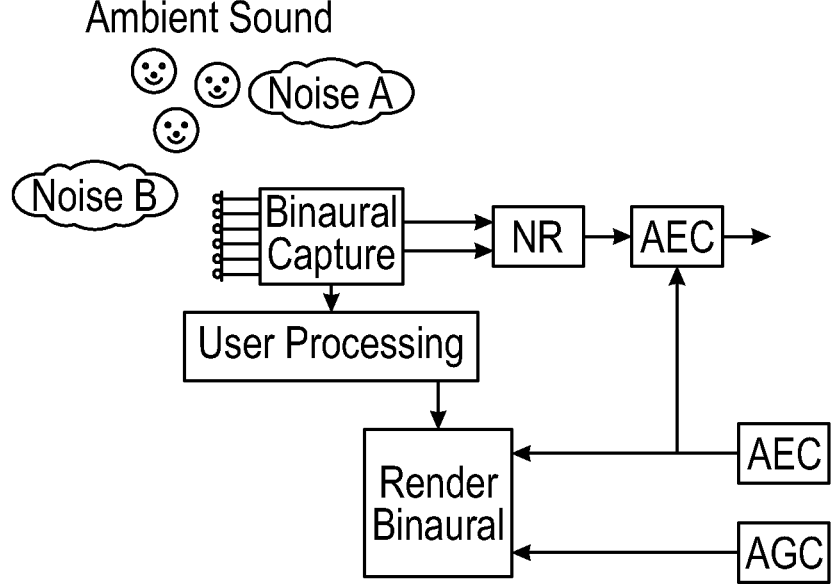

FIG. 74 illustrates an exemplary multipath processing, according to some embodiments of the disclosure.

Figure 75:
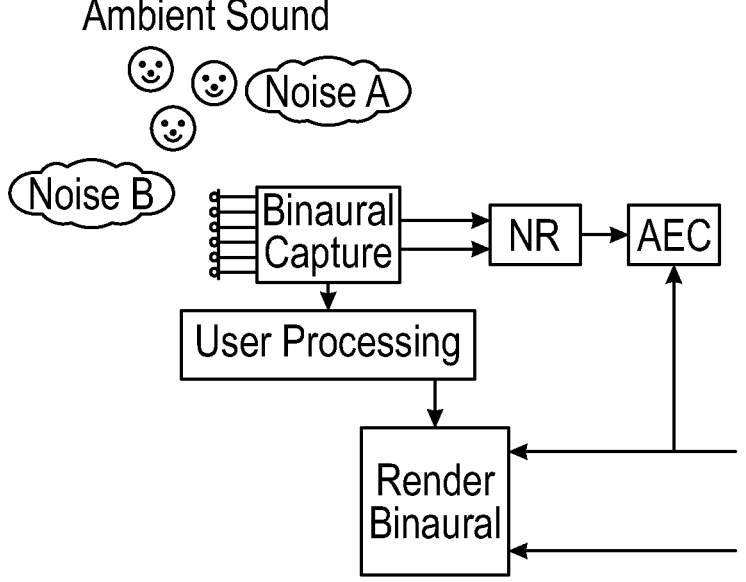
Figure 75:
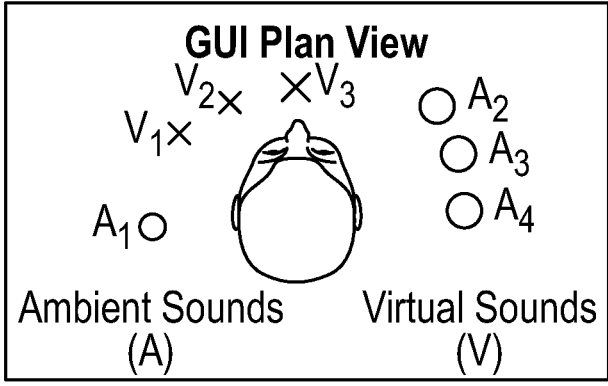

FIG. 75 illustrates an exemplary separate processing path architecture with a corresponding user control application, according to some embodiments of the disclosure.

Figure 76:
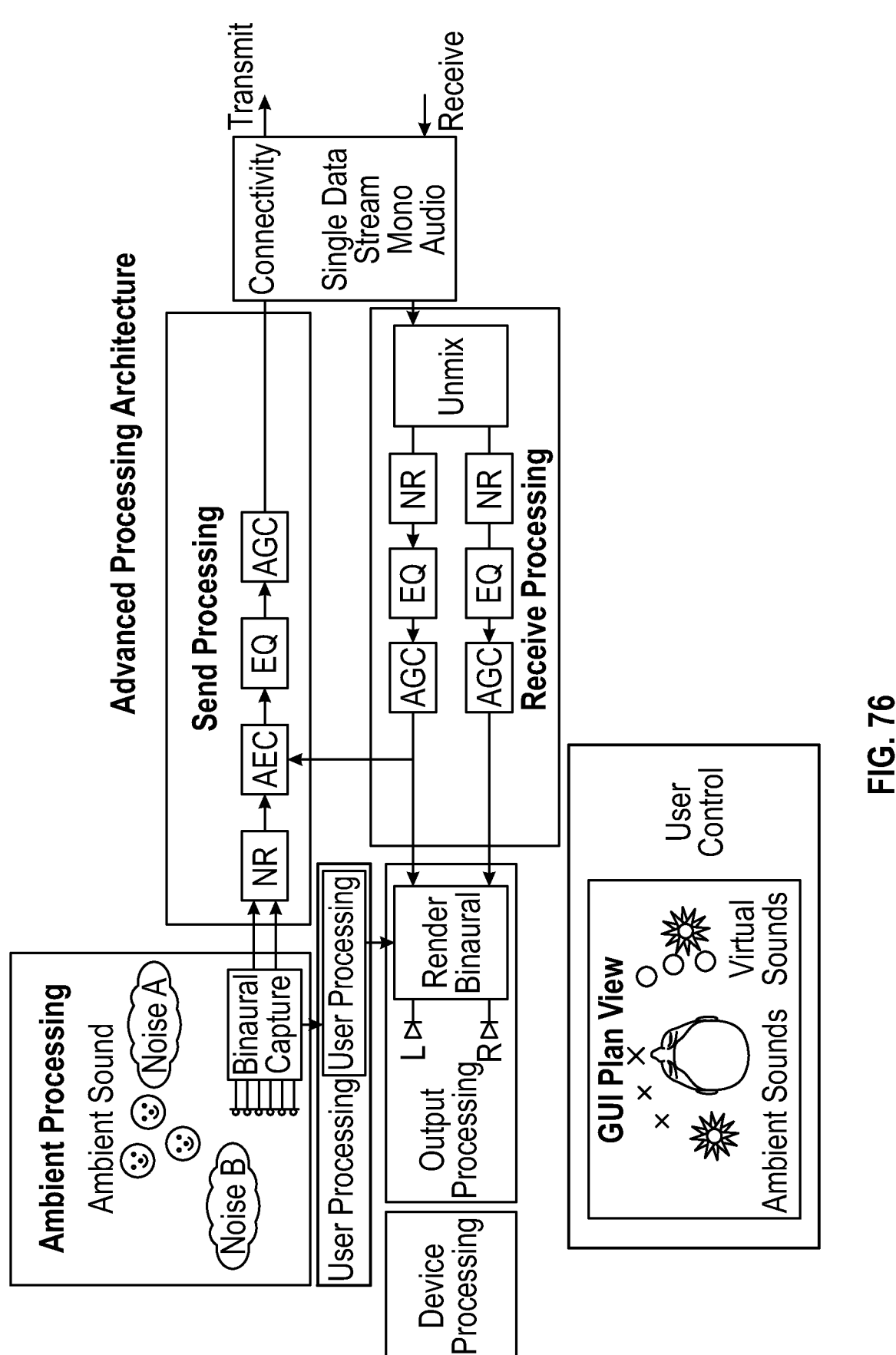

FIG. 76 illustrates an exemplary plugin architecture for multiple processing paths, according to some embodiments of the disclosure.

Figure 77A:
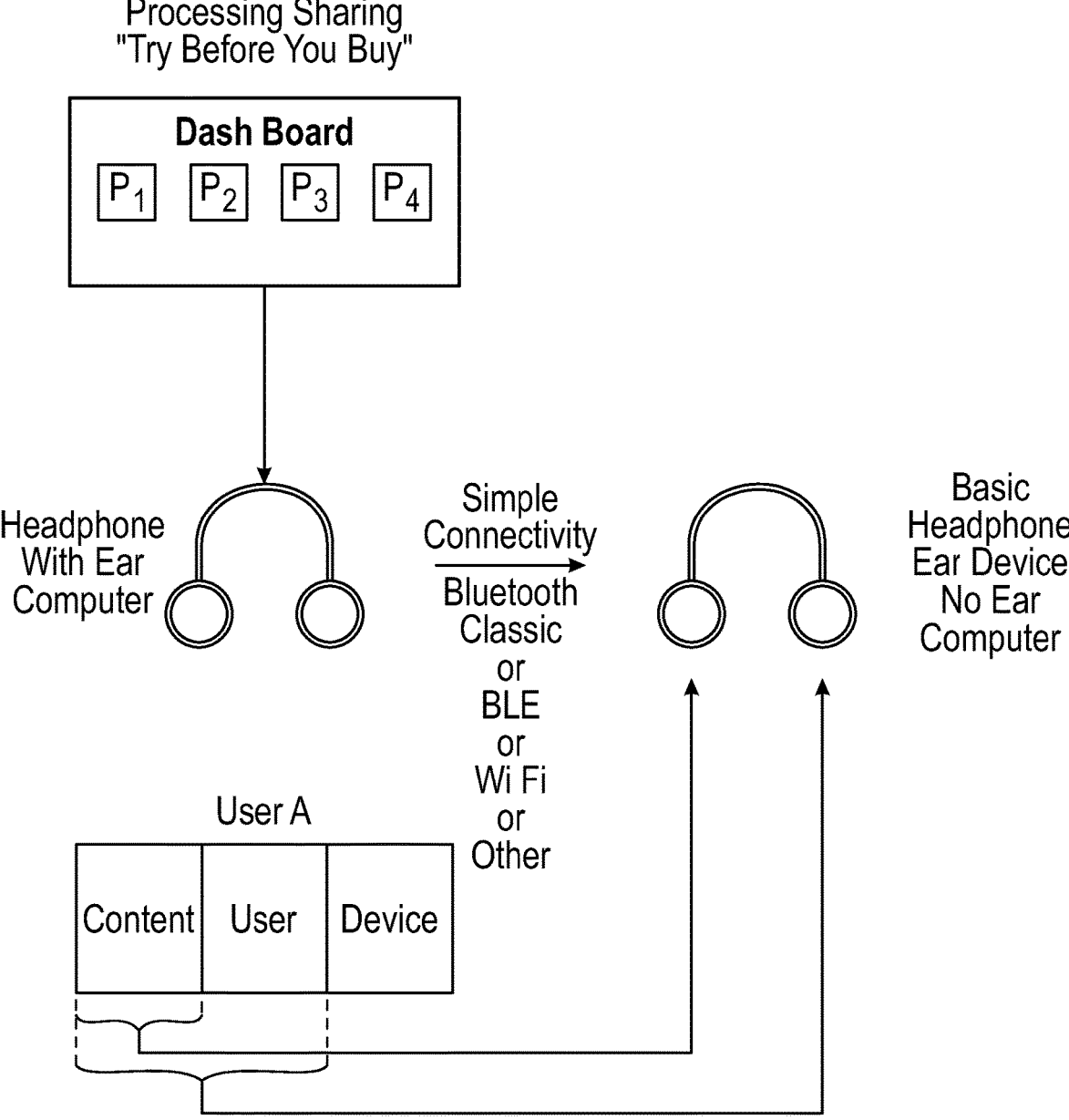

FIG. 77A illustrates an exemplary plugin spatially separating participants in a conference call, according to some embodiments of the disclosure.

Figure 77B:
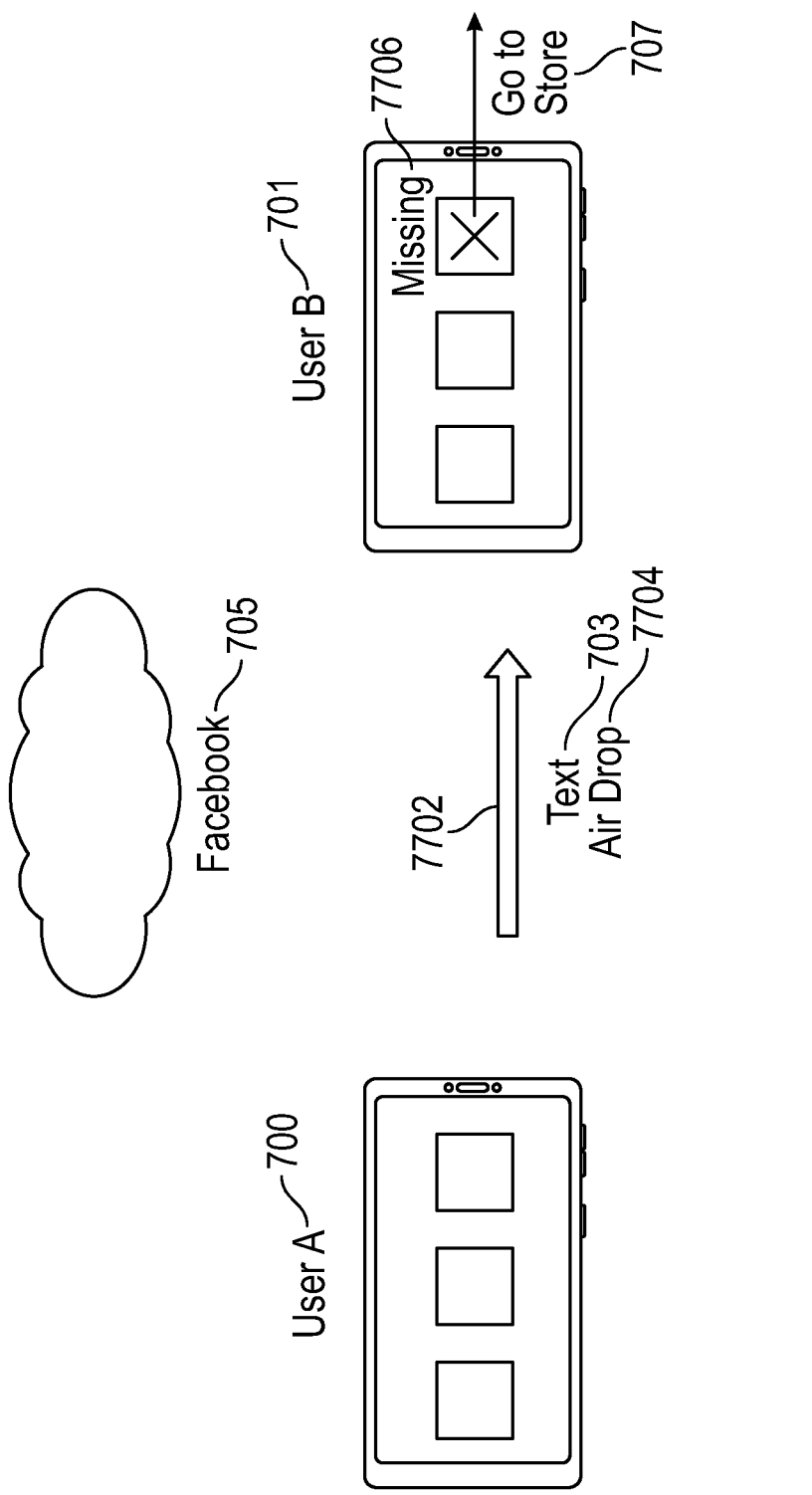

FIG. 77B illustrates an exemplary user profile sharing, according to some embodiments of the disclosure.

Figures 77C, 77D:
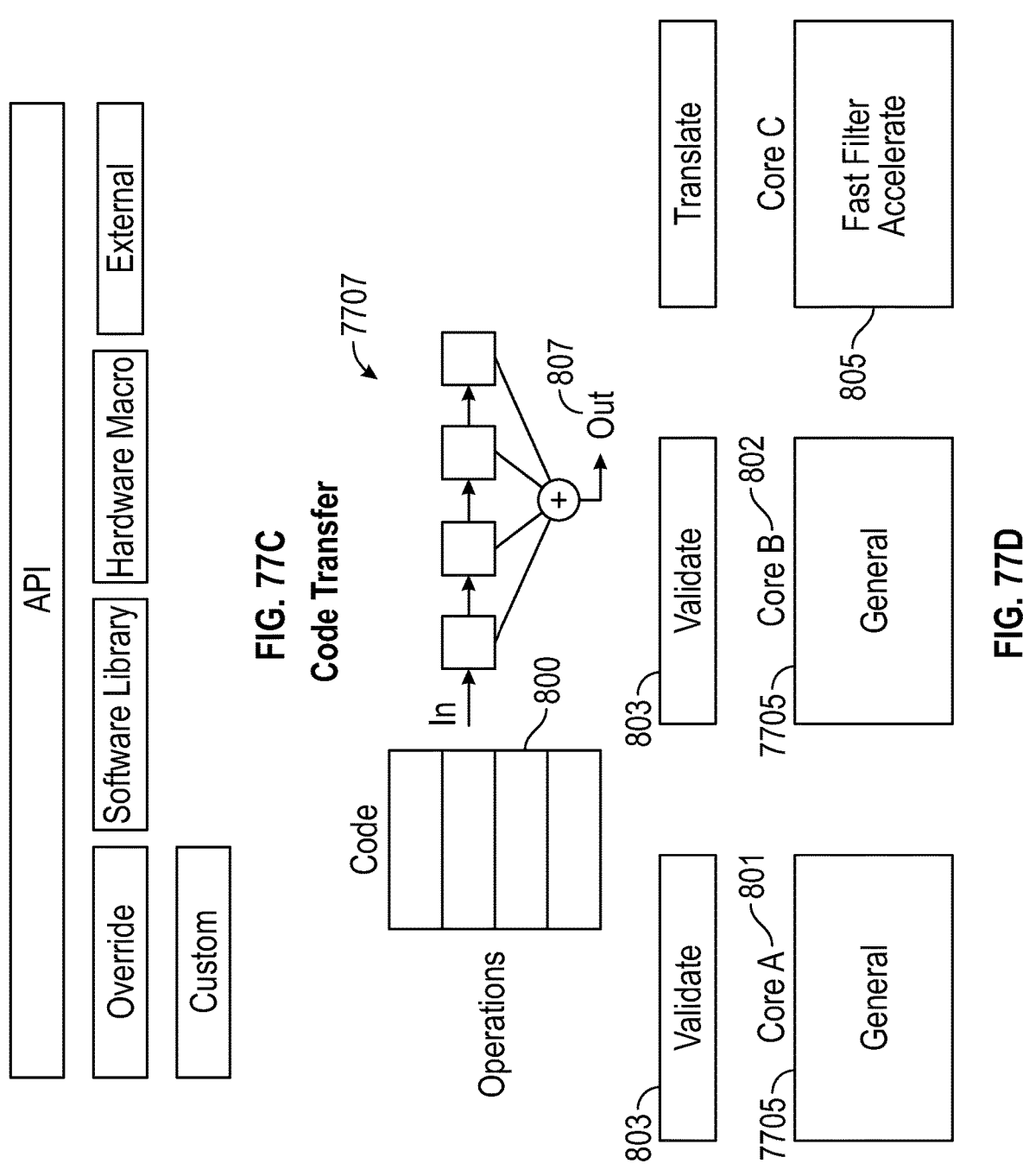

FIG. 77C illustrates an exemplary single API for supporting multiple implementations within a system, according to some embodiments of the disclosure.

FIG. 77D illustrates an exemplary code transfer to multiple components, according to some embodiments of the disclosure.

Figure 77E:
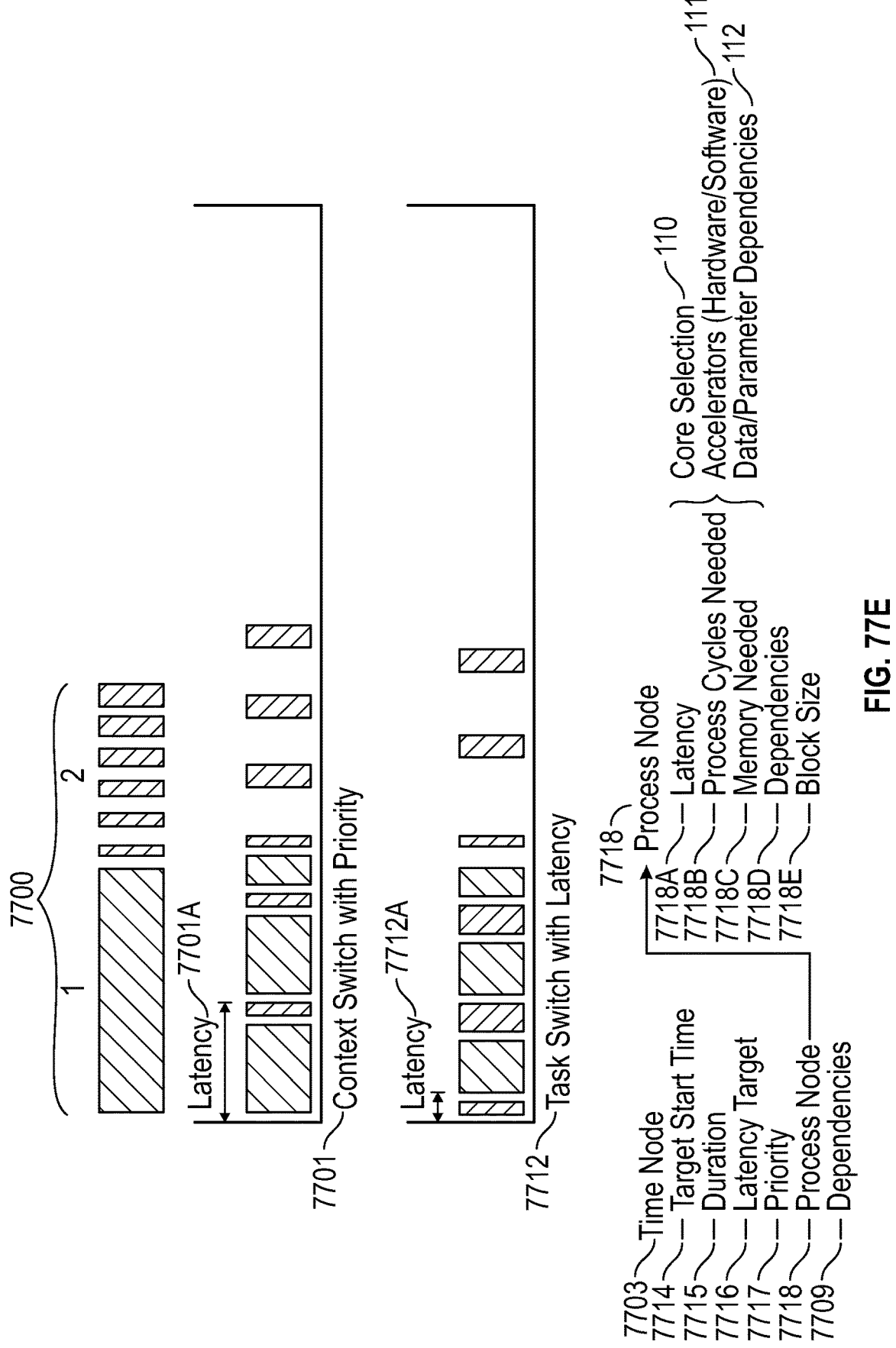

FIG. 77E illustrates an exemplary ear operating system running in real time audio to achieve very low latency, according to some embodiments of the disclosure.

Figure 77F:
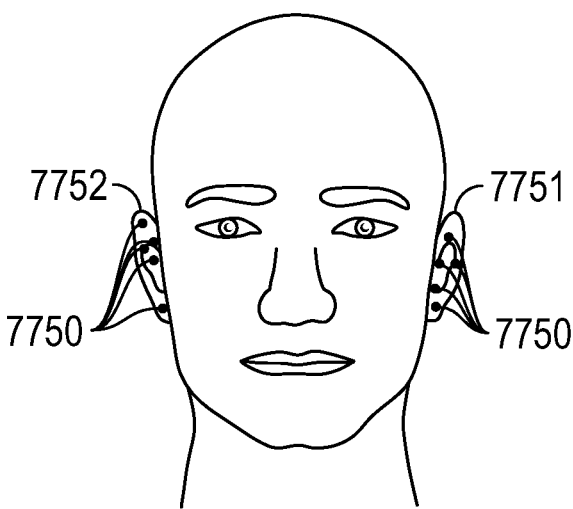

FIG. 77F illustrates exemplary synthetic ears for applications such as robots and drones, according to some embodiments of the disclosure.

DETAILED DESCRIPTION

The following description is presented to enable a person of ordinary skill in the art to make and use various embodiments. Descriptions of specific devices, techniques, and applications are provided only as examples. These examples are being provided solely to add context and aid in the understanding of the described examples. It will thus be apparent to a person of ordinary skill in the art that the described examples may be practiced without some or all of the specific details. Other applications are possible, such that the following examples should not be taken as limiting. Various modifications in the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to a person of ordinary skill in the art, that one or more aspects and/or features described or referenced herein may be practiced without some or all of these specific details. In other instances, well-known process steps and/or structures have not been described in detail in order to not obscure some of the aspects and/or features described or referenced herein.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combination of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used in this application, the terms "component" and "system" are intended to refer to a computer-related entity, either hardware, a combination of software and tangible hardware, software, or software in execution.

Exemplary Audio System

Figure 1A:
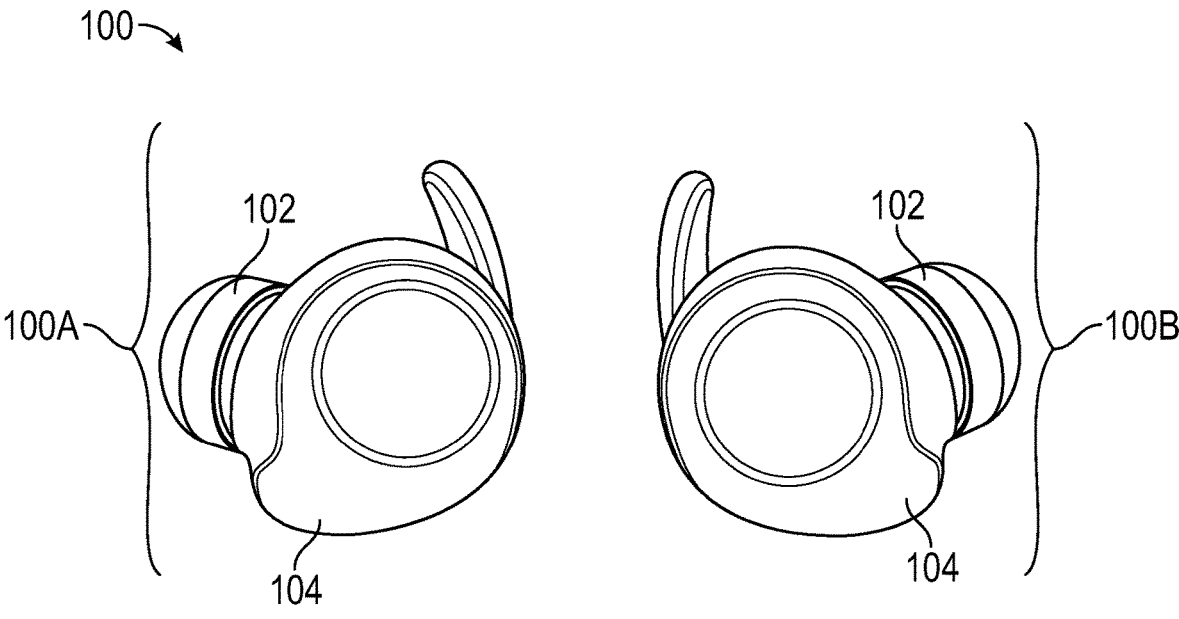
FIG. 1A illustrates an exemplary audio system, according to some embodiments of the disclosure.

FIG. 1A illustrates an exemplary audio system in which embodiments of the disclosure can be implemented. Audio system 100 can include a left ear piece 100A and a right ear piece 100B. Each ear piece may include one or more speakers and one or more microphones 102 located within housing 104. The audio system 100 can have different form factors, such as over ear, on ear, and in ear. The audio system 100 may also include one or more transceivers and/or ports (not shown) for communicating with another device, such as a battery charger, an electronic device, etc. The audio system 100 may communicate using a wired connection or a wireless connection. Exemplary wired connections can include, but are not limited to, a passive connection (e.g., an analog cable) and an active connection (e.g., universal serial bus (USB) digital audio data cable). Exemplary wireless connections can include, but are not limited to, Bluetooth, WiFi, radio frequency (RF), cellular (4G, LTE, 5G), near field communications (NFC) and near-field magnetic induction (NFMI) communications.

Figure 1B:
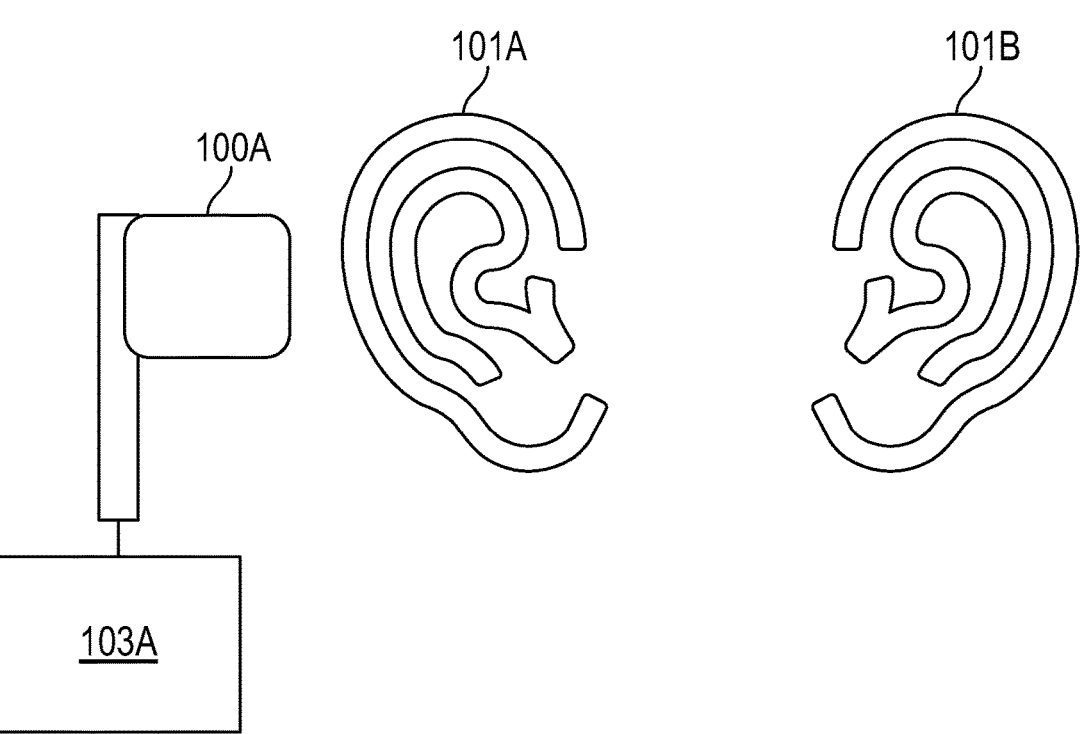
FIG. 1B illustrates an exemplary monaural device including a single ear piece programmed to output sounds to a single ear, according to some embodiments of the disclosure.

The audio system 100 may include a monaural, a dual monaural, or a binaural device. A monaural device may include a single ear piece programmed to output sounds to a single ear. For example, as shown in FIG. 1B, ear piece 100A may be programmed to output sounds to ear 101A. In some embodiments, ear piece 100A may not be programmed to output sounds to ear 101B. The monaural device may also include a processor 103. The monaural device may be receiving multiples channels of data.

Figure 1C:
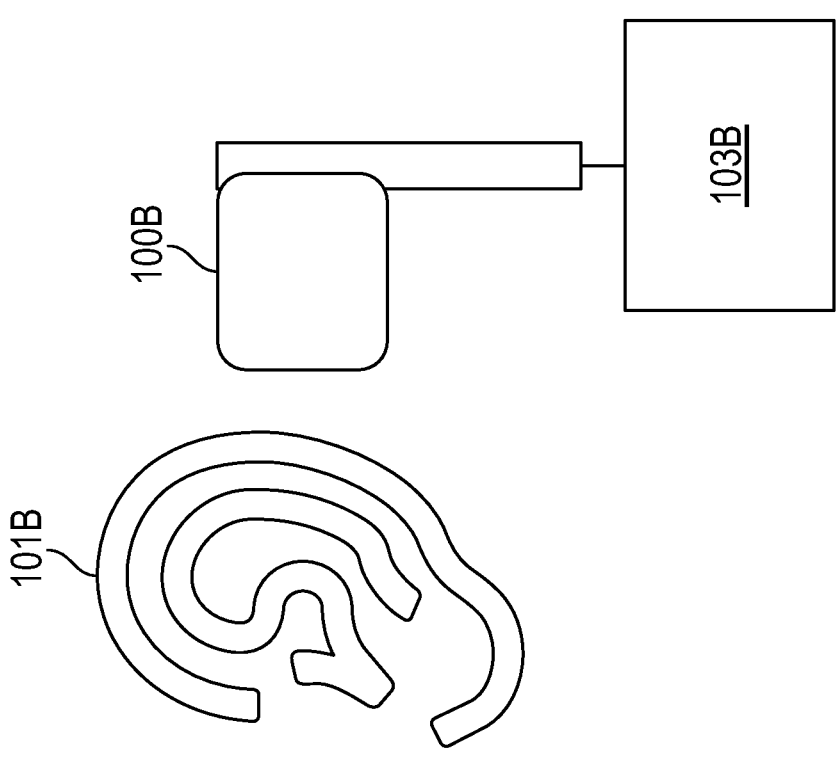
FIG. 1C illustrates an exemplary dual monaural device, according to some embodiments of the disclosure.
Figure 1C:
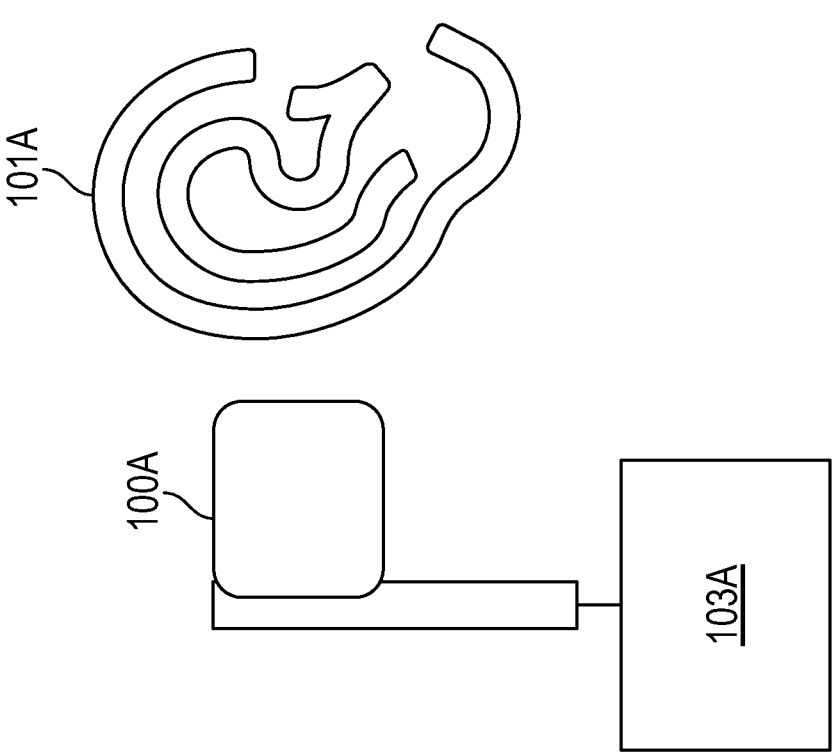

FIG. 1C illustrates a dual monaural device, according to some embodiments of the disclosure. A dual monaural device may include two ear pieces 100A and 100B. Each ear piece may be programmed to output sounds to a single ear. Ear piece 100A may be programmed to output sounds to ear 101A, and ear piece 100B may be programmed to output sounds to ear 101B. The two ear pieces in a dual monaural device may not communicate or have a communications link between each other. Each ear piece in a dual monaural device may operate completely independent from the other ear piece. In some embodiments, each ear piece 100A or 100B may include a separate processor 103A and 103B, respectively. The dual monaural devices may be receiving multiple channels of data.

Figure 1D:
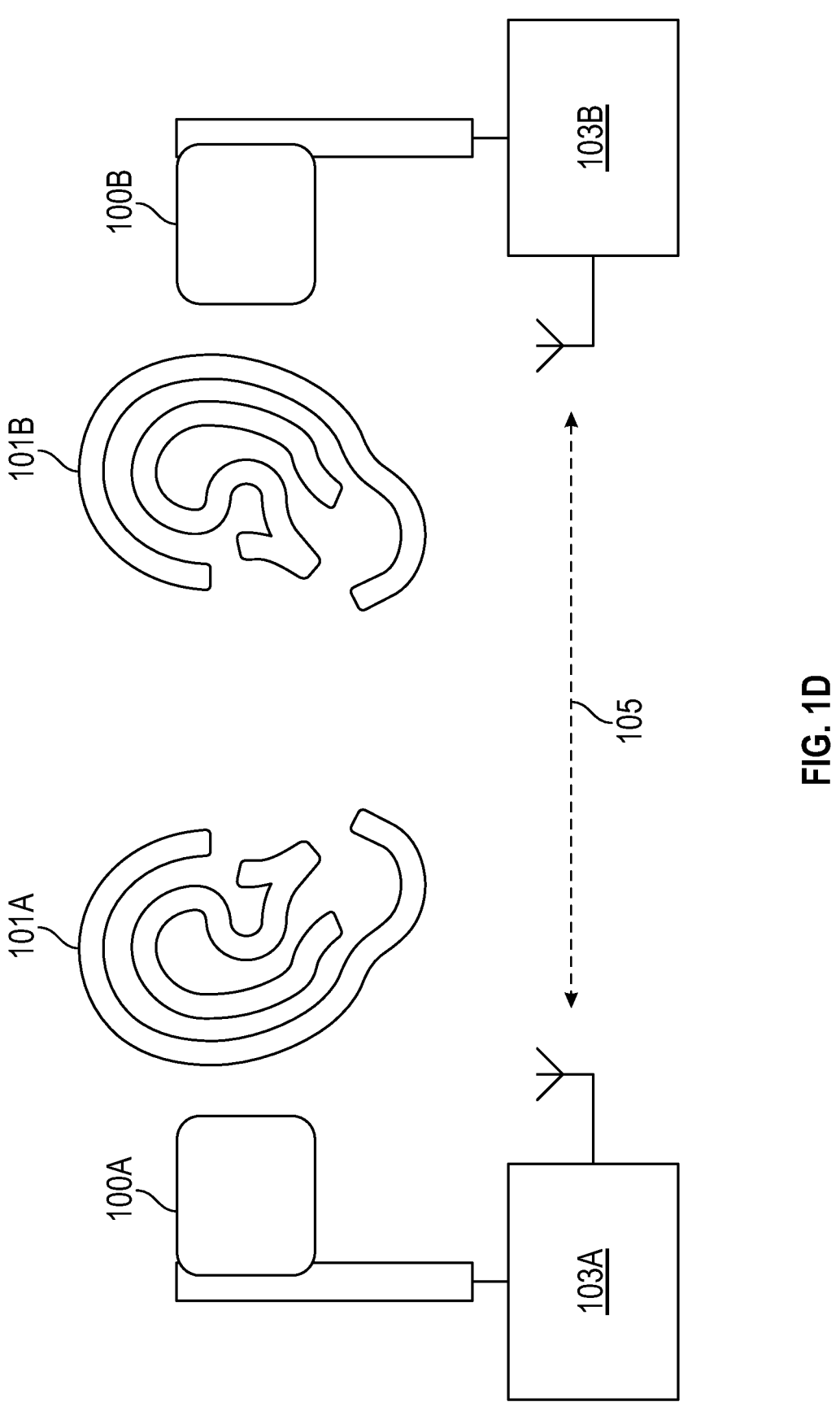
FIG. 1D illustrates an exemplary binaural device including two ear pieces, where each ear piece may be programmed to transmit and receive sounds to and from a single ear, according to some embodiments of the disclosure.
Figure 1E:
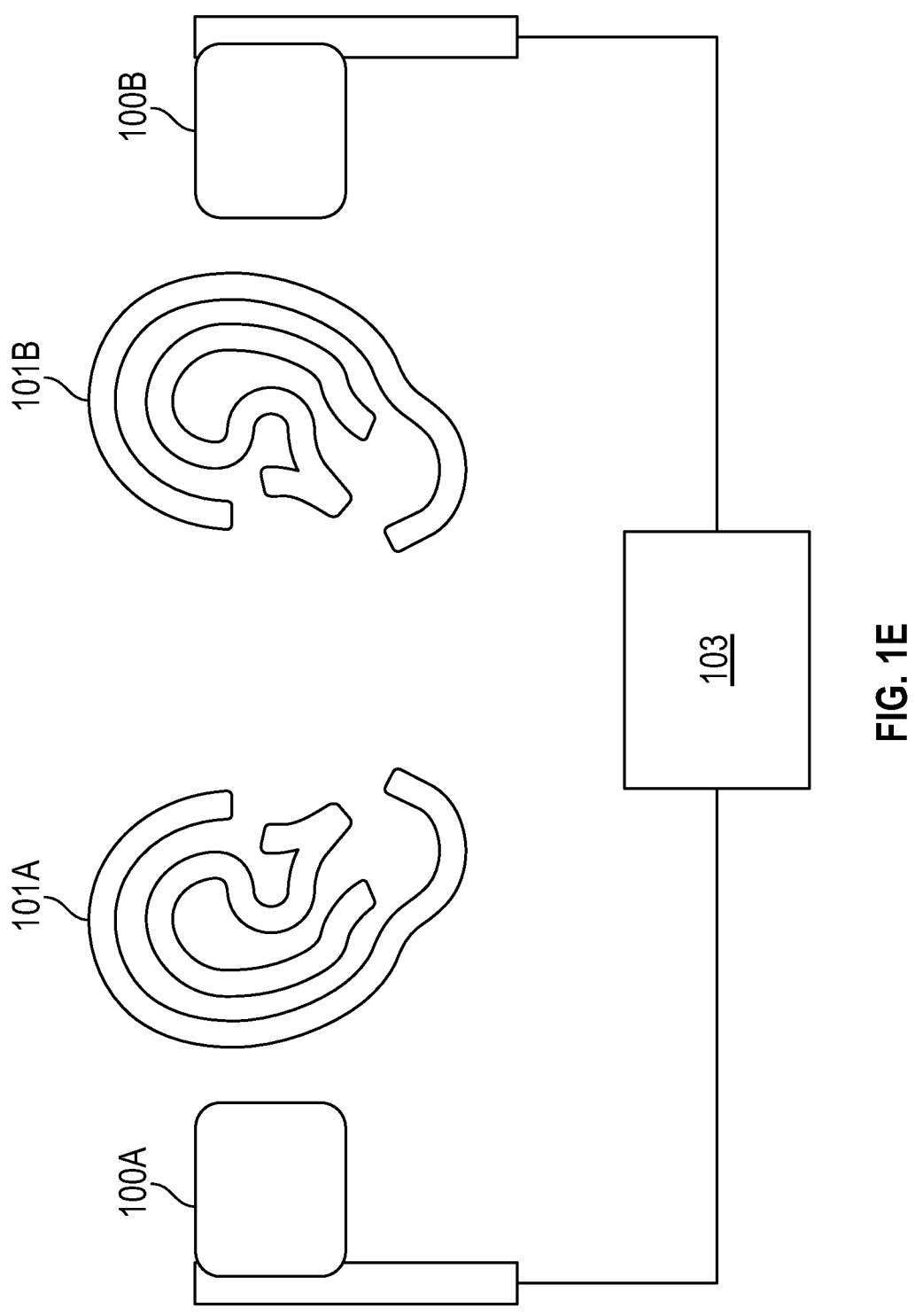
FIG. 1E illustrates an exemplary binaural device including a binaural single processor programmed to manage audio data and processing for both ear pieces, according to some embodiments of the disclosure.

A binaural device may include two ear pieces, each ear piece may be programmed to transmit and receive sounds to and from a single ear (e.g., ear 101A or 101B), as shown in FIG. 1D. The two ear pieces 101A and 101B in a binaural device may communicate with each other via a connection 105 between the two ear pieces 100A and 100B. The connection between the two ear pieces may be wired or wireless and may be programmed to pass information (e.g., audio data) to each other. In some embodiments, the two ear pieces 100A and 100B in a binaural device may each include an independent processor 103A and 103B, respectively, programmed to transmit and receive sounds to and from the respective ear piece. In some embodiments, as shown in FIG. 1E, the binaural device may include a binaural single processor 103, which may be a single, common processor programmed to manage audio data and processing for both ear pieces 100A and 100B.

As used throughout this disclosure, an audio data stream may be real-time data through the audio system 100. Audio data may be a time bound frame of data that can be analyzed separately from an audio data stream. Audio data may be data that represents audio information, or it can be associated data related to the processing of audio information or non-audio data as part of an acoustic device, such as data from additional sensors, memories or peripheral components or connectivity components or other connected devices.

The audio system 100 may transmit sound signals to the user's ear(s) in one or both ear pieces using one or more speakers 102, for example. The audio system 100 may also receive sound signals (from the user or the scene the user is in) in one or both ear pieces using one or more microphones 102, for example. In some embodiments, both ear pieces may transmit sounds signals to both of the user's ear, but may be programmed to receive sound signals in only one ear piece. Alternatively, the audio system 100 may be programmed such that only one ear piece transmits sounds to the user's ear, but both ear pieces receive sound signals. The audio system 100 may be programmed such that the selection of ear piece(s) that transmit and/or receive sound signals is dynamically adjusted in real-time (e.g., is not pre-determined at the time of manufacture). The configuration of the ear pieces may be based on any number of factors including the location of sound sources, the application being used with the audio system 100, the user's preferences, etc.

The audio system 100 may include additional components not shown in the figure, such as one or more sensors and memory storage. The audio system 100 may also be programmed to handle different types of data formats and processing. Additionally, the audio system 100 may be programmed to protect and transfer secure information. The ability for the user, the manufacturer, or both to fully customize the audio system 100 is discussed in more detail below.

Exemplary Human Hearing and Auditory Cues

A human's brain uses auditory cues (e.g., sound levels, spectral content, and spatial location) to process and understand the sounds received by the human ears. The embodiments of the disclosure include an audio system and development platform, including tools and associated processing, to enable the enhancement, modification, processing, exposure, or a combination thereof of sound signals (including auditory cues) transmitted to and received by an audio system.

Figure 2A:
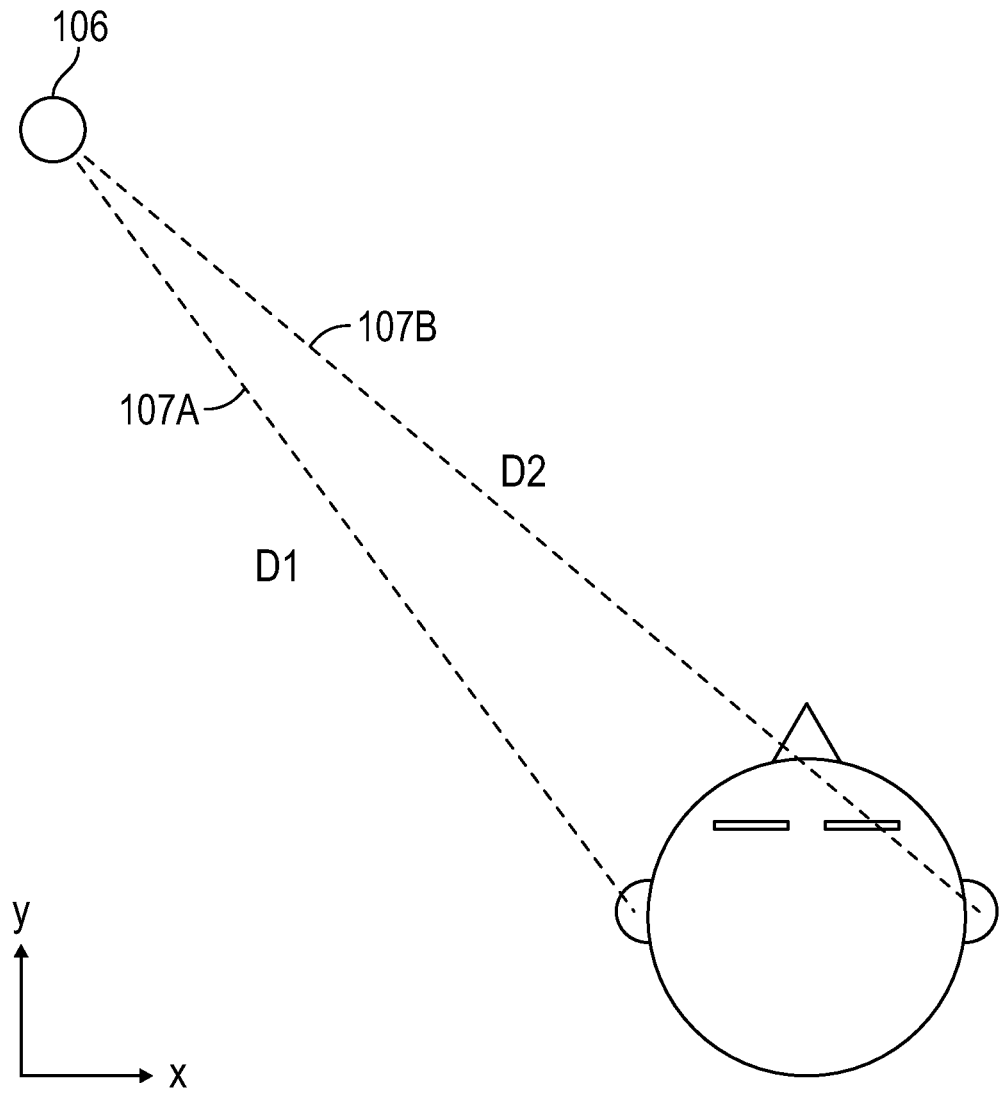
FIG. 2A illustrates exemplary sounds transmitted to the user's ears from a sound source, according to some embodiments of the disclosure.

FIG. 2A illustrates exemplary sounds transmitted to the user's ears from a sound source, according to embodiments of the disclosure. The sound source 106 may be transmitting sounds that are received by the user's ears. When the sound source 106 is directly in front of the user (e.g., the sound source 106 is located the same distance along the x-axis relative to the user's ears), the sounds may have the same path lengths. When the sound source 106 is not directly in front of the user but is instead closer to one ear (e.g., left ear), as shown in the figure, then the sounds to each ear may have different path lengths. For example, the sound source 106 may be located a distance D1 from the left ear and a distance D2 from the right ear, where the distance D1 is not equal to the distance D2. The path difference between the two sounds 107A and 107B may be equal to the difference between the distance D2 and the distance D1 (e.g., D2–D1).

In some embodiments, a non-zero path difference may cause a level (e.g., intensity or amplitude) difference. This level difference is referred to as the inter-aural level difference (ILD). Additionally or alternatively, a non-zero path difference may cause a time (or phase) difference in the sounds received by each ear. This time or phase difference is referred to as the inter-aural time difference (ITD).

Figure 2B:
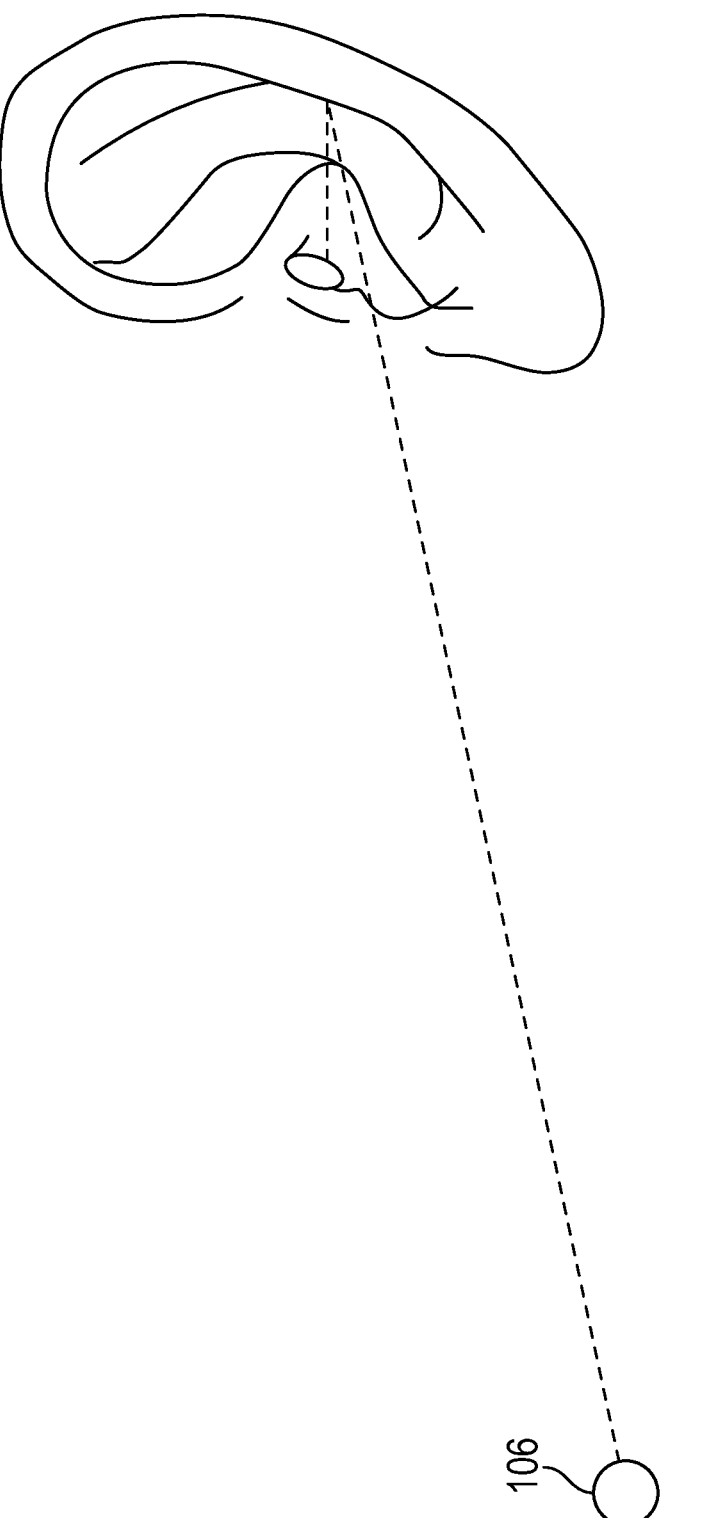
FIG. 2B illustrates exemplary sounds received by the user's ear, according to some embodiments of the disclosure.

The sounds received by the user's ear may also be affected by reflections in the user's ear pinna, as shown in FIG. 2B. The user's body and head shape and ear pinna assists with directing sounds from the sound source 106 to the user's ear. The user's ear pinna includes shapes and folds that create spectral coloration of the sounds received by the user's ear. The spectral coloration is different at each ear. The spectral coloration is direction dependent. For example, the user's left ear may receive sounds from a single sound source having spectral colorations that are different relative to the sounds received by the right ear. The binaural auditory cues from both ears allow the user to determine the direction and origin of the sound source 106, thereby allowing the user to identify and distinguish between the sounds received by the user's ears.

Figure 2C:
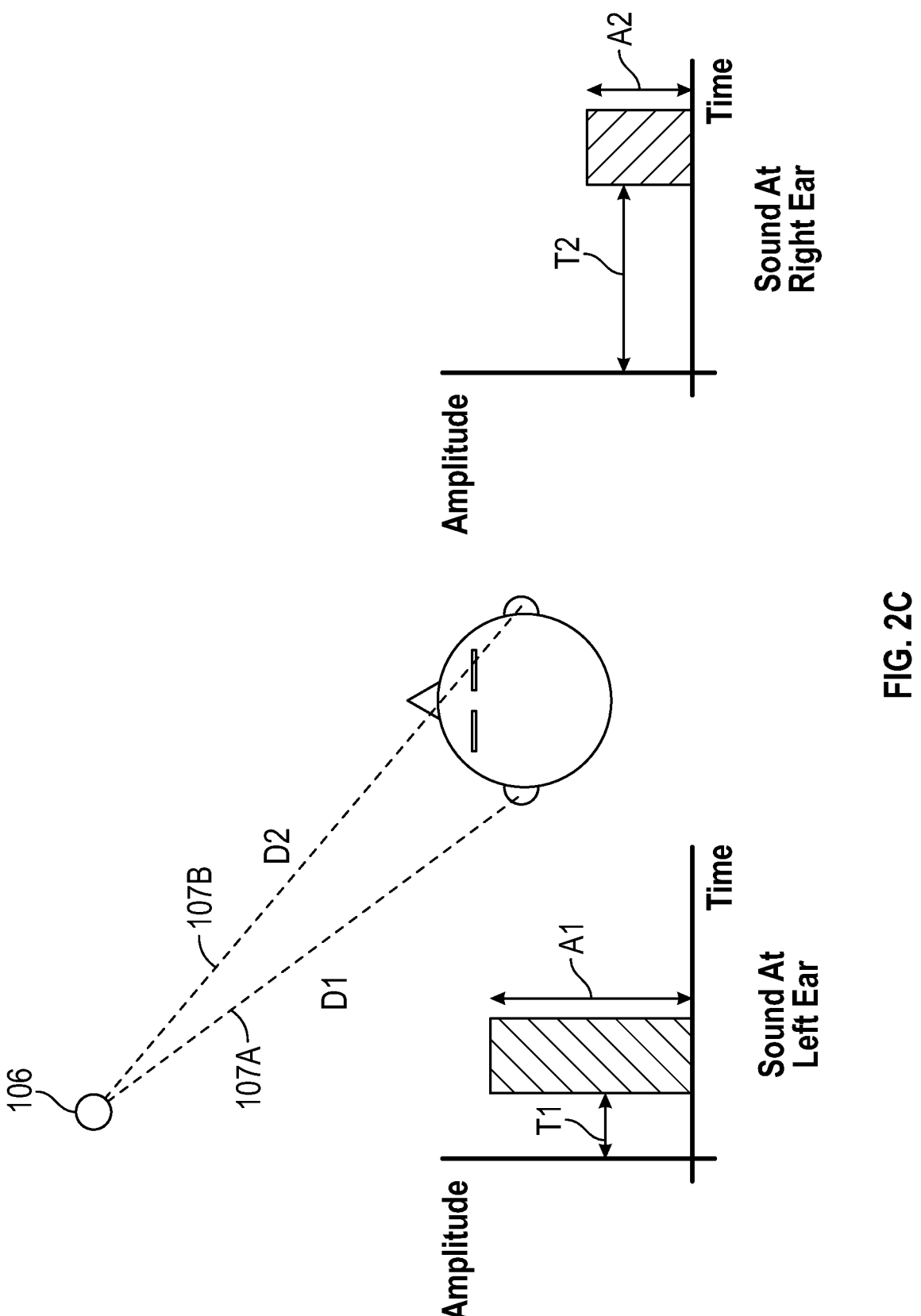
FIG. 2C illustrates exemplary amplitude and time differences for sounds when a sound source is not located directly in front of the user, according to some embodiments of the disclosure.

FIG. 2C illustrates exemplary amplitude and time differences for sounds when a sound source 106 is not located directly in front of the user. As shown in the figure, sound 107A has an amplitude A1 and a time T1, and sound 107B has an amplitude A2 and a time T2. Thus, the amplitude difference between the two sounds is equal to the difference between the amplitude A2 and the amplitude A1 (e.g., A2–A1), and the time difference is equal to the difference between time T2 and time T1 (e.g., T2–T1).

Even if the user is located in a scene having a large amount of noise, the user may be able to hear and understand speech from, e.g., another user. Embodiments of the disclosure include an audio system 100 that allows a user to distinguish between different sounds coming from different sound sources 106. To do so, the audio system 100 is programmed to detect, process, and enhance auditory cues in one sound signal differently from auditory cues in another sound signal. For example, the audio system 100 may be able to process and amplify (e.g., enhance, adjust, etc.) the auditory cues from speech differently from the auditory cues from the scene. In some embodiments, the audio system 100 may use these auditory cues in addition to the spectral content of the sounds to assign each sound component to an audio stream. Assigning sound components to an audio stream may allow sounds to be grouped together and analyzed. The audio stream may be used to create, configure, and/or change an auditory scene. In this manner, the auditory scene may be customized and optimized specifically for the user's individual sound experience. As a result, the audio system 100 may not create a generic auditory scene that is applied to some or all users. Instead, the system enables the user to control the properties (e.g., content, tone, level, spatial location, etc.) of the sound signals transmitted to the ear pieces.

Current prior art audio systems attempt to differentiate between different sounds by only amplifying frequencies or amplitude. For example, many hearing assistance devices correct a user's hearing profile in the sound signals transmitted through (or captured by) the user's ear pieces by amplifying frequencies where loss of sensitivity has occurred. Amplifying just the frequencies, without considering the scene, may cause all sounds (e.g., both the target sounds and background sounds) to be louder. Making all sounds louder may be beneficial to the user in certain scenes, such as quiet scenes, but may be counterproductive in noisy scenes where the frequency amplification may make it harder to hear the target sounds. Furthermore, increasing the amplitude of some frequencies relative to other frequencies can cause unnatural sounds and other masking problems for a listener, for example, amplifying low frequencies may prevent quieter higher frequencies from being heard making it very difficult to understand speech.

Figure 2D:
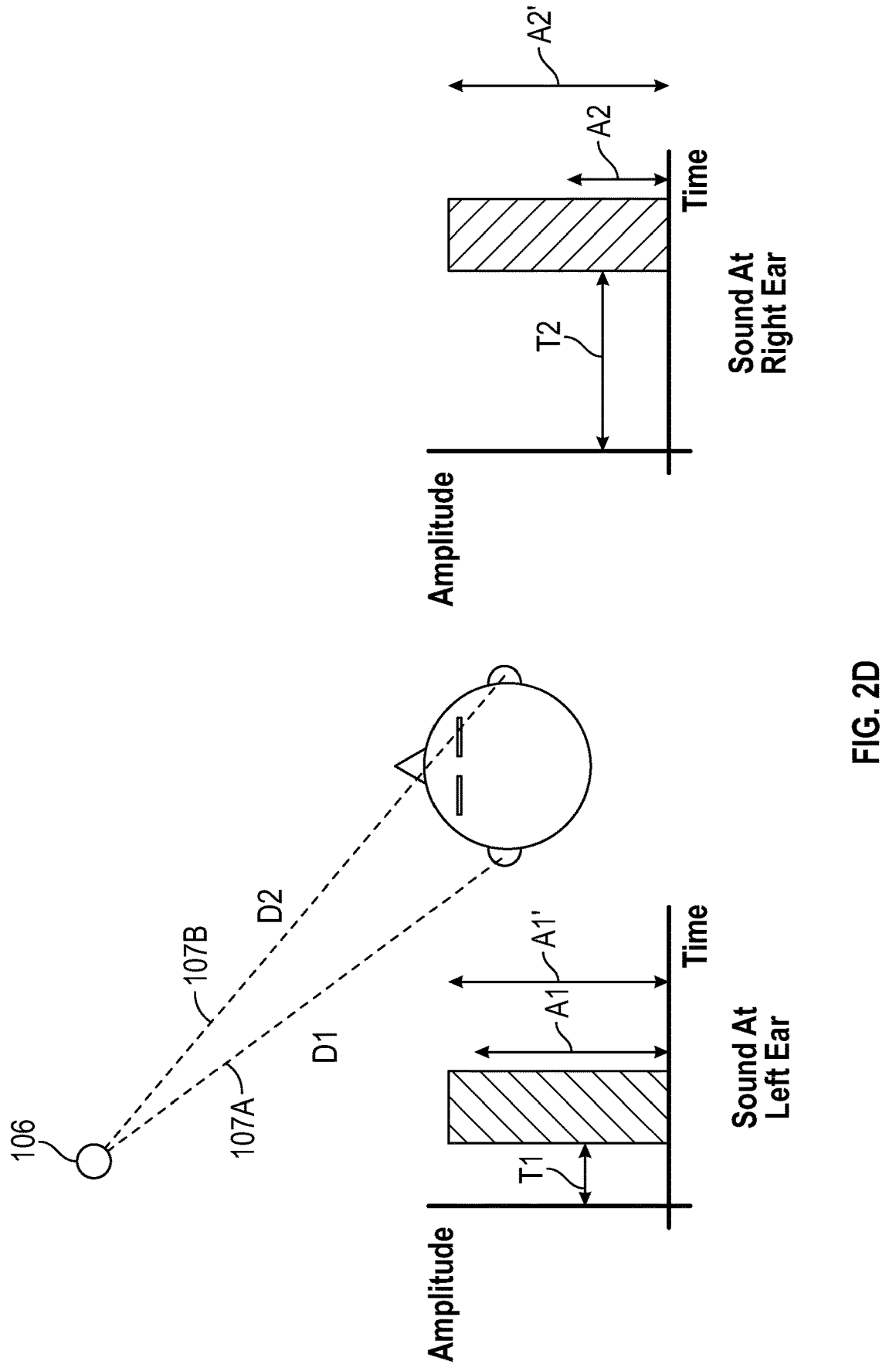
FIG. 2D illustrates exemplary sound signals received by a user when using an audio system that does not consider the scene when detecting, processing, and/or enhancing auditory cues, according to some embodiments of the disclosure.

FIG. 2D illustrates exemplary sound signals received by a user when using an audio system that does not consider the scene when detecting, processing, and/or enhancing auditory cues. As shown in the figure, sound 107A has an amplitude A1 and a time T1, and sound 107B has an amplitude A2 and a time T2. The amplitude A1 is larger than the amplitude A2, which means the user's left ear should hear the sound source 106 as louder than the user's right ear. Additionally, time T1 is shorter than time T2, so the user's left ear should hear the sound sooner than the user's right ear. If the audio system amplifies both sounds to achieve a target amplitude, it can result in sound signals that have the same amplitudes A1' and A2', respectively, then the user's brain may mistakenly believe the sound source 106 is located directly in front of the user. The mistaken belief occurs because the time difference (e.g., T2–T1) may not be accounted for or may not be used as a dominant auditory cue, which is frequency dependent. As a result, the amplitude difference between the two sound signals transmitted to the user's ears are reduced or completely removed (e.g., zero). When the audio system is a hearing assistance device, the user's needs or wants may change depending on the specific scenario (e.g., scene, user's activity, etc.). As such, amplifying the sound signals without binaural signal processing is undesirable, especially when the same amplification correction is applied for all listening conditions and all users. Embodiments of the disclosure may include cue preservation of binaural signal processing. In some embodiments, independent amplitude processing may be based on source location. In some embodiments, signal separation may be based on location. Additionally or alternatively, respatialization of sounds may be based on location. Binaural hearing enhancement below describes why and how binaural cue preservation is important. This means that processing of audio at the left ear must be informed of the processing at the right ear, in a low latency manner, to ensure the user is receiving binaural cues they can use to make sense of the sounds they are hearing. This not only allow sounds to maintain useful information, it allows the cues to be processed further to enhance them and even manipulate them to create new spatial experiences that can benefit a listener.

Figure 2E:
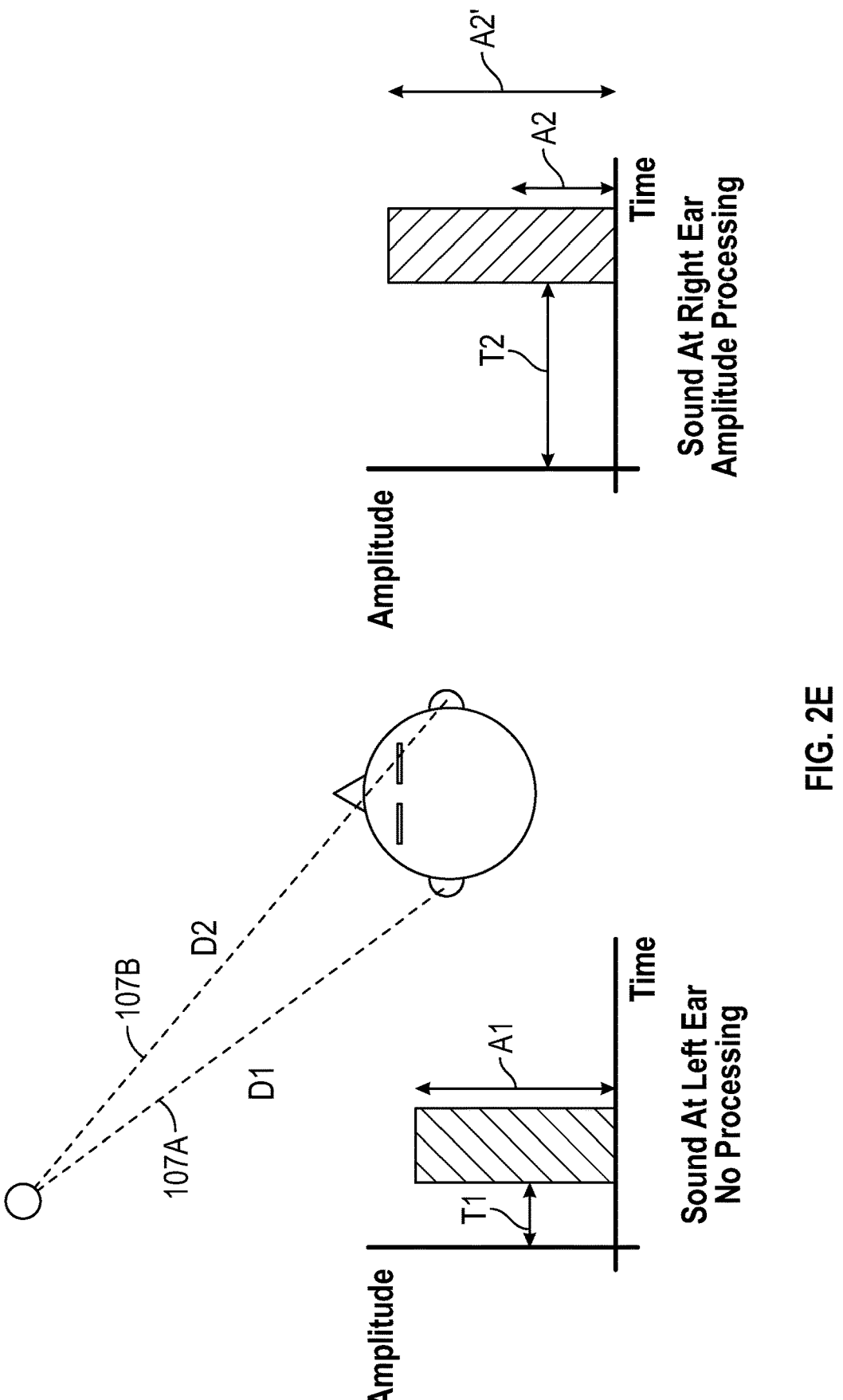
FIG. 2E illustrates exemplary sound signals received by a user when using an audio system that uses signal processing for a single ear, according to some embodiments of the disclosure.

FIG. 2E illustrates exemplary sound signals received by a user when using an audio system that uses signal processing for a single ear. As shown in the figure, sound 107A has an amplitude A1 and a time T1, and sound 107B has an amplitude A2 and a time T2. The amplitude A1 is larger than the amplitude A2, which means the user's left ear should hear the sound source 106 as louder than the user's right ear. Additionally, time T1 is shorter than time T2, so the user's left ear should hear the sound sooner than the user's right ear. If the audio system amplifies only one sound signal (e.g., sound signal 107B is amplified to amplitude A2'), then the user's brain receives inconsistent binaural cues that can cause the user to perceive the sound source 106 is located directly in front or located closer to the right side of the user.

Thus, the audio system 100 and the development platform 1000 of the disclosure performs binaural signal processing such that auditory cues in sound signals transmitted to the user's ear pieces are not removed or reduced. Instead, the auditory cues may be changed (e.g., enhanced) to provide an improved and unambiguous auditory scene that may be controlled by the user to benefit the tasks performed. The audio system 100 and the development platform 1000 maintain certain characteristics in the auditory scene to enhance the user's experience.

In many cases, the source 106 of a sound may move relative to a user, resulting in sound signals having varying amplitudes that increase or decrease depending on whether the motion of the source is toward a user, e.g., toward a right or left ear of the user, or away from the user.

The audio system 100 may provide for tracking of the location of the source so that binaural signal processing captures the movement of the source 106 relative to the user to further improve the user's perception of the dynamic auditory scene. In some embodiments, the location of the sound sources in a scene may be tracked as moving relative to the user.

Overview of an Exemplary Development Platform

In some aspects, disclosed herein is a development platform that allows manufacturers (including developers) to create and customize an audio system. The development platform may be used to develop, modify, analyze, and optimize the performance of the audio system. In some embodiments, the audio system may be a field-programmable gate array (FPGA) based system that allows reconfigurable silicon definitions to be used and tested. In some embodiments, the audio system may be associated with a hardware development board with real-time audio signal processing capabilities.

Figure 3A:
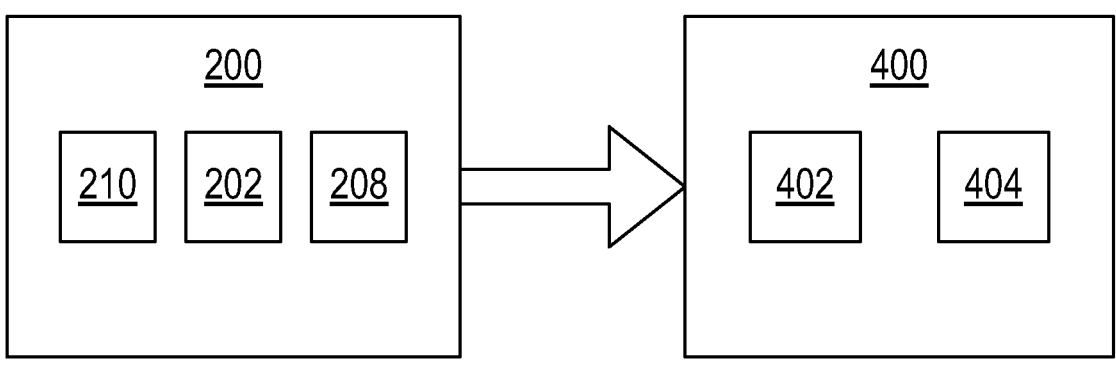
FIG. 3A illustrates a block diagram of an exemplary development platform, according to some embodiments of the disclosure.

FIG. 3A illustrates a block diagram of an exemplary development platform, according to embodiments of the disclosure. The development platform 1000 includes software development tools 200 and hardware development tools 400. The software development tools 200 may include simulation software 202 for simulating the auditory scene for the audio system 100. The hardware development tools 400 may include hardware 402 (e.g., silicon chips) to be included in the audio system 100 and embedded software 404 programmed to run on the hardware 402. In some embodiments, the software developed within the development platform 1000 may be transferred to hardware 402, as shown in the figure. The software development tools 200 may be programmed to provide a framework that matches the same real-time audio framework on hardware 402. In some embodiments, the software development tools 200 and the hardware 402 may use the same audio OS. The software development tools 200 may allow the manufacturer to create and configure the hardware development tools 400. After creating and configuring the hardware development tools, the development platform 1000 allows the manufacturer to load the software and hardware to the audio system 100. The software development tools 200 and the hardware development tools 400 are discussed in more detail below.

Figure 3B:
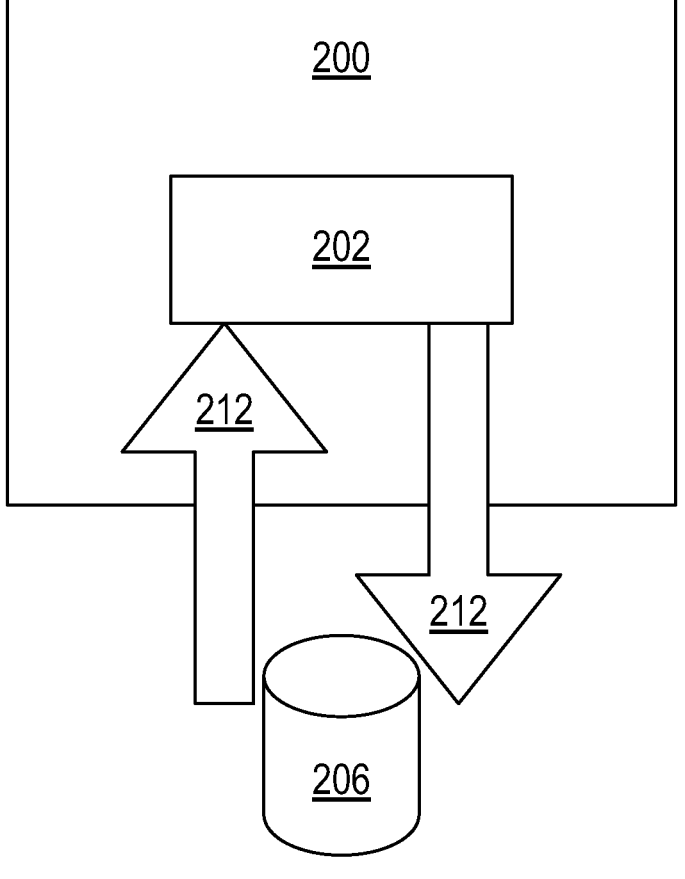
FIG. 3B illustrates exemplary software development tools capable of operating when the hardware development tools are not connected to it, according to some embodiments of the disclosure.

The software development tools 200 and the hardware developments tools 400 are capable of connecting and disconnecting from each other. For example, as shown in FIG. 3B, the software development tools 200 may be capable of operating when the hardware development tools are not connected to it. In some embodiments, the software development tools 200 may receive and transmit audio data and/or other types of data streams using multiple audio channels 212. The audio data may be received from and saved to a storage device 206, for example.

Figure 3C:
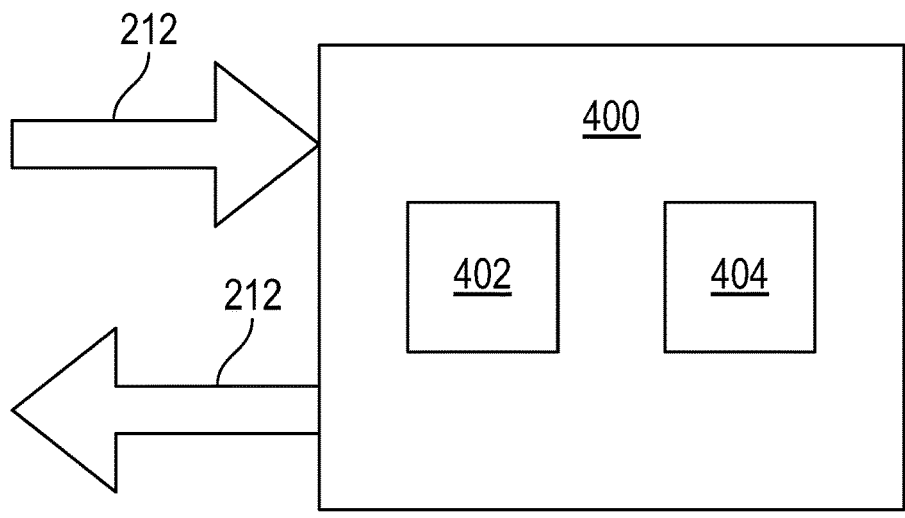
FIG. 3C illustrates exemplary hardware development tools capable of operating when the software development tools are not connected to it, according to some embodiments of the disclosure.

As shown in FIG. 3C, the hardware development tools 400 may be capable of operating when the software development tools 200 are not connected to it. In some embodiments, the hardware development tools 400 may use high speed audio data connections to receive and transmit audio data into and out of the development platform. The audio data may be received and transmitted in real-time. Additionally or alternatively, one or more components may be connected to and disconnected from the development platform for simulation, analysis, and debugging.

Figure 3D:
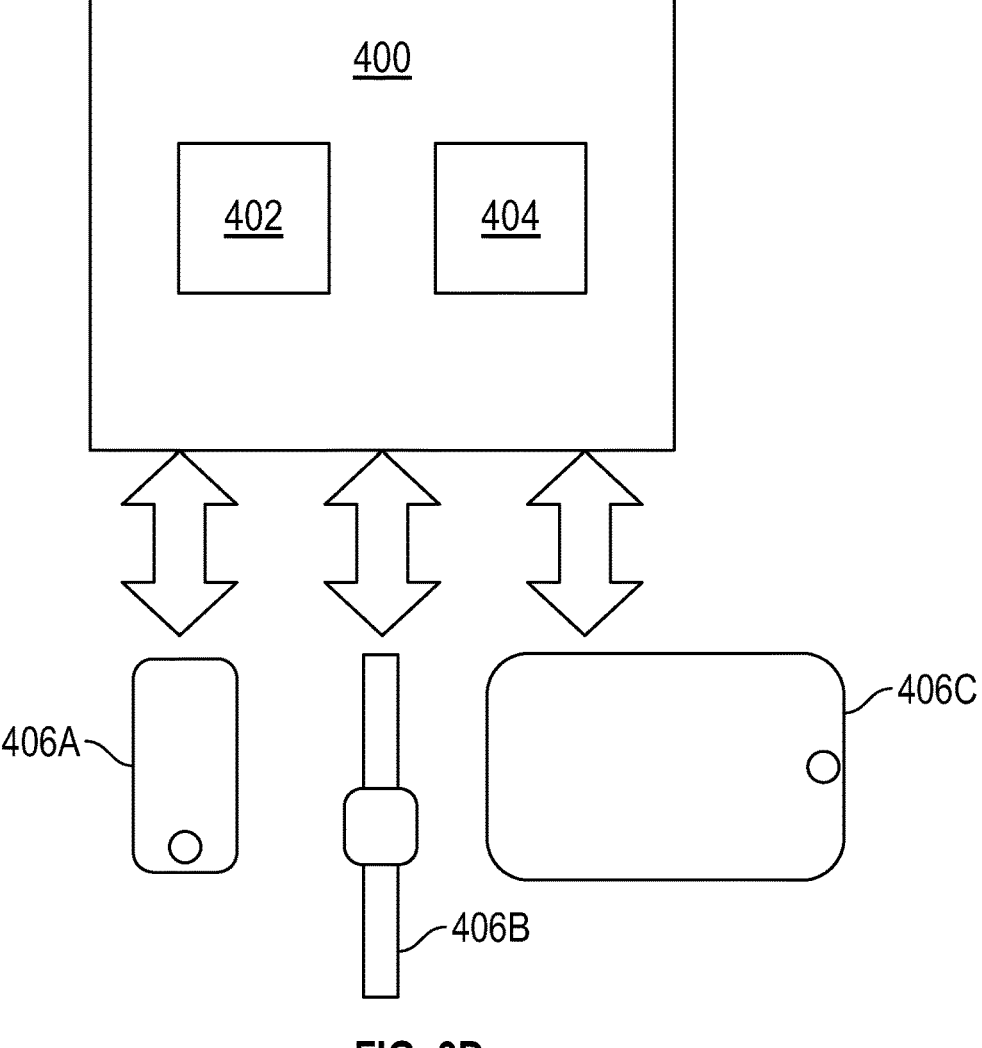
FIG. 3D illustrates a block diagram of exemplary electronic devices communicating with the hardware development tools, according to some embodiments of the disclosure.

The hardware development tools 400 may transmit audio data to and receive audio data from other sources. FIG. 3D illustrates a block diagram of exemplary electronic devices communicating with the hardware development tools, according to embodiments of the disclosure. The hardware development tools 400 are capable of communicating with one or more electronic devices 406, such as smartphone 406A, smart watch 406B, tablet 406C, personal computer, or the like. The electronic device 406 can be programmed to allow a user to transmit and/or receive data, including audio data, control data, and user information data, using a user interface (UI) (e.g., a graphical user interface (GUI)) presented on the electronic devices 406A-406C. For example, the user may use the UI to send control signals (e.g., including parameter information) to the electronic device 406. Exemplary information displayed by the UI includes, but is not limited to, the noise level, how long the user has been wearing the ear pieces, the battery life of the audio system, biometric information, etc. In some embodiments, the UI may be developed as a plugin for an electronic device 406 using the software development tools 200. In some embodiments, the plugin may include a corresponding processing plugin that is resident on the ear pieces that is being controlled. The plugin and the corresponding processing plugin may work together or independently, for example.

The system dashboard can be used as a development tool and a user configuration tool. For a developer it can provide advanced system metrics and debug information. This data can be streamed wirelessly through a debug plugin that is uploaded into the ear devices. Each device can be streaming independent information back to the dashboard so the developer can see the status of each independent ear device and the processing system inside each. The debug plugin can be customized by the developer to provide private features. The debug plugin will be limited in its access to resources, such as memory or private processing cores, on the silicon. It would be restricted to only having access to the plugins that are under the developer's control. This would allow a developer to debug and profile their processing components without having access to any plugins or components in the system. This information can be presented back to the developer through a GUI on a wired or wirelessly connected device, such as a phone or tablet, or through a wired or wireless connection to a personal computer used for developing the algorithms.

Figure 3E:
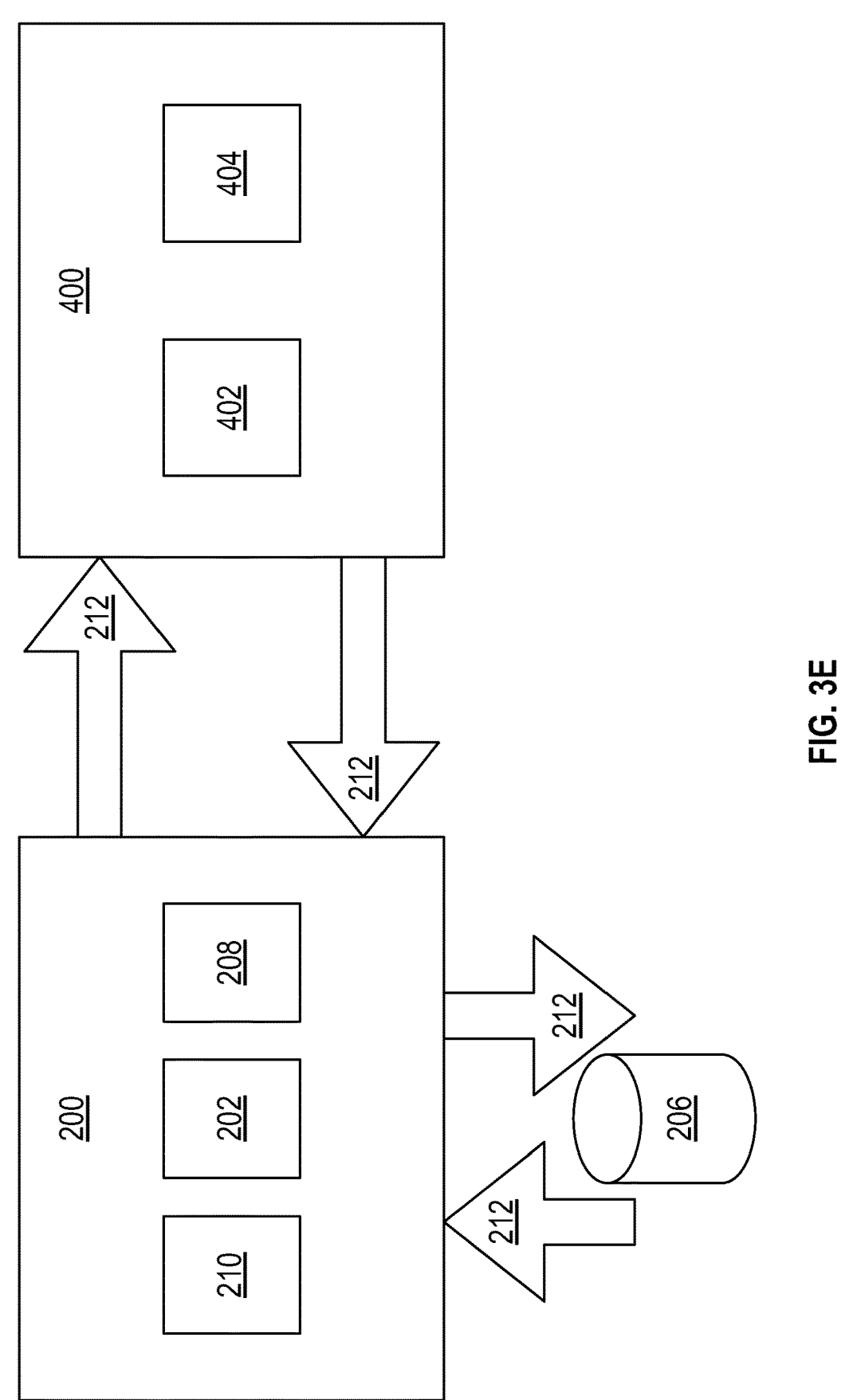
FIG. 3E illustrates a block diagram showing the operation of development platform, according to some embodiments of the disclosure.

The development platform operates such that the performance of the simulation from the software development tools 200 match the performance of the hardware 402. FIG. 3E illustrates a block diagram showing the operation of development platform, according to some embodiments of the disclosure. The software development tools 200 may receive audio data from the storage device 206. The audio data may be multichannel audio data, for example. The storage device 206 may be any type of storage device including, but not limited to, a disk drive in a computer or a server on a network. The software development tools 200 transmit audio data to the hardware development tools 400. In some embodiments, the transmission of audio data from the software development tools 200 to the hardware development tools 400 may occur in real-time. In some embodiments, the hardware development tools 400 may be programmed to communicate directly with the storage device 206 and may be capable of receiving audio data directly (e.g., without being passed through the software development tools 200).

The hardware 402 may process the audio data. The hardware 402 can then send the processed audio data to the storage device 206 (either directly or via the software development tools 200). In some embodiments, the storage device 206 may save the processed audio data. In some embodiments, the hardware 402 may include local storage for saving audio data that is separate from the storage device 206. Audio data received by the hardware 400, e.g., raw audio data, or audio data processed by the hardware, e.g., processed audio data, may be sent to the local storage and saved. The saved audio data may be retrieved by the software development tools 200 for offline analysis.

The development platform may provide information to the user, in real-time. The information may include analysis of the audio data and performance metrics of the audio system. The development platform may allow the user to transmit information to the hardware development tools 400. Exemplary information provided to the hardware development tools 400 includes, but is not limited to, processing parameters, configuration information, UI information, etc.

In some embodiments, the information exchanged among the software user tools 200, the hardware user tools 400, and the user may be synchronized to create a repeatable debug and analysis simulation. The transmission of information between the software tools 200 and the hardware tools 400 may be scripted and/or automated to facilitate synchronization. For instance, at a time T1, a frame of audio including N samples may be transferred between the software user tools 200 and hardware user tools 400 for processing along with B bytes of information (e.g., configuration information or other parameters) relating to the N samples. The hardware may continue to stream and transmit the audio data until time T2. At time T2, a second frame of audio including N additional samples may be transferred for processing along with an additional B bytes of new information relating to the N additional samples. Transmission of data may be used to determine system performance and test reliability where, for instance, audio data streams are sent to the device, and separate configuration parameters are sent to an equalizer processor, for example, at repeatable increments (e.g., once per second, once per minute, etc.). Processed audio may be analyzed relative to the configuration parameters to ensure that correct processing has been applied, and there are no delays in parameter updates or glitches in audio caused by the new configuration parameters. In some embodiments. For example, e.g., at time T1, a frame of audio including N samples is transferred to the development system for processing along with B bytes of configuration information. The tools continue to stream more audio data until at time T2 where new configuration information is sent. This can be used for determining system performance and testing reliability where, for example, audio data streams are sent to the device and separate configuration parameters are for an equalizer processor are sent with updates every second. The processed audio is analyzed to determine the correct processing has been applied and there are no delays in parameter updates or glitches in the audio caused by the new configuration parameters.

Exemplary Software Development Tools

The software development tools 200 can include a plurality of tools, such as libraries and interfaces 210, simulation software 202 and application developer 208, as shown in FIG. 3A. Although the figure illustrates three software tools, examples of the disclosure can include any number of software tools such as two, four, five, six, 10, 20, etc. The development platform 1000 can be implemented on an integrated development environment where the tools in the software development tools 200 are compatible with tools inside and outside of the software development tools 200. The integrated development environment may be based on industry standards (e.g., Matlab, Eclipse, etc.) used by a large number of users. In this manner, users can easily integrate their software code into the development platform 1000 and its applications, as provided as part of a software development kit (SDK). The SDK may allow users access to all levels of the development platform 1000. For example, the SDK may allow users access to the UI running on an electronic device (e.g., smart phone, tablet, smart watch, laptop computer, etc.), communication channels within the electronic device, and plugins running on the electronic device.

An extension of the development tools and deployment for cross platform products is supported. This includes the configuration of the separate components of the system where the UI is developed in environment A and is running on system B within device C and there is data processing that is developed in environment D and is running on system E within device F. In simulation mode this could all be running on a single physical machine within separate virtual machines. In a real application these will be physically different pieces of hardware with different capabilities. Device C, which may be a mobile phone, tablet, smart watch of smart charging pod, will need to be built such that it can cope with many different connected devices, with one example being device F. Similarly, device F will need to be built such that it can cope with many different connected devices, with one example being device C. Separate components may be developed and run in separate development environments. In some embodiments, the system where the UI is developed may be in a first environment A and running on a first system B within device C. Data processing may be developed in a second environment D and running on a second system E within device F. In simulation mode, this could all be running on a single physical machine within separate virtual machines. In a real application, these may be physically different pieces of hardware with different capabilities. Device C may be built such that it can cope with many different connected devices, with one example being device F. Similarly, device F may be built such that it can cope with many different connected devices, with one example being device C.

Exemplary Libraries and Interfaces

The development platform may allow a user access to libraries and interfaces (library and interfaces 210 of FIG. 3A). In some embodiments, the user may access the libraries and interfaces using an application programming interface (API) and a system layer. Using the libraries and interfaces, a user can create a plugin that may work on any hardware configuration, for example. Additionally, a user may optimize and customize the plugin by overriding its functions. The audio system may present a consistent runtime scene/environment within the embedded platform in a device (e.g., wearable device). The consistent runtime scene/environment may allow applications and plugins to be transferred from one development platform to another development platform. The consistent runtime scene/environment may be provided by an operating system (OS) (e.g., audio OS) that can present an API for the software to use. When a change is made (e.g., by an end user or a developer) to the hardware (e.g., upgrade), the OS may automatically benefit from the processing enhancements and may enable the plugin to have access to them. In some embodiments, a library may include processing information for a specific device, such as an electronic device (e.g., mobile phone). Embodiments of the disclosure may include runtime download of plugins from a first device A to a second device B.

Exemplary Simulation Software

Simulation software (simulation software 202 of FIG. 3A, for example) may be a tool that provides a simulation of the audio system and one or more electronic devices. For example, the simulation software may simulate the flow of audio data, parameters (including updates), applications, functions, processes, plugins, UIs, and more. In some embodiments, the simulation of an audio system may perform accurate real-time processing. In some embodiments, a machine or software running on the development platform may be used to capture real-time information. A user may use the UI to receive information about the signal processing of the real-time information. With information about the signal processing, the user may be able to further customize and optimize the sound signals transmitted to and received by the audio system. In some embodiments, real-time information may be provided by other sources, such as file input/output (I/O) test vectors, data streams from sensors, etc. The information from other sources may not be audio related and/or may have different data rates.

In some embodiments, the simulation software may be programmed to simulate the entire audio system on the development platform, where the simulation may include full binaural signal processing capability. The audio system may include sound signals transmitted and/or received by both ear pieces. In some embodiments, the sound signals to and from the two ear pieces may be treated separately and processed by separate functions. In some embodiments, the separate sound signals may be simulated by two different processing cores included in the audio system. The two ear pieces may communicate with each other and/or with other components via a wired or wireless connection, for example. The communications between the two ear pieces may include timing information, sensor data, and audio data.

In some embodiments, an electronic device may be coupled to the development platform, creating a virtual machine environment. Some electronic devices may not be able to accurately capture real-time information. For example, some laptops may capture real-time information, but it may transmit high latency signals. In some embodiments, a soundcard may be used for low latency I/O and multi-channel streaming.

In some embodiments, the simulation software may provide real-time playback only. In some embodiments, the simulation software may provide real-time capture only.

Figure 4:
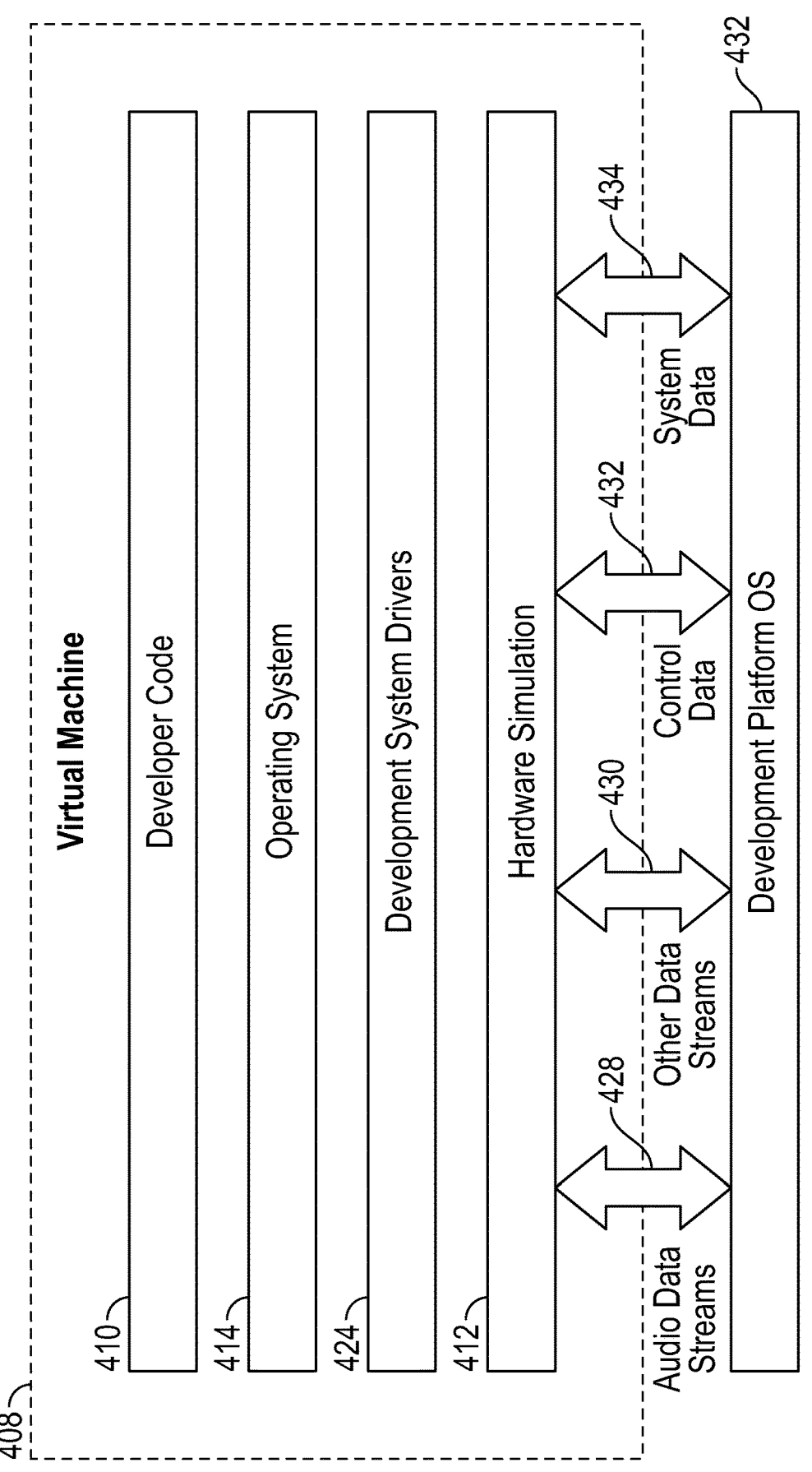
FIG. 4 illustrates an exemplary virtual machine for running an algorithm in a virtual machine environment, testing input data streams, and creating output information, according to some embodiments of the disclosure.

As shown in FIG. 4, a user can use a virtual machine 408 to run an algorithm in a virtual machine environment, test input data streams, and create output information (e.g., performance metrics) to validate performance. The virtual machine 408 may include developer code 410, OS 414, development system drivers 424, and hardware simulation 412. The virtual machine 408 may communicate with a development platform OS 432. The communications may include audio data streams 428, control data 432, system data 434, and other data streams 430 such as debug and monitoring information.

The user may compare performance metrics among different applications, different electronic devices, different algorithms, different hardware, or the like. Exemplary performance metrics may include, but are not limited to, processor usage, processing speed (e.g., number of million instructions per second (MIPS)), memory usage, number of memory tiles, peak resource usage (MIPS and memory), average usage, variation of usage, power profile based on processor usage and memory usage, audio data I/O activity, OS overhead, synchronization of test audio data streams, synchronization of changes due to user interaction, and signal processing demands.

The performance information may also include breakdown performance for each component so that the user can identify which components consume the most or least amount of resources (e.g., processor bandwidth, processor memory, etc.). Processing performance metrics of the components may be captured with time stamps to permit a user to analyze changes in performance over time, e.g., changes in performance related to different processes being active and/or different loadings of the system. In some embodiments, the processing performance metrics are captured with time stamps to determine how the performance changes over time due to different processes being active and for different loadings of the system.

After the user has made the desired modifications and/or selections, the development platform may copy or modify the respective applications, algorithms, etc. to the embedded software (e.g., of hardware such as a field programmable gate array (FPGA) or another specific target hardware system) so that the audio system, electronic device, or both may contain the selected applications, algorithms, etc. when disconnected from the development platform.

In some embodiments, the simulation software may provide simulations related to an electronic device. For example, the simulation software may simulate communications between two or more of: an audio system (e.g., its message handler, its processing engine, etc.), a first electronic device (e.g., mobile phone, tablet, etc.), a second electronic device (e.g., wearable device), and the development platform. The simulation software may be able to simulate communications between specific components (e.g., processor, memory, application, plugin, etc.) among the audio system, electronic devices, and/or the development platform. Communications may include, but are not limited to, connectivity, messaging, I/O, handling of audio data, information requests, and audio data requests. The simulation software will include the embedded operating system that controls and connects other software and hardware components for the development of devices.

System information noticeboard: This concept of the noticeboard where processing plugins can post information that is available for other plugins to use. The noticeboard is a reserved memory space in the system that is made available for all plugins to use. The size and address of the noticeboard is programmed and handled by the operating system. Such as plugin A determines that the incoming sound level has reached a certain threshold. Plugin B is monitoring the incoming signal levels to determine when it should activate its processing. An additional example could be a plugin that analyses the ambient sound that is captured and provides information related to the content. This could be a detailed map of noise level based on frequency and spatial location that is provided for the rest of the plugins in the system to use as an indication of the type of acoustic environment the user is experiencing. This could be an estimate of reverberation which can be used to determine what type of room the user is located in. This could be an indication that the user is outside. This could also be a notification that the user is sitting or moving or running or walking etc. This could also be a notification that wind noise has been detected. The information on the noticeboard is monitored to determine when a certain trigger threshold is hit so that other plugins do not need to do a full analysis as it is a waste of power and processing resources and is duplicated work in the system. Another public piece of information could be the current battery charge level. The noticeboard can be programmed to cause interrupts to other plugins to cause them to react to new information rather than continually checking the noticeboard. A plugin can register an interrupt request based on information posted to the noticeboard reaching certain conditions. For example, when background noise reaches A decibels in the frequency range of F1 to F2, an interrupt may be sent to plugin P1. The noticeboard mechanism can be programmed so that the information is marked as public, protected or private. Public information is available for all other plugins and processors in the system to access. Protected information may be provided only for plugins of a particular type or perhaps from a single provider. For example, all plugins developed by company ABC have access to motion information provided by their own IMU data analyzer. Private information can be marked such that only a single specific component or plugin has access to the information, but it still has the benefits of the noticeboard data handling and interrupt mechanism. An extension of this is where a plugin provides public information that is posted on the noticeboard such as the system battery level and the temperature of the user. This causes a second plugin to analyze the two or more pieces of information to create a new indicator that is also posted to the noticeboard, such as the combination of detecting a rising body temperature when the battery is low puts a notification onto the noticeboard that the emergency health notifications should take priority of the sounds generated in the system so that the user can be informed without using up precious battery resources for lower priority tasks. An extension of this use case allows the data in the noticeboard memory to be converted into different formats. For example, head movement information may be provided by an IMU component in the system. This raw data can be posted to the noticeboard for other plugins to use. One of those plugins may convert the data into a different representation or format of the information, such as a different quaternion or matrix based format. This allows different analysis of the same data to be available for other plugins to use.

Embodiments of the disclosure may include using a noticeboard where processing plugins can post information that is available for other plugins to use. For example, a first plugin A may determine that the incoming sound level has reached a certain threshold. A second plugin B is monitoring the incoming signal levels to determine when it should activate its processing. The second plugin B may do an analysis that is less than a full analysis until a certain trigger threshold is hit. Doing an analysis that is less than the full analysis conserves power and processing resources and may avoid or reduce duplicated work in the system. As another example, a first plugin may determine the current battery charge level. Plugins may monitor this information to determine when to switch into low power mode. This could allow the system to have one single power monitoring plugin that publishes public information, rather than each plugin making requests to measure and calculate the current power level.

For example, an electronic device may be coupled to a FPGA board, and the electronic device may include a UI with messaging capabilities. The simulation software may allow the user to write an application that tests the communication of messages between the electronic device and the FPGA board (e.g., to be used in an audio system). The simulation software may simulate the application generating a message (e.g., a "set" message) to the FPGA board to store audio data in memory. The simulation software may also simulate the application generating a request message (e.g., a "get" message) to the FPGA board for reading audio data from memory and transmitting the audio data back to the electronic device. In some embodiments, the simulation software may include timestamps in the simulated information (e.g., in the set message, in the get message, etc.). The simulation software will use the embedded audio operating system to provide the same communications, data flow, processing, resource management, task management and so on, as a real device.

Figure 5A:
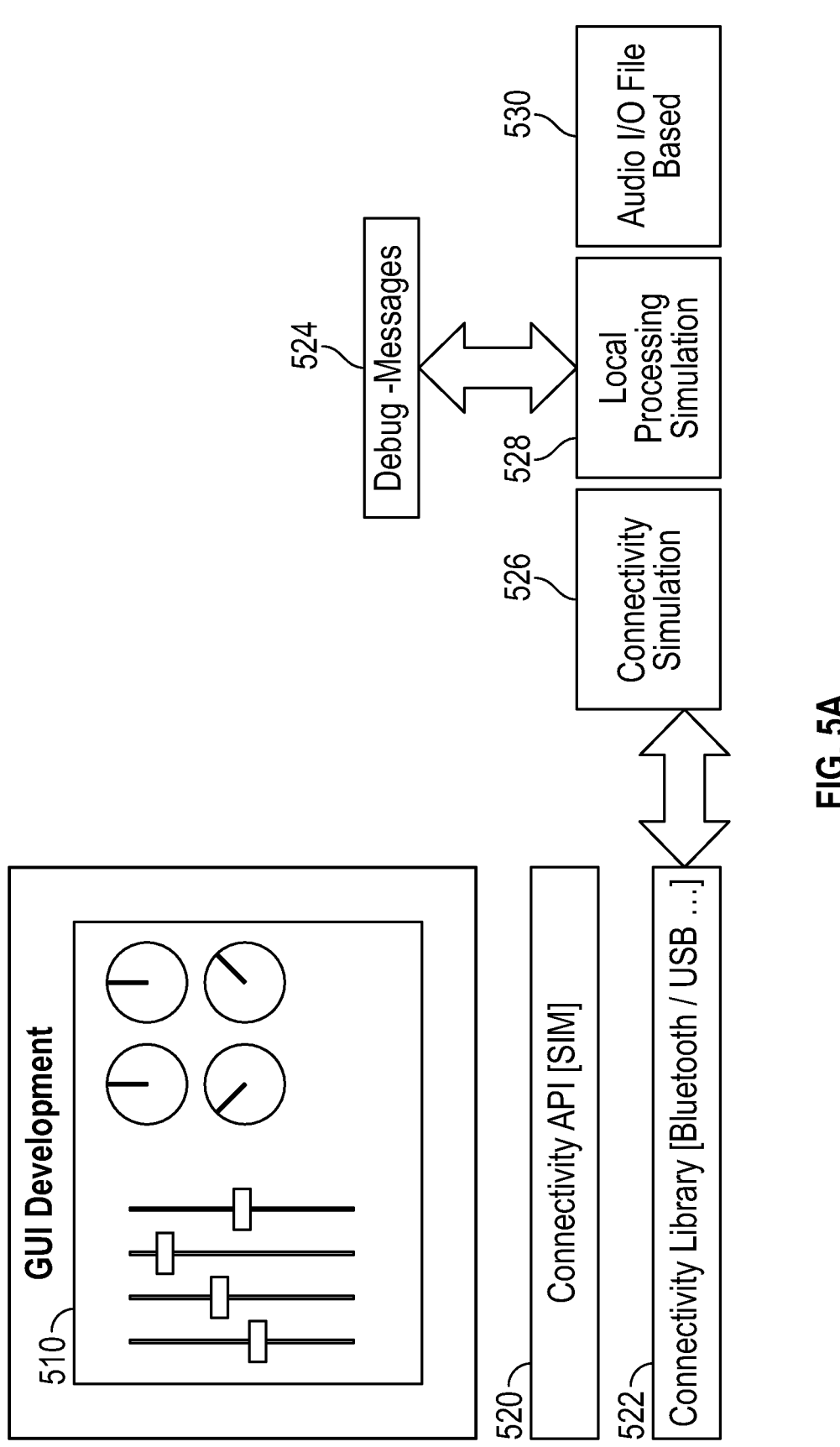
FIG. 5A illustrates an exemplary system development architecture, according to some embodiments of the disclosure.
Figure 5B:
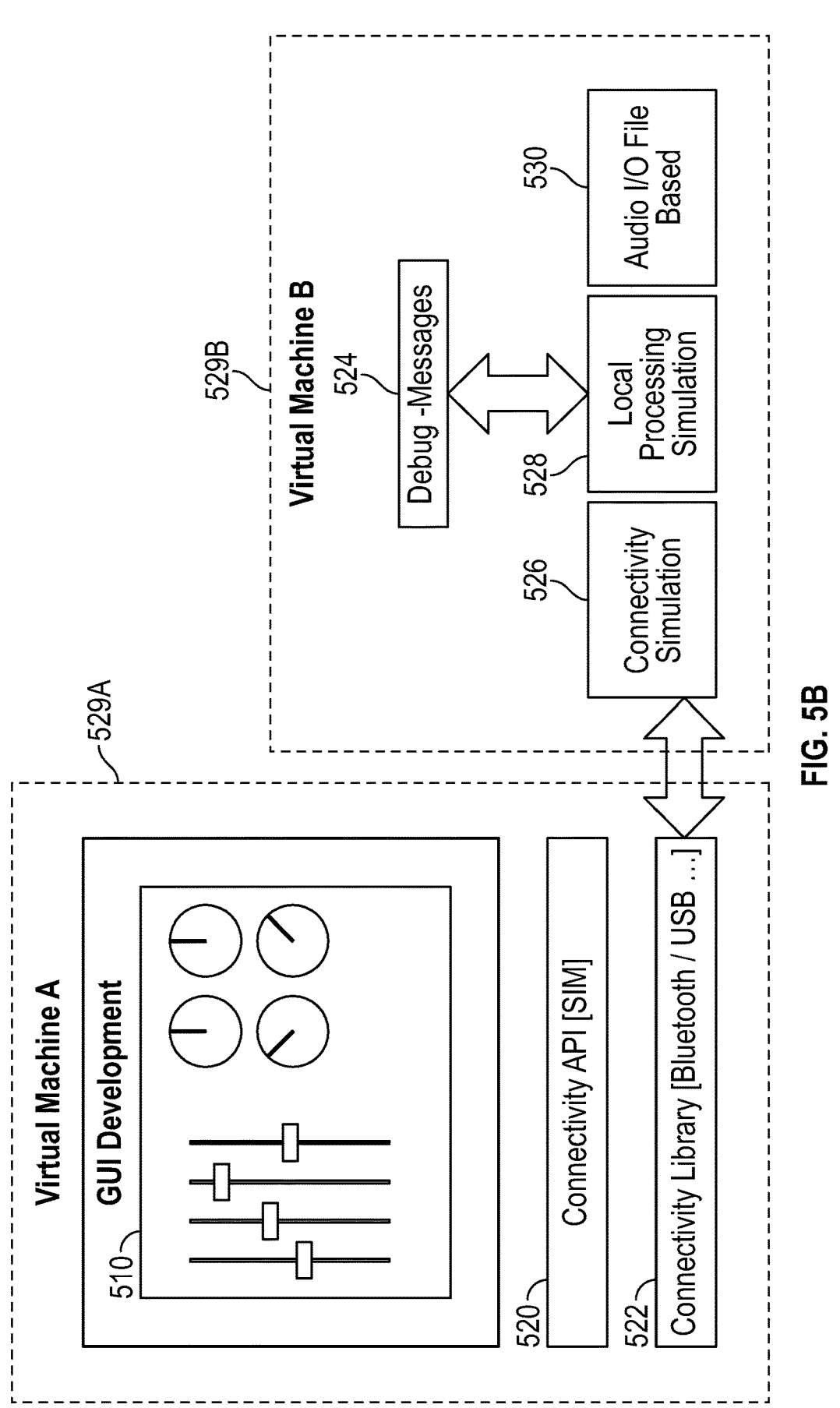
FIG. 5B illustrates an exemplary multiple simulation environments within different virtual machines that are communicating with each other, according to some embodiments of the disclosure.

System development with platform simulation: FIG. 5A illustrates an exemplary system development architecture. The development environment can be used for developing the graphical user interface, developing connectivity, developing signal processing, according to some embodiments of the disclosure. The simulation software may be within a simulation environment, like Matlab, with a binaural framework. After the simulation has been completed, the development platform may transfer the instructions, plugins, algorithms, and other information used in the simulation to the audio system and/or electronic device 406. The use of multiple simulation environments, potentially within different virtual machines 529A and 529B, that are communicating with each other is shown in FIG. 5B. This allows single or multiple developers to build software for multiple different target platforms within a simulation environment which enables development without the specific target hardware.
Exemplary Application Developer Development platform for multiple target devices and environments: The development platform allows a user to develop applications, such as UIs or plugins, and copy them to an audio system, an electronic device, or both. The UIs created are to be used on an electronic device, for example. In some embodiments, the UI and the underlying data processing is being developed for a single target device and environment. For example, a developer may be creating an application for a mobile phone where the user interface and the data processing are created to form a single application for a single target operating system. The developer may then take that same application and rebuild it for a different target operating system. For the wearable product use case, the developer now has to create two or more components that have different target hardware and operating systems. For example, the user interface is built for a mobile computing platform such as Android running on a mobile phone, tablet, smart watch or charging pod. In addition there is a different hardware platform used for the wearable device, such as an ear computer, that uses a different operating system. The wearable device may contain multiple compute systems with different operating systems that the developer is creating software for. The ecosystem may also contain an intermediate device such as a charging pod which is using yet another processing platform and operating system.

Figure 5C:
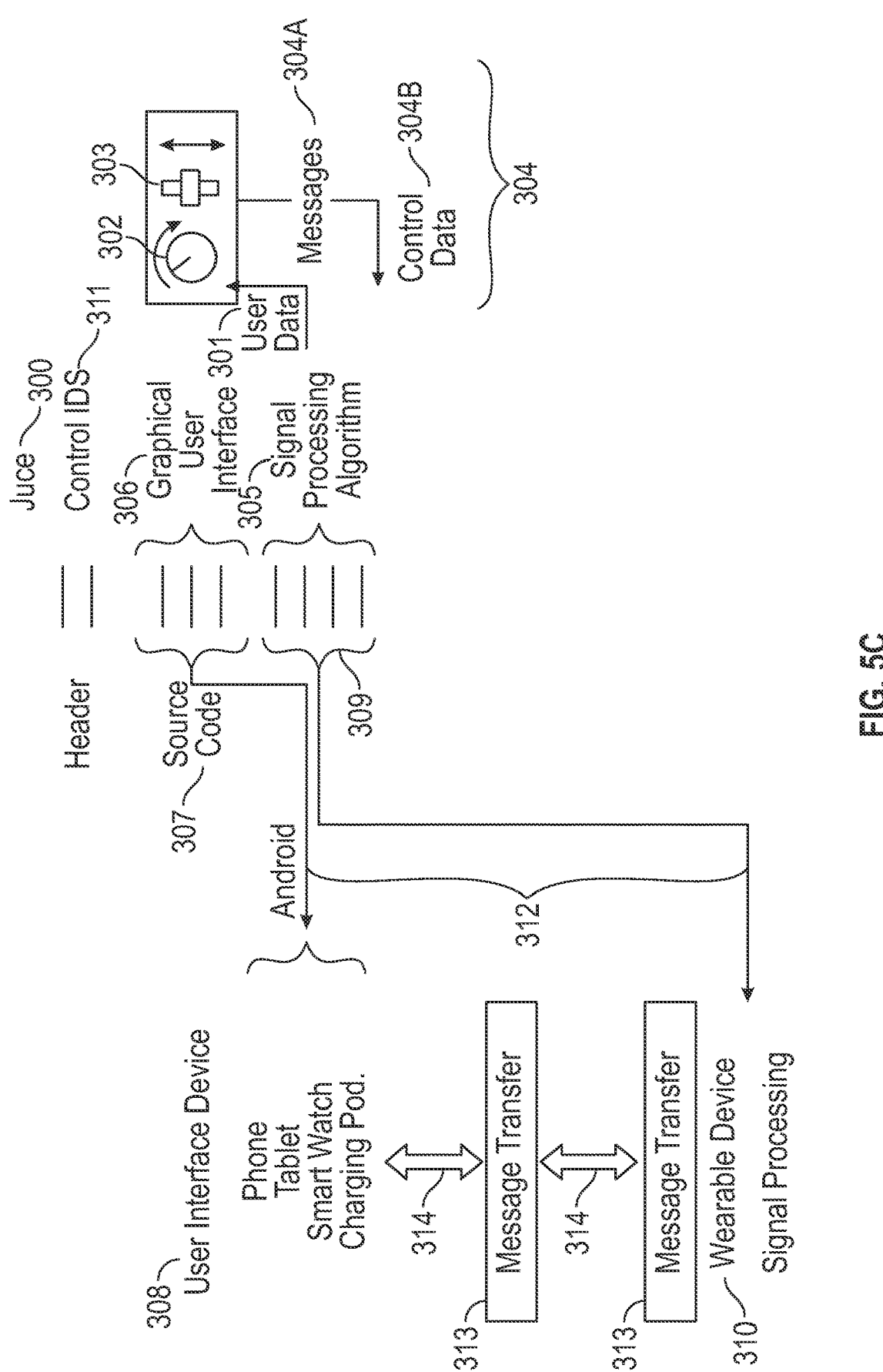
FIG. 5C illustrates the development tool chain, according to some embodiments of the disclosure.

Development platform for multiple platforms: FIG. 5C illustrates the development tool chain. Typically, a developer uses a set of tools to develop their audio processing system, and one example is an environment called JUCE 300. This allows for the implementation of graphical user interfaces where, for example, the user 301 controls a rotary dial 302 or a slider 303 on their laptop or their tablet, and within the same environment, the software defines the algorithm that is being controlled by this user interface. As this dial 302 or slider 303 is moved, the message transfer system 304 sends messages 304A via control data 304B to the signal processing part of the software 305, and the software can then react to the parameter change data 304B. The signal processing algorithm 305 can also send information back to the graphical user interface 306. For example, the graphical user interface 306 may display the new volume control level, or a level meter based on the audio data amplitude that is being processed. These components are typically built within one environment 300 and are typically deployed into one single system such as a laptop, tablet, or a dedicated work station for a recording studio.

To develop applications for more than one target, it is necessary to create a separate system. This is accomplished by implementing a new tool chain for the ear computer chip within the JUCE environment 300. Source code 307 is developed for graphical user interface devices 308. These devices 308 may include a phone, tablet, smart watch, or the charging port for the earbuds, and these devices will typically be running an operating system such as Android. Then, additional code 309 is developed and built using a separate set of tools to create the processing algorithm for the embedded device 310 that the user wears, such as earbuds or other wearable product. The two pieces of code 307 and 309 use shared control IDs 311, so the IDs 311 for the messages and all of the parameters are embedded into 307 and 309.

After the code is developed, it is split and built into independent code 312 using the tool chain for each of the target platforms and is sent to the relevant devices. Then, any information that is changed on the graphical user interface device 308 will pass through the message transfer systems 313 with the correct IDs and parameter information over a communications link 314, such as Bluetooth low energy or a USB cable. The information travels to the message transfer receiver in the embedded device 310, which then passes the parameters back into the embedded code. This process is bi-directional, so that any information the user receives can be passed back to the graphical user interface device 308 and may be viewed by the user.

In some configurations, all of the built code for all of the platforms is sent to a user interface device where it is unpacked and then redistributed to the relevant connected devices based on the embedded platforms.

The proposed development tool chain is an improvement over the traditional methods of developing code where all components are built in one environment and deployed into one system. Typically, building for two or more separate systems requires a completely separate development environment, separate tool chain, separate libraries, separate IDE, and separate operating system. The improved development tool chain utilizes resources that are already available to apply different tool chains within the same environment for more than one target.

Figure 54:
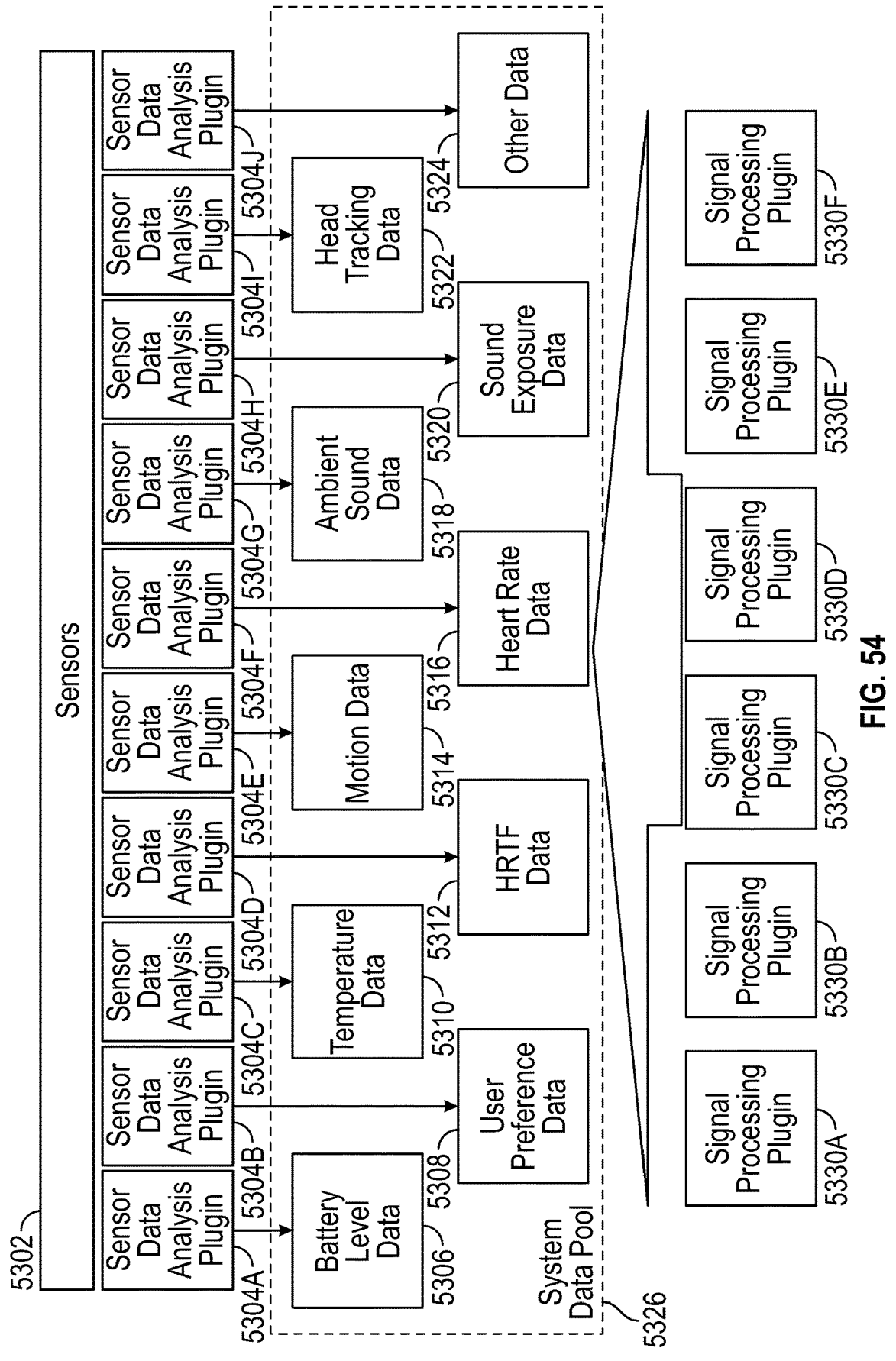

Development platform for multiple target devices using example hardware: To assist with the development of signal processing plugins and the associated graphical user interface, the developers can be provided with representative hardware for the target application. For the graphical user interface this may be easily achieved using an industry standard mobile phone, tablet or smart watch. For the embedded plugins and applications this may not be possible. For this scenario the developer is provided with a piece of hardware in the form of a development kit that is representative of a real device. This is shown in FIG. 54. This is an extension or an alternative starting point to the development system as described herein. The developer is able to easily migrate the application they have created in the simulator onto the representative hardware platform for real time testing. This also allows the example hardware device to be placed in exemplary environments such as acoustic spaces that cannot easily be represented using a simulation environment on a personal computer. This also allows the development device to be directly worn by a target user or developed to gather real time real world audio and sensor data. The development kit hardware may be connected through available data connections on the board to additional hardware components. The example hardware device can also be provided as a small form factor unit that allows the developer to have a portable or even wearable solution for their development work.

Example applications and graphical user interfaces: In some embodiments, the development platform can include a first UI for developing a second UI. The first UI may use industry standard controls and messaging. A connection layer can send bidirectional data between the development platform and the electronic device.

Example applications and signal processing plugins: The development platform 1000 can additionally or alternatively include a first plugin 420 for developing a second plugin. The plugin may allow users access to sound signal processing and other information (e.g., from sensors on the electronic device). In some embodiments, the plugins may have a corresponding UI application with controls.

Exemplary Hardware Development Tools

The hardware development tools can include hardware, embedded software, or other components (not shown). As discussed in more detail below, the hardware development tools 400 may communicate with one or more external devices, such as an electronic device.

The hardware development tools may be used to develop embedded software for hardware. During the development phase, the user may be able to consider the end product form factor, system architecture, and targeted use case(s) when developing the embedded software.

Exemplary Hardware

The audio system may include one or more silicon chips for implementing one or more processes, such as processing of audio data streams. The silicon chip may include a plurality of components, components and hardware macros and accelerators, some of which may be specifically designed for audio applications, low power functions, and low latency embedded audio signal processing, to name a few.

Figure 6A:
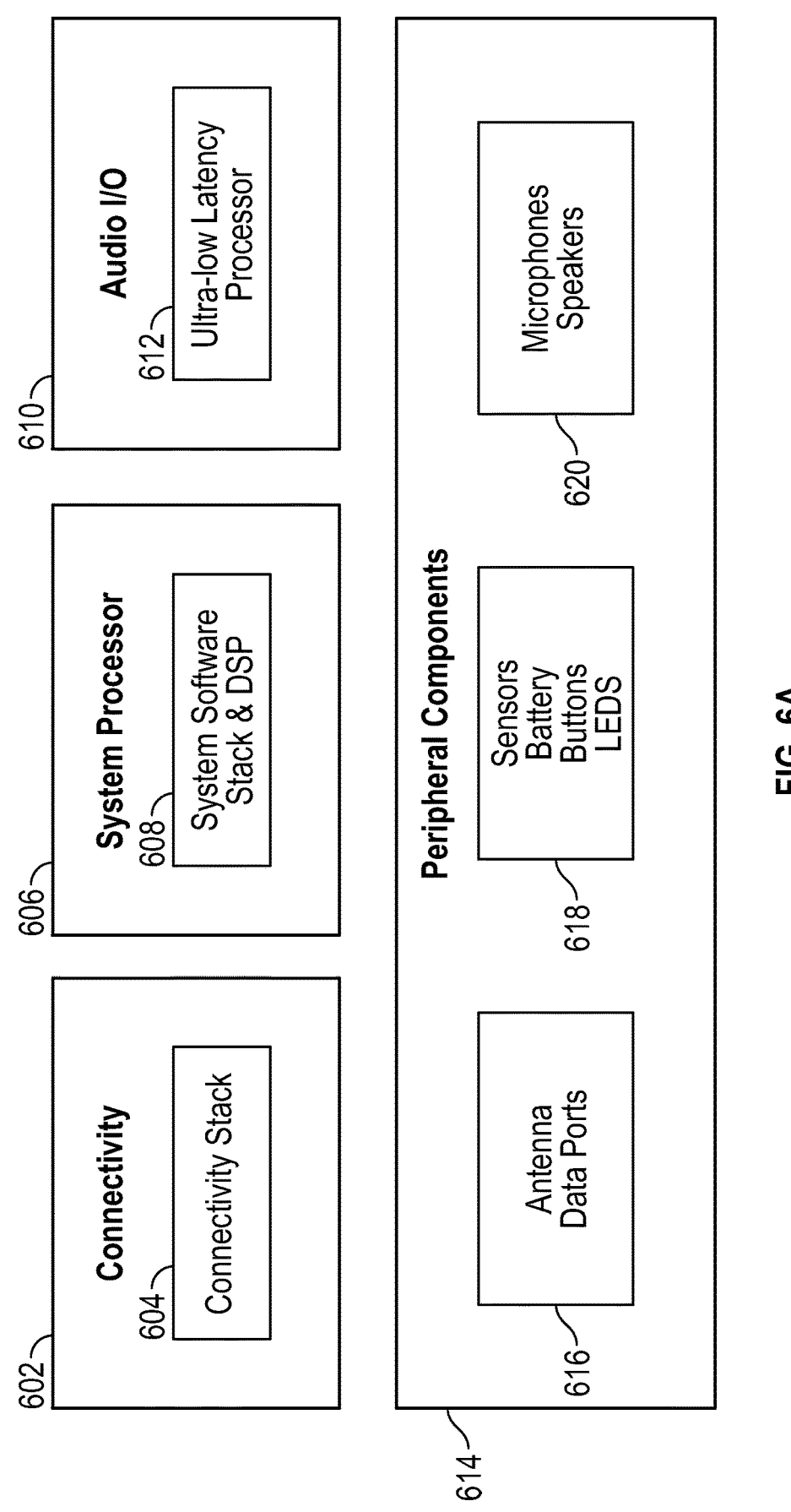
FIG. 6A illustrates a block diagram of an exemplary system architecture, according to some embodiments of the disclosure.

FIG. 6A illustrates a block diagram of an exemplary system architecture, according to some embodiments of the disclosure. The system architecture may include connectivity 602, system processor 606, audio I/O 610, and peripheral components 614. Connectivity 602 may include a connectivity stack 604. System processor 606 may include system software stack and digital signal processor (DSP) 608 and a memory. In some embodiments, the system processor 606 is an ARM or RISC-V processor. The main processor may include a dedicated memory for storing instructions executable by the processor to perform operations on data streams received by the processor. Audio I/O 610 may include various data interfaces (e.g., industry-standard interfaces UART, SPI, I2C, USB, etc.) used to receive data from other devices and peripheral components. Audio I/O 610 may additionally include ultra-low latency processor 612. In some embodiments, peripheral components 614 may include antenna data ports 616, other components 618 (such as sensors, battery, buttons, LEDs, etc.), and microphones and speakers 620.

One or more software, for instance, drivers, an OS, and applications may be executable by hardware. Certain components of the audio system are included in the silicon chip, while other components are included in a software layer integrated with the silicon chip for more efficient data processing. The OS is programmed to ensure a consistent API to the relevant processing functions, whether they are implemented as software libraries, hand optimized assembler routines for a specific processor, or hardware macros in the silicon, or offloaded to an external processor.

Embodiments of the disclosure may include an SINC for allowing the user to select which sounds around them are heard and which ones are removed.

Figure 6B:
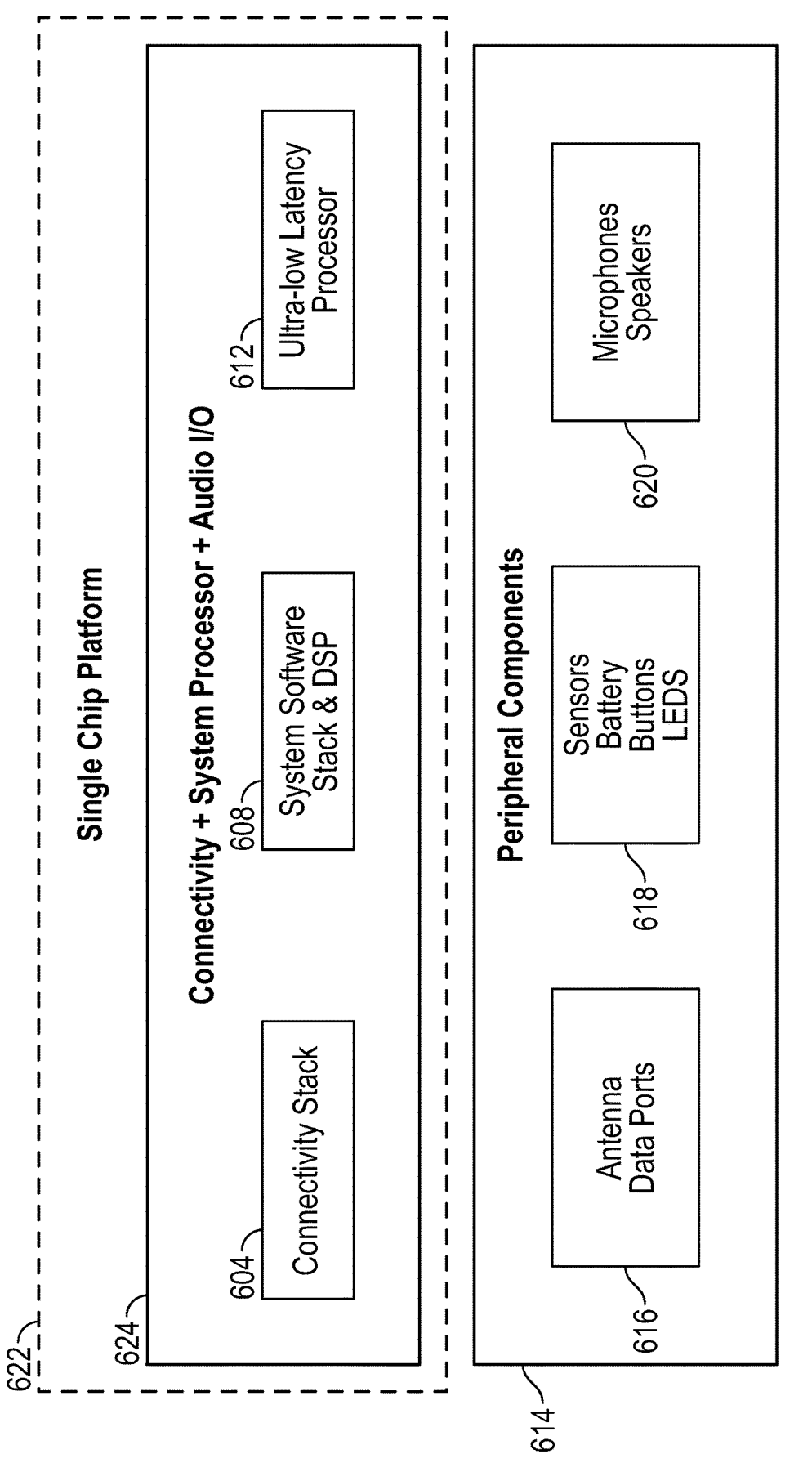
FIG. 6B illustrates an exemplary system architecture on a single chip, according to some embodiments of the disclosure.

In some embodiments, one or more components may be integrated into a single chip platform. FIG. 6B illustrates an exemplary system architecture on a single chip, according to some embodiments of the disclosure. Connectivity stack 604, system software stack and DSP 608, and ultra-low processor 612 may be integrated into the single chip platform 622.

Figure 6C:
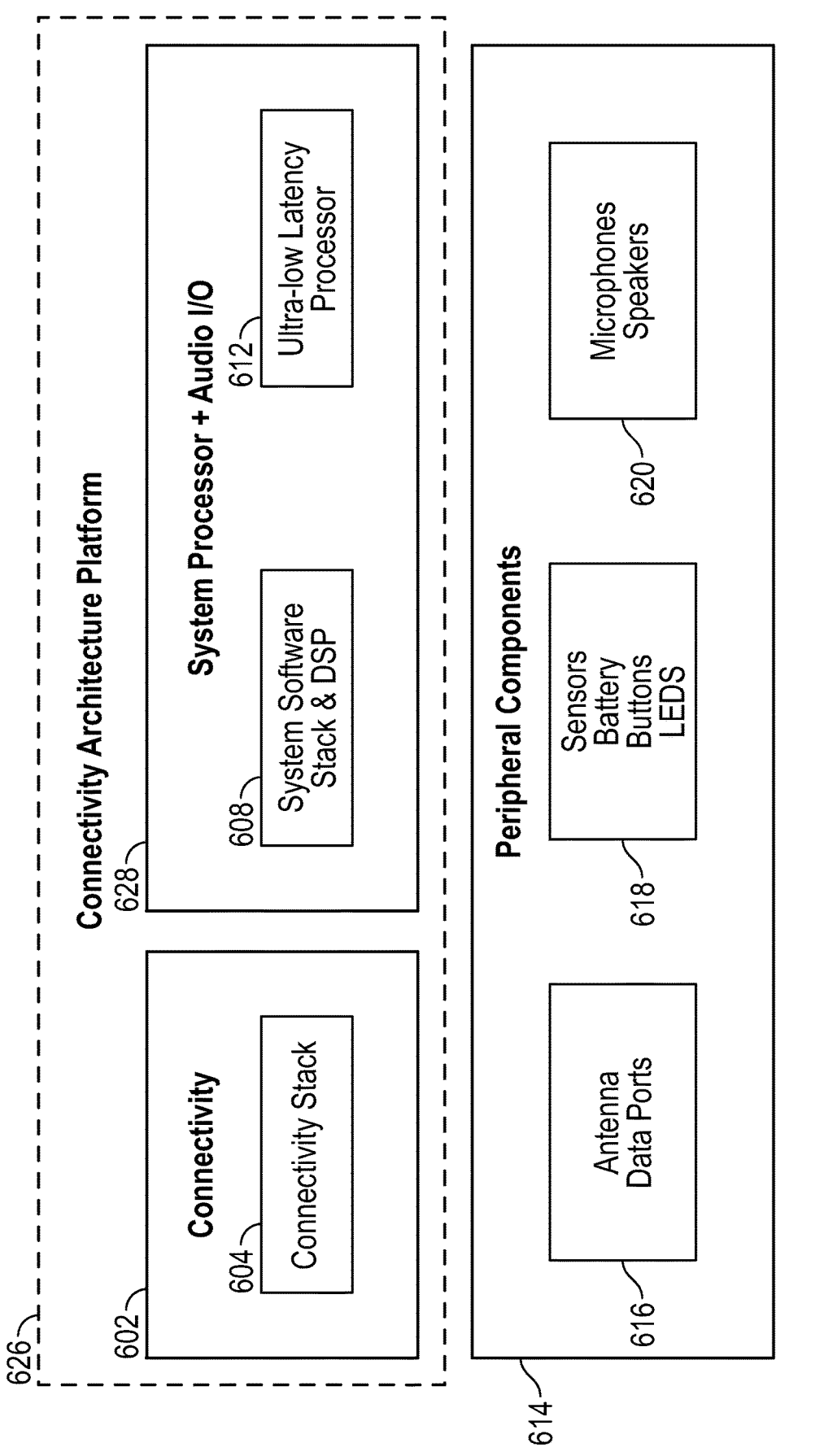
FIG. 6C illustrates an exemplary system processor programmed to handle the system software stack, DSP, and audio I/O, according to some embodiments of the disclosure.

In some embodiments, a system processor may be programmed to handle the system software stack, DSP 608, and audio I/O 610, as shown in FIG. 6C. Connectivity 602 may include connectivity stack 604. In some embodiments, connectivity 602 and system processor and audio I/O 628 may be included in a connectivity architecture platform 626.

Figure 6D:
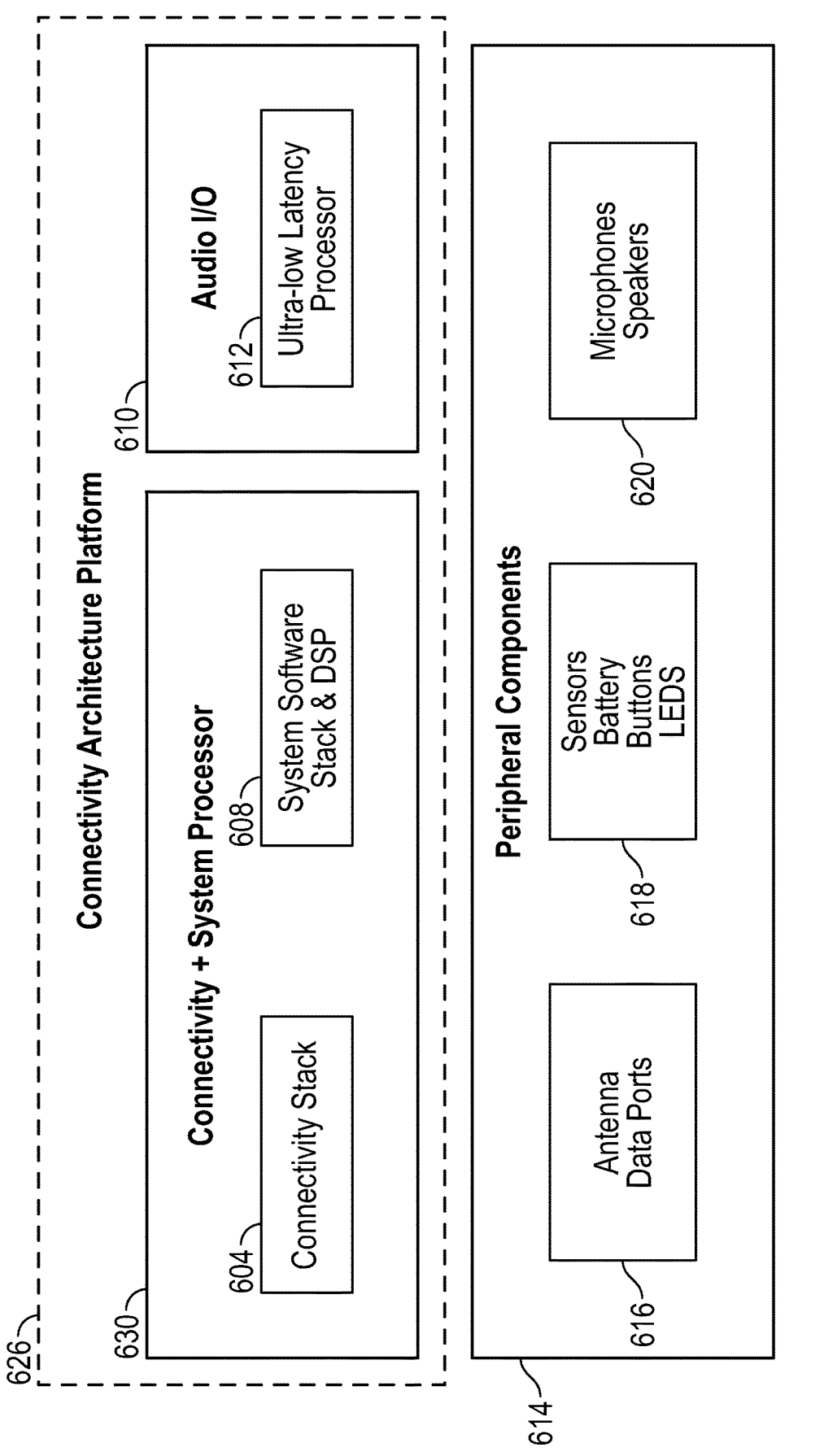
FIG. 6D illustrates an exemplary system architecture including a system processor that is programmed to handle the connectivity, according to some embodiments of the disclosure.

Alternatively, in some embodiments, a system processor may be programmed to handle both system software stack and DSP 608 and connectivity stack 604. FIG. 6D illustrates an exemplary system architecture including a system processor that is programmed to handle the connectivity, according to some embodiments of the disclosure. Connectivity and system processor 630 may include connectivity stack 604 and system software stack and DSP 608. Audio I/O 610 may include ultra-low latency processor 612. Connectivity and system processor 630 and audio I/O 610 may be included in a connectivity architecture platform 626.

Figure 6E:
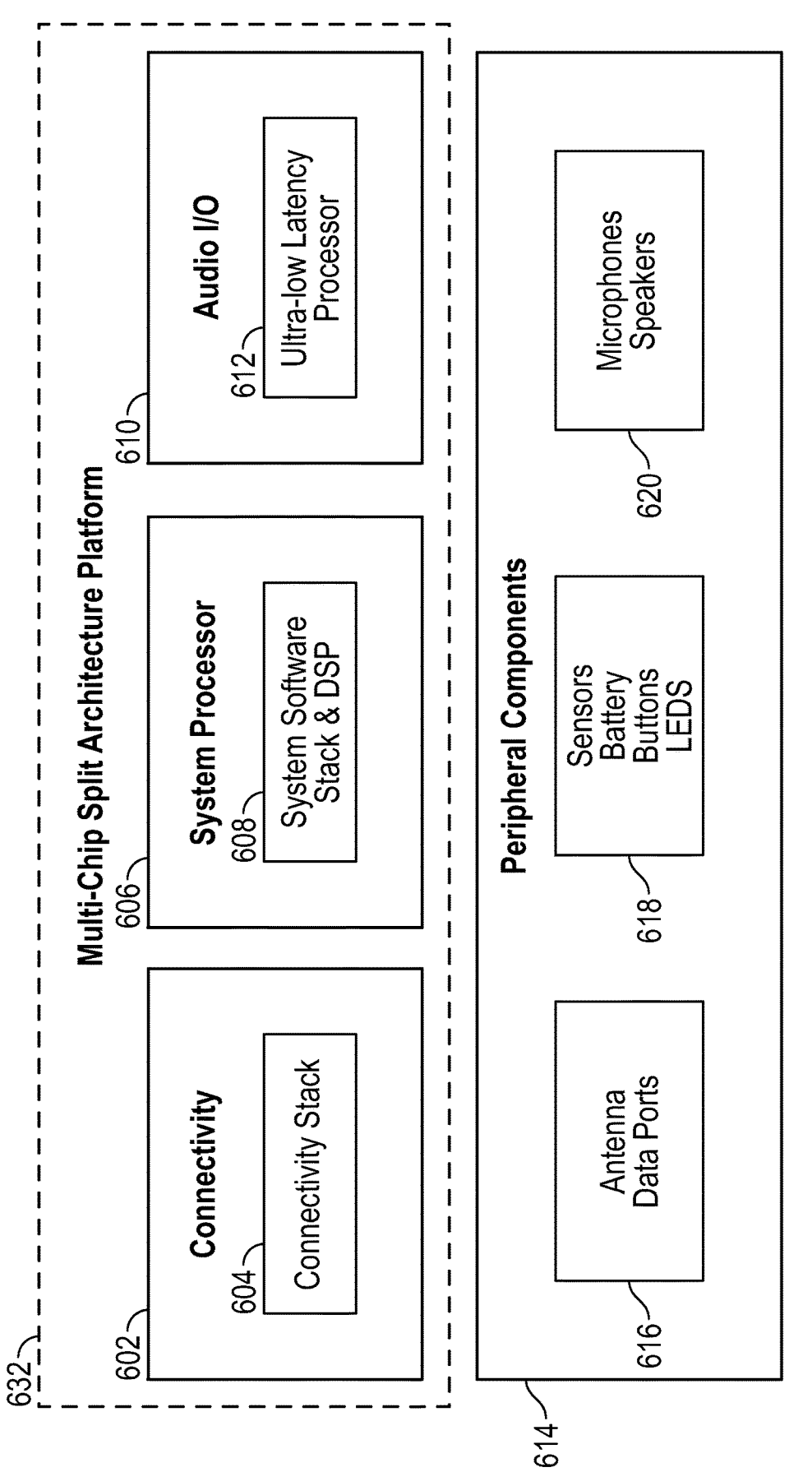
FIG. 6E illustrates an exemplary system architecture including a multi-chip split architecture platform, according to some embodiments of the disclosure.

Embodiments of the disclosure may include the main components of the system architecture being on a separate piece of silicon, according to some embodiments of the disclosure. For example, the system architecture may comprise a multi-chip split architecture platform 632, which comprises connectivity 602, system processor 606, and audio I/O 610, as shown in FIG. 6E.

Figure 6F:
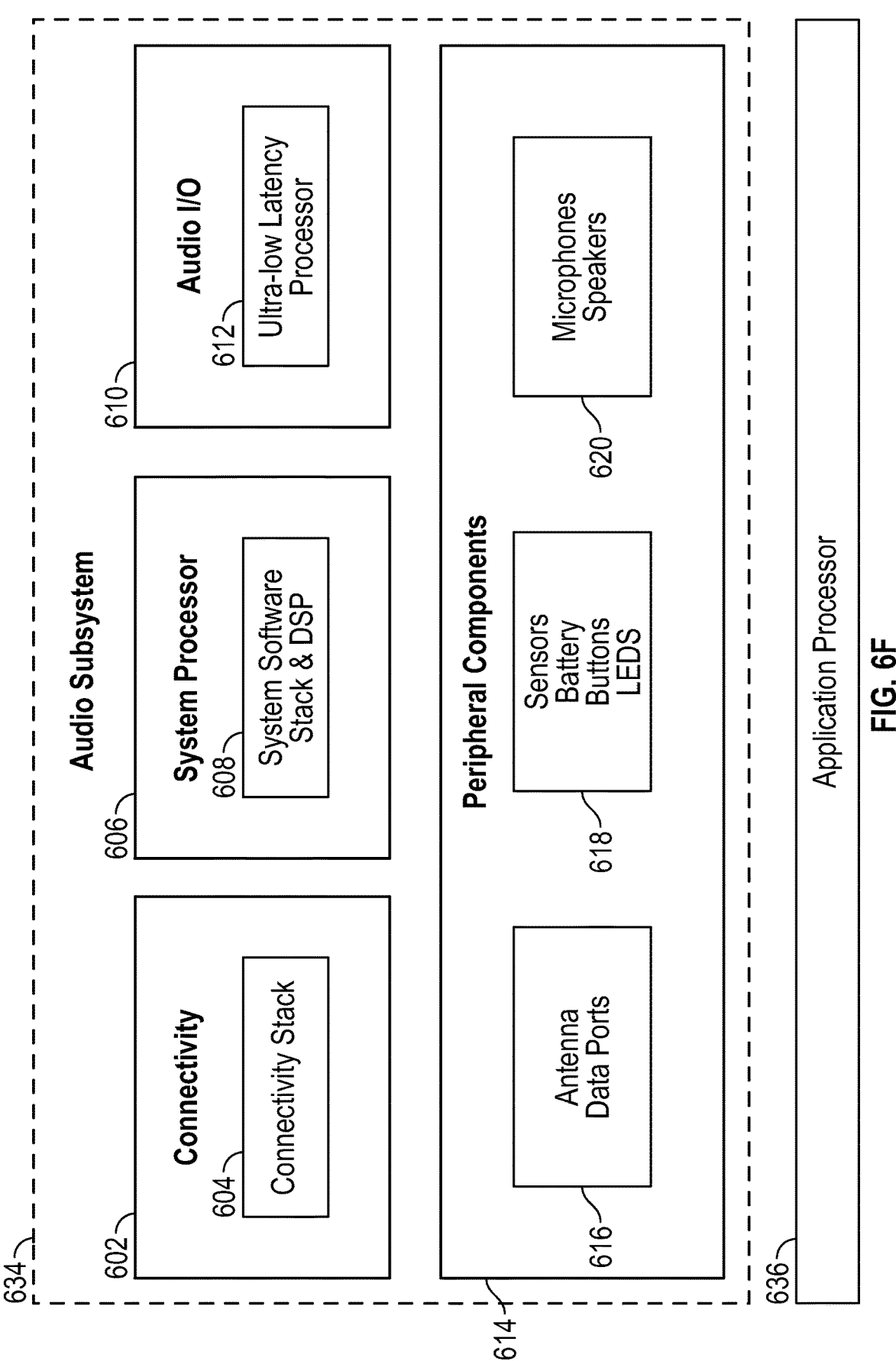
FIG. 6F illustrates an exemplary system architecture having an audio subsystem that is a complete system including components for connectivity, system processor, audio I/O, and peripheral components, according to some embodiments of the disclosure.

FIG. 6F illustrates an exemplary system architecture having an audio subsystem 634 that is a complete system including components for connectivity 602, system processor 606, audio I/O 610, and peripheral components 614, according to some embodiments of the disclosure. The audio subsystem may be connected to the system processor 606, audio I/O 610, peripheral components 614, a memory, and one or more DSPs programmed to handle certain processing tasks independent from the main processor. The application processor 636 (main processor) may be located outside of the audio subsystem 634, and may interface with the audio subsystem to offload certain processing tasks to the audio subsystem. Data streams may be transmitted to DSPs of the audio subsystem for processing when, e.g., the system processor 606 lacks processing resources, when the system processor 606 cannot complete processing operations within a desired time period, to improve efficiency of data processing, a combination thereof, or the like.

The silicon chip (e.g., an audio subsystem of the silicon chip) can include one or more DSPs. The DSP(s) may comprise multiple processing cores. In some embodiments, different processing cores may be used for different functions, such as low power functions, low latency functions, high computing functions, etc. In some embodiments, instructions, processes, and/or functions may be optimized to be run on a specific processing core. A plugin may be used to identify the optimal processing core for a given set of instructions/processes/functions. In some embodiments, the audio system may be programmed to adapt to using the instructions/processes/functions when not run by the optimal processing core. The OS and associated plugins can be allocated to the optimal DSP core based on the needs of the plugin processing. This can be done independently of the developer knowing intimate details of the processing capabilities of the silicon platform, therefore making the code cross platform compatible.

Alternatively, as in a multi-core system, at least some of the processing cores may be identical, in some instances, allowing instruction sets to be used on any of the processing cores. In some embodiments, one processing core may be a master processing core (including a controller). The processing may be distributed across the processing cores where each processing core may be running the same instruction sets, but with different audio data, in some embodiments. For example, the processing cores may be using data from different sections of an image recognition system, data blocks for different regions of a spatial scene, or different frequency bands for spectral processing. The data processed by each processing core may overlap with other processing cores, in some embodiments. For example, all the processing cores may have access to the same input data to create different variations of output data. This set of output data is passed to a different processing system to determine the optimal one to use for the specific type of processing, application, plugin, user preference and system environment. The audio OS may be programmed to manage resource loading when the audio system includes multiple identical processing cores. The OS can use system metrics such as MIPS being used, memory being used, latency of data paths for example.

Alternatively, as in a multi-core system, at least some of the processing cores may be identical, in some instances, allowing instruction sets to be used on any of the processing cores. This allows a plugin or a task to be allocated to any of the cores with no additional checking as all the resources will be identical.

In some embodiments, one processing core may be a master processing core (including a controller). The master core may be reserved for only running the operating system. The master core may also run small plugins for administrative tasks. The master core may be used for other system tasks. The master core may be the only core and will run all of the operating system tasks and the plugins. The master core may be one of many cores and it is utilized until it no longer has sufficient resources available to execute more tasks at which point any new tasks are allocated to other cores in the system.

Same code, identical cores, different data—The processing may be distributed across the processing cores where each processing core may be running the same instruction sets, but with different audio data, in some embodiments. The cores can be configured to run the same code but with different input data streams. This could be for audio data or other forms of data. This could be multiple streams of audio data from multiple sources, for example, all using spectral domain processing and requiring identical FFT processing modules to be used.

Same code or different code, same cores or different cores, overlapping data or different time window data—the data streams can be processed by multiple plugins which may be running on one or more processing cores. The data may be overlapped so that a window of samples is sent to plugin A and an overlapping region of samples with a different window is sent to plugin B. This allows a different time regions of a data stream to be processed sequentially or in parallel using different plugins. The tasks of plugin A and plugin B may be identical or they may be different.

Different code, same cores or different cores, same data—the data streams can be processed by multiple plugins which may be running on one or more processing cores. The block of input data may be sent to plugin A and the same block of data is sent to plugin B. The tasks of plugin A and plugin B may be identical or they may be different. When the code is different this will create different output data depending on the plugin tasks that have been executed.

Plugin allocations based on data streaming and OS metrics—the OS will determine the optimal core to run a plugin based on the audio streaming and other system metrics. For example, if a processing core is already receiving an audio data stream for plugin A and the OS detects that plugin B also will be processing the same data stream, it may decide to place plugin B on the same processing core to avoid copying and routing data to a different core, if there are resources available.

In some embodiments, a processing core may be dedicated to a specific process/function. For example, a DSP may comprise four processing cores. A first processing core may be programmed to handle music processes. A second processing core may be programmed to handle voice connection processes. A third processing core may be programmed to handle hearing processes. A fourth processing core may be programmed to handle low latency processes. The processing cores may run in parallel, depending on the respective processes. In some embodiments, each dedicated processing core may be programmed to run an optimized instruction set unique to the respective process. For example, the instruction set for the first processing core, which handles music processes, may have instructions for handling larger buffers, timestamping, and playing back timing, along with decoding and encoding of data streams for signal processing.

In some embodiments, the processing cores will be identical such that the different processing tasks can be allocated to any core depending on resource availability and data routing.

In some embodiments, the operating system can be programmed or controlled through a specific interface to adjust processor loading based on a primary metric. The primary metric may be to reduce memory footprint, or to minimize power consumption, or to reduce latency, or to maximize compute loading, as some examples. This will change the allocation of resources, the number of resources used, the speed of operation and how interfaces are programmed and controlled for example. The operating system is designed to allow the user or other system parameters to adapt the resource control depending on the system requirements.

In some embodiments, the operating system may use resource thresholds to cause a change in how the system is configured and used. For example, when the battery level drops to 25% the operating system may send messages to all plugins to run in low power mode. Similarly, when the memory usage is at 80%, for example, and another plugin has been sent to the device to be activated and added to the task list, the operating system send a request to all other plugins to reduce their memory usage. The metric that is used for initiating a change on the processing load of the system can be changed and can be determined by the specific use case. For example, if the user wishes to listen to music for 10 hours with a specific set of plugins and processing, the operating can make adjustments to try to meet that target.

The dashboard application that is used to control the plugins and show metrics to a user can be used to illustrate the impact of the processing load and what would happen if a new additional plugin was added to the system. This can be shown as a delta on the resource loading, such as, if plugin A is already resident in the embedded device, this may result in 4 hours of available battery life. If plugin B is added this may reduce to 1 hour of battery life with continuous usage.

Software development tools may or may not be aware that the processing cores are running different instruction sets. In some embodiments, the use of separate processing cores within a single chip may be determined at runtime by the OS. The OS may use some or all available cores for intense neural network (NN) processing, for example, for hearing enhancement applications. The user of the device may want to change the application to then be used for music listening in the same noisy environment. The OS may reconfigure the usage of the separate processing cores to enable one processing core for the decoding of the audio streams, a second processing core for the audio processing enhancements, and now a smaller NN for ambient sound processing, for example. The plugins may be informed of the processing loading change and then adapt their resource usage accordingly.

In some embodiments, hardware may include a DSP used for performing binaural signal processing. The DSP may be programmed such that it receives I/O from multiple microphones, speakers, and sensors.

In some embodiments, the DSP may be receiving data from multiple connectivity components, such as wired data streams or wireless data streams. In addition, the DSP may be connected to multiple memories. In some cases, the DSP may be connected to multiple simultaneous data streams using multiple data paths, data formats, data rates and so on.

Figure 7A:
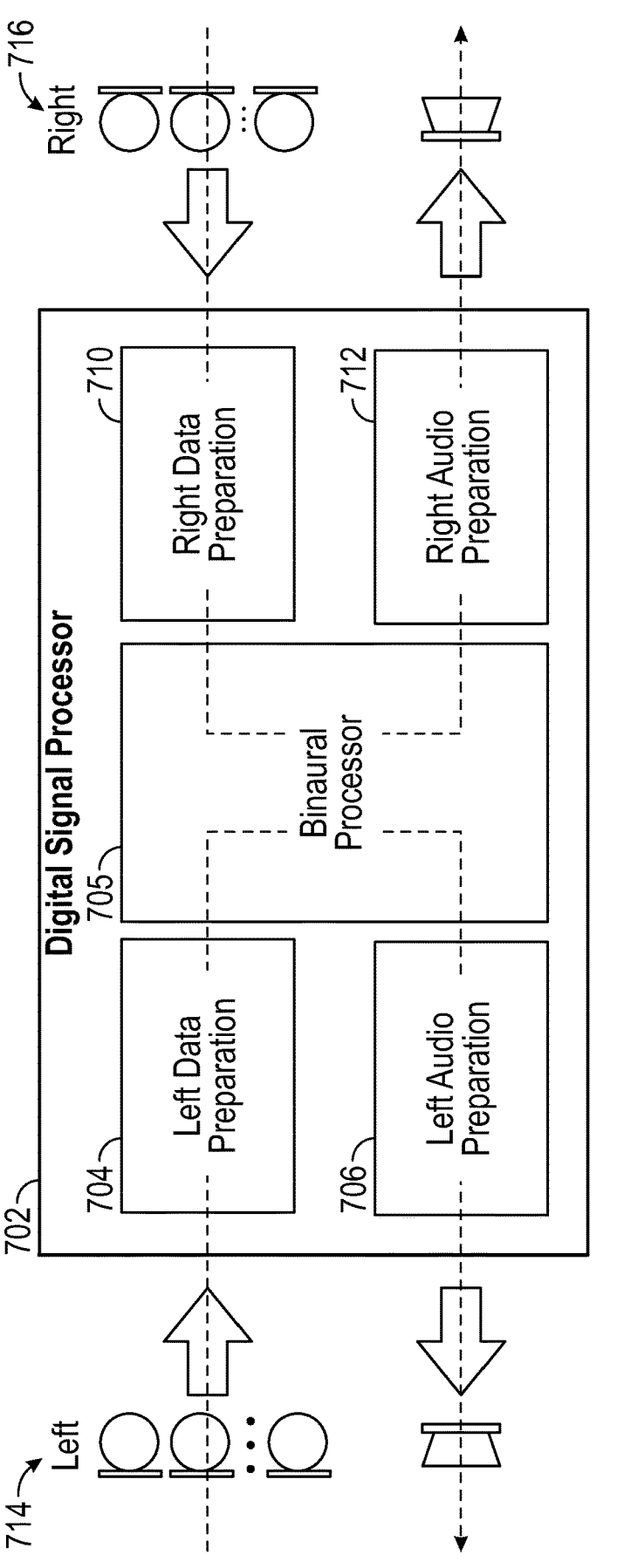
FIG. 7A illustrates a single platform for binaural processing, according to some embodiments.

Binaural processing system architecture—single platform: FIG. 7A illustrates a single platform for binaural processing, according to some embodiments. A binaural device may include two ear pieces, left ear piece 714 and right ear piece 716. In some embodiments, each ear piece may operate independently from the other ear piece.

Figure 46:
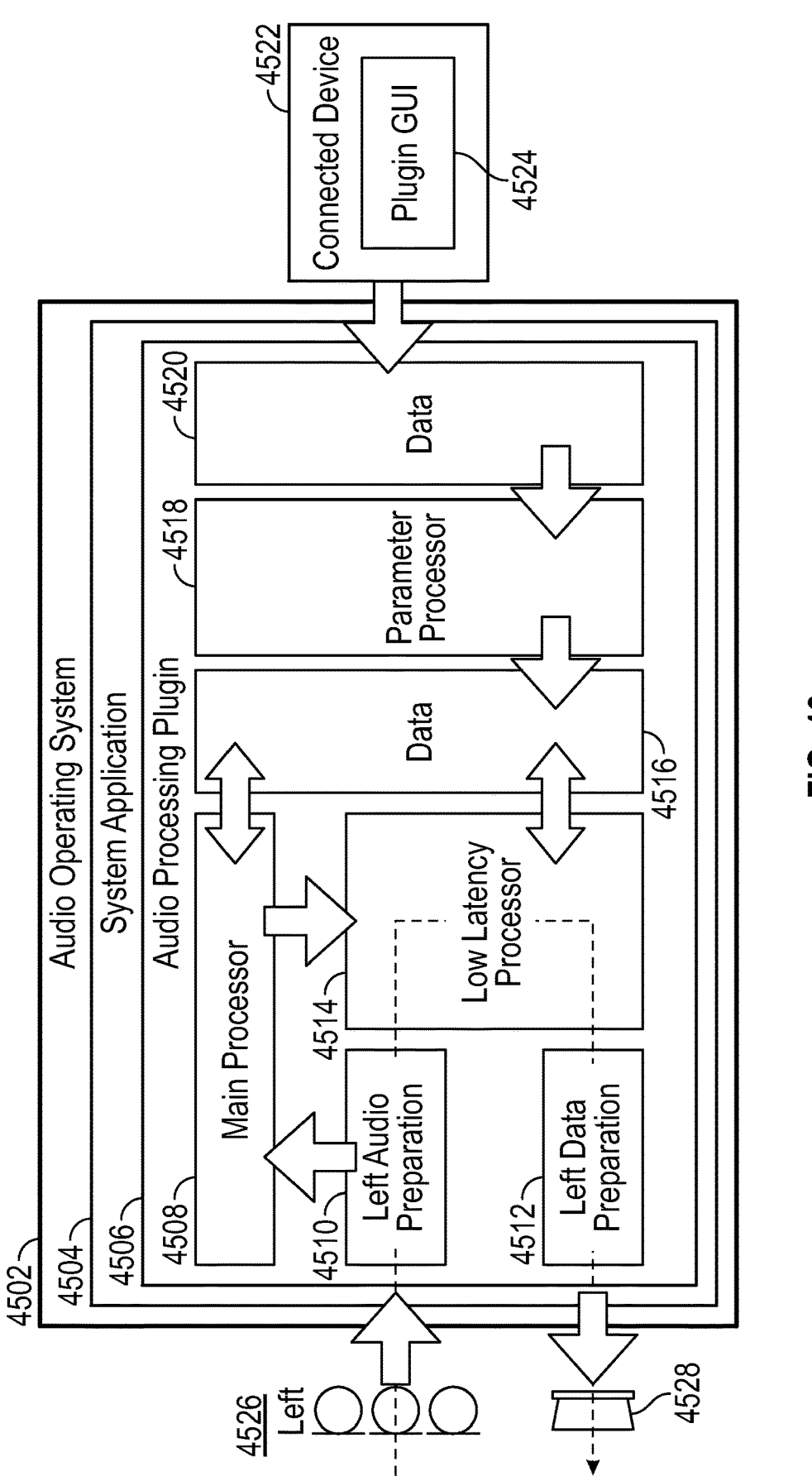
FIG. 46 illustrates an exemplary audio processing plugin, according to some embodiments of the disclosure.

Binaural processing system architecture—single platform with layered processing: The devices may be connected to a single processor, such as through a headband, neck band, necklace pod, belt pack or other central hub that the ear devices can be connected to. An example of the processing architecture that can be employed within the flexible ear computer configurations is shown in FIG. 46 (discussed in more detail below). This illustrates the separate layers of the low latency processing for each ear bud that can occur independently at each ear. There is also an analysis layer that uses information gathered at each of the ear device the user is wearing and is processed using independent analysis and common analysis signal processors. For example, the spatial analysis of the signals uses information from each ear bud (4604), which can inform subsequent processors which signal components should be tagged as "target sounds" or "desirable sounds," which components should be tagged as "background sounds" and those components which should be tagged as "noise sounds." This information is calculated separately from the low latency data streams to avoid increasing latency in the primary signal paths from the microphones to the speakers. The spatial analysis metrics can be passed into the low latency processing filters and other signal processing plugins (4614A and 4614B) to allow them to adapt to the changing conditions that have been analyzed. This allows for smooth transitions based on the analysis.

Figure 7B:
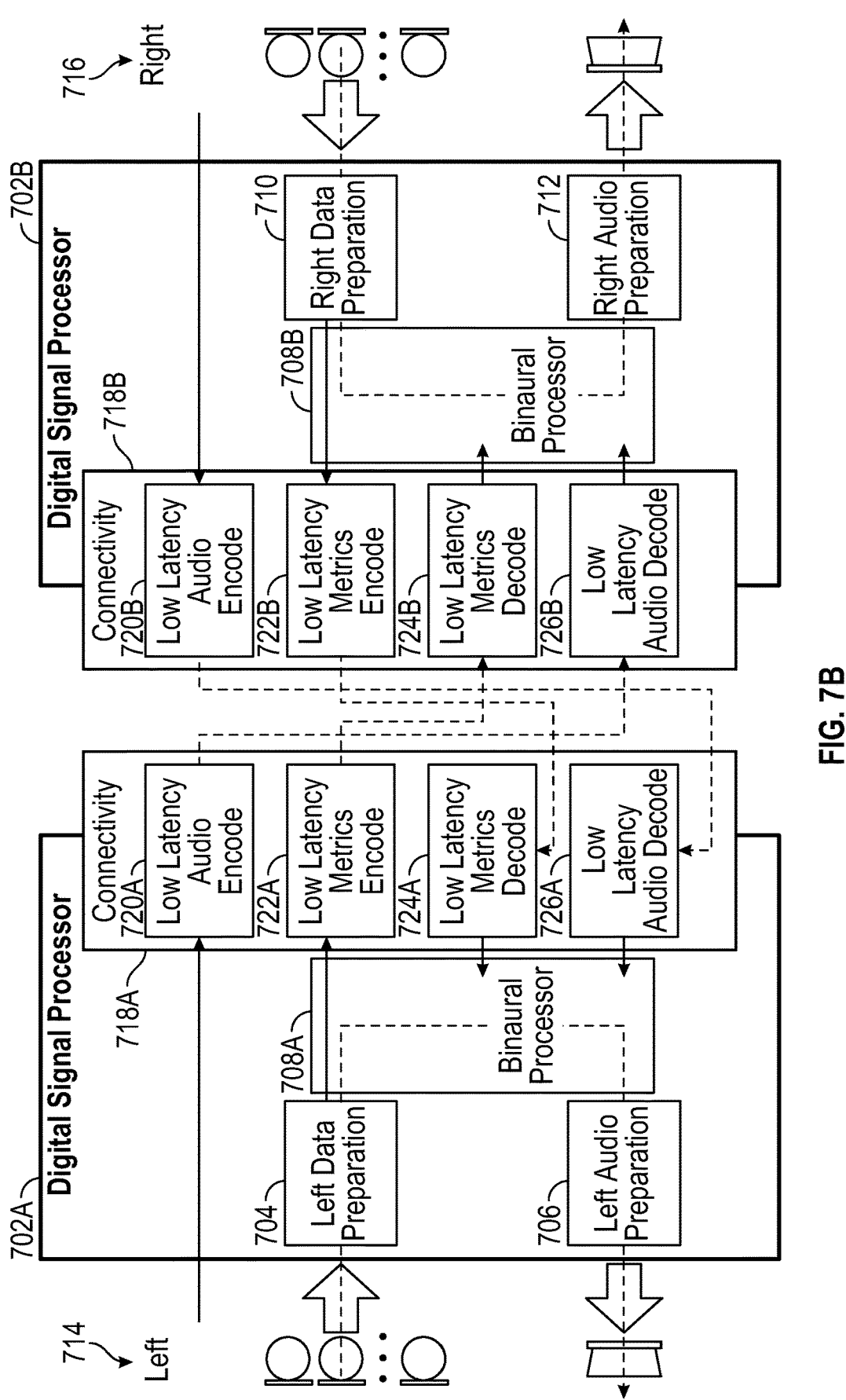
FIG. 7B illustrates exemplary ear buds communicating with each other using wired or wireless communications, according to some embodiments of the disclosure.

Binaural processing system architecture—dual platform: The ear buds may communicate with each other using wired or wireless communications, as shown in FIG. 7B. In this configuration, each ear bud has its own independent processing platform with communications links to other connected devices and to the corresponding ear device to make a left and right pair. The architecture allows for each ear device to process its local audio and create an output audio stream. The flexible ear computer architecture allows a direct audio path from the microphones to the communications link to reduce latency. The raw audio signals are sent to the other ear device using low latency audio encoding (720A). This is received at the other ear and decoded (726B) to reconstruct the audio samples for processing along with the locally captured audio signals (708B).

Binaural processing system architecture—dual platform with timestamps: The audio stream is regularly timestamped so that the receiving ear device can link the received encoded audio data to the audio data it is capturing locally. In addition to the raw audio information, analytic information is calculated for local processing and this too is shared with the other ear device. The metrics could include the location of the dominant sound that has been detected, the frequency bins that include the highest energy, the amount of noise that is present, the amount of signal processing load that is being performed, battery level, sensors data and other information that the system has programmed to be useful at each ear device. The metrics may also include information about the processed output audio stream for that ear device and the filtering or neural network configurations and coefficients that were used to achieve it. The metrics are passed to the other device with suitable data tags to identify the data, timestamps and unpacking information.

Binaural processing system architecture—dual platform with additional external components and functions: The metrics may also include information related to other peripheral components in the system, such as an active noise cancellation chip configuration or a Bluetooth radio chip. This could be information such as the active noise cancellation chip has gone to sleep to save power. The metrics may also be used to notify the other ear device if the local Bluetooth radio is suffering with a bad connection and is missing packets of data from an audio source device.

Binaural processing system architecture—dual platform with inconsistency handling: In some scenarios the processing at one ear has entered a mode or condition which may cause inconsistency between the left and right ears and so the other ear device needs to be notified. For example, if a component or processor in one ear stops processing or goes to sleep, this may cause an imbalance in the audio processing. Similarly if the Bluetooth radio in one device is having difficulties with its connection this may also cause inconsistency in information at each ear. In this scenario, the ear device that is suffering with poor performance may request the other ear device to provide data or other information to assist with the situation. Each ear device may be notified of the current status and conditions of the ear other ear device to maintain consistency in the user experience.

Binaural processing system architecture—dual platform with inconsistency drifting: In some scenarios a binaural cue mismatch can be caused by independent processing at each ear. For example, the processing at the left ear may detect that additional level control and noise reduction is needed. This can cause additional plugins and signal processing components to be activated that introduce additional latency, amplitude modifications and spectral coloring of the audio at the left ear. If this is instantiated without passing information to the right ear, there will potentially be a significant mismatch in binaural cues between the left and right ears. Increases in latency between the left and right ears can give the perception of the sound moving to one side, compared to where it is actually located. Increases in amplitude difference between the left and right ears can also give the perception of the sound moving to one side and being closer to the ear where the sound is now louder. Spectral inconsistencies between the left and right ear can be perceived as making the sound less natural and synthetic. It is therefore important that processing information is shared between the two ears such that binaural cues are maintained, remain consistent and are compensated for when needed. This can be implement using data processing matching at each ear to maintain the same signal paths and processing delays. This can also be implemented as a compensation plugin that receives information from the other ear regarding the processing is has applied and then takes information that describes the processing that has been applied for the local ear and then adjust accordingly. A compensation plugin can be placed in each of the systems to ensure the binaural cues are consistent. This can be extended to multiple devices in a network to ensure that the processing at a node is compensated for at other nodes. For example, if wireless speakers are located in rooms around a house, processing at one loudspeaker should be replicated or compensated for across the other speakers that are linked to the first.

Binaural processing system architecture—dual platform with calibration data sharing: The metrics may also include calibration information for the ear device, such as the frequency and amplitude and phase profiles of the microphones and speakers at each ear, which are shared between the ear devices.

Binaural processing system architecture—dual platform communications link: As shown in the figures, the ear pieces (left ear piece 714 and right ear piece 716) may pass data (e.g., encoded audio streams) between each other. The audio data may be encoded using very low latency processes, such as adaptive differential pulse code modulation (ADPCM). The data passed between the two ear pieces may include, but is not limited to, audio metrics, such as interaural intensity difference (IID) data and/or interaural time difference (ITD) data, or spectral information. The spectral information may be less sensitive to ultra-low latency. In some configurations, the data can be sensor information such as health information for example, heart rate, temperature, sound exposure level. In some embodiments, the latency may not be low enough to send processed audio to each ear piece, and instead, the auditory cues or other analytical data may be used to determine the type of processing to be performed at each ear piece.

The data streams may be processed using a DSP 702. The DSP 702 may include a left data preparation 704 and left audio preparation 706 for the left ear piece 714. The DSP 702 may also include a right data preparation 710 and right audio preparation 712 for the right ear piece 716. In some embodiments, the DSP 702 may be a single DSP used for processing audio data for both left and right ear pieces 714 and 716, respectively, as shown in FIG. 7A. The DSP 702 may include a binaural processor 705.

In some embodiments, as shown in FIG. 7B, the data streams for the left and right ear pieces 714 and 716, respectively, may be processed using separate DSPs 702A and 702B, respectively. A first DSP 702A may include left data preparation 704, left audio preparation 706, and binaural processor 708A. The first DSP 702A may also include connectivity 718A. Connectivity 718A may include low audio encode 720A, low latency metrics encode 722A, low latency metrics decode 724A, and low latency audio decode 726A. The second DSP702B has preparation 710, right audio preparation 712, binaural processor 708B, connectivity 718B (including low latency audio encode 720B, low latency metrics encode 722B, low latency metrics decode 724B, and low latency audio decode 726B). In some embodiments, the data passed between the ear buds is less sensitive to latency and can be timestamped to ensure each ear bud can link the data to the corresponding time block of audio processing. The data transfers can be symmetrical, for example, all the sensor and audio information collected at the right ear may be duplicated at the left ear. The data at each ear may be transferred to the other ear device to ensure that each ear processor has the same information to analyze and process. Alternatively, the data transfers can be asymmetrical, for example, the user's temperature is captured at the left ear and the heart rate at the right ear. The different data are then sent to the other ear device for further analysis and processing.

Figure 7C:
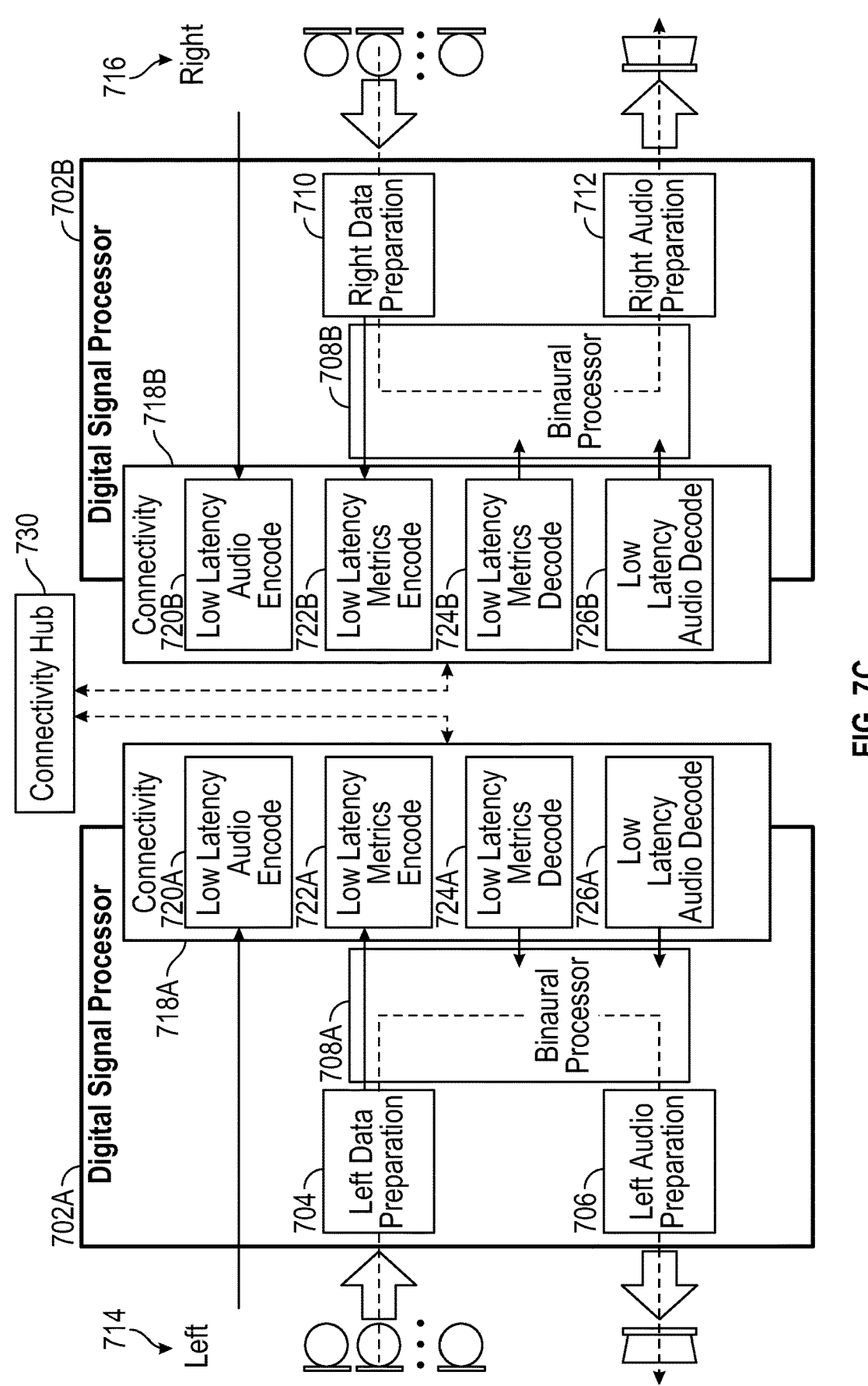
FIG. 7C illustrates an exemplary connectivity configuration including a connectivity hub, according to some embodiments of the disclosure.

Binaural processing system architecture—central hub: FIG. 7C illustrates an exemplary connectivity configuration including a connectivity hub 730. The connectivity hub 730 may analyze the audio data and metric data, then redistribute them. The connectivity hub configuration may introduce latency, but may be suitable for certain types of connections, such as wired connections.

In some embodiments, the audio system may include two DSPs, one for each ear piece, to perform dual binaural signal processing. In some embodiments, a first DSP is performing audio data stream processing for a second ear piece while directly receiving audio data for the first ear piece. The second DSP may be doing the same, but for the other ear piece (e.g., performing audio data stream processing for the first ear piece, while directly receiving audio data for the second ear piece). The audio system may include a cable that couples the two DSPs together and allows the two DSPs to transmit the respective microphone signals to each other. For example, the audio system may be a dual hearing assistance device with a neck band. In some embodiments, the audio OS may be programmed to allow data streams to be received from different sources. The different sources may be in addition to or an alternative from microphones and speakers. Data may be from an alternative data connection (e.g., wired or wireless). The data may be encoded and frame based, for example. In some embodiments, the data streams may include timestamp information to be used by a signal processor. Algorithms that use binaural data may perform regardless of the source of information and/or the type of connectivity used. In some embodiments, the system may receive additional audio data streams from a remote microphone, sent to the ear buds.

In some embodiments, a DSP may split processes into sub-processes, which may be referred to as micro DSP processing. Micro DSP processing may include reducing the physical size of the DSP area to form micro (e.g., tiny) DSPs. The layout of the silicon may be optimized by reducing one or more features, such as processor size by only using the DSP instructions that are essential, memory footprint, number of I/O for a specific application, and the like. The micro DSPs may be placed very close to, next to, or on top of other existing processors components in a product (e.g., main application processor, microphones, speakers, sensors, etc.). In some embodiments, the microD- SPs are different in that each one has a fixed predetermined function. The microDSPs are fully programmable and can be used to offload the main processing core when resources are unavailable, or if timing requirements are not being hit, such as low latency, or background tasks are not getting serviced frequently enough, such as checking sensor data. In some embodiments, a microDSP may perform specific processing tasks. Each microDSP may have its own processing memory in addition to sharing memory with other processors in the system.

In some embodiments, a microDSP may be identical to a main processor. For example, the microDSP may have the same core and same instructions as the main processor. When additional applications are run, the entire application or plugin may be offloaded to the microDSP.

In some embodiments, a microDSP may have reduced code or reduced instructions. The processor may have a master set of instructions while the microDSP may have a smaller set of instructions. The instructions for each microDSP may be selected to fit certain one or more processing tasks. For example, a microDSP may have instructions for multiplications, additions, or other data processing tasks. In some embodiments, there may be one or more tasks that a processor may perform, but a microDSP may not. For example, a neural network accelerator may be present in the main processor, but not a microDSP. In some configurations, the microDSP may have an instruction set that is completely different to the main processor. In some configurations, the microDSP may be owned by a specific manufacturer or plugin developer and contains their proprietary instructions that are only accessible by their plugins.

The operating system may know which instructions are present on and the types of operations available on each microDSP. For example, when a second application is run in parallel, the processing engine in the main processor may match code in the second application to various microDSPs to offload the processing from the main processor to the microDSPs so that processing tasks for the parallel application may be performed. In some embodiments, the offloading of the processing can be assigned to a plurality of microDSPs, which may receive smaller portions of the application. The processing may be transferred to different microDSPs for different forms of processing. The transferring of code to certain microDSPs may be based on, for example, a lookup table of instructions executable at each microDSP. In some embodiments, after the code is transferred to the plurality of microDSPs, the main processor may still be performing tasks (from a task list), while some tasks are offloaded to the microDSPs.

In some embodiments, a microDSP processing core may be dedicated to signal analysis, system analysis, and data analysis functions. Its function is based on monitoring the system and providing metrics to other components of the system including to other connected devices that may be used to inform the user.

In some embodiments, a microDSP processing core may be dedicated to real time debugging of the platform. This allows specific debug operations to be implement within the silicon without adding code, functions, operations that can disrupt the real time nature of the signal processing system and the interaction of the components and plugins within the system. The debugging processing can also run independently of the operating system to monitor activities, resource loading, node lists, memory usage, data interfaces, data flows, power consumption etc. This allows data to be "sniffed" before and after other components in the system have accessed it. This also allows the chip to hit customized breakpoints, such as pause the processors when power consumption hits a level of X. Alternatively, the system can be paused if an operation causes a particular event to occur, such as when head tracking has been classified as a particular type of movement.

The management of the allocation of processing to a microDSP core can be set up at different development levels, either by the developer when the system is being created, the manufacturer based on the target platform, the OS at runtime. The access to microDSP can also be a protected hardware feature that is only enabled when a user purchases a specific key code from the manufacturer to "add more processing" to the system. Similarly the user can purchase more memory with a key code that then allows more of the internal memory space to be allocated.

In some embodiments a microDSP may be designed to manage and process quaternion data to assist with the interpretation and manipulation of sound source positions. This is applicable to real ambient sound analysis and rendering of virtual sound sources or respatialized ambient sound sources. The quaternion data format is an efficient representation of locations in 3D space. The format also allows for efficient mathematical operations to manipulate the information representing a location. For systems that involve spatial audio capture, spatial audio processing and spatial audio rendering, a processing engine that is designed to provide these mathematical operations as software libraries or hardware macros in silicon will enable low latency and efficient compute of the spatial scene. Motion tracking sensors, such as inertial measurement units can provide motion information that may need to be converted into quaternion format for further processing. Efficient interpolation of locations using, for example SLERP (spherical linear interpolation) is a more accurate method of determining a specific location when two or more points are known. Further to this, path tracking can be implemented using techniques such as SQUAD (spherical and quadrangle) to map across multiple rotations. An embedded processing system can ensure quaternion data remains stable, accurate and represents the spatial scene in a meaningful format. Many of the mathematical operations that are needed involve complex numbers and standard functions such as sin, cos, exponent and log. However, these can be extended to process multiple input data values as single operations, reducing complexity of implementation. Further, most of the complexity of the data format manipulation and calculations can be hidden through software APIs. For example, place sound source A, in the middle of sound source B and sound source C. Another example could be move sound source A from location X to location Y over the next 30 seconds. Another example could be an inverse movement calculation to compensate for head movements that would update a rendering engine to ensure a sound source is spatialized to single stable location for a listener. In some examples, the data processing can be extended to a matrix implementation to calculate complex operations in parallel.

In some embodiments, quaternion data may need to be streamed into the processing component. This may be from a separate component or device, such as a dedicated headband, or other wearable device. This may be from a sensor connected to the processing component using an industry standard interface. The data stream may contain raw sensor data, or reformatted data to assist with the later processing. The data stream may contain multiple sensor information, such as from one or more accelerometers or one or more gyroscopes or a magnetometer. The data stream can be handled in a similar method to audio data streams in that it may be providing continuous, low latency, time critical data on a regular interval. The data may include timestamps to assist with alignment with the signal processing for other data streams in the system.

In some embodiments the quaternion data, or other motion related data, may be processed to determine a quantized version of the information. The quantization resolution may be used to determine whether tiny movements of the device provide any useful information. For example, if the sensor is detecting small head movements this may not be useful for determining large scale motion for neural network based categorization, such as whether the wearable device has detected that the user is running, walking or riding a bicycle. For some examples, the quantization resolution by much finer to ensure smaller movements are detected, such as when the user's head is moving when audio sound sources are being rendered. For some examples, it may be determined that the new motion data that has been received is similar enough to the previous data that is tagged as no movement change. This can be used to prevent additional and unnecessary downstream motion based processing being executed.

In some embodiments, the motion data can be gathered from multiple devices and collected in a single hub device to confirm that a specific motion has been detected before redistributing the motion information to other components in the system for further processing. This can be useful if the motion information from one device does not match other motion information that has been collected. For example, if the user drops an ear device, while the other ear device is still located in their ear, this could cause incorrect motion and spatialization information being used in the system, if the sensor is only located in the device that has been dropped.

In some embodiments, the motion data along with other sensor data can be used to determine which ear the device has been placed into. This can be used to ensure spatial rendering and other signal processing is correctly applied to each ear. Plugins can even be swapped between left and right ears with the associated data and parameters and configurations if the user has placed the devices into different ears. Alternatively, the user can be notified that they should switch the devices over to ensure the correct data and hearing profiles are used accordingly. The sensors can also determine how the device has been placed on or in the ear. The orientation of the device may be slightly different to other times the device has been worn. This can change the position of microphones and other components in the device that may need to be compensated for.

In some embodiments, one or more parts of the signal processing may be extracted out as a separate processor and used within a larger system as an independent processing core with limited, but specific functionality (e.g., NN engine, filter bank, mixing, etc.) Extracting out part(s) of signal processor may allow individual functions and DSP instructions to be programmed. The master processing core of the chip can use these micro DSPs in parallel to other processing that the system may utilize.

Figure 8A:
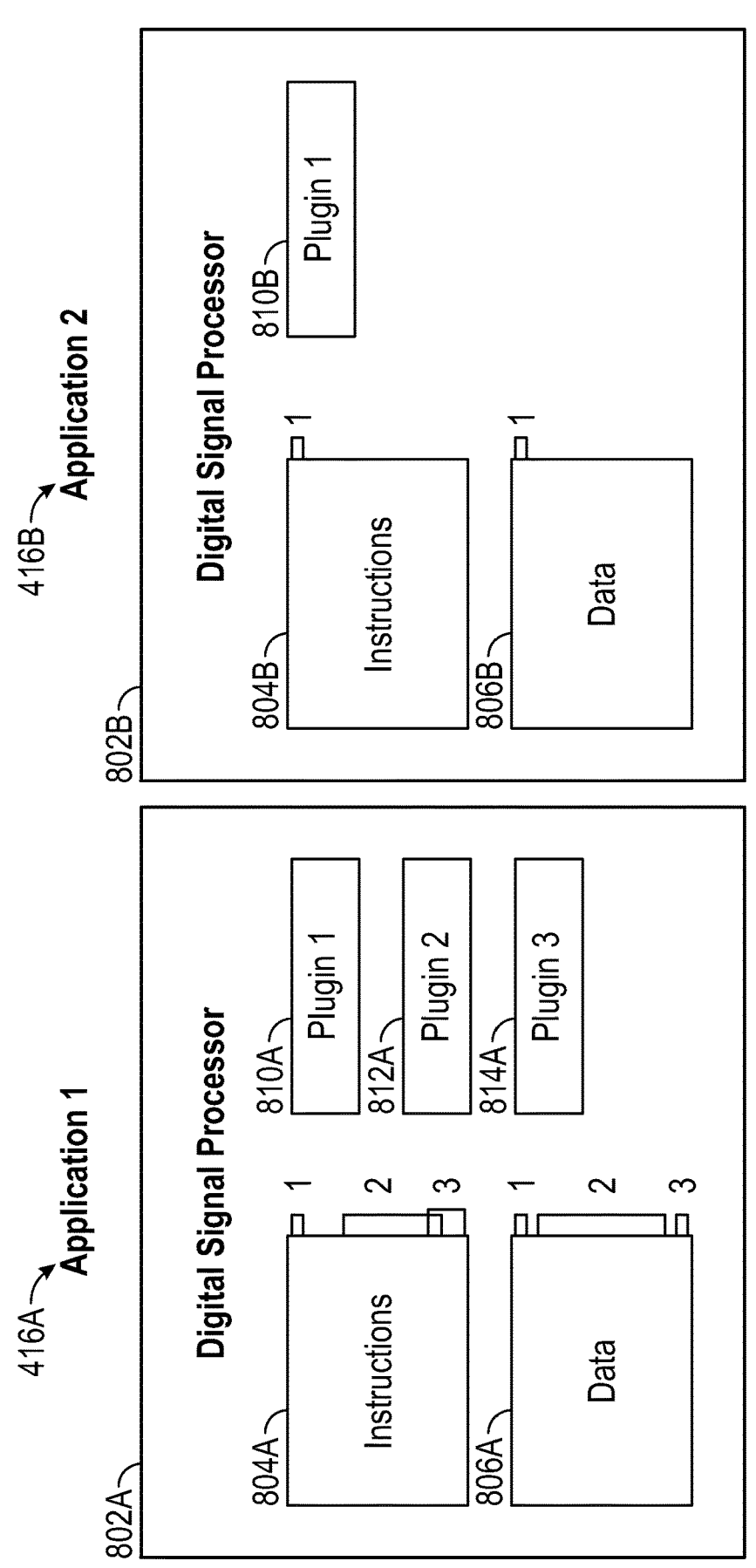
FIG. 8A illustrates an exemplary system including a plurality of digital signal processors for a plurality of applications, according to some embodiments of the disclosure.

As shown in FIG. 8A, the system may include a plurality of digital signal processors 802A and 802B for a plurality of applications 416A and 416B, respectively. Each digital signal processor may have instructions (e.g., instructions 804A and 804B), data (e.g., data 806A and 806B), and plugins (e.g., plugin 1 810A, plugin 2 812A, plugin 3 814A, and plugin 1 810B). Some applications may bypass the main processing engine, large memories, etc. to reduce power consumption. Some plugins may use different parts of the DSP instruction set and memory bank. For example, a first plugin 810A may only use a small part, but the entire digital signal processor 802A may be activated. This may cause the first plugin 810A to always be on, which may increase the system resources. In some embodiments, other plugins, such as plugin 2 812A, plugin 3 814A may be off. Additionally or alternatively, the digital signal processor 802A may not be using instruction 804A or data 806A.

Figure 8B:
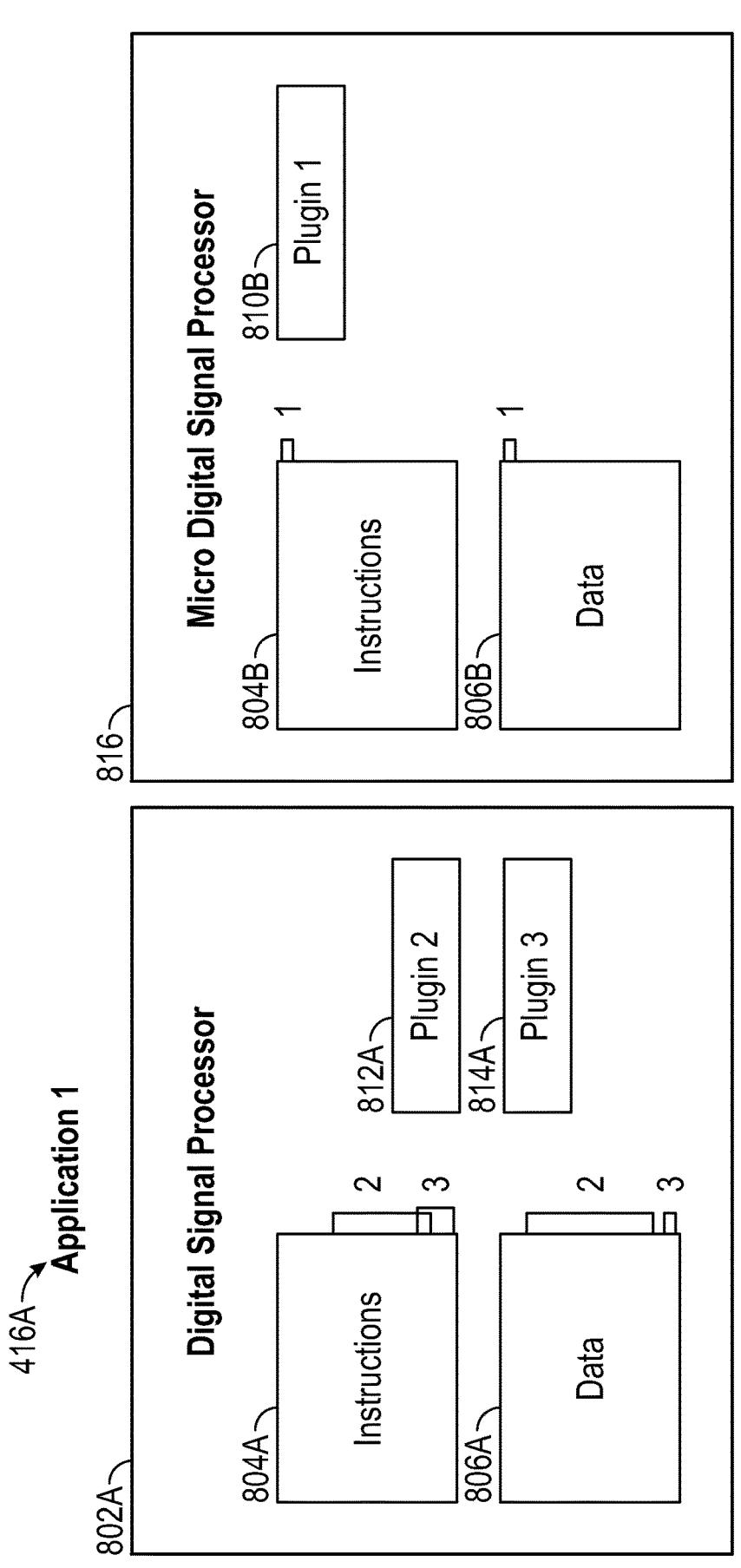
FIG. 8B illustrates an exemplary configuration where a first plugin is relocated to a separate, tiny micro DSP and memory bank, according to some embodiments of the disclosure.

FIG. 8B illustrates an exemplary configuration where a first plugin is relocated to a separate, tiny micro DSP 816 and memory bank, according to some embodiments of the disclosure. Configuring the first plugin 810B to be implemented by the micro DSP 816, instead of the DSP 802A, may reduce the system overhead and power consumption. For example, the first plugin 810B may be an always-on plugin, a NN waiting for a specific trigger word, and thus, it is always listening. The micro DSP architecture shown in the figure may use less power. The always-on plugin 810B may detect the trigger word and then interrupt the main DSP 802A to activate other plugins, such as the second plugin 812A and the third plugin 814A. An extension of this configuration allows the multiple processing cores in the system to run at different clock rates. For example, the main processor may be in sleep mode will other micro DSP components are busy actively processing data between the interfaces of the platform. The system can be programmed to allow different clock rates across the system.

A DSP may be programmed to split a process for a NN having a first number of coefficients into sub-processes, each having one or more second smaller numbers of coefficients, in some instances. For example, instead of processing using 16-bit coefficients, the DSP uses 4-bit or 8-bit coefficients at a given time, thereby saving space in hardware 402. In such instances, external tools and the simulation software may similarly be adjusted to handle the split processing. Additional layers of processing nodes in the NN may be added. Furthermore, the NN may be programmed with nodes that are "NULL" and do not need to be processed, saving processing resources and memory.

Exemplary Chip

Figure 9A:
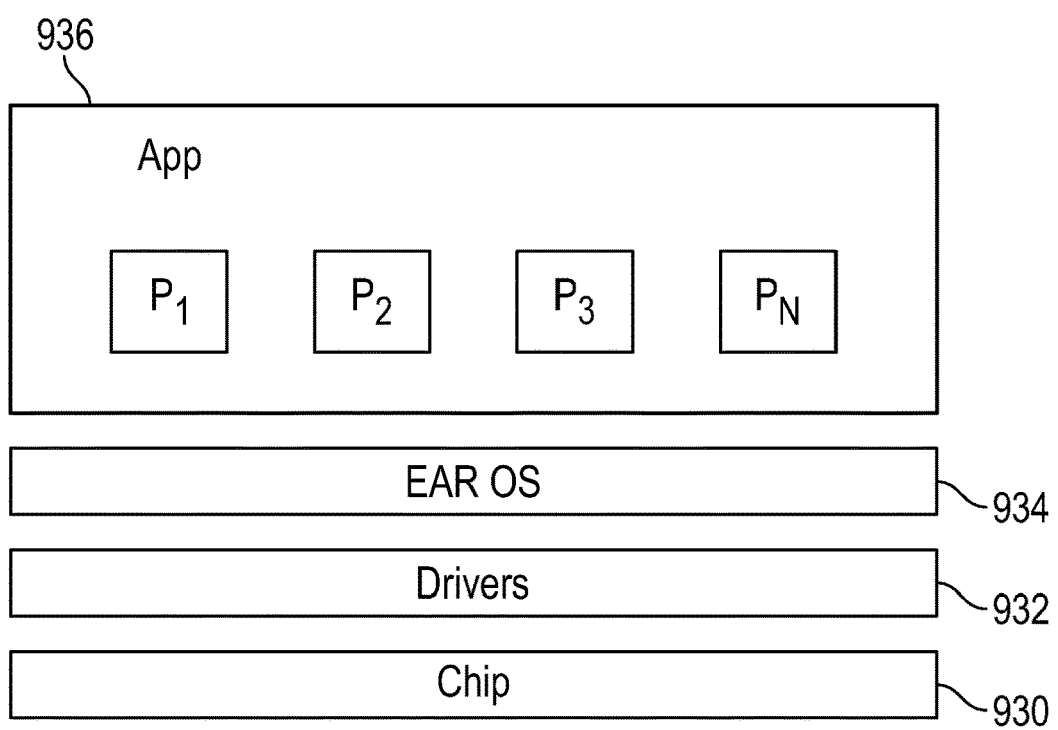
FIG. 9A illustrates an exemplary audio system stack including a chip, drivers, an OS, and applications that may include one or more sub-applications, according to some embodiments of the disclosure.

FIG. 9A shows an exemplary audio system stack including a chip 930, drivers 932, an OS 934, and applications 936 that may include one or more sub-applications. For efficient data processing, certain processing functionalities may be implemented in the silicon chip, while other processing functionalities are accessible in the OS and implemented via drivers and extensions of the chip.

Typical auditory systems often use generic off-the-shelf processors and operating systems, which may be poorly integrated, leading to more resource-intensive processing of audio data. A more specialized division of processing resources and improved integration between the hardware (e.g., the silicon chip) and software (e.g., the OS and the like) may permit more efficient processing of data, e.g., the processing of audio data for auditory applications.

Typical auditory systems may also handle all processing tasks on a single core process. For instance, a silicon chip may include a core processor programmed with a full set of instructions for handling all data processing operations of the audio system, including, e.g., managing the transfer and processing of data streams received at the various I/O interfaces of the audio system, matching rates of the data streams, correcting lost data in the data streams, improving reliability of the data streams, or managing latencies in the data streams. However, handling all data processing operations at a single core process may use memory and processing resources that may be limited due to design constraints of the audio system.

A more efficient chip for an audio system may conduct some or all of these data processing operations in an audio subsystem separate from the core processor. Removing some or all of the data processing operations to an audio subsystem layer allows for more efficient data processing, as repeatedly-run "housekeeping tasks" (e.g., rate-matching, lost data repair, latency correction, filtering, and other processing tasks) may be removed from the main processing core and into dedicated DSPs or hardware macros in the audio subsystem. Handling data processing operations at DSPs within an audio subsystem layer may result in off-loading resources from the main processing core, result in a smaller audio system design. Such configurations may be particularly advantageous for space-limited devices that may use advanced data processing of complicated data streams, like ear pieces for dynamically processing audio signals. In some embodiments, the plurality of processors is programmed to perform dedicated functions, the dedicated functions being different from the one or more functions of the main processor.

An extension to the audio sub-system for handling audio data streams and data transfers, would be to handle other types of data streams, such as video data from a camera, heart rate information from a PPG sensor, motion information from an inertial measurement unit sensor, as some examples. The prepared data streams can be formatted for immediate feature extraction and processing by neural networks. In some implementations the feature extraction may be combined with the data streaming operations, such as using an FFT.

Figure 9B:
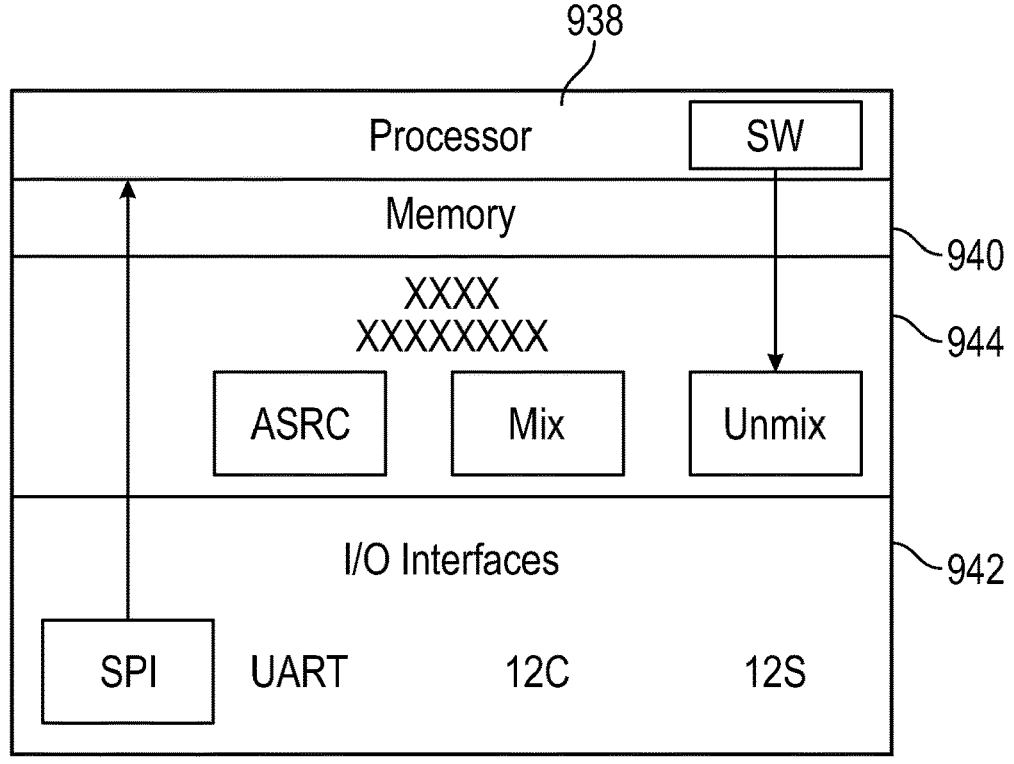
FIG. 9B illustrates a block diagram of an exemplary silicon chip architecture for implementing one or more processes, according to some embodiments of the disclosure.

FIG. 9B illustrates a block diagram of an exemplary silicon chip architecture for implementing one or more processes, such as processing of data streams (e.g., audio data streams, sensor data streams, and other data streams received through I/O interfaces) at an audio subsystem. The silicon chip includes a main processing core 938 having a memory 940, one or more I/O interfaces 942, and a separate silicon layer dedicated to an audio subsystem 944 that includes an audio bus for transmitting data streams throughout the chip (e.g., a multi-rate router) and specialized data processing components, such as one or more DSPs or microDSPs, programmed for handling particular data processing tasks.

In some embodiments, the main processing core 938 includes memory 940 and one or more processing cores for processing data streams. In some embodiments, the main processing core is an ARM processor or a RISC-V processor or other industry standard processing cores, or a custom processor, or a combination of these. The memory of the main processing core may be programmed to store data streams, and may include executable instructions for processing data streams or defining the processing function of other components of the audio system. In some embodiments, the main processing core includes security features designed to protect data streams or memory of the processing core.

The one or more interfaces may include standard interfaces for receiving data streams, such as industry-standard UART, SPI, I2C, I2S, USB and other interfaces. During operation of the chip, data streams may be received through the I/O interfaces from a variety of sources. For instance, data streams may include audio data streams received from a microphone (e.g., audio data streams corresponding to an auditory scene in an environment of the user), audio data streams received from external devices (e.g., streamed music transmitted to the audio system from an external device), sensor data provided by one or more sensors of the audio system (e.g., a motion sensor), or other data received by the audio system for processing.

Direct connections are provided between the one or more I/O interfaces, the core processor, and the audio subsystem for communicating data received at the interfaces to the core processor and/or the audio subsystem for data processing and storage. In some embodiments the chip provides multi-channel connections between the I/O interfaces, the memory, and the core processor with the capability of transmitting and processing multiple data streams in parallel.

The system processor may receive data streams at multiple audio I/O interfaces in parallel and transmit the data for processing/storage at one or more processors of the chip (e.g., the core processor and one or more further DSPs or microDSPs of the audio subsystem). Data streams may be input data streams received through one or more I/O interfaces at a plurality of data sample rates, for instance, a microphone operating at a first data sample rate, a Bluetooth interface operating at a second data sample rate, and a head tracker operating at a third data sample rate. When data streams are received at I/O interfaces at a plurality of data sample rates, components of the chip (such as a decimator or interpolator) may be programmed to process and transmit the data streams at any combination of the received data sample rates. In addition, the components of the chip may be programmed to process and transmit the data streams at any combination of new data sample rates as required by subsequent processing components in the system. In other examples, when data streams are received at the I/O interfaces at a plurality of data sample rates, the components of the chip (and/or I/O interfaces) may convert the various data streams to a single data sample rate for processing and transmission to the other components of the chip.

As shown in FIG. 9B, the audio subsystem layer may include one or more processors (e.g., DSPs or microDSPs) programmed to a desired data processing operation on a data stream. Each of the one or more processors includes a processor, a memory, and instructions for performing the desired data processing operations. Data processing operations may be defined by the computer-readable instructions in memory that can be executed to perform the desired processing operation on a data stream. The audio subsystem of a chip may, for instance, include components programmed for modifying a sample rate of one or more data streams (e.g., via an automatic sample rate converter (ASRC)), mixing at least two data streams (e.g., via a digital mixer), unmixing or separation of one or more data streams, low latency processing of one or more data streams, binaural processing of one or more data streams, NN processing of one or more data streams, dynamic transferring one or more data streams within the chip, or provide other specialized or customized data processing functionalities. Certain tasks of the audio subsystem may include pre-processing tasks programmed to be performed on input data streams received directly from the I/O interfaces (e.g., mixing, sample rate conversion, etc.) before the data streams are transmitted to the core processor. Other tasks of the audio subsystem may include receiving one or more output data streams from the main processor, performing processing tasks programmed to be performed on the output data streams immediately prior to the data streams' output via the I/O interfaces (e.g., unmixing, sample rate conversion, etc.) and transmitting the processed output data streams to the one or more I/O interfaces (and/or one or more peripheral components). The audio subsystem and other processing components in the silicon can be controlled and configured and managed by the operating system.

In some embodiments, one or more programmable processors could be included in the audio subsystem. The programmable processor(s) may be programmed for performing a customized processing operation on a data stream, e.g., an operation defined by instructions on the component that may be programmed by a manufacturer or a user of the device. In some embodiments, users or manufacturers of audio systems, applications, and/or associated devices may specify customized processing operations to be included in instructions of the programmable processor (e.g., such that the programmable processor is specifically programmed for handling manufacturer-defined tasks, such as common processing tasks or tasks associated with a particular application). Additionally or alternatively, the programmable processor could be programmed dynamically by importing instructions onto a memory of the programmable component to change the processing functions of the component in real-time, e.g., to suit the desired processing needs of a particular listening environment or an application being run by the audio system. Instructions may be introduced onto such a programmable component by, for instance, sending a text message programmed to introduce the instructions to the component, downloading a manufacturer plug in programmed to introduce the instructions to the component, or by selecting a particular programming function via a user interface of the operating system.

In some implementations, the operating system running on the main processing core, or another core in the system, may determine that particular tasks can run on processing resources available in the audio sub system and transfer those tasks to a different hardware component on the chip. This has an additional advantage of allowing the improvements from the signal processing to applied earlier, or later in the signal chain such that other modules in the system can benefit from this, and reduce duplication of similar tasks by multiple plugins. For example, if a data stream requires packet loss recovery this would be helpful if applied before the data is distributed to plugins so that all plugins can benefit.

The transfer manager may maintain a queue or time ordered list of nodes. In some embodiments, the operating system on the main processor may try to keep the queue full such that the nodes are continuously run without gaps in between. In some embodiments, if the transfer manager identifies one or more are gaps (time deltas between nodes) in the queue, the transfer manager may cause the main processor to enter a sleep mode in response. The transfer manager may send a wake up node to the main processor before the next node that uses the main processor. The transfer manager may also go to sleep while it is waiting for the next data transfer node to be processed.

Exemplary Audio Bus

Figure 9C:
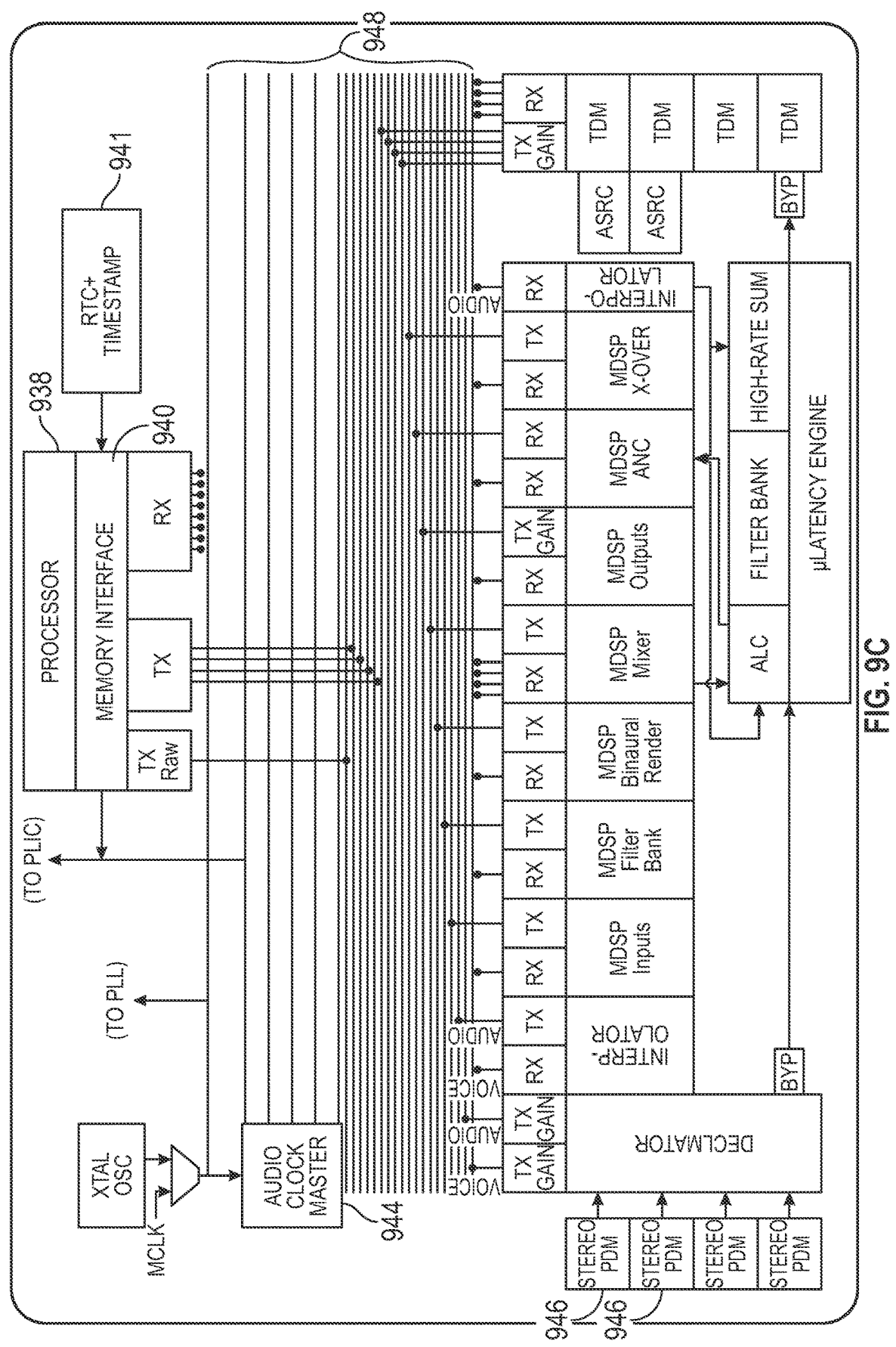
FIG. 9C shows another exemplary chip architecture having a plurality of processors in an audio subsystem layer for offloading certain processing tasks from the main processor, according to some embodiments of the disclosure.

FIG. 9C shows another exemplary chip architecture having a plurality of processors in an audio subsystem layer for offloading certain processing tasks from the main processor. The silicon chip includes a main processor 938 having a memory interface 940, a clock 944, one or more stereo pulse density modulations (PDMs) 946, one or more processors (e.g., DSPs or microDSPs) for processing data in an audio subsystem, and an audio bus 948 programmed to provide connections for communicating data streams. The silicon chip may also include a real-time clock (RTC) and time-stamp 941.

The audio bus 948 provides a plurality of channels for transmitting data streams between the audio subsystem, one or more audio I/O interfaces, the main processor, and other hardware of the audio system. In some embodiments, the audio bus is a multi-rate router or a specialized addressable ping-pong buffer programmed for dynamically transmitting multiple data streams. Channels of the audio bus may transmit data streams independently from one another, such that each channel of the audio bus may simultaneously transmit data streams having a different properties (data source(s), data destination(s), data sample rate, etc.). The audio bus may be programmed with one-to-many (1-to-n) and many-to-one (n-to-1) topology, such that data transferred into the audio bus from a single data source may be transmitted to multiple destinations within the audio subsystem. Similarly, one or more data streams (e.g., one or more data streams from the I/O interfaces or one or more of processed data streams from the audio subsystem), may be mixed into a single data stream for further data processing and transmission by the audio subsystem.

Data in the audio subsystem may be transmitted and processed at a variety of data sample rates. In some embodiments, each channel of the audio bus may transfer data at a specified data sample rate, for instance, an 8 kHz, 16 kHz, 32 kHz, 48 kHz, 96 kHz or 192 kHz sample rate. Additionally or alternatively, the properties (such as data sample rate of the channels of the audio bus) may be dynamically configurable (in real-time) in order to transfer data streams at any desired sample rate, e.g., at a sample rate of a data stream, at a sample rate of a processor or the main processing core, or at some other sample rate specified by a user, manufacturer, component, or application of the audio system. For instance, voice data streams may be processed and transmitted at, e.g., a 8 kHz, 16 kHz, or 24 kHz sample rate, while audio data streams are processed and transmitted at, e.g., a 32 kHz, 48 kHz, 96 kHz or 192 kHz sample rate, while ANC data streams are processed and transmitted at, e.g., 192 kHz, 384 kHz, or 768 kHz sample rates. Incoming or outgoing data streams having non-native sample rates may be passed through an ASRC component of the audio subsystem to convert their sample rate to a native sample rate (e.g., any of the sample rates specified above).

In some embodiments, certain data paths and processing parameters of the audio subsystem may be predetermined, e.g., fabricated into the silicon chip. Additionally or alternatively, certain aspects of the processing and transmission of data streams within the audio subsystem may be programmed dynamically, such that they may be determined and modified during operation of the audio system. For instance, the source and destination of data streams into, within, and out of the audio subsystem; the sample rate of data streams within the audio subsystem; data latencies of data streams within the audio subsystem; and other parameters may be determined and modified in real-time during data processing. Configuration of data transmission and processing within the audio system may be dynamically controlled by the operating system on the main processing core, a component of the audio subsystem, the OS, or by an application or device associated with the audio system, such that data transfers and specialized processing within the audio subsystem may be initiated in a device-specific, application-specific, and sub-application-specific manner.

Each channel of the multi-channel audio bus may have an associated priority, such that data transfers through certain channels of the audio bus may occur more quickly or are prioritized first relative to data transfer transfers through other channels of the audio bus. For instance, the multi-channel audio bus could include a plurality of channels, each channel having a sequential priority (e.g., a first channel having a first priority, a second channel having a second priority, a third channel having a third priority, etc.).

Exemplary Transfer Manager

In some embodiments, the audio subsystem includes a processor programmed to manage the transmission of data streams through the multi-channel audio bus. A transfer manager 950 uses digital logic to receive apps, order, prioritize requests from apps (e.g., so that the requests can run with background apps), and/or initiate data transfer operations through the audio bus of the audio subsystem, e.g., data transfers between I/O interfaces and the main processor of the chip into and out of the audio subsystem. The transfer manager may also notify the main processor or other processors in the system when an error occurs that prevents data transfer. The operating system running on the main processor may alert the user by, e.g., playing a chime or sending a text message to an associated device. In operation, the transfer manager may continuously order and initiate the transmission of data streams between components of the audio system based on information associated with the data streams and information received from the main processor or other components associated with the audio system (e.g., applications run by the audio system or devices associated with the audio system). Offloading transfer management and ordering processes from the operating system on the main processor may save valuable processing resources that can be used for other processing tasks at the main processor. The audio subsystem may also be used for other non-audio data such as the transfer of code, audio files, parameters, configuration data, sensor data etc.

The transfer manager may transmit data streams via any number of the multiple channels of the audio bus to any desired destination within the chip. In some embodiments, the transfer manager may transmit one data stream via one or more channels of the audio bus to one or more destinations in the chip. The transfer manager may also transmit data streams at any desired data sample rate, for instance, any of the sample rates specified above in relation to the audio bus.

Figure 9D:
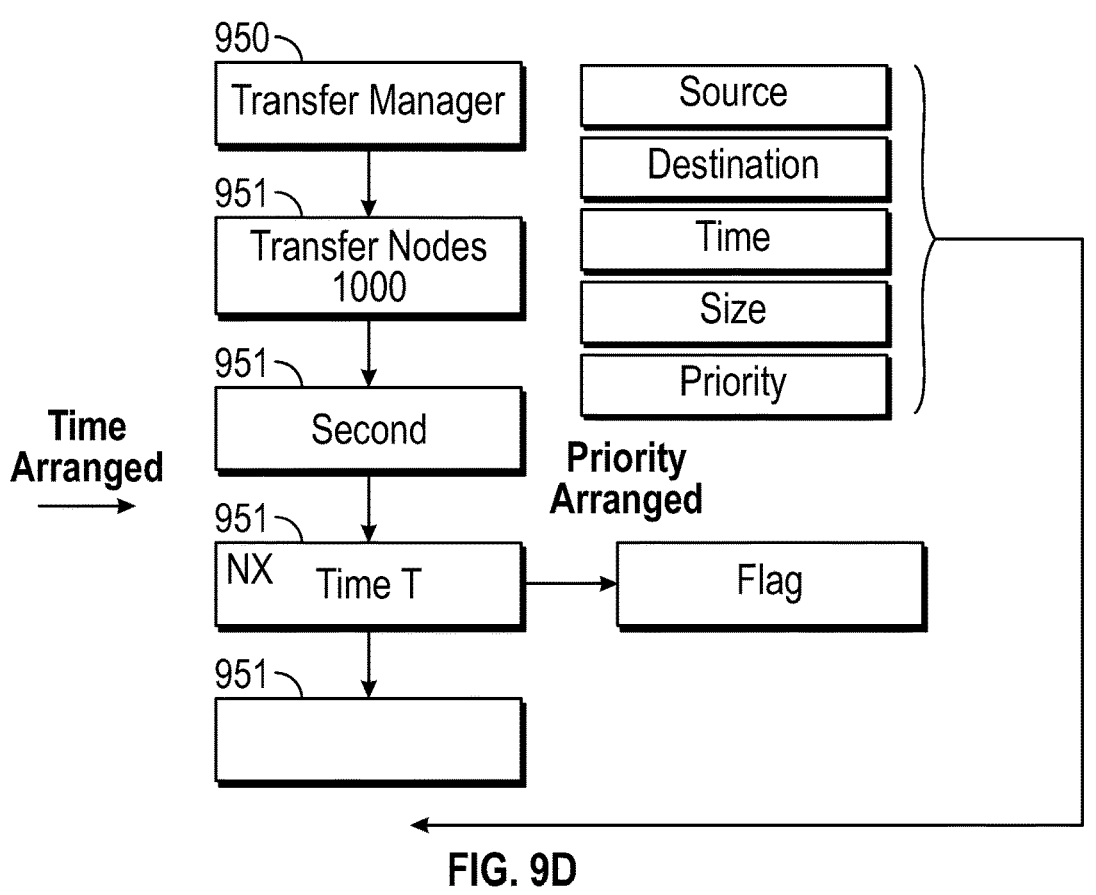
FIG. 9D illustrates the processing of transfer nodes by the transfer manager to initiate data transfers through the audio subsystem, according to some embodiments of the disclosure.

To initiate a data transfer (e.g., the transmission of a data stream) between a data source and a data destination, the main processing core transmits readable instructions to the transfer manager specifying information (e.g., a transfer node) relating to a particular transfer operation between components of the audio system. The transfer nodes may include various information relating to a desired data transfer, for instance, a source of data, a destination of data, a time of data, a size of data, or a priority of data. For example, a node 951 may be associated with a copy operation, where data is transferred from a source to a destination. The transfer manager may then process the transfer node to initiate a data transfer specified by the transfer node. FIG. 9D illustrates the processing of transfer nodes by the transfer manager to initiate data transfers through the audio subsystem.

Another example non-limiting operation associated with a node is a multiplier. In some embodiments, an operation can occur as part of the data transfer. For example, if a microphone is too quiet, the multiply operation may occur as part of the data transfer. In some embodiments, certain interfaces may use operations that are part of the data transfers; the transfer manager may handle these operations and data transfers, offloading the task from the main processor.

In operation, the transfer manager may generally initiate transfer operations sequentially, e.g., by processing transfer nodes in the order at which instructions specifying the transfer nodes are received by the transfer manager. However, in some embodiments, the transfer manager may initiate transfer operations based on, e.g., a priority, a size, a latency, a destination, or a source of a transfer node, to prioritize particular transfer operations based on the processing demands of the audio system. For instance, when two sets of instructions are received at the transfer manager at the same time specifying two different transfer nodes, the transfer manager may first process the transfer node having a relatively higher priority, and then process the transfer node having a relatively lower priority to initiate transfer operations in order of priority.

The transfer manager may, at times, initiate transfer nodes out of order, for instance, based on a priority of the data transfer operation. The transfer manager may determine a priority of a data transfer operation based on a specified priority of a transfer node received at the transfer manager, or based on other aspects of the data transfer operation (e.g., a size, a source, or a destination of the data transfer, or some other information). For instance, transfer nodes corresponding to manufacturer-defined processes (e.g., transfers of head tilt data from a head motion sensor, transfers of temperature data to determine whether the device is overheating) may be prioritized above transfer nodes corresponding to user-defined processes (e.g., data transfers initiated by an application run by a user of the audio system).

To initiate a higher priority data transfer operation, the transfer manager may route a data stream from a data source through a relatively higher priority channel of the multi-channel audio bus to a data destination.

The transfer manager may maintain a queue of nodes. In some embodiments, the operating system on the main processor may try to keep the queue full such that the nodes are continuously run without gaps in between. In some embodiments, if the transfer manager identifies one or more are gaps (time deltas between nodes) in the queue, the transfer manager may cause the main processor to enter a sleep mode in response. The transfer manager may send a wake up node to the main processor before the next node that uses the main processor. In some embodiments, nodes associated with recurring tasks may be reinserted into the queue after completion of a task. The transfer manager may reinsert the node without input from the main processor. The nodes may be organized in the queue based on priority. In some embodiments, lower priority nodes may be delayed and pushed further down in the queue. Exemplary lower priority nodes may include, but are not limited to, temperature sensor readings, alerts due to an incoming text message, etc.

The transfer manager may maintain a queue or time ordered list of nodes. In some embodiments, the operating system on the main processor may try to keep the queue full such that the nodes are continuously run without gaps in between. In some embodiments, if the transfer manager identifies one or more are gaps (time deltas between nodes) in the queue, the transfer manager may cause the main processor to enter a sleep mode in response. The transfer manager may send a wake up node to the main processor before the next node that uses the main processor. The transfer manager may also go to sleep while it is waiting for the next data transfer node to be processed.

In some embodiments, nodes associated with recurring tasks may be reinserted into the queue after completion of a task. The transfer manager may reinsert the node without input from the main processor. This provides a method for continuous data transfer without adding any overhead to other processors in the system or the operating system.

The nodes may be organized in the queue based on time and priority. In some embodiments, lower priority nodes may be delayed and pushed further down in the queue. Exemplary lower priority nodes may include, but are not limited to, temperature sensor readings, alerts due to an incoming text message, etc. Nodes are repositioned in the list based on time. The target processing time of a node can be changed such that it occurs later. This allows a process to be placed into a snooze condition such that it will be serviced later. The transfer manager may look ahead in the list of transfer nodes and identify a gap, by comparing adjacent transfer node times, where a node can be placed. This repositioning of a node in the list based on future work load will assist with spreading out low priority tasks and inserting them when high priority tasks are not being serviced.

The transfer nodes may be arranged such there are two or more lists of nodes. One list is for nodes that will be executed and is the active list being serviced. An additional list can contain nodes that will be processed when the main list has available space. The nodes from the second list will be transferred to the main processing list when a gap is identified, otherwise they remain on the second list. The second list can be transfer nodes that are for background tasks. This reduces the overhead of managing the nodes in the main list. The nodes can be moved from a first list to a second list. The nodes can be copied and duplicated from a first list into a second list The transfer nodes may contain a unique identifier to allow the node to be referenced and found by other modules in the system. Other modules may need to update and modify the information contained in the transfer node to adjust its operation when it is serviced.

The transfer nodes may contain additional performance metrics information, such as time taken for the associated data transfers to be completed, the amount of memory required, MIPS used, other resources used. The metrics will be updated to provide the transfer manager information for scheduling the node when it is next needed.

The main processor core may identify if data transfer operations are not occurring quick enough, e.g., nodes miss the designated time. The main processor core may associate nodes with processes and may send a message to a process node in the OS. The OS can control the transfer manager as needed based on other system operations and resources.

For example, plugin A can be notified if one or more of the data streams it requires is stalled, broken, corrupted or has other issues that prevent data being transferred for it to process or provides a gap for it to place its output data.

The transfer manager may initiate data transfers in response to any of a number of triggering events. In some embodiments, a data transfer from a data source may be initiated when the transfer manager determines that that data source is available to transmit the data stream. In another example, a data transfer to a data destination may be initiated if the transfer manager determines that space is available at the data destination. In some embodiments, particular applications may use data transfer at a particular time, e.g., at a time determined by a clock, at regular time intervals, or at some other time. For example, an external clock may be used and a predetermined amount of data may be transferred at predetermined times or time intervals. The transfer manager may also set itself a transfer requests based on previous transfers, for example to cause repeating data transfers Another example trigger event is an immediate request, such as a request received by Bluetooth to authenticate user data. The operating system on the main processor may communicate associated task information (e.g., an indication that information is needed from a source, where the information needs to be delivered, the time for delivery, the priority, etc.) to the transfer manager. The transfer manager may perform one or more functions, such as managing nodes, prioritizing nodes, creating the queue, etc., so that the main processor's resources can be used for other functions.

Another example trigger event is an immediate request, such as a request received by Bluetooth to authenticate user data. The operating system on the main processor may communicate associated task information (e.g., an indication that information is needed from a source, where the information needs to be delivered, the time for delivery, the priority, etc.) to the transfer manager.

The transfer manager may perform one or more functions, such as managing nodes, prioritizing nodes, creating the queue, etc., so that the main processor's resources can be used for other functions. The transfer manager may be running on a dedicated processor in a system, designed for handling data transfers and the logic required to support that, and may not have other processing functions and instructions, such as DSP operations, that other processing cores in the system are using.

The transfer manager may be required to execute some activation logic for a transfer node to determine whether it should be serviced or not. This may include a system function that is called and determines whether the activation parameter in the data transfer node is set or not. This may cause the transfer node to be reinserted into the list at a different location so that it is checked again at a different time.

The transfer manager may be required to execute some gating logic for a transfer node to determine whether it should pass the data to the destination or not. This may include a function that is called and determines whether the content of the data meets certain requirements. For example, that data may need to be above or below a predetermined or dynamically configured threshold parameter. In another example, the data may be passed through a neural network which classifies whether the content of the data is what the destination requires, such as valid heart rate information. In another example, the data may be passed through a filter or signal processing module to ensure that contains specific information such as a voice activity detector (VAD).

The transfer manager may be required to execute some muting logic for a transfer node to determine whether the data should be transferred as is defined by the transfer node, or whether the data should be replaced with a specific data pattern, data value or zero. This is a useful method for maintaining data throughput without passing corrupt, unexpected or bad data values through the rest of the system. The data replacement can be through a dynamically defined value as a parameter in the transfer node. That data replacement can also be through a simple gain control to apply a zero gain to the data values.

Another example trigger event can be caused by an external sensor, such as head movement, or user interface event, such as tapping the ear device, or microphone level event, such as reaching a certain level threshold, or voice trigger event, such as detecting a trigger word has been spoken.

Time information associated with the data transfer may be included in a data transfer node associated with the data transfer operation. For instance, a data transfer node may specify a particular time at which to transmit the data or a time at which the data should be received at a particular component of the audio system. The nodes may have associated priorities.

The transfer manager may initiate data transfers in response to a determination of the particular time on the clock, or calculate an execution time corresponding to the time that data transfer should be initiated in order to transmit a desired size or amount of data before the particular time on a clock. An interrupt may occur on the audio bus in between cycles, where the interrupt may be based on the execution time. In some embodiments, certain data transfer processes may occur at regular intervals (e.g., the transmission of data from a particular sensor at predetermined time intervals, or the transfer of a notification at a particular time set by a user of the audio system). In such cases, the data transfer manager may initiate data transfers at time intervals defined by transfer nodes associated with the data transfer process.

The transfer manager may initiate data transfers in response to a determination of the particular time on the clock, or calculate an execution time corresponding to the time that data transfer should be initiated in order to transmit a desired size or amount of data before the particular time on a clock. The transfer manager may calculate that a transfer node must start at a specific time in order to deliver the data at the time requested.

An interrupt may occur on the audio bus in between cycles, where the interrupt may be based on the execution time. For example, the transfer manager may determine that there is a significant gap in time until the next transfer node needs to be serviced. The transfer manager may then set its processor to go to sleep and set an interrupt to occur just before the next transfer node needs to be serviced to wake up the processor. The interrupt may also be caused by a request for a data transfer that needs immediate attention for a new transfer node to be added to the front of the list. The interrupt may also be caused by an external interface that has data available or requires data to be provided.

In some embodiments, certain data transfer processes may occur at regular intervals (e.g., the transmission of data from a particular sensor at predetermined time intervals, or the transfer of a notification at a particular time set by a user of the audio system). In such cases, the data transfer manager may initiate data transfers at time intervals defined by transfer nodes associated with the data transfer process. The regular intervals of data transfers may not result in continuous data. For example, a temperature monitoring plugin may request the transfer manager to provide temperature information once every hour, within a window of 4 minutes of the target time. The transfer manager can create a transfer node for the target times.

The transfer manager may be programmed to send a request to an external sensor to wake it up and start gathering data. For example, a temperature sensor may not need to be continuously active and is only required to be awake, fully powered and gathering data, when it is needed. The system may control the external sensors on a time or priority based need of the plugins and processing of the system. In addition, the sensors may have the capability be configured to provide data on a regular basis and will notify the system, for example with an interrupt, that data is available.

The transfer manager may be programmed to monitor the data streams and provide a status on each of them for other components in the system to request. For example, a plugin running on a DSP core may be waiting to start processing and requests a status indication for each of the input and output data streams it is using from the transfer manager or operating system. The status may be "waiting", "ready", "stalled", "streaming", or other indicators, provided as a numeric code to the plugin.

In some embodiments, the transfer manager may initiate a data transfer based on at least a size of the data. For instance, the audio bus may have a data transfer capacity (e.g., a maximum number of bits of data that may be transferred by the audio bus or a channel of the audio bus during a period of time). Additionally or alternatively, the transfer manager may have a data transfer capacity, e.g., a maximum data size or a maximum number of transfer nodes that may be processed by the transfer manager over a period of time. The data transfers can be programmed to be a single data value or entire blocks of information.

In some embodiments, the operating system running on the main processing core may provide feedback to the transfer manager. For instance, the operating system or hardware within the main processing core may determine that the transfer manager is overloaded, e.g., that data transfer operations are not occurring at the times specified by the transfer nodes, or that the transfer manager does not have capacity for processing of additional transfer nodes. Responsive to a determination that the transfer manager is overloaded, the operating system on the main processing core may transmit instructions that cause the transfer manager to cease certain transfer operations (e.g., low priority transfer operations) and may provide a notification to a user of the audio system. In another example, the main processing core may determine that a data destination does not have space for a data stream, that a data source is unavailable, or some other error condition of a data transfer. Responsive to a determination of the error condition, the operating system on the main processing core may modify transfer operations at the transfer manager or provide a notification to a user of the audio system. The transfer manager may also communicate the transfer conditions to other processors, plugins and components in the system.

Additionally or alternatively, the operating system running on the main processing core (or the processor of the transfer manager component) may determine that the transfer manager does not have any transfer nodes to process, or that a period of time exists between transfer nodes. Responsive to a determination of a period of time between the transfer nodes, the main processing core (or the processor of the transfer manager) may cause the transfer manager to go to "sleep" for the period of time (e.g., until the next transfer node needs to be processed or the next transfer operation needs to be initiated). To "wake" the transfer manager, the main processing core may transmit a transfer node to the transfer manager that specifies a desired "wake up" time. The control of the transfer manager can be a component of the operating system.

In some embodiments, a transfer node may be associated with a particular data processing operation. For instance, a particular data destination of a transfer node or a data source of a transfer node may be associated with a particular data operation, and the audio system is programmed to perform that data operation during transfer of the data stream. In some embodiments, a particular data source (e.g., a microphone of an ear bud) may be associated with a particular data operation (e.g., a multiplication by two), and the operation may be performed on the data stream each time data is transmitted from that particular data source. In another example, a particular data destination (e.g., a speaker of an ear bud) may be associated with a particular data operation (e.g., a filter). In such examples, the transfer manager may initiate the transfer using logic that performs the associated data processing operation during transfer of the data stream. Performing data processing operations during data transfer by the transfer manager, instead of at the main processing core, may save processing resources compared to typical audio systems.

The transfer manager may categorize data in a plurality of sections. Exemplary sections may include, but are not limited to, content processing, user or app processing, and manufacturing/device processing. The content processing may include processing of music, ambient sounds, etc. User/app processing may include processes that run on a process. For example, an app may be informed of the type of device/hardware that it is installed on. Manufacturing/device processing may be device-specific and manufacturer-specific processes. The manufacturing/device processing information may be protected and hidden. The manufacturing/device processing information may include equalization information, gain information, calibration information, lots of configuration information, etc. The manufacturing/device processing information may be located in memory of a processor, hardware, or both. In some embodiments, the manufacturing/device processing can be performed by one or more microDSPs. Embodiments of the disclosure may include a microDSP dedicated to a particular manufacturer. The manufacturer-specific microDSP may have instructions specific to the manufacturer. The manufacturer specific microDSP may be controlled through the operating system running on the main processor, which is in turn controlled through a manufacturer plugin that enables the device to be upgraded in the field with new features, functions, parameters based on manufacturer or user requests.

Exemplary Data Processing Domains

Data processing operations may occur in any number of separately controllable domains associated with various users of the audio system. The processing domains are managed by the operating system to ensure smooth and simple integration and effective resource control and task scheduling. For instance, a manufacturer may desire to import or adjust particular settings on the audio system in one domain without interfering with user-controlled audio preferences or audio settings applied by a particular audio source in another domain. In another example, a user may desire to adjust particular audio parameters like volume and spatial localization of sound sources in a domain without overriding processing operations specified by a manufacturer of the audio system or an application in another domain.

In some embodiments, a first user domain may include processing operations specified by a user of the audio system. For instance, in the user domain, the user may define particular processing operations to adjust audio preferences of a data stream, or to adjust the spatial rendering of a data stream.

A second manufacturer domain may include processing operations specified by a manufacturer of the audio system (or a manufacturer of applications or plugins for an audio system). For instance, processing operations associated with sensors and I/O interfaces of the audio system may be stored in a manufacturer domain so that these base-level processes are unaffected by user-selected preferences. In another example, an application designed by a manufacturer may perform particular processing operations to a data stream that the manufacturer desires to remain separate from user-controlled or content-associated processing parameters.

A third content domain may include processing operations specified by a data stream (e.g., specified by an external source or a destination of a data stream and transmitted with the data stream). For instance, in some embodiments, a music streaming service may define processing operations to decode a particular data stream from a music source. In another example, a device associated with the audio system may define processing operations that pause a data stream to provide an audio notification, or cause a data streams to be transmitted to a cloud.

Processing operations completed in each domain may be stored separately as instructions in memories of the main processing core and/or the processors of the audio subsystem. Changes made to processing operations in one domain may be implemented by replacing the instructions in that domain with another set of instructions, leaving instructions associated with other domains unchanged. In some embodiments, one or more processing domains may include security features to prevent unintended access to or modification of instructions stored in that domain. For instance, instructions in the manufacturer domain may be protected by security features that prevent users of the audio system from accessing or modifying the instructions, thereby allowing a manufacturer to maintain certain processing functions a secret.

Exemplary Parallel/Modular Processing of Data Streams at Multiple Processors

As mentioned previously, the silicon chip may include one or more processing cores, such as a multi-core main processor or one or more processors, e.g., DSPs or microDSPs, located in an audio subsystem layer of the chip. Multiple processing cores allow the chip to perform, at times, multiple data processing operations simultaneously. At one processing core, the chip can perform a first processing operation on a first data stream. At a second processing core, the chip can perform a second processing operation (which may be the same or different from the first processing operation) on a second data stream (which may be the same or different from the first data stream). Simultaneous completion of multiple processing operations to one or more data streams may improve the efficiency of data processing and allow the chip to more quickly complete complicated audio processing tasks. The management of resources across multiple cores and with multiple distributed tasks is carried out by the operating system.

Applications or plugins of the audio system may define one or more processing steps (e.g., processing functions) to be performed on a data stream by processors of the audio system. To implement modular processing of data streams in accordance with the processing steps of an application, the operating system running on the main processing core may be programmed to delegate processing steps from the main processing core to additional processors of the chip, such as additional main processing cores or processors of the audio subsystem.

The task manager may determine that a task for a plugin is not time critical. If a task can be delayed until a more convenient time the task manager may adjust the process time for the time node or execution time request for a task. For example, the system may request that information from a sensor is collected and processed. The data may be available and stored in memory. The processing cores may be in sleep mode until a time critical task needs to be serviced. The task manager may determine that is better for power consumption for the main processing cores to remain in sleep mode until a higher priority task is serviced. At that time the processing cores are activated. The delayed task is then serviced along with other tasks, rather than wake up the processors for a non-urgent task. In some embodiments the delay of a task may allow it to be processed on multiple cores running in parallel.

In some instances the task may be deliberately split across multiple cores to enable more compute to be accessed, with the accepted impact on processing delay and latency. The transfer manager can be configured to send alternating windows of input data to different cores so that the processing can be distributed. This can be scaled across multiple processing cores that are running in parallel with different data segments from the same data stream. This can include any history data the processing needs which may cause the data transfers to overlap the data windows.

Figure 9E:
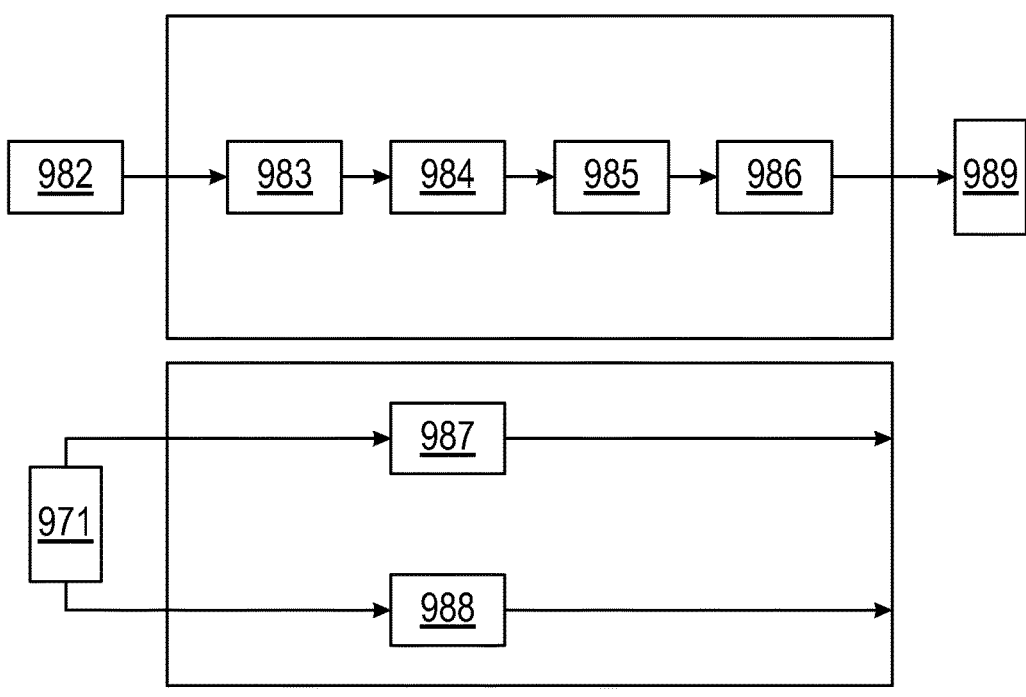
FIG. 9E illustrates exemplary processing flow, according to some embodiments of the disclosure.

FIG. 9E illustrates exemplary processing flow, according to embodiments of the disclosure. A first processing flow 982 may perform steps sequentially. For example, data may be streamed at 983, decoded at 984, enhancement/equalization/compression at 985, user-level changes at 986, and then output.

Embodiments of the disclosure may include a second processing flow 971 that performs steps, such as steps 987 and 988, in parallel. The outputs from the first processing flow 982 and the second processing flow 971 may be mixed together using mixer 989. In some embodiments, these outputs may be from processors associated with the first and second processing flows. In some embodiments, the mixer 989 may output the mixed sounds to the user.

A plurality of processing flows may operate in parallel. In some embodiments, each processing flow may be associated with a different application. Since the processing flows can operate in parallel, the hardware can process multiple apps at the same time. In some embodiments, the order of operation of the processing flows can be dynamically changed.

Each of the processors of the audio system may function independently from the main processing engine and from other components, such that each component is capable of processing a data steam in parallel. The modularity of the audio subsystem may improve the efficiency of the audio system by permitting the processing of several data streams at once (e.g., simultaneous processing of a voice data stream, an audio data stream, and a sensor data stream), or the processing of several aspects of a single data stream at once (e.g., by conducting NN processing of the data stream at a first processor, and binaural processing of the same data stream at a second processor, etc.).

Completion of certain processing function at dedicated components in the audio subsystem may offload processing resources from the main processor, conserving resources of the audio system. For instance, when an application is run on the audio system, the application (or a portion of an application, e.g., a component or processing step of an application) may use certain data processing operations to be performed on a data stream. If the operating system running on the main processing core determines that the data processing operation can be performed by one of the processors of the audio subsystem, the data stream may be transmitted, via the audio bus, to the one or more processors for completion of the processing operation. In some embodiments, when an application or component is being processed at the one or more processors of the audio subsystem, the main processing core may be turned off or enter a "sleep" mode to save power.

Data streams may also be transmitted to the processors of the audio subsystem for processing when processing resources are unavailable at the main processing core, or when the main processing core is unable to process data in a desired time period. Transmission and data processing at the processors may also be initiated responsive to other external and internal triggers, described above with respect to the transfer manager. The data transfers can contain the audio data, parameter data, processing code, configuration data and all other forms of information required for a process to execute effectively. The reconfiguration of the data streams and re-allocation of processing resources is controlled by the operating system.

Modular processing at the audio subsystem may also provide increased flexibility for manufacturers of audio systems and application for auditory systems. For instance, if a manufacturer of an application or device desires to offload certain data processing tasks from the main processor, e.g., common or repeated data processing tasks that use excess processing resources, data processing related to a particular application, or data processing relating to manufacturer-specified features of a device, then processors can be specifically programmed for performing the manufacturer's desired tasks In operation, a processor may process data stream in accordance with instructions for an application-defined processing step. At times, such as when multiple application are run in parallel on the audio system or when a particular application defines repeated processing steps to be performed at a processor, certain processors may be tasked with performing multiple processing steps. When a processor performs multiple processing steps, e.g., in order to sequentially process data streams from multiple data sources, or to repeatedly process data from a single data stream, the processor may define a processing queue.

Figure 9F:
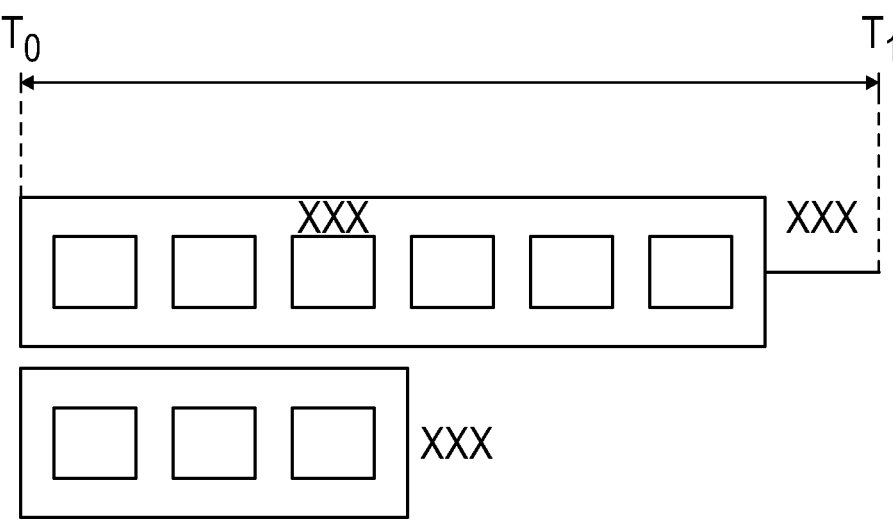
FIG. 9F shows a processing queue of a processor of the audio system, including a plurality of processing steps associated with application(s) running on the audio system, according to some embodiments of the disclosure.

FIG. 9F shows a processing queue of a processor of the audio system, including a plurality of processing steps associated with application(s) running on the audio system. The processing queue defines a processing window (e.g., $T_0$ to $T_1$) during which the processor completes one or more processing steps on one or more data streams in accordance with one or more applications. If the processor completes all processing steps in the processing queue within the processing window, the processor may enter "sleep" mode. When the processing window expires, or when the processor receives an additional processing step, the processor may "wake" from "sleep" mode.

The operating system executing on the main processing core may schedule one or more processing steps within the processing queue to ensure that a processor can perform all requested processing steps within the time period. To determine whether to transmit a data stream to a particular processor for completion of a processing step(s), the main processing core may determine whether the processing step(s) can be completed within the processing window. For instance, a first application may include a first processing step that can be completed at a first processor, and a second application may include a second processing step that can be completed at the first processor. If the operating system running on the main processing core determines that the first processing step and the second processing step can be completed within the processing window, the main processing core may cause data streams associated with the first and second processing steps to be transmitted to the first processor.

At times, such as when multiple applications include steps to be completed at a particular processor, that processor may become overloaded with more processing steps than can be completed within the processing window. When the operating system on the main processing core determines that a particular processor cannot complete all processing steps of applications within the processing window, the main processing core may cause one or more data streams to be transmitted to a second processor for completion of one or more processing steps.

In a multi-core system, one or more processors may include the same processing core and instructions, such that one or more processors can be used interchangeably. When a first processor gets overloaded, e.g., cannot complete all processing steps within a processing window, the operating system on the main processing core may schedule a portion of the processing steps at a second identical processor.

The task manager as part of the operating system maintains a list of the processes and tasks that need to be performed. Each task may contain an estimate of the resources needed for it to complete its processing for a particular data block size. The resource usage metrics are updated based on the real time execution of the processing for the tasks on the target core with the other existing overhead of the system.

The task manager may look ahead into the list of tasks that need to be performed and identify that with the existing resource load for a processing core, the future tasks may not be complete in time for the start they are currently scheduled, or the current completion time they need to meet. To prevent a processing glitch the task manager may decide to move future tasks to a different processing core before it becomes an issue for the real time processing that needs to be maintained. A pre-emptive task transfer is initiated in preparation for running future tasks on a different processing core, if it is available.

The task manager may look ahead into the list of tasks that need to be performed and identify that the current resource loading is going to prevent a future task from completing to meet its real time scheduling requirements. This may cause an audible glitch for audio streams or missing data for sensor analytics which may cause incorrect information to be identified. To reduce the impact of this inevitable issue, the task manager may notify plugins that there is a bottleneck approaching and they may need to take action. This could be a message sent to the plugins or a flag that is posted to a noticeboard or memory space that plugins can access to indicate a bottleneck condition. The plugins may then decide to switch to a low compute mode ahead of the problem to avoid a glitch. The plugins may decide to pause and fade out the audio stream for graceful degradation to the audio stream rather than an abrupt glitch. The task manager may keep the system in this low compute mode until sufficient resources and computation is available for the plugins to return to their full processing status.

In another example, such as a silicon chip having a dedicated audio subsystem with processors programmed for predefined processing tasks, the operating system may delegate processing steps between processors according to which tasks each component is programmed to perform. As described previously, each processor of the audio subsystem may be programmed to perform one or more processing functions on a data stream. When an application defines a processing step that corresponds with the processing function that can be performed at a particular processor, a data stream may be transmitted to that processor for completion of the processing step, thereby saving processing resources at the main processor.

In some embodiments, an application may define a processing step on a data stream that can be completed by a processor of the audio subsystem. Responsive to determining that a processor is programmed to perform the processing step, the operating system running on the main processing core may cause a data stream to be transmitted to the processor for performance of the processing step (by, e.g., transmitting a transfer node to the transfer manager of the audio subsystem to initiate a data stream transfer to the processor). In some embodiments, an application may define a binaural filtering step, and the main processing core may transmit a data stream to the binaural filter engine for completion of the binaural filtering step.

An application may provide one or more processing steps in an ordered processing sequence. For instance, certain processing steps of an application may be ordered sequentially and may only be performed after the previous processing step of the sequence has been completed. For instance, a spatial localization application may define one or more spatial localization processing functions on a data stream, one or more filtering functions, and one or more equalization functions in a specified sequence in order to produce a desired audio output. Other standalone processing steps may be performed independently from functions coming before or after in the processing sequence.

In some embodiments, a first application may be scheduled during a time window, and a user may start a second application during the same time window. Embodiments of the disclosure may include running the first application and the second application simultaneously by moving some of the processing of the second application to a different processor. The processing may be performed by one or more DSPs, such as smaller DSPs with defined functions that can pull audio from the audio subsystem and perform certain processing tasks.

In some embodiments, the scheduling of time critical tasks may be completed such that the processing system can be put into sleep mode. The system may determine that there are background tasks that may not be immediately due for execution, but can be brought forward during the period where there is no other processing to be performed. This effectively clears a backlog of future tasks to fill the resource loading gaps when processing resources are available. This allows tasks to be re-scheduled to avoid the potential of missing the actual time of execution in the future if the processor becomes fully loaded at that time. Tasks can be marked as time critical (must be completed by a specific time)—play this block of audio samples within the next M milliseconds to avoid an audible glitch and long latency, time specific (must occur at, or soon after a specific time)—play this notification at 2 μm, or any time (time of execution is not important)—take my temperature within the next 3 hours.

Exemplary One-Time Programmable Memory

In some embodiments, the chip includes a one-time programmable memory. The one-time programmable memory may be readable to provide information about the chip, for instance, a number or type of microDSPs in the audio subsystem, an amount of processing power or an amount of memory of the main processor or microDSPs, a number or type of I/O interfaces, or some other information. In some embodiments, the one-time programmable memory may be readable to provide information about a code of the chip, e.g., instructions included within a memory of the main processor, microDSPs and other components that may provide information about the components and their respective functionalities.

In some embodiments, the one-time programmable memory can be used to facilitate production of chips having differing components or functionalities. For instance, a manufacturer may desire to create one or more chips having a different number or type of microDSPs, a different amount of memory or processing power, or a different type or amount of I/O interfaces. However, the cost of designing and manufacturing a variety customized chips may be expensive or work-intensive. Similarly, consumers of chips for audio systems may desire customized chips, e.g., chips having particular microDSPs, I/O interfaces, tailored processing functionalities, particular code or instructions, or some other customized characteristics. To facilitate production of customized chips, the one-time programmable memory may include instructions for a desired chip configuration (e.g., a number or type of microDSPs, an amount of memory or processing power, a number or type of I/O interfaces, or some other characteristics), and the instructions can be executed to produce a chip having the desired configuration. The one-time programmable memory may be operable to modify the functionality of the chip by turning "on" and "off" various components of the chip or by importing code (e.g., executable instructions) to provide desired functions to various components of the chip.

In some embodiments the one-time programmable memory may be used to enable or disable access to certain data streams or peripheral components. For example a heart rate sensor peripheral may be marked as only accessible by the software and hardware components of the system that are manufacturer specific and it is not openly available for other third party components to utilize. In another example, the heart rate data stream may only be accessible by plugins that provide a specific access token that is validated by the operating system to provide the data stream to the requesting plugin. This deliberately limits and restricts which modules have access to certain data or peripherals such as sensors and microphones and external memories.

In such an example, a manufacturer of a chip for an audio system may design a single "master chip" that may be given selective functionalities by the one-time programmable memory. The "master chip" may include increased functionalities compared to chips sold to consumers, and certain functionalities (e.g., microDSPs, memory, processing power) may be modified by the one-time programmable memory before sale and use of the chip.

Exemplary Ultra-Low Latency Engine (ULL)

Figure 9G:
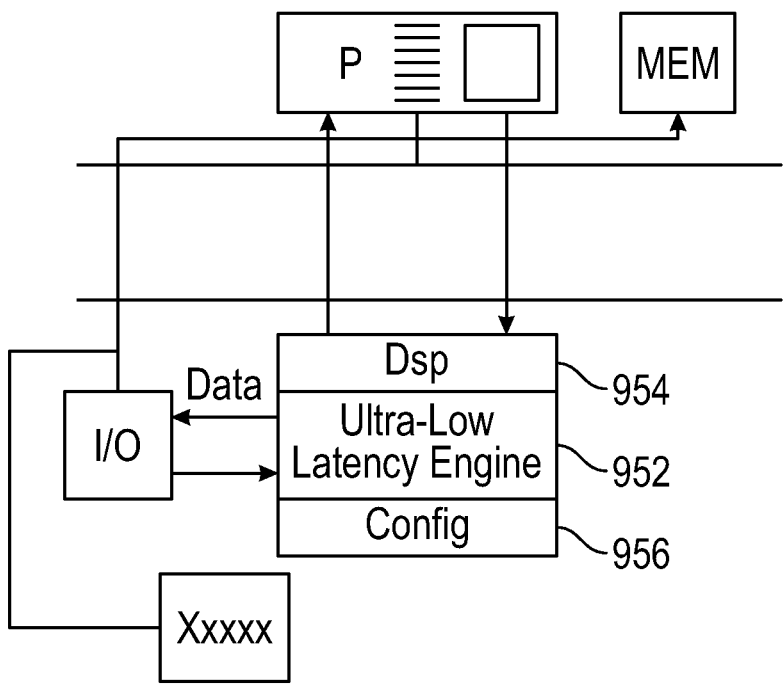
FIG. 9G illustrates an exemplary ultra-low latency engine including a microDSP and an associated configuration, according to some embodiments of the disclosure.

In some embodiments, the audio subsystem includes a processor programmed as an ultra-low latency engine. FIG. 9G illustrates an exemplary ultra-low latency engine 952 including a microDSP 954 and an associated configuration 956 (e.g., an intelligent noise cancellation (INC) filter or active noise cancellation (ANC) Controller, described below). The ultra-low latency engine 952 is programmed to receive instructions from the main processing core, the instructions defining a particular processing task to be completed at the ultra-low latency engine 952. The main processing core and the ultra-low latency engine are controlled through the operating system running on the main processor.

The ultra-low latency engine may be programmed to perform low-latency data processing operations on data streams received at a relatively high data sample rate, e.g., a 384 kHz sample rate or another sample rate that is relatively higher than the sample rate of other components in the audio subsystem. The ultra-low latency engine may be programmed to perform processing operations on data streams received directly from the I/O interfaces and processors of the audio subsystem. Processing of data streams at the ultra-low latency engine, instead of the main processor, may improve efficiency of the audio system by avoiding a delay associated with transmitting data streams from the audio system to the main processor and then back to the audio subsystem for continued processing.

The ultra-low latency engine may be programmed to perform any desired processing function on a data stream. For instance, the ultra-low latency engine may be programmed to perform a neural network function, a filtering function, a summing function, a mixing function, an equalizing function, a sample rate conversion function, or some other processing function.

In some embodiments, the ultra-low latency engine performs a fixed processing function specified by a manufacturer of the chip, e.g., data filtering and other data processing operations. Alternatively, the processing functions of the ultra-low latency engine may be configurable in real-time during audio processing by, e.g., a main processing core of the audio system or a plug-in application run on the audio system.

In some embodiments, the main processing core, or the operating system running on the main processing core, includes instructions for configuring the ultra-low latency engine to perform one or more processing functions, and transmits the instructions to the ultra-low latency engine to define a desired processing function at the ultra-low latency engine.

In some embodiments, third-party applications include instructions for configuring the ultra-low latency engine to perform one or more processing functions, and transmits the instructions to the ultra-low latency engine, using the operating system, to define a desired processing function at the ultra-low latency engine. In another example, a user of the audio system may define a processing function of the ultra-low latency engine by, for instance, downloading or running an application on the audio system that defines a processing function of the ultra-low latency engine.

The ultra-low latency processing engine can be programmed to process audio in a single sample mode, e.g., one sample is processed at a time with a block size of 1. In addition, the ultra-low latency processing engine may be programmed to us a multi-sample block size if additional analysis and buffering is required by the algorithms.

In some implementations the ultra-low latency core may be programmed to only be accessible to specific plugins, such as a single manufacturer's plugin process, and not to be available for all plugins to use.

Figure 9H:
FIG. 9H illustrates an exemplary ultra-low latency signal processing engine, according to some embodiments of the disclosure.

In some embodiments the data streams in and out of the ultra-low latency processing component may require additional enhancements, such as fractional phase adjustment. FIG. 9H depicts the ultra-low latency signal processing engine, which is shown as a microDSP processor 1200.

A standard processing engine could possibly be used, but this example is programmed to run single sample data transfer rates. This is desirable in order to transfer sound into the system and out of the speaker through a processing unit while mixed with other signals so that users can hear the sound around them in extremely low latency signal paths.

Typically, the end-to-end target is 10 microseconds or less. Hearing aid applications have a target that is at least below 1 millisecond. As such, the target is a few microseconds from input to output with processing in the middle. To accomplish this, multiple PDM inputs from the microphones are synchronized 909, and those digital streams are decimated 910. They can be decimated to more than one rate in parallel. However, a high sample rate is necessary so that the time of each sample represented is very small. A high sample rate serves to reduce latency, as the longer the wait between samples, the longer the latency.

These signals can be passed into the microDSP 1200, but they can also be sent out to other processing units in the system at different rates 911. If 384 kHz is used as a target sample rate, each sample is clocked through the DSP 1200 in a single sample fashion 913, as opposed to taking an entire buffer and running it through as a frame. Effectively, the frame size is now 1. Each sample is clocked through. The DSP 1200 then recognizes that the sample is ready at the input and that an output sample should be created. This will typically run in the time domain 920, but with a small amount of buffering, this can also run in the frequency domain. Alternatively the audio can be passed through a time domain filter bank for individual band processing.

To achieve normal processing in this type of application for purposes such as noise cancelling, banks of FIR filters or IIR filters 917 are used. The DSP 1200 is built to allow multiple instructions to run in one cycle. Thus, each operation takes multiple pieces of data, perhaps through a delay line, and operates them in one clock. As an example of timing, a 384 kHz sample rate yields an individual sample time of 2.6 microseconds 912. The goal is to get the sample through as quickly as possible with signal processing along the way. The chip could be clocked at about 400 MHz or 500 MHz, which gives about 2.5 nanoseconds per operation and about 1,000 operations per sample 1208. This number increases as the clock rate goes up. At 1 GHz clock rate, for example, this yields 2,600 operations per sample 926. This number represents the operations that can theoretically be performed using the DSP 1200 before the next sample is presented at that sample rate.

One application that would use this technology is active noise cancellation 921, which sets up filters in the processor. This is typically hard-coded in 908, and the manufacturer sets the coefficients 1212B based on the acoustics of the headphones. As the microphone signal is received, it is filtered using these coefficients 1212B to create an inverse sound filter. Thus, when the sound is then presented out of the speaker, it is acoustically mixed with the ambient sound the person is experiencing and the sounds will theoretically cancel out.

Another application is the capture of transfer functions 922 that can be used in very low latency. The microphone signals are used to determine the transfer function in these filters and then send that data to other processes in the system. As such, an analysis path is used for other processing in the chip instead of merely passing the audio through. This is an improvement over a typical active noise cancellation chip, where all processing is confined within the processor.

This technology can also be used for hearing enhancement, such as a hearing aid application 915. As opposed to noise cancellation, which seeks to cancel sounds, the filters are designed to enhance the sound with this application. The filters are determined based on the user's hearing profile 1212C. Thus, there must be another method of obtaining coefficients, so data coming in from the external environment would need its own path. For example, an audiologist may measure a user's hearing profile 1212C, create the hearing data 1212A, and use it in the processing component 1200 for the microphone signals to be processed.

Another application is transparency, or inverse system transfer functions 919. This application filters out the acoustic impact of wearing the device. This entails creating the inverse transfer function of the device, so that the sound captured by the microphone is processed as if the device was not there. These filter coefficients need to come from the external environment as well, but they can also be operations from a plugin. As such, another path into the chip is from plugins that are running on other cores in the chip 927. As these single sample process signals 923 leave the microDSP 1200, they go through a mixer 924 where they are mixed with other signals that have been processed in other cores before passing through the digital analog converter 925 and the speaker inside the device.

Figure 9I:
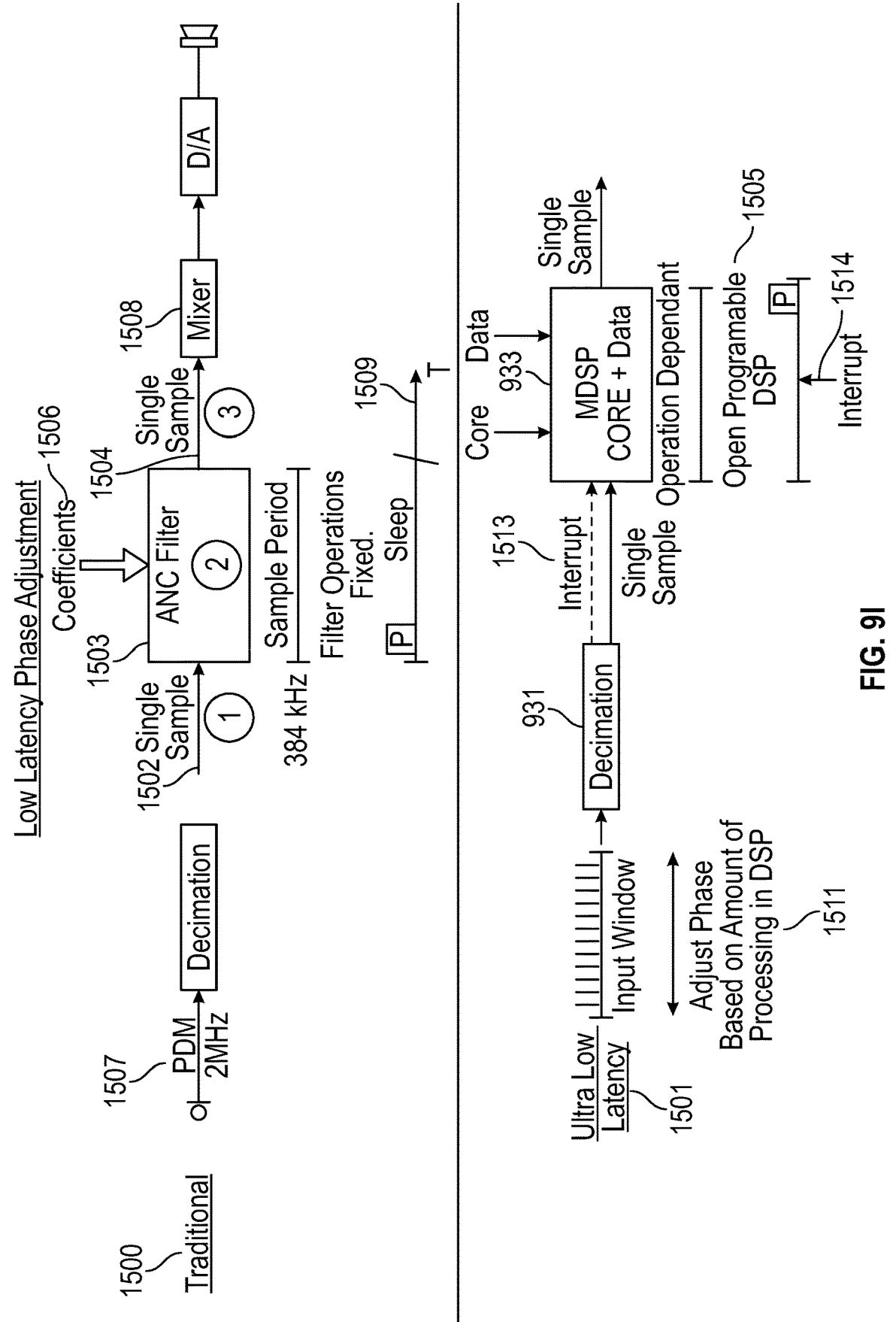
FIG. 9I illustrates an exemplary comparison of the traditional method of using very low latency signal processing with the ultra-low latency method using a completely open programmable DSP, according to some embodiments of the disclosure.

FIG. 9I illustrates a comparison of the traditional method 1500 of using very low latency signal processing with the ultra-low latency method 1501 using a completely open programmable DSP 1505. The flexibility of the completely open processing cores for multiple applications is access either directly or through the operating system.

With a typical ANC filter 1503, the filter is fixed in terms of its size and the amount it is capable of processing. The developers or manufacturers can only change the coefficients 1506 for that filter. As such, there is a very predictable sequence of data through the system, and one can tightly couple the input and the output to a specific number of samples. There is a three sample delay from the PDM input 1507 to the downsampled, higher sample rate, for example 384 kHz. While one sample is processed coming into the system 1502, there is a sample in the filter 1503 being recalculated, and a sample 1504 being passed to the mixer 1508. As such, there is a three stage sequence. Meanwhile, the filter operations that are fixed take up a fixed amount of processing time 1509. These operations can either run the filter very fast and then idle for the rest of the sample period 1509, or they can run the filter at a lower clock speed to save power and finish just before passing the next sample to the output.

The ultra-low latency method 1501 differs from the traditional method 1500. The microDSP component on the chip can be completely programmed by the developer and loaded in the data and code 933 into the DSP 1505. The amount of time that processing takes is process-dependent, rather than fixed as with a traditional ANC system 1500. The open DSP 1505 causes some problems in terms of latency. One solution is to run the processing quickly like the traditional method 1500, and then use the remaining processing as needed to finish by the end of the sample period. Instead, to reduce latency, it is necessary to adjust the phase of the input data 1511 so that the data is ready at the desired starting point for processing. Thus, the processing will finish at exactly the point where the next component in the chain needs the sample data. Rather than wait an entire sample period in the processor, processing only occurs for the amount of time that is needed by the code. This allows for a very short time period between the input and output.

To achieve this effect in a traditional system, the input and output are clocked through at the main sample rate. Instead, the improved method decouples the input and the output so that the output stages are exactly the same and are clocked through at the sample rate. The time that it takes for the sample to be ready on the input is determined by the decimation filter 931. The decimation filter 931 creates a sample and may send an interrupt 1514 to the DSP 1513 to indicate that the sample is ready before passing the data along. The actual DSP code is then measured by the system to determine the amount of time needed to create an output sample and pass the signal. That time is then used to set the new interruption. Thus, the phase of the window that is used for the decimation filter can be adjusted 1511 based on the amount of processing needed. This allows a developer or a manufacturer to make a change to the code 933, and the input time is automatically adjusted based on the desired amount of processing instead of being fixed on a per sample period basis.

Exemplary ANC Controller

In some embodiments, one or more processors of the audio subsystem are programmed as an ANC controller. The ANC controller is in communication with the ultra-low latency engine and is programmed to receive instructions from the main processing core relating to a processing function to be completed at the ultra-low latency engine. The ANC controller may provide the instructions to the ultra-low latency engine to modify the functionality of the engine to provide for a particular processing function. For instance, a third-party application or plug-in run on the audio system may define a particular processing function to be completed by the ultra-low latency engine, and the ANC controller may provide instructions to the ultra-low latency engine to cause the engine to perform that processing function.

Additionally or alternatively, the ultra-low latency engine may provide feedback to the ANC controller by transmitting information to the ANC controller relating to a processing function of the ultra-low latency engine. The ANC controller may then communicate the processing functionality of the ultra-low latency engine to other components of the audio system (e.g., processors of the audio subsystem, the main processor, or the I/O interfaces) so that the components may change their own processing functionalities to be compatible with the ultra-low latency engine (e.g., to produce a desired cumulative processing of a data stream by way of the ultra-low latency engine and other components of the audio system). In some embodiments, the ultra-low latency engine transmits to the ANC controller information about a processing function performed by the ultra-low latency engine. Responsive to receiving the information from the ultra-low latency engine, the ANC controller may transmit the information to one or more other components of the audio system (e.g., the main processing core and processors of the audio subsystem). One example is to allow for any necessary compensation for the processing performed by the ultra-low latency processor for other data streams in the system. This compensation processing can be performed using the main processor of a microDSP component as part of the audio subsystem as a dedicated compensation component.

Exemplary Crossover Network

In some embodiments, a manufacturer of a chip may include physical filters and other acoustic components to modify data signals received at and output from I/O interfaces of a device. Additionally or alternatively, one or more processors of the audio subsystem may be programmed to perform certain processing operations on incoming and outgoing data streams to provide more dynamic and tailored signal processing than acoustic components. For instance, before a data stream is transmitted to an I/O interface for output from, e.g., speakers of the audio system, the data stream may be instead transmitted to the crossover network. The crossover network may perform one or more processing operations on the data stream, for instance, a filtering function, a level control function, a phase delay function, a compression function, or some other processing operation. In some embodiments, the crossover network may be programmed to selectively transmit certain frequency bands of the data stream to filter the data stream. The crossover network may then transmit the processed data stream to the I/O interface so the data stream can be output from, e.g., speakers of the audio system.

In some embodiments, the crossover network may perform a fixed processing operation specified by a manufacturer of an audio system or an application for an audio system. For instance, a manufacturer may desire to output audio having a particular sound profile, a particular latency, or some other characteristic provided by processing at the crossover network. In another example the crossover network may be configurable in real-time by providing instructions to the crossover network that specify a particular processing function to be performed by the crossover network.

Embodiments may include changing the frequency content within each band for a headphone with multiple speaker drivers and outputs using a cross-over network. The data output to the speakers may have been processed by a DSP such that no additional physical acoustic filters are needed. The DSP processing may include filtering, level control, phase delays, compression, etc.

Exemplary Interpolator

In some embodiments, one or more processors of the audio subsystem are programmed as an interpolator. The interpolator may be programmed to receive one or more data streams and dynamically increase a sample rate of the one or more data streams. For instance, the interpolator may be operable to increase a sample rate of a data stream from approximately, e.g., 8 kHz, 16 kHz, 32 kHz, 48 kHz, 96 kHz, 192 kHz or 384 kHz to approximately, e.g., 16 kHz, 32 kHz, 48 kHz, 96 kHz, 192 kHz, 384 kHz, or 768 kHz. In some embodiments, processing of data stream may occur at a first sample rate, e.g., 16 kHz, and mixing and/or output of a data stream may occur at a second sample rate, e.g., 48 kHz, and the interpolator could be programmed to increase the sample rate of the data stream from the first sample rate to the second sample rate. Locating sample rate conversion at the interpolator may improve efficiency of the audio system by offloading sample rate conversion from mixing and output components of the audio system.

The interpolator may be programmed to increase a sample rate of a data stream by interpolating the data stream, e.g., by creating new data points between existing data points of a data stream to approximate an increased sample rate data stream.

In some embodiments, the interpolator includes a plurality of input channels programmed for receiving data streams from one or more components of the audio system. The interpolator may be programmed to receive one or more data streams at the one or more input channels, and may modify each of the data streams independently to provide a plurality of output data streams having increased data sample rates. In such an example, multi-channel system, the interpolator may provide output data streams having a same data sample rate, or any number of different data sample rates.

In some embodiments, the interpolator is a dedicated processing component in the silicon to offload the significant processing requirements from the main processor. The dedicated processor can be implemented with a highly optimized instruction set to efficiently deal with the filters and interpolation of audio samples at multiple data rates.

In some embodiments, the interpolator is connected to the ultra-low latency engine and programmed to transmit data streams directly to the ultra-low latency engine. In such cases, the interpolator may be programmed to modify a sample rate of a data stream, e.g., in order to increase the sample rate of the data stream to equal a sample rate of the ultra-low latency engine (e.g., 384 kHz). In other examples, the interpolator may increase data streams to match the output of the ultra-low latency engine for subsequent digital mixing of the multiple data streams at the higher sample rate.

Exemplary Input Layer DSP and Output Layer DSP

Embodiments of the disclosure may include an input layer DSP in the audio subsystem. Some embodiments may include an output layer DSP in the audio subsystem. In some configurations, there may be a DSP that can be assigned to input layer or output layer processing. The input layer DSP and/or the output layer DSP may allow at least one of the user, one or more applications, or the manufacturer to specify parameters or processes to be performed on the data streams received by the audio subsystem. The parameters may be user-defined parameters, for example, that may be communicated between different components of a chip, different components of different chips, or both. The communications may be transmitted using an input layer DSP or an output layer DSP.

Exemplary Binaural Filter Engine

In some embodiments, the audio subsystem includes a binaural filter engine. The binaural filter engine may be programmed to receive binaural data streams from one or more I/O interfaces of an audio system (e.g., one or more microphones included in ear buds), analyze the data streams to determine spatial information about sounds sources in an auditory scene, process the binaural data streams to produce rendered data streams in accordance with one or more setting (e.g., user preferences), and then transmit the rendered binaural data streams from one or more I/O interfaces of the audio system (e.g., one or more speakers included in ear buds).

Standard binaural processing engines may only allow minimal user control of the rendering of an auditory scene. For instance, a user may be able to modify only an overall volume of an auditory scene. In some embodiments, a user may have more control over binaural rendering of an auditory scene, for instance, specifying a desired location of a sound source in a rendered auditory scene, modifying the volume of one or more sound sources in the rendered auditory scene, or specifying some other aspect of the rendered auditory scene.

Binaural processing engines that allow for more control of the rendering of auditory scenes (e.g., virtual reality or augmented reality systems) may be performed on large processors, which are poorly suited to space-constrained applications like those designed for in-ear audio processing. However, binaural audio rendering may be included in a device with a smaller footprint by offloading binaural processing from a main processing core of the audio system.

Figure 9J:
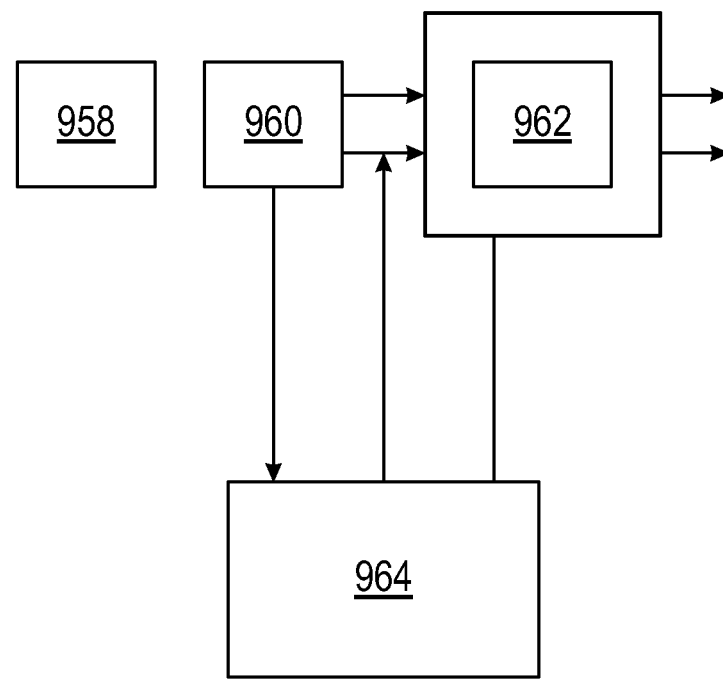
FIG. 9J illustrates an exemplary flow of one or more data streams through an audio system that includes binaural filter engine, according to some embodiments of the disclosure.

In some embodiments, an audio system includes a dedicated binaural filter engine for binaural processing of audio data independent from a main processing core. FIG. 9J illustrates an exemplary flow of one or more data streams through an audio system that includes binaural filter engine. The binaural filter engine includes one or more processors for processing audio data streams, such as a capture engine 958, a scene manager 960, and a rendering engine 962. The binaural filter engine may be programmed to communicate with one more devices associated with the audio system 964, such as speakers or a cell phone of a user of the audio system.

Each of the capture engine and the rendering engine may be programmed to receive any number of data streams. For instance, the capture engine 958 may be programmed to receive one or more data streams from I/O interfaces of an auditory device (e.g., a left ear data stream and a right ear data stream received from microphones included in left and right ear buds, respectively). A scene manager may be programmed for processing the one or more data streams into one or more binaural data streams. In some embodiments, for instance, when an auditory scene may be rendered without user modification, the data stream may be transmitted to the rendering engine In another example, the capture engine may transmit data streams to and receive data streams from a device associated with the audio system.

Figure 9K:
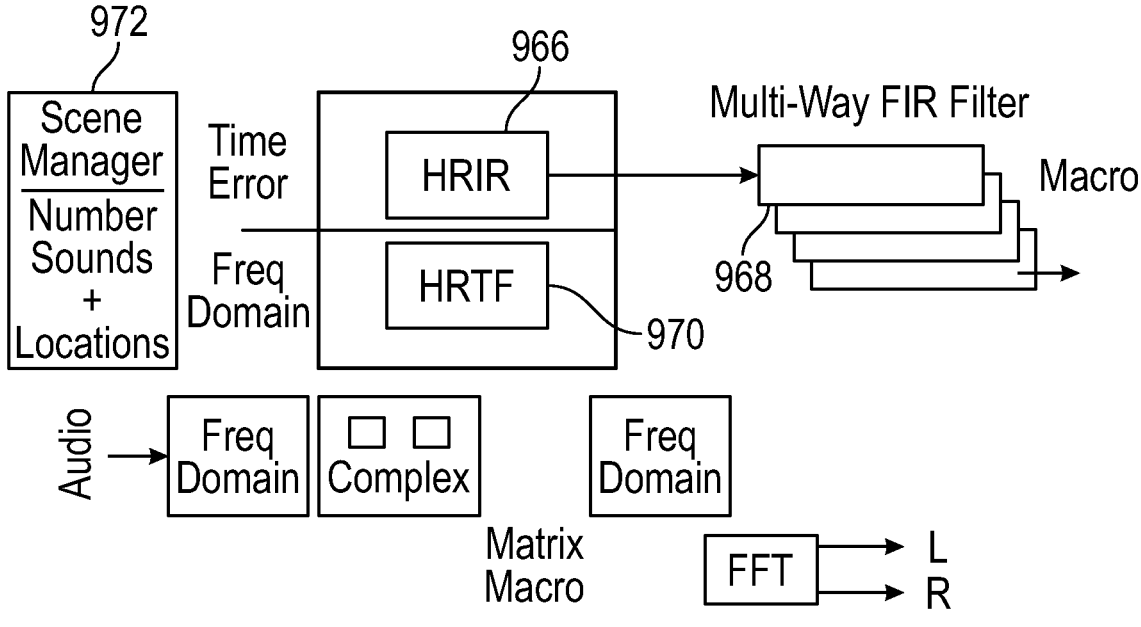
FIG. 9K illustrates exemplary time domain processing through a binaural filter engine and frequency domain processing through a binaural filter engine, according to some embodiments of the disclosure.

Binaural audio data streams may include one or more audio domains, for instance, a frequency domain and a time domain. The binaural filter engine processes audio stream in a frequency domain and in a time domain. FIG. 9K illustrates exemplary time domain processing through a binaural filter engine and frequency domain processing through a binaural filter engine, respectively. In the time domain, the system may perform operations in low latency to reduce a delay associated with complex audio processing. Time domain processing may include passing the data streams through one or more head-related impulse response (HRIR) filters 966. The one or more HRIR filters 9616 may include operations for an addition or multiplication of the received data streams. The one or more HRIR filters 9616 may be programmed in parallel such that the filters are capable of processing more than one data stream simultaneously. Time domain processing may also include one or more multi-tap FIR filters 968, such as a 32-tap FIR filter. For more efficient and continuous processing of data streams, the FIR filter may be programmed for process data streams on a sample-by-sample basis. The FIR filter may also accept user information to specify aspects of the sample-by-sample processing of the data stream. In some embodiments, the FIR filters may be included within one or more macros on the chip. Macros may be placed in parallel on the chip to further improve the efficiency of the audio system by permitting parallel processing of data samples, for example to process the audio for the left and right output channels in parallel, simultaneously. Each of the macros may correspond to a particular location of an individual sound source or the spatialization of a single sound source to multiple locations.

In the frequency domain, the binaural filter engine may include one or more head-related transfer function (HRTF) filters 970. In some embodiments, the binaural filter engine includes one left HRTF filter corresponding to a left ear bud and one right HRTF filter corresponding to a right ear bud. In the frequency domain, data streams may be processed in accordance with one or more frequency bins (e.g., data from a particular range of frequencies may be processed together). A complex matrix macro may be included for further frequency domain processing and efficient convolution operations. Frequency domain processing may also include a frequency-to-time domain transfer, such as a fast-Fourier transform.

A scene manager 972 may be programmed to control entry of data streams into the binaural filter engine, binaural processing of the data streams, and repeated processing of data streams in the time and/or frequency domains. For instance, the scene manager may be programmed to determine a number of sound sources in an auditory scene, an actual location of one or more sound sources, a rendered location of one or more sound sources (if different than the actual location), and processing operations at the binaural filter engine to produce one or more rendered binaural data streams based on user-defined preferences.

In standard audio processing systems, a fixed number of sound sources may be recognizable by a processor of an audio system. However, alternatively, the scene manager may be programmed to recognize any number of sound sources existing in a complex auditory scene surrounding a user of an audio system. The scene manager may also determine a number of iterative steps for spatial, frequency or time-domain processing of a data stream.

In some embodiments, the binaural filter engine includes a capture engine. In some embodiments, the capture engine may be programmed to unmix one or more data streams. For instance, the capture engine may receive one or more data streams (e.g., M number of input data streams) and transmit one or more additional processed data streams (e.g., N number of output data streams).

In some embodiments, the capture engine is programmed to perform scene analysis to determine the location of one or more sound sources in an auditory scene around a user of the audio system.

In some embodiments, the capture engine may include processing functions to filter one or more data streams, for instance, to remove or reduce the level of particular sounds from a captured audio data stream, based on spatial location.

The capture engine may also perform certain activities to enhance the capture of speech, such as human speech in an auditory scene around a user of the audio system. In some embodiments, the capture engine extracts speech data from one or more audio data streams and generates one or more speech data streams including the extracted speech data. The extracted speech data may be associated with a particular sound source (e.g., a particular speaker in the auditory scene), such as a user of the audio system or another speaker.

Additionally or alternatively, the binaural filter engine may include one or more processors programmed as a rendering engine. The rendering engine is programmed to receive audio data streams and manipulate the audio data streams to produce left and right binaural data streams and render one or more audio sources in a spatial location relative to the wearer of the ear buds. The left and right binaural data streams may then be output through respective left and right ear buds to simulate a 3-dimensional auditory scene around a wearer of the ear buds.

Figure 9L:
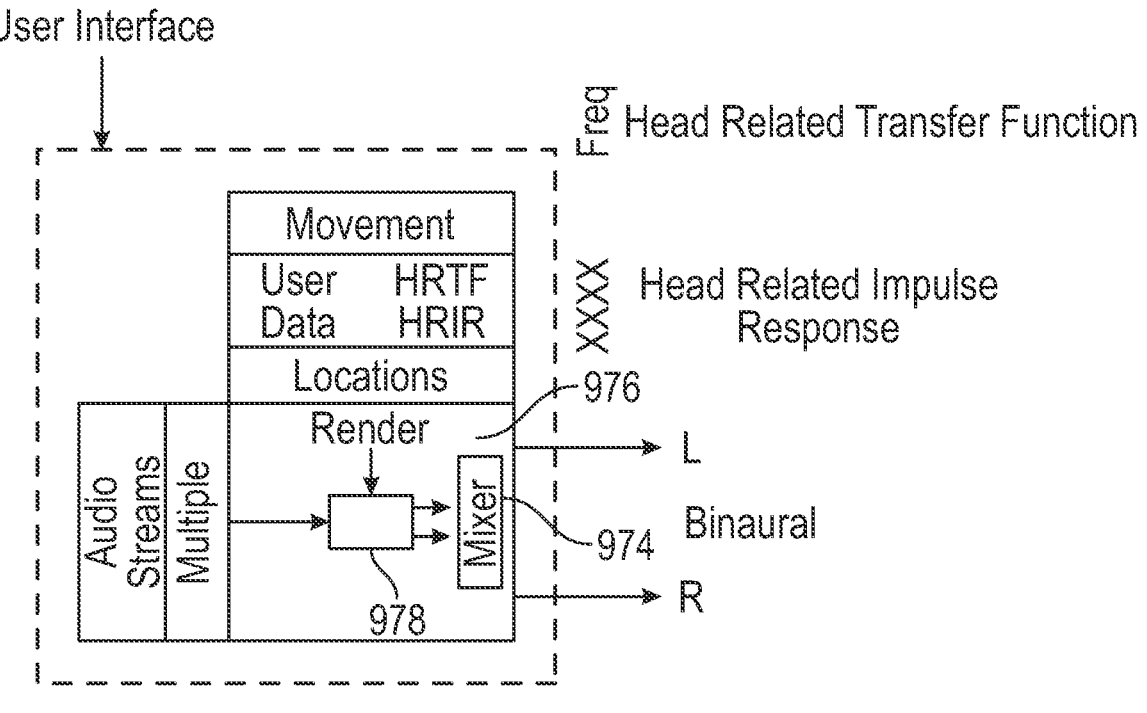
FIG. 9L illustrates an exemplary rendering engine, according to some embodiments of the disclosure.

FIG. 9L shows an exemplary rendering engine. The rendering engine 976 includes one or more input channels for receiving one or more data streams, a DSP 978 (such as a microDSP) for processing the one or more data streams to produced one or more binaural data streams, and a mixer 974 for mixing the one or more binaural data streams before outputting the binaural data streams to a user. The one or more data streams may be processed based on information received from the audio system, such as information relating to the movement of a user (information sourced from, e.g., a head tilt sensor), information relating to the spatial location of one or more of the sound sources, or information input by a user on a user interface of the system (e.g., information about a desired spatial location at which particular sound sources should be rendered).

In some embodiments, the rendering engine may receive audio data streams from one or more devices associated with the audio system (e.g., a cell phone or speakers) and may mix the audio data streams. The rendering engine may be programmed to perform one or more processing functions on data streams received at the rendering engine. In some embodiments, the rendering engine may combine data streams for multiple data sources, for instance, one or more microphones in an audio system. In some embodiments, the rendering engine may include processing functions to filter one or more data streams, for instance, to remove particular sounds to improve clarity or maintain coherence of a scene.

In some embodiments, a user may input information about a desired rendered audio scene at a user interface of the device. For instance, a user may input, via a user interface, a desired location of a sound source in a rendered auditory scene. Instructions for the desired location may be transmitted to the rendering engine.

The rendering engine may be programmed for rendering sounds in three dimensions, for instance, a distance dimension, a radial dimension, and a height dimension. In order to render a sound source at a particular location, the rendering engine may use reference locations stored in a memory of the rendering engine.

In some embodiments, the binaural filter engine includes a scene manager. In some embodiments, the scene manager is a dedicated processor of the silicon chip, for example, a DSP or microDSP. In another example, the scene manager is included as a set of instructions in the main processing core of the audio system. The scene manager may route data streams through processors of the binaural filter engine to produce a rendered auditory scene in accordance with a user's preferences (e.g., by using the binaural processes described throughout the disclosure). For instance, the scene manager may receive information from a user of the audio system about a desired location of a sound source, a relative volume of a sound source, or some other information about an auditory scene. Based on at least the information received from the user, the sound manager may transmit the processed audio data to the output rendering and streaming components in the platform.

The scene manager may additionally receive information from other components of the audio system, for instance, a head tracker for receiving information about the relative direction and location of a user.

In some embodiments, the scene manager receives information from a user interface of the audio system. In some embodiments, specifying a location of a sound source includes inputting a desired sound location on a user interface of the audio system. In some embodiments, the sound location is specified as a relative location relative to the user of the system (e.g., a location relative to the wearer of one or more ear bud). The relative location may be determined based on, for instance, a distance from the user, a radial direction from the user, and/or a height relative to a user. The scene manager may continuously update the rendered location, to anchor it in space, as the user moves to maintain the relative location in the same spatial location relative to the user. In other examples, the sound location is specified as a fixed location in an auditory scene. When a user of the audio system moves, the scene manager may continuously update the rendered location to maintain the same fixed spatial location in the auditory scene regardless of the movement of a user (continuously adjusting distance, radial direction, and height as the user moves through the auditory scene).

In addition the scene manager may be tracking the user's head movements relative to a sound source in the ambient environment. For example, there may be a reference loudspeaker or other sound source in the proximity of the listener and it is required to know the relative direction of the speaker to the user's head to track spatial cues. This is useful for binaural hearing tests, binaural cue capture and analysis and capturing HRTF and HRIR information.

In addition the scene manager may be tracking the user's head movements relative to a fixed virtual location, in addition to other sound sources in the real ambient environment, that is acting as an audible beacon, for example to lead a user to a specific location in the real or virtual environment. This can be used for visually impaired listeners where audio notifications can be used with emphasized binaural cues to help them locate sounds and objects around them.

Responsive to receive a user-specified location of a sound source with an auditory scene, the scene manager may modify various aspects of the signal processing at the binaural filter engine to render the sound source in the desired location.

To configure the binaural filter engine to render sound at a particular location, the scene manager may be programmed to adjust the HRIR and HRTF filters based on at least a user-specified location of a sound source.

A memory of the scene manager (e.g., a memory of the main processing core or a memory of a dedicated scene manager processor) may include information about two or more points in three-dimensional space. The scene manager is programmed to interpolate between the two or more points to determine the user-specified location.

A first point "A," and a second point "B" may each be associated with particular filter characteristics (e.g., filter coefficients, such as coefficients for the HRIR and HRTF filters). A third point "C" may be determined by the scene manager and associated with third filter characteristics. The third characteristics may be determined based on interpolation of point A and point B to arrive at the filter coefficients corresponding to point C. The interpolation would use data weightings based on the proximity of the target spatial location relative to the two known spatial locations for which real filter data is available.

An extension for some spatial filter data sets would require the interpolation of 3 actual data points and triangulate the new spatial filter data based on the weightings of the 3 data sets. In a further extension a similar interpolation would be provided for 4 data sets that would use two different azimuth data sets and two different elevation data sets with respective weightings to create the new target filter data. The interpolation of multiple sound locations can be referred to as interpolation.

Figure 9M:
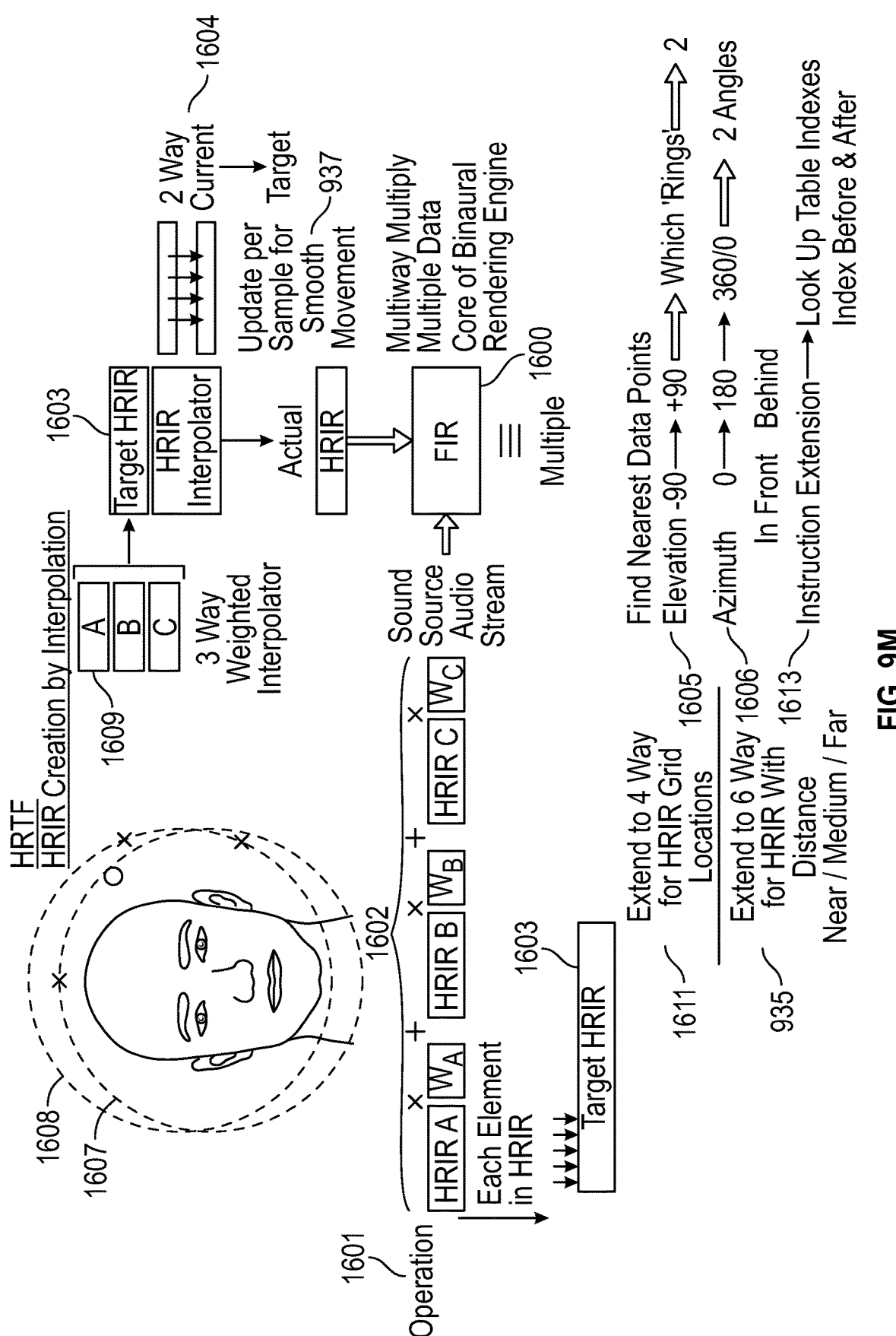
FIG. 9M illustrates an extension of the binaural rendering engine. The objective is to allow the user to easily spatialize sounds, according to some embodiments of the disclosure.

FIG. 9M illustrates an extension of the binaural rendering engine. The objective is to allow the user to easily spatialize sounds. This requires access to the audio streams and the HRIR or HRTF data. The main component of the processing engine is the multiway FIR filter block 1600, which conducts parallel multiplications 1601 and an addition. Multiple banks are needed, as for every stream that comes in, every sample of that stream has to run through the entire FIR filter and every stream needs its own set of filter coefficients for different locations. There is one set for each combination of audio and HRIR 1602, and each one creates two signals, one for the left ear and one for the right ear. Those two signals for every stream are then mixed separately. To obtain the correct HRIR data, the current filter set is interpolated to a target dataset 1603.

If a signal is stationary, meaning the user has selected one location for that sound, interpolation is unnecessary. However, if a sound source has been moving, interpolation is needed between the current HRIR and the target. This is accomplished using a two-way interpolator 1604. The first and second filter sets of coefficients are interpolated incrementally between the first and the second for each of the data values in the filter, corresponding to each of the coefficients. This can be implemented as a hardware macro, and thus occurs completely separate from the developer without their knowledge. Thus, this piece is specific to the proposed implementation and is not currently conducted in chips.

Obtaining the target HRIR requires referring back to the model of all of the HRIRs that are in the system. This will typically be a large lookup table, and each set of filters has a corresponding elevation 1605 and azimuth 1606. These represent a coordinate point around the user's head of the specific location for that filter. The filters tend to be spread out around a listener's head 1607, since all possible locations cannot be covered. Normally, there could be 5, 10 or 20 degree separations both in azimuth and elevation. To obtain the target HRIR, at least three different coordinates must be used based on the rings of data. Typically, there is a ring at each elevation level 1608. These coordinates are interpolated with the location of the target sound and the nearest actual HRIR to arrive at the filter set that describes that location. Thus, a three-way interpolator 1609 is required at minimum, which is an operation that is not currently conducted in chips.

Each type of HRIR data is weighted according to its proximity to the actual data point. The elements are added once they have all been multiplied by their weight, and this is done for every element in the HRIR dataset. Each element results in a new data value which becomes the target HRIR 1603, and this is updated as the sound source moves 937. This operation is run as a hardware macro instead of software because the software would require too many MIPS and memory, preventing other processing components from using the processor cores and memory.

The three-way interpolator can be extended into a four-way interpolator 1611 when there is a ring of HRIR data points with one point above it. Thus, it would be necessary to look at the location in between the two rings and in between two azimuth points as well. Another extension, which is a six-way interpolation 935, would allow for the inclusion of distance. As the sound source moves farther away from the user, the sound is quite different for the HRIRs at each ear, and the six-way interpolation accounts for these differences 935. Another instruction extension is to navigate the lookup table 1613. Elevation 1605 is normally captured between −90 degrees, which is right below a person, to +90 degrees all the way above them. Azimuth 1606 is normally measured from 0 degrees in front, all the way to 180 degrees in the back, and back to 0 in the front. Thus, navigating the lookup table 1613 would allow the user to find the two adjacent points at a supplied location.

Exemplary Decimator

Figure 9N:
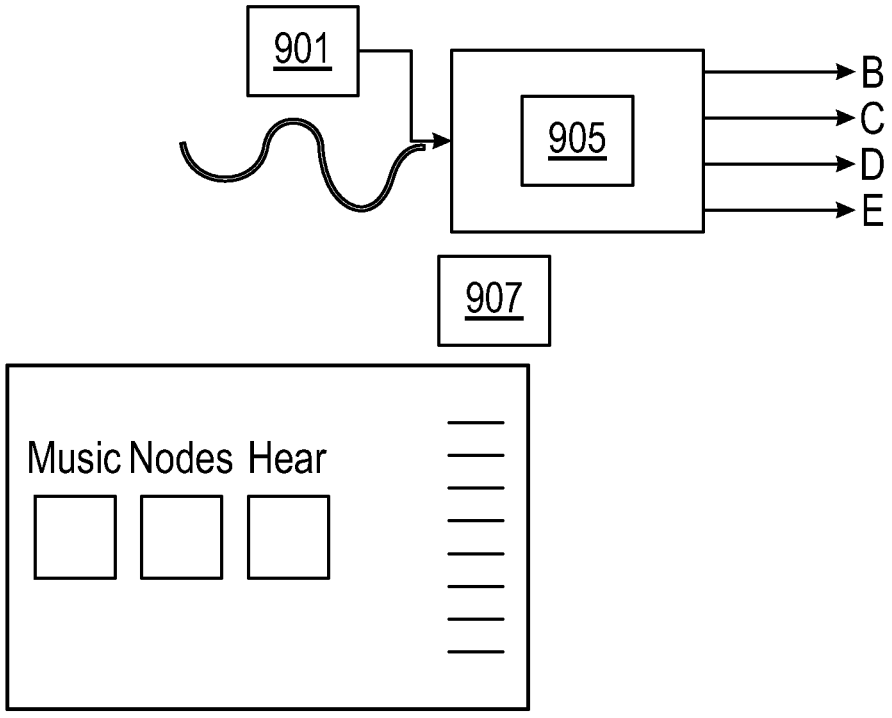
FIG. 9N illustrates an exemplary decimator that may receive one or more incoming data streams, decrease the data rate, and provide multiple outputs, according to some embodiments of the disclosure.

In some embodiments, one or more microDSPs of the audio subsystem may be programmed as a decimator. A decimator may be a multi-way data decimator. A decimator 905, shown in FIG. 9N may receive one or more incoming data streams 901, decrease the data rate, and provide multiple outputs 903. The outputs may be input to different components on the same chip. In some embodiments, the multiple outputs may have different data rates. For example, the decimator may receive an incoming data stream having a first data rate and may output a plurality of outputs having a second data rate, a third data rate, etc. In some embodiments, the outputs may have different data rates by sampling the incoming data stream at different points.

The decimator may be a single component that performs this change in the data rates and outputting multiple outgoing data streams having different data rates. The decimator may perform this change so that individual components (who receive the output going data streams) do not have to perform the data rate conversion.

The data rates may be dynamically programmed. The decimator may receive the data rate information from a signal processing component or an external device 907. For example, if a user connects an external device to the system, the decimator may change the data rate of an outgoing data stream in real-time in accordance with the connected external device.

In some embodiments, the number of outputs may be dynamically programmed.

Exemplary Development System

Figure 10A:
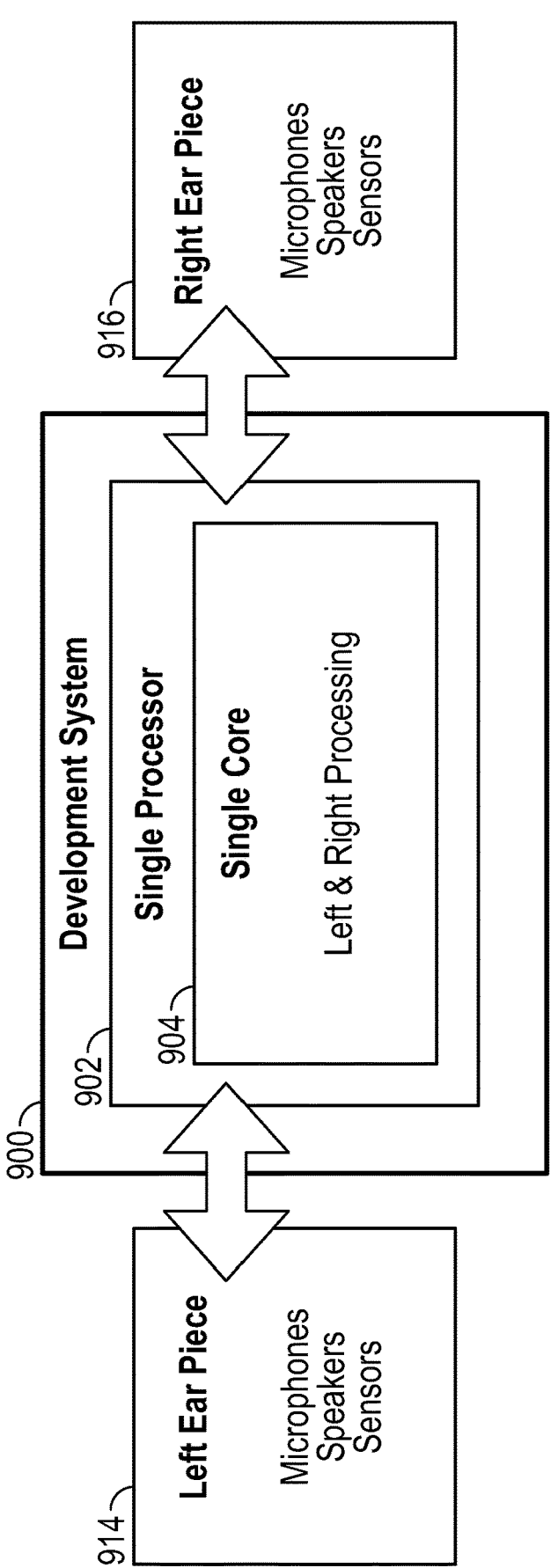
FIG. 10A illustrates an exemplary development system including a single platform with a single signal processing core, according to some embodiments of the disclosure.

In some embodiments, hardware may include development system, which may be hardware for the development phases. The development system may be for binaural audio systems, for example. One exemplary type of development system may include a single platform with a single signal processing core, as shown in FIG. 10A. The development system 900 may include a single signal processor 902, which includes a single core 904 for processing signals from both the left ear piece 914 and the right ear piece 916.

Figure 10B:
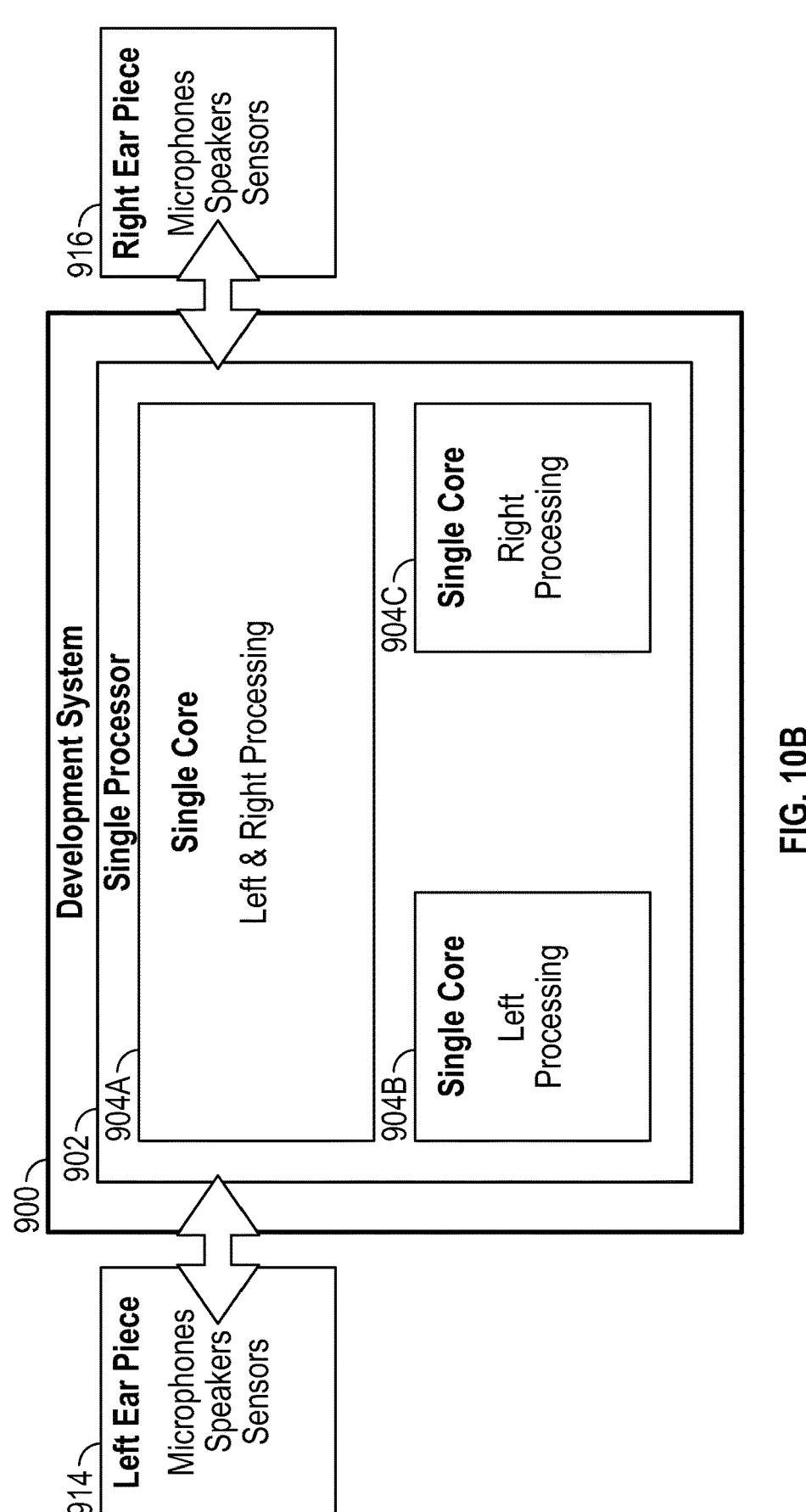
FIG. 10B illustrates an exemplary development system including a single platform with multiple processing cores, according to some embodiments of the disclosure.

Another type of development system may include a single platform with multiple processing cores, as shown in FIG. 10B. The development system 900 may include a plurality of cores: first core 904A, second core 904B, and third core 904C. The first core 904A may be for left and right processing, the second core 904B may be for the left processing, and the third core 904C may be for right processing.

Figure 10C:
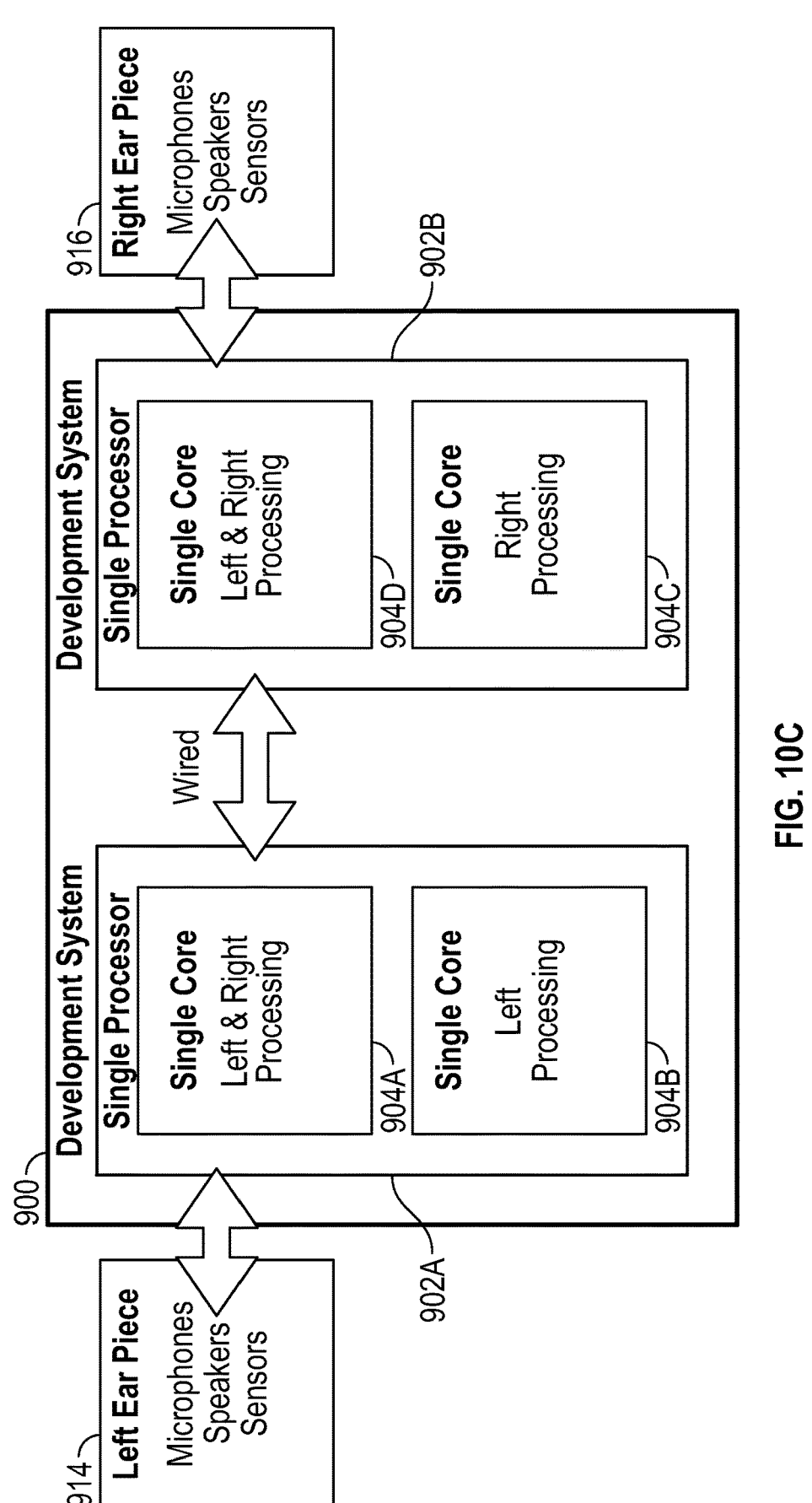
FIG. 10C illustrates an exemplary development system including a single platform with multiple single processors, according to some embodiments of the disclosure.

In some embodiments, as shown in FIG. 10C, the development system 900 may include a single platform with multiple single processors 902A and 902B. Each of the single processors may include multiple cores. The first signal processor 902A may include a first single core 904A for left and right processing and a second single core 904B for left processing. The second signal processor 902B may include a first single core 904D for left and right processing and a second single core 904C for right processing.

Figure 10D:
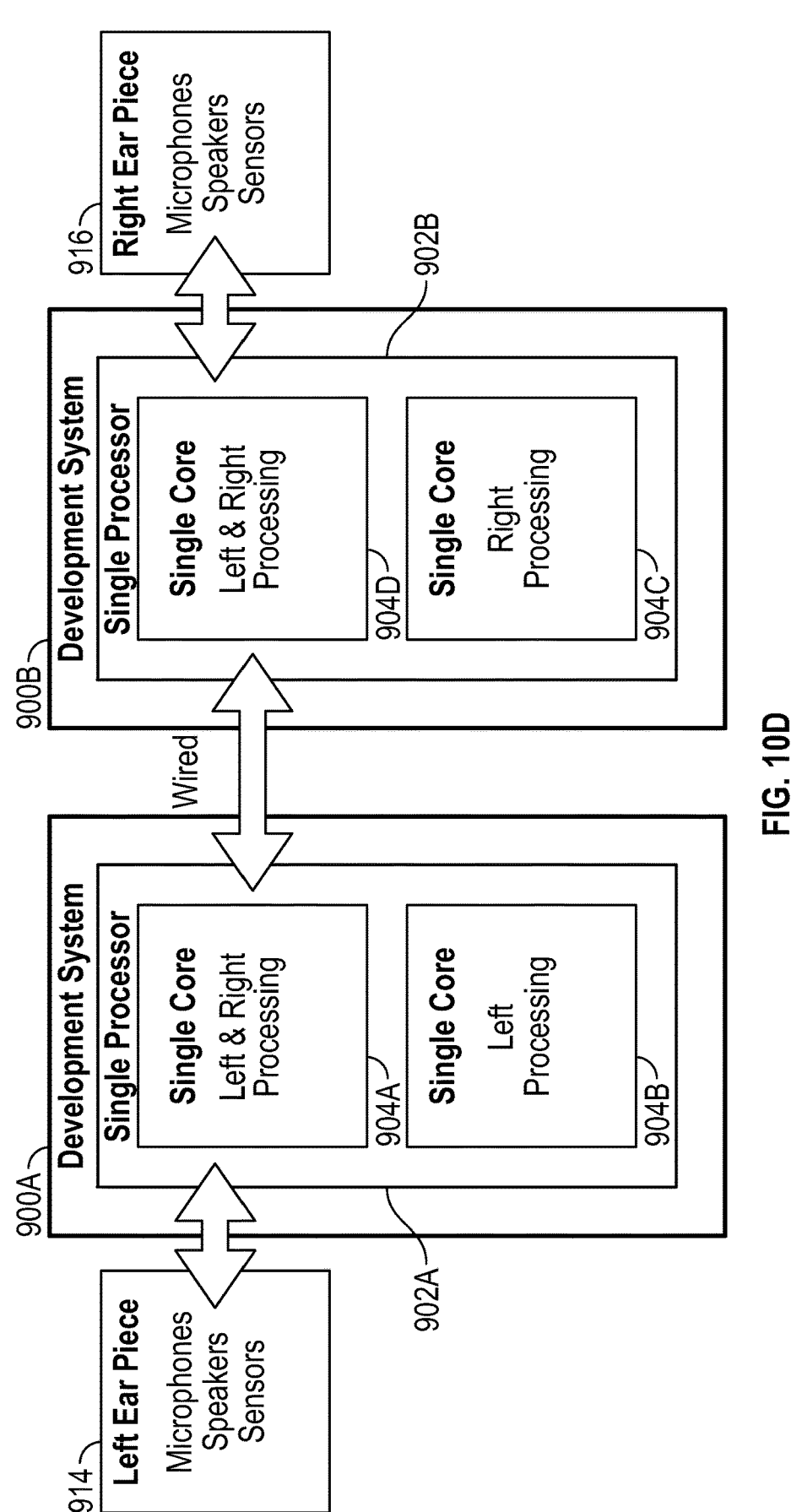
FIG. 10D illustrates exemplary development systems communicating using a wired connection, according to some embodiments of the disclosure.
Figure 10E:
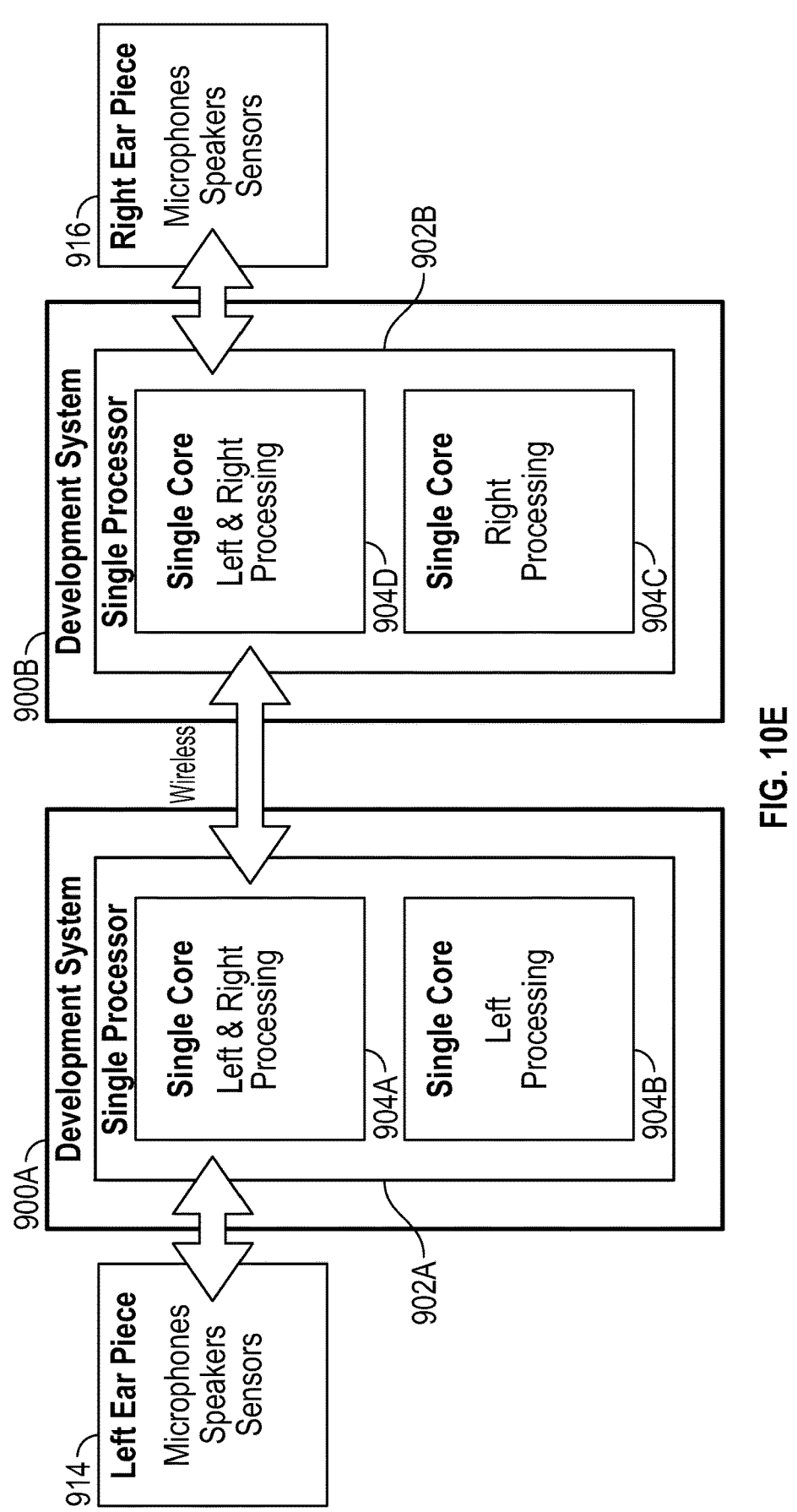
FIG. 10E illustrates an exemplary dual platform with multiple processors and multiple processing cores with a wireless connection between them, according to some embodiments of the disclosure.

In some embodiments, the development system may be a dual platform with multiple processors and multiple processing cores. The first development system 900A may be optimized for the left ear piece 914, and the second development system 900B may be optimized for the right ear piece 916. In some embodiments, the first and second development systems 900A and 900B may communicate using a wired connection, such as shown in FIG. 10D. Embodiments of the disclosure may include a dual platform with multiple processors and multiple processing cores with a wireless connection between them, as shown in FIG. 10E.

Non-real-time neural network (NN) analysis: In some embodiments, the hardware may perform non-real-time NN analysis of the audio data streams. The non-real-time NN analysis can be performed with a frame that is larger (e.g., having a longer latency) than the main signal path through the audio system. In some embodiments, each data stream may be split into a time critical component and a non-time critical component. The time-critical component may be serviced with a target latency. The non-time critical component can be serviced when processing resources allow it. The output from the NN analysis may be used to update a processor (e.g., one that uses the gains for a spectral map of the audio data stream). The non-real-time NN analysis may not be performed on every audio data stream, in some embodiments. Additionally or alternatively, the non-real-time NN analysis may be performed at a lower update rate. The NN analysis may include a higher level of granularity and/or may involve more steps when using a longer buffer of audio data. In some embodiments, different signal paths having different latency requirements may be used for the NN analysis. The NN analysis can be used in combination with real time audio NN processing.

Figure 11A:
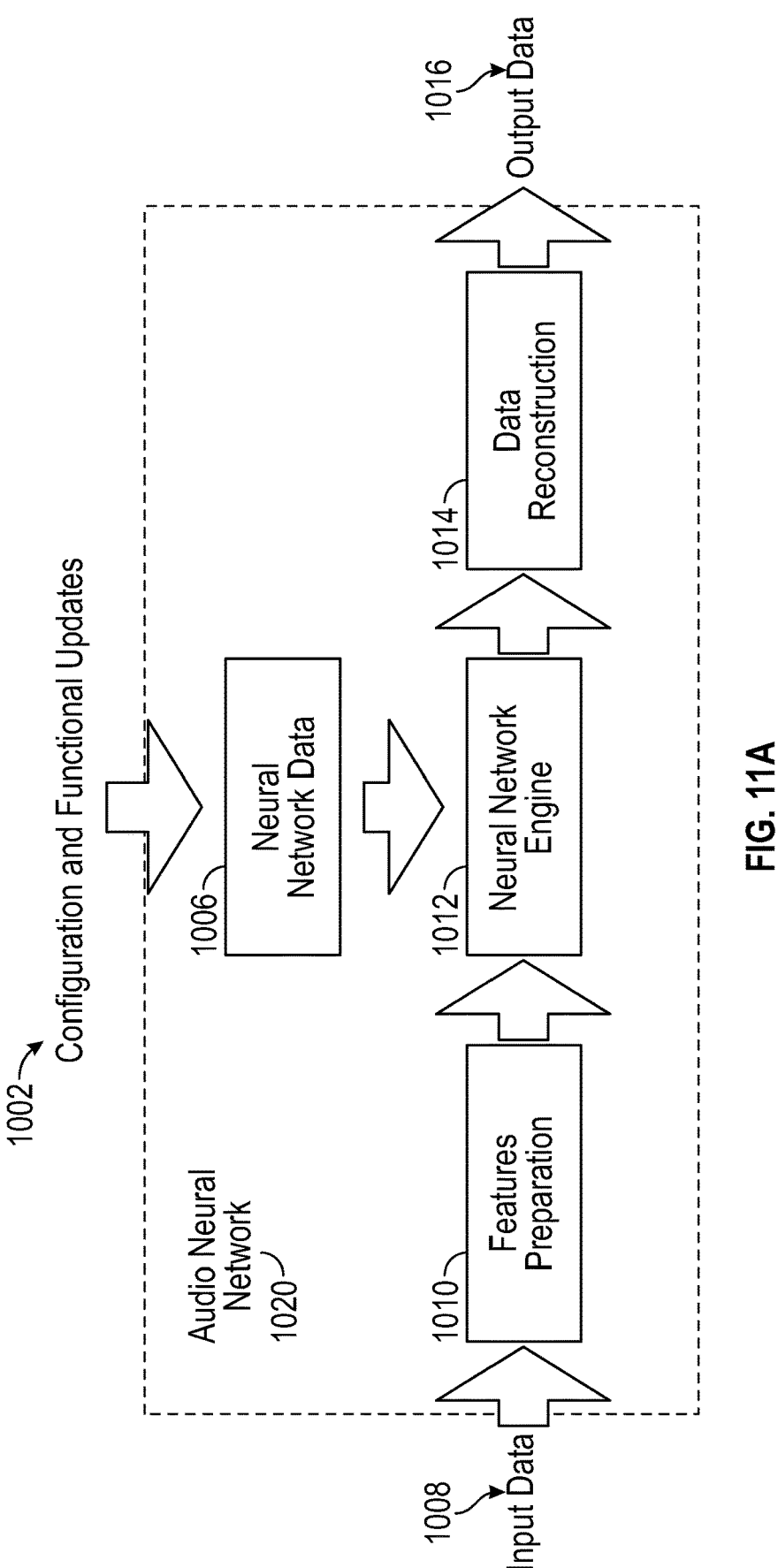
FIG. 11A illustrates an exemplary audio neural network, according to some embodiments of the disclosure.

The audio NN may be standalone. It may be configurable and updated depending on the task it is trying to perform. FIG. 11A illustrates an exemplary audio NN, according to some embodiments of the disclosure. The audio NN 1020 may receive input data 1008 and configuration and functional updates 1002. The audio NN 1020 may include features preparation 1010, NN engine 1012, NN data 1006, and data reconstruction 1014 to generate output data 1016.

The audio NN 1020 can be used within an audio signal processor. In some embodiments, the audio NN 1020 can be used in isolation, with multiple audio NNs, or with additional signal processors. The audio NN 1020 can use real-time audio data streams and can combine with other data from sensors, user interface, output from other processors, etc. For real time audio processing, the NN is combined with feature information preparation 1010 and a data reconstruction 1014 to form a larger unit of processing where real time audio data comes in 1008 and the processed real time audio data is provided at the output 1016. The unit can be placed as a plugin into a signal processing chain in the same way as traditional signal processing, such as a simple level control. The number of input and output data streams do not need to be the same and are not limited to single mono audio. For example, a stereo or binaural signal can come into the unit which creates multiple output streams that are used for subsequent processing. Another example could be a neural network based echo cancellation plugin that uses an input audio stream that potentially includes an echo signal, as well as multiple reference signals used to identify the echo. The neural network is used to eliminate the echo signals from the input audio stream to create a clean output audio stream.

NN resource reconfiguration. The performance, function, compute resources, memory resources, etc. may be changed depending on other external factors. One example is when the battery is running low in the audio system, an audio NN 1020 may be requested to switch to a lower compute mode, which may change the NN configuration, size, etc. The audio system may use memory for another plugin being loaded into the audio system. The audio system may identify which plugin is using a large amount of system resources and can request that the plugin that includes the NN 1020 switch to a smaller memory footprint, for example.

Figure 11B:
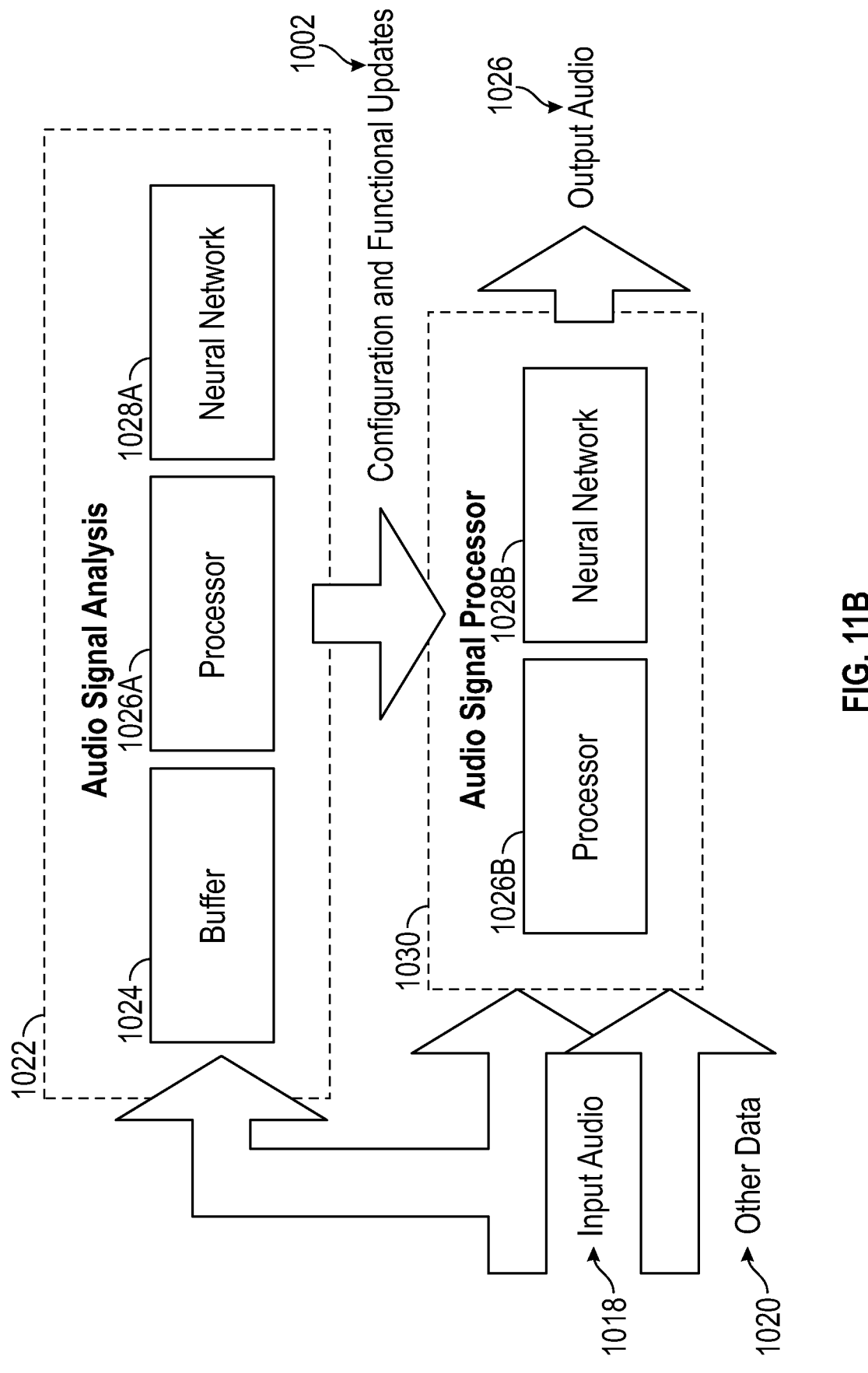
FIG. 11B illustrates an exemplary analyzer detecting the noise level is increasing around the user, according to some embodiments of the disclosure.

NN component with separate analysis components: The audio system may use an analyzer to determine external conditions on the same time frame as the real time audio processing component, or on a smaller or larger time frame. For example, the analyzer could be monitoring noise levels every few hundred milliseconds. If the analyzer detects that the noise level is increasing around the user, it may send a configuration to the audio processor to change its functions or audio NN 1020 configuration, as shown in FIG. 11B.

In some embodiments, the audio NN 1020 configuration may be such that the input audio 1018 is input to audio signal analysis 1022 and 1030. Audio signal analysis 1022 may include buffer 1024, processors 1026A, and NN 1028A. Audio signal processor 1030 may include traditional processor 1026B and NN 1028B. The audio NN 1020 may receive input audio 1018 and other data 1020, and may output audio 1026.

Configuration changes related to software modifications: The configuration changes may include small parameter updates that can happen in real-time while the audio signal processor 1030 is actively processing the audio data stream 1018. The configuration changes may be large data changes that may happen in a way that does not cause stability problems or a break in the audio processing. An example configuration change is a smooth transition in the signal processing and updating of the parameters. The signal processing architecture that uses a separate analyzer can also be an advantage for determining which components need to be inserted into the real signal processing chain and the tasks those components should perform. In addition to changing the parameters in 1026B and 1028B, the entire component of 1030 could be replaced. For example, the signal analysis component may determine that the user has moved from a meeting room with noise conditions and reverberation conditions that the real time signal processor can cope with, to now being outside and is experiencing wind noise and traffic noise.

Configuration changes related to hardware modifications: The plugin architecture and operating system flexibility can switch the processor 1030 or provide a new set of parameters to the existing component such that the signal processors have the correct configuration data and coefficients to handle the change in acoustic conditions. The change in conditions detected by the audio analysis component 1022 may also cause the real time audio processor 1030 to activate or deactivate input data streams depending on the information it uses for the new conditions. For example, when the user moves outside into a windy environment, the system may determine that improved audio processing performance can be achieved if different microphone streams are used, such as internally facing within the ear canal as opposed to external facing microphones that are more exposed to wind.

Figure 11C:
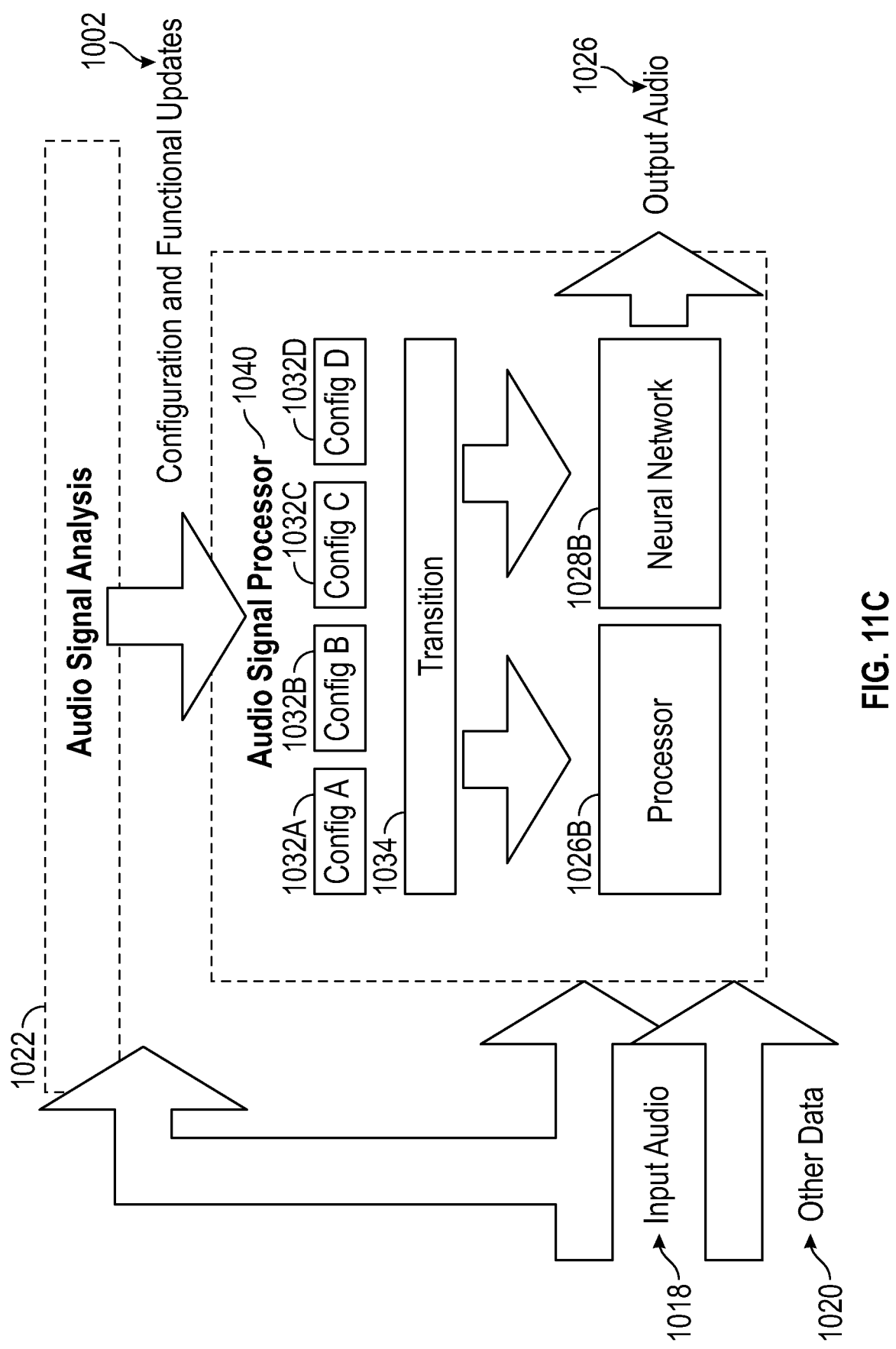
FIG. 11C illustrates an exemplary method provided to a transition processor within the audio signal processor that switches between the different configurations, according to some embodiments of the disclosure.

One method is to provide a transition processor 1034 within the audio signal processor 1040 that switches between the different configurations 1032A, 1032B, 1032C, and 1032D, as shown in FIG. 11C. The transition could be a hard switch between different banks of parameters. The selection of the parameter bank is determined by the configuration data sent by the analyzer. The transition may be processed over a longer time frame, for example, many seconds, to reduce the impact on the processed audio data stream. The transition may happen while audio is muted to prevent the parameter change causing unexpected audio output. The transition may be placed on hold until the audio processor determines there is a quiet frame of audio that includes low level audio.

Figure 11D:
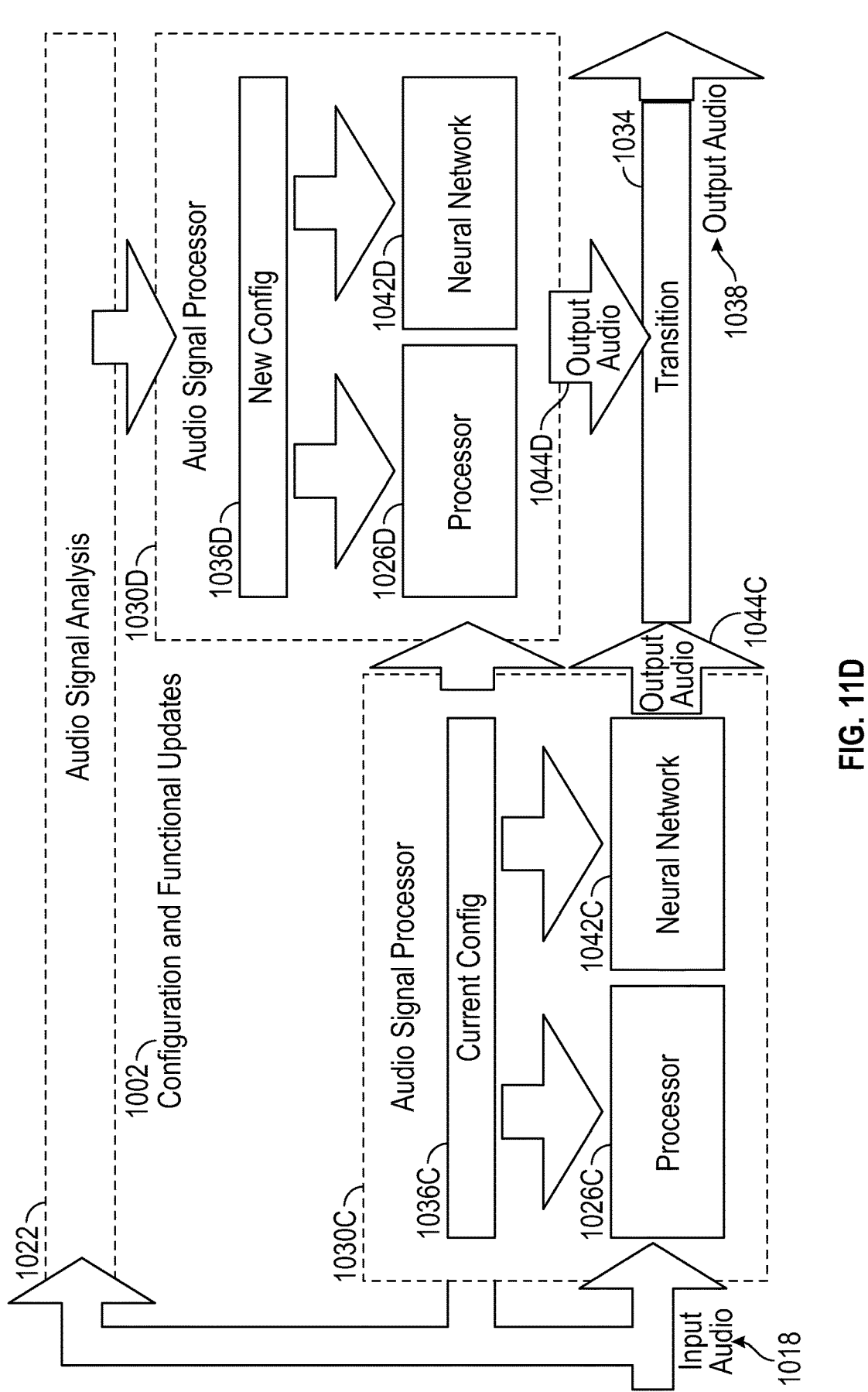
FIG. 11D illustrates an exemplary embodiment where switching the parameters in the data domain is to switch in the audio domain, according to some embodiments.

FIG. 11D illustrates an exemplary embodiment where switching the parameters in the data domain is to switch in the audio domain, according to some embodiments. In this example, two instances of the audio signal processor, a first audio signal processor 1030C and a second audio signal processor 1030D, are used. In some embodiments, only one of the instances is active and resident in the processor. In some embodiments, it may be preferred to have both instances always resident in the processor if transitions are very frequent and resources are available. When a parameter update is received from the analyzer, the inactive audio signal processor is prepared with the new data. The audio stream is connected to both the first audio signal processor 1030C and the second audio signal processor 1030D. The first audio signal processor 1030C may use a current configuration 1036C, which may be input to the first processor 1026C and the NN 1042C. The second audio signal processor 1030D may use a new configuration 1036D, which may be input to the second processor 1026D and the NN 1042D. The output from the first audio signal processor 1030C may be the first output audio 1044C, and the output from the second audio signal processor 1030D may be the second output audio 1044D.

A transition 1034 is used to merge, mix, and/or fade between the two output audio streams to create a single audio stream. When the transition is complete and the processing is now only using audio from one of the audio signal processors, the original audio signal processor can be de-activated, and its resources freed if necessary. The unused processing core can now go to sleep to save power until it is needed again. These configurations can be considered a multi-stage NN based signal flow.

The first audio signal processor 1030C may be analyzing the input audio 1018. It makes a decision and selection of second stage NN processing to be used. The second audio signal processor 1030D may use the real-time audio streams and processes them to create new output samples based on the type of NN and the coefficients that were selected by the first audio signal processor 1030C.

In some embodiments, hardware may perform multiple audio data input NN analysis. The analysis may be used for a single audio data stream, the main audio data stream, or both into the audio system. In some embodiments, the NN analysis may be used for multiple simultaneous audio data streams. In some embodiments, the multiple audio data input NN analysis may be based on data from sensors, such as a temperature sensor, a motion sensor, a heart rate sensor, or the like. For example, if the heart rate sensor data includes a first measured heart rate, the main audio data stream may include data representative of this first measured heart rate. The audio system may play music to the user that matches this first measured heart rate. When the heart rate sensor data changes to a second measured heart rate, the main audio data stream may change as well, and the audio system may transmit sound signals with music that matches the second measured heart rate.

As another example, the multiple audio data input NN analysis may be based on audio data from a temperature sensor. If the temperature, when measured (e.g., over long periods of times) every, e.g., 30 minutes, reaches a temperature threshold, the audio system may provide an audible notification to the user. The notification may be a warning, an alarm, or a voice prompt (e.g., "temperature has exceeded the upper threshold of 100 degrees"). In some embodiments, the notification may also be sent to an electronic device 406, such as a mobile phone. The temperature may be recorded with a time stamp, in some instances. As another example, the multiple audio data input NN analysis may be based on data from a motion sensor. If the motion sensor detects abnormal movement, such as shaking, rapid movement, unnatural lack of movement, falling, etc., then the user may receive a notification.

In some embodiments, data input NN analysis, e.g., recurring temperature measurement and analysis, may be a background task, while notifications of the user becomes a higher priority task. For instance, if an alarm is triggered upon exceeding a certain temperature, the system may prioritize the alarm to ensure an action is taken by the user. Notifications may be provided locally, e.g., on a user interface of the device, may be sent and/or displayed at a connected device, or may be provided both locally and on a connected device. In some embodiments, the temperature measurement may be a background task, but the notification it triggers may become a high priority task and the system ensures that action is taken. The notification can be sent to a connected device, or be handled locally, or both.

In some embodiments, information from multiple components may be used for confirming measurements. If the first ear piece measures first data and the first data meets a threshold, a message can be sent to the second ear piece. The message may cause the second ear piece to make a similar measurement of second data to see if the second data matches the first data. The measurements from first and second data may be used to confirm, e.g., temperature, movement, heart rate, noise level, or the like.

Embodiments of the disclosure may include transmitting audio data between two ear pieces, in what may be referred to as binaural audio data transfer. Audio data from a first ear piece may be encoded and packaged such that a second ear piece receives the audio data in blocks. The blocks may be used for binaural rendering. The encoding and packaging of the audio data may result in avoiding having to send compressed real-time audio data as an audio file, or at least reduce the frequency of sending this audio file. In some embodiments, the second ear piece may not use the actual time domain audio samples, and thus an additional encode and decode step may be omitted. The audio samples may be used directly and may be transferred without encoding, in a raw format, in the time domain. The audio samples may be passed through a time domain filter bank to create multiple bands of time domain samples where only some of the bands of audio information are passed to the other ear. The bands may be resampled to a lower sample rate to reduce the amount of data that needs to be transferred. For example, the audio samples may be transferred in real-time and can be included in a window or block of buffered information. The audio may be represented in other forms, such as frequency domain, compressed data, phase data, amplitude data, etc. Sending all the audio data between the ear pieces in both directions (e.g., left to right, and right to left) can lead to a significant overhead and increase in power consumption. In some embodiments, only some specific information may be sent. For example, specific information may include information related to when the audio data in the left ear piece reaches a certain level threshold, certain frequencies bands that are active, or direction information for a target region of locations, etc. The specific information that is sent may be associated with architecture options. A single device may be used to process the binaural data, but the binaural processor may not be active all the time. In some embodiments, the processing may be split and independent processors may be included in each ear piece, such that the same power and processing savings are achieved. Data may be passed between the ear pieces (e.g., when a significant event has been detected). In summary, the data transfer between the ear pieces can include, raw audio data, audio data metrics, encoded audio data streams, data condition flags, sensor data, sensor metrics, system metrics, device capabilities, processing metrics, licensing information and effectively a complete data transfer such that ear device A can perform as if it had direct access to the complete memory and processing system of ear device B.

Hardware components for ambient sound processing: Hardware may also include memory; I/O; components for latency management; DSPs and a DSP instruction set; components for multi-domain processing; one or more analog to digital converters (ADCs); one or more digital to analog converters (DACs); components for digital audio data transfers, signal routing, and framework; components for sample rate conversion and rate matching; components for synchronization; components for mixing; components for acoustic shock protection; integrated sensors; integrated microphones; integrated loudspeakers; integrated connectivity; and interfaces to multiple peripheral components and external connectivity. The hardware may also include components for expanding the functionality of the audio system. The compute instruction extensions, multi-channel audio, multiple sensors, or a combination and/or variations thereof may expand the functionality. Some of these hardware components are discussed in more detail below.

Inputs and outputs (I/O): A DSP that performs binaural signal processing may use a certain amount of I/O in order to transmit and receive audio data from multiple microphones, to multiple loudspeakers, sensors and other connectivity devices (such as USB, Bluetooth, etc.). In some embodiments, I/O may allow a first ear piece to receive wireless communications from a second ear piece. The second ear piece may transmit audio data including metadata information related to the sounds in the second ear such as binaural specific information such as ITD/ID/head related transfer function (HRTF) information. In some embodiments, the audio data sent to the second ear piece may include post-processing information. Alternatively, the DSP located in the second ear piece may process the sound signals transmitted to the second ear piece and may use auditory cues for the processing.

In some embodiments, raw audio signals may be transmitted from one ear piece to another ear piece. Raw audio signals may be transmitted between ear pieces together such that the raw captured data streams at earbud A are sent to earbud B along with associated audio information, such as processing parameters being applied to the audio stream, output processed audio signals, and other associated information about the audio. This is simpler if the binaural audio processing is happening within one physical device, or one silicon chip. The processing at ear bud B might be changed if it knows what processing has been applied at ear bud A. For example, earbud A might be dealing with a nearby noise source and does not have good clean audio from a target sound source to provide to the user. It may request audio signals from an alternative source, such as the other ear bud. Raw audio signals transferred from one or more ear pieces may be combined to produce a more accurate or complete audio output. In some embodiments, the processing parameters applied to one audio stream (e.g., an audio stream processed at a first ear piece) may be transmitted to another ear piece so that the processing parameters at the second ear piece can be adjusted according to the processing parameters received from the first ear piece. For instance, if a first ear piece has received a noisy or incomplete audio signal relating to a particular audio source, then the first ear piece may request and/or the second ear piece may transmit audio information from the second ear piece to the first ear piece so that the first ear piece can create and estimate a signal that is more "clean" or complete audio from that data source. In another example, a first ear piece may be using excessive (e.g., more than desired) or a lot of, processing resources to process audio signals from a particular audio source, e.g., because the audio source is excessively noisy. In such an example, the second ear piece may produce a superior (e.g., a more complete or "cleaner") audio signal from the audio source, and the processor may cancel or otherwise modulate the audio signal from the first ear piece to improve the user's audio. The processor may deal with the local noise source and the resulting output audio for earbud A is poor quality. Ear bud B may have much better output audio quality and the combination of the two processors may determine the best overall experience.

Canceling an audio signal such that there is full noise cancelling at a first ear piece may create a sound mute or hole in the spatial image of the audio signal, thereby requiring the second ear piece to provide the user with the target audio signal that can be used to fill in any spectral signal gaps. The system can redistribute the audio captured at each ear device to the other ear device to maintain an auditory scene that makes sense to the listener and is based on their preferences and control.

The system may be based on comparing quality metrics at each ear piece to determine the optimal combination of audio signals and processing parameters at each ear piece. Quality metrics may be based on real-time measurements using, e.g., perceptual evaluation of speech quality (PESQ) or perceptual objective listening quality analysis (POLQA) standards. Quality metrics can also be based on a NN trained on user preferences for audio performance.

In some embodiments, the I/O may be used by the DSP for binaural signal processing in a single processor or distributed to separate processing at each ear with a connection between them. The I/O may be based on speech capture or active noise cancellation or local pass through applications. The pass through applications may be for single ear or single channel conditions. The binaural signal processing may combine more inputs beyond a typical configuration. The binaural signal processing may combine the processing for the outputs to ensure the user experience is improved, compared to independently processing the sounds for each ear.

DSPs and a DSP Instruction Set: A DSP may receive real-world signals (e.g., analog signals that a user hears), converts them into a digital equivalent, and then performs processing. The DSP instruction set may define the operations that a DSP performs on these real-world sounds. The DSP instruction set may include a group or combination of mathematical operations that may be applied to input audio data (e.g., real-world signals) to generate the output audio data. For example, the DSP instruction set may include an addition operation that takes two input audio data, a first input audio data (e.g., including data A) and a second input audio data (e.g., including data B), and adds them together to generate output audio data (e.g., including data C). The addition operation can be represented as A+B=C. A bank of registers may be used to store the inputs and outputs. The registers may be linked to audio data streams, so that an instruction might be programmed to use four input registers to create two output results. The four inputs could be R1 to R4. Each register may be connected or linked to an audio stream or samples (or other representation of the audio). The multichannel audio data may then be operated on within a single instruction. Exemplary operations may include setting of operational flags, such as, but are not limited to, rounding, signed or unsigned, overflow, etc.

A DSP instruction set may have a core set of instructions that are common across many applications. In addition, there may be DSP instructions that are application specific. The application specific instructions may include various combinations of operations. For example, the multiply accumulate operation may be included in a core set of instructions used in many digital signal processing algorithms. The multiply accumulate operation may be used by digital filters to multiply a block of history audio data by a corresponding block of coefficients to generate the output audio data at a given time. The output audio data may be the accumulated sum of the multiplications.

To make the execution of an operation or a block of operations more efficient, some DSP instructions may include multiple parallel operations that may be executed at the same time. The parallel operations may result in loops of identical operations being much faster and using less operational overhead (e.g., fetching audio data in the arithmetic unit, fetching the operation opcode, writing audio data back, etc.). Additionally, the efficiency may be improved by using other techniques, such as using a local memory cache for blocks of instruction sets or processing data, such as coefficients.

In some embodiments, the operations may be ones most applicable to multiple algorithms and use cases, thereby increasing the flexibility and portability of the operations. Additionally or alternatively, the operations may be selected based on the complexity of implementation that may introduce other risks and limitations. In some embodiments, the operations for a given DSP may not be specifically designated for a given algorithm or use case, and thus it may be globally usable and not obsolete when new techniques are used.

In some embodiments, the DSP instruction set may include processing extensions. The processing extensions may be individual instructions or groups of instructions that are combined into a specific macro instruction and provide higher level functionality. One example processing extension may be a low level macro that could replace a loop that applies a gain to a block of samples. This low level macro may be used in an audio processing system. A loop and single multiplication instruction may be replaced with a single block gain operation that applies a specific gain to a block of audio samples as a single instruction. For example, the operation could be provided with a start address in memory, a gain to apply and the number of memory locations to process, e.g., MEM_BLOCK_GAIN (0x10000000, 0.3, 0x40), would multiply a block of 64 samples from memory address 0x10000000 by 0.3.

Another example processing extension may be a higher level macro that includes a max operation. The higher level macro may be performed on a block of data values, instead of comparing pairs of numbers in a loop. For example, the operation could be provided with a start address in memory and the number of memory locations to process, e.g., MEM_BLOCK_MAX (0x20000000, 0x80), which provides the maximum value of data in a 128 sample block starting at address 0x20000000, and also the sample index from the start of the block of the location of that maximum sample. A further extension of the memory block operations is to have the contents of memory block A multiply, item by item, the contents of memory block B and write the results back into memory block A. MEM_BLOCK_MULT (0x20000000, 0x30000000, 0x80), which multiplies 128 values from address 0x20000000 with 128 values from address 0x30000000 and puts the results back into the address spaces starting at 0x20000000. A further extension of the memory block operations is to have the contents of memory block A added, item by item, to the contents of memory block B and write the results back into memory block A. MEM_BLOCK_ADD (0x20000000, 0x30000000, 0x80), which adds 128 values from address 0x20000000 with 128 values from address 0x30000000 and puts the results back into the address spaces starting at 0x20000000. This can be extended to other operations such as subtract, minimum, mean, reverse order, sort order ascending, sort order descending etc. Offloading these types of memory block operations can reduce the processing overhead of a processor to do other tasks while the current task is waiting for the memory block processing to be completed.

Yet another example could be a complete functional block such as a Fast Fourier Transform (FFT) component or an encoding/decoding scheme. The processing extensions may enable certain use cases to be implemented with lower power consumption, smaller memory footprint, etc. One example use case is sub-band coding (SBC) that receives audio data and converts them into pulse-code modulation (PCM) audio samples.

The processing extensions may also enable advanced processing. One type of processing extension may be multi-lane multiple processing extensions that allow large numbers of multiply or other operations to be performed on a single clock. To allow a large number of multiply operations, the DSP instruction set may include instructions related to audio data movement. For example, the DSP instructions may be able to manage the inputs to each multiply operation.

The DSP instruction set may also include instructions to update addresses for the next iteration.

In some embodiments, the processing extensions may include instructions for the preparation of features for NN applications. For real-time audio signal processing, the features for the NN applications may be performing the pulse code modulation (PCM)-to-feature mapping. The features may depend on the information used by an NN application. For example, an NN application may be identifying a trigger word, and the features are spectral information for a block of audio PCM data, such as FFT output. Another example could be an NN application that determines ambient sound conditions, where the features are signal levels, frequency band content, and rates of level change. Yet another example could be talker identification, where the features are long term (e.g., uses a large buffer) of spectral information or multiple time windows of a filter bank output. The PCM output may then be determined using the NN output.

In some embodiments, the processing extensions may include instructions for combining standard signal processor with NN components. Standard signal processor may include, but are not limited to, filters, such as finite impulse response (FIR) and infinite impulse response (IIR) configurations, delays, dynamic range compression, expansion and limiters, gain control, mixers, filter banks. In some embodiments, the standard signal processor could be within a single plugin or within separate plugins.

In some embodiments, the DSP instruction set may include instructions for a plurality of layers processing. For example, the layers may include: processing audio data into and out of the audio system 100, audio preparation for features (real-time, low latency, time domain, spectral domain, location domain, etc.), and processing for the core processing engine (e.g., audio separation, audio enhancement, etc.). The core processing engine may be the software running on a DSP chip. In some embodiments, all layers are running on the DSP. The layers may run on multiple DSPs or multiple cores within a single DSP. The software architecture may or may not be mapped onto the underlying silicon hardware architecture Another type of instructions included in the DSP instruction set may be instructions for tile domain processing for binaural sound signals. Tile domain processing for binaural sound signals includes vector processing for tiled signals from a spatial filter. The tiles may include the time frequency components for the amplitude and phase of the left and right binaural sound signals. In some embodiments, the DSP instructions and audio data alignment can be programmed to process the components that use single instruction, multiple data (SIMD). The audio data alignment may include data being processed within a single instruction or function where the multiple channels of audio are synchronized and grouped together. In some embodiments, the data is passed to the instruction or function such that it is stored in locations in memory to allow for efficient execution of the instruction or function.

Additionally, the DSP instruction set may include instructions for HRTF indexing. HRTF data can be stored as a block of FFT data for each ear piece. The block of FFT data may include the gain/amplitude and phase for each component of the sound signal. The FFT data may be placed in memory in different layouts for easier access. In instances where a single sound signal is rendered to each ear, the HRTF data for the respective sound signal may be interleaved such that the frequency component for the sound signal(s) to each ear can be computed in parallel. Each memory location may be sequentially accessed by incrementing the memory address after each operation. An operation may be an instruction or group of instructions the processor is performing on the data. For HRTF processing, the operation may be multiplications, additions, and rotations, for example.

The DSP instruction set may additionally or alternatively include instructions for executing spatial remapping operations. In some embodiments, the spatial remapping operations may apply an amplitude (or gain) adjustment and phase adjustment. The amplitude adjustment may be a scaling process (e.g., a multiplication), and the phase adjustment may include a shift (e.g., addition with rotation). The amount of amplitude to adjust may be based on the IID. Additionally, a delta may be used to increase or decrease the amplitude or phase for the left and right binaural sound signals for each frequency component. The calculation and application of this delta could be combined into a single operation (e.g., a difference and multiplication by 0.5). The ITD and IID expansion and contraction can then be mapped into a new operation. The IID and ITD may be frequency limited, so in some embodiments, only the relevant frequency components may be processed.

Another example instruction set that may be included in the DSP instruction set relates to efficient spatial mixing. Efficient spatial mixing involves mixing only the dominant components in a binaural spatial mix of sound sources. For example, a sound A may be spatialized to the left of a listener and sound B may be spatialized to the right of the listener. Sound components of sound A may be sufficiently louder at the listener's left ear than sound B that the quieter sound cannot be heard and is completely masked within particular frequency bands. When hearing sounds, the human brain may fill in spectral gaps in a sound if there are dominant sounds at a specific location. This means that if sound A is sufficiently loud enough it is unnecessary to send any of the audio data from sound B to the listener's left ear as it simply won't be heard. In this scenario we do not need to user processing resources to prepare the audio samples for sound B for particular time windows of audio and particular frequency bands. This can provide significant savings in signal processing if a loud sound dominates the spatial scene such that other quieter sounds cannot be heard and therefore do not need to be processed.

In some embodiments, the specific location may be the perceived location of the sound source in the 3D space around the listener. As a result, not all components in a sound signal need to be re-spatialized as the sound components of the quieter sound will not be heard at the target location for the sound source. The masking based processing activation is spatial location dependent. For example, sound B may be quieter than sound A, but it can still be heard if it is spatialized to a location that is far away from sound A. However, if it is spatialized to the same spatial location as sound A it will not be heard.

Additionally, the DSP processing may determine that is it unnecessary to implement the mixing of a new sound for all frequency components. In some embodiments, the DSP instruction set may use a pre-gain mapping to determine whether to use multiplication and mixing operations. An exemplary multiplication may be used in an operation based on a signal level from a previous multiplication. For example, the audio data may be split into multiple frequency bands and it is more efficient to only process the frequency components that are contributing to the overall output sound in the mix. This can be determined by setting a flag for the data component such as a gain gate flag. This means the frequency component may be computed and mixed if the gain gate has been set. In this scenario the gain gate is triggered if the previous processing components have determined that the sound will be heard. Alternatively, the previous processing components may have set a gain for the frequency component within an audio stream such that it will not be heard and therefore no subsequent processing and mixing of that component is needed. That data component can be tagged as "no process".

Some DSP instructions can cause flags to be set in the processor. These flags are usually to indicate when an instruction causes a zero result, there is data overflow, a carry occurred, and/or the result is negative.

The flags may be stored in a status register. The status register can then be compared to determine if subsequent instructions should be executed. In some embodiments, a new customized flag may be defined (e.g., by the developer) for a block of instructions. For some operations, one or more data components may be checked against a threshold to determine whether the operation should be executed by the processor. For example, instruction A may be programmed to set the user flag based on a threshold. If the threshold is exceeded, the flag may be set. Instruction B may be only executed if the user flag is set. The user flag may be a special flag dependent instruction that can skip the instruction if flag has been set or is clear. In this manner, the comparison for every operation component may avoided and may be set based on the data value of the previous instruction, allowing a gain gate to be more easily implemented. The gain calculation operation could set the user flag if the gain threshold is exceeded. Operations that are linked to a threshold flag could be a compute operation, such as addition or multiplication, or a memory load or data move operation, where the data is only written to memory if the customized threshold flag is set.

In some embodiments, the DSP instruction set may include NN coefficient-based instructions. If an NN processor is using small coefficients (e.g., 2 bits, 3 bits, 4 bits, etc.), then a standard multiplication operation may be inefficient due to wasting a multi-bit load. The DSP instruction set may be a block of instructions used to implement a NN that includes a large number of multiplication and addition instructions. Standard multiplication instructions use the full data width of the processor, such as 16 or 32-bit wide data. For 32-bit wide operations, eight separate 4-bit multipliers can be run in parallel using the same data width and careful packing of the data. To enhance efficiency, multi-lane (parallel) multiplications may be used, where two, four, or eight multiplies are executed in parallel. A single instruction can load multiple multipliers with reduced sized registers to perform the operation. An input register may be loaded with all of the coefficients. A second input register can be loaded with all of the input data to be processed.

A further optimization of the multiplication can be used if the coefficient is a constant, quantized, fixed point number. The multiplication can be selected from a table of opcodes that are defined as a multiply by a constant, for example. The relevant opcode can be selected from a lookup table. The lookup table may include a base that represents the multiplication by one. An increment of a single opcode may be an increment in the coefficient value. These opcodes can be generated from the coefficient table. The NN may input audio data that has changed, and the coefficients may remain the same.

The DSP instruction set may include instructions for NN output transitions. The NN output transitions instructions may ensure a smooth transition between NN outputs. The NN may create an output block with parameters and performance metrics that determine the audio signal processing to be applied. Exemplary output blocks may include a block of gains, a block of frequency components, etc. In some embodiments, the NN output transitions instructions may allow the user to switch to different audio processing modes or profiles based on their preferences. For example, mode A may be used for quiet ambient sound conditions, mode B may be used in a restaurant with a lot of reverberation, mode C might be used on an airplane, mode D might be for very noisy conditions, and mode E might be used for outdoor windy conditions. Additionally or alternatively, the NN may be updated to perform a different task, or the audio data may be routed to a different NN.

A second NN may create a new batch of parameters, metrics, and/or gains. In some embodiments, the transition in the output audio data may be abrupt when switching between two output parts of the NNs, which can cause an audible glitch or click. A smooth transition ensures that the audio data gradually moves between different processing modes. For example, the gains from a first NN may be stored in a memory block. The gains that are actually applied to the output audio data may be based on the first gain block. When the gains from a second NN are available, the applied gains may be updated using a cross fade between the two sets of audio data. The cross fade ratio may be updated smoothly over time using a linear cross fade ratio, sine, or other parabolic function. The gain may be applied such that the total gain does not cause an unnatural increase or decrease in overall level. The combined gain should be applied such that there is no instability in the overall output audio data.

For example, the new combined gain could be applied in the frequency domain for each individual frequency bin of audio data and should be applied such that the inverse FFT (IFFT) does not create a large amplitude component in the waveform of the output audio data. The DSP instruction set can include a transition function that allows smooth transitions between the sets of audio data based on a gain parameter that results in a set of audio data being the output of the DSP instruction. The output of the DSP instruction may be the gain applied to the output audio data, for example. In some embodiments, the transition function can ensure that no individual gain exceeds a limit threshold. In some embodiments, the transition function may also combine with the NN mixing.

Additionally or alternatively, the DSP instruction set may use customized extensions that include instructions for filter coefficient transitions and stability checking. One instruction may involve transitions between two sets of filter coefficients. The instructions may be for infinite impulse response (IIR) filters to enable a smooth transition without resetting the history of the memory in the filter, which may otherwise cause an audible glitch. The instructions may also check the transitions of the coefficients to ensure the filter does not become unstable. For example, the instructions may check to make sure the feedback coefficients remain less than unity in value. The instructions may also check to make sure there are no rounding options that could cause the samples and the coefficients to hit or exceed the limits. In some embodiments, the instructions for filter coefficient transitions and stability checking may be applied to low frequency filtering, where the accuracy may be very important and wide data formats may be used for the coefficients, requiring wide data support for the transition instructions, such as allowing 16 bit, 32 bit or 64 bit operations.

In some embodiments, the DSP instruction set may include instruction extensions that are specific to the audio system. For example, the DSP instruction set may allow a configurable limit to be applied to a calculation, for example. An instruction can be programmed to hit a max limit based on the audio data width. The max limit may be based on the number of bits of audio data. In some instances, for floating point numbers, the output of a mathematical operation may be limited to a pre-determined value (e.g., a hard ceiling). Limiting the floating point numbers may occur in a configuration mode for the multiplication operation (e.g., limit to programmed value), or a specific multiplication instruction that applies a limit of a certain threshold. The DSP may have a configuration mode that allows instructions to be executed normally, or alternative user modes may be provided such that instructions may be executed depending on the status of certain user defined status registers. In this manner, the use of explicit comparison instructions for every data component may be avoided. Exemplary configurations modes may include, but are not limited to, normal, threshold limit, zero limit, user 1, user 2, etc. In some embodiments, the user can set the threshold. If the threshold is not set, a maximum audio data value may be used, which may result in effectively not applying a limit. Thus, an extension may ensure that signed audio data is kept within +/− of the threshold value.

In some embodiments, the DSP instruction set may include instructions for binaural operations. The binaural operations may be used by binaural algorithms that may apply signal processing operations to the sound signals to each ear piece. Exemplary binaural operations may include increasing or decreasing the difference between two numbers by a fixed offset or a scaled amount, increasing or decreasing a number based on an addition/subtraction of fixed value and wrap/rotate at a set threshold (e.g., a modulus function), and increasing or decreasing by a scaling value (e.g., multiplication) and wrap/rotate at a set threshold (e.g., a modulus function). The difference between two numbers may be stored in a corresponding memory block that may be indexed by the same offset as the input values, allowing multiple different offsets to be applied on a sample by sample basis, or to each individual frequency bin for frequency domain data.

Binaural operations may also include operations that apply a random offset (e.g., addition (within a configurable range of values, e.g., +/−0.5)) to a block of values so that audio data may not need to be processed, and instead, may be stored in memory, and operations that apply a random gain (e.g., multiplication (within a configurable range of values, e.g., +/−0.5)) to a block of values. The binaural operation may include single and dual random number generators and/or separate engines. The random number generator(s) may provide a single value or two values, one from each random number generator. A single value equal to the sum of the current random number values for each generator for different distribution functions may be provided, in some embodiments.

Embodiments of the disclosure may also include binaural operations that apply two different offsets (e.g., additions) to two input audio data in parallel. Another type of binaural operation may apply two different gains (e.g., multiplications) to two input audio data in parallel. The input values could be included in left and right sound signals, or the signals from two microphones. The two offsets can be different adjustments to the audio data that are applied in parallel using multiple instruction, multiple data (MIMD). Other compute and data manipulation operations can also be implemented using this method. This allows two streams of data to be processed together using single operations to ensure the results of the operation are available at the same time. This assists with reducing latency of audio through a system. This also simplifies the system architecture as it avoids the need to have two or more separate and synchronized processing cores that are processing data for each stream separately and then need to be routed and combined for output preparation, such as to a left and right loudspeaker.

Components for multi-domain processing: In some embodiments, audio data may be processed in different domains, depending on the specific algorithm, signal path, or both. In some embodiments, multiple domains may be used and combined, in what may be referred to as multi-domain processing.

Figure 12A:
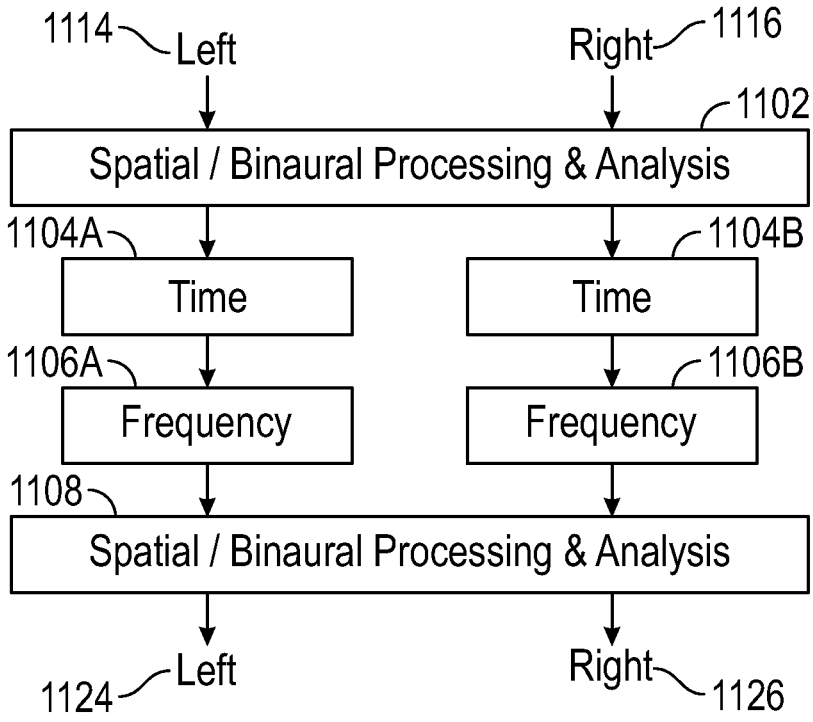
FIG. 12A illustrates exemplary multiple domains, one for each ear piece, according to some embodiments of the disclosure.

FIG. 12A illustrates exemplary multiple domains, one for each ear piece, according to embodiments of the disclosure. This illustrates a simple example of how the modular architecture of software components, signal processing plugins and silicon blocks on a chip can provide a flexible signal processing platform. For example, a system may require multiple input signals to be analyzed and processed, such as for a binaural capture processing component to make sense of ambient sounds around a listener using multiple microphones and sensors. This information and audio data is passed to separate components for processing the audio for each ear piece independently. This processing can consist of multiple sequential components using time domain or frequency domain based plugins. The number of plugins and processing domains can be different at each ear, this example shows one time domain (1104A and 1104B) and one frequency domain (1106A and 1106B) processing component for each ear. The data may then be recombined for a final output stage that is working on both the left and right audio streams together, for example to create a binaural rendering using spatialization functions and mixing functions. The modular architecture also allows components to be easily inserted or removed from the signal chain. It allows multiple types of processing to be applied to the signals. It allows separate signal paths to be routed to different components for analysis and decision making tasks in one domain, while the audio data is being processed in a different domain. For example, detailed analysis of a signal may be performed in the frequency domain using large blocks of data, which requires buffering and latency that may not be acceptable to the main signal path. Therefore the processing of the audio samples is carried out in the time domain using information gathered from the frequency domain analysis.

Figure 12B:
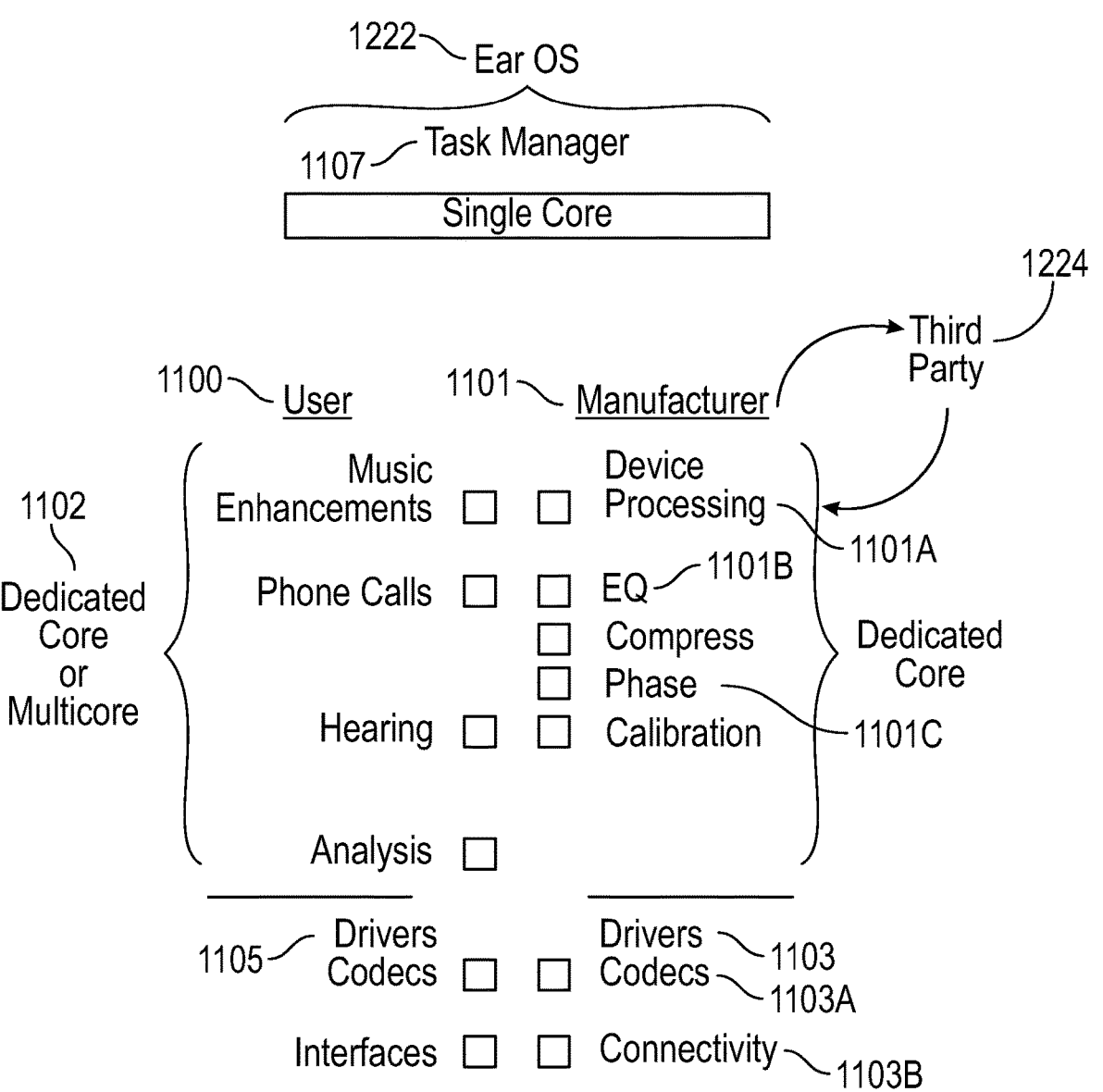
FIG. 12B illustrates the two main processing buckets that need to occur in the chip and in the software stack, according to some embodiments of the disclosure.

In some embodiments, the plugins may be specifically separated between user and manufacturer. FIG. 12B illustrates the two main processing buckets that need to occur in the chip and in the software stack.

There are two distinct areas, one for the user 1100 and one for the manufacturer or the device component manufacturer 1101. The user can download plugins into their space which may run on a single core with all the other processing, or it may have a dedicated core or even multiple cores 1102. This is separate from all the tasks that are allocated to the manufacturer's device processing 1101A. The manufacturer's tasks may include equalizing the microphones and speakers on the product 1101B, understanding the phase alignment of acoustic components 1101C, and other tasks that are specific to the individual device and its structure. It also includes the drivers 1103, which encompass MP3 or AAC decoding 1103A, or connectivity for Bluetooth or other sensor chips that are part of the hardware 1103B. The drivers may be upgradable, but they tend to be fixed. These components 1101, 1103 are created by the manufacturer or updated by the manufacturer when the device is in the field.

Alternatively, they may be updated by a third party 1224 to provide upgrades on the manufacturer's behalf for their specific piece of hardware.

The user can also update drivers 1105 in order to gain access to sensors or additional microphones. Either the manufacturer or the user can purchase upgrades to all of these features. This allows either the manufacturer or the user to gain access to pieces of hardware that may not be enabled at the time the device was purchased but may be enabled if the relevant license key is downloaded.

The operating system 1222 manages all of the individual tasks for each of the plugins, whether they are on the user side or the manufacturer side. Latency and all resources allocated for each plugin are managed by the EAR OS task manager 1107.

In some embodiments, multi-domain processing may use multiple processing cores. In some embodiments, a first processing core may be used to perform NN analysis at a first time frame. The NN analysis may be used to determine the processing or gains to apply to audio data by the second processing core at a second time frame. For example, the low latency path may be running at a high sample rate (e.g., 384 kHz, 768 kHz, etc.). A filter bank may be used to create multi-band separation of an audio data stream in the time domain. The multiple audio streams of the time domain filter bank can be transferred to multiple processing components that are informed with analysis data from frequency domain analysis.

Figure 13A:
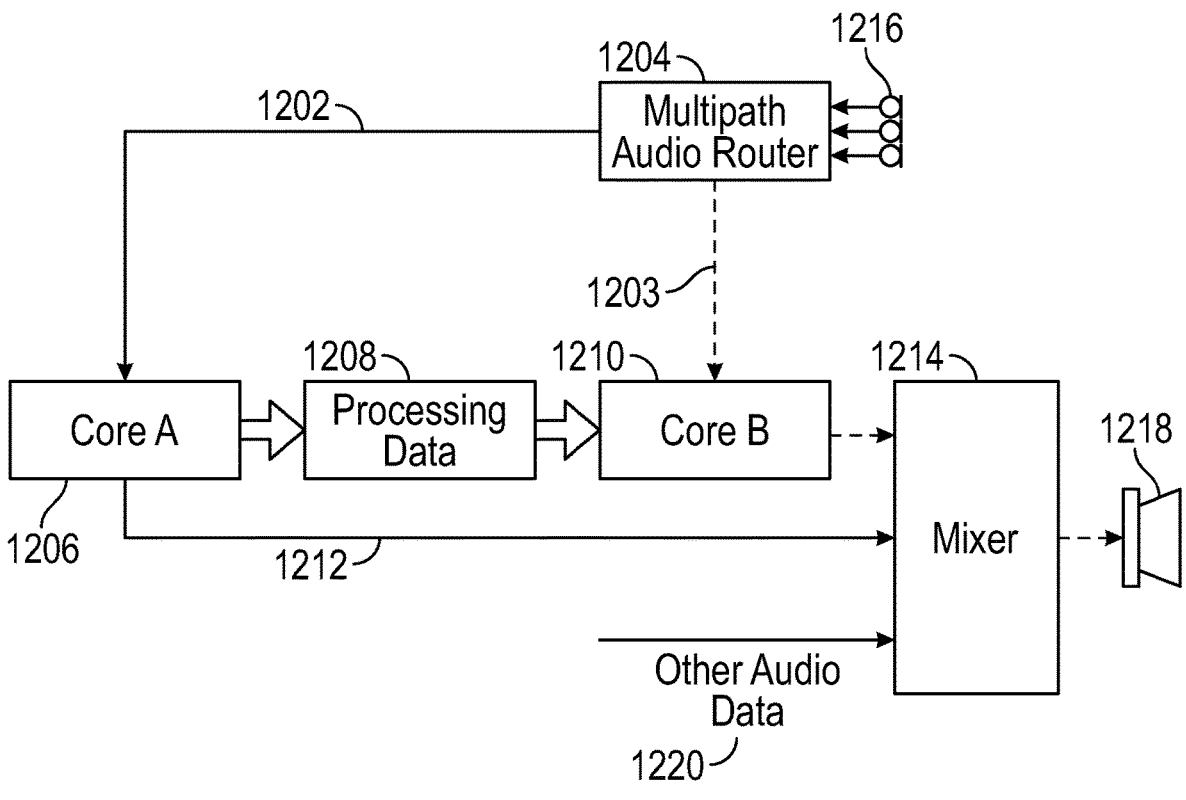
FIG. 13A illustrates an exemplary multicore processing architecture, according to some embodiments of the disclosure.

The multicore processing architecture is shown in FIG. 13A. Single or multiple microphones are attached to the system. Data from microphones 1216 may be programmed and routed through a processor, shown as a multipath audio router 1204. The output of this processor provides audio streams at different sample rates, for example, using a multipath decimation component. A processing core may use multiple data streams at different sample rates. Multiple cores can be used with multiple data streams. The example shown in the figure has a first core 1206 that is analyzing a first audio data 1202. The first audio data 1202 may have a standard sample rate, such as 48 kHz, and normal latency, for example. The output of the analysis could be processing data 1208 (such as processing parameters, filter coefficients, or other metrics based on the content of the audio). The processing data 1208 could be passed through a frequency domain processor or a filter bank. The analysis could be based on an NN processor.

The multipath audio router 1204 may output a second audio data 1203. A second core 1210 may be processing the second audio data 1203, which has a different sample rate, for example, 768 kHz. The second core 1210 could be using the same instruction set as the first core 1206 or it may have a different instruction set, for example, with a different data resolution to allow more or less accuracy in the processing calculations. It may have a very limited instruction set to only perform the low latency processing functions. It may use a different power profile for the first core 1206 so that it can efficiently be running while the first core 1206 is asleep. In some embodiments, the first core 1206 and the second core 1210 may not be active at the same time. The processing by the second core 1210 uses information in shared memory that is updated by the first core 1206. The second core 1210 may also be performing its own analysis functions as well. The second core 1210 may use the same or a different filter bank. For high sample rate audio streams, the second core 1210 may process a narrow range of frequencies in the audible range, such as up to 20 kHz. The mixer 1214 may process audio from the second core 1210 and mix it with other audio streams 1220 from other components in the system, including the audio stream 121 from the first core 1206. The mixer 1214 may output the mixed audio streams to a loudspeaker 1218. The overlapping filters from the time domain filter bank are independent to this application, the developer can choose the frequency ranges of the individual filters within the filter banks. It is up to the developer to map the frequency information from the first core 1206 to the second core 1210 with audio data at different sample rates.

In some embodiments, audio data at very high frequencies may not be split into small blocks of data. For some applications, such as an audio application, certain high frequencies (e.g., above 20 kHz) can be ignored. In some embodiments, frequency separation filters having different sizes, widths, or both may be used. Using filters with different widths may enable much more efficient processing of the audio data stream, for example. The signal path for analysis can be processing on a different processing core. In some embodiments, the signal path for analysis may run at a different sample rate, a different update rate, and/or a different audio data resolution to reduce processing overhead. The analysis path may be processed in the FFT domain or another domain (e.g., a time domain filter bank). The processing of the frequency domain data can be adjusted based on information provided with the data stream. For example, the audio data may be provided at a sample rate of 48 kHz, but it has been upsampled from 16 kHz, which limits the audio information within the data stream. This information can be provided to subsequent processing components so that only the bands containing useful audio data need to be analyzed and processed in the frequency domain or streams from a filter bank.

A separate audio data stream (based on the same input audio data) may be running slower (e.g., 48 kHz) and may be processed by a FFT/IFFT block. The output gains and phase of the FFT may be passed to another processor (such as NN for signal separation) to determine the gains to be applied to the audio data stream. The FFT-based gains may then be mapped to the target frequency bands for the filter bank. Mapping to the target frequency bands may adjust the audio data streams in the low latency time domain based on the FFT domain analysis. The gains may then be smoothed using a gradual transition within each filter band. In some embodiments, smoothing the gains may be combined with the ultra-low latency processing of the time domain filters at a higher sample rate. The FFT-based gains may also be used as a filter bank to calculate the amplitude of each of the filter outputs (for each frequency band). In some embodiments, the amplitude of each of the filter outputs may be determined by calculating the average absolute value of the samples in a window, and then using those gains as the input to the NN. The NN size can be adjusted based on the range of frequencies that are analyzed. In some embodiments, the NN size may not be adjusted for every frequency in the entire audio bandwidth, for example, the NN may only be used for certain frequency bands within the full band of the signal. The selection of the bands may be based on content, user preference, user hearing profile, ambient sounds, other sensor information or other analysis information in the system.

The data routing can be determined by the intended application, plugin and processing needs of the system. For example, data at different sample rates can be routed to difference plugins. In addition, data can be captured at a single sample rate such as 48 kHz and then passed through a filter bank to split the signal into multiple frequency bands. Only the relevant bands of audio are then routed to the different plugin processes. Plugin A may only require audio information up to 12 kHz, so only the lower bands of filtered data are passed to that plugin. Plugin B may require audio information up to 24 kHz, so all the audio bands are passed to that plugin.

Components for audio data transfers, signal routing, and framework: Software or hardware may be used to prepare audio data streams that are being input to and output from a silicon chip. When hardware prepares the audio data streams, the audio OS, the DSPs, and the space for instructions may be freed up due to the software not having to handle audio data transfers. Audio data transfers may include accessing audio data from memory. Although functionalities described below are described as being performed by hardware, examples of the disclosure may include software performing one or more of the same functionalities.

In some embodiments, hardware may be capable of allowing multiple audio data streams to be input to or output from the chip simultaneously. The audio data stream can include different audio formats, sample rates, latency paths, processing demands, or the like.

In some embodiments, the framework may implement an automatic ramping function when the transfer of audio data streams start and stop. The automatic ramping function may be implemented using fade in and/or fade out to prevent sudden large spikes and clicks in the sound signals.

The inputs and outputs may be synchronized. For example, hardware may group audio data samples into audio data streams on the same clock tick. Hardware may also resample audio data streams to change the data rates. In some embodiments, hardware may also synchronize the slaves and masters of the clocks to allow multiple formats to be synchronized.

In some embodiments, the audio data streams that are synchronized may include at least one analog audio data stream and at least one digital audio data stream. For example, if the audio system includes a digital microphone using pulse-density (PDM) audio data at 1 MHz to 4 MHz, or an I2S PCM microphone at 48 kHz, the hardware may synchronize the master input to other I/O on the silicon chip.

In some embodiments, audio data streams may be processed through an analog to digital converter (ADC) included on a silicon chip. Analog digital conversion may be synchronized with one or more master clocks. The ADC may be clocked from an external audio source, for example. The system may include multiple clock domains (one internal, more than one external on the same system), where the clocks are internally matched to allow the core to do the processing in a synchronized manner. For example, the device may have an external codec for microphones at rate A, Bluetooth streaming at rate B and USB data stream at rate C and internal audio processing and output codec at rate D. System may be running at local clock D for all internal processing. ASRC may be used to match the external data streams to the local rate. The ASRC component may use different configurations and parameters for each of the different data rate matching processes.

The audio system may be configurable so that there are multiple master clocks, for example, one or more internal and/or one or more external clocks. One example master clock could be the internal clock of the silicon chip for a first I/O group (e.g., used for the ADC). Another example master clock may be an external clock source, such as a digital PCM input stream on I2S that is the master clock for a second I/O group. Yet another master clock may be an external clock for the digital output to an external codec or electronic device on I2S for a third I/O group. The clocks may be internally matched to allow the core to process the I/O data streams in a synchronized manner. In some embodiments, an external codec may be included for processing, e.g., a microphone data stream at first rate, a Bluetooth data stream at a second rate, and a USB data stream at a third rate, while the system runs internal audio processing and output codec at a fourth rate. In such an example, an asynchronous sample rate converter (ASRC) may be used to match the external data streams to the local rate to synchronize processing of the data streams. In some embodiments, one master clock could be used for the internal DAC outputs that are also using the same clock as the first I/O group. In some embodiments, at least two of the clock groups could operate at different sample rates.

In some embodiments, multiple hardware components may be made available for different inputs and outputs. In some embodiments, at least two hardware components may operate simultaneously. In some embodiments, at least one of the hardware components coordinates with the internal digital audio streams from an analog block and also with external digital sources coupled to the silicon chip through a digital interface.

Hardware, such as a processing core, mixer, or a low latency macro, may be connected to a desired I/O data handler to facilitate input capture and transfer, input data preparation, data processing, output data preparation, and/or output data transfer. In some embodiments, a software-defined routing matrix is used to route data from a data source through the hardware and to a data destination, such that the data inputs and outputs to the hardware processor are not fixed based on a predetermined use case.

Extension: A hardware component, such as a processing core, mixer, low latency macro, etc., can be connected to any input and output data handler component. The general architecture for the system is input capture and transfer, input data preparation, data processing, output data preparation, output transfer. The software defined routing matrix allows a hardware processing component to be connected to any data source and data destination. In some embodiments, the software defined routing matrix is not fixed based on a predetermined use case (such as music streaming or phone calls).

Figure 13B:
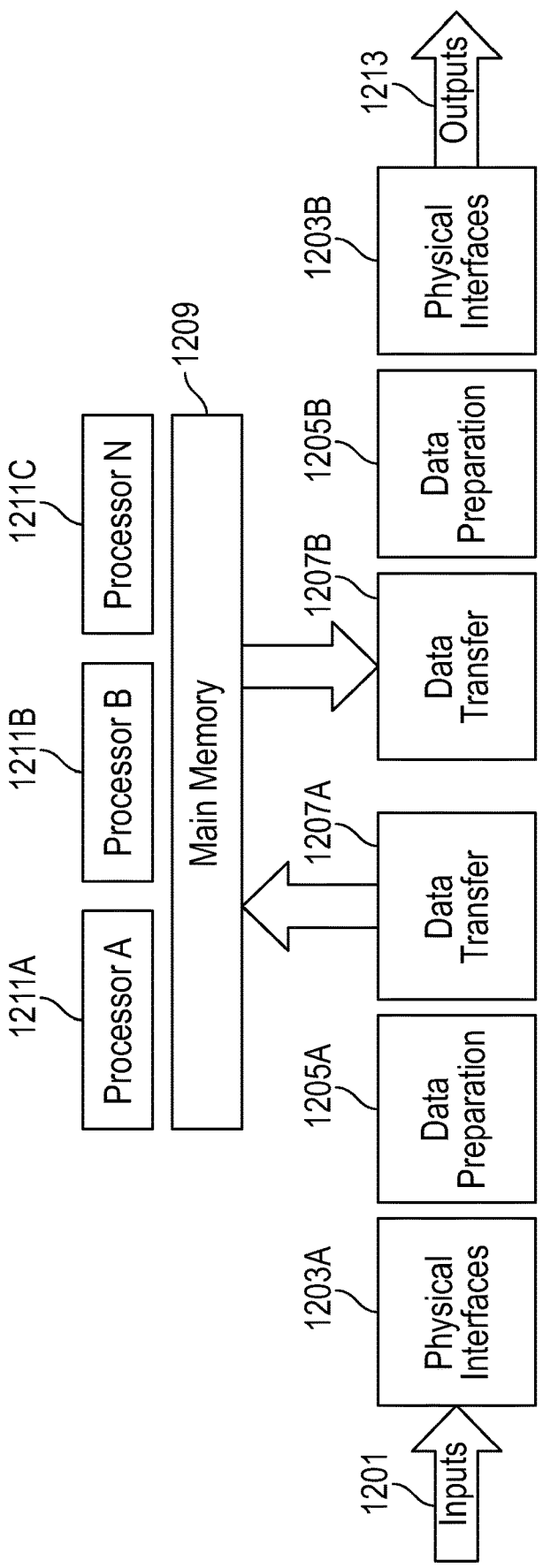
FIG. 13B illustrates an exemplary data flow, according to some embodiments of the disclosure.

FIG. 13B illustrates an exemplary data flow. The physical interfaces 1203A, such as microphones, sensors, data connections to RF components, etc., provide raw data as inputs 1201. The system may prepare the data at 1205A, which may include converting this data into a more usable format, unpacking or packing into different data streams, reformatting into different data widths, etc. The system may transfer that data at 1207A to main memory 1209. One or more processors 1211A, 1211B, or 1211N may be able to access the data in main memory 1209. The data flow may also include similar data transfer 1207B, data preparation 1205B, and physical interfaces 1203B for generating outputs 1213.

Figure 13C:
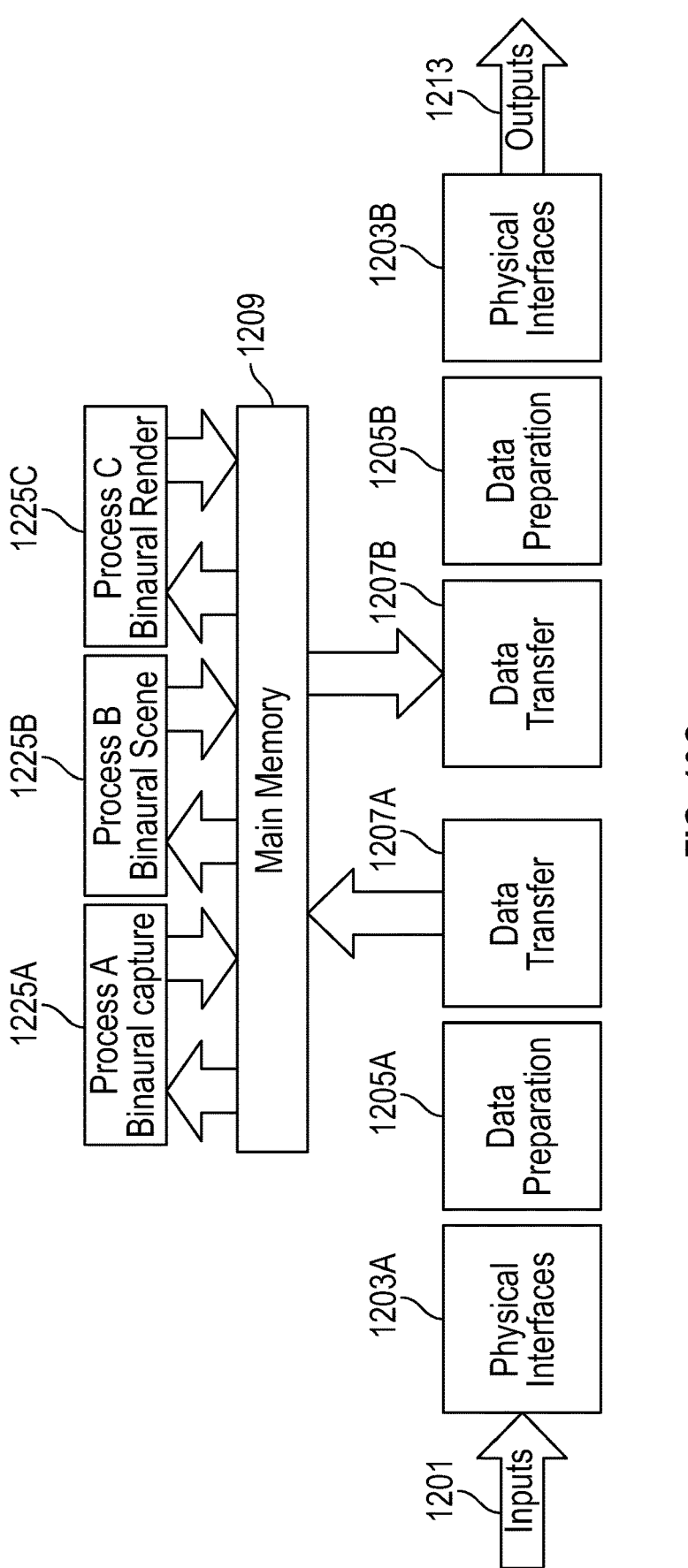
FIG. 13C illustrates an exemplary extension of the data handling architecture implemented using multiple dedicated processing cores, according to some embodiments of the disclosure.

An extension of the data handling architecture can be implemented using multiple dedicated processing cores, as shown in FIG. 13C. This can be illustrated with a binaural processing system that has separate processing macros: process A 1225A for capturing binaural sounds, process B 1225B for manipulating the binaural scene, and process C 1225C for creating the binaural render for output to the user's ears.

Embodiments of the disclosure may include configuring a single analog-to-digital converter (ADC) input to generate multiple synchronized outputs. For example, the ADC may pass audio data at high data rates (e.g., 384 kHz) to a low latency DSP and may simultaneously pass the same audio data at a lower sample rate (e.g., 48 kHz) to a voice input processing plugin. In some embodiments, the ADC may pass a plurality of separate audio data streams, a first data stream may have a low latency path (e.g., having a sampling frequency of 384 kHz or 768 kHz), a second data stream may have a high quality hearing path (e.g., having a sampling frequency of 48 kHz), and a third data stream may have a speech communications path for phone calls and voice assistants (e.g., having a sampling frequency of 16 kHz). The ADC output may be resampled to create other data rates, in some embodiments. In some instances, a single ADC channel may be synchronized to other ADC inputs so that the samples created are in phase with each other. The ADC channels can have independent gain controls in analog and digital domains. In some embodiments, the gain changes, the start and stop triggers, and other parameter changes may be synchronized to each ADC input, for example, stereo gain may be applied to the channels at the same time.

The ear worn device may have performance requirements related to data handling of certain data inputs and data outputs. For instance, some data may be received as a continuous stream of digital samples or analog signals, while some data maybe received in bursts. Some data uses very fast processing and transfer to the next operation stage, e.g., for low latency applications, while other data uses large buffers for long term analysis. Data inputs and outputs may be received and processed at various data rates and formats. The data rates and formats can be different between the inputs and the outputs. Some systems provide fixed data paths. Other systems provide limited configurations of data paths. To facilitate handling of these various data types, the ear computer architecture may include a software defined data transfer matrix that is fully configurable and dynamic based on the requirements for handling a particular type of data.

Figure 13D:
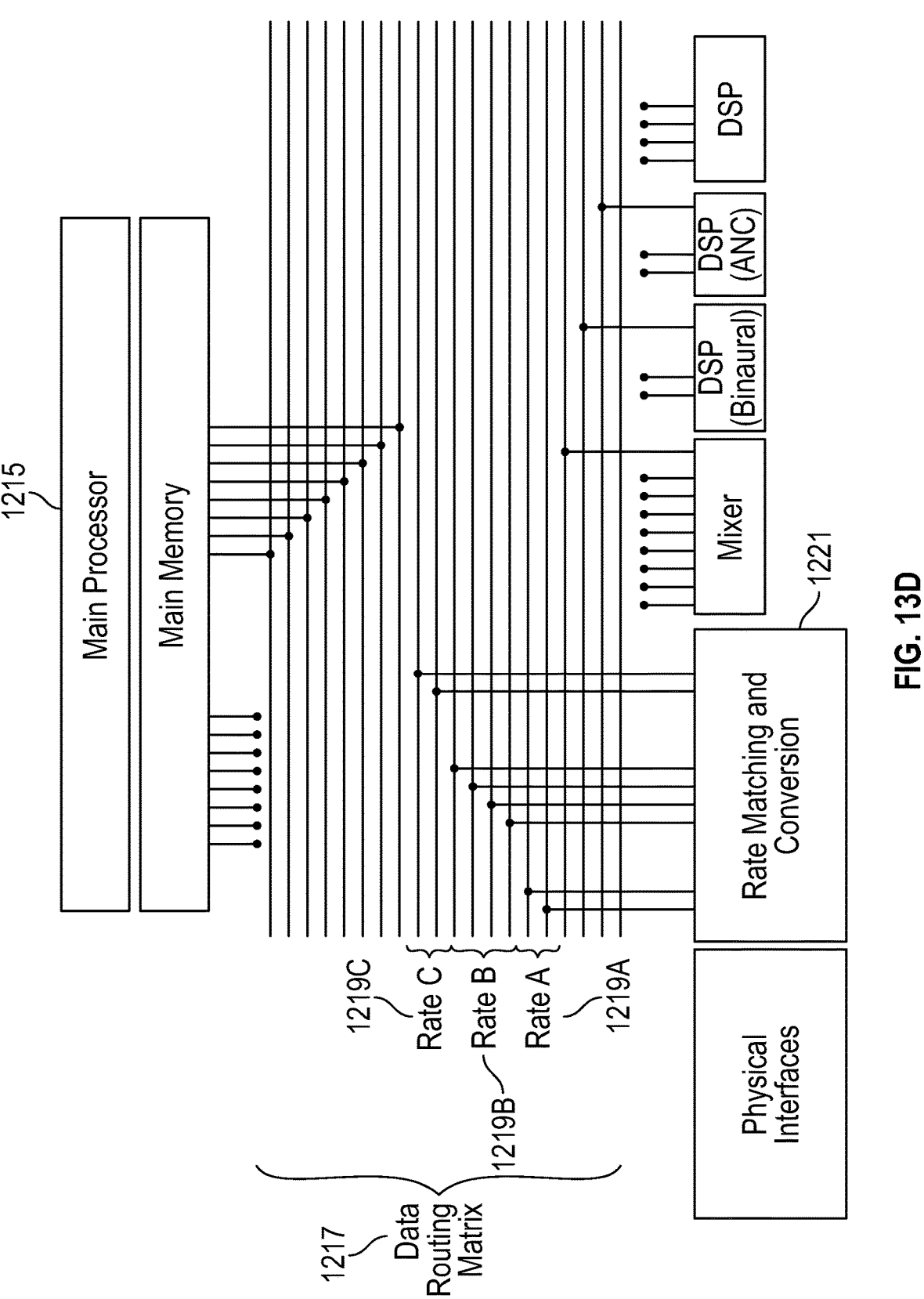
FIG. 13D illustrates an exemplary software-defined computer routing matrix architecture for processing variable data inputs and outputs, according to some embodiments of the disclosure.

FIG. 13D illustrates an example software-defined computer routing matrix architecture for processing variable data inputs and outputs, according to embodiments of the disclosure. The software defined data routing matrix 1217 allows for the processing of multiple data streams simultaneously and may function independently from the main processor 1215.

For example, the software defined matrix 1217 may process multiple data streams to be handled simultaneously without requiring the main processor(s) of the silicon chip to be fully activated and powered up. The multiple data streams may have different data rates 1219A, 1219B, and 1219C. A rate matching and conversion 1221 may be used to convert and match the data rates. Data transfers may be handled by dedicated hardware to reduce overhead on processing resources. The data transfers through the system may be programmed, set up, and initiated to run as needed without continuous servicing and instructions from additional processors.

In some embodiments, the main processor 1215 or the operating system running on the processor, or another processor may initiate the data transfer or configure various aspects of the data transfer, e.g., the source or destination of the data transfer, processing to be applied to the data en route, any packing or unpacking etc. In some embodiments, the main processor 1215 or another processor may initiate the data transfer or configure various aspects of the data transfer, e.g., the source or destination of the data transfer, various processing parameters to be applied to the data, or other information associated with the data. Software may make adjustments to the data and reconfigure aspects of the data transfer.

In some embodiments, the data transfers through the silicon chip may be controlled such that they do not prevent other processes from executing. Embodiments of the disclosure may include using a direct memory access (DMA) process for data transfers into and out of the silicon chip. The data transfers may be flexible to reduce overhead of getting data into, through and out of the chip. The standard DMA process may be modified to allow for highly optimized data streaming, such as for low latency real-time systems.

In some embodiments, the overhead of data transfers can be assigned to separate direct memory access (DMA) engine that manages the movement of data, in parallel with the signal processing that is being performed in the DSP core. Some systems use DSP instructions (and valuable clock cycles) to move data from a first memory bank A to a second memory bank B, for example. The data movement can be taken care of by a DMA engine, where it can be programmed to move N bytes from a first address A to a second address B. The data stream can be optimized as very simple DMA processing can be used to extend the usage of the DMA engine even further. For example, requesting the DMA engine to copy N bytes of data from the first address A to the second address B and a third address C at the same time, allowing two identical copies of data to be generated.

Figure 13E:
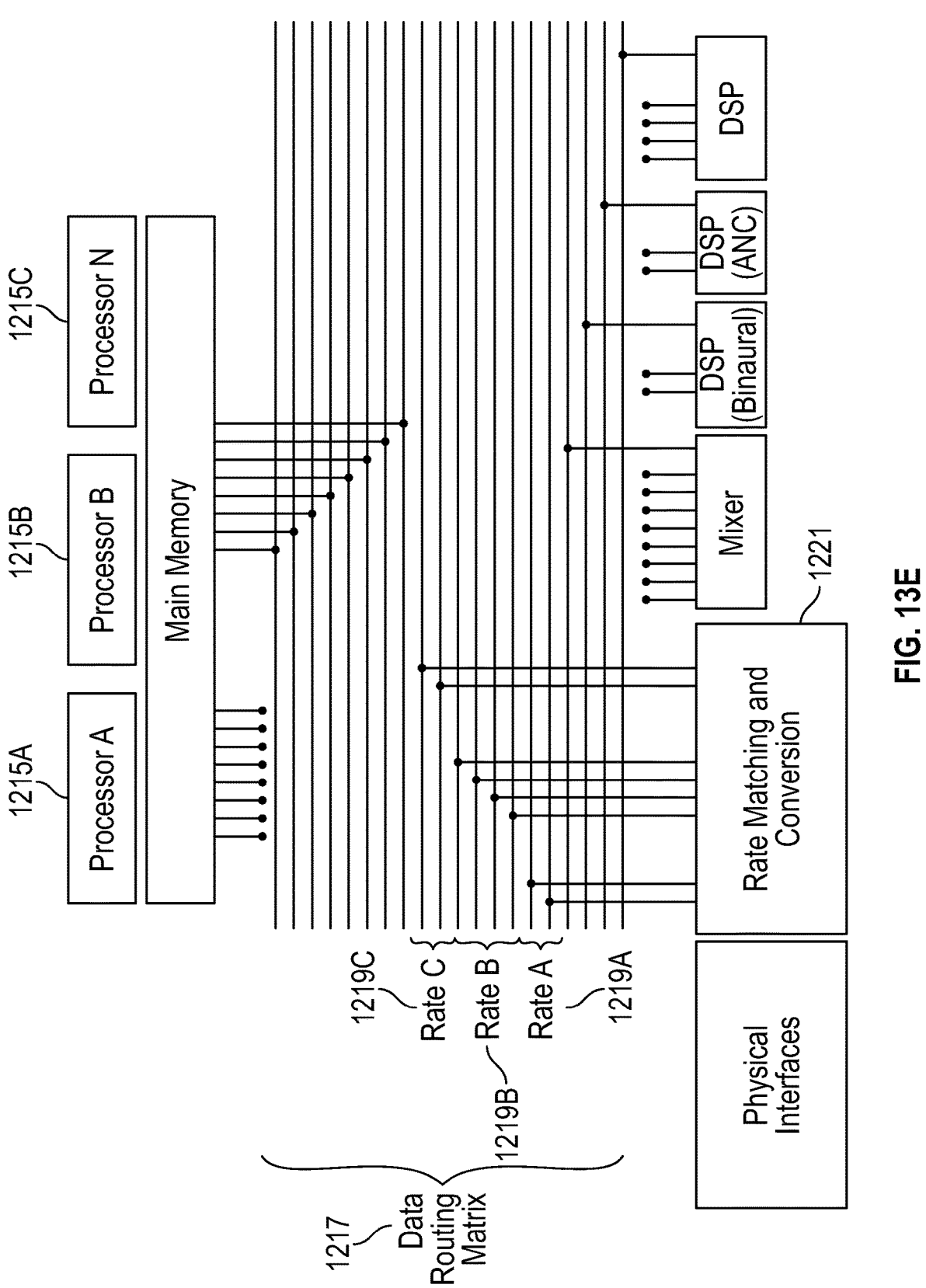
FIG. 13E illustrates an example software-defined computer routing matrix architecture comprising a plurality of processors, according to some embodiments of the disclosure.

A multi core system may process the same input data streams but may use different signal processors and plugins, one for the left ear and one for the right ear. FIG. 13E illustrates an example software-defined computer routing matrix architecture comprising a plurality of processors 1215A, 1215B, and 1215C. In some embodiments, the DMA engine can be programmed to apply simple processing such as copy N bytes of data from the first address A to the second address B and while doing that multiple all the values by a gain (e.g., a gain of 0.5). Similarly, the DMA engine could be programmed to apply an offset to the data values through an addition operation. More DMA extensions are provided below that are specific the types of functions that are useful for ear worn devices and binaural processing.

A single audio input to the audio system may be transmitted to multiple ear pieces and/or multiple users using multiple plugins, for example. In some embodiments, at least one plugin uses long windows of analysis with highly irregular processing loads. For example, a plugin may include two main processors. The first processor analyzes the input signal level to determine whether a particular threshold of amplitude has been triggered. This analysis could be a small and simple analyzer requiring a tiny amount of processing. If the trigger is reached, the second processor is activated to perform a more detailed analysis of the input signal in the frequency domain and then applies multiband level compression to the audio in each of the bands, before then converting the multiband signal back into the time domain. This could use significantly more processing to compute on the DSP. In some embodiments, at least one plugin may perform small amounts of continuous processing. For example, an ear device may be programmed to only apply basic equalization to an input audio stream, which is passed to the loudspeaker in the device. This could be implemented using small number of IIR filters that are configurable by the user and could only use a small number of instructions to implement on a DSP with a single input stream. In some embodiments, the multiple plugins may have different latency requirements.

The DMA process may be able to transfer audio data to multiple memory banks, including transferring the audio data to one or more (e.g., two, three, etc.) places simultaneously (e.g., on a single clock cycle). The plugins that use the same audio data may be programmed with the address information of the same or separate memory banks.

A DMA process that can take two audio data streams, mix them together with a gain, and write the mixed data streams to a single output memory location. The two audio data streams can be separate audio data streams, for example. One audio data stream may be a first audio data stream, and the other audio data stream may include low level noise shaped dither information that is added to the first audio data stream.

In some embodiments, the DMA process may be programmed to take a single input audio data stream at a first sample rate (e.g., 192 kHz), then write the output audio data stream to a destination memory location for every sample. The output audio data stream may be written periodically (e.g., every two clock cycles, every four clock cycles, etc.). The periodic writing may generate a first audio data stream at first rate and a second audio data stream at second rate, where the first rate may be a multiple (e.g., two times, four times, etc.) of the second rate. As a result, the generation of the second audio data may lead to immediately down sampling the audio data. In some embodiments, a phase offset can be added to the down sampled data up to an integer factor of the down sampled rate. For example, reducing by the rate by a multiple of four can include starting the second stream on sample index 0, 1, 2 or 3. Embodiments of the disclosure may include an audio stream at sample rate X which can be reduced by an integer factor by selecting samples at regular intervals. A phase offset can be applied by selecting which sample index to start at.

Additionally, the DMA process may allow for simple, in place, operations to be performed. A simple, in place, operation may be an operation is a specific part of the data transfer and does not use an instruction from the DSP processing core with all the overhead. An example simple, in place, operation may be to move 1024 samples of audio data from a first location to a second location, and multiply each value by 0.5. For fixed point audio data that are received directly from an ADC, the simple multiplication could be a shift of the data bits to achieve the correct scaling.

Additionally or alternatively, the DMA process may be programmed to allow instructions (e.g., compute operations) to be copied and moved to multiple memory locations. Having the instructions in multiple memory locations may help with code packing and real-time debugging. For example, a group of processing cores or processors on a single processing core may be able to execute in parallel using identical computer operations with different data.

In some embodiments, the components for data transfer may access audio data samples at a first memory location A and copy to second memory location B. The number of audio data samples copied may be equal to one for low latency applications, for example. Additionally, in some embodiments, the address indexing for the first and second memory locations may be byte aligned so that multi-byte audio data sample sizes can be moved, copied, or processed (e.g., 8-bit data, 16-bit data, 24-bit data, 32-bit data, etc.).

In some embodiments, the components for data transfer may access audio data at a first memory location and copy to second and third memory locations simultaneously. Additionally, in some embodiments, a multiplication operation or a bit shift operation may be applied to each audio data sample, such that the audio data samples in the second and third memory locations are scaled versions of the audio data samples in the first memory location.

Additionally, in some embodiments, different integer address increment may be applied when moving to the next address location. In some embodiments, a different address offset may be applied to the source memory location or destination memory location for each movement. This allows data to be repeated or skipped as needed.

In some embodiments, components for data transfer may access audio data samples at a first memory location and adds them to audio data samples from a second memory location. The result from adding audio data samples may be stored in a third memory location. In some embodiments, the third memory location may be the same as the first or second memory locations. Additionally, in some embodiments, the audio data samples in the first and second memory locations may be scaled using a multiplication or shift operation.

In some embodiments, the components for data transfer may access audio data sample(s) at a first memory location and may copy the same data block multiple times to a second memory location. The audio data sample(s) from the first memory location may include one audio data sample. This allows a destination memory block to be filled with a single value or multiple repeating values from a source memory location In some embodiments, the components for data transfer may access audio data sample(s) at a first memory location, and then may compare them to audio data sample(s) from a second memory location. In some embodiments, a copy of the maximum or minimum among the audio data samples from the first memory location and audio data samples from the second memory location may be stored in a third memory location. In some embodiments, the third memory location may be the same as the first or second memory locations.

In some embodiments, the components for data transfer may separate audio data samples and/or recombine audio data samples. In some embodiments, digital audio samples may be separated, combined, or stored based on a minimum or maximum sample value within a data block. For example, audio samples from a first location (e.g., a first memory location or another source of audio data) may be compared with audio samples from a second location (e.g., a second memory location or another source of audio data), and the minimum or maximum sample values may be stored in a third location.

A further extension could use the comparison of the sample values in source location A with a fixed threshold value. If the sample value exceeds the threshold, the sample is set to be the same as the threshold, or an alternative fixed value that is configurable by the controlling software system, imposing a forced limit on sample values. Similarly, if a sample value is below a minimum threshold value, the sample value can be set to zero or another pre-determined and configurable lower sample value, to act as a signal gate. In some embodiments, the components for data transfer may access audio data samples at a first memory location, and then may compare them to a single audio sample value. A copy of the maximum or minimum among the audio data samples from the first memory location and the single audio data sample value may be stored in a second memory location. In some embodiments, the second memory location may be the same as the first memory location.

In some embodiments, the components for data transfer may access audio data samples from a first location and compare the audio data to a predetermined threshold value. Sample data that exceeds the threshold value may be adjusted so that it is equal to or lower than the threshold value, thereby producing an audio sample that is modified to have only values lower than the threshold. In some embodiments, sample data that exceeds the threshold value may be adjusted to an alternative value. Additionally or alternatively, sample data that is below a predetermined threshold value may be adjusted to equal zero or some other alternative value above the threshold value, thereby producing an audio sample having only values higher than the threshold (e.g., such that data transfer components act as a signal gate). The predetermined threshold value(s) and the alternative value(s) may be configurable by the software of the system, such that the values may be adjusted by a user of the system or by components of the system.

In some embodiments, the components for data transfer may access first audio data streams at a first memory location, access second audio data streams at a second memory location, and then may interleave the first and second audio data streams to generate third audio data streams. In some embodiments, the number of audio data streams accessed from the first memory location is equal to the number of audio data streams from the second memory location. The third audio data streams may be written to a third memory location, in an alternating fashion (e.g., a first audio data stream from the first memory location, a first audio data stream from the second memory location, a second audio data stream from the first memory location, a second audio data stream from the second memory location, etc.).

In some embodiments, the components for data transfer may access first audio data streams at a first location, may de-interleave the first audio data streams into second and third audio data streams, and then may copy the second and third audio data streams to second and third memory locations, respectively. The de-interleaving may be such that the audio data streams are alternatively assigned to the second and third audio data streams. For example, a first one of the first audio data streams may be included in the second audio data streams, a second one of the first audio data streams may be included in the third audio data streams, a third one of the first audio data streams may be included in the second audio data streams, a fourth one of the first audio data streams may be included in the third audio data streams, etc.

In some embodiments, the components for data transfer may access audio data at a first location and manipulate the audio data before storing the data in a second location. For example, all samples in a block of audio data received from a first location may be sorted into ascending or descending order before being saved to a second location.

Data transfers with trigger events: In some embodiments, data transfer may be initiated or interrupted by a certain triggering event. The triggering event may be an external event, for instance, a buffer being filled to a certain threshold level or emptying to a certain threshold level. Additionally or alternatively, data transfer may be initiated or interrupted by a triggering event caused by the system or a user of the system. In some embodiments, the triggering event could be associated with a device in connection with the system (e.g., an input received from the device, or the connection or disconnection of the device from the system). The triggering event could also include the receipt of data from a sensor in connection with the system that is above or below a certain threshold value, e.g., a temperature sensor of the system indicating that the temperature of the device is above a certain threshold level. The triggering event could also include the receipt of a user input at a user interface of the system, e.g., a user input at one or more of the ear pieces or at another wireless device associated with the system. In some embodiments, the triggering event could be the initiation of music streaming at a wireless device associated with the system. The triggering event may also be an event defined by the software or hardware of the system. For instance, data transfer may be interrupted when a software-defined routing matrix determines that the system should enter a "sleep" or "standby" mode. Data transfer may be initiated or resumed responsive to the device exiting "sleep" or "standby" mode, e.g., upon receipt of a user input. A DMA transfer process may be used to monitor data streams and to determine whether a triggering event has occurred to initiate or interrupt data transfer.

Data transfers with status flags: In some embodiments, transferred audio data includes status indicators that provide information about the audio data to other hardware and software components of the system. For instance, status indicators may indicate that the transferred audio data is above or below a certain user-determined threshold value, or above or below a certain fixed threshold value (e.g., zero or one). Status indicators may also provide information about whether the data has been modified prior to or during data transfer (e.g., to inform hardware and software of the system whether the received data is "raw," or to provide processing parameters associated with processed data).

Data transfers with truncation: In some embodiments, the components for data transfer may access audio data in a first location, truncate the audio data by applying a truncation operation to the audio data values, and then store the audio data in a second location. In some embodiments, the truncation operation may change a number of bits of the data, e.g., reducing the data from 64-bit data to 32-bit data, from 64-bit data to 16-bit data, from 32-bit data to 16-bit data, or some other change in bits. Data truncation may be performed based on industry standard techniques, and in some embodiments may additionally include rounded, dithering, and/or noise shaping the data using information from, e.g., lookup tables.

Software defined data transfer manager: In some embodiments, the data transfer components include a data transfer manager. Software defined data transfer manager. The data transfers may be configured, controlled and managed by the operating system. Data transfers in a software defined system may be dynamic and fully configurable. Some systems use data streams that are pushed through the signal chain. For example, as soon as a sample is available at the input to the system, it is transferred to the next component in the chain. As soon as that component has completed its processing it passes the data onto the next component and so on until the data is output at the other end. In this configuration the samples are pushed through the signal chain. Some systems use data streams that are pulled through the signal chain. For example, as soon as the output needs a sample, it takes it from the previous component. That component produces another output sample and requests a new sample from the previous component, and so on until the system input is feeding data into the signal chain. An alternative is for the signal chain to be clocked at a constant data rate. For each regular system tick event, N samples, where N can be 1, are passed through the system. This requires that the input to the system has N samples available and the output has space for N samples at each tick event. The software defined data transfer manager allows the system to be controlled in any of the described configurations, or others, or combinations of these within a single system. Each data transfer is defined based on a trigger event, with a source and destination. The trigger event can be the source location being ready or full, the destination location being ready or available. The trigger event can be a specific time, such as a periodic time or a single event that is scheduled in the future. Each data transfer can also be assigned a priority to ensure data transfers are serviced in the correct order. Priority can be based on latency requirements for a particular data stream.

Software defined data transfers with multiple agents: The data transfer operation can be implemented on a main processor. This uses precious resources on the chip that could be better utilized for data processing or other system activities. It is beneficial to move the data transfer operations to a separate hardware macros such as a DMA engine or dedicated data transfer agent. In some systems, data transfers may have to happen within a particular time window to reduce latency in the system. In some embodiments, some systems provide more than one data transfer agent when large amounts of time critical data are moved into and out of a processing system.

Figure 13F:
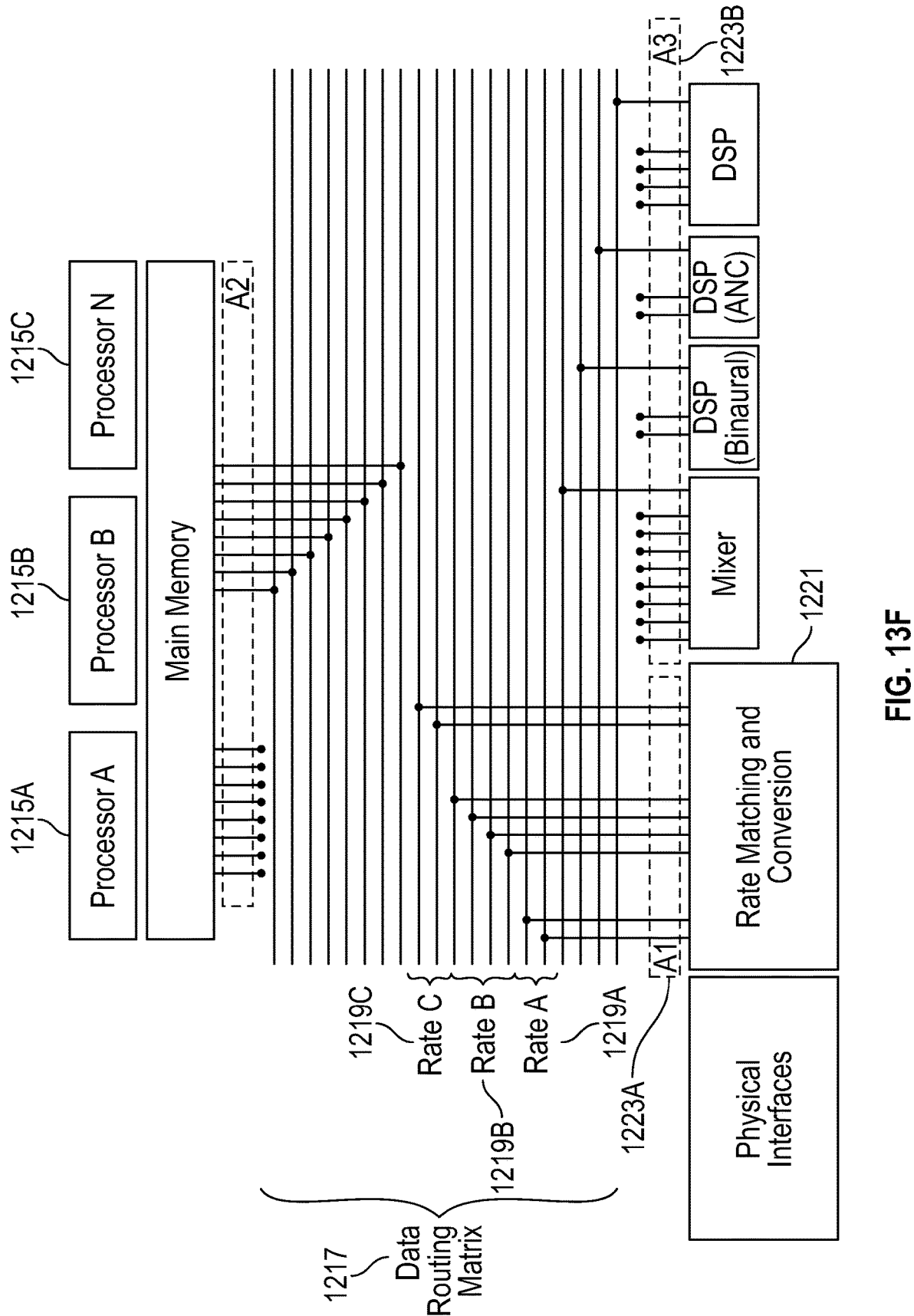
FIG. 13F illustrates multiple data transfer agents in the data routing matrix, according to some embodiments of the disclosure.

FIG. 13F illustrates multiple data transfer agents in the data routing matrix. The data transfer agents 1223A and 1223B are dedicated to specific data types and connections. In some embodiments, the software data transfer manager configures the agents as needed when a transfer request is made from the main processing application. An alternative is to have a bank of data transfer agents that are assigned on an as needed basis. For example, agent A is used for the first data transfer request, then agent B for the second and so on. This may distribute the loading across all the data transfer agents. A queue or holding list of data transfer requests is maintained by the data transfer manager. The data transfer request can be a repeating operation. For example, to transfer 32 samples from microphone A at 48 kHz to internal RAM at location 0x1000A000 until told to stop. The transfer manager puts the task into the queue to be executed at a time in the future to ensure 32 samples may be available. Or the task can be marked as low latency and may start as soon as 32 samples are available. When the data transfer is complete, the data transfer manager may create a new task to be executed at a new time in the future, based on when the old task started and completed. The data transfer manager can also create tasks for the queue based on interrupts or other trigger events. The tasks are then assigned to the relevant data transfer agent in the system. The data transfer manager can also determine whether the connection matrix is complete. This involves checking that all the active sources of data are connected to destinations. For example, a music stream may be paused or disconnected from the input to the system. The output streams for the music could be connected to the digital to analogue convertors (DAC) to play sound to the speakers. If the music pauses or stops, it may be desirable to prevent the buffers in the DAC wrapping and causing a buzzing noise. The data transfer manager can be programmed to detect orphaned connections and mute them or stop them based on the system requirements.

Software defined data transfers with data rate management: The data transfer manager may have direct access to source and destination buffer levels, transfer times, and other information related to the data rates for each of the nodes it is connected to. This information can be used to determine a rate metric. For example, if the data transfer manager requests 32 samples from an input buffer and it sees there at only 31 available it can determine that the buffer is filling too slowly. System time stamps can be used to determine an accurate data rate for a source or destination node. A fractional deviation from the target rate can be calculated and stored in memory locations or registers for the system application to use. The fractional rate deviation can be stored as a floating point value or a fixed point mapping, such as a percentage, for example, each integer value represents $\frac{1}{1000}^{th}$ of a percent. In some embodiments, rate matchers can be used to adjust for the mismatch in rates between a source and destination. The data rate calculation can also provide an indication to the rest of the system whether a data stream has stalled, for example, there is no space in the output buffer for channel 2 connected to a digital to analogue convertor. This information can be used for monitoring the data flow through a system with metrics presented to an analysis interface, such as a screen. Each of the data transfer nodes can use a traffic light system where the marker is green when the stream is flowing at the correct rate. Yellow can indicate that the data is flowing, but it is not at the desired rate. Red can indicate the stream is connected but is not flowing at all and is stalled.

Software defined data transfers with debugging: The data flow through the system can be a source of audio problems which are difficult to capture and debug in real-time. The data transfer manager can be programmed to run in debug mode. This may store all data transfers into a memory space that can be retrieved through a debug interface. This can be programmed as a circular buffer of transfers such that the last N transfers and status information are available as a stack for a developer to review. The timestamps for the transfers may assist with tracking the source of bad data or data flow stalls occurring in the system.

Software defined data transfer with data preparation: The data transfer may often use specific manipulation of the bits to create data that is in a more usable format for the next component in the signal processing chain. This can be implemented using specific hardware macros. This can also be implemented using a dedicated microcontroller that provides instructions for data handling. This may include packing bits into words that are more easily transferred, and similarly unpacking words of data into a bit stream. This may also include reordering the bytes of information within a word. It may also include bit reversing of bytes and words of data. It may include unpacking bytes into separate words, with zero padding, and also packing bytes into words to compress data. It may also include interleaving and de-interleaving words and bytes of data. The microcontroller can be used for the data formatting based on the needs of the data transfer task.

Software defined data transfers for non-audio data. All the data transfer mechanisms that are built into an audio OS and associated silicon platform are applicable to other non-audio data. For example, data captured from a sensor in the ear worn device such as an Inertial Measurement Unit (IMU) may also require low latency data transfers, data unpacking, data format conversion, rate matching, timestamps and other metadata.

Figure 14:
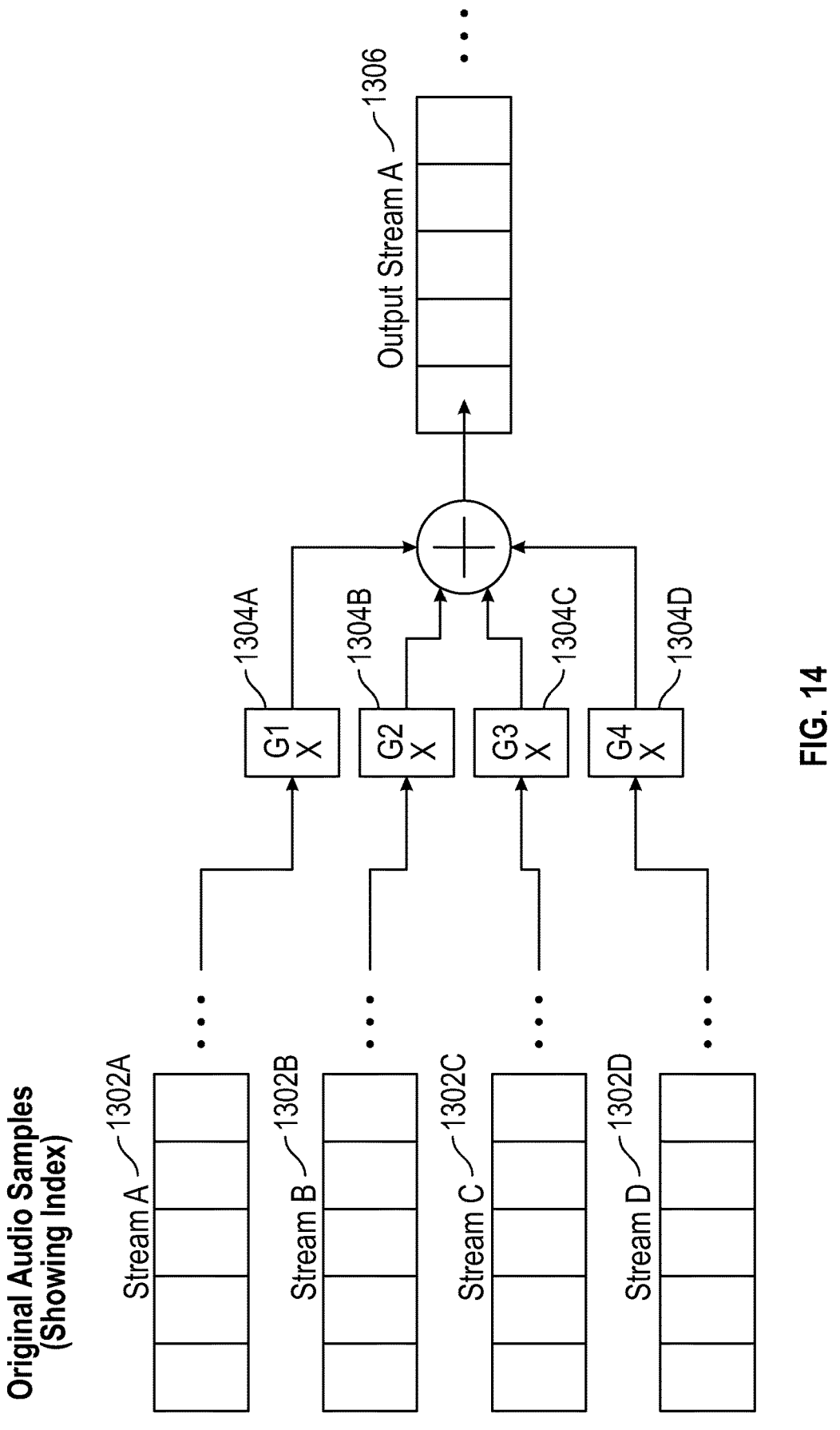
FIG. 14 illustrates exemplary audio data streams be combined by adding the audio data samples from each of the audio data streams and optionally applying one or more gains to create a single output audio data stream, according to some embodiments of the disclosure.

Components for mixing: The silicon chip of the disclosure uses both digital mixing and analog mixing. Digital mixing may be beneficial due to its flexibility when the number of audio data streams being combined is dynamic. A DSP can handle a large number of different audio data streams. The audio data streams may be combined by adding the audio data samples from each of the audio data streams and optionally applying one or more gains to create a single output audio data stream, as shown in FIG. 14. Embodiments of the disclosure may include multiple instances of digital mixing through the signal chain. Embodiments of the disclosure may include different mixing domains, digital mixing (at a common sample rate), analog mixing, acoustic mixing (in the ear canal), etc. The software defined mixer refers to the various forms of digital mixing and can be extended to control the analog mixer. The INC components refer to analog and acoustic mixing. The software defined mixer can be configured and controlled by the operating system.

Some devices do not use a mixer when handling multiple input data streams to a system. Instead, if the device is processing a first audio stream 1302A and the system receives a new second audio stream 1302B, the system may pause processing of the first audio stream 1302A so that the second audio stream 1302B can be processed and delivered to the output. When processing of the second audio stream 1302B is complete, the system may resume with processing the first audio stream 1302A. This break in the audio streams may be desirable in some scenarios and can be a user selected configuration.

In other scenarios, the user may want the original processing of the first audio stream 1302A to continue while the second audio stream 1302B is being processed and have the two combined, using a mixer, into a single audio stream. For example, the first audio stream 1302A could be music audio and the second audio stream 1302B could be a notification from a connected mobile device, such as a beep that a text message has been received. In many cases, it may be preferable to the user to mix the beep into the music stream without pausing the music every time a notification is sent to the headphones.

The use of a mixer to combine audio streams is essential for improved user experience. Ear worn devices are being connected to multiple devices simultaneously. This makes it challenging to create a mixer to service all the different audio streams. A software defined mixer allows far greater flexibility for handling an unknown and changing number of inputs to the system. The mixer can be programmed based on the system requirements by software. This can form a software defined mixer plugin that takes N input(s) (e.g., first audio stream 1302A, second audio stream 1302B, third audio stream 1302C, and fourth audio stream 1302D) and provides M output(s) (e.g., output stream 1306). Multiple instances of the plugin can be placed into the signal chains within the system. Hardware acceleration can be used to efficiently combine data streams. Each instance of the mixer can be running at different sample rates. This provides a significant improvement from having no mixer or a fixed mixer architecture, or using signal processing resources on a DSP core.

Most ear worn devices provide only one control for the level of the sound that is output into the ear. Typically, the output level control applies the same gain to the signal for the left and right channels. A software defined mixer behaves much more like a mixing desk as used in professional recording studios. The software defined mixer allows the developer and end user to independently control the level of the outputs. This allows them to have different gains applied to the left audio stream relative to the right audio stream. This is useful for applications where the user has a hearing profile that uses a different balance of sound, or is in an environment that uses the sound to be louder in one ear compared to the other, or is working in a scenario where independent left and right gains allows them to perform their tasks more effectively, such as for DJs using split cuing.

The software defined mixer also allows the developer and the end user to provide access and control to the inputs of the mixer. In some embodiments, the balance of levels are controlled relative to each other. When multiple audio sources are connected to an ear worn device it is unlikely that each individual source is programmed to deliver sound within a consistent amplitude range. The software define mixer allows the user to set a comfortable and desired level for audio being received into the device. The overall level that is presented to their ears is controlled separately and is based on their preference and listening conditions, not on the content that is being received. Each audio stream can be tagged with an identifier such that levels from devices are remembered and stored as part of the user's listening profile. For example, music from a first device having a first audio stream 1302A may be set to gain G1 at 1304A, whereas music from a second device having a second audio stream 1302B may be set to gain G2 at 1304B, and notifications from a third device having a third audio stream 1302C are set to gain G3 at 1304C. When audio streams with the specific content are received from a device, the hearing system may use the stored preferred gains. This can be extended for different applications on a single device, such as a tablet or a mobile phone, where each app may send audio to a hearing device at different levels and the user can set preferences for specific application data from a single device by tagging the application type as metadata in the audio stream.

Figure 15:
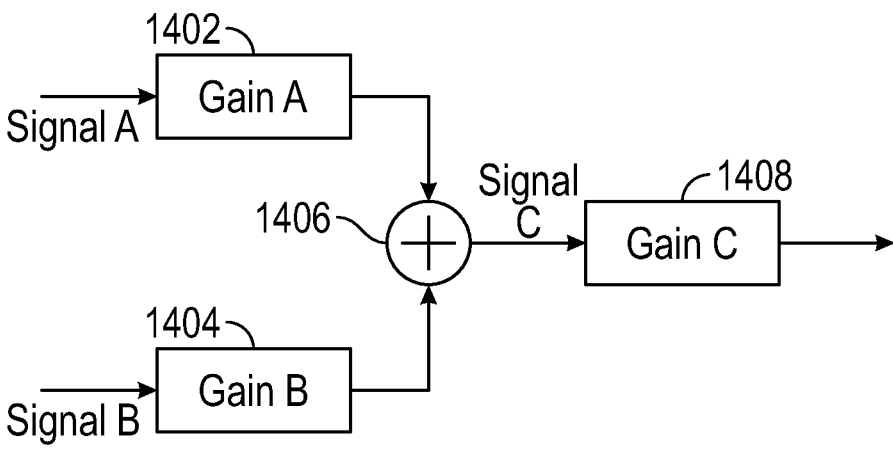
FIG. 15 illustrates an exemplary system providing control of the gain of an audio stream, according to some embodiments of the disclosure.

As shown in FIG. 15, the system provides control of the gain of an audio stream. This can be through a standard user interface, such as buttons, sliders, GUI etc. This can also be controlled through other signal processors in the system that are analyzing audio streams and then determine the gain to be applied for example. The gain can be applied in software as a DSP instruction or similar operation on a processor. The gain can be applied as a hardware macro on a silicon chip that is specifically designed as a mixer component. Two or more streams may have independent gains. For example, the system may apply a first gain A to a first signal A at 1402 and a second gain B to a second signal B at 1404, as shown in the figure. The streams are summed or mixed together at adder 1406. In some embodiments, the gains for each of the input streams is only applied for this mix combination. Different gains can be applied for different mixer configuration instances within the system that are using the same input data streams. The summed output has its own independent gain control. The resulting output from adder 1406 may be signal C, where the system may apply a third gain to signal C at 1408. The first stage of gains sets the mix balance of the input signals. The second stage of gain sets the overall level of the mix.

Figure 16:
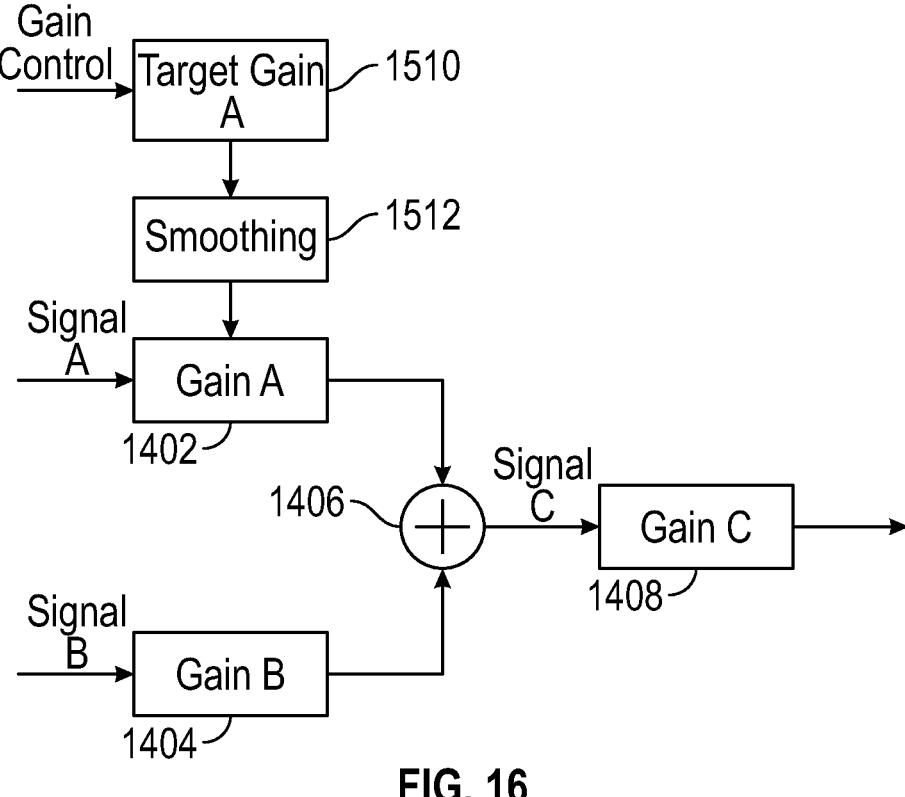
FIG. 16 illustrates exemplary gain of each audio stream can be changed while the data is being processed, according to some embodiments of the disclosure.

The gain of each audio stream can be changed while the data is being processed, as shown in FIG. 16. In some embodiments, a gain control signal (e.g., a user-controlled gain) of an audio stream may be applied at 1510 with gain smoothing 1512 to avoid zipper noise. Each gain stage in the mixer can include smoothing to avoid rapid gain changes and jumps in signal level which can sound disturbing and can cause clicks in the analog output. This can be applied when an audio stream is connected or turned on through the mixer, where gain can switch between 0 and G. A sharp, immediate transition could sound like a click and should be avoided. Similarly, this can be applied when muting an audio stream or disconnecting a stream to turn it off, where the gain can switch from G to 0.

Figures 17, 18:
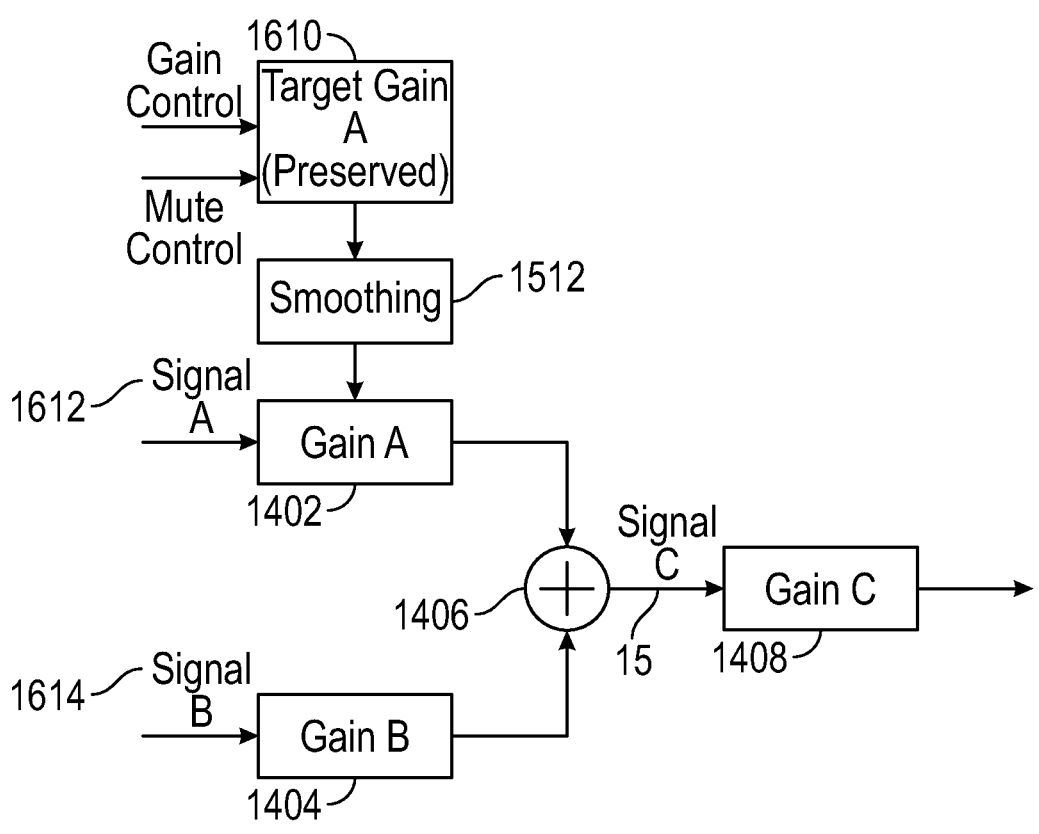
FIG. 17 illustrates an exemplary mute control signal being used, according to some embodiments of the disclosure.
FIG. 18 illustrates exemplary one or more threshold gates applying one or more level threshold checks, according to some embodiments of the disclosure.

In some embodiments, a mute control signal may be used, as shown in FIG. 17. This could also be heard as a sharp transition. Instead of transitioning across one sample, the gain changes are spread out over a window or buffer of samples. For example, the gain could be at setting G, and the user has selected the stream to be muted and set the gain to 0. A mute control signal may be applied at 1610 to mute as a separate transition from the main gain process, so that the gain can be reinstated when the stream is unmuted. The gains are stored in a separate memory block and are not affected by a mute request. This can be applied in steps over N samples, such as 32 samples.

In some embodiments, the gain change is split into 32 equal steps to create a more gentle transition or fade. Fade transitions are popular in professional audio editing systems. Embodiments of the disclosure may include placing that fading technology into gain stages such that it can be applied when gains are changed.

In some embodiments, gain transition is applied with a smoothing coefficient, for example, of 0.8, may be applied to the gain delta between the current gain and the new gain. This is applied for each block of N samples so that the actual applied gain gets gradually closer to the target gain. When the actual gain is close to the target gain, for example, within 0.1 dB, the actual gain is switched to the target gain and no further smoothing is applied. These gain steps can be stored as gain coefficients in a lookup table. The gain coefficients are applied for N samples at a time, where N could be 1 for each step or higher values for longer duration fades. Large values of N could cause long transitions or fades, which may be desirable, but could also cause the system to be unresponsive when the user wants a fast reaction. The fade transition can be changed depending on the application and use case. The mixer can time align gain transitions to cause crossfades. This could mean two streams are coming into the mixer, a first signal 1612A is at a first gain G and a second signal 1614B is at a second gain 0. A crossfade is triggered such that the first gain is transitioned to 0 and the second gain is transitioned to G. Each transition occurs synchronously using the same fade transition coefficients. This avoids abrupt changes between switching streams in the system. Gain transitions are provided in a hardware component on the chip to smoothly transition between two gain values without using DSP instructions and processor overhead. Gain transitions can also allow sounds to be "moved to the background" by reducing their level when it is desired that another sound needs to be heard. For example, when listening to music, the user may want the music audio to be reduced if a notification is received with a message from a certain location or device. The music is not muted, it is reduced in level and may become a background sound so the user can pay attention to the notification. The gain transitions can be set to be different depending on whether the gain is increasing or decreasing. For example, a user may wish the reduction of sound level to be applied quickly so that other sounds can be heard, whereas they may want a sound increase to be slower, such as fading in of music after it has paused, to have a gradual return of the audio stream to the ears. This could be extended over many seconds for a specific user experience. This avoids rapid transitions in signal levels that can cause acoustic shock if a gain has been previously set to a high level.

The gain applied to a signal stream can cause a sound to exceed comfortable listening levels, or even be at dangerous levels. Similarly, a gain could be used to reduce the amplitude of a signal significant below a noise floor of a masking threshold that is set by a separate audio stream. A level threshold check can be applied to a signal to ensure the amplitude of a signal is within a determined range. This can be controlled through dynamic range compression or simply providing a gate or a limiter around the desired level window. As shown in FIG. 18, one or more threshold gates 1714A and 1714B may be used to apply one or more level threshold checks to the first and second signals. The threshold checks can have upper and lower limits.

Figures 19, 20A:
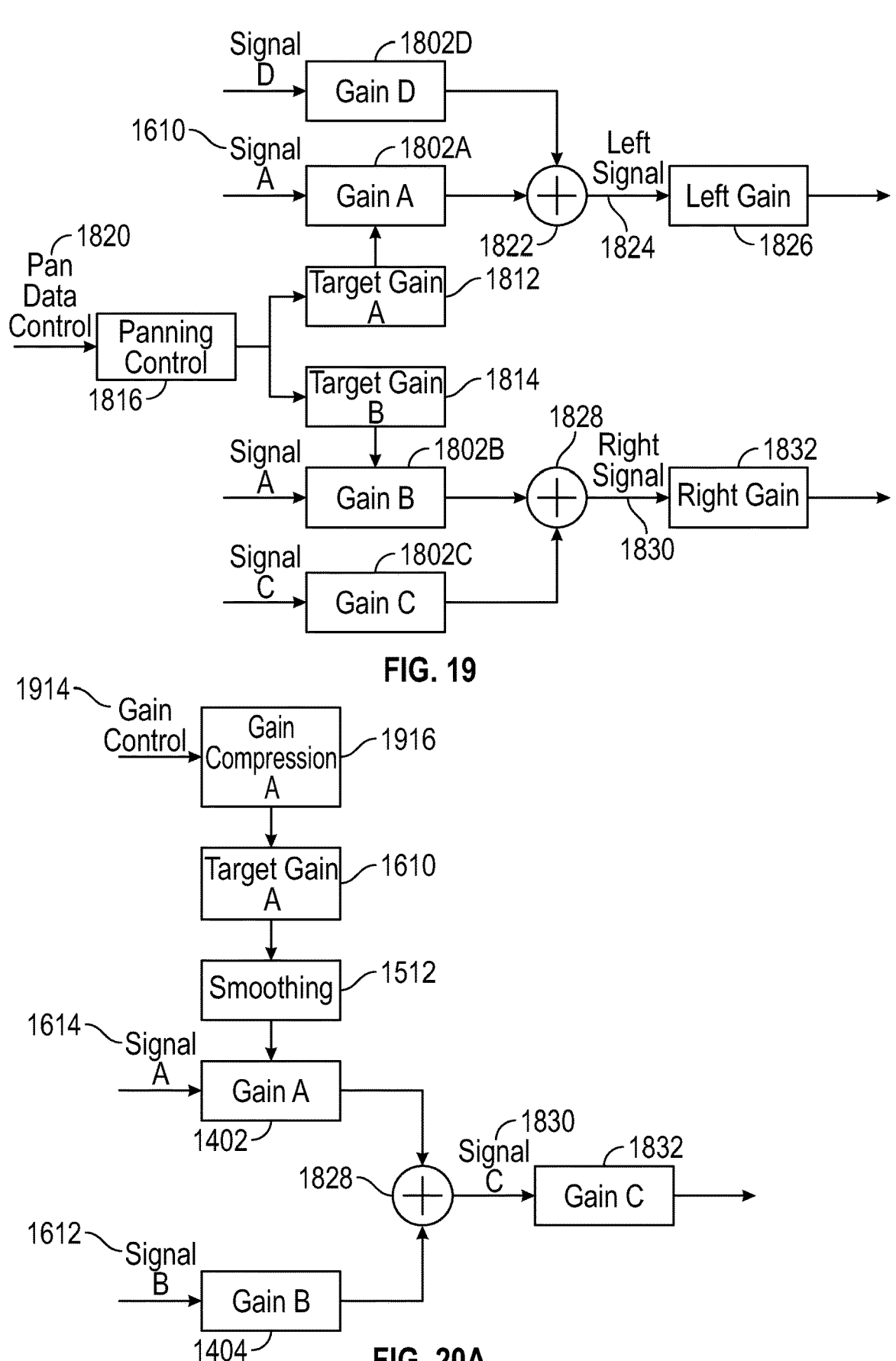
FIG. 19 illustrates an exemplary block diagram of a mixer applying different gains to left and right ear signals, according to some embodiments of the disclosure.
FIG. 20A illustrates an exemplary block diagram of a mixer including a gain control signal 1914, according to some embodiments of the disclosure.

Different gains can be applied to the left and right ear signals to give the impression that a signal has moved in perceived location. FIG. 19 illustrates an exemplary block diagram of a mixer applying different gains to left and right ear signals, according to embodiments of the disclosure. The mixer may include a panning control 1816, a plurality of gain components, and a plurality of target gain components. The panning control 1816 receives the pan data control signal 1820. The plurality of gain components 1802A, 1802B, 1802C, and 1802D may apply one or more gain values to the signals. The plurality of target gain components 1812 and 1814 may apply one or more gain values to the signal output from the panning control 1816. The left signal 1824 may be generated by adding the output signals 1802A and 1802D. A left gain 1826 may apply a gain to the left signal 1824. The right signal 1830 may be generated by adding the output signals 1802B and 1802C. A right gain 1832 may apply a gain to the right signal 1830.

An ear computer can adjust similar functionality by adjusting the gain for the signal at the left ear, differently to the gain for the corresponding signal at the right ear. This could appear to move the perceived location of the signal to one side. This could allow a notification signal to be placed to a different location, for example, on the other side of the listener. Unlike most audio DSP systems which provide the same gain to all output channels, embodiments of the disclosure may include the ear computer allowing different gains to be applied to the inputs and the outputs independently.

Audio streams can be variable in level. It is desirable for the user to be able to set a preferred target level for a stream without having to continually adjust the gain based on the level of the content within that data stream. In some embodiments, a user-controlled gain of an audio stream with a target gain/loudness range may be used to keep the input signal within an adjustable range.

FIG. 20A illustrates an exemplary block diagram of a mixer including a gain control signal 1914, according to embodiments of the disclosure. The gain control signal 1914 may be input to a gain compression 1916. The output of gain compression 1916 may be input to target gain 1610, which is then smoothed at 1512 and applied to a first signal 1614.

I/O streams may have gain limits applied to avoid damaging levels of output and clipping distortion. Input gain can be limited through a compressor or limiter signal processor. This form of signal processing adjusts the dynamic range of a signal such that is reduced or "compressed" into a target dynamic range. This gain adjustment is non-linear and continually adapts based on the measured level of the input signal to set the gain applied to create the output signal. Typically, this results in quiet sounds or signals with small amplitude, being increased in level and loud sounds or signals with large amplitude being reduced in level. The adjusted signal can then be processed further to maintain a target output level for the signal path, using a makeup gain. The compressor can be informed what the mixer output gain is so that overall gain can be adjusted and limited to meet the user's preferred level or the level used for the next stage of processing in the signal chain. Compressor may work with a flexible amount of delay for signal amplitude analysis to avoid increasing latency in the system. The system may provide compression to each input stream to maintain a consistent level range for each stream. The system may provide compression to each output stream to maintain a consistent level for the user's preference. The compression range for each stream can be controlled by the user. This can be set differently for each stream depending on the content and the scenario the user is currently experiencing.

User control of compression settings: The compression range is set by the user to control the target perceived level of an audio stream. This can be for the individual input streams and independently for the mixed output stream. The compression allows quiet signals to be heard without increasing the overall level of the mix (output stream) or affecting other streams coming into the system and routed through to the user's ears, and without increasing the max amplitude of the stream when the signal gets louder at the input. An example user interface could be through a connected device such as a mobile phone, tablet, smart watch, or neck worn control pod. The control surface could be a graphical touch screen, or wheels, sliders, or buttons on a controller. The graphical interface could include a display level controller that has more functions than a simple volume control slider or fader. The slider has a target level. There is also a range marked around the slider where level of the signal is kept between. The user can drag the window up and down to set the target level. The upper and lower markers may move with the window, showing the compression input level range. The user can use multiple fingers to squeeze or expand the level range that sits around the target level. The user can independently set the upper and lower limits of the compression by dragging the individual markers up and down. The slider and threshold markers could be overlaid on an active level display, such as a PPM, that is providing an indication of the actual signal level of that audio stream at the device. The level information is transmitted from the ear device back to the connected graphical user interface device if the user activates that additional information.

Figure 20B:
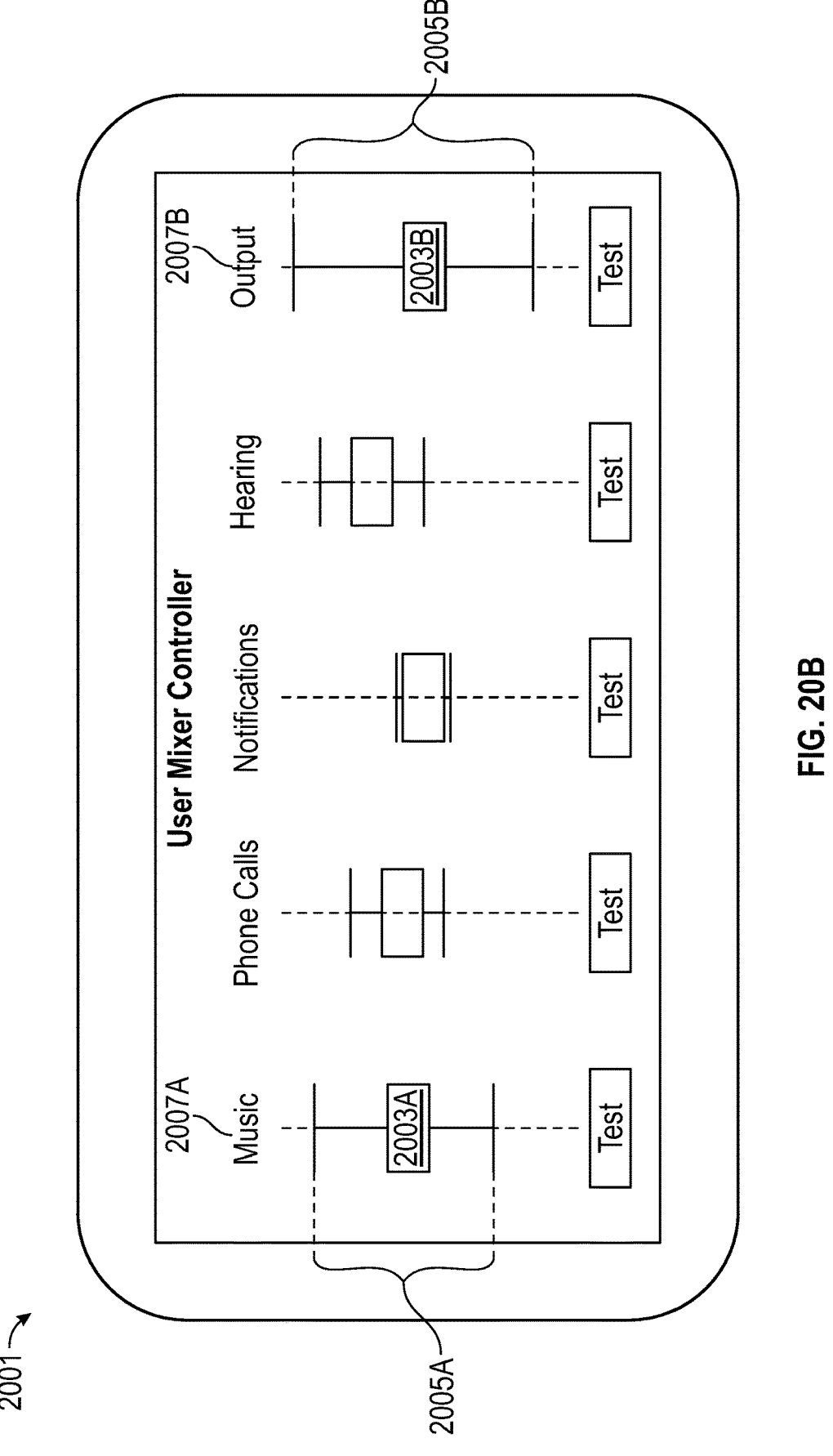
FIG. 20B illustrates a mixer interface with gain range, according to some embodiments of the disclosure.

FIG. 20B illustrates a mixer interface 2001 with gain range, according to embodiments of the disclosure. Each stream 2007 has a target level 2003 and has a corresponding range 2005 around the target level 2003. At least two streams may have different target levels and/or ranges. For example, a first stream 2007A (e.g., music stream) may have a first target level 2003A and a first range 2005A. A second stream 2007B (e.g., output stream) may have a second target level 2003B and a second range 2005B. This sets the acceptable dynamic range for the audio stream. The level profiles for each stream can be set for different scenarios. For example, when listening to music outside in a noisy place, the user may want a higher level of music playback with a narrow dynamic range, but when listening at home when working in a quiet room they can reduce the level and expand the acceptable dynamic range. This removes the need to simply keep adjusting the output level based on the content level.

Figure 20C:
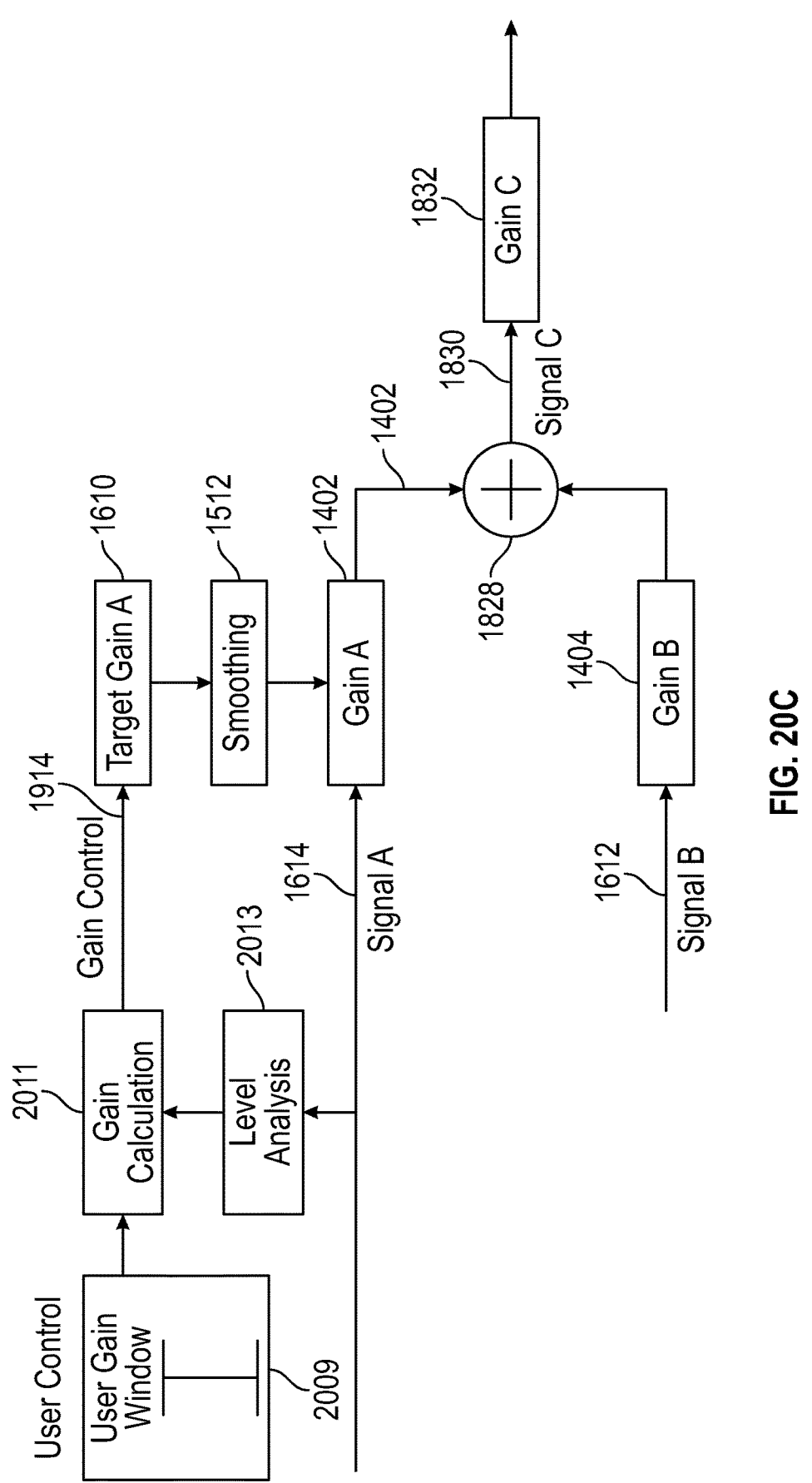
FIG. 20C illustrates an exemplary gain range with limitation using compression and a user-controlled gain range, according to some embodiments of the disclosure.

FIG. 20C illustrates an exemplary gain range with limitation using compression and a user-controlled gain range. The user may set the gain range using a user control 2009. A gain calculation 2011 may receive the user-controlled gain range and output(s) from level analysis 2013 to calculate the gain control signal 1914.

Figure 20D:
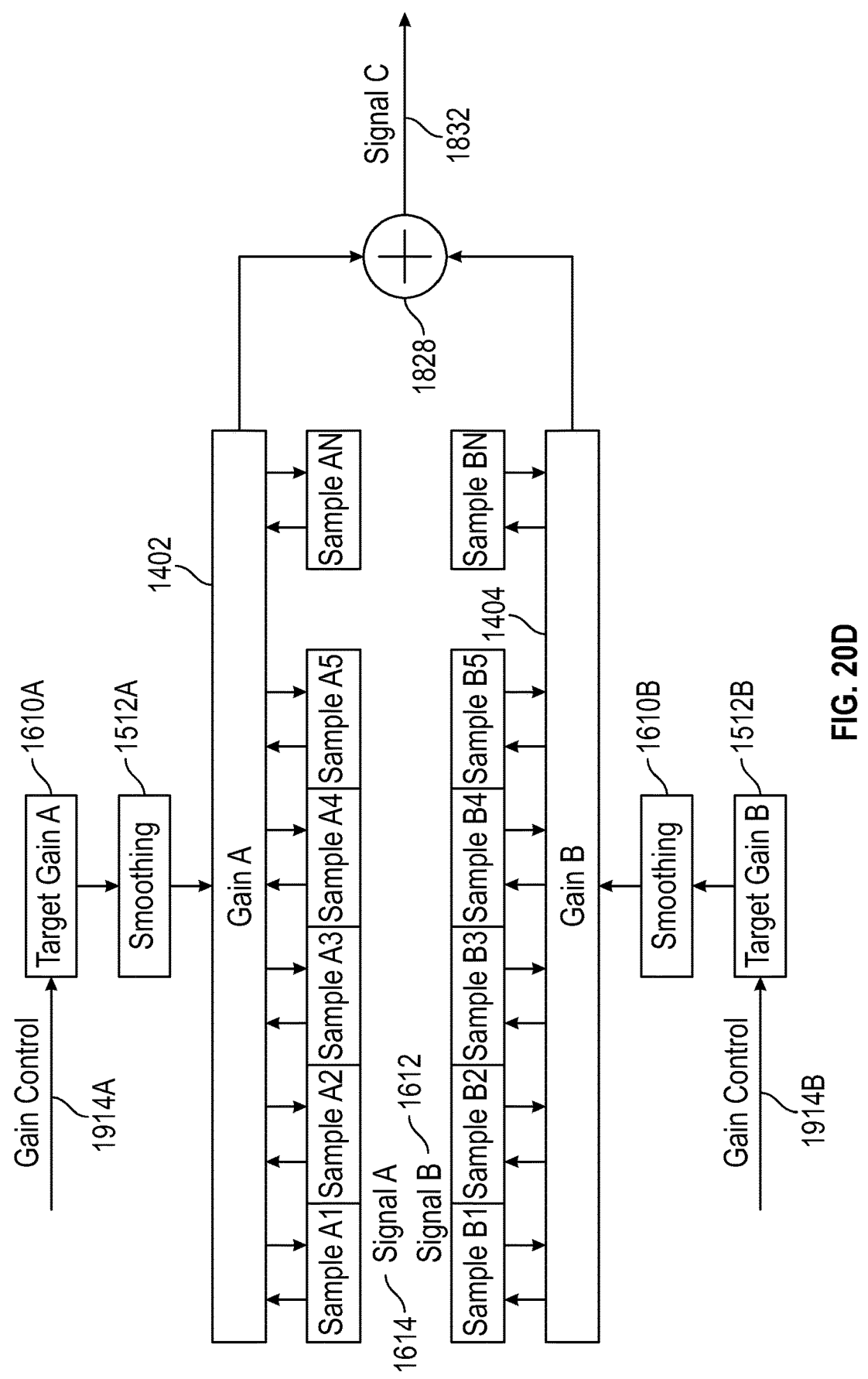
FIG. 20D illustrates an exemplary optimized version of the smoothed gain can be implemented by applying the operation of the gain multiplication directly at the memory location, according to some embodiments of the disclosure.

An optimized version of the smoothed gain can be implemented by applying the operation of the gain multiplication directly at the memory location, as shown in FIG. 20D. This form of in-place processing can use special memory cells that have operations connected to the memory locations. The first signal 1614 may include a plurality of samples (samples A1, A2, A3, A4, A5, to AN), and the second signal 1612 may include a plurality of samples (samples B1, B2, B3, B4, B5, to BN). In this instance the operation is a simple multiplication. Each memory cell has its own gain coefficient. Each coefficient can be the same constant value. Each coefficient can be individually adjusted by a separate process that updates the gain coefficients. This can be a smoothing operator that gradually transitions the gain coefficients from value A to value B on a sample by sample basis. This removes the need for multiplication operations being used in the main processor of a system.

In some embodiments, each stream is set a level and also a corresponding range around the target level. This sets the acceptable dynamic range for the audio stream. The level profiles for each stream can set for different scenarios. For example, when listening to music outside in a noisy place, the user may want a higher level of music playback with a narrow dynamic range, but when listening at home when working in a quiet room they can reduce the level and expand the acceptable dynamic range. This removes the need to simply keep adjusting the output level based on the content level. FIG. 20C illustrates the implementation of this type of gain range with limitation using compression and a user controlled gain range.

An optimized version of the smoothed gain can be implemented by applying the operation of the gain multiplication directly at the memory location. This form of in-place processing can use special memory cells that have operations connected to the memory locations. In this instance the operation is a simple multiplication. Each memory cell has its own gain coefficient. Each coefficient can be the same constant value. Each coefficient can be individually adjusted be a separate process that updates the gain coefficients. This can be a smoothing operator that gradually transitions the gain coefficients from value A to value B on a sample by sample basis. This removes the need for multiplication operations being used in the main processor of a system. This is shown in FIG. 20D.

Figure 21:
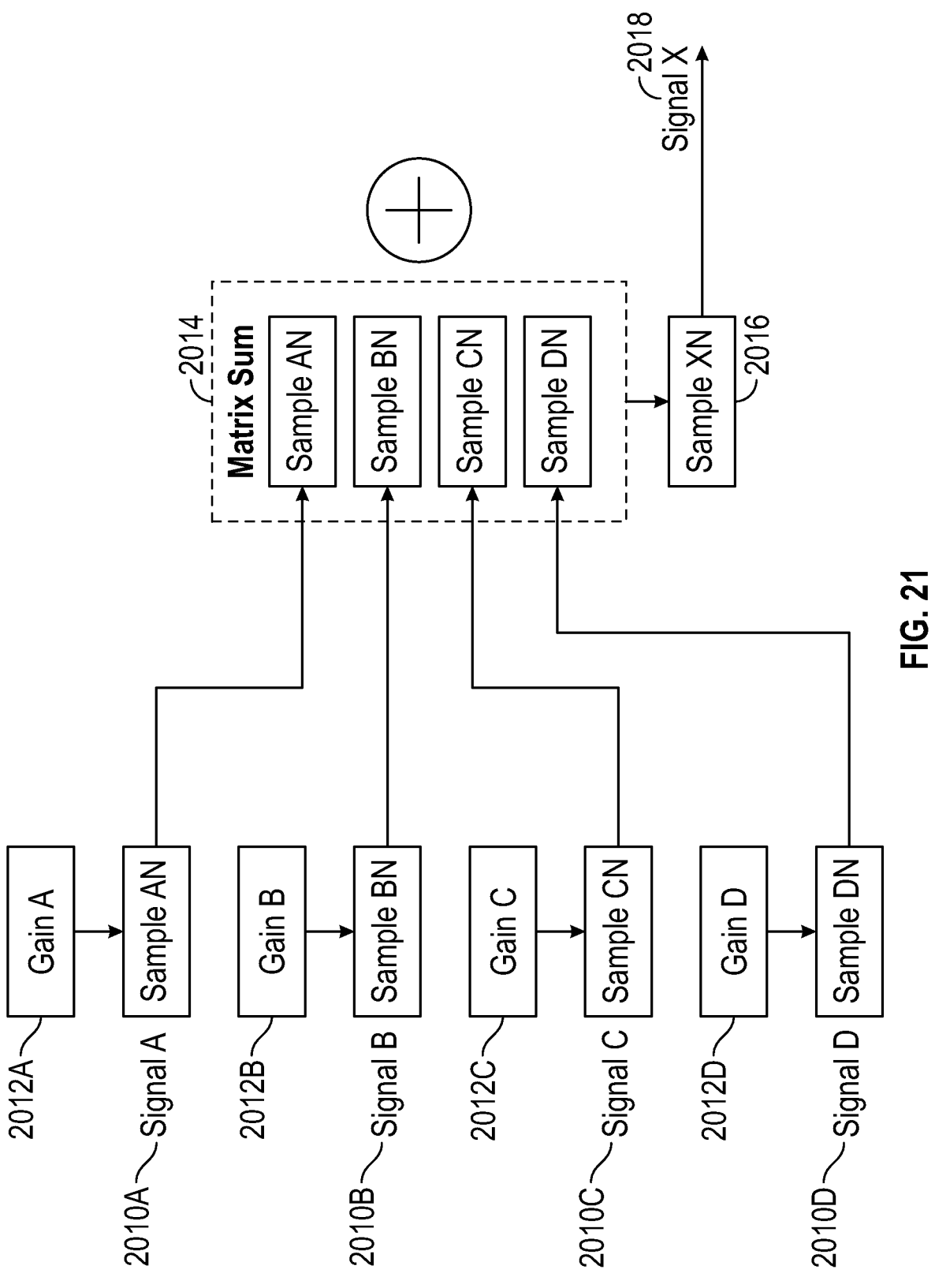
FIG. 21 illustrates a block diagram of exemplary mixing of multiple input samples in a single operation, according to some embodiments of the disclosure.

Matrix mixing for optimizing software defined mixer: In some embodiments, the mixing is applied to multiple input samples in a single operation. FIG. 21 illustrates a block diagram of exemplary mixing of multiple input samples in a single operation. The mixer may receive a plurality of signals 2010A, 2010B, 2010C, and 2010D. A plurality of gain values 2012A, 2012B, 2012C, and 2012D may be applied to the plurality of signals 2010A, 2010B, 2010C, and 2010D, respectively.

The mixer may use a matrix summer 2014 summation to create a single output sample 2016. The mixer may output signal 2018. Input samples are written to memory locations that make the summation simpler for matrix operation, such as placing in contiguous memory locations. One or more (e.g., 1 to N) inputs can be mixed in a single operation. Separate mixing components are provided for each of the outputs of the system. A single mixer can be used with multiplexed data streams that iterates through each of the outputs on each processing clock to service all the outputs of the system using a single processor.

Figure 22:
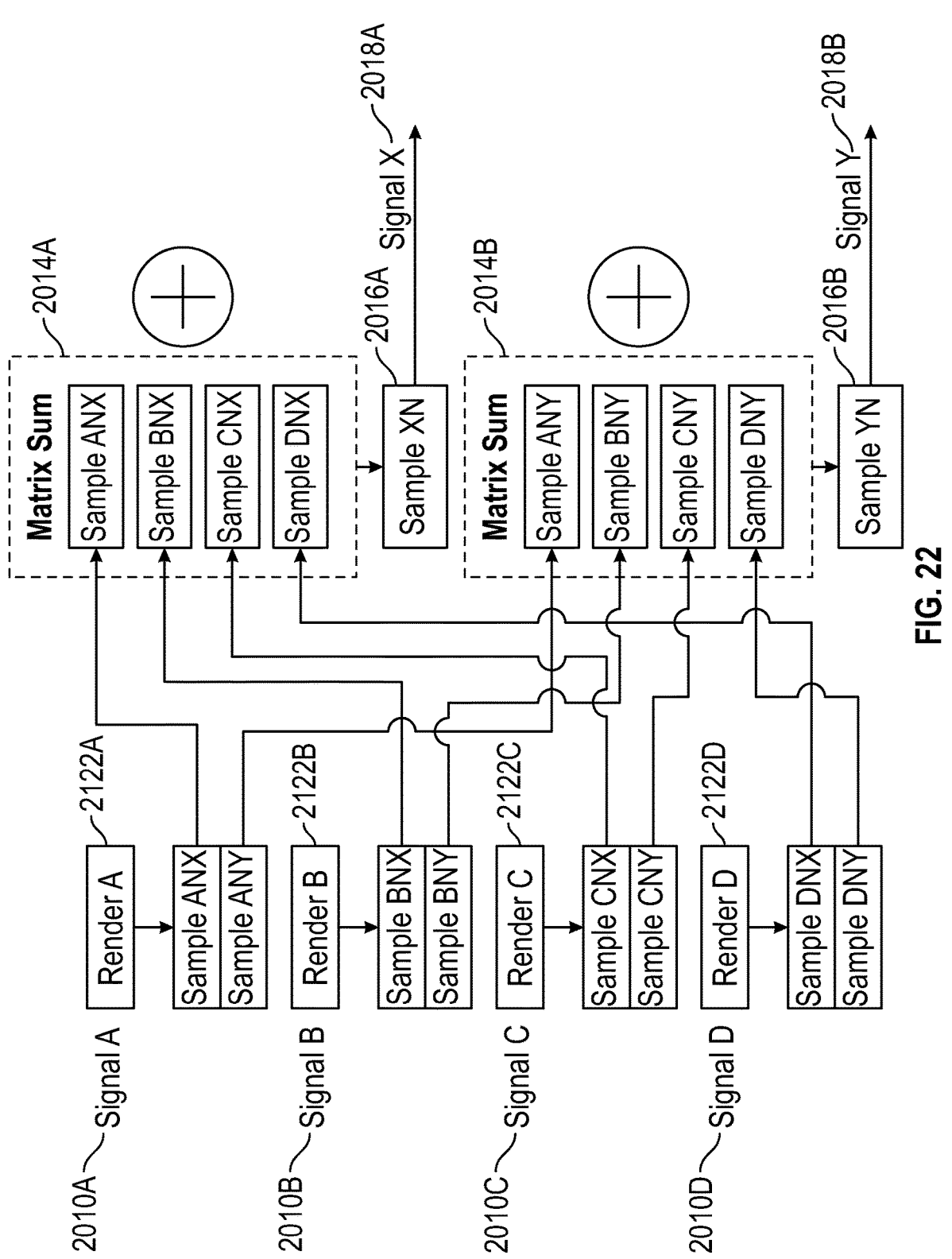
FIG. 22 illustrates an exemplary matrix mixing applied with rendered audio streams that allow multichannel audio streams to be mixed without losing spatially rendered binaural information, according to some embodiments of the disclosure.

In some embodiments, as shown in FIG. 22, the matrix mixing can be applied with rendered audio streams that allow multichannel audio streams to be mixed without losing spatially rendered binaural information. To generate the rendered audio streams, a plurality of render values 2122A, 2122B, 2122C, and 2122D may be applied to the plurality of signals 2010A, 2010B, 2010C, and 2010D. In some embodiments, the mixer may include a plurality of matrix summers 2014A and 2014B, which may output a plurality of single output samples.

Gain protection is used to control the amount of gain being applied at each node of the mixer, to ensure the overall output level is not reaching dangerous levels. Each gain stage is monitored independently and in combination with all the gain stages in each signal path. For example, if the user is applying 30 dB of gain at the input stage of the mixer for a single stream, and then a further 30 dB of gain at the output stage of the mixer going to the loudspeaker, this could potentially create dangerous levels of output sound. The user can be informed of the danger of the gain combinations through the user interface. The system can place limits on individual gain stages to prevent dangerous combinations. The system can also provide an output limiter to ensure that even dangerous levels are caught and limited before signals are sent to the ear as a final fail safe. The fail safe limiter can be placed in the analog domain or a stage beyond the user configurable software defined mixer component so that it cannot be overridden and turned off. The user can be informed through a user interface on a connected device that the safety limiter has been triggered to prevent hearing damage and they should adjust the signal levels to avoid this happening.

Gain protection can be applied at an individual node to push the gain target further downstream. For example, the user may adjust the output gain stage of the mixer because they are struggling to hear the audio from a first sound source A that is providing a first audio stream A. This could potentially cause damage if a loud signal is passed through the same signal chain. This needs to be caught by the fail safe limiter or the output compressor that may be used to prevent or reduce the damage. If a second audio stream is connected into the mixer, the output gain stage is potentially setup incorrectly for an additional stream that does not require such a high level of gain to be applied. The system recognizes this and pushes the existing output level compressor with large makeup gain downstream to the input gain of the first audio stream A. This allows the output gain stage to return to "passthrough" and the new second audio stream B may not be amplified. If the user requires the second audio stream to be amplified as well, a second compressor is applied at the input to the mixer for the second audio stream B, creating now two independent gain control stages feeding the output that is still at "passthrough" gain of 1 or unity or no gain. The user can create a new separate output gain control stage, in some embodiments.

Figure 23:
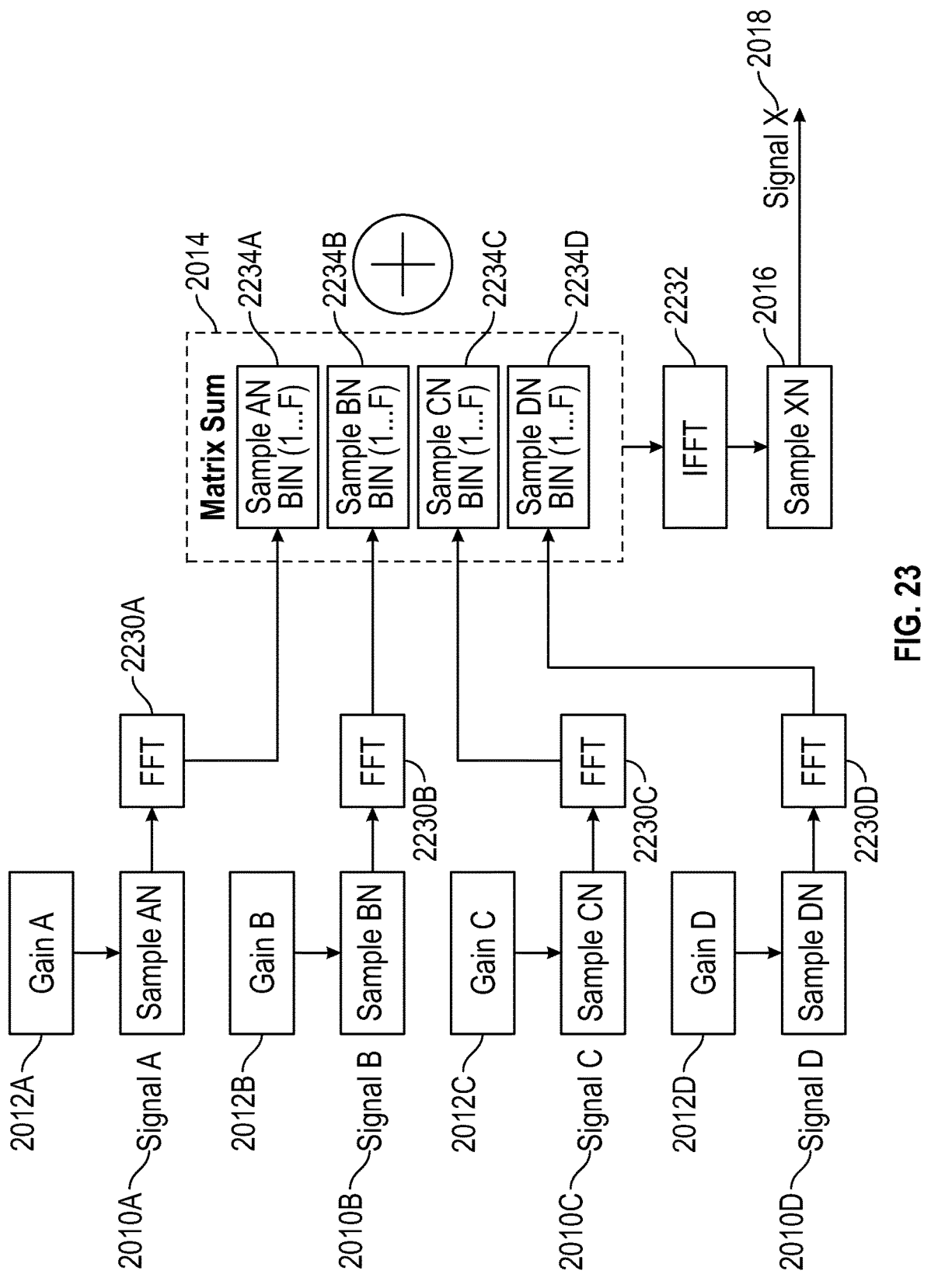
FIG. 23 illustrates an exemplary mixer including an IFFT, according to some embodiments of the disclosure.

The mixing of signals can be implemented in the frequency domain. When there are multiple sound objects being mixed together we may have a signal processing chain where multiple streams are converted to the frequency domain. We can mix the frequency components in the frequency domain using a plurality of FFTs 2230A, 2230B, 2230C, and 2230D. In some embodiments, the number of IFFTs (or other inverse transforms) are reduced. For example, the mixer may include one IFFT 2232, as shown in FIG. 23. Alternatively, each stream may be converted back to the time domain before mixing using traditional time domain methods. Standard addition techniques for combining frequency domain data can be applied. The data in each corresponding frequency bin 2234A, 2234B, 2234C, and 2234D are summed, for magnitude component, and rotated, for phase component. This creates a new set of information for each frequency bin.

Figure 24:
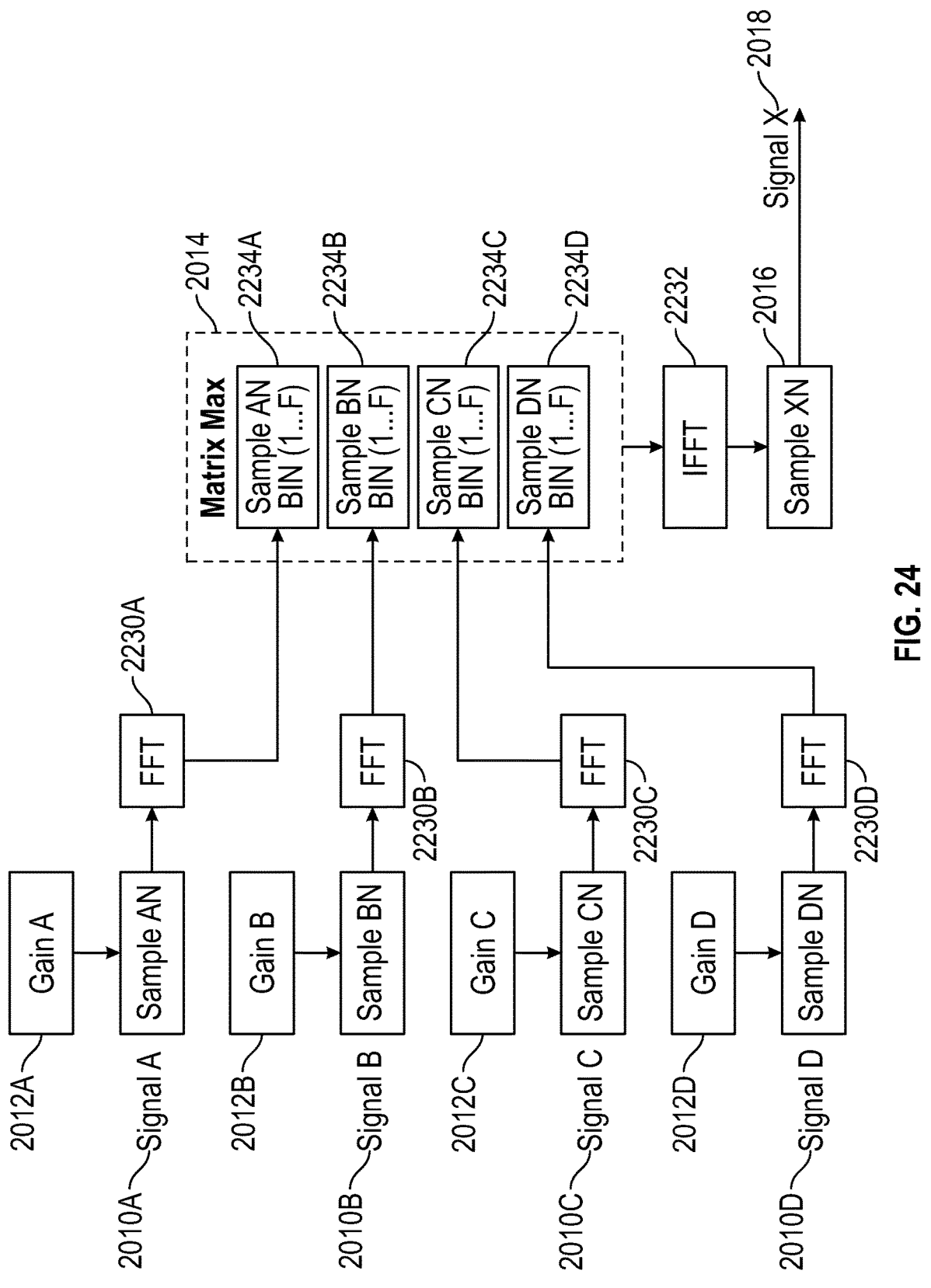
FIG. 24 illustrates a block diagram of an exemplary mixer including a matrix max function, according to some embodiments of the disclosure.

FIG. 24 illustrates a block diagram of an exemplary mixer including a matrix max function, according to embodiments of the disclosure. Signals that are processed in the frequency domain provide additional information that can be used to optimize a mixing operation. The gain components of each frequency bin are compared across the multiple input streams to the mixer. The mixer may include a matrix MAX 2314 function which identifies the loudest frequency component within the current time window. The frequency bin data 2234A, 2234B, 2234C, or 2234D that corresponds to the MAX gain and phase data is passed to the IFFT 2232.

This may avoid the need to sum together the corresponding data components for every input data stream in the frequency domain. Instead, it uses a comparison and a data move operation. This creates a new complete time frequency block of data that includes only the loudest frequency components for each frequency bin. The inverse transform is applied to create the time domain signal. The transform could also be a time domain filter bank where the amplitude is calculated using the sample values in each frequency band. Fading between streams can be used to transition between each window of samples. Regular matrix mixing can be used to sum all the samples within each frequency band if the loudest threshold is not being used. Applying gains that can be independently set and dynamically adjusted for each frequency band allows multiband compression to be applied as part of the mixing stage.

A similar method is used for optimizing the mixing matrix processing by applying a noise gate to each input signal. For each signal at the input to the mixer, the magnitudes of the individual frequency bin components are compared with a noise gate threshold value. The noise gate threshold value can be different for each frequency bin. The shape and magnitude of the frequency based noise gate mask can be user-controlled. The mask can be based on the user's hearing profile. The signals that include frequencies that the user cannot hear may not be mixed into the output signal. The noise mask is applied before or after the user-controlled gain is applied to the data in each frequency bin. The user-controlled gain can also be frequency dependent by using a multi-band compressor for example. The frequency domain signal components that do not exceed the noise gate threshold are not passed to the frequency domain mixer. This reduces the number of data streams that are combined to create the output data of the mixer.

An extension to this system is to change the noise gate threshold behavior such that instead of only allowing signals through that exceed the threshold, it allows signals through that are below a threshold. This can be used as a form of signal exposure protection. If a frequency component has a magnitude that exceeds a pre-determined threshold, it is prevented from passing through the system into the mixer matrix. Signal components that are below an amplitude mask value are allowed to pass through and be mixed together.

Figure 25:
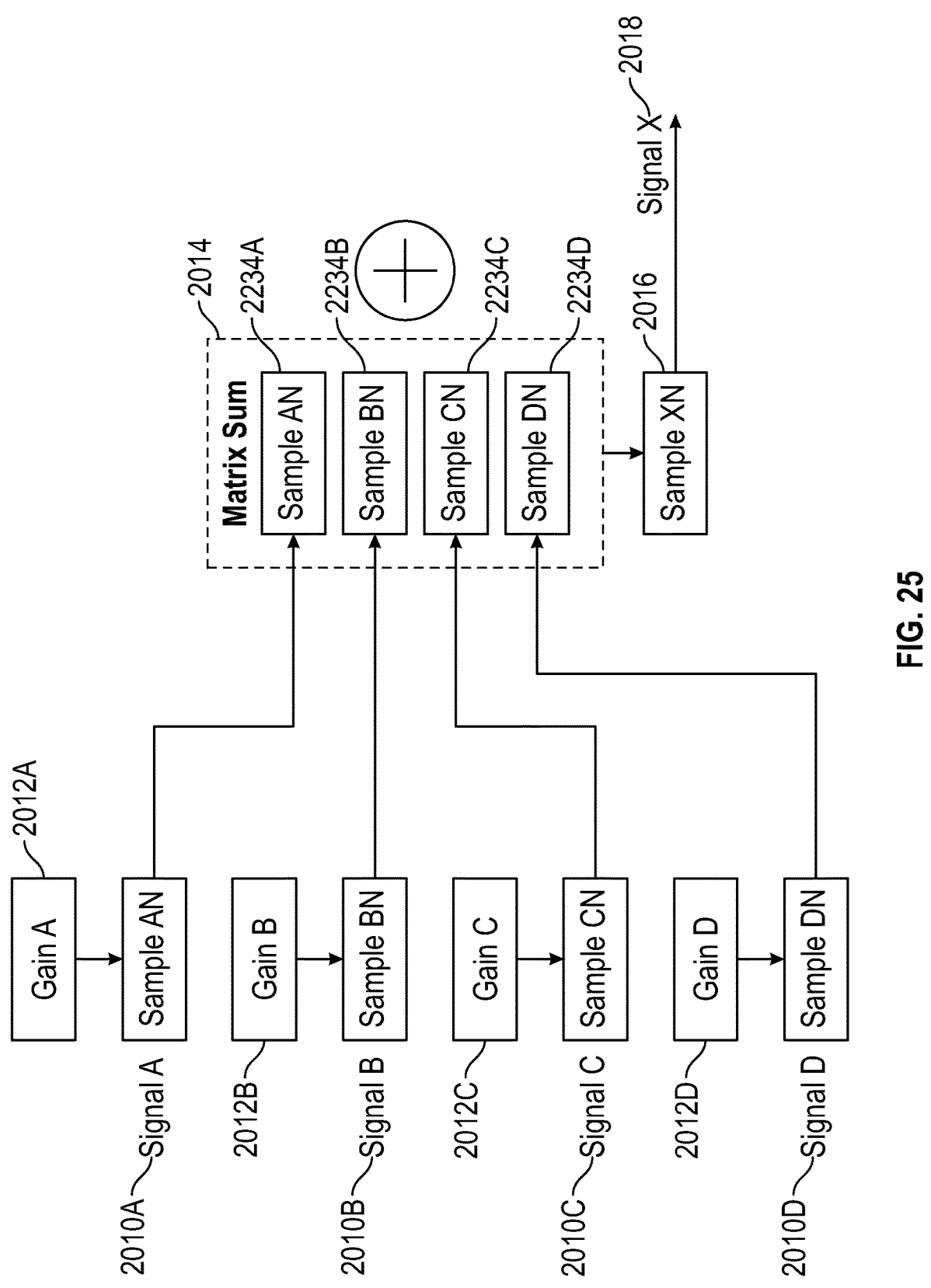
FIG. 25 illustrates an exemplary matrix threshold comparison used for multiple inputs of a multichannel matrix mixer, according to some embodiments of the disclosure.

An example of the matrix threshold comparison used for multiple inputs of a multichannel matrix mixer is shown in FIG. 25. This can be for a maximum threshold or minimum threshold depending on whether it is used for a noise gate or a level limiter. More than one threshold comparison matrix operation can be used simultaneously on each stream and each one can have independent parameters, shown as 2234A, 2234B, 2234C and 2234D.

The threshold masks for noise gate applications and amplitude protection applications can be dynamically set by a separate analysis component in the system. This analysis component could be a NN that has identified a sound that includes a signature the user has selected as being a sound that they want to or do not want to hear. For example, a worker in a factory may configure their device to allow speech sounds to pass through, even if they are quiet, but do not allow the noise of a machine to pass through above a different threshold so they are not exposed to sounds within a certain frequency region for long periods of time. The thresholds can be determined by health and safety regulations that are controlled from a central system and overlaid on a user's device when working in a particular environment to protect the user's hearing while allowing them to be aware of essential sounds around them.

In some embodiments, multichannel audio streams can be mixed independently. For example, the level masks and mixing matrix configurations are separately controlled for the left ear and the right ear. The system can also be implemented with a signal threshold mask or mixing matrix configuration that is applied to all output streams, for example, the same configuration for the left ear and the right ear. The system can also allow the mask for the left ear to influence the mask for the right ear, and vice versa. For example, the thresholds may be set such that a sound is detected in the right ear, but the level in the left ear is too low, and it may not be passed through. The analysis at the right ear can determine that this is an important sound and must be allowed through in both ears and can adjust the masks for the left ear accordingly. This can be extended to ensure that sounds are heard in conditions where there is external noise and the user's hearing profile may prevent some sounds being heard unless they reach a particular level. Some mixing parameters may prevent a user hearing a sound at all, which is acceptable in some listening conditions. In other conditions the sound may be an emergency warning that must be delivered at a level where the user can hear it above all other sounds, even with noise cancellation and reduction processing being used simultaneously.

Binaural mixing: To ensure coherence for binaurally rendered sound objects, the left and right sounds may be mixed without breaking, disrupting, removing or causing ambiguity of the spatialization cues. Each sound object can be a separate single channel of audio. Multichannel audio streams can also be mapped onto a stereo or binaural output pair of audio streams. The sound object is rendered to a spatial location, using HRTFs or simple panning to create a left output signal and a right output signal. The left and right signals are mixed with other sound object output signals to create a mixed left signal and a mixed right signal. The mixing can be done in blocks or single sample to reduce latency for output playback. The level of a sound object is controlled by the user adjusting a gain to create their preferred balance of sounds in the overall mix. The left and right levels are separately controlled through the output gain control.

Binaural mixing can also benefit from the use of level thresholds and comparison of signals across each sound object. For example, the left and right signals of a set of binaurally rendered sound objects can be compared in the frequency domain. The magnitude of each frequency bin is passed through a MAX function and the greatest component is copied to the output frequency domain buffer. This is repeated for all the frequency components within a time window for all the sound objects. This results in a left and right frequency domain signal that includes the loudest spectral components from the original rendered sound objects. The user still has two stages of gain control. One for the individual sound objects as inputs to the mixer and one for the output to control the overall binaural level of the mix, similar to traditional volume controls. This can also be considered as binaural mixing based on spatial dominance of input sound objects.

Matrix mixer optimizations can be applied to make best use of the available hardware macro extensions on a silicon platform. For example, a system may use a software defined mixer to be programmed for eight inputs and two outputs. The hardware macro can be built to provide eight parallel multiplication operations for the gains to be applied, followed by a summation. This is repeated for each output channel. An alternative operation is to have two parallel operations that are performing the gain multiplication on each channel and store two separate accumulated results. This is repeated eight times for each of the inputs to the mixer to create two final accumulated output results. A further extension is to have the same operations for two data components in a bank of parallel multiplications and accumulations that can be clocked in sequence as a cascade of results passes from one to the next. This is more applicable where the number of inputs and number of outputs are not going to exceed a maximum limit of the design. If the mixer matrix is unlikely to exceed a reasonable size, a fixed matrix size can be programmed for further optimizations. An example of a typical ear worn product may have two outputs, for the left and right ears, and may not exceed eight or 16 individual input streams. A hardware stage counter can be used to configure how many sequence steps are used within the optimized matrix. This ensures that only the active channels are used within the hardware macro. The hardware macro for the multichannel mixer may also be designed to handle 16 or 32 channels in the silicon product. The number of active channels that are available to a manufacturer or end user may be limited using one-time programmable identifiers or licensing keys. Additional channels of mixing and inputs can be provided by purchasing a license key to unlock them. Beyond this range, a different configuration is used, such as a purely software solution or modular hardware macro as described above.

Masking threshold mixing: The human hearing system suffers from an effect known as auditory masking. This happens when a first sound A is of a sufficiently large amplitude that it prevents a quieter, second sound B from being heard. The first sound A and the second sound B do not have to be at the same frequency, but are within the same critical band. The first sound A and the second sound B may not occur at the same time. If the first sound A is loud enough, it can mask the second sound B when it occurs after the first sound A and even if it occurs before the first sound A. This presents an interesting optimization for the mixer. An extension to the threshold of whether a sound should be passed into the mixer can be used to further reduce the amount of operations performed. The use of the MAX operation described above can be extended across adjacent frequencies, and if buffering is used, before and after the loud sound has passed through the mixer.

Matrix mixer mask: The performance of the matrix mixer is determined by a mask that sets whether a signal component is passed into the mixer matrix and operated on. The matrix of gains that are applied are also controlled by the mixer matrix mask. The mask is also controlled by the level of other sounds or signals in the system. The mask can be externally controlled by the user to activate or de-activate individual streams or combinations of audio streams or all streams. The mask can be controlled by external events, such as other system triggers, for example, a sensor providing a piece of information that may require urgent attention by the user. This could be a sensor that detects a doorbell ringing or receives a wireless message, which triggers all the other mixer inputs, expect the single target sound audio stream, to be masked to zero temporarily. Another example could be a sensor that is monitoring the user's heart rate and can detect when they are sleeping. Some devices are designed to produce sound to help mask outside noise and help people sleep. When the device detects the person is asleep, the audio streams can be automatically reduced in level and adjusted based on sleep patterns.

Figure 26A:
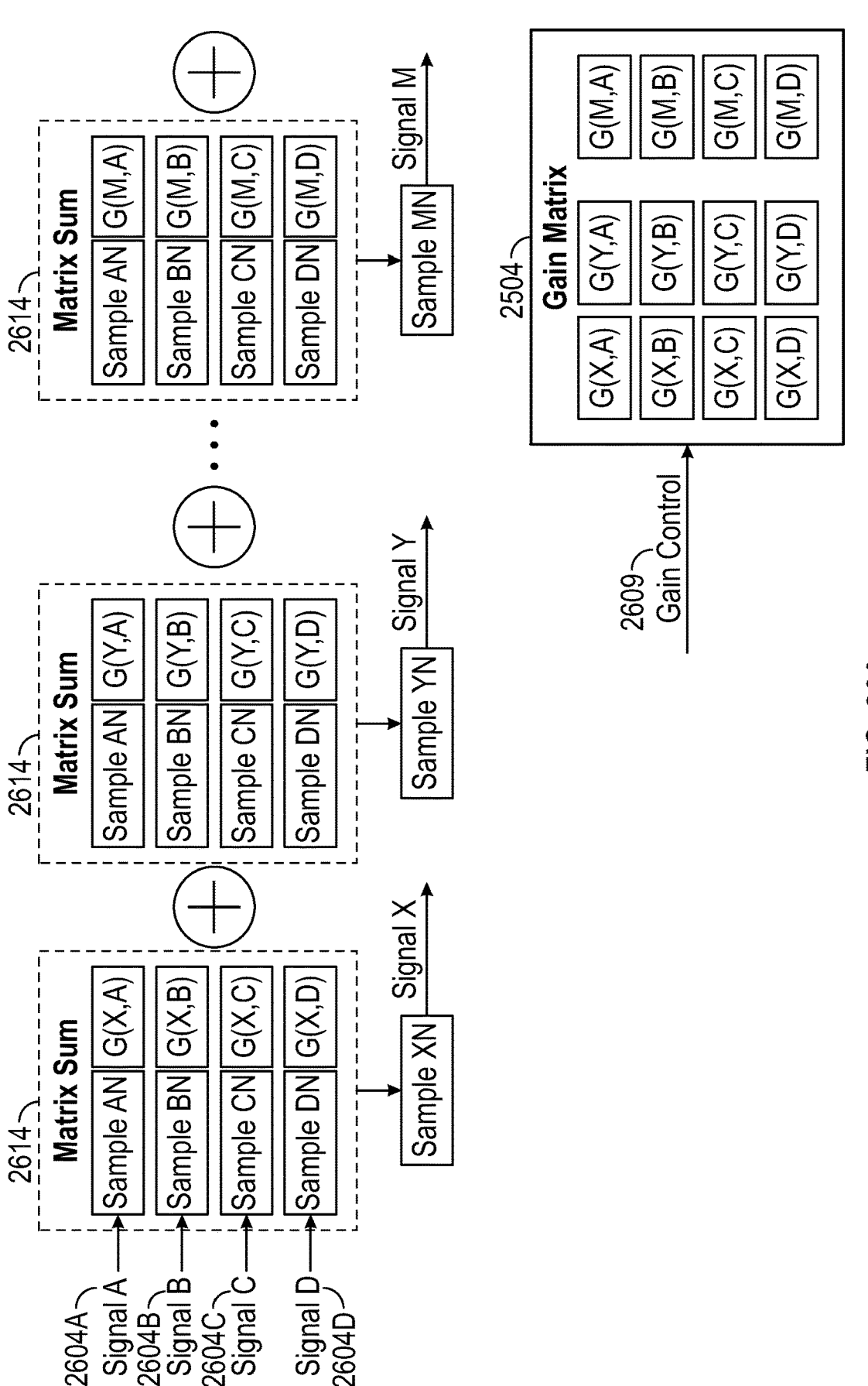
FIG. 26A illustrates a block diagram of an exemplary mixer including independent processing for each of a plurality of output channels, according to some embodiments of the disclosure.

Multichannel mixing: The system may be programmed to have independent processing for each output channel. FIG. 26A illustrates a block diagram of an exemplary mixer including independent processing for each of a plurality of output channels. A plurality of matrix summers 2614 may receive a plurality of signals 2604A, 2604B, 2604C, and 2604D. The plurality of matrix summers 2614 may use gains from a gain matrix 2504. The gain matrix 2504 may determine the gains using a gain control 2609.

Figure 26B:
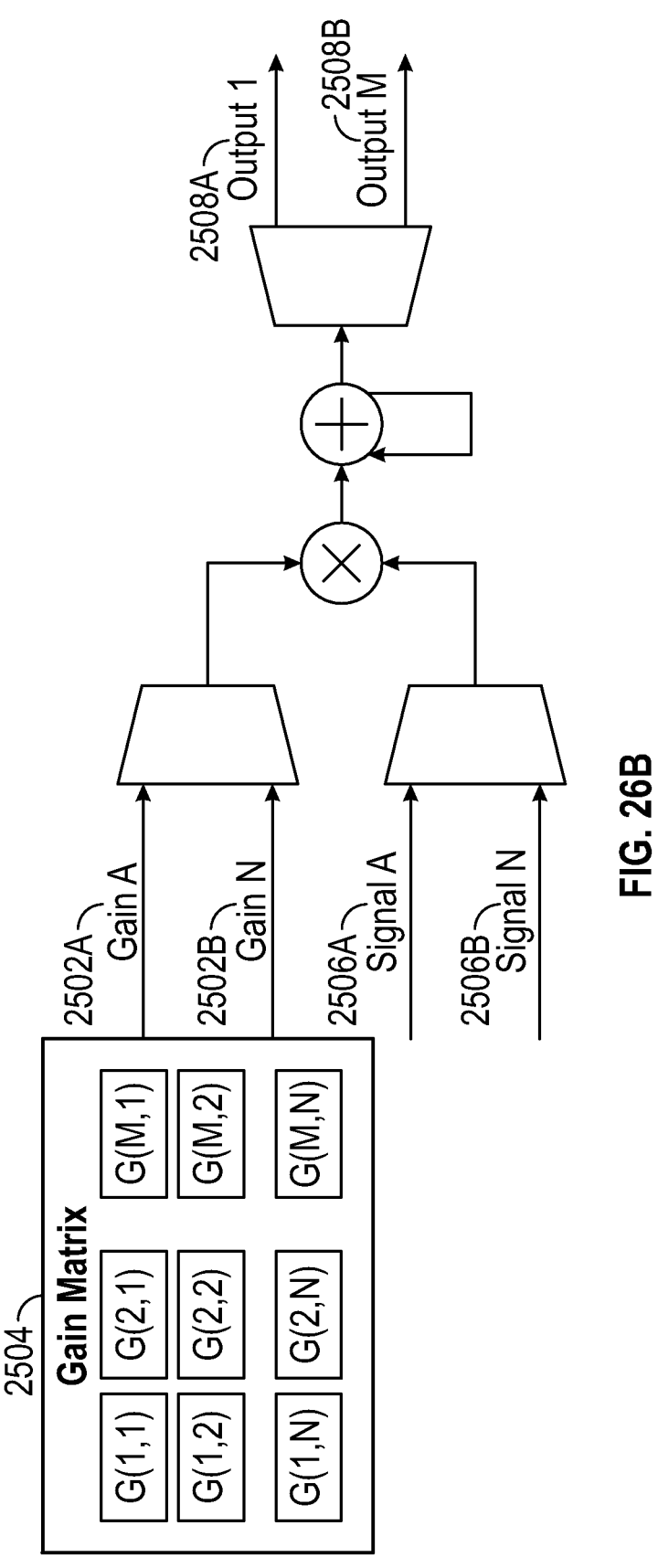
FIG. 26B illustrates an exemplary gains being grouped and updated as a single operation to ensure gain changes and the mix of sounds remains consistent, according to some embodiments of the disclosure.

The gains can also be grouped and updated as a single operation to ensure gain changes and the mix of sounds remains consistent if that is desired, as shown in FIG. 26B. The mixer may include independent gains 2502A and 2502B (from a gain matrix 2504) and mix of sounds from multiple signals 2506A and 2506B to generate a plurality of outputs 2508A and 2508B. One example is for a user that uses different levels to each ear and a different combination of sounds to each ear. The software defined mixer allows the I/O gains to be independently controlled to accomplish this.

Figure 27:
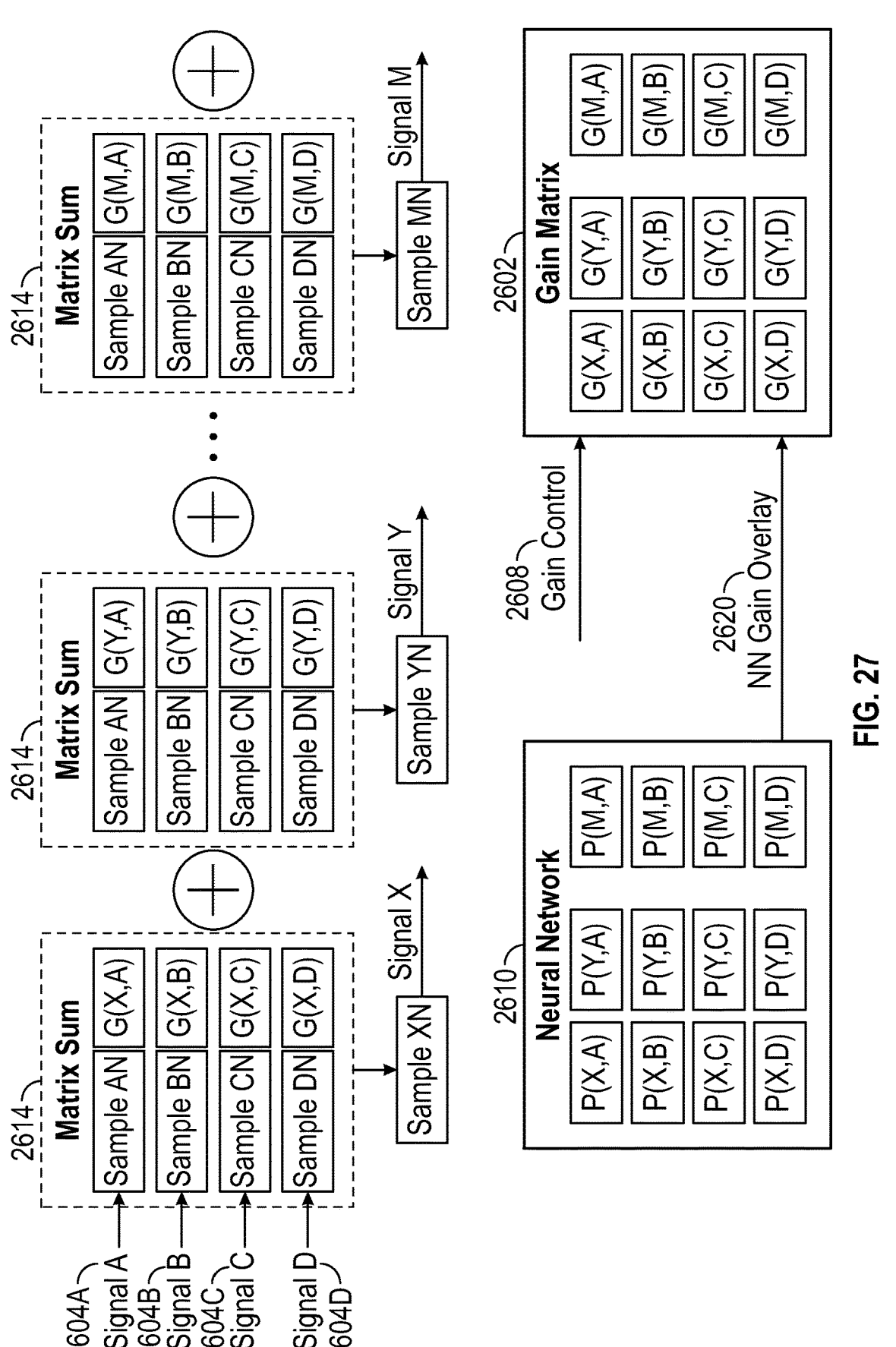
FIG. 27 illustrates a block diagram of a multichannel mixer, according to some embodiments of the disclosure.

Multichannel mixing with gain matrix and external control: FIG. 27 illustrates a block diagram of a multichannel mixer, according to embodiments of the disclosure. A gain matrix 2602 may be used to control the I/O gains for a plurality of signals 2604A, 2604B, 2604C, and 2604D through the mixer. The gain matrix may receive a gain control signal 2608 and an NN gain overlay signal 2620 from an NN 2610. The gains are set through additional processors, in response to a user interface, or through a NN controller.

Multichannel mixing gains can be set based on the combined mixed output features which are fed back to the NN 2610 or other type of processor to update the gains. This allows the analysis of the output to control the configuration of the input for the software defined mixer. The analyzer can determine the optimal mix of sounds based on a target output. This can be trained using machine learning to use the multiple input streams to create a preferred balance of sounds. If the content within the input audio streams to the mixer changes the balance, the output of the NN 2610 may generate different gain maps to maintain the balance within the desired range.

For example, a user may have a preference for the balance of sounds that they hear when separated into target sounds, background sounds and noise sounds. The audio streams into the mixer may be controlled to ensure a natural balance of sound is achieved. The gain of each stream is adapted in real-time using a plurality of matrix summers 2614 to maintain the preferred mix. Typical automatic gain control processing uses the amplitude of the sound content to adjust the gain. A more advanced system may use the analysis of the content of audio stream to adjust the gain of the stream when presented with other sounds in a mix.

An extension to this example is when the background sounds the user is hearing are very quiet, and a typical automatic gain control may make them louder to meet the target level. The target sounds the user is hearing may now be impacted by this increase in level of the background sounds due to spectral overlap, conflicting content, such as another talker in a crowded room, or spatial proximity to the target sounds. Independent control of the different categories of sounds ensure the target sounds remain audible and are not masked by background sounds.

Figure 28:
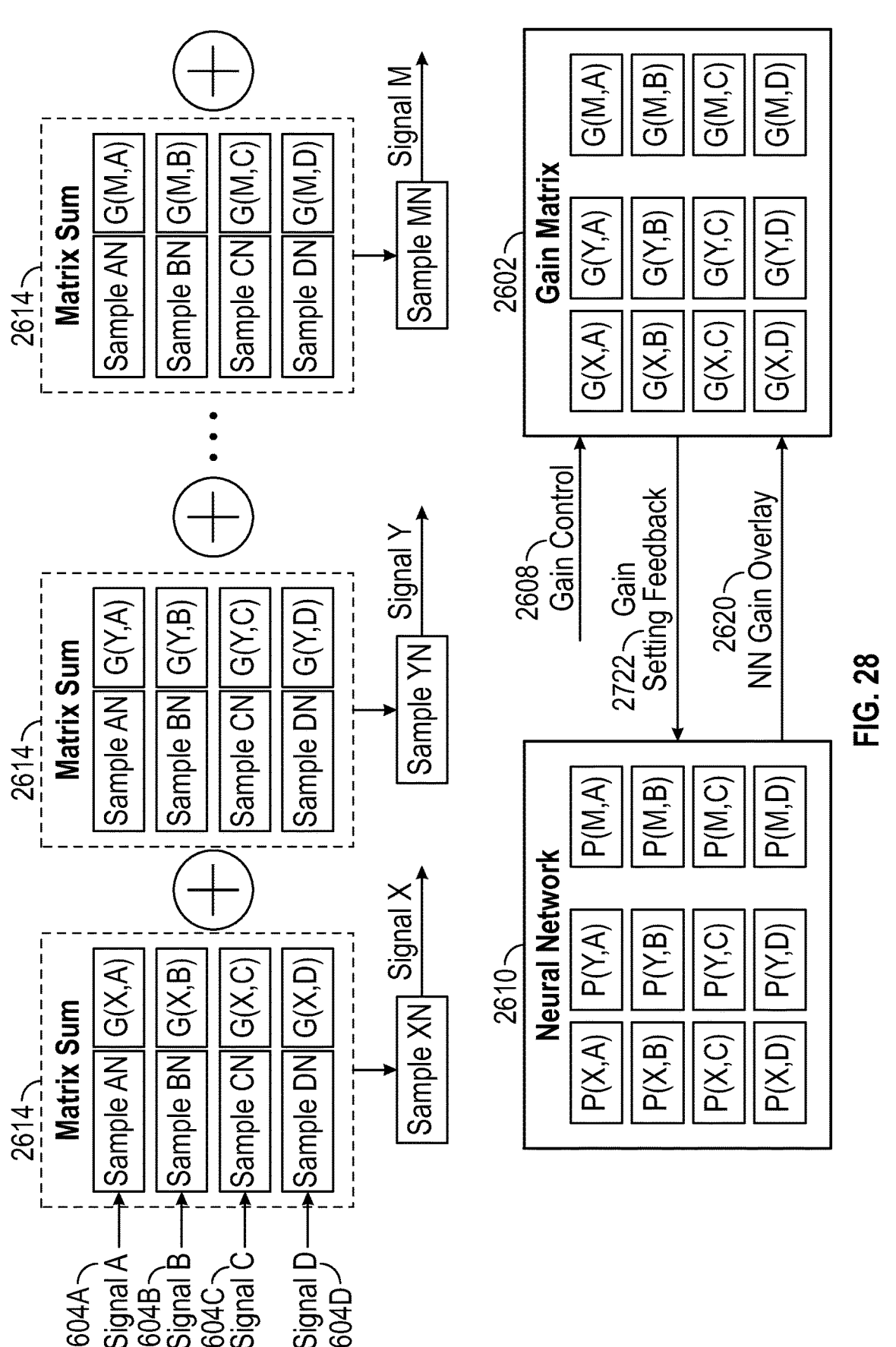
FIG. 28 illustrates an exemplary diagram for adjusting the mix balance using a gain setting feedback signal, according to some embodiments of the disclosure.

In some embodiments, the system may analyze the output mix and detect when target sounds are being masked by other sounds. The mix balance can be adjusted using a gain setting feedback signal 2722, as shown in FIG. 28, to create a better experience for the listener, without them having to continually adjust the target gains or compression settings for individual streams.

Figure 29:
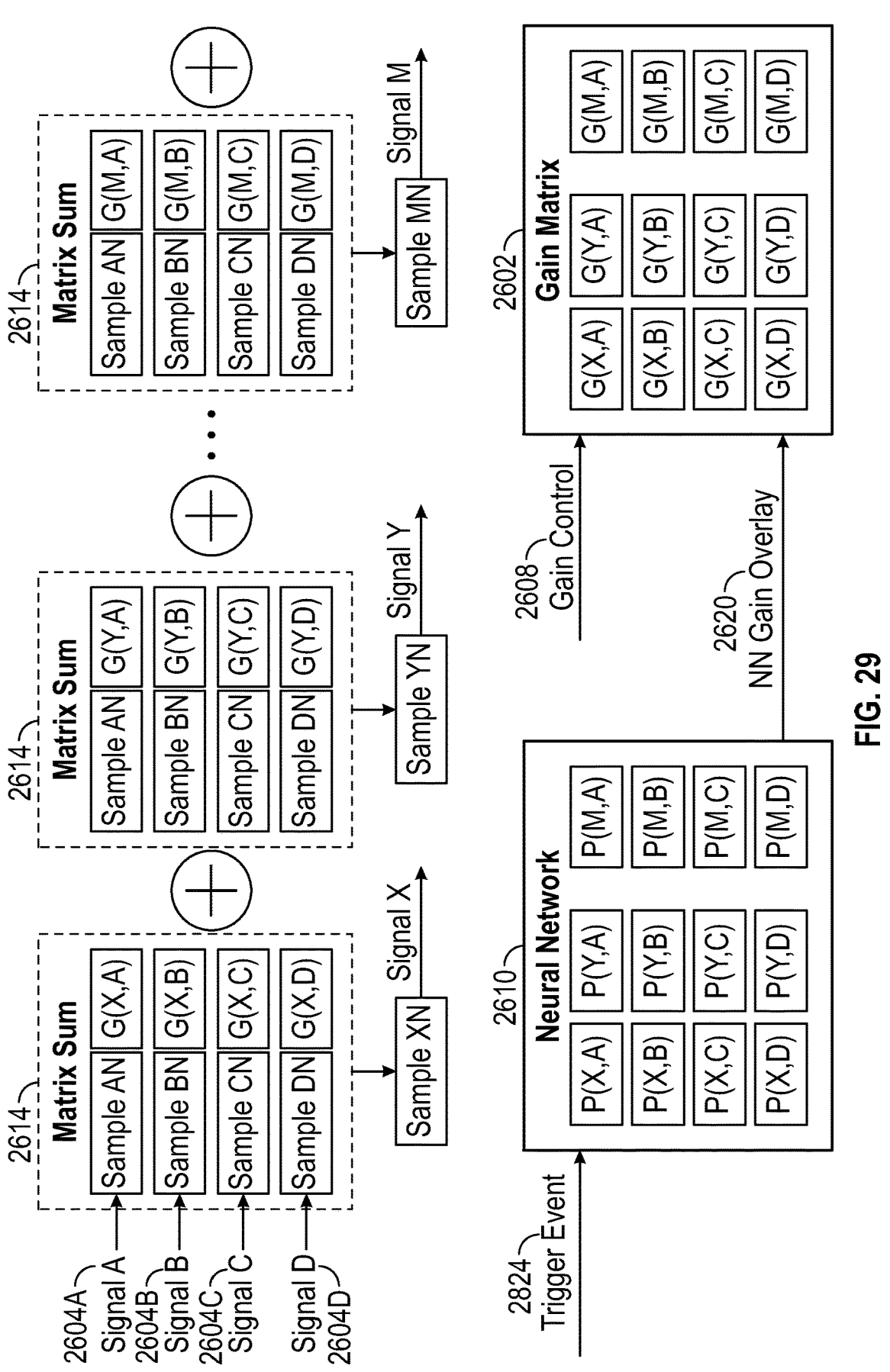
FIG. 29 illustrates an exemplary neural network may receive a trigger event signal to trigger this configuration change, according to some embodiments of the disclosure.

This can be extended to include the handling of external and internal trigger events to the system that causes the software defined mixer to change its configuration, gain maps, user profiles etc. As shown in FIG. 29, the NN 2610 may receive a trigger event signal 2824 to trigger this configuration change.

Figure 30:
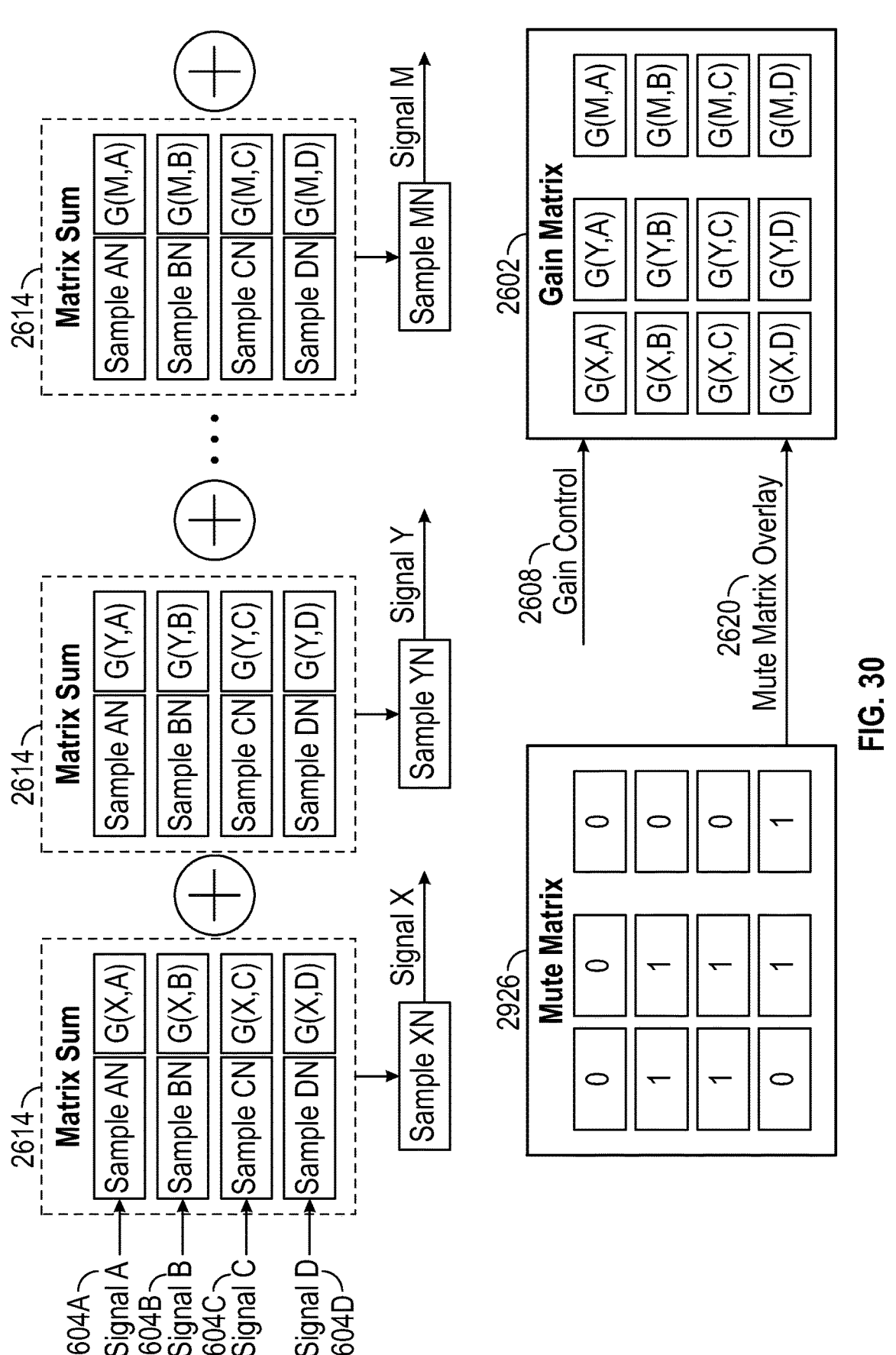
FIG. 30 illustrates an exemplary multichannel mixing matrix with a gain map being controlled by a mute matrix, according to some embodiments of the disclosure.

In some embodiments, the multichannel mixing matrix with a gain map can be controlled by a mute matrix 2926, as shown in FIG. 30. The mute matrix 2926 is used to override the gain settings in the gain matrix 2602. I/O streams are controlled with a separate mute matrix, which allows the gain to be restored when muting is no longer used. The mute matrix 2926 can be controlled through user interface or other processors. The mute matrix 2926 may cover all I/O configurations for a multichannel software defined mixer.

For all the described gain change mappings and mute operations, smoothing can be included to ensure audio streams are handled without causing glitches or clicks for an improved user experience.

Figure 31A:
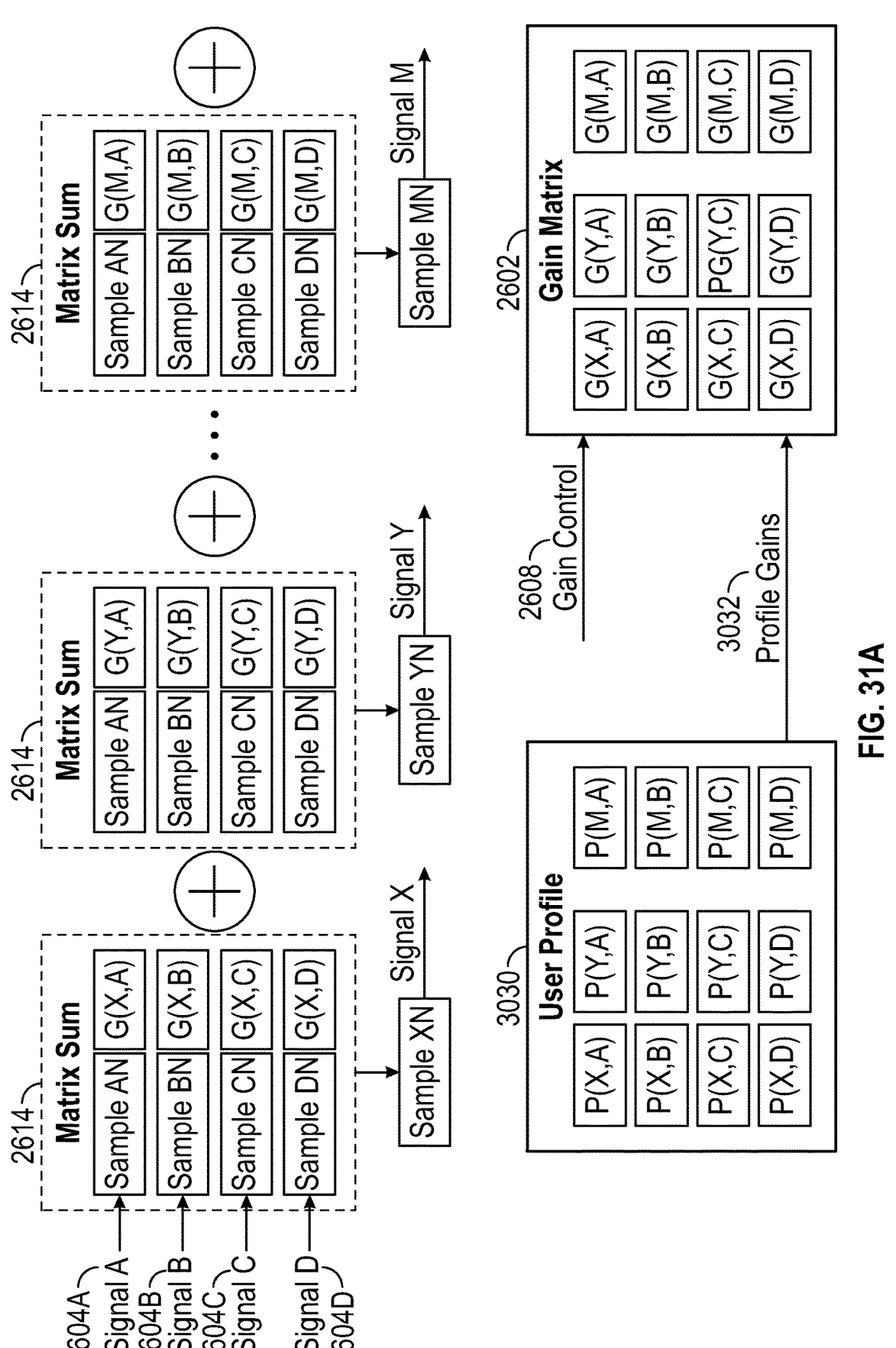
FIG. 31A illustrates a block diagram of an exemplary mixer including a user profile, according to some embodiments of the disclosure.

Multichannel mixing with user profiles: FIG. 31A illustrates a block diagram of an exemplary mixer including a user profile, according to embodiments of the disclosure. User profiles 3030 store a saved matrix for a particular user scenario or experience condition, such as making a phone call outside, having a conversation in a noisy restaurant, listening to music on the train, etc. The profile gains 3032 can be stored as a fixed set of parameters that the user can update as a separate data set from the actual gains being used. The profile information could be different NN coefficients for that particular listening scenario. The profile can be used as a good starting point, and the user can adjust the gains if the scenario is slightly different. In some embodiments, the adjusted gains may be stored as new settings as a new profile. A NN can be used to automatically select the preferred user profile based on the listening scenario, for example, it detects that the user is in a very noisy and reverberant room. The system may switch to a profile that handles the noise condition for the user, and the profile may be one the user has selected many times before when the condition changes to this listening environment. The user profile gain map can be set and controlled by the user or a third party plugin that is part of the signal processing within the system. The user profile may also be provided by an external source, for an audiologist providing a different profile based on user feedback when trying a hearing assistance device. The user profile gain map can be adjusted in real time by a remote third party. For example, an audiologist could be providing updated gain settings for users that are unable or do not wish to change the gain maps themselves. The audiologist can accomplish this while the user is providing feedback. The system can also provide metrics back to the user and the audiologist to give information relating to the environment the user is exposed to.

Multichannel mixer with unmixer for ambient sound or streamed content: Some systems may unmix the audio stream into separate components before a matrix mixer is used to recombine the sound components into a new mix. This can be implemented using a NN that is trained to identify, separate, and extract sounds into different sound streams. This can use features such as spectral content, level, spatial location, information content, talker identification, sound signatures, audio categorization, etc. In some embodiments, the data streams for the mixer may come from an unmixing process. This may allow the user to determine the individual levels of unmixed audio streams, while maintaining spatial information and binaural cues for the sound sources.

An example of this is to identify audio content that is being delivered through a single audio data stream but includes a sequence of multiple pieces of content. This could be a music stream from a cloud based audio streaming service, a radio station, or a video streaming service that embeds advertisements or other audio material. In some embodiments, the levels of the different pieces of content are not level matched. The advertisements may be louder and brighter to grab the user's attention. A signal separator can be used to categorize the music part of the data streams and distinguish it from the speech or advertisement part of the audio stream. The audio type classification allows the generation of two or more outputs streams. The music streams are sent to one set of inputs to the mixer. The other audio streams are sent to different inputs to the mixer. The user can then control the level of the music content independently from the other content. This allows them to reduce the level or mute content based on their preference. Exemplary signal separators may include NNs that are trained to identify music differently from speech, categorize sound levels content to determine if a segment of audio is significantly and unnaturally louder or quieter than previous segments, or determine and/or use compression metrics to indicate the compressor is working harder to adjust the level of the audio, either to increase it or decrease it, relative to previous compression parameters. Gap detection in audio streams are also useful indicators and markers that a section of audio is finished, and a new piece of content is about to start. Noise floor analysis and measurement can also be used to mark a transition between different pieces of content as the noise floor of the music content is unlikely to be the same as the advertisement. A voice activity detector can also be used to identify content that has the dynamics of speech instead of the rhythmic and tonal dynamics of music.

Figure 31B:
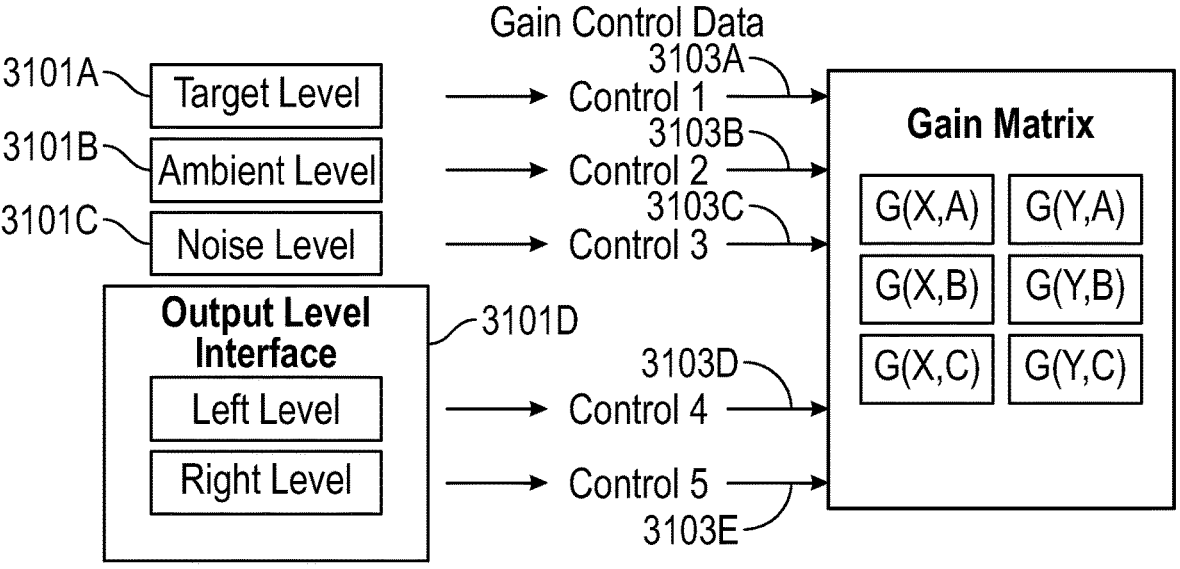
FIG. 31B illustrates an exemplary user control of multiple streams of audio unmixed from ambient sound, according to some embodiments of the disclosure.

The user control of multiple streams of audio unmixed from ambient sound is shown in FIG. 31B. This shows that the user can individually and independently control the levels 3101A, 3101B, 3101C, and 3101D using independent control signals 3103A, 3103B, 3103C, 3103D, and 3103E. The target sounds, background sounds, ambient sounds, and noise sounds can be mixed. This may adjust the balance of ambient sounds that the user is hearing. This can be extended to more sound categories based on user preference and the specific scenario.

Multichannel mixer with content switcher: An extension to the method of the mixer muting audio streams and allowing the user to remove audio from a sound source is the method that allows the system to switch to an alternative audio source. For example, the software defined mixer is connected a first audio source A and a second audio source B. The first audio source A could be an online music streaming service. The second audio source B could be local memory embedded in the ear worn product or an alternative sound streaming service or a connection to an alternative music content player. When the system detects that the content from the first audio source A is no longer the desired category of sound, such as a transition from music to an advertisement including speech, the mixer routes the audio from the second audio source B with its own target gain into the system in place of the undesired content from the first audio source A. This transition can be caused by the user pressing a button. The system can learn that the user wants to replace advertisement category sound with sound from the second audio source B. This is similar to a user changing to different radio stations when commercials start. This transition can be automated through sound categorization.

Multichannel mixer with multichannel outputs: The mixer supports multiple input audio streams and multiple output audio streams. The mixer is not limited to two channels of output, for example, for stereo sound for left and right ears. The mixer may be in a system that uses more than one headphone to be connected simultaneously. One non-limiting example is a streaming pod that has two physical headphone outputs for two people to share the audio stream. The mixer could allow each user to have independent control of the balance of sounds while listening. Person A may want the audio to be louder than person B. Person A may want to hear more ambient sound than person B. Person A may have a different hearing profile to person B. This could be used in situation where multiple people share accommodation, such as a student room, and the user would like to listen to music late at night without using loudspeakers. This can also be used on devices where multiple headphone connections provide a personalized sound to each user, rather than a single general experience. An additional extension of this is the use case where two or more people wish to watch TV without using the speakers to avoid disturbing others, so the audio is streamed to their ear worn devices. Each individual would require separate audio processing that is based on their preference and profile. This is enables a scenario where multiple people can experience the same audio stream at their own preferred level based on the source content, such as a group of people all watching TV and effectively having their own independent control of the sound level.

Multichannel mixer with multichannel outputs to a single device: An extension to the multichannel mixer output streams is the configuration where all the output streams are for a single device. This is used when the connected audio device includes multiple outputs, such as a headphone with multiple drivers inside each ear piece. An example is a headphone that has a low, mid, and high band audio streams with separate acoustic drivers for each. The software defined mixer can provide separate audio streams that are processed to deliver audio in the relevant band to each driver. This configuration of the mixer may have more outputs than inputs. This allows different gains to be applied to each band of audio to create different sound profiles based on user preference, for example, person A may prefer a first sound profile (e.g., one with more bass) and person B may prefer a second sound profile (e.g., one with more treble). The left and right ear pieces may continue to have different sound profiles and different gains so that the sound to each ear can be independently controlled.

Multiple mixers: A system can include multiple mixers to handle audio data streams at different sample rates. Multiple hardware and software configurations can be implemented in parallel or in sequence. For example, a mixer can be used for ambient sound balancing, another mixer can be used for content received from connected devices, another mixer can be used for phone call or communication use cases, etc. Each of these individual mixers can be fed into a system mixer where the user can control the balance between different data sources and audio streams based on different use cases and acoustic scenarios.

Multiple mixing domains: The software defined and controlled mixer can be implemented in the digital or analog signal domain.

Multichannel mixer architectures: The software defined mixer uses a dynamic architecture. The number of I/O connections can be programmed in real-time without causing a break or a glitch in the audio streams. A basic mixer may consist of only two input audio streams from two separate audio sources and two output audio streams for the left and right ears. The mixer can be executed in a sample by sample basis. The mixer can operate on frames of samples when ultra-low latency is not used. The mixer can be triggered to run by external events, such as samples being ready or are needed by the output destination.

Figure 32A:
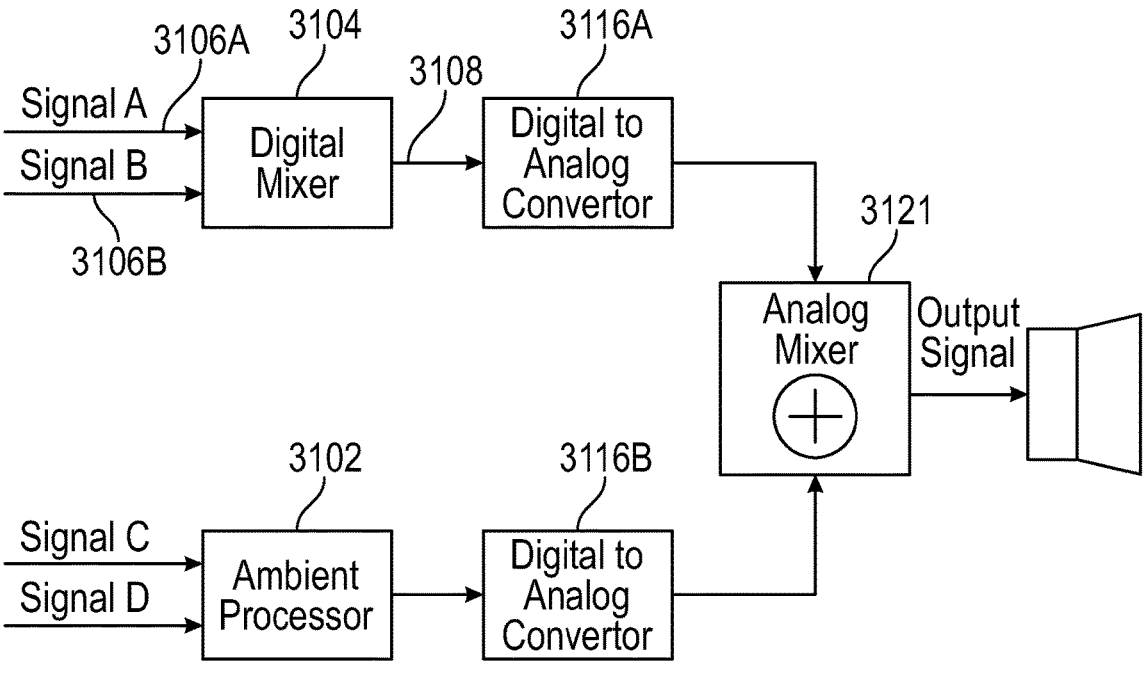
FIGS. 32A and 32B illustrate block diagrams of exemplary mixer mixing different types of audio streams using an analog mixing implementation and a digital mixing implementation, respectively, according to some embodiments of the disclosure.
Figure 32B:
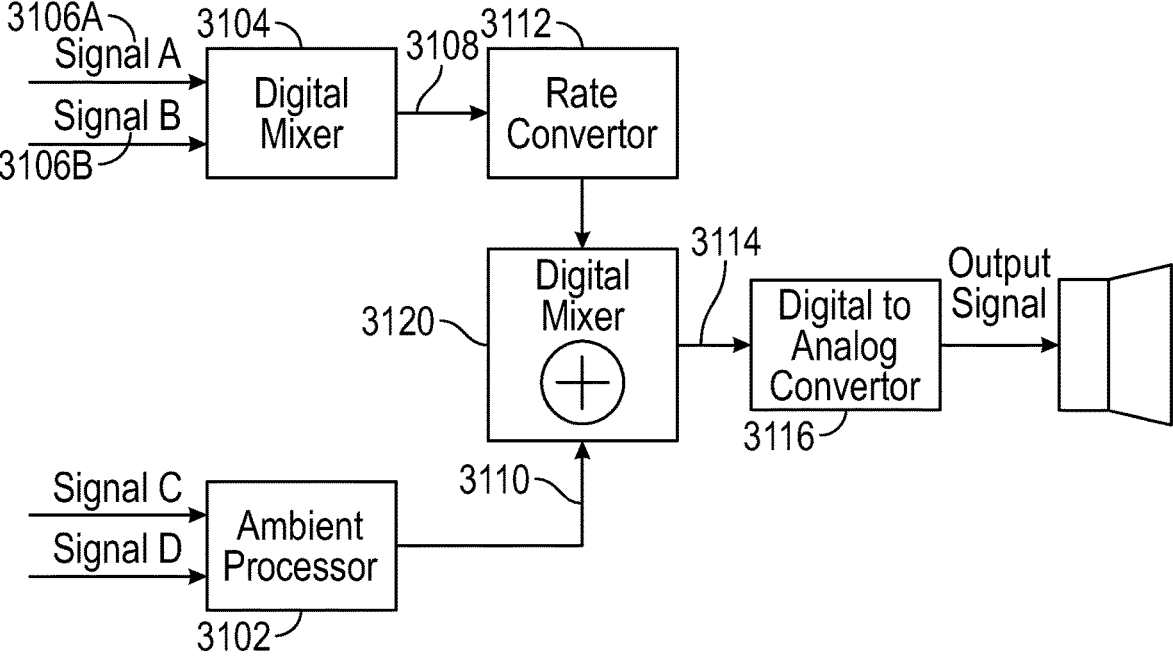

Matrix mixer with ultra-low latency: FIGS. 32A-32B illustrate block diagrams of exemplary mixer mixing different types of audio streams using an analog mixing implementation and a digital mixing implementation, respectively, according to embodiments of the disclosure. The mixer can be used for data streams that use very low latency processing with fast transitions from input to output. This can be useful for applications that are providing noise cancellation signals for the wearer of a device. Some sounds may be cancelled, such as ambient sounds that the user is exposed to. An ambient processor 3102 may be used to cancel or reduce these sounds. Some sounds may pass through the ear piece speakers without being cancelled, such as music playback streams or phone call streams. For example, a digital mixer 3104 may be used to mix signals 3106A and 3106B to generate signal 3108.

The outputs from the digital mixer 3104 and the ambient processor may be converted to analog signals using digital to analog converters 3116A and 3116B, respectively. An analog mixer 3121 may mix the analog signals to produce an output signal.

In some embodiments, as shown in FIG. 32B, the signal 3108 (from the ambient processor) may have a different sample rate than the signal 3110 (from the digital mixer). A rate converter 3112 may be used to match the sample rates of the signals 3108 and 3110. For ultra-low latency applications, low data rates may be upsampled to the higher data rates before mixing. The audio streams 3108 and 3110 can be mixed (using digital mixer 3120) into a signal output stream 3114 for a single speaker driver. This may reduce the need for two separate signal paths for digital to analog conversion (by a digital to analog converter 3116) and mixing in the analog or acoustic domain. The audio streams can be passed to different physical speaker drivers in the device.

Figure 33:
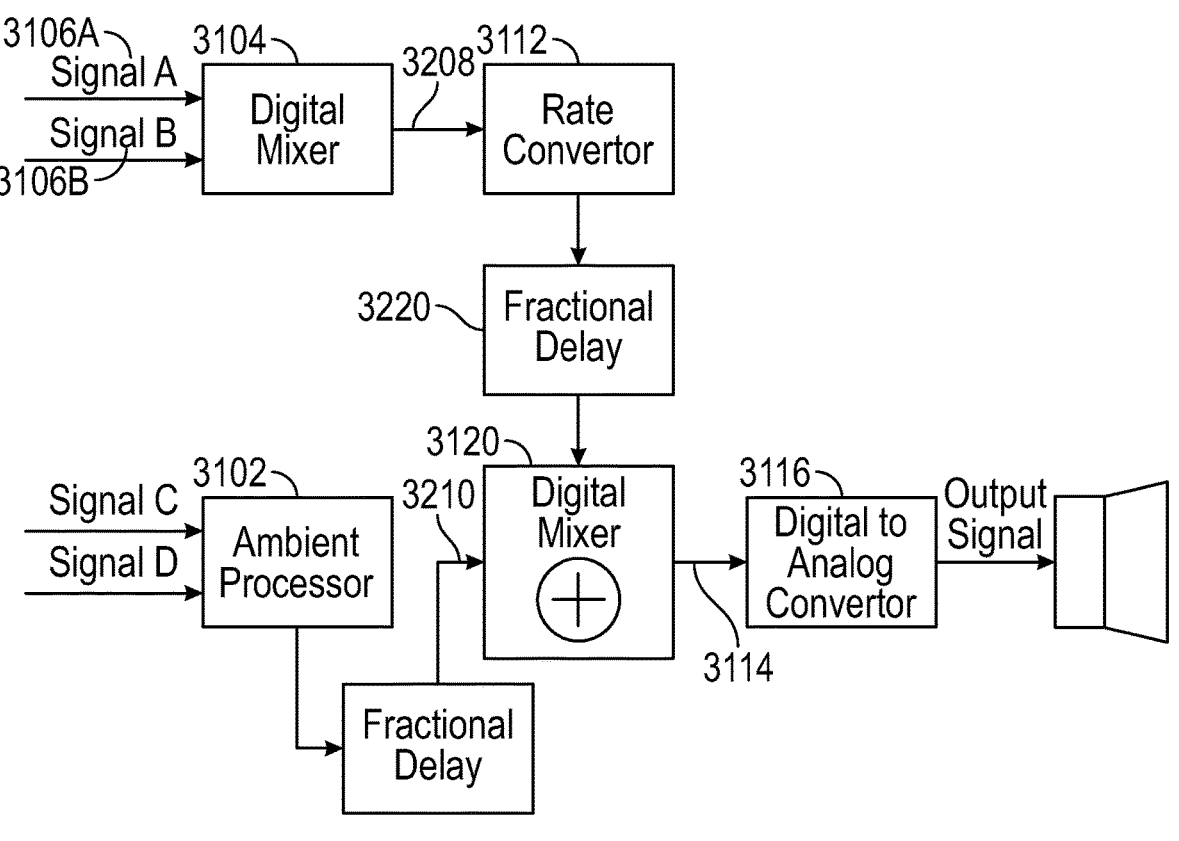
FIG. 33 illustrates a block diagram of an exemplary mixer including a fractional delay, according to some embodiments of the disclosure.

An extension to the ultra-low latency use case allows the inclusion of fractional delays 3220 to be applied to the upsampled data streams to configure the optimal cancellation of signals. FIG. 33 illustrates a block diagram of an exemplary mixer including a fractional delay. In some embodiments, the signal 3208 (from the ambient processor) may have a different sample rate than the signal 3210 (from the digital mixer). A rate converter 3112 may be used to match the sample rates of the signals 3208 and 3210.

Figure 34:
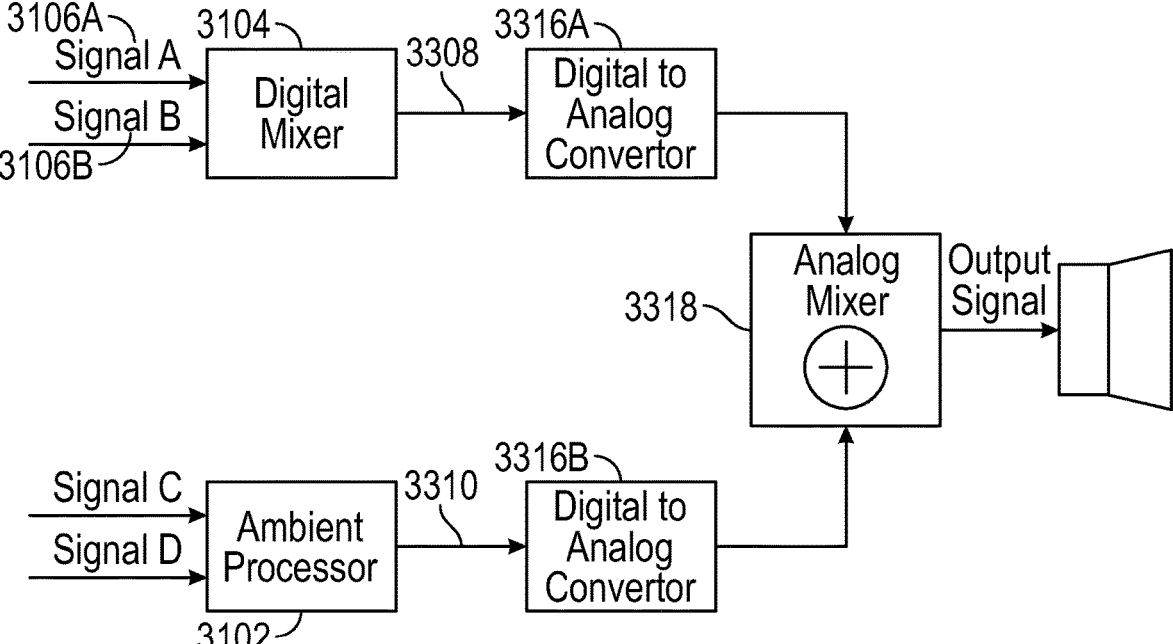
FIG. 34 illustrates exemplary mixing in the analog domain, according to some embodiments of the disclosure.

An extension to the ultra-low latency use case is to do the mixing in the analog domain, as shown in FIG. 34. The mixer may include a plurality of digital to analog converters 3316A and 3316B for performing a conversion on the outputs from the digital mixer 3104 (signal 3308) and ambient processor 3102 (signal 3310), respectively. The mixer may also include an analog mixer 3318 for mixing the outputs from the digital to analog converters 3316A and 3316B. In some embodiments, the mixer may exclude a high compute of the upsample filters and the additional data buffers. Separate gains can be applied to each of the individual audio streams.

In some embodiments, the digital to analog converters may be located along different multiple data paths. The data paths may have different sample rates, such as one very high sample rate for ultra-low latency signals, one for regular audio signals, another for voice rate signals, another for notification signals, etc.

Figure 35:
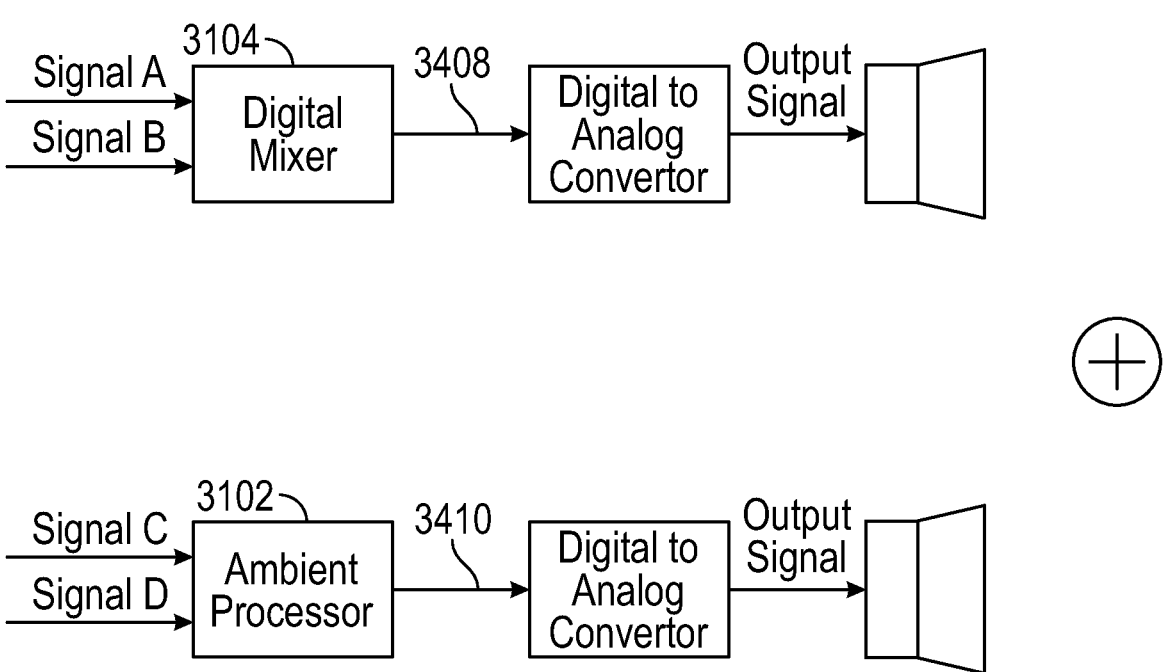
FIG. 35 illustrates exemplary mixing in the acoustic domain, according to some embodiments of the disclosure.

An extension to the ultra-low latency mixing use case is to do the mixing in the acoustic domain, as shown in FIG. 35. The output 3408 from the digital mixer 3104 and the output 3410 from the ambient processor 3102 may have independent signal processing and gains. Each path may be connected to its own loudspeaker. The acoustic signals are mixed in the acoustic chamber of the ear canal cavity.

An extension to the ultra-low latency mixing use case involves the use of multiple outputs speakers in the ear piece used for multiband audio output. For example, the ear piece may have three separate speaker drivers, one for low band, one for mid band, and one for high band audio content. Each speaker may be programmed independently. The configuration may use that only the low band and the mid band are impacted by noise cancellation audio streams. The digital mixing with upsampling may be performed for certain output streams. Compensation filters may be used to prevent or reduce desirable signals being cancelled when ultra-low latency feedback paths are used in the system. This configuration of the mixer and the different data streams allow the digital to analog convertors for each band to run at different rates to save power, as the low and mid bands may be running at high sample rates.

Multistage mixing for segmented processing in an ear device: An ear device system may be programmed into different stages of signal processing. Each stage may use its own mixing of signal streams instead of one mixer at the final stage in preparation for the output of the device. For example, one stage of the system may be processing multiple audio streams for the user programmed scenarios. This can be based on real-time controls or user profiles. The audio streams are prepared for output of the system and mixed accordingly. A second stage of processing may take the audio streams the user has programmed and apply additional processing based on manufacturer configurations for the specific product that is being used. This can include taking the user programmed streams and separating them into separate bands, applying more processing, and recombining or mixing those bands into new audio streams with independent I/O gains in preparation for the physical outputs of the device. The user may have direct control of the physical outputs gains of the system.

Gain control for multistage multichannel mixer: The mixer gains can be controlled using many different interfaces. Hardware and software interfaces may control the input and the output gains of the multichannel mixer. Basic ear worn devices only have a single level control, which sets the output level of the device without any control of the input level. In some scenarios, the input level of the audio stream must be set using the source device. The source device may have multiple audio streams connected to the ear device. The source device may be sending audio to more than one connected device, including devices that the user is unaware of. The control of gains is set by the user of the ear device. Independent gain controls are provided to the left and right ears to allow the user to adjust the balance of sound, rather than a single control that keeps the left and right signals at the same level. In some embodiments, the controller may allow the user to only hear sound in the left, or only the right ear, to balance the sounds. The gain controller can set the individual level for each separate output driver in an ear piece, which can be more than one.

The gain controller can set the level of different frequency bands depending on user preference.

An extension to the gain controller for a mixer matrix includes the use of a message handle layer. This can be software that is running on a host processor or other microcontroller in a system that is the interface to the physical control interfaces. The controller messages may be sent through a wireless connectivity protocol such as Bluetooth. The message handler may interpret the gain information in the message and direct the gain change to the appropriate gain stage cell of the mixer matrix. For example, a GUI on a tablet may be controlling the level for an input audio stream to the mixer. The gain change message is sent to the message handler in the target device, along with information that identifies the source of the message, which data stream it is connected to, and other signal processing information. The message handler can pass the gain information to the correct location in the mixer gain matrix or any intermediate processor that converts the raw level or gain into the correct format, such as through a compressor gain translation stage. The message handler may be running on a different processor, or the same processor as the audio processing. The message handler may be running on a low power dedicated microcontroller that enables the main processor to shut down to save power and control the audio stream levels directly in the hardware macros for the mixer matrix. The message handler may be running on a separate core within a single chip which allows the audio processing core to go to sleep and save power.

The hardware user interface or software user interface can have multiple different controls that are accessing the mixing matrix on the silicon (either directly or through a separate software message interpreter). For example, a wheel on a first interface A could be controlling the level from a first sound source X, a combination of buttons on a second device B are controlling the output levels for the left and right ears, a software slider on a graphical user interface is controlling the gain of second sound source Y, a gesture detection system on the ear device is controlling the amount of ambient sound is passed through the ear pieces for stream Z, etc.

Figure 36:
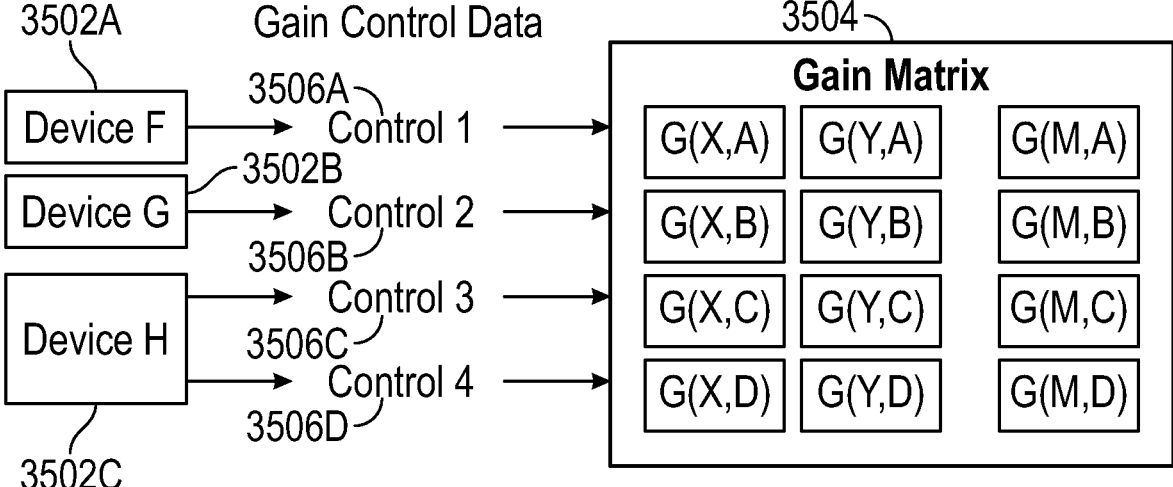
FIG. 36 illustrates exemplary separate devices controlled using the gain values in the gain matrix, according to some embodiments of the disclosure.

FIG. 36 illustrates a non-limiting example showing three separate devices 3502A, 3502B, and 3502C, controlled using the gain values in the gain matrix 3504. The first device F 3502A has a single control, which sets the input gain 3506A for stream A. The control may be a slider on a GUI on a mobile phone for setting the level of phone call audio streamed to the ear worn product, for example. The second device G 3502B has a single control, which sets the input gain 3506B for stream B. The single control may be, for example, a wheel on a remote control device that sets the level of the ambient sound the user is exposed to. The third device H 3502C may have a single control, which simultaneously sets the output gains 3506C and 3506D for streams X and Y, respectively, such as volume up and down buttons on an ear worn product.

An extension of the gain control handler is used when handling new audio streams into a system. The ear worn device controls the I/O levels for all streams. Connected devices may cause level problems when they take control of the output level of the ear worn device, in particular, when multiple devices are connected. Connected devices can leave the output level of the ear worn device in a bad state, such as too loud. When a new device is connected to the ear worn device, the output level is now incorrect for the new data stream. The user would like to reduce the level of the new data stream and not change the level of the output of the device that is set to be comfortable for their use case and hearing profile. The ear worn device may have multiple gain stages that are managed by the user through the ear worn product. The user sets the levels they want to hear, based on the mix of the signals coming into the system.

The system can store the last good gain for a connected device and a connected audio stream. For example, if a mobile phone is sending notifications to an ear piece, it may be using audio streams that are connected to the mixer input with identification indexes of 1 and 2. The user sets the input gains for that stream in the mixer to a level that is comfortable. When the notification is complete and new audio stream is connected to the mixer from a different device, such as a laptop. The software defined mixer determines that inputs 1 and 2 to the mixer are available. The gains are still set based on the previous audio stream, and the user may adjust them. If the mobile phone now sends another notification to the ear piece, the audio streams can no longer be connected to the mixer inputs identified as 1 and 2, but must use 3 and 4 instead. It is desirable for the system to remember the gain settings for the source device and audio stream such that the initial gains are set to what the user selected before. This is based on the input gains for the audio streams and not adjusting the output level for the user each time a new audio stream is connected to the user, which can be the user experience if only the output gain can be adjusted for a device. In this case the desired gain moves with the content and is not a fixed parameter in a fixed component.

Matrix mixer optimized with gain register updates: The software defined mixer uses many multiplication and addition operations. Standard DSP instruction sets can provide this type of operation. This may use instruction fetch and data fetches as part of the operation. For the mixer operation, it is known in advance that one of the pieces of data is a gain coefficient. The gain for an audio stream is unlikely to be changing very often, whereas the audio samples in the data stream may be continuously changing. The mixer operation can be optimized by using a fixed set of registers for the gain coefficients. The gain update process can calculate the new gain for an audio stream and write the appropriate data value into the relevant mixer operation register. This may reduce the number of data fetches. The operations can be pipelined as a hardware macro such that the next sample of audio data is being fetched and loaded into the appropriate register while the compute operation is working on the current audio sample with the loaded gain coefficient. A bank of registers can be used for the implementation of a multichannel software defined mixer matrix.

Matrix mixer with gain quantization: In many applications where gain is used to multiply a digital audio signal, the resolution of the gain value can be more than is detectable by human hearing. For example, a gain value that is stored in a 32-bit floating point format could allow for tiny gain increments that a typical wearer of an ear device could be able to perceive. In some applications, the gain value can be quantized to a number format that uses less bits of storage. This could be a 16-bit gain value or an 8-bit gain value. The gain value could be applied directly to the audio samples. The gain value could be an index into a lookup table of actual gain values that may not be linearly distributed. For example, the gain could be logarithmically distributed to cover a broader range of actual gain multipliers.

Matrix mixer with dual register gain updates: An extension to having a dedicated register for the mixer gains is to have two dedicated registers. One that includes the gain that is being applied, the second includes the new desired gain. The mixer operation provides smoothing between the actual gain and the desired gain. The smoothing can be applied on every sample or on a frame of data for each update. The smoothing could be applied at a rate that is dependent on the size of the gain change between the current gain value and the new desired gain value.

Matrix mixer with optimized data transfers: The quantized gain data that is limited to a reduced data width, such as 8 bits can be transferred through an audio processor alongside the audio samples. For example, the audio samples may be 24-bits wide, and the gain to be applied to those samples is 8-bits wide. The two pieces of information are transferred as a single 32-bit data value. The packing and unpacking of the data block can be part of the mixer operation. An extension to the use of metadata embedded alongside audio samples can also be used for other information such as the source identification (mobile phone, music player, ambient sound, right ear, left ear etc.), the content identification (music, speech, noise, ambient, etc.), the destination identification (main processor, mixer path, NN accelerator, etc.). The metadata can be split into multiple components, for example, 16-bits of audio data, 3-bits of source identification, 3-bits of content identification, 3 bits of destination identification, 7 bits of gain information. Other data configurations are possible within a 32-bit wide data transfer. The split of the metadata and content information can be different for each data transfer. For example, streams from a microphone include different metadata to streams received from a Bluetooth radio.

Matrix mixer with optimized gain data transfers: An extension to the quantized gain data format could allow multiple gain values to be stored in a 32-bit data value. Each gain value could be assigned to an individual input channel to the mixer, for example, which could reduce the number of data fetches even further. As the size of the mixer increases, more 32-bit encoded gain values could be used.

Matrix mixer with dedicated gain data formatting: The gain information for an audio processing system can be passed between components as a decibel format. This could be a number format type declared for use across all the independent processors in system. The mixer could use an embedded translation function to convert a raw gain value to a decibel format and also in the reverse direction. For example, a hardware macro or software processing library function could provide an optimized operation for performing a 20×log 10 mathematical operation or similar. In addition power function macros can be provided to assist with optimization of gain calculations.

Embodiments of the disclosure may include a sample rate conversion processor that converts the audio data streams to the same data rate so that the audio data samples used in digital mixing may be synchronized and at the same sample rate.

The digital mixing may also keep signals in the digital domain, reducing the need to have multiple channels for the ADC. Having signals in the digital domain may be easier for integrating the audio data stream with other sounds, including sounds from an electronic device (e.g., notifications from a mobile phone) and local music playback included in the auditory scene. Additionally, the signals in the digital domain may be compatible with auditory overlays for augmented reality and virtual reality applications. As such, multiple audio data streams from a DSP in the audio system may be mixed with communications streams from electronic devices, audio data streams (e.g., music, gaming, notifications, etc.) from electronic devices, audio data (e.g., notifications, voice prompts, etc.) from local memory sources, and the like. Embodiments of the disclosure may include digital mixing in time domain, frequency domain, and spatial domain, plus other digital data formats.

In some embodiments, an input for the digital mixer may be skipped. In such instances, the digital mixer may receive a notification (e.g., a data flow metric) that an input has been skipped (e.g., due to data flow blockage) and may continue mixing with the available audio data streams. The digital mixer can be programmed to operate in a wait mode based on the amount of data in the output buffer. In some embodiments, the digital mixer may operate in the wait mode when one or more inputs to the digital mixer are only slightly delayed, and there is not complete data due to flow blockage. In wait mode, the digital mixer may create an additional sample in the output buffer to increase the latency gradually. In other modes (e.g., regular mode), the digital mixer may be programmed to skip a block and create a glitch.

In some implementations, it may be useful to have a fractional delay to make small phase adjustments to a signal. This can be for a full band signal or for individual bands of audio data associated with a filter bank. Phase adjustments can be implemented using phase rotations in the frequency domain. This can provide subsample phase modifications. In the time domain this can be implemented using oversampling of a block of audio samples to introduce multiple interpolated data values. The new data values allow for subsample delays to be implemented by selecting an offset index into the buffer of new samples either before or after the original sample data points to obtain the output samples of the fractional delay process. This can be implemented as a software processing library or has a hardware macro in the silicon to provide fractional phase delays either in the time domain or frequency domain.

An extension of the data stall latency extension method is to have an ASRC component that can extend a block of N samples to create N+M samples, where M is typically the same size as N (by repeating a block of data) or shorter than N in length. The length extension can create a small additional latency that may be sufficient to allow a stalled data stream to deliver the necessary data to continue processing. The latency extension does not need to be an integer number of samples in terms delay. The ASRC can be programmed to create a predicted block of samples, or alternatively it can be used to resample a block of audio to create more samples for the same data, effectively stretching or shrinking the audio depending on the latency needs.

An extension to the data stalling situation is a jump ahead notification. In this scenario, the input to the system has been notified or detected that input audio has stopped. The audio processing chain and mixer may still be processing the samples in the pipeline. The system sends a message to the output mixer to notify it that audio streaming has stopped for one of the audio sources. The mixer than then take action to initiate a smooth transition to a mute status to avoid a glitch with the audio simply stopping. This will enable a better audio experience for a listener when the stream ends.

Analog mixing may be useful because not all digital audio data streams have the same format or are at the same sample rate, making mixing of multiple data streams difficult. Converting all audio data streams to the same high (e.g., fast) sample rate may use a lot of additional processing, especially when performed for a simple mixing operation. In some instances, the components of the audio system may mix audio data streams in the analog domain.

In some embodiments, at least one of the audio signal paths in the analog domain may be used for very low latency data flow (e.g., active noise control to reduce or remove unwanted sounds) and/or high sample rates (e.g., 384 kHz, 768 kHz, etc.). In some embodiments, the audio signal paths in the analog domain may be mixed with signals from the DSP, and the mixing may be performed in the analog domain. Separate analog gains may be used for the different audio data streams. In addition, the analog signals may be mixed using data from other peripheral components in the device, such as from an external Bluetooth device or active noise cancellation devices, that streams its data to the ear computer device for mixing and user control.

Components for unmixing: In addition to combining data streams in preparation for being presented to the wearer, as described in the mixing process, there are often scenarios where the signal streams include multiple sound sources that should be separated. For example, the system may be using audio data captured through two microphones, one at each ear, to provide binaural audio. A processor in the system can use that binaural pair of signals to determine auditory features such as signal level, spatial location, content, etc. and separate out sounds into individual streams for further processing and enhancements or cancellation. One implementation could be a NN-based signal separation processor that has inputs from the left and right ear audio capture streams and extracts the target, background, and noise signals into separate output streams for the left and right output channels. This type of component may typically have the same or more outputs of data than inputs of data, whereas a mixer may be programmed to have the same or less outputs of data than inputs of data.

Components for Acoustic Shock Prevention: Acoustic shock occurs when the user experiences a loud, unexpected sound. In a regular scenario, with no ear protection, the sensitive parts of a user's ear may be fully exposed to the loud, unexpected sound. The loud, unexpected sound may be particularly uncomfortable for people that suffer from loudness recruitment. People that suffer from loudness recruitment may be unusually sensitive to loud sounds. Although the acoustic reflex may help protect the user from some loud sounds, it may not protect from extreme sound exposure. Although passive ear plugs may provide continuous protection, it blocks all sounds, making it very difficult for the user to have a conversation when wearing them.

Embodiments of the disclosure may include components for preventing acoustic shock by protecting the user's ear from extreme sound exposure, while allowing the user to hear target sounds (e.g., a conversation). The audio system may include an external microphone that can detect a loud sound at the external surface of the ear pieces and can create a low latency active protection signal. The low latency active protection signal may be combined with another sound signal (e.g., an audio data stream comprising speech) in the sound signals to the user's ear pieces. In some embodiments, the low latency active protection signal may not create a full masking effect of the unexpected loud sound, but instead may reduce its intensity and reduce the exposure of the user.

In some embodiments, the audio system 100 may include a component that electronically overrides a shutdown. A shutdown may occur when the audio system 100 receives a loud and sudden sound in the analog or digital input audio data. The user (e.g., via ambient awareness settings, such as settings set for listening in a quiet scene) or an algorithm 416 may apply a gain to the input audio data that includes the loud and sudden sound. The loud and sudden sound may be amplified and passed to the output DAC. The detection of the loud incoming sound may cause the gains and output stages to immediately shutdown. In some embodiments, the electronic override may occur before the sound reaches the user's ear canal.

In some embodiments, a hard limiter may be included in or coupled to the output DAC. The hard limiter may be user-controlled or application controlled such that it can be removed. In some embodiments, an emergency trigger event can be used to reinstate the hard limiter. The hard limiter may ensure that sounds above a certain level are not transmitted to the user's ear pieces. In some embodiments, the audio system 100 may include a safety limit to prevent the audio system from outputting sound signals having a level above a pre-defined threshold. The safety limit may be used, for example, if a parent wants to limit the sound levels that a child is exposed to.

To protect a user from loud and sudden sounds, the hardware may support low latency capture and reduction of microphone signals. Active noise control filters may be used and tuned for low frequencies. Additionally or alternatively, an output level protection circuit may be included to act as an emergency limiter that may prevent the user's ears from being exposed to high amplitude and/or high frequency sounds.

One example application is hunting, where the cancellation of a gunshot sound may be challenging due to the high levels of the sound and the proximity to the user's ear. The cancellation of the loud sound may be performed by analyzing the sample deltas, sample levels, and relative sample levels. A large sample delta may indicate a very rapid level transition. Absolute sample levels may indicate extreme output level possibilities. Relative sample levels may indicate whether or not there is a major level shift (e.g., the user is in a very quiet scene, such as a hunter waiting for a deer). This may require extremely high data rates, such as greater than 768 kHz for audio processing. This may involve the use of PDM domain data processing for signals from a digital microphone for example, that is clocked at 2 MHz or even higher.

In some embodiments, the audio system may include a ramping amplitude sound in the sound signals transmitted to the user's ear pieces before the loud sound occurs (e.g., the gunshot is taken). This can cause the natural, muscular reflexive reaction in the ear to reduce the impact of loud sounds. A trigger event (e.g., a gesture, voice, teeth movement, clicking internally, etc.) may initiate the ramping amplitude sound, for example, when a hunter knows that are about to pull the trigger that in turn will cause the acoustic shock event. In some embodiments, acoustic shock prevention may allow ambient awareness, while offering some level of protection.

Integrated sensors: The audio system 100 may include one or more different types of sensors. Exemplary sensors may include microphone(s), vibration sensors, bone conduction sensors, motion (e.g., pedometer) sensors, head tracking sensors such as inertial measurement unit (IMU) sensors, temperature sensors, heart rate sensors, wearing/insertion sensors, light sensors, photoplethysmography (PPG) sensors, electrocardiogra sensors, electrodermal activity (EDA) sensors, electroencephalography (EEG) sensors, SpO2 and VO2 Max sensors, and moisture sensors. The sensor(s) may be programmed to take measurements (e.g., when initiated by the user, when initiated by another component included as part of the audio system or by an electronic device, at periodic intervals, etc.). The management and control of multiple sensor data streams with different data formats and data rates can be configured by the operating system.

The data transfer manager can be programmed and configured to use data from multiple data sources and multiple data formats that are not restricted to real time audio data streams. The system can be used for non-audio applications, such as healthcare devices using sensor data, monitoring devices using cameras, industrial combinations using various combinations of these example data streams.

In some embodiments, multiple sensors may be coupled to and may be programmed to send data streams to a processor, such as a DSP. The raw measured sensor data, processed sensor data, or both may be transmitted to one or more processors and/or plugins. Embodiments of the disclosure may include using machine learning and NNs to process and analyze the sensor data.

In some embodiments, the sensor data may be combined with other data (e.g., audio data). In some embodiments, the sensor data from a first ear piece may be combined with the sensor data from a second ear piece. The combined sensor data may be used to eliminate or reduce errors, confirm conditions, determine differences at each ear piece, or the like.

Integrated microphones: Each ear piece may include one or more microphones. A microphone may be an external microphone located at an external surface (e.g., away from the inside of the user's ear canal) of the ear piece. Alternatively, an external microphone may be located on a headband, an ear cup, or a dedicated microphone boom of the audio system, or in a remote electronic device (that may be coupled via wireless or wired connections). A microphone may be an internal microphone located at an internal surface of the ear piece to capture signals within the ear canal.

In some embodiments, at least two microphones may have different characteristics including audio data formats (e.g., voltage ranges, noise floors, digital clock rates, frequency ranges, dynamic ranges, etc.). The data formats for a microphone may be dynamically changed. Each microphone can be individually calibrated with the calibration data stored in the audio system. Each microphone may transmit a separate sound signal to other components in the audio system, for example. In some embodiments, the sound signals may be analog signals, digital signals, or both. The microphones may be programmed to deliver binaural audio signals to a processor, for example.

When there are two or more microphones, the sound signals of the microphones may have a fixed delay, and a processor may synchronize the sound signals. In some embodiments, there may be a consistent delay every time the inputs are activated, and a processor may synchronize the sound signals. In some embodiments, two or more sound signals from the microphones may be grouped together, but independently controlled.

Integrated loudspeakers: The audio system may include integrated loudspeakers. In some embodiments, each ear piece may have a single loudspeaker. In some embodiments, each ear piece may include multiple loudspeakers. The loudspeakers may have different formats to enhance the sound quality. With multiple loudspeakers, at least two loudspeakers may be used to cover the entire frequency range and dynamic range for the sound signals transmitted to the ear pieces.

In some embodiments, the integrated loudspeakers in each ear piece may transmit multiple channels of audio data simultaneously. Crossover filters may be used to limit the range of frequencies sent to each individual loudspeaker. Additionally, the crossover filters may compensate for any product variations among the different loudspeakers. The crossover filters may be programmed and tuned based on system requirements and component calibration data. The crossover filters can be programmed by manufacturers, developers or users to create a desired output response of the ear devices. Different configurations can be used at each ear.

The audio system may synchronize and retain synchronization over long periods of time of the sound signals delivered to the loudspeakers. Embodiments of the disclosure may include one or more functions for minimizing the drift in delay between the sounds at each ear piece and/or maintain a constant phase difference between the sound signals.

Exemplary Embedded Software

Figure 37:
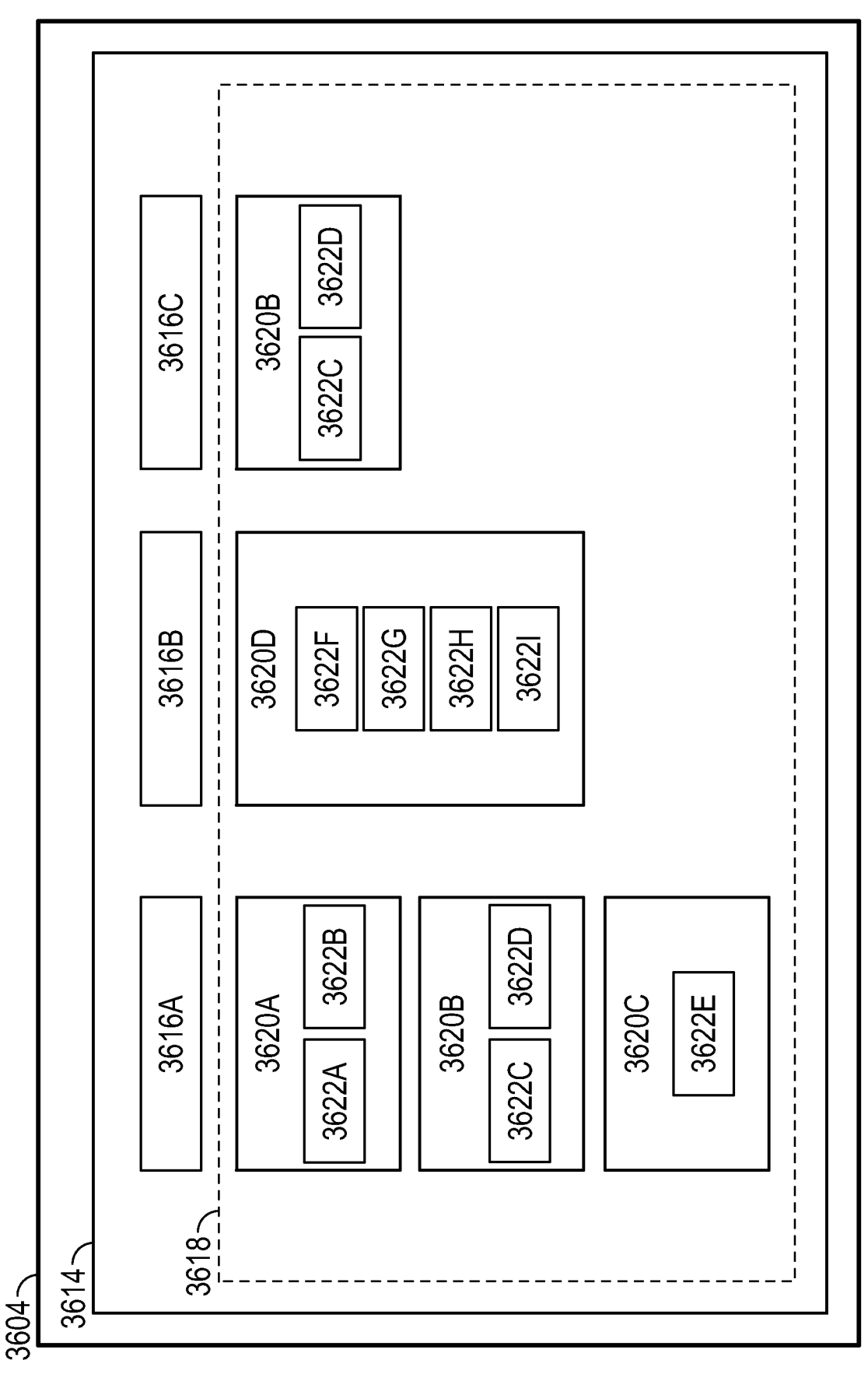
FIG. 37 illustrates an exemplary block diagram of exemplary embedded software in an audio system, according to some embodiments of the disclosure.

The audio systems may have memory that stores embedded software. FIG. 37 illustrates a block diagram of exemplary embedded software in an audio system, according to embodiments of the disclosure. The embedded software 3604 can include audio OS 3614. In some embodiments, the audio OS 3614 may be one that controls multiple layers of software in the embedded software 3604: application(s) 3616, framework 3618, plugins 3620, algorithms 3622, drivers 3624 (not shown), and system data 3628 (not shown). In some embodiments, the embedded software 3604 may have multiple applications 3616, as shown in the figure. In some embodiments, an application 3616 can include one or more plugins 3620. A plugin 3620 can include one or more algorithms 3622. Additionally or alternatively, a plugin 3620 can be used for multiple applications 3616. For example, the plugin 3620B may be included in both application 3616A and application 3616C.

In some embodiments, multiple plugins 3620 may be combined into a single application 3616, as shown in the figure. Additionally or alternatively, multiple plugins 3620 may be used to process multichannel audio data streams and/or multiple sensor data streams or other data streams coming into the system.

Embodiments of the disclosure may also include a decoder plugin 3620 used to decode data input to and/or output from an application 3616. There may be multiple decoder plugin 3620 options, where a decoder plugin 3620 may be upgraded and/or replaced. The decoder plugin 3620 selected at any given time may be based on the audio data stream. The decoder plugin 3620 may also transmit decoded audio data to multiple other plugins 3620.

An extension to the handling and operation of multiple plugins in a system includes the data transfer between plugins in an embedded system. When multiple plugins are used in a system there is the potential for multiple sequential processing stages are applied to the same audio data. For example, a system may include the following plugins: plugin A is used for enhancing the content of an audio stream, such as music data, plugin B is used for enhancing the audio based on user preference and their individual hearing profile, plugin C is used for enhancing the audio for the specific device that is being used and includes processing the manufacturer has embedded into the unit. If all the plugins are operating in isolation there is potential for each plugin to apply gains that cause saturation and distortion at the output. One method for handling this is to have the proposed gain to be applied passed through the system along with the audio sample data, rather than actually applying the gain to the data values. For example, plugin A may apply gain to increase the level of the incoming audio stream. Plugin B may also be applying gain to compensate for the user's hearing profile, which causes the samples to reach saturation point. Plugin C could now be presented with saturated or distorted data and could reduce the level of the impaired audio data. However, by passing the gain value along with the audio samples, rather than applying it directly at each stage, the plugins can adjust the gain parameter to ensure the audio data is not impaired or distorted. The final gain to be applied is calculated and could result in samples that are not distorted. The final gain is applied at the output stage of the system using an output mixer or the like. The operating system manages the data flow and routing of audio and associated information between plugins.

Embodiments of the disclosure may include embedded software 3604 that may be upgraded. The embedded software 3604 stored in the ear pieces may be upgraded when there is an upgrade available and the ear pieces are being charged in a charger pod, for example. The charger pod may include memory that stores a software binary image. The software binary image may be used to upgrade the ear pieces when seated in the charger pod. The electronic device(s) 3606 may be upgraded when in an upgrade mode, for example.

Exemplary Audio OS

The audio OS 3614 of the present disclosure is capable of managing multiple different processes (e.g., applications 3616, plugins 3620, algorithms 3622, functions, and audio data streams) simultaneously. Since there may be multiple active processes at any given time, the audio OS 3614 may also be capable of allowing and managing loading and configuring (e.g., when a user switches settings) the processes. In some embodiments, the audio OS 3614 may be programmed by a user or a manufacturer, thereby allowing a more flexible OS 3614 that can be used universally and can be customized.

The audio OS may be managing tasks, processes and plugins that are not specific to audio data streams. In some scenarios, the system may only be actively using audio data streams. In other scenarios, the system may be actively using a combination of audio data streams, and other data streams, such as sensor data (ECG, PPG, camera, microphone, thermometer and so on), system data (battery level, radio connection strength, memory usage, processor usage and so on). In other scenarios, the system may not be using any audio data streams and is only using other data streams such as sensor data or system data.

In some scenarios the audio OS may be managing tasks, processes and plugins for audio processing, data processing, system logic, system management, system tasks for the OS and other software and hardware modules within the system, for example connectivity to multiple simultaneous data streams. The tasks, processes and plugins may be based on simple logic, signal processing or neural network algorithms running simultaneously.

The audio OS 3614 of the disclosure may be controlled and customized using an external view or an internal view, both discussed in more detail below.

External View: In some embodiments, the audio OS 3614 may be programmed to manage multiple processes, in what may be referred to as external view (also referred to as user application view). One process may include an application 3616. The application 3616 may be stored in the memory of an electronic device 3606. Two or more applications 3616 may operate simultaneously, for example. The audio OS 3614 may manage the internal resources and timing of one or more applications 3616, as discussed in more detail below.

In external view, the user may be capable of changing the configuration and control of each application 3616 through a UI, referred to as a dashboard. For example, a system management application 3616 titled "Sonical Dashboard" may be associated with an electronic device 3606 (e.g., a wearable device, or mobile phone). The dashboard may allow the user to manage which applications 3616 and plugins 3620 are stored in the memory of the electronic device 3606 at any given time. In some embodiments, the dashboard may allow the user to manage which applications 3616 are currently running on the electronic device 3606. The user may access the dashboard via a UI, for example.

The dashboard may also communicate information (e.g., configuration, capabilities, etc.) about the electronic device 3606, such as memory size, processor speed, number of processing cores, number of microphones, connectivity, etc.). The information communicated may be related to system resources and the impact a certain application 3616, plugin 3620, or both may have on a system resource. In some embodiments, the information may be determined by, e.g., a system builder included in the dashboard. The system builder may communicate with the connected ear devices to determine the current system status for display in the dashboard.

The dashboard may use an indicator, such a graphic that looks like a traffic light. If all active plugins 3620 have access to the resources they need, the dashboard may display the graphic with a green colored indicator to indicate that that the application 3616 or plugin 3620 to be downloaded does not lead to an issue with the system resources. If there are potential issues (e.g., contention and unexpected results) with one or more resources, the dashboard may display the graphic with an amber colored indicator. In some embodiments, the dashboard may provide the user with information, such as the specific resource (e.g., memory, processor loading, timing, latency, etc.) that is likely to be impacted if the application 3616 or plugin 3620 is to be downloaded. If the system builder detects that the electronic device 3606 may not be able to execute all applications 3616 and plugins 3620 if another were to be downloaded, then the dashboard may display the graphic with a red colored indicator. Based on the indicator, the user can then decide whether or not to use the configuration represented by the indicator and accept the corresponding performance. Alternatively, the user can reconfigure the system builder to reduce the amount of load or can configure a plugin 3620 to use a different type of processing (e.g., by running the plugin 3620 in a different mode).

In some embodiments, the system builder may also identify routing and interface conflicts. For example, a plugin 3620 may request access to three microphone sound signals for processing, but the electronic device 3606 (coupled to the development platform 1000) may have only two microphones available, leading to a conflict. As another example, a user may select two music processing plugins 3620. Both plugins 3620 may receive a stereo music audio data stream as input and then may process the input audio data streams before passing to the stereo output DAC and amplifier. A conflict may occur if the requested use of resources (e.g., processing load, memory, etc.) by both plugins 3620 together exceeds the amount of resources available. There may also be an issue regarding which plugin 3620 should be used for audio enhancement and how the sound signals from the plugins 3620 are mixed together for the final output. In some embodiments, the system builder may provide information about the conflict to the user. The user may choose to (at least temporarily) operate a single plugin 3620 (e.g., "solo" selection), one at a time to compare the processing quality of each plugin 3620 individually. For example, in a first instance, the user may bypass plugin 3620A and may analyze the audio signal processing of plugin 3620B. Then, in a second instance, the user may bypass plugin 3620B and may analyze the audio signal processing of plugin 3620A. The user may then select between the first instance and the second instance. That is, the dashboard may allow the user to use the dashboard to select which plugins 3620 are active.

In managing the plugins 3620, the dashboard may be programmed to arrange the plugins 3620 in a processing chain. In some embodiments, there may not be a processing chain; instead, the plugins 3620 may run in parallel in order to prevent resource conflicts and ordering problems. In some embodiments, the dashboard may be programmed to adjust the sample rate based on the target latency for the processing chain.

In some embodiments, the dashboard may have multiple signal paths available for the plugins 3620 to use. The dashboard may prevent 'tiny' plugins from being formed into larger systems. In this manner, the plugin provider may create a system, and not individual plugins. A plugin 3620 may then provide a useful processing function for the user. In some instances, this may be enforced by a deliberate limitation in the OS to prevent more than one user level plugin being allocated to a system function, such as music playback or making phone calls. The plugin developer may create the system, instead of creating 20 plugins that the user has to connect together.

In some embodiments, the plugins are grouped into systems. For example a system or bundle of plugins, may be used for a single user experience. This could be to process a data stream, provide user feedback, include user specific processing and device specific processing. This would appear as multiple plugins but they are configured and used as a single system. The individual plugins within the system may be provided by multiple different plugin developers. The plugins may be tagged as requiring the same data streams and will therefore be allocated to a processing core as a single unit to reduce the overhead of data copying.

Embodiments of the disclosure may include providing the user with information regarding the operation mode of a plugin 3620 at any given time. The information may be provided using indicators on the dashboard, for example. Exemplary operation modes of a plugin 3620 may include standard, premium, low power, and low resources. In some embodiments, the different operation modes may use different resources (e.g., memory, processing, etc.) and/or different levels of a given resource. For example, in the standard operation mode, the processing and other resource usage may be at a median level. In premium operation mode, the level of processing may be higher, but may give a better user experience. Low power operation may include using the minimum amount of processing, but still performing enough processing to meet a certain level of user experience. Low resources operation mode may include using the minimum amount of processing, memory, and other resources.

Figure 38A:
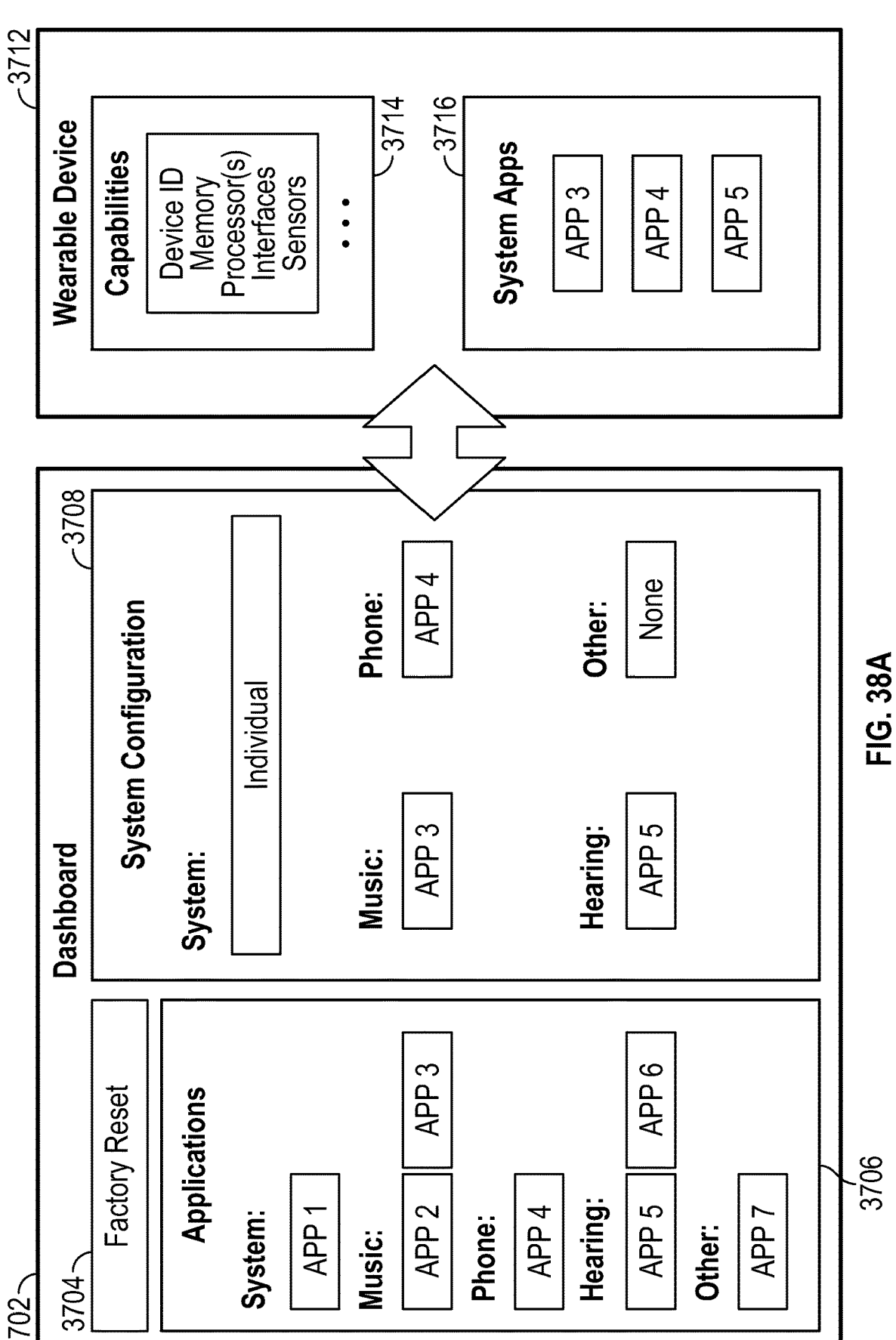
FIG. 38A illustrates a view of an exemplary dashboard, according to some embodiments of the disclosure.

FIG. 38A illustrates a view of an exemplary dashboard, according to some embodiments of the disclosure. In some embodiments, the dashboard may be displayed on a first electronic device 3702 (e.g., mobile phone, tablet, etc.), which may be programmed to communicate with a second electronic device 3712 (e.g., wearable device). The dashboard 3702 on the first electronic device may request information from the second electronic device related to its capabilities 3714, resources, performance, calibration information, interfaces, system apps 3716, and the like. The dashboard may provide the requested information to the user. The dashboard may also request information (e.g., status information, metrics, etc.) about the plugins located in memory on the second electronic device 3712. For example, a plugin that measures external noise level exposure may be located in memory on the second electronic device 3712. The noise level exposure may be calculated by the second electronic device 3712 and then transmitted to the first electronic device 3702 so that the information may be displayed on the dashboard. Alternatively, the second electronic device 3712 may transmit the measured external noise level data to the first electronic device 3702. The first electronic device 3702 may calculate the noise level exposure, and then may display the information on the dashboard.

The dashboard may allow the user to use a first electronic device 3702 to load and/or update applications 3706, plugins, settings, parameters, system configuration 3708, etc. on a second electronic device 3712. In this manner, the first electronic device 3702 may be used to control the functionality of the second electronic device 3712. In some embodiments, the dashboard may allow one or more plugins to be added, loaded, programmed, or removed from an audio system, an electronic device (e.g., a wearable device), or both.

Figure 38B:
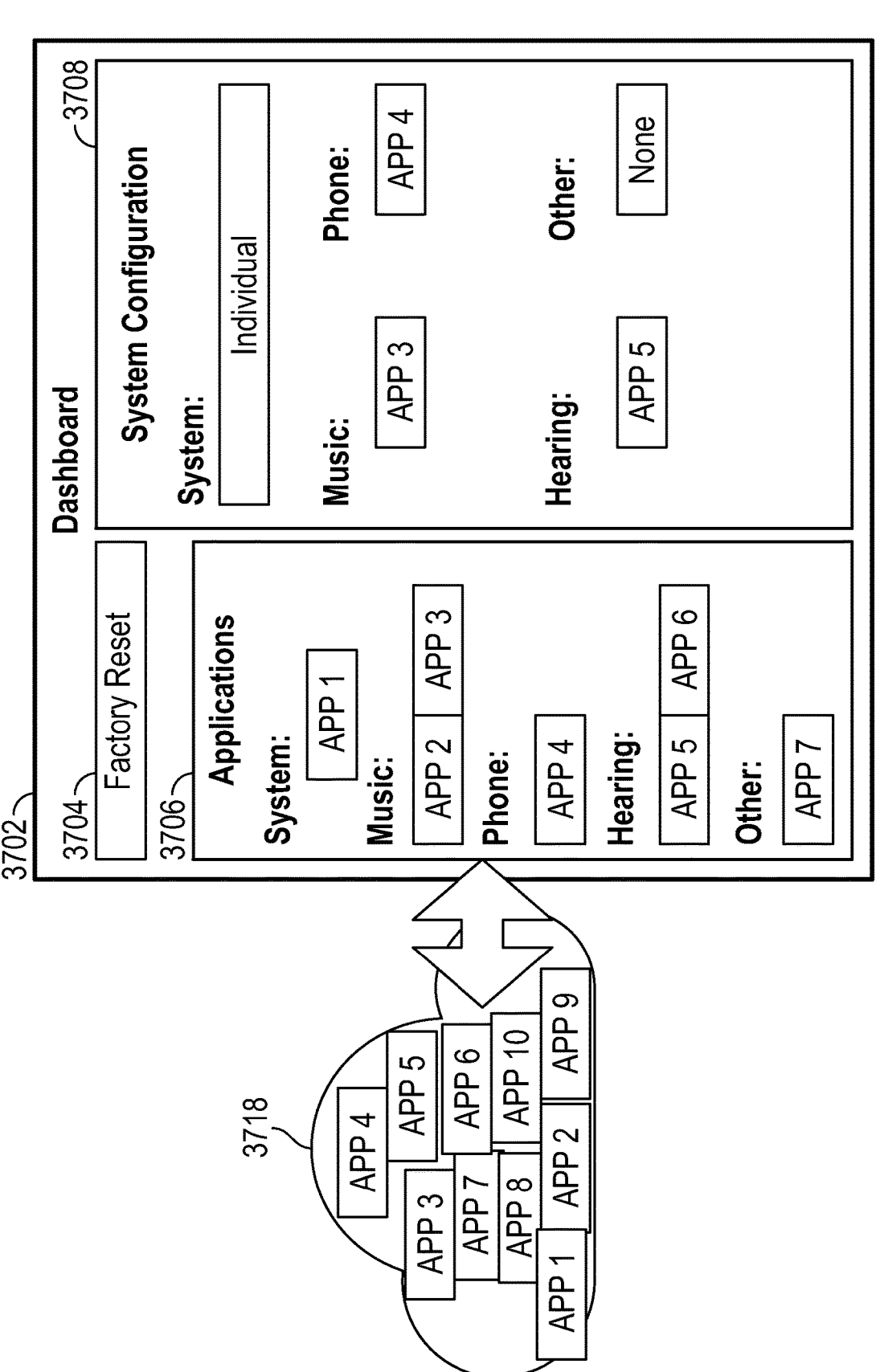
FIG. 38B illustrates a view of an exemplary dashboard, according to some embodiments of the disclosure.

FIG. 38B illustrates a view of an exemplary dashboard, according to some embodiments of the disclosure. The electronic device 3702 may display the dashboard to the user and may allow the user/user to select which plugin(s) to use.

The dashboard may use a configuration space 3718, which may be a separate portion of the dashboard's UI. The configuration space 3718 may show which plugins are part of the current configuration, which plugins are currently resident on the second electronic device 3702, and which plugins are new to the configuration space 3718. In some embodiments, the configuration space 3718 may use highlighted regions to differentiate between different plugins. The plugins may be represented by a graphical icon, for example.

The user may select the plugin by dragging the representative icon to a list or basket of available plugins shown in the configuration space 3718. The user may remove a plugin from the configuration space by selecting the representative icon and dragging it back to the list of available plugins, by double tapping it, or by "flicking" it back to a holding area.

Giving the user the option to use a first electronic device, such as a mobile phone, to find, download, configure, and remove plugins provides the user with greater flexibility and ease. For example, a second electronic device, such as a wearable device, may use language specific operations, such as voice prompts. The control of plugins via the first electronic device may avoid having to load each plugin into each electronic device at the time of manufacture to cover all the language configurations that the device might need. For example, all language- or region-based settings can be programmed through a manufacturer's application and provided as an updated plugin to the user.

An extension of the plugin configuration through a connected device allows a user to create new experiences through a plugin toolbox that is downloaded onto the configuration device. This would allow a user to connect signal processing components from multiple plugin suppliers into their own preferred components to create a "super plugin" that is then uploaded to the ear devices for them to experience.

In some embodiments the dashboard application on a connected device must ensure that the plugin has been correctly delivered to all the targeted receiving devices. For the ear worn product use case, this may mean checking that the plugin container and all the additional relevant information has successfully been transferred to both the left ear and right ear before any further operations are enabled for the plugin. This can be extended to multiple connected devices in other scenarios, such as multiple wireless or wired speakers, or multiple wearable devices.

In some embodiments, the electronic device may communicate with one or more sources (e.g., a cloud-based application) to access one or more plugins. The user may purchase and/or download a plugin. The plugin may be made available on a temporary basis (e.g., trial) with a fixed end date or duration of usage. The dashboard may provide the user with information regarding all the plugins the user has selected and downloaded.

In some embodiments, the dashboard can enable flexible payment and billing options for plugins that the user has downloaded. For example, the user may be charged only if the plugin is activated in a system configurator of the plugin. The user may be provided with a fixed amount of usage time before being charged. For example, a plugin may be free for 10 hours a month, then after that the user may be charged for all remaining usage within the month. The audio OS may track usage statistics and can provide this information to the plugin manufacturers so that they can determine how long the plugins are being used for. The user may be informed that the usage statistics are being tracked through a terms and agreement and may have to accept those terms when downloading the plugin.

Different plugins to be loaded into an electronic device. One example plugin involves different voice assistant commands. The voice assistant commands may trigger events on the electronic device. The plugin may allow the user to select which voice trigger events to use on the electric device. An example would be changing a command that is programmed by the manufacturer to recognize "volume up" as the trigger event to increase the output level of the device, to be "turn it up" instead. This allows the user to determine which commands they would like to use for their product. The plugin configuration may be controlled on the dashboard with the audio capture and confirmation operation on the ear worn device. The two parts working together through the audio OS for a seamless experience. An extension is to allow multiple commands for a single trigger event, for example also adding "make it louder" as an additional command that is captured and set in the plugin interface in the dashboard.

Figure 38C:
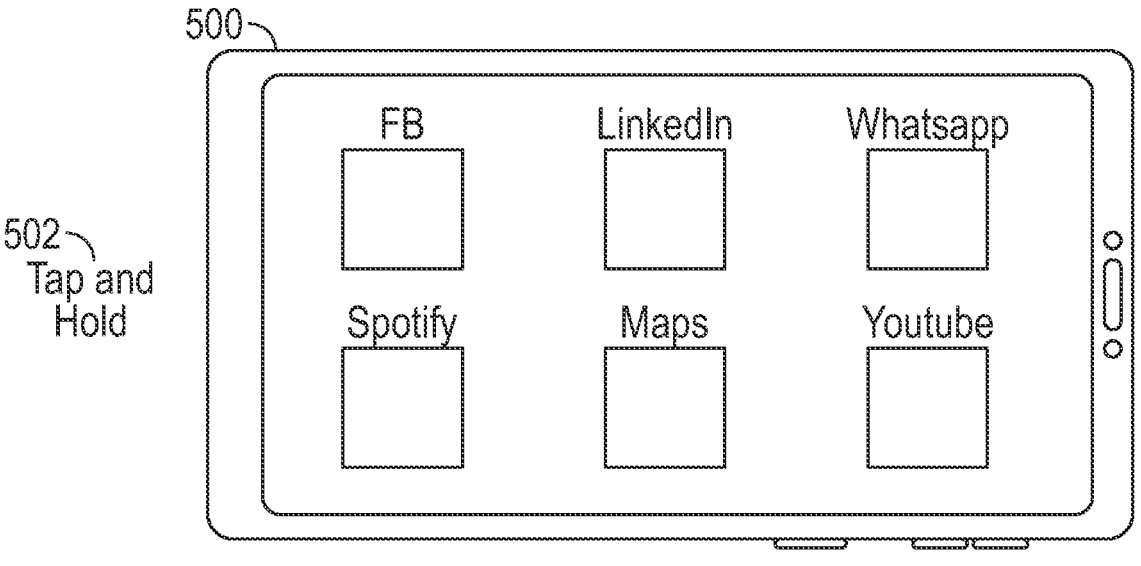
FIG. 38C illustrates a voice interface for the earbuds, according to some embodiments of the disclosure.
Figure 38C:
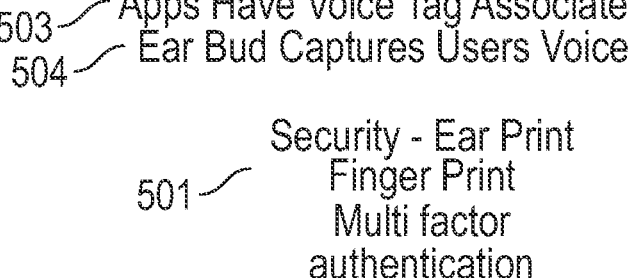

In addition, the system allows the dashboard to configure voice trigger events. FIG. 38C illustrates a voice interface for the earbuds.

Typical earbuds allow the user to control the functions of the device, such as turning up the volume or skipping a song, using their voice. However, users typically do not utilize this feature for their earbuds because it does not provide the user with significant benefits over the interfaces that already exist for controlling these functions. It is desirable for the user to control functions with their voice using their earbuds without being limited to one voice assistant, like Siri or Alexa. Instead, it is beneficial for the user to have a separate interface depending on the application they wish to control with their voice.

The proposed invention allows the user to associate their voice for identification using the earbud, granting particular access to an app that is already on their phone 500, or other connected device. Security features include multi-factor authentication 501 such as the user's fingerprint and ear print and voice in order to identify the particular user. The user interface allows the user to tap and hold an app 502 in the same manner currently found in smartphones to move or delete apps. This allows the access of the application on the target connected device through a specific voice tag that the user sets themselves using their ear device.

Another application that is overlaid by the earbuds is the association of a voice tag 503. A user taps and holds an app 502 and is given the option to assign a voice tag 503. The earbud then records the user's voice 504. For example, a user could tap and hold Spotify, assign the voice tag by saying "Spotify" into the earbud, and then the user is able to access the app in the future by referring to the same voice tag.

The improved interface allows a user to control individual apps with their voice instead of asking one assistant to perform the function. For example, the user could say "Spotify, play music by Led Zeppelin" or "YouTube, play the Ted Talk that Bill Gates did recently." This allows the user to talk to the apps that are specific to the user of the earbud and use the voice interface within each app. The default voice tag can be assigned as the name of the app, but the user has the option to associate other names, such as by saying "Hey music player" instead of "Hey Spotify." Because most app developers do not have access to this technology themselves, it is provided by the earbud to the apps that the user already owns. This brings an advanced user interface to the phone or tablet using their earbuds.

Additionally, the dashboard may be programmed to allow a user to upgrade a plugin. In some embodiments, when new or improved technology has been developed, the dashboard may notify users of a new version of an algorithm. The notification may appear as an update request on the dashboard, for example. The user may accept or dismiss the update, depending on the new features that the new version provides, for example. If the user accepts the update, the algorithm or plugin may be placed into the dashboard as an updated algorithm or an updated plugin to be uploaded to the audio system.

In some embodiments, the dashboard may validate the plugins that a user has selected. The plugin may also include information about the system resources it needs. The dashboard may match the resources used by the plugin with the capabilities of the audio system and provide an indication. For example, a green indicator may indicate that there is a "premium" match where the plugin may be able to run on the audio system with optimal processing. A yellow indicator may indicate that the plugin is limited to running in a "basic" mode based on the capabilities available, and a red indicator may indicate that the plugin may not be able to run at all.

Figure 38D:
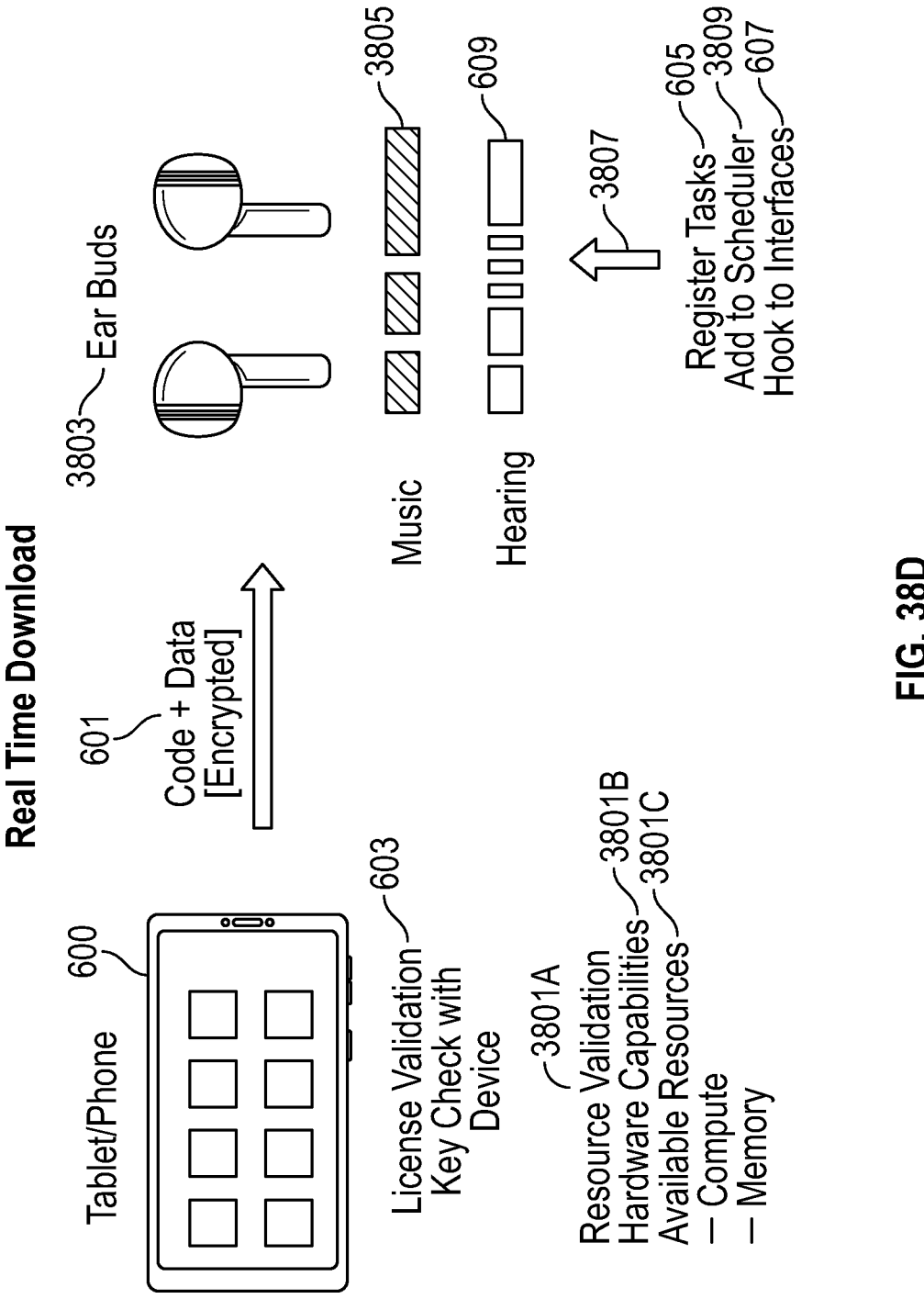
FIG. 38D illustrates an exemplary operating system managing real-time download of code components and plugins from the user interface device to the embedded platform, according to some embodiments of the disclosure.

In some embodiments the system must provide plugins using a secure data transfer and validation. FIG. 38D illustrates the operating system managing real-time download of code components and plugins from the user interface device to the embedded platform.

When a user activates an app on their tablet or phone 600, the application determines if a device is connected where new code can be transferred to it, such as when activating new features. Code is sent wirelessly or through another data connection to the target device 3803, and the target device then activates the code and runs it as part of the full system. Typically, the entire system would have to be built and provided as an embedded platform 601 in the product when it is purchased by the user, and as such, these apps can only control a target device based on the code that is already within the app.

In many embodiments of existing embedded platforms, the entire system is updated if modifications are made. For systems that use larger and more functional operating systems, such as personal computer and smartphones, it is only necessary to update individual applications, or the operating system as separate modules of software. The audio OS enables the modular update of software and embedded functionality on a connected device. This also allows new features to be added to a system without requiring a complete system build by a manufacturer. This allows developers to independently provide new features, experiences and updates to an endpoint device without approval and interaction with the device manufacturer. This allows an end user of an endpoint device to access new features for their device when they want or need them.

The proposed improvement is a mechanism that allows the user to select and download new apps after purchasing the product, and the code for the new app will then run inside the existing framework. This requires a license validation 603 to ensure that the new piece of code is valid to run on that particular device, so that the user has effectively purchased a license and the device itself has the right key. It is also necessary to conduct resource validation 3801A for the capabilities of the device. For example, if the user downloaded an app that requires 4 microphones but the connected product only has 2, the user receives a message that they are not able to run the plugin on the product because the product does not have enough capabilities.

Some of the relevant factors in the resource validation inquiry 3801A include hardware capabilities 3801B and the available resources in the product at the time 3801C, such as the computing and memory the system is currently using. For example, the system might already be playing music, which may be using all of the available resources in the system so that another application, such as hearing enhancement, cannot run at the same time. However, if there are enough resources available for two applications to run at the same time, the encrypted data and code is sent to the product 3807 and decoded inside of it. The code components and tasks are separated out and put into the relevant stream 609 and 3805. Then, the tasks are registered 605, added to the scheduler 3809, and the process can hook the tasks to the interfaces 607 and start running.

The application update and transfer can be automated, similar to how mobile phones and tablets will update applications in the background. This can also be used for update apps in the connected devices while the user is actively using a different app, or the devices are charging or not being used. The app on the phone or tablet can send updates to the connected wearable devices without the user being aware or through a general "accept all updates" policy.

Although this is represented as an ear device that is connected and controlled from a mobile phone or tablet, the concept can be extended to many other applications, such as other wearable devices that require upgrades, updates or new features in the field, while they are being used. This can be based on very specific user needs when dealing with a particular scenario. For example a worker in a factory may download an app that allows them to work more comfortably and reduce the noise of machinery around them. This could also be a group of people that working together in a foreign environment with harsh acoustic conditions but still need to communicate with each other and immediate application upgrades are needed to help, such as soldiers in a foreign region. This can also be extended where an application is downloaded to the ear bud that allows real time translation of a language that wasn't previously loaded into their product when they purchased, but they need to communicate with a person in a foreign language.

In some embodiments, the system configurator may be used to manage the user's access to plugins. The information (e.g., resource requirements, system configuration requirements, associated application(s), version number, etc.) about a plugin may be provided to the user.

Embodiments of the disclosure may include a plugin that identifies itself, the resources it needs, its functionality (e.g., the type of enhancement it brings), etc. as part of its available audio data within a plugin binary. The plugin may be programmed for a specific device, product identifier, version number, and/or manufacturer. In some embodiments, the plugin may be programmed differently or expose different features depending on the type of electronic device coupled to the audio system. In some embodiments, the plugin updates the UI of the electronic device based on the type of electronic device coupled to the audio system. In some embodiments, the available plugins list in the dashboard may be updated depending on which user is logged into the dashboard and which electronic device is being programmed.

The plugin binary may include information about the type of processing the plugin performs, along with the configuration and interfaces used. In some embodiments, the plugin binary may be downloaded from a third party, where the plugin binary may include protected and/or encrypted processor instructions. The downloaded plugin binary may be unlocked by a user account that has access rights, for example. The downloaded plugin binary may be associated with a UI or graphical icon that may be displayed in the dashboard. In some embodiments, even if the dashboard displays the representative UI or graphical icon, the plugin binary may be inactive until the protected instructions are unlocked. The plugin binary may be upgraded when the audio system upgrades. The plugin binary may be used to upgrade the ear pieces when charging, for example.

In some embodiments, the signal processing for a plugin may have different tiers of performance and resource loading. The signal processing for a plugin may be accessible through a purchasing mechanism to unlock the instructions; the purchasing may be based on the tiers. For example, premium mode of performance is a different price level to standard or basic performance levels.

In some embodiments, the audio OS allows multiple plugins to be resident and executed together as a single application. In some embodiments, the audio OS allows multiple plugins to be resident, and information is passed between them via shared memory with protection mechanisms. In some embodiments, the audio OS allows multiple plugins to be resident, and the plugins may be linked together as a single application (e.g., the plugins may be from the same manufacturer). The plugins may be locked in a configuration that cannot be split apart or have other plugins inserted into the same application.

In some embodiments, the audio OS allows multiple plugins to be resident and executed together as a single application. For example, a group of plugins may be used for a particular use case, such as participating in a multi-person conference call, or listening to immersive spatial music, or going for a run.

In some embodiments, the audio OS allows multiple plugins to be resident, and information is passed between them via shared memory with protection mechanisms. For example, a plugin group may be used when a user is going for a run. This may contain plugins that are streaming, decoding, processing, enhancing and rendering the music for the run. In addition this may contain plugins that are capturing heart rate, motion, temperature and breathing sensor data, processing the data and providing notifications to the user. In addition, the device may be capturing GPS data and providing route and directions information to the user. These plugins may be sharing information in a group, such as heart rate data is sent to the music playback plugins as they may want to alter the playback speed. The notifications and direction information may be sent to the audio rendering plugin as it may place these audio streams at different spatial locations, such as "take the next left" is spatialized to the left of the listener as they are running.

In some embodiments, the audio OS allows multiple plugins to be resident, and the plugins may be linked together as a single application (e.g., the plugins may be from the same manufacturer). The manufacturer may create bundles of plugins for different use cases and applications. The plugins within each bundle can be from one manufacturer or from multiple developers. The individual plugins may be specific to a group application.

The plugins may be locked in a configuration that cannot be split apart or have other plugins inserted into the same application. This allows a manufacturer to control the signal flow, use case, user experience and resource usage of a group of plugins for a specific device or user. The configuration may be locked such that the user cannot select individual plugins within the group and use them in isolation. Also, the group may not have other plugins added to it which may break the signal flow and resource usage.

Embodiments of the disclosure may include the dashboard checking the resources used by a plugin against the resources available within an electronic device and determining if a plugin may be loaded into the electronic device. If there is a resource gap between a plugin and the electronic device, the dashboard may notify the user and provide a suggested action to take.

In some embodiments, the electronic device may be manufactured with a resource configuration that may be upgraded by the end user of the audio system. The electronic device may have limitations placed on its available resources by the manufacturer or user. An unlock key may be used to enable more resources, such as memory, processor speed, access to sensors, more microphones, etc., to become available for the operating system and the applications to use.

In some embodiments, the resources of a system may be limited further by a specific license key. For example a software key is sent to a device to further reduce the amount of memory or processing, or other resources that are available for the end user. In addition, the type of data that is accessible or processed by plugins may be limited. This can be used when a parent wishes to limit what types of data and processing a child has access to. This may also be used for controlled deployment of devices for a workforce where strict access limitations are put in place.

Additionally, calibration audio data may be made available to plugins. Exemplary calibration audio data may include the frequency and phase responses of the microphones and speakers. The dashboard can detect the unique ID of an electronic device 406, and the calibration audio data may be associated with this unique ID. Calibration data may be stored in the wearable device at the time of manufacture. The data may be provided as part of a manufacturer plugin when needed by the wearable device. The data may be downloaded from the cloud when a user registers their device. Calibration data may be updated be a re-calibration process. A calibration process can be performed by a manufacturer if a device is returned to them for servicing. A calibration process can be performed by the user if their charging pod contains the necessary equipment, or a separation calibration component is provided by the manufacturer.

Figure 38E:
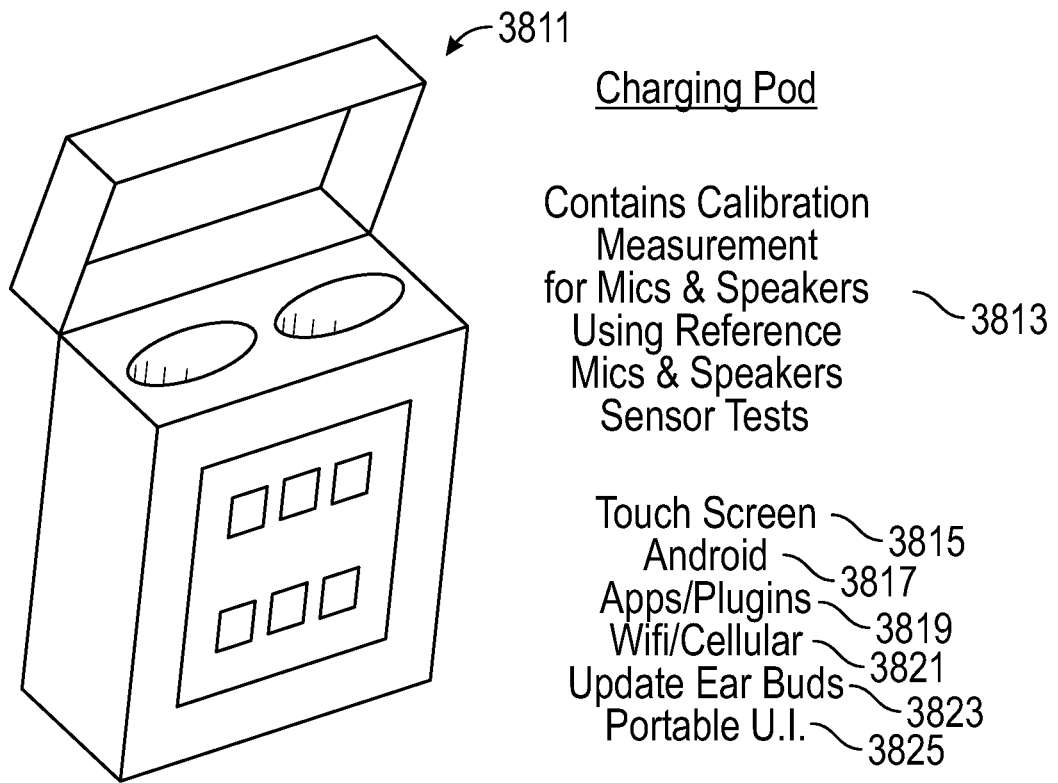
FIG. 38E illustrates exemplary charging pods that house the earbuds to be charged in a box-type structure, according to some embodiments of the disclosure.

In addition the charging pod can provide further functionality. FIG. 38E illustrates the charging pods that house the earbuds to be charged in a box-type structure 3811.

The proposed improvement adds the capability of running Android 3817 or a similar operating system, on the charging pod 3811, which will have a touch screen 3815 and all of the user's plugins and applications 3819 will be available to them for the device inside the charging pod. Using Wi-Fi or cellular connectivity 3821, the user can download new apps to the charging pod 3811 instead of using their phone or their tablet, which is much bigger. The user can download the new apps and plugins directly into the charging pod and the charging pod will then download all the necessary code into the earbuds in one unit 3823. This provides the user with a portable user interface 3825, so that the user can keep the charging pod in their pocket while wearing the earbuds and use the charging pod as their user interface. As such, the user can perform functions like changing the music selection using the charging pod, which is effectively a more portable version of a phone but in a much smaller form factor.

Additionally, when the earbuds are placed in the charging pod, software and acoustic devices run inside it, such as microphones and speakers, so the earbuds can be calibrated and tested 3813 while inside the pod. For example, the user may test the functionality of the speakers or microphone or whether the device needs to be cleaned of earwax. Any problems that are detected are shown on the user interface, so that appropriate actions are taken such as recalibrating or sending the unit back to the manufacturer.

The dashboard may prevent a user from activating features in an electronic device that is marked as locked, stolen, or missing. The electronic device may be unlocked by using, e.g., biometric data such as an ear print of the user. The lock or unlock status of the system is provided by the dashboard to the operating system in the wearable device. The operating system can be programmed to regularly check the security status of the device. If the device is unable to confirm that access is granted it can be programmed to automatically shut down to prevent any further use of the device.

In some embodiments, the connected device may be unlocked by biometric information for a secondary device. This can be from facial recognition from a device with a camera, such as a personal computer or smartphone. This can be from another wearable device that can detect motion, gait, heart rate patterns etc., such as a smart ring or smart watch or fitness device such as a wristband. This can be from a device that contains a microphone, such as a laptop, smartphone, smart speaker or other audio device. The biometric confirmation is linked to the target device through additional confirmation with the use of other sensors. For example, a motion sensor in the ear worn device is activated at the same time as the motion sensor in a wrist band and the data are correlated to determine that the same user is wearing both devices and the data matches sufficiently that biometric acceptance is confirmed. In some examples, the ear device and other devices may capture other sensor data or audio data for multi-source authentication. In some instances, just the ear device sensor and audio information is used to confirm an ear print or other biometric authentication.

In some embodiments, the electronic device may analyze and monitor the usage of the audio system and provide such information to the user using the dashboard. Additionally or alternatively, the dashboard may be able to configure and analyze multiple devices, for example, when a parent controls the applications and output levels for a child.

In some embodiments, the dashboard may control and monitor multiple devices simultaneously for multiple users or for a single user.

In some embodiments, the dashboard may control and monitor multiple devices that are part of a single ecosystem of devices. In some examples this may be for a single user that uses multiple wearable devices. The dashboard will gather information from and send information to multiple connected devices. This may include smart ear devices, smart watch, smart wristband, fitness device, smart ring, smart ankle bracelet, smart glasses or other devices that contains sensors and signal processing and connectivity capabilities.

In some embodiments, the dashboard device, which may be a smart phone, tablet, personal computer, home automation hub, home connectivity hub, home audio and video central hub and so on, may be a data hub for the connected wearable devices in the ecosystem. The sensor data may be sent to the dashboard device with timestamp information. The dashboard device may then pass the accumulated data streams back to other devices in the ecosystem. For example, the heart rate may be gathered by a smart ring. The data is captured, processed and then passed on to the dashboard device, where further processing may or may not be applied, before the data is sent to another connected device, such as an ear worn device that uses the heart rate information. In some examples the hub device may have different profiles and accessibility configurations for the data streams for multiple people, such as members of a household, for managing the data streams.

In some embodiments, the hub device may be the charging pod of the ear worn device, which gathers data from multiple connected devices and then redistributes the data to other connected devices based on the configuration the user requires or the data access protocols that are enabled.

In some embodiments, the hub device may be one of the connected devices in the ecosystem, such as a smart watch or a smart wrist band or a smart ear device. The endpoint device will gather all the timestamped sensor data from the other devices and then redistribute the data streams to the other connected device as required.

The dashboard in the external view may display different sections of information. Exemplary sections may include hearing, conversation, content rendering, communication, voice UI, codecs, sensors, analysis, and user preferences. The hearing section may allow the user to control whether to listen to, enhance, or remove ambient sound. The conversation section may allow the user to set preferences related to low latency in-person communications. The content rendering section allows the user to listen to content that is streamed to the audio system or created internally by the audio system. The communication section allows bidirectional communications with remote people (e.g., over a phone or IP network). The voice UI section enables word recognition and connectivity to voice assistants, voice controlled interfaces, or the like. The codecs section, when enabled, causes the audio system to perform and use compression and decompression codecs for audio data streaming. The sensors section controls and provide information related to the sensors and the user metrics (e.g., temperature, motion, heart rate, head tracking, etc.) in the audio system. The analysis section provides information related to sound level monitoring for input sound signals and output sound signals, content analysis, word recognition, etc. The user preferences section allows the user to configure sound signals output to the ear pieces to personalize the user's experience. All of the processing components can be programmed and run independently or together in multiple combinations in a system.

Internal view: In some embodiments, the audio OS may be programmed to manage multiple resources to ensure that certain performance targets are met, in what may be referred to as the internal view (also referred to as device view). The internal view may function similar to a system manager. The audio OS may determine the impact a plugin may have on system resources, for example. The impact on the system resources may be used to determine whether an audio system or an electronic device may able to accommodate the extra load from the plugin. If the plugin cannot be loaded or executed due to, e.g., not enough resources, the UI of the electronic device may provide this information to the user. For example, a message may be transmitted to the electronic device to display an error (e.g., "unable to play music with ABC enhancements-insufficient resources") on the dashboard.

The internal view of the audio OS may have a plurality of functions: memory management, task scheduling, messaging, interrupt handling, resource management, power management, debugging, and system resource control. Each function is discussed in turn below.

Memory management function: The audio OS may be programmed to allocate memory. The audio OS may allocate memory dynamically, statically, or both. Dynamic allocation allows tasks to be created and disposed during run-time. Dynamic allocation is very flexible, but results in memory fragmentation, which uses extra memory headroom to mitigate. Static allocation allows full utilization of the memory, but is not as flexible.

In some embodiments, the audio OS of the disclosure uses a hybrid approach by allowing high utilization of memory space while also providing some flexibility for dynamic tasks. In some embodiments, the hybrid approach includes combining static and dynamic memory allocation for the development platform, which may be an embedded platform. The static and dynamic memory pools maybe used concurrently, for example. Embodiments of the disclosure may include the static memory pool and the dynamic memory pool having different sizes. Additionally, there may be multiple static memory pools and multiple dynamic memory pools. The number and size of the memory pools may be programmed through software or hardware. The operating system can control the number of memory pools that are active or the size of the memory pools that are active based on the dynamic nature of the resource requirements. The number and size of the memory pools may be upgraded through a secure unlocking mechanism, for example.

The usual audio system plugins may be matched. The usual audio system plugins may be a mix of fixed core functions and some user configurable functions, for example. A typical audio processing plugin is likely to use some core audio library functions such as standard filters, gain manipulation functions, FFT/IFFT, other filter banks, etc. These DSP functions could be stored within the silicon and are accessible to one or more plugins. In addition, the plugin is likely to have some custom audio processing functions that deliver the special performance and audio experience. These can be considered private audio functions that the plugin provider has researched and developed. These functions may not be available to any other plugin in the system (unless provided by the same plugin developer). These two main types of processors can be considered as being mapped to static memory, for the public libraries, and dynamic memory for the private libraries. The first is available all the time for all plugins to use, the second is only available when plugins load them. The hybrid approach may create a more efficient memory usage profile, where only the memory tiles that are actively being used are powered. The operating system supports the use of combinations of public and private plugins, running as software only, hybrid software and hardware, hardware only, with access to static and dynamic memory pools as needed. This integration of hardware and software components would allow full customizable silicon platforms for a specific platform manufacturers products containing plugins and processing functions, such as neural networks, for their target use cases and devices.

For some system configurations, the hybrid approach can allow large areas of memory to be left unused. In some embodiments, memory pools may be locked or grouped together. By locking memory pools together, the memory pools may be stored in a contiguous address space, allowing for the correct address alignment (suitable for, e.g., efficient loading of audio data into a mathematical unit). In some embodiments, memory pools may not be locked together, and the audio OS may assign memory pools at different addresses.

In some embodiments, an entire memory space may be allocated to multiple synchronized and locked tasks. In some embodiments, a memory pool may be assigned to and locked to a process, where other processes are not allowed to access allocated memory.

Figure 39:
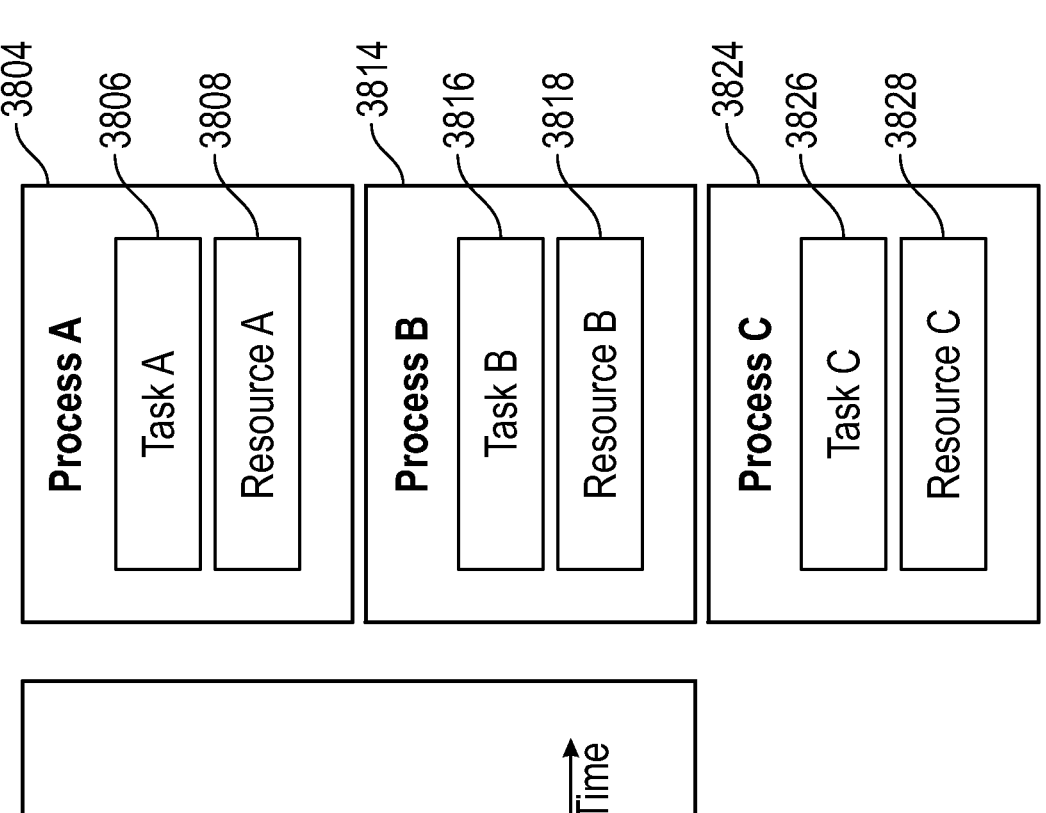
FIG. 39 illustrates an exemplary audio operating system including a task manager programmed to arrange and schedule tasks according to a specific order, according to some embodiments of the disclosure.
Figure 39:

Task managing function: The audio OS includes a task manager 3802 that is programmed to arrange and schedule tasks according to a specific order, as shown in FIG. 39. In some embodiments, the order may be sequential and based on the processing chain used in an audio system. For certain applications, the task manager 3802 may schedule task(s) such that they are executed as quickly as possible. The audio OS may share resources between tasks to ensure these applications are executed as quickly as possible. In some embodiments, a task may be partially completed, and then the task manager 3802 may switch resources to a different, more urgent task. Additionally, a task may be paused and then resumed later.

In some embodiments, tasks may have audio data flow dependencies and specific timing requirements. In some embodiments, tasks may be scheduled based on target completion times, target start times, when a particular audio data dependency has been met, or a combination therefore. In some embodiments, the task manager 3802 may maintain a list of tasks (a first process A 3804, a second process B 3814, a third process C 3824, etc.). The first tasks A 3806, second task B 3816, and third task C 3826 in the list of tasks may be in an order according to execution time, data chunk size, or the like. In some embodiments, tasks that are time critical and have low latency may be scheduled before other tasks. In some embodiments, the list of tasks may also include resource information, such as a first resource A 3808 being used by a first process A 3804, a second resource B 3818 being used by a second process B 3814, and a third resource C 3828 being used by a third process C 3824.

The task manager 3802 may support timer and event triggers, which may allow tasks to be scheduled based on timing and event requirements. In some embodiments, task manager 3802 may be based on time nodes and/or process nodes.

In some embodiments, the task manager 3802 may schedule tasks based on the priority assigned to a given task. The priority may include an overall task priority and a tic priority. In some embodiments, during a tic, if a critical task has completed enough processing (even though there is more to be done), it can release the resources for lower priority tasks. Releasing resources for lower priority tasks may help achieve optimal latency oriented scheduling.

In some embodiments, the task manager 3802 may schedule tasks based on the synchronization of processes. Tasks that are linked together may be considered a group. The task manager 3802 may schedule the group of tasks such that the tasks are completed by a specific time. In this manner, linked tasks (e.g., tasks for the left ear audio data and tasks for the right ear audio data) do not have different latencies or delays.

In some embodiments, the task manager 3802 may keep track of one or more properties of one or more tasks, such as how much of a task has been completed, when dependencies are available and complete, and the like. The task manager 3802 may identify tasks that have stalled, and as a result, missed its target completion time. Embodiments of the disclosure may include determining why a stall happened, such as identifying dependencies that are not ready, the actual processing time exceeded expected processing time, or resources not being available while the task was executed.

In some embodiments, the task manager 3802 may assign tasks to different processing cores within a system. In some scenarios this may be cores that have been assigned for left and right audio streams for ear worn products. In other scenarios, the cores may be assigned based on specific plugins. In other scenarios, the cores may be assigned based on resource loading. In some scenarios a plugin may be duplicated across multiple processing cores using different data. In some scenarios a plugin may be duplicated across multiple processing cores using the same data with different processing parameters.

In some embodiments, the task manager 3802 may assign tasks to other devices that are connected to the device where the task manager is running. For example, the task manager may be running on an ear worn device and it sends messages to a second device, such as a smart ring, for it to perform tasks such as monitor heart rate or motion when the ear worn device needs it.

Messaging function: In some embodiments, a task may communicate with other tasks via messaging. The audio OS may manage communications between tasks. In some embodiments, the audio OS may allow a single message to be delivered to multiple components, serially or simultaneously.

In some embodiments, the messages can be between software modules or processes running on the same processing core on the same chip. In other scenarios, the messages can be to different processing cores on the same chip. In other scenarios, the messages can be to other chips within a device or product. In other scenarios, the messages can be to one or more other devices that are connected to the first device, such as in a network of devices.

The tasks may be within the audio OS and may include inter chip communications via hardware I/O. The tasks may be running on different processing cores, for example. Some messages may be time critical. For example, a message including a request for audio data on a connectivity link in order to avoid a time out may be considered time critical. If a time critical task is being implemented, in some embodiments, other tasks may be delayed so that the time critical task may finish.

In some embodiments the message handler may use a list of message nodes, in a similar manner to a process manager using a list of process nodes and a data transfer manager using a list of data transfer nodes.

In some embodiments the message nodes contain information about the message such as time of delivery, the processing functions it requires, the resources it uses, and so on.

Some messages may be synchronized, thereby ensuring consistent delivery times when the messages are sent to multiple destinations. Some messages may have a specific time for its delivery. The specific time for delivery may be specified using, e.g., time nodes.

The audio OS may manage communications using a message handler. The message handler may manage the audio data input to and output from a component (e.g., audio OS, hardware, etc.). The message handler may buffer messages to prevent an overflow. The processor may not be stalled beyond a pre-defined block of time on a single task. For example, some systems may allow nested processing, such that process A can be interrupted by process B, which can then be interrupted by process C. If process C and B both use significant processing resources and many clock cycles to complete their processing, process A may be idle for a long time before it is serviced again. The pre-defined block may be used to avoid processes being left unserviced a long time. A mechanism may be added to the processor to ensure a process is not left unserviced for a long time, using a time check routine. Higher priority processes may not be allowed to completely dominate the processing resources. As another example, a process may be stalled because it is dependent on another process that has not completed. In some instances, a process may be using sensor data, for example, a temperature reading, but the device is unable to get an accurate reading for some reason. The data analysis process may be stuck waiting for the sensor data. The system may be able to unblock or remove processes that are dependent on data streams or other processes that are not able to proceed.

In some embodiments, a process or plugin may have message handler routines that the system can activate when certain conditions arise. For example, if a data stream is stalled or not responding, the system may send a message to the plugin error handler that can determine the preferred action to be taken in those conditions, rather than the system performing the action in same way for all plugins. The error condition in this scenario can be overridden by plugins that have a preferred or different action to be taken.

In some embodiments, the audio OS may allow service of the message handler without hampering the delivery of time critical messages. To avoid hampering the delivery, the task associated with the message may be split into sub-tasks, and the sub-tasks may be executed at different, spaced apart times.

In some embodiments, the messages delivered to the system can be marked with flags to determine when a message should be serviced. These can include "immediately", or "as soon as possible". These can also be marked as "when ready" which can be linked to a resource usage threshold. For example, the message to take a temperature reading may be marked as only necessary when resource usage drops below 50%.

In some embodiments, a message may also contain an ID of a previous message which it replaces. This can be a previous message that is now out of date and the new message replaces the previous one. This can be a message that is no longer relevant, such as a previous message requesting a temperature reading, is now replaced with a message requesting a heart rate reading instead. The system may flush the message queue or list of previous message types for a specific ID or type.

In some embodiments, the messages can be marked as a sequence and the system must service them in the correct order. This can be messages from a connected device that are changing the level of a sound. As an example, the level change messages may be configured such that they must all be executed to ensure a smooth level change transition, and they must be serviced in the correct order, instead of just servicing the most recent level change message and ignoring all previous requests.

In some embodiments the message may be split into multiple sub tasks that are grouped or treated as individual tasks. The tasks are wrapped into process nodes. The process nodes are placed into time nodes and then inserted into the time node list or process node list as needed. The tasks will then be executed as part of the overall system resource management and task scheduler without causing a stall in the message handler.

Interrupt handling function: The audio OS may support prioritized interrupt handling so that it can respond to critical tasks in a timely fashion via an interrupt mechanism. Interrupts may be handled using an interrupt handler implemented in software or hardware macros. The interrupt handler may be programmed to place the critical task in the next available time slot, for example. The interrupt handler may also have the ability to create sub tasks that are allocated to time slots in the future, thereby allowing an interrupt to be "serviced" quickly and then place its tasks into the main processing framework of time ordered tasks. The interrupt handler may avoid allowing the system to be stuck in an interrupt service routine which prevents the core processors from being serviced. The interrupt tasks can be assigned different levels of priority in the main task list. Interrupts can also be assigned a "time to trigger" to allow an interrupt to happen immediately or at some predefined time in the future. An interrupt can also be assigned a window of time. It can be programmed to only happen if the rest of the system is not very busy. For example, set up a request that the system causes an interrupt within the next two hours, when the system is operating at less than 20% of peak processing resources, to cause a user temperature reading to happen. If that condition is not met, the interrupt may cause an immediate temperature reading after two hours.

In some embodiments, the interrupt mechanism can use multiple layers of logic to determine when and how an interrupt is serviced.

In some embodiments, the message handler may be a plugin that is then handled just like all other plugins in terms of scheduling, system resources, process management and so on.

In some embodiments, all of the OS functionality can be implemented as plugins such that the core OS kernel can treat all resource allocation and scheduling with the same logic and infrastructure. For example message handling, interrupt handling, resource manager, process manager, time node manager and so on.

Resource management and low power function: The audio OS may be programmed to monitor the resources and power of the audio system. One mode that may be supported by the audio OS is called a low overhead mode. In low overhead mode, power saving functions (e.g., low processing activities, static applications, etc.) may be implemented. Additionally or alternatively, the audio system may be operated such that tasks are prioritized, and higher priority tasks are operated while the audio OS runs in low power mode. The lower priority tasks may be temporarily disabled, in some instances. For example, a hearing application that sends and processes certain signals (e.g., natural sound signals, speech communication sound signals, etc.) may be considered a higher priority task, whereas a music listening application may be considered a lower priority task. In some embodiments, higher priority tasks, low priority tasks, or both may operate in low power mode to reduce the amount of resources used for a given task. The low overhead mode may be implemented when, e.g., the battery on the audio system, electronic device, or both are low.

Resource management within the audio OS and associated silicon can be controlled using simple counters for each resource that has been connected into a system. For example, a microphone may be used by a plugin process for capturing speech information. A second plugin may want to use the same microphone signal to determine a measure of the noise conditions. The OS is responsible for allocating the hardware and software resources. It can maintain a counter for each component that has been attached to a resource. When the plugins are deactivated, they will free up their resources, which includes detaching from other components in the system. The OS can determine when no plugins are connected to a resource and then request that can go to sleep or power down.

In some embodiments, the system may track resources and identify that resources have been left allocated without processes using them or being attached to them. These orphaned resources can highlight plugins that are not tidying up their resource usage. In a similar way that memory leaks can be identified by tracking memory usage, resource leakage can be flagged during plugin development and can be a metric used by a system administrator as to whether a plugin should be accepted for general release to customers.

In some embodiments, a plugin may stop functioning unexpectedly and leave resource unattached. The plugin resource allocation manager can track which plugins have been removed from the system and free up resources accordingly.

In some scenarios, the OS may be programmed to deliberately prevent multiple plugins accessing a particular resource. For example a manufacturer may create a product such that only their own plugins have access to specific sensors in the device and they are not available for other plugins to use. This restriction can be programmed to enable only certain plugins, plugin developers, user conditions etc.

Debugging function: Software development tools and hardware development tools may provide breakpoint and event tracing tools. In addition, the audio OS has the capability of capturing live audio data streams. In some embodiments, live audio data streams, or other data streams in the system, may be used for debugging. The debugging interfaces and reserved memory may be reassigned for different versions of the development platform.

Figure 40:
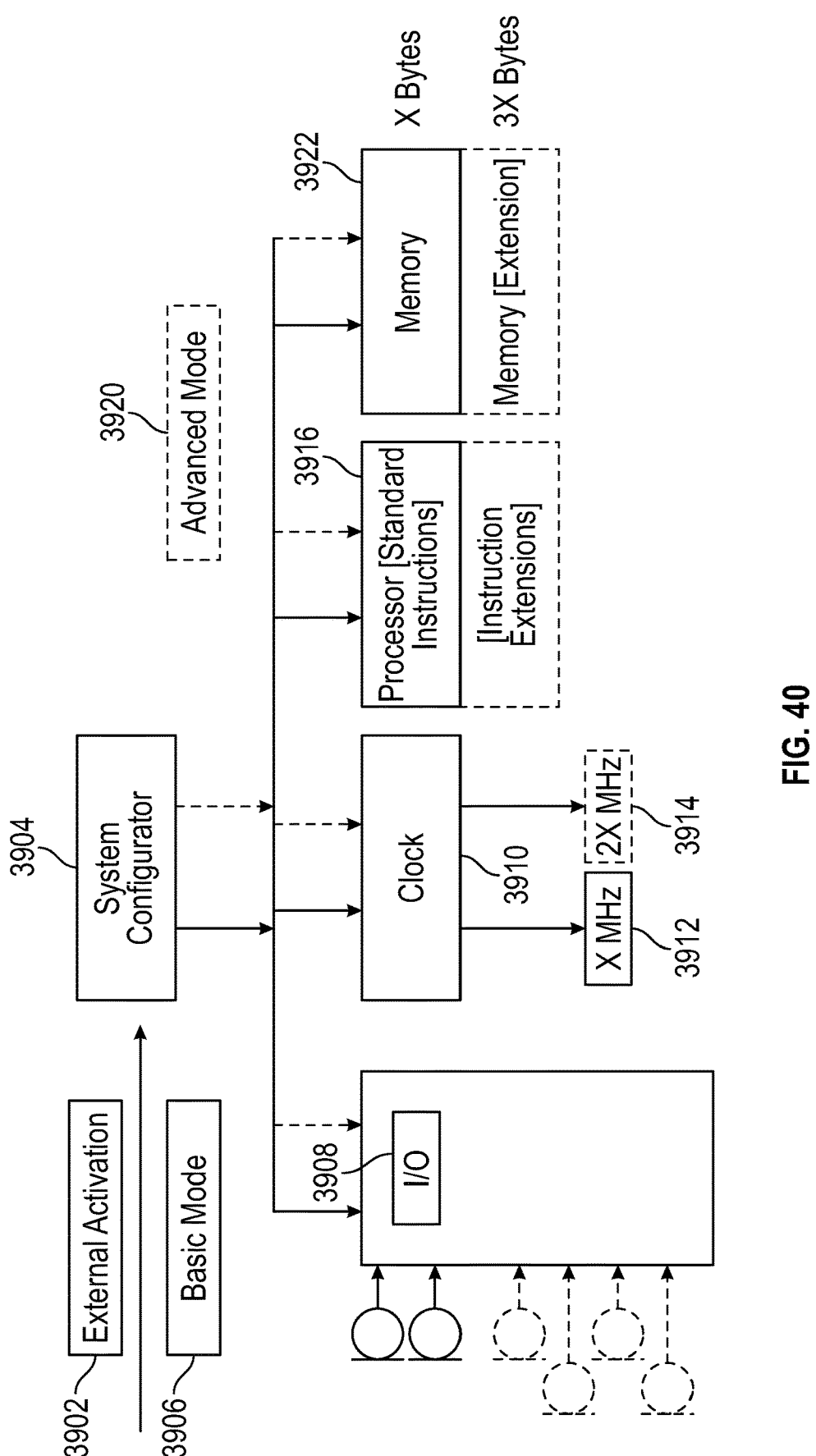
FIG. 40 illustrates an exemplary system configuration for processor and memory loading with an optional resource pool, according to some embodiments of the disclosure.

Resources control function: The audio OS may be a configurable OS that controls system resources. FIG. 40 illustrates an exemplary system configuration for processor and memory loading with an optional resource pool, according to some embodiments of the disclosure. The system configuration may include a system configurator 3904, I/O 3908, a clock 3910 a processor 3916, and memory 3922. The system configurator 3904 may operate in one or more modes, such as basic mode 3906, advanced mode 3920, or external activation 3902. The clock 3910 may operate based on one or more frequencies, such as a first frequency 3912 and a second frequency 3914. The processor 3916 may have one or more instructions, such as standard instructions, and may use additional instructions, such as instruction extensions. The memory 3922 may similarly have an extension.

For example, the amount of available resources may be restricted using, e.g., a secure hardware mechanism. If the user upgrades to a premium version of the audio OS, then the audio system may have more access to resources and premium applications that may use those resources. For example, the maximum clock speed may be limited to 50% of the available maximum, and memory could be limited to 50% of the available memory. In some embodiments, the time node system may limit the amount of processing available in a processing slot.

In some embodiments, the audio OS may include a system builder, which may be programmed to dynamically allocate memory and processing to tasks. This is unlike having a single application with different configurations built in that uses resources without being aware of the resources needed by other applications. As a result, the system monitoring overhead and total memory usage may be reduced. In some embodiments, power consumption may also be reduced by activating only active memory tiles.

In some embodiments, the audio OS may include a system configurator 3904. The system configurator 3904 may be programmed to check the system resources usage level to determine if more processing can be included into the current workload. If a process can be included, the process manager may insert the process into a process list, which may be a list of tasks to be executed. The system configurator 3904 may also allocate the appropriate memory. Before inserting the process into the process list, the system configurator 3904 may execute preparation steps in a preparation stage. The preparation stage may be its own process node that the process manager may run only when the process is initialized. The process may execute process-specific steps, followed by shutdown steps. The shutdown steps may clear the memory used for executing the process and delete the process node from the process list.

In some embodiments, the process manager and task manager may be the same function. The process nodes and tasks may also be configured such that they are using the same API. In other scenarios, the process nodes, the process list and process manager can be different to the task and the task manager. In some scenarios a process may be considered a group of one or more tasks.

The system configurator may be requested to perform system clean, defragmentation, plugin reorganization processes to free up resources for example. This can be used as a method of allowing the system to reset its resource allocations and create a clean platform based on the new set of plugins and system requirements.

As discussed above, the system configurator 3904 may use a process list and process nodes. In some embodiments, a plugin may include multiple processing functions. For example, an output processor may use a plugin that includes a compression function and an equalizer function. Each function may be associated with one or more process nodes.

Figure 41:
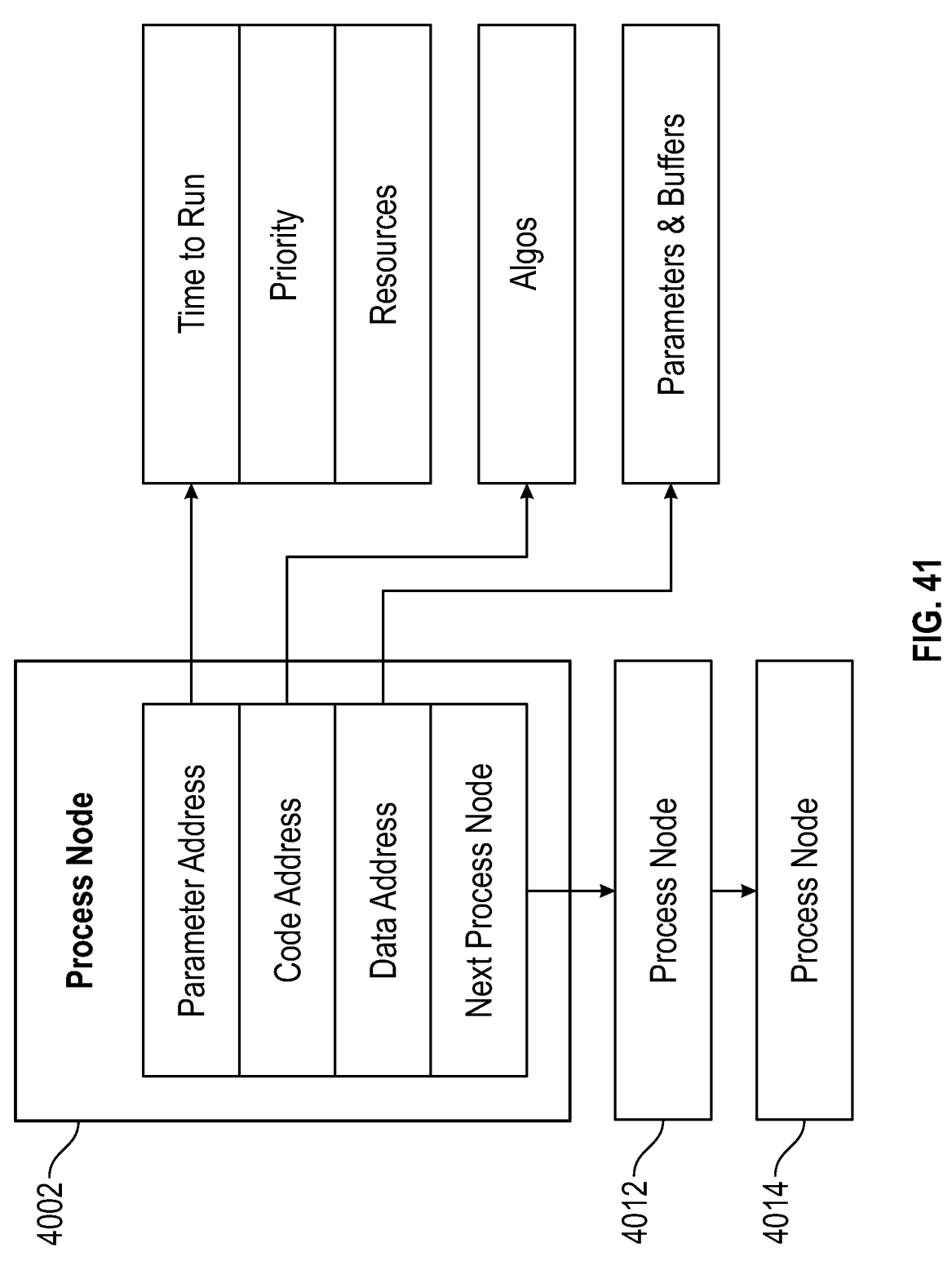
FIG. 41 illustrates an exemplary process node, according to some embodiments of the disclosure.

FIG. 41 illustrates an exemplary process node, according to some embodiments of the disclosure. The figure illustrates how a process node 4002 fits into a list of process nodes (process node 4012, process node 4014, etc.). A process node 4002 can be managed in software or hardware and may describe the processing and data that an individual node may use. For example, the compression function may be associated with an analysis node, a gain calculation node, a gain smooth node, and a gain application node. The equalizer function may be associated with a parameter update node (based on user input configurations) and a filtering node. In some embodiments, one or more process nodes may run at the same time or within the same time window.

The process list may reference process nodes to be executed. The process list may be a linked list that may be executed at times based on the processing window. Process nodes may be executed at a particular time in the future, at a time relative to the current time, or at time that ensures the output of the process is ready for the next process. In some embodiments, a process node may use the resources of a specific processing core. For example, an NN process may perform better when assigned to a processing core that has SIMD instructions and a large memory. As another example, an active noise control process may perform better when assigned to a tiny processing core with fast I/O and low latency.

In some embodiments, a process may include multiple process nodes, which may be assigned to multiple processing cores executing the process nodes in parallel. The resource control function may create a group of multiple processing nodes and assign a time node to the group. Alternatively, the resource control function may indicate the same time of execution with different processing core identifiers for multiple nodes.

One or more process nodes may be associated with a time node, which is used to start execution of the process. A process node may use flags that may be set to indicate one or more properties. For example, a process nodes may have an update flag that is set to indicate that there is an update available. Another example flag is a data ready flag which indicates that the node has completed processing of its data for the current time node. Yet another example flag is a threshold flag that indicates that a certain threshold (e.g., the level of the output signal has reached the threshold, and should be reduced) has been reached.

In some embodiments the time node and the process node and other types of node may include a unique identifier that allows a node to be referenced and found within a list of nodes. It also allows a node to be connected to other nodes in groups or lists.

The process manager may use a list of time nodes, which may specify the order and/or times of the time nodes to be executed. As the process manager receives new processes, it may insert the corresponding new time node into the correct location in the list of time nodes to ensure that time nodes are ordered correctly. In some embodiments, the times in the list of time nodes may be relative to the current system time. The last time node in the list of time nodes may have a time equal to the maximum time counter for the audio OS (e.g., 0xFFFFFFFF).

In some embodiments, the time node associated with a process node can be used as a time stamp for data gathering within a process node or other time related information that can be stored with the data.

At any given time, the process manager may be aware of the next time when a process may be executed based on the list of time nodes. In such instances, the process manager may cause the audio OS 414 to switch to a low power mode (e.g., sleep mode) until the next time node time has arrived or shortly before it. When the process manager executes a process associated with a time node on the list of time nodes, it removes the time node from the time node list.

In some embodiments, the process manager may look ahead in the list of time nodes to determine potential bottlenecks where many nodes need to be processed in a short time window and take pre-emptive action such as informing the associated process nodes. The process nodes may change their processing based on early warning of potential resource limitations in the future.

In some embodiments, a time node process can be used to create a structured time frame of processing to ensure samples are ready at a particular time. The structured time frame of processing may reduce latency. An example structure time frame may include blocks of processes, executed at certain time slots. For example, the block of processes can include multiple filtering processes for active noise control applications. Instead of polling the input buffers to determine when to process the audio data, the time node process may wait for the process node to be executed at the designated time slot. Once the current time node is complete, the time node process can create a new time node for the next block of audio data. A time node process may include a timestamp, in some instances, to ensure that a process completes the processing before a certain time so that the output samples are ready for the next process.

Time nodes may also be used for audio data preparation. In this manner, time nodes can be used to ensure certain processes can execute. For example, time nodes may be used to ensure I/O space is ready and available for the next block of processing.

In some embodiments, time node interrupts and preemptive processing may be used for certain tasks. For example, a time node interrupt may be used to stop or pause a first task (e.g., signal processing) and may allow a second task (e.g., a task that has a higher priority, a task that has a lower latency, etc.) to be executed. In some embodiments, after the second task has completed, the first task may resume until it has completed or until another interrupt occurs. In some embodiments, the first task may be a background task, and the second task may be a critical task. Embodiments of the disclosure may include creating a notification when background tasks do not complete within a certain amount of time (e.g., due to too many interrupts), or bypassing interrupts after a time threshold or interrupt threshold has been reached to avoid or reduce glitches. For example, the resource control function may increase the processing times for a background task by creating a new time node. As another example, a single background task may be split into multiple background tasks to ensure that one background task does not consume all or the majority of available resources.

One or more time nodes may be executed on a master processing core. The process nodes associated with the time nodes may be assigned to one or more different processing cores. By assigning the time nodes and the associated process nodes to different professing cores, a process node may only be interrupted by a time node when it assigns another process to the same processing core. For example, if there are two processes and two processing cores, each process may be assigned to a different processing core to avoid or reduce the number of conflicts. In some embodiments, the processing cores may be used to balance the processing load by moving processes or sub-processes from one processing core to another.

Task priorities: In some embodiments, the resource control function may execute tasks based on priorities, where the priority of a task may be dynamically adjusted based on the urgency of task (e.g., to meet a timing or latency deadline). In some embodiments, a task may be designated as low priority until the deadline is approaching. When the deadline for a task approaches, the resource control function can check if all input audio data, or other data, needed is available. While the task is designated as low priority, the resource control function may not prematurely check if all input audio data needed is available so that it does not waste clock cycles. The resource control function may balance the amount of computing time for a task to complete before the deadline and the use of clock cycles for checking the availability of input audio data. The amount of computing time may be fixed (e.g., for an NN or a filter) or dynamic (e.g., for a signal level or a trigger event).

In some embodiments, the priority of a task may be dynamically adjusted, either increased or decreased, depending on other system factors, such as available resources, proximity to execution time, available data or space, user interaction, information from other connected devices and so on.

In some embodiments, the audio OS may be operated in a debug mode. The debug mode may allow for debugging of tasks, process nodes, and associated lists to determine bottlenecks. A large debug buffer may be used in the debug mode to capture some or all of the executed process nodes and associated execution times. The debug mode may also be used for debugging memory allocations. To find memory leaks, the memory allocations and releases may be filled with pre-determined fixed values. Additionally, the debug mode may be used for troubleshooting problems with audio data transfers. The audio data transfers in the audio OS 414 may include timestamps. In the debug mode, the audio OS may use the debug buffer to capture the timestamps and sizes of the audio data transfers. Based on the contents of the debug buffer, the user may determine whether and where there are any bottlenecks in audio data flow, clock mismatches, data rate conflicts, or the like.

In addition to managing processes, the resource control function may be programmed to manage memory allocations. In some embodiments, a process may be assigned to fixed sized memory. Processes that may use more memory than the fixed size memory may use multiple memory banks. The process nodes may determine whether a dual bank memory, for example, may result in more efficient loading of registers and operation results.

In some embodiments, the audio OS uses a multi-layer processing scheme that allows the audio system to operate in low power mode, low resources mode, or both. One or more plugins may include multiple (e.g., three or more) variants. A variant may designate the processing and memory requirements for the audio system, related to the operation mode of the audio system. One variant may be a full variant, where all the processing and memory may be available. Another variant may be a low power variant, which the resource control function may switch to when one or more usage levels reach one or more thresholds. In some embodiments, when the battery level of an audio system is low, the battery is being used up quickly, and/or the memory usage is reaching a certain level, it may be difficult for one or more applications to run. The audio system resource control function may can switch to a different variant of the plugin, allowing extended usage of the audio system.

In some embodiments, the operating system may request plugins and tasks in the system to run in different modes that are independent from each other. For example plugin A may be running in high performance mode, plugin B may be running in normal mode and plugin C is requested to run in low power mode or low resource mode. Plugins can be independently controlled. This enables different layers of performance for each plugin. This allows users to control the performance of plugins based on their individual needs. As an example, a particular user may configure the system for high performance hearing enhancements to be used in all scenarios, to help with their hearing loss, while all other plugins are secondary in priority and can use regular processing or even low performance processing to enable the primary plugin to reach its performance target.

Exemplary Applications

As discussed above, the audio system can include one or more applications. Applications may be used by a user to enable and/or control one or more functions of the audio system. In some embodiments, the electronic device can be programmed to operate multiple applications simultaneously. Exemplary applications can include, but are not limited to, hearing (e.g., ambient sound processing), content playback, accessing compression codecs information, phone calls, using a voice interface, monitoring biometrics, monitoring sound exposures, handling sensor data, HRTF capture, and the like. The details of some of these applications are provided below.

Applications may be enabled and/or controlled through a UI of an electronic device. The UI may communicate with an application through a bidirectional communications channel, for example. An application may request access to system resources, such as processing and memory, used by the application. The application may also request access to audio data streams. In some embodiments, the audio data streams are reconfigured on-the-fly. For example, a new application may request access to an audio data stream that is currently being used, but is programmed at a different streaming rate. The development platform may provide one or more methods for seamlessly changing audio data connections and rerouting digital audio data. For example, to avoid glitches, the development platform can automatically ramp up and/or automatically ramp down the audio data connections when starting and stopping.

For example, an application can use a microphone input audio stream. When a plugin is loaded that uses a microphone, the connected microphone component may be powered on and programmed. Audio data may then appear as digital samples at the input to the system. A buffer that is collecting the audio samples may be initialized to include zeros or silence. The first audio sample from the microphone could be caused by a loud input signal. This can cause a large transition from "silence" to "loud" in a very short time frame of just one sample. This sharp and large transition can cause an undesirable click and may cause unexpected outputs through signal processors further down the processing chain. Instead it is better to smoothly ramp up the audio from silence to the target level using a ramp of gains, for example, linearly transitioning from 0 to 1.0 over 32 or 64 or 128 samples. This can be configurable when a new audio stream is connected to the system. The implementation can be in hardware on the chip or in software as part of the connection process. A similar concept can be used when an output is detached from the system. Rather than simply stopping audio streams, the system can ramp down the buffered audio at the output using gains from 1.0 to zero to allow a smooth transition to silence and avoid a click.

Figure 42:
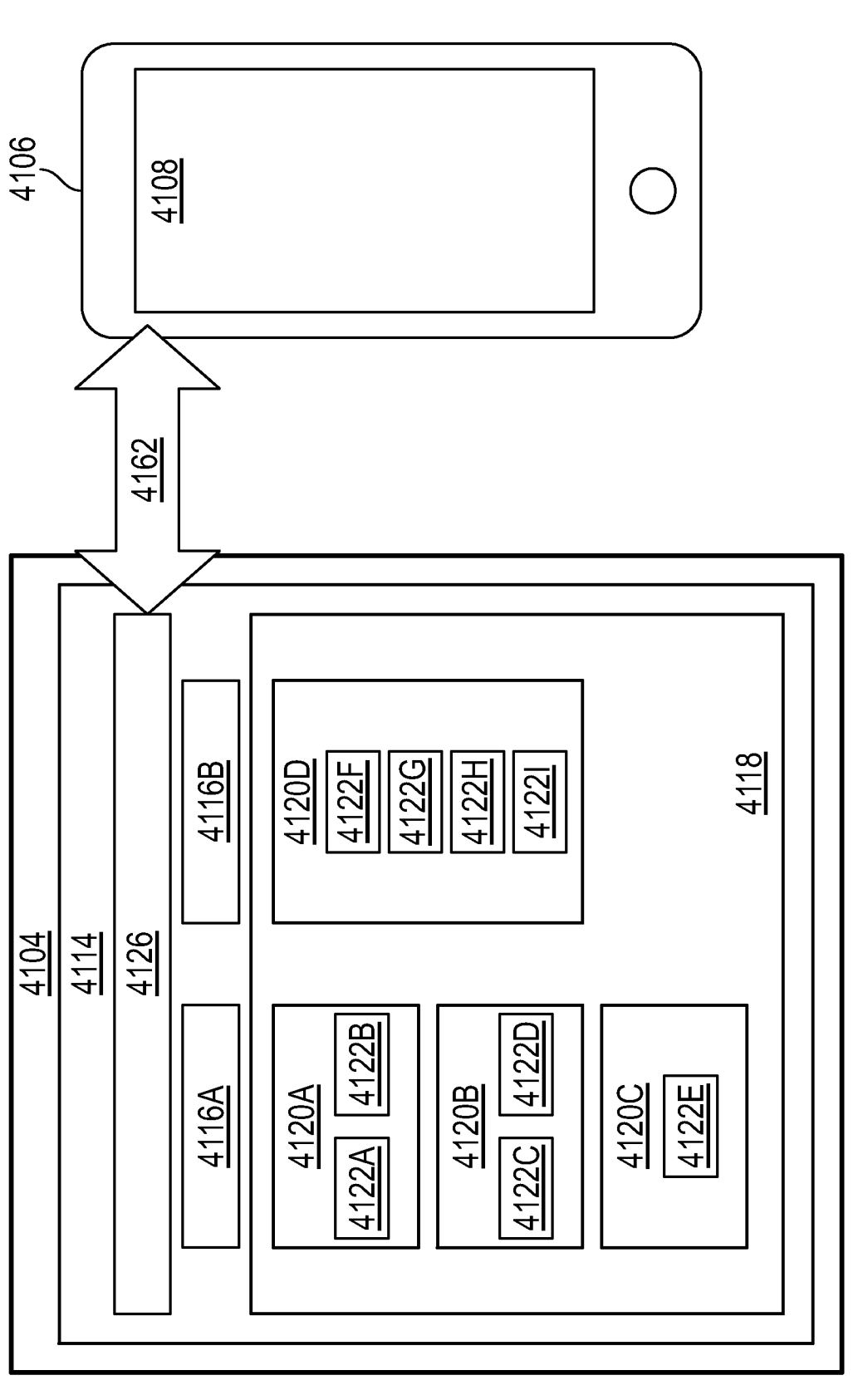
FIG. 42 illustrates exemplary embedded software connected to an electronic device through a connectivity layer and connection, according to some embodiments of the disclosure.

In some embodiments, the development platform manages dynamic loading and unloading of applications onto an electronic device. As shown in FIG. 42, embedded software 4104 may be connected to an electronic device 4106 through a connectivity layer 4126 and connection 4162, according to some embodiments of the disclosure. The electronic device 4106 may display information on a UI 4108.

In some embodiments, not all applications 4116 may be running at the same time and/or loaded on the electronic device 4106, the development platform may unload applications 4116 that are not running at any given time. For example, some applications 4116, such as sound level monitoring, may always be on. As a result, the development platform may keep always-on applications loaded on the electronic device 4106. Other applications, such as making phone calls or listening to music, may only be loaded when the phone calls or music applications is being run. Thus, the development platform may keep as-needed applications 4116 loaded on the electronic device 4106 only when the application 4116 is being run and/or when there is sufficient memory available on the electronic device 4106.

When multiple applications 4116 are operating simultaneously, the electronic device 4106 may have to manage multiple audio data streams, allocations of resources, sharing of drivers, and sharing of inputs and outputs to optimize performance. The OS will configure and manage the resources such that multiple experiences can be delivered on a wearable device that are fully customizable by a user.

The electronic device 4106 may also have to handle instances where a system resource may be unavailable. For example, a block of memory, an audio stream, a data stream, another piece of information from a separate process. The management of this system status and the distribution of system information and alerts is covered by the audio OS.

The OS may also identify optimizations at a system level where resources or information can be shared between multiple applications and plugins. For example, multiple applications may be trying to access the same APIs. This can be implemented as a library of code that are shared between multiple plugins. This can also be implemented as an API to a hardware macro that efficiently produces data used by multiple processing components in the system, such as the current output level of an ear device. In addition, the OS may identify that multiple plugins are requesting access to the same data streams. This can be provided through a common addressed memory or as separate copies of the data depending on data usage. For example, some processes may be designed to provide in-place processing where the source data is replaced by the new processed data, which will cause issues with other processes that require access to the original unmodified source data.

In some embodiments, the system may request plugins to switch between in place processing, where the processed output data is placed back into the same memory locations where the input data is read from. In other scenarios, the system may request that plugins used separate copies of the audio data into a new memory location. In other scenarios, the input and output buffers will be directly managed by the system where in some instances the input and output buffers are the same memory locations, or in other implementations they are different memory locations.

In some embodiments, the system may identify that resources can be shared between tasks and processes and plugins in the system. For example, data streams from microphones may be used by multiple plugins. The modular design of the operating system architecture enables data streams to be shared instead of each plugin duplicating the data into multiple copies in different memory locations.

The plugins 4120 may be part of a framework 4118. Each plugin 4120 uses its own memory allocation and data parameters. The shared code can be accessed by multiple plugins with different data pools. For example, an FFT library can used by a first plugin A 4120A using a first memory block A 4122A. It can be interrupted to enable a second plugin B 4120B to also use the FFT library but with a second memory block B 4122C. Then processing can return to the first plugin A 4120A.

To manage power, the electronic device 4106 may run one or more applications 4116 in low power mode. This could be managed through a system power function that monitors power consumption and battery levels. It can be programmed to trigger different modes at thresholds controlled by the manufacturer of the device. When the battery level drops to a certain threshold, the power management function can set a system flag that all processing be in low power mode. It may be able to monitor resource usage and determine which processes or plugins are using the most power and select which plugins should go into low power mode first. A plugin may provide metrics when it is loaded that provide an indication of typical power consumption in each of its modes. The system power function can request power information for each plugin and determine which one is likely to provide the most power savings when switching to low power mode and only select plugins that may make a difference to the overall system power extension. Plugin A can be prioritized over plugin B if the potential power reduction of plugin A is greater. In some embodiments, when an application 4116 runs in low power mode, it may use fewer resources. For example, the sound level monitoring application running in low power mode may monitor the sound levels less frequently (e.g., half as many measurements compared to regular power mode).

To manage resources, the electronic device 4106 may run one or more applications 416 in low resources mode. A resource manager function can be used to monitor the resources used by each plugin and determine when it is necessary to request a plugin to switch to low resources mode. This could be to save power or to allow other plugins to be loaded or system functions to be processed, or background plugins to be processed more regularly, etc. A plugin can provide information on the resources needed in each processing mode. Resources can include, memory footprint, number of data channels, data rates, compute requirement: MIPS, connectivity requirements, output requirements etc. The resource manager may find more compute time for a background task that is taking the temperature of the user as it has now reached a time critical request time. Other plugins may be using a large amount of processing available in the processor. The resource manager may determine that a plugin could significantly reduce its compute needs if it was to switch to low resources mode. The resource manager may request the plugin to do so, this could allow the background task, such as temperature reading, to have access to the processor. When the temperature reading is complete, the resource manager can request the main processing plugin to return to normal resource mode. The audio OS provides the functions for managing resources efficiently to achieve the target performance of the system.

In some embodiments, to avoid oversubscribing memory tiles, applications 416 may provide information to the audio OS 4114 indicating which memory tiles are not used by the application 4116. The audio OS 4114 may allocate the unused memory tiles to another application 4116.

In some embodiments the plugin will identify which resources are now available when it switches to low resource mode. For example, this may free up memory tiles that can be used by other plugins. When the system allows the plugin to return to normal processing mode, the memory is given back to the plugin so it can use it.

Additionally or alternatively, drivers may be reconfigured on the fly (e.g., for I/O) by changing sample rates, audio data bandwidth, etc. For example microphones and speakers and other external system peripherals can be managed to reduce system resources for a wearable product. The OS can inform the device drivers that system resources need to be reduced. This can result in a reconfiguration of the connected peripheral component to achieve the desired reduction. This could mean changing the clock rate for connected microphones or ADCs, or sending a low power mode request to the peripherals if they support them. This could include a request to reduce the output sample rate for DACs and loudspeakers. This could also include a request for a Bluetooth connection to reduce the data rate or fully go to sleep.

Content playback application: One software application is content playback, which involves a method of replaying audio or video. Content playback may include enhancing the audio content. For example, bandwidth extension may be applied, the amplitude may be corrected, the noise may be reduced, or a combination thereof. Content playback may also include processing the audio or video to compensate for acoustic properties of the audio system 100. Additionally or alternatively, content playback may include processing the audio or video to account for the user's preferences in terms of loudness, spectral content, equalization, etc. In some embodiments, content playback may include spatial rendering. The content playback may also include methods for adjusting and controlling the latency and delay of one or more data streams to ensure synchronization of signals at the point of consumption by the user. The content playback application can be considered an example of a high level system architecture. There are at least three categories of signal processing plugins for ear worn devices. A single plugin can cover more than one category. The three categories that the system supports at a minimum can be described as data, user and device. Plugins provide signal processing enhancements to one or more of these categories. The signal flow of the data through the system is defined to allow plugins to be placed into the system architecture without requiring intimate knowledge of other processing components in the signal chain.

Figure 43A:
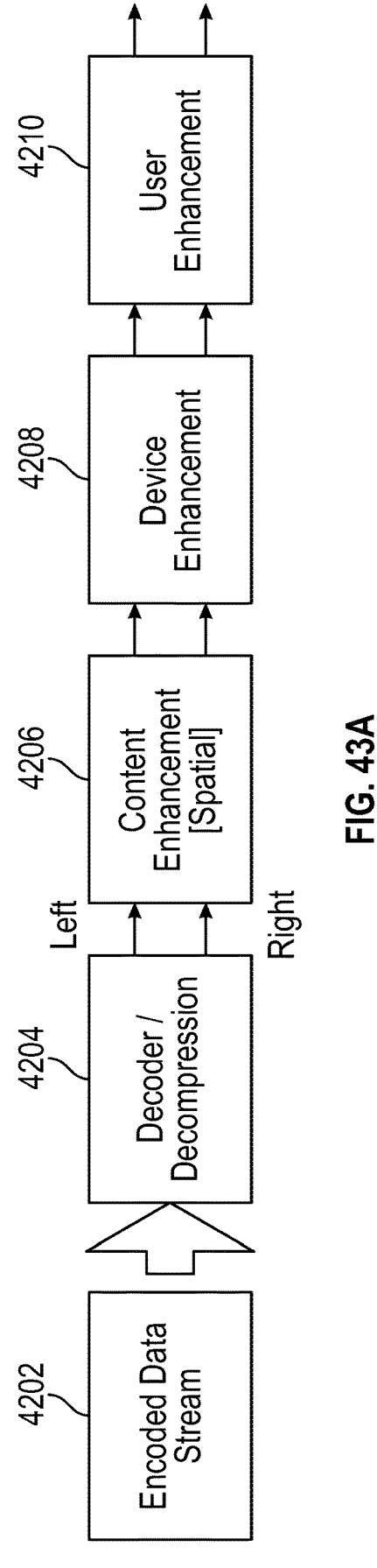
FIG. 43A illustrates an exemplary flow diagram representative of an exemplary content playback, according to some embodiments of the disclosure.

FIG. 43A illustrates a flow diagram representative of an exemplary content playback, according to some embodiments of the disclosure. The content playback architecture is an example of the "data", "user" and "device" categories of plugins that the technology platform supports. In this application, the data is processed using multiple plugin stages. The first is to handle the data streaming into the device. This could be a dedicated driver plugin that is communicating with and controlling a connectivity peripheral component, or an integrated connectivity components, such as a Bluetooth radio or USB data connection controller. This component is informed both with the external dynamics of the system, based on the connected device and its data flow, and also with the internal dynamics of the system based on the additional plugins and device data flow. This can be a reactive process operating in slave mode to the data stream. This can be a proactive process operating in master mode to the data stream. The task of the data stream driver is to maintain a continuous source of data into the wearable device. The next data processing component takes the data streams and converts them into a data format that is usable by the rest of the system. This is typically some form of decryption and decoding component that takes blocks of data and converts it into time domain PCM audio samples as a continuous stream of audio. This could be using industry standard coding schemes and data compression schemes for audio data, such as MP3, SBC, LC3, AAC, APTX, FLAC etc. In some configurations, this may be a custom coding scheme between two or more devices for sharing data, such as when sending content from one ear to the other ear. In some implementations this may be just an unpacking or reformatting of samples into a data format that is usable by the next stage of processing. The next stage of processing is used to enhance the audio streams to create better content for the user. This can be operations and plugins that provide processing functions such as bandwidth expansion, packet loss concealment or spatial rendering of the audio streams. These enhanced audio streams are delivered to the next stage of processing that provide device specific processing. This could be operations and plugins that adjust the frequency response and level of the audio based on the acoustic properties of the device. The audio streams are then passed on to the next stage of processing which is for user specific enhancements. This could be additional operations and plugins that are specific to a user's hearing profile or preference. The user processing may come before the device processing in some applications.

The audio content may be one or more data streams, enhanced by a cross-over network, for example. The enhancement may comprise modifying the data streams based on one or more parameters from the user, manufacturer, etc. For example, a manufacturer may have a configuration file for programming a device-specific plugin to have certain enhancements. The cross-over network may allow a user to change other settings on top of the manufacturer's configuration file.

Figure 43B:
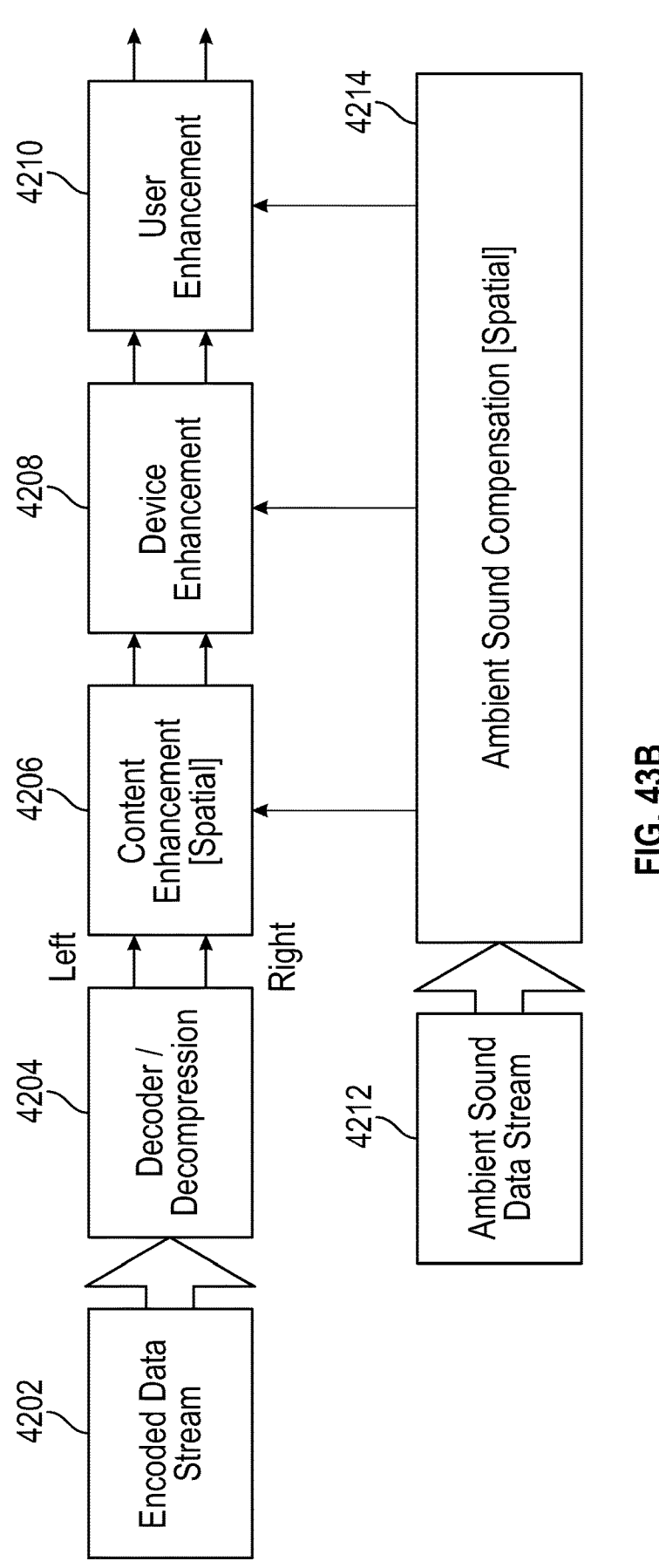
FIG. 43B illustrates an exemplary flow diagram representative of an exemplary content playback, according to some embodiments of the disclosure.

FIG. 43B illustrates a flow diagram representative of an exemplary content playback, according to some embodiments of the disclosure. Plugins may receive information about the auditory scene (e.g., ambient and environmental conditions) the user is exposed to, which may affect the type of processing applied within the plugins.

Figure 43C:
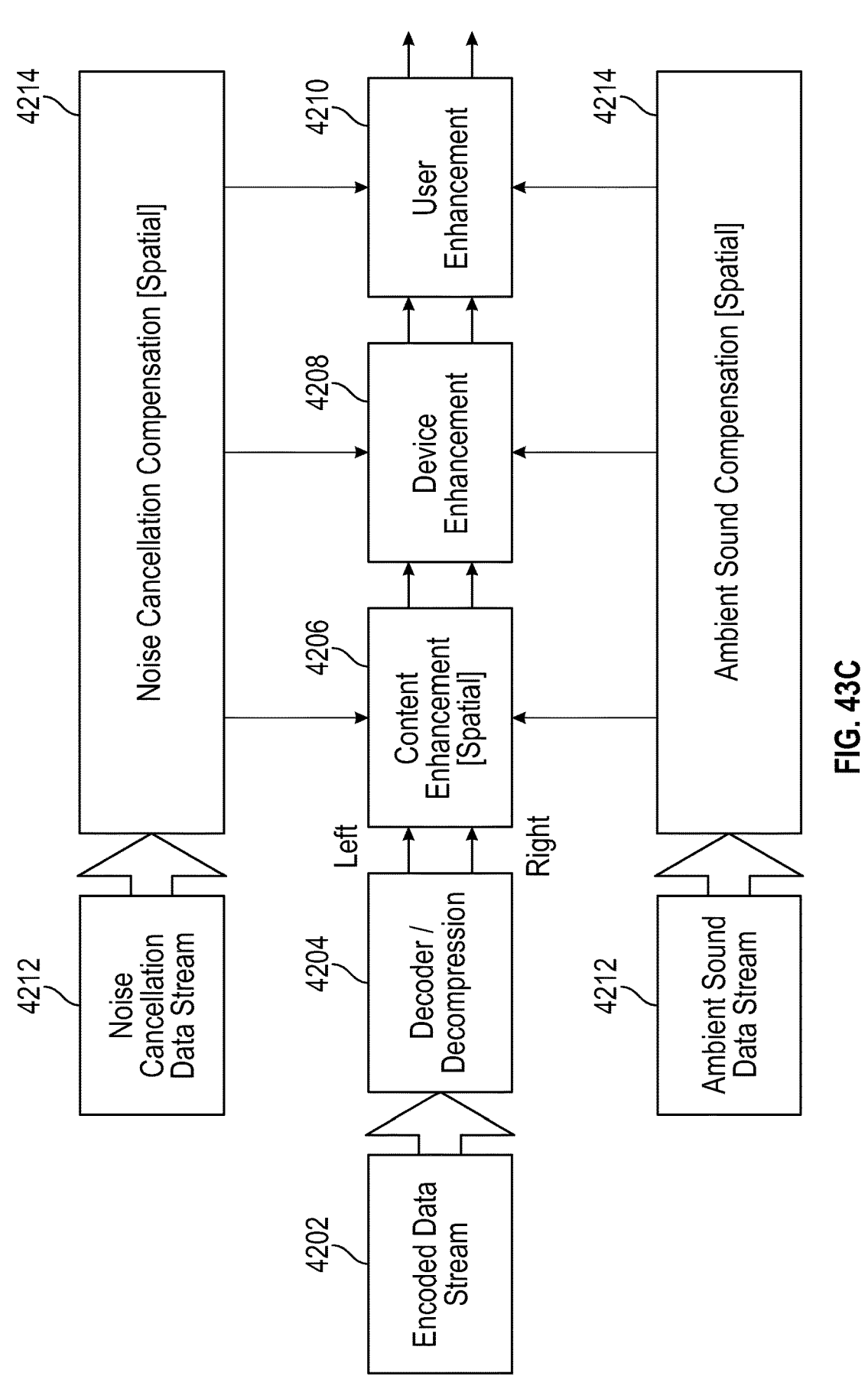
FIG. 43C illustrates an exemplary flow diagram representative of an exemplary content playback, according to some embodiments of the disclosure.

FIG. 43C illustrates a flow diagram representative of an exemplary content playback, according to some embodiments of the disclosure. Plugins may receive information about the processing for active noise control that may be applied to the output audio data stream, which may affect the type of processing applied within the plugins.

Figures 43D, 43E:
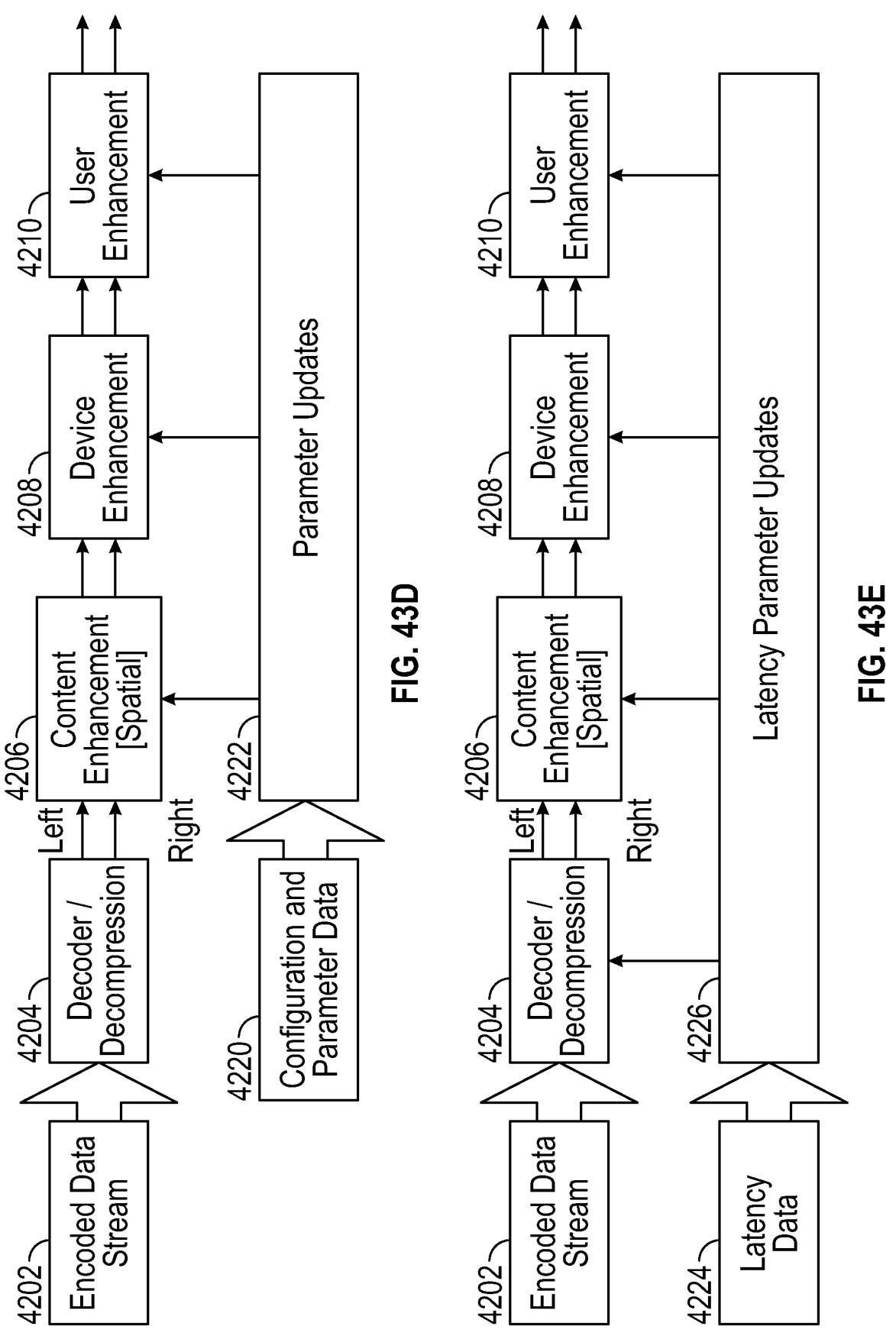
FIG. 43D illustrates an exemplary flow diagram representative of an exemplary content playback, according to some embodiments of the disclosure.
FIG. 43E illustrates an exemplary flow diagram representative of an exemplary content playback, according to some embodiments of the disclosure.

FIG. 43D illustrates a flow diagram representative of an exemplary content playback, according to some embodiments of the disclosure. Plugins may receive configuration data and parameters used for the processing within each plugin. The parameters can be synchronized to multiple plugins, provided as independent audio data streams, or independent parameter components. The UI of an external device may provide encoded and compressed data as messages to the processing chain.

FIG. 43E illustrates a flow diagram representative of an exemplary content playback, according to some embodiments of the disclosure. Plugins may receive latency information, such as operating modes, target processing times, and data flow management information. The latency information may be used for low latency streaming applications such as different low latency codecs and low latency signal processing for time domain enhancements.

The audio data received for content playback may be compressed before transmission and then decompressed after transmission, thereby allowing faster communication of audio data between components, using less connectivity bandwidth. Embodiments of the disclosure can include a component (e.g., included in a wearable device) that encodes and compresses the audio data prior to transmission. The component may encode the audio data based on a codec stored in the component's memory. The component may decode the packets of data to reproduce the PCM samples that are passed to other processing components in the system. The codec may be based on the type of audio source, the connectivity protocol, or the like. The audio system performing one or more pre-processing steps that receive and decompress the encoded audio data stream.

An extension to the implementation of a data compression codec is to assign a dedicated processing component in the system, such as a microDSP. This reduces the impact of handling encoded data streams on the main processor of the system. Some coding schemes can require significant processing for either encoding or decoding of data. This can significantly impact the ability of the system to maintain its processing capabilities for other plugins when encoded data is one of the many data streams in and out of the platform. The silicon architecture provides the ability to assign a microDSP to the task of encoding and/or decoding audio streams. The processing component will provide the data handling mechanism to take packet based data on one side and handle time domain audio samples on the other side. The packet data may not be produced or consumed at a constant rate. The DSP component will include data handling functions to specifically take care of this, such as using rate matching, time stretching, packet loss concealment, buffer management. The DSP component will also include specific accelerators for handling encoded data streams and the operations required to pack and unpack the data. Also, it will provide hardware macro accelerators to assist with optimizing the decoding and encoding of audio data based on industry standard coding schemes, such as SBC, MP3, AAC, APTX, LC3, FLAC etc. The DSP functions will also enable optimized handling of multiple channels of data for coding schemes that support more than 2 channels of audio for stereo music and more than 1 channel of audio for conversational or communications applications. The processing core will support the download of new plugins containing more advanced coding schemes or optimizations and improvements to existing coding schemes. This architecture enables the encoded data handling to be completely or partially offloaded from the main processor. A microDSP processing core can be allocated for encoding and a separate core allocated for decoding in some applications. Multiple microDSP cores can be used to handle multiple encoded data streams coming into the system. For example a mobile phone may be sending notifications to the platform using SBC coding as part of the standard Bluetooth specification, while simultaneously the system is receiving high quality audio streams from a second device, such as an AV receiver, using the MQA coding scheme.

Phone calls application: The ear pieces in the audio system may be used to engage in hands-free phone calls. When people communicate with each other in-person, people use both of their ears to help deal with noisy scenes and to help capture and understand the other person's speech. For example, head movements and natural binaural auditory cues may be used to help understand what the other person is saying. When engaging in a phone call, communications networks remove a lot of the advantages of in-person communications, as communications networks tend to be mono, narrowband, low quality, and can introduce delays. The user does not have access to head movements and natural binaural auditory cues.

Embodiments of the disclosure can include a phone calls application that may reinstate the head movement information by rendering the received speech using HRTF or HRIR to provide a spatial location of the remote person's speech. Head tracking may be used to anchor the rendered voice in a fixed position, which may allow the user to turn his or her head to a certain angle to hear the speech better. Additionally, advanced noise reduction can be used to reduce the impact of the ambient sounds the user is experiencing and to reduce the level of noise that is sent to the remote person. In some embodiments, wideband or full band audio data streams may be used through the communications network.

Embodiments of the disclosure may also include an external microphone and an internal microphone to actively control unwanted noise, where the internal microphone is located in the user's ear canal. The external microphone may be used to determine the ambient sounds, and the internal microphone may be used to determine the user's speech. The ambient sounds measured by the external microphone may be used to control the ambient sounds included in the sound signals transmitted to the user's ear pieces. The system may also use multiple microphones in the ear piece. In addition, the system can use microphones from both ear pieces to create a binaural capture of the spatial ambient sound to further enhance the processing to extract sounds the user wishes to hear and to capture their voice for communications purposes.

In some embodiments of the system, the use of multi-capsule microphones will provide sound field capture data that can be processed to recreate a binaural experience for the listener. The capture of sound fields at a point in space allows a full 360 audio experience to be rendered through binaural mapping. The binaural mapping can be performed as a plugin for sound field data. This can be captured using available 8, 16 or 32 channel microphones. The rendering can be placed in the user's ear devices using personalized HRTF or other data representing their hearing profile and binaural cues. This can provide an immersive and realistic experience as if the listener is actually located in the environment where the audio was captured, such as in a concert hall.

In some embodiments, the ear pieces may be an "acoustic extension" of the mobile phone. The ear pieces may include a single microphone and a single loudspeaker, for example. The loudspeaker may be located close to the user's ear. The microphone may be located close to the user's mouth. The microphone may be located on a boom that extends from an ear piece, or may be on a separate pod located on a cable that connects an ear piece to the mobile phone. When used as an acoustic extension, the ear pieces may be passive and may not include any signal processing or powered circuitry. A cable may connect the ear pieces to the mobile phone, and the mobile phone may perform signal processing enhancements. In this scenario, the phone may not know the type of device the ear pieces are or their form factor. The design and manufacture of the ear pieces and the connections may be simple, low cost, and flexible (e.g., the ear pieces can connect to many different endpoints such as mobile phones, computers, tablets, wireless belt packs, custom installations (such as mixing desks or other hardware), conferencing systems, etc.).

The ear pieces of the audio system may alternatively be a wired device comprising a connection that is digital and powered (e.g., USB or lightning connection) between an ear piece and an electronic device. The wired connection may be used to power the ear pieces and send/receive high quality digital audio. The electronic device (e.g., a headset) may be programmed to perform local signal processing. This system architecture also allows multi-channel audio to be passed to and from the electronic device using the high data rate of the digital data connection. As a result, the audio system may be mono or stereo (with separate channels of audio for the left and right ears) and can use multiple microphones. Multiple microphones may be used to remove noise. The signals may be processed and a single output channel of audio data may be sent to the electronic device 406. For example, the audio samples may have a sample rate of 8 kHz (narrowband), 16 kHz (wideband), or 48 kHz (full band) or higher.

In some embodiments, the ear pieces of the audio system may be a wireless device that communicates using wireless communications via, e.g., Bluetooth, WiFi, or the like. The Bluetooth standard provides different profiles or data streaming protocols that allow audio data to be communicated between two devices. Some of the profiles are specifically designed to communicate real-time bidirectional audio data between the ear pieces and an electronic device (e.g., a mobile device, personal computer, etc.). The ear pieces may be included in a powered digital wireless headset that includes multiple microphones and can use a stereo form factor.

In some embodiments the ear pieces may be connected to multiple connectivity interfaces simultaneously. For example, the device may be using NFMI to communicate between the left and right ear pieces. The ear pieces may be using Bluetooth and Bluetooth Low Energy to receive music or notifications from a mobile phone or smart watch. The ear pieces may also be receiving data using WiFi from within the building they are in which can be used for VOIP communications or high resolution audio streaming with multiple channels of audio. In addition, the ear pieces may be connected to a cellular network, such as 5G, to provide direct and secure communications with cloud based services and other cellular data streams such as phone calls. The ear computer, ear operating system and plugins will enable all these combinations to be supported.

Further examples of the use of multiple connectivity components in a system include the use of ultra wideband (UWB) or even custom connectivity links, between devices. This can enable very low power data connections for audio and other data streams, such as sensor data, to be transferred between connected devices. In some scenarios this can be between the left and right ear pieces, or it can be connections to other wearable devices, such as smart rings, wristbands, fitness trackers, smart glasses, smart watches and so on. In some scenarios the UWB data transfers may be used in conjunction with another wired or wireless protocol, such as Bluetooth. This enables a system to leverage the extensive use of Bluetooth interoperability and standard profiles to create connections between devices, with the data transfer using an alternative system, such as UWB, to use lower power, lower latency and greater data bandwidth streaming.

Figure 43F:
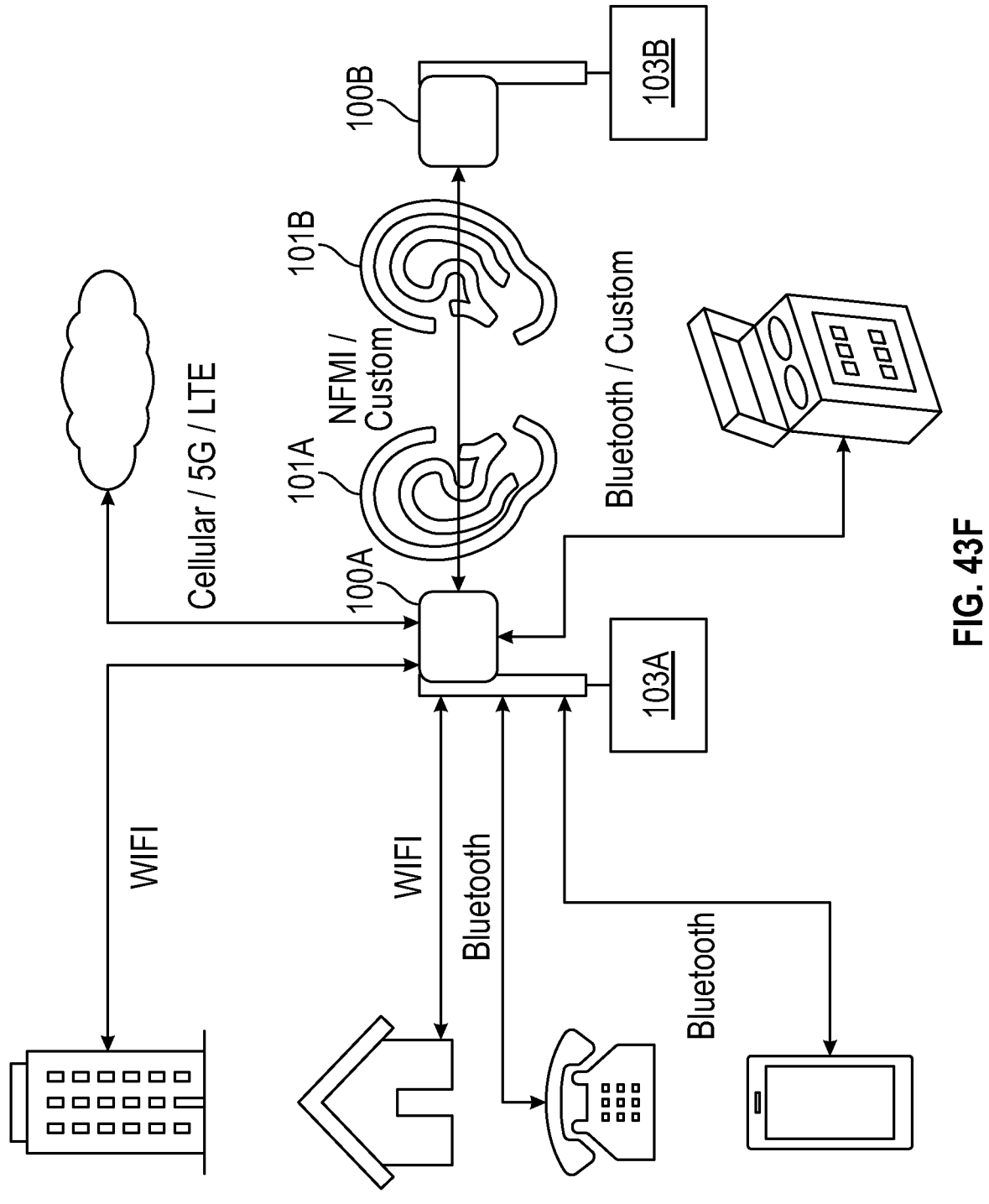
FIG. 43F illustrates an exemplary configuration for all the connectivity requirements to be placed in the ear device, according to some embodiments of the disclosure.
Figure 43G:
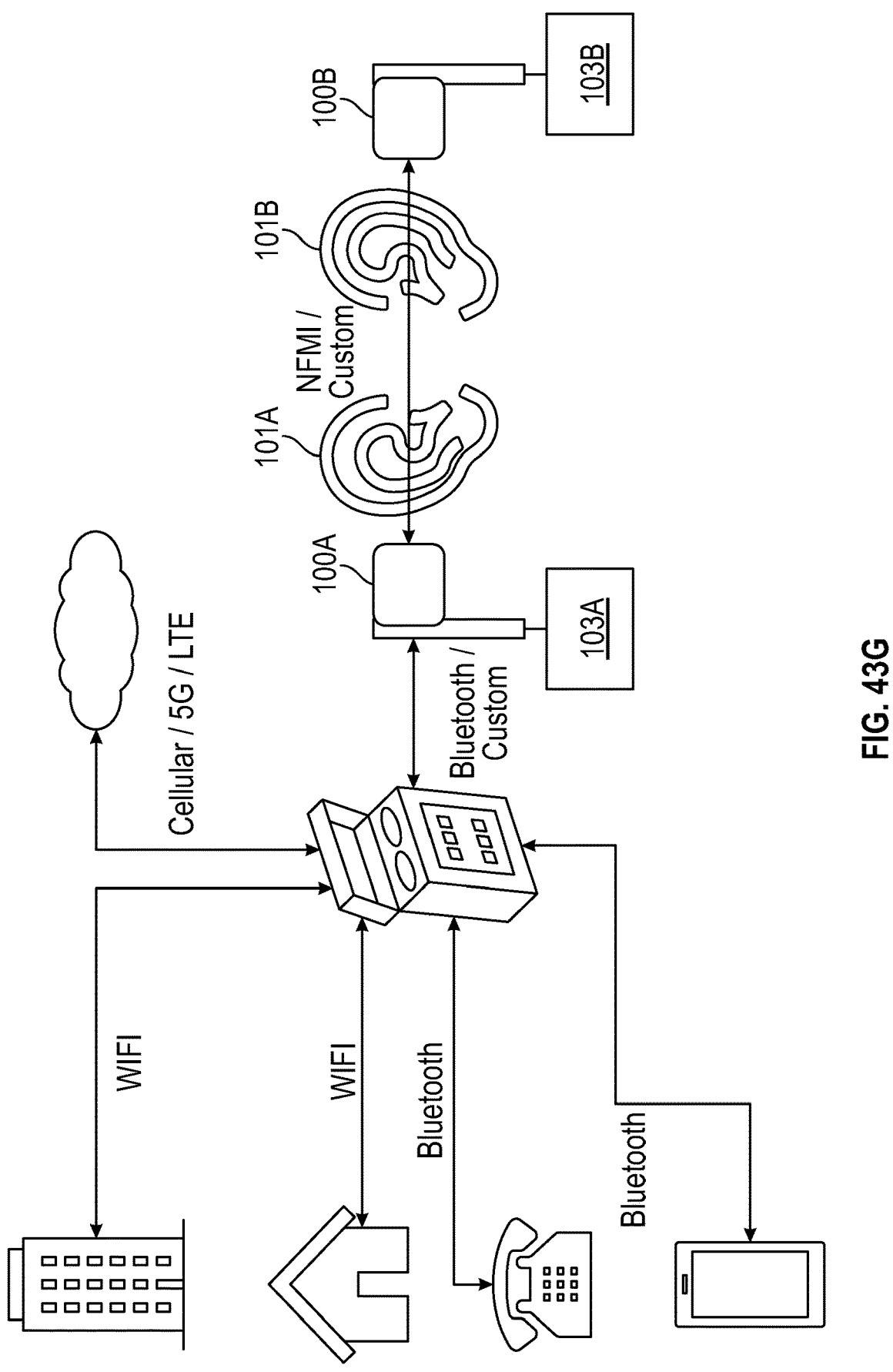
FIG. 43G illustrates an exemplary configuration for all the connectivity requirements to be placed in the smart charging pod, with a high data bandwidth connection using a custom protocol from the ear buds to the charging pod, according to some embodiments of the disclosure.

In some embodiments the multiple connectivity data paths will active simultaneously. The ear computer provides multiple data interfaces to connect to multiple peripheral connectivity components in a system. One configuration is for all the connectivity requirements to be placed in the ear device, as shown in FIG. 43F. A modified configuration is for all the connectivity requirements to be placed in the smart charging pod, with a high data bandwidth connection using a custom protocol from the ear buds to the charging pod. This is shown in FIG. 43G.

In some embodiments, the ear pieces may be included in a wire free architecture where there is no wire connection between the ear pieces. Instead, the user wears two independent ear pieces. The voice call functionality may be carried out in one or both ear pieces. The microphone signals from both ear pieces may be combined and processed to create a single audio data stream back to the electronic device (e.g., mobile phone, personal computer, etc.). Each ear piece may contain multiple microphones, internally and externally located.

In some embodiments, the audio system may use multiple microphones to capture the user's speech. In some embodiments, the microphones may be spatially separated, such as on each side of the user's head. The microphones may be binaural microphones that capture both the ambient sounds and the user's speech. Binaural microphones are programmed as pairs, one on each side of the user's head. Binaural signal separation may be used to separate out the ambient sounds and the user's speech. The location and number of microphones may be programmed such that the user's speech may be distinguishable from noise (e.g., acoustic noise and physical noise received at the microphones such as from wind).

The phone calls application of the disclosure may include several functions including noise reduction. The noise reduction function may be programmed to reduce or remove the noise in the auditory scene while maintaining or amplifying voice sounds. In this manner, people on the far end of the communications network can hear and understand the conversation, and the noise may not leak into the call, disrupting the conversations. The user may be able to control the amount of noise reduction applied to the noise using an electronic device. The noise reduction or cancellation may be applied when a user is talking through an electronic device and a communications network, for example.

In some embodiments, the phone calls application may process two or more distinct audio data streams. A first audio data stream may be included in the sound signals transmitted to the user's ear pieces, and a second audio data stream may be transmitted to the electronic device 406 (and/or to the communications network). The user may be allowed to control the content, levels, and processing performed on the user's voice during a phone call.

Another function may be acoustic echo cancellation or reduction. With acoustic echo cancellation/reduction, the leakage of the sounds from the loudspeaker being picked up by the microphones may be sent back through the communications network and removed.

The phone calls application may also include a gain control function that ensures that the speaker's voice is at a consistent level into the communications network. Additionally, an equalization function may ensure the speaker's voice has a consistent range of frequencies and large peaks and troughs in the frequency response may be avoided or reduced. The equalization function may also be used to adjust for issues with microphone frequency response.

Yet another function may be the side tone function. A signal picked up by the microphone(s) may be played back to the user when speaking so that the user can easily hear his or her own speech. The side tone function may reduce or remove the occlusion effect (e.g., Lombard effect) so it does not result in the user talking louder than normal. Indication of users talking level can be provided, such as a notification as simple as a beep, or a speech notification "talking level is high" that is played into the user's ear piece as a warning.

These function of the phone calls application discussed above may be used on the signal path from the microphone capturing the user's speech to the communications network. Additionally, one or more signal processors may be included on the signal path from the communications network to the user's ear pieces. The signal processors may be programmed to enhance the sound signals transmitted to the user's ear pieces. The enhancements may lead to a cleaner signal (e.g., due to noise reduction) and a consistent spectral and level balance of sounds (e.g., from the communications network). In some embodiments, multiple audio data streams may be received from a communications network. The multiple audio data streams may be from multiple endpoints and participants. The multiple audio data streams may be spatially rendered in the sound signals to each ear piece, where the spatial rendering may be based on user preferences.

In some embodiments, the phone calls application may spatially render sounds in the sound signals transmitted to the user's ear pieces, where the spatial rendering creates a virtual environment that is influenced by the real acoustic environment that user is experiencing. In some embodiments, the phone calls application may include a common virtual ambient sound space to be used for one or more participants in a multi-person communications call.

Figure 44A:
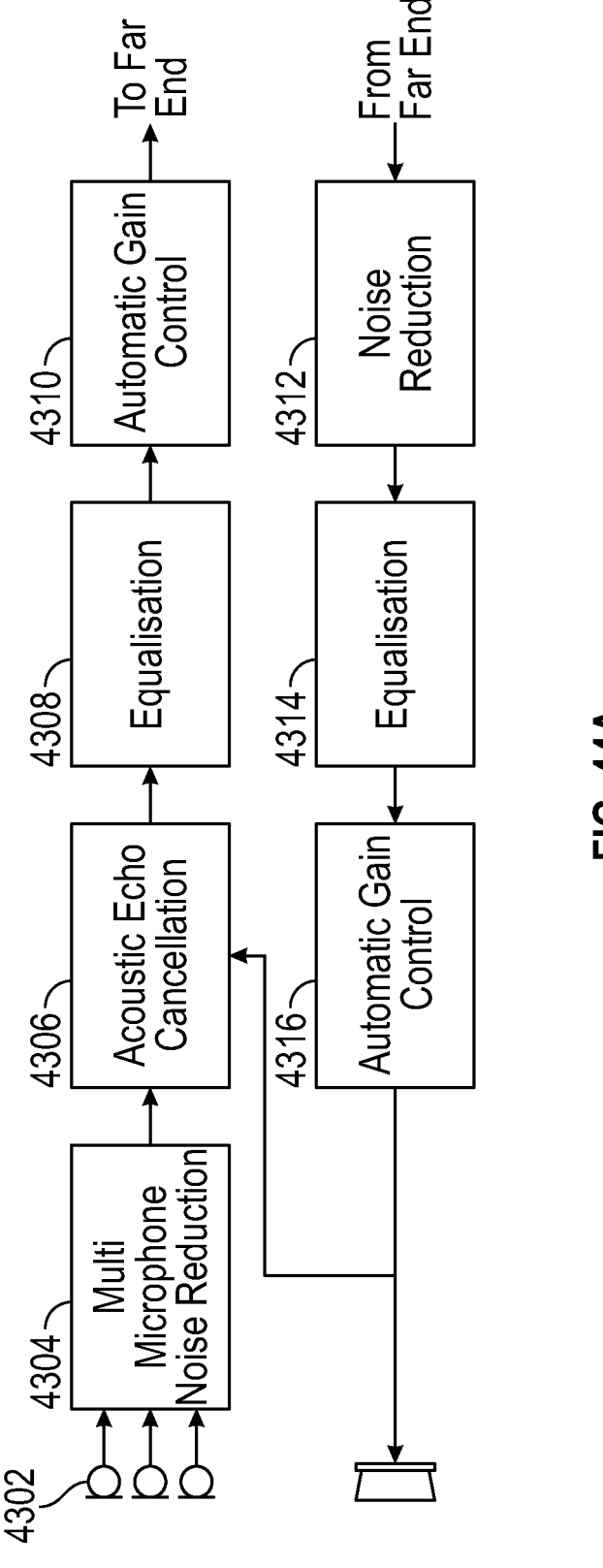
FIG. 44A illustrates exemplary basic signal processors, according to some embodiments of the disclosure.

Exemplary basic signal processors are shown in FIG. 44A.

In some embodiments, the phone calls application may use low latency signal processing to ensure a natural communications experience. Latency can have a significant negative impact on communications between people. A delay between a person speaking and the sounds being received by a remote listener can prevent natural communication. Some delay may be from the communications network itself, and some delay may be end-to-end delay from the endpoints. The low latency signal processing may be used in certain applications, such as video, where a delay between the visual cues provided by the images and the audio from people talking may be noticeable. Thus, embodiments of the disclosure may include minimizing additional latency introduced through the electronic device 406 with advanced signal processing.

Figure 44B:
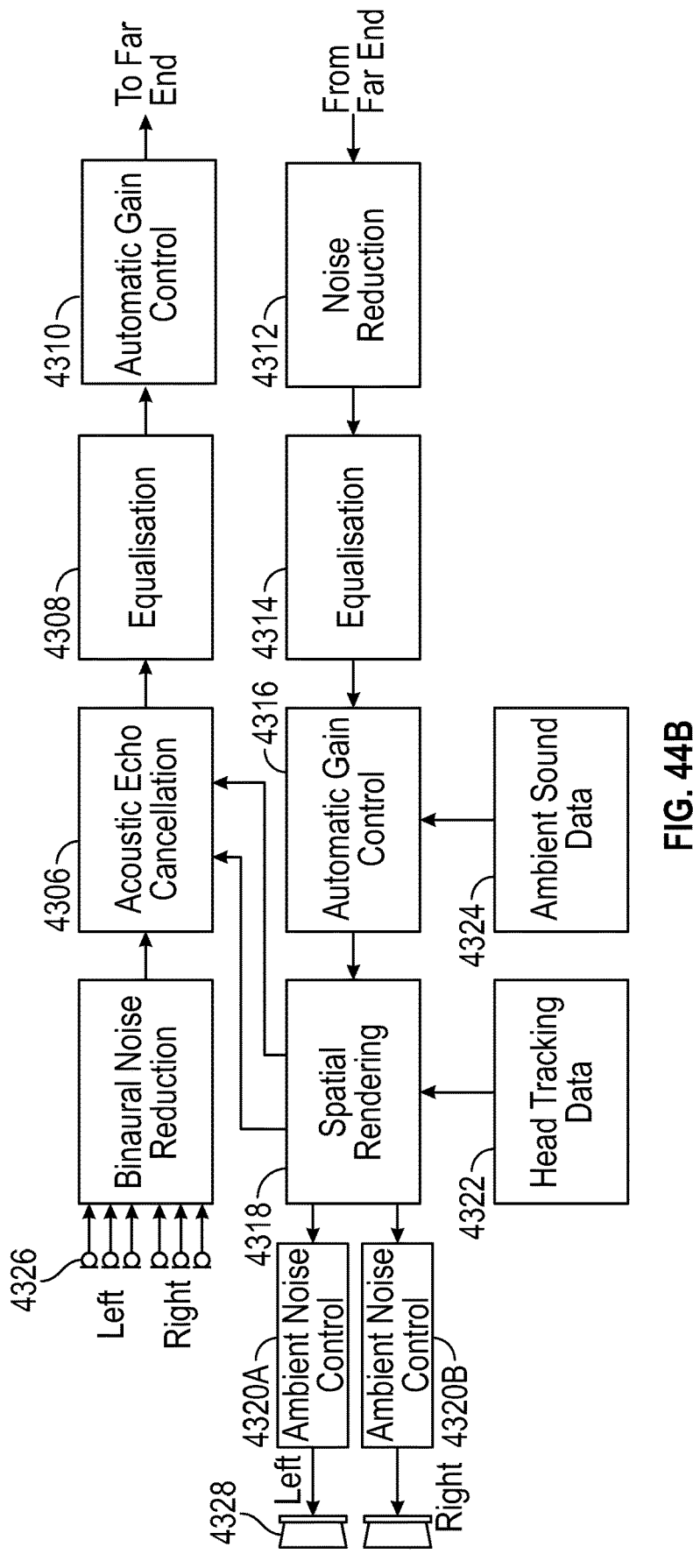
FIG. 44B illustrates an exemplary phone calls application included advanced binaural signal processors, according to some embodiments of the disclosure.

In some embodiments, the phone calls application may include advanced binaural signal processors, as shown in FIG. 44B. The basic voice processing application can be enhanced using additional signal processing that can be provided within the same plugin or as a separate plugin in the system. One extension is to use the binaural information of the acoustic environment that the user is located in. This can include the noise and talkers around them. The user may decide that some of the ambient sounds are classified as "background" sounds that they want to be aware of. Those sounds may inform the level control of the received speech information they are listening to from the communications network. Another extension is to use spatial rendering of the ambient sounds and the received speech stream from the communications network. This will be informed with head tracking information such that the received speech can be anchored to a location in the virtual space that makes sense for the listener, for example, away from other noise sources in the room. This would enable the listener to classify the received speech audio as "target" sounds. Further to this, ambient sound control processing may be used to eliminate sounds from the user's experience, for example, sounds that are classified as "noise."

Figure 44C:
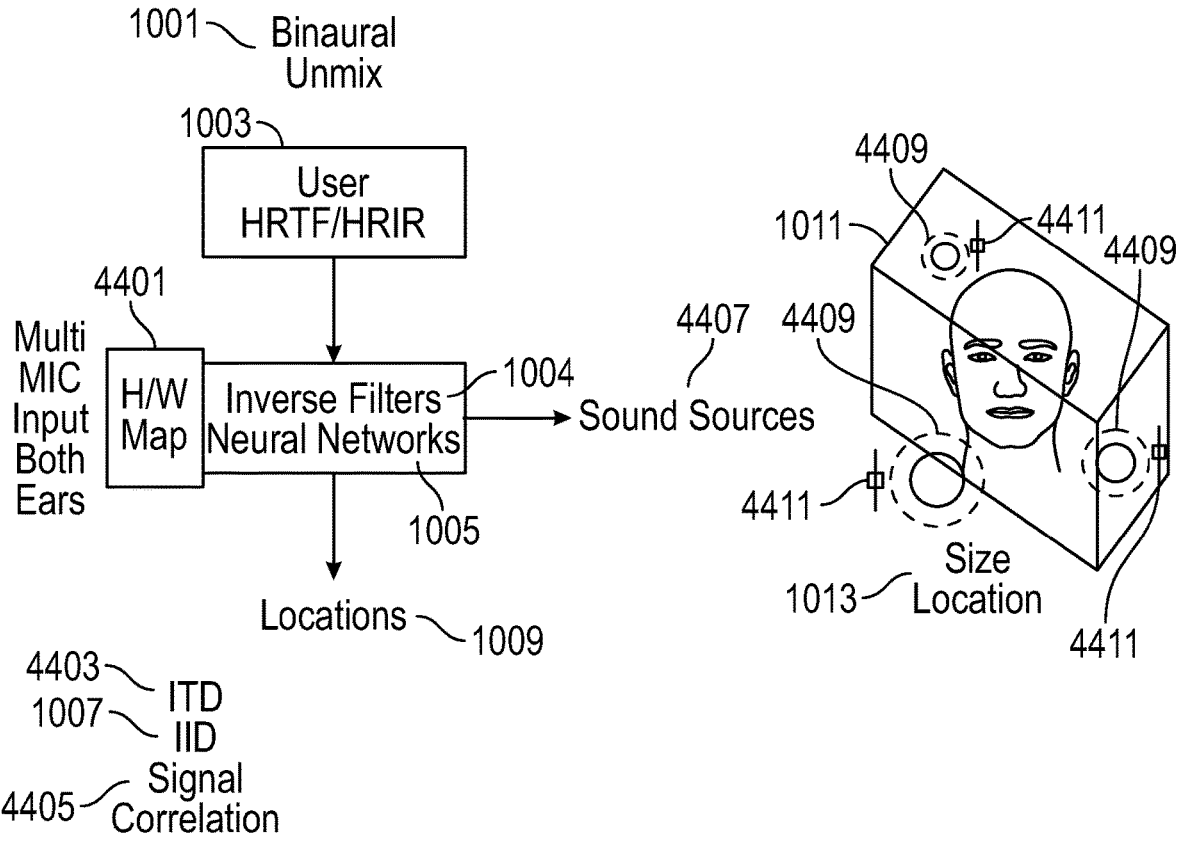
FIG. 44C illustrates exemplary capture and processing of binaural sounds to deliver useful information to the user, according to some embodiments of the disclosure.

Binaural capture for ambient sound processing: FIG. 44C illustrates the capture and processing of binaural sounds to deliver useful information to the user.

The embedded system 1001 captures binaural data from the two earbuds using multiple microphones as discussed previously. The microphones allow for an accurate indication of sound source location within the ambient sound. It is necessary to compensate for the physical hardware 4401 in order to ascertain which microphone signal is coming into the system and how the signal has been manipulated by the mechanical design.

The user also has HRTFs or HRIRs 1003 so that inverse filters 1004 can be created to process the signal. Since the signals derive from both ears, they can be correlated to examine the interaural time difference 4403, the interaural intensity difference 1007, and any signal correlation and spectral differences that is left over from other sounds 4405.

In addition to the inverse filters, neural networks 1005 can be trained to predict the location 1009 and source of the sound 4407 based on the particular combination of signal levels coming into the system from the HRTFs or HRIRs 1003. As such, the filtering and neural networks are combined into one processing unit, which can be a dedicated hardware macro that runs on the chip. Thus, before the signals travel into the main processor, they have already been analyzed by this engine to identify the location and intensity of the sound sources. These elements run within the embedded system in each ear.

The data is then transferred to the graphical user interface or the connected device 1011 which, for example, could be a representation of a head inside a 3D box. Each sound source is given a 3D position 4409 around the user that shows activity when a sound source is present at that location. The size of each 3D object 1013 may be used to demonstrate how loud that particular sound is. The user can then interact with the representations of each sound on the graphical interface, such as by pinching a sound smaller or larger depending on whether they want it to be quieter or louder. Alternatively, sliders 4411 may be used to adjust the volume of each sound. That information is then sent back to the embedded device 1001 so that it can identify the sound source that the user selects at a particular location and adjust the level of that sound when it enters into the rest of the processing chain. Therefore, the user is able to control the level of the sounds around them.

HRTF capture application: Another software application is HRTF capture, which involves gathering and processing information that is specific to a user that will enable later processing to assist with converting a stereo sound into 3D sound. The HRTF capture application may include playing a sound on an electronic device 406 (e.g., mobile phone or charging pod for the ear pieces), for example. A capture may include the user moving the electronic device 406 around the user's head while wearing ear pieces in the ears. Microphones in the ear pieces may pick up the sound emitted by the electronic device 406 as the user moves it around. The electronic device 406 may be able to monitor its location relative to the ear pieces using one or more sensors (e.g., camera, microphone included in the electronic device 406, etc.). In some embodiments, the electronic device 406 may provide information to the user related to the HRTF capture. For example, the electronic device 406 may use a UI 508 to provide the user with instructions on how to perform the HRTF capture. The instructions may include the speed of movement and the ideal location (e.g., a quiet place without much reverberation) for performing the HRTF capture. Additionally, in some embodiments, the UI 508 may display a graphic to show the user which parts of the area around the user's head have been captured.

In some embodiments, HRTF capture may include capturing two audio signals, one captured using a microphone on the left ear piece and the other captured using a microphone on the right ear piece. In some embodiments, the audio signals are captured from a location close to the entrance of the respective ear canal. The HRTF capture application may then generate multiple (e.g., three) separate output signals for each ear. In some embodiments, the HRTF capture application may include and/or use a binaural signal processing algorithm. The audio captured for the HRTF capture application is tagged with metadata describing the location of the sound source at regular time points during the recording, for example, every millisecond. In some applications, the ear piece may have multiple microphones located externally and internally. The HRTF capture application may use all available microphones to determine a better data set from which to calculate the user's HRTF. In some applications it may be required that user place the ear pieces on a table or within the charging pod, for example, to determine a reference signal from which the application can determine the actual impact of the user wearing the devices in their ears.

Using the sound signals communicated from the electronic device 406 to the ear pieces and/or the determined relative location, the audio system 100 may convert the sounds signals into 3D sound signals. In some embodiments, the ear pieces may emit sound signals that the electronic device may receive via one or more microphones. In some embodiments, the ear pieces may use HRTF information from another system. In some embodiments, a HRTF capture may involve multiple captures.

Figure 44D:
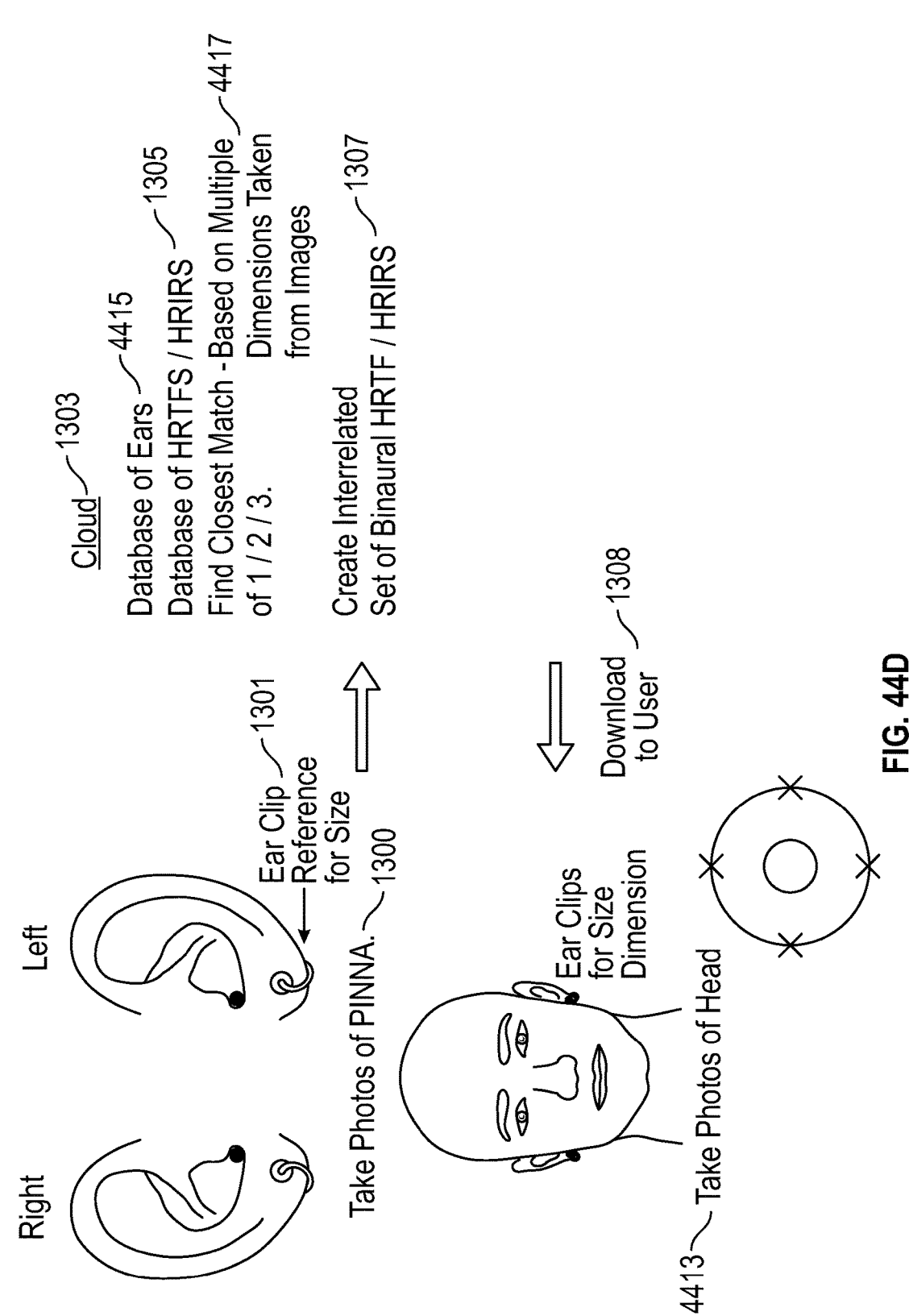
FIG. 44D illustrates exemplary capture of a user's ear-related, head-related transfer function, according to some embodiments of the disclosure.

In some embodiments, the HRTFs will be analyzed and matched by a cloud service or other offline service. FIG. 44D illustrates the capture of a user's ear-related, head-related transfer function.

It is first necessary to measure the dimensions, size, shape, and distance between the ears of a person. The user takes a photo of each ear with their camera 1300. There is a reference point, such as a small clip 1301 that the user attaches to each ear. Then, the user takes a photo from face view 4413 to ascertain the distance between the ears and the size of the head. The photos are uploaded to the cloud 1303 through an application provided on the user's mobile phone. Once the photos are uploaded, they are analyzed to gather other dimensions, such as the inside of the ear or the height of the ear, and are added to a database of ears 4415.

These dimensions are run through another database 1305 to determine if there is already a set of head-related transfer functions or head-related impulse responses that are a reasonable match for this particular user 4417. If there is no suitable match, the closest match is interpolated between one or several different sets of data based on the user's images 1307. The interpolated set is then sent back to the user 1308. The user then receives a questionnaire on the app to ask whether the set worked well for them and whether the ambient sound they listened to was a good match. If the match did not work well for the user, another interface on the app is provided that allows the user to move within the space defined by the HRTFs 1307. As such, if the user has a set of data points with their current HRTF set in the middle, the user can adjust this on the screen to one of the other locations.

Figure 44E:
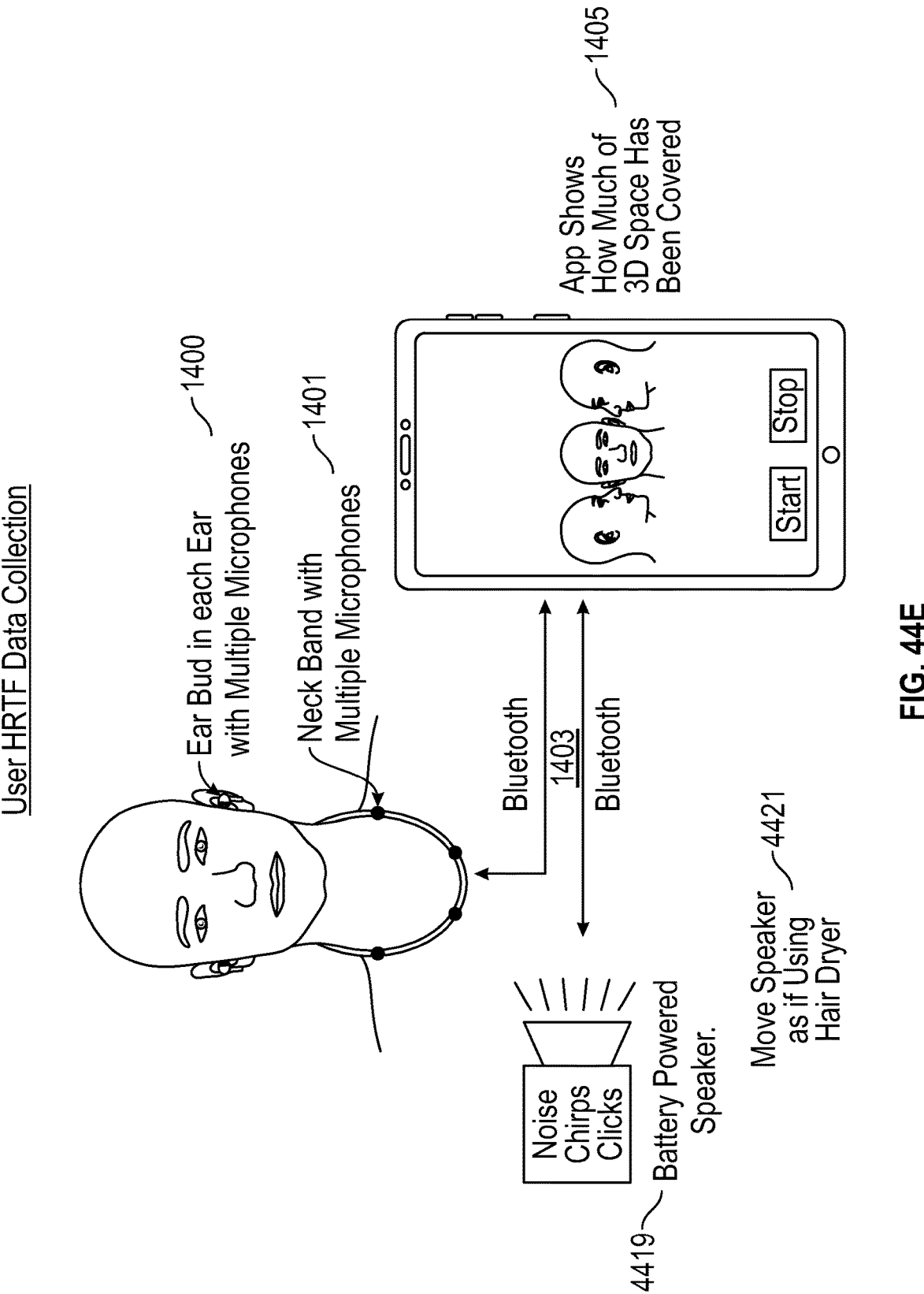
FIG. 44E illustrates the collection of the user's HRTF data, or HRIR data, according to some embodiments of the disclosure.

FIG. 44E illustrates the collection of the user's HRTF data, or HRIR data. This technology allows the user to replicate the quality of data collection in a well-conditioned laboratory from their home. The user is provided with two earbuds having multiple microphones on the outside, and the user places an earbud in each ear 1400. They are also provided a neck collar with multiple microphones located around it 1401 and a battery-powered speaker 4419 which acts as a reference speaker. All of these components are connected 1403 to a mobile app that controls the signals to and from these components.

The app prompts the user to start the test, which then streams test signals to the Bluetooth speaker. The Bluetooth speaker may also contain motion sensors to determine location relative to other components in the system and speaker orientation. The user moves the speaker using a motion similar to drying their hair with a hairdryer 1421. The user covers their entire head, reasonably slowly, while the microphone array is used to determine the location of the speaker relative to the microphones. The app identifies how much of their 3D space the user has covered 1405, either in a 2D representation or as a 3D model. The app allows the user to identify which areas have been covered and which areas still need to receive a signal from the speaker. Meanwhile, all of the signals are sent to the mobile phone, and from the test signal reference and the captured signals, a transfer function is calculated which depicts either the head-related transfer function or the head-related impulse response. After the data has been collected and the user has achieved full coverage, the user stops the test and the data is uploaded to a reference database in the cloud for further analysis and processing as needed.

Exemplary Framework

Figure 45:
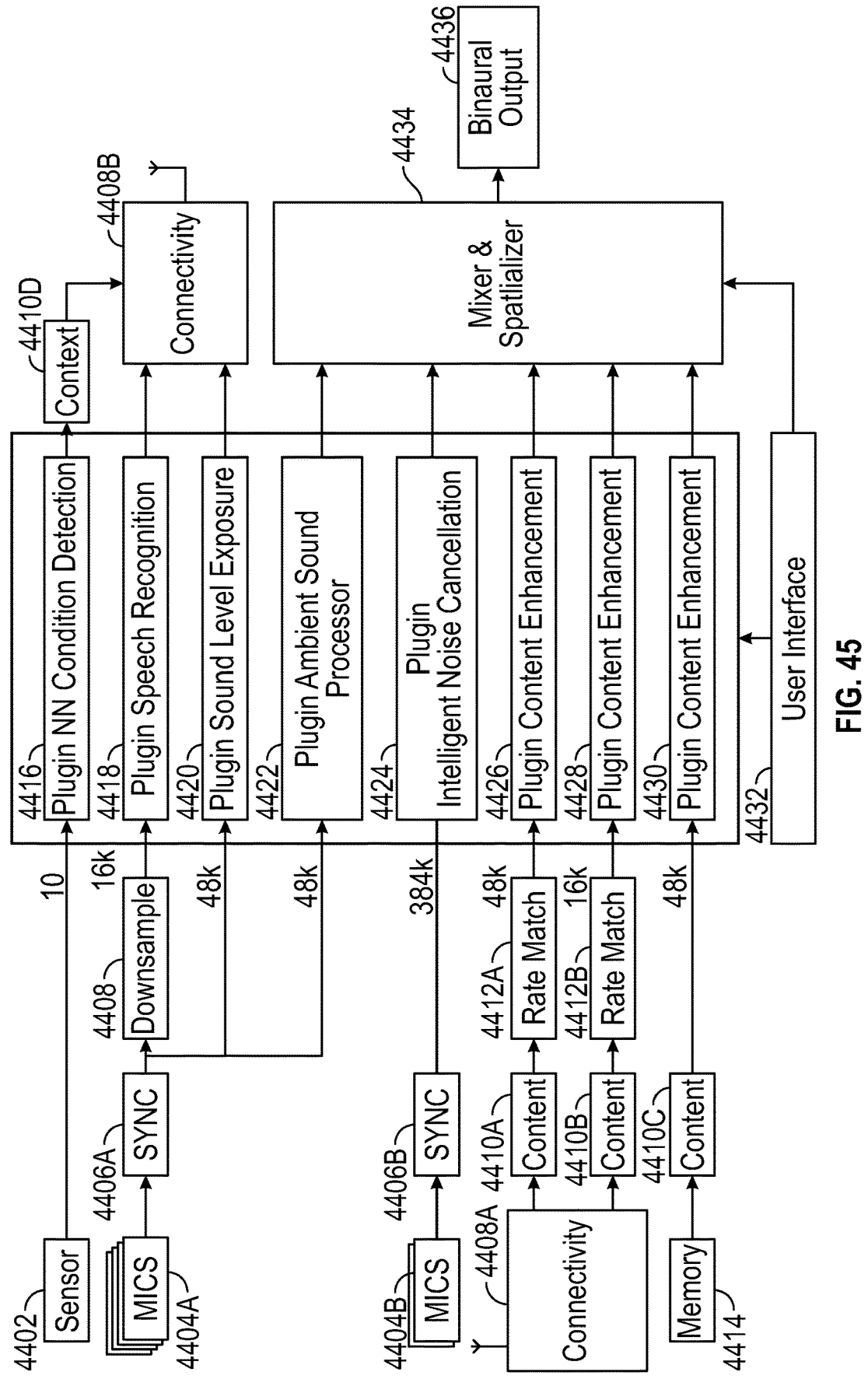
FIG. 45 illustrates an exemplary audio operation system may include a framework to simplify the audio data paths through the development platform, according to some embodiments of the disclosure.

The audio OS may include a framework to simplify the audio data paths through the development platform, as shown in FIG. 45. Simplification of the audio data paths can lead to easier development of plugins and processors. In some embodiments, the framework may be for an embedded development platform. In some embodiments, the embedded development platform may be used for binaural audio applications. The framework may include one or more components, such as connectivity 4408A and 4408B, content 4410A, 4410B, and 4410C, context 4410D, a UI 4432, a mixer and spatializer 4434, and a binaural output 4436.

In some embodiments the framework will enable products and endpoint devices to process audio streams only. In other scenarios, the devices may be configured such the framework enables only data from sensors. In other scenarios, the devices may be configured to only handle streams from other connected devices and external memories. In other scenarios, the devices may be configured such that the framework enables any combination of these data streams. The framework can be dynamically reconfigured during run time to change which streams are active or inactive.

The properties of the audio data paths can vary based on one or more factors. For example, an audio data path can be based on the latency requirements for propagating information from one end to another end in the development platform. One or more signal processing algorithms may benefit from very low latency (e.g., a few microseconds) signal processing. Examples of the disclosure may include making the audio data path shorter for low latency signal processing algorithms.

Another factor that may affect the properties of the audio data paths may be the block size of the audio data being processed. In some embodiments, an algorithm may use single sample processing. In some embodiments, an algorithm may be able to process large blocks of audio data at any given time.

Additionally or alternatively, the audio data paths may be programmed based on audio data width. Some algorithms may be able to perform signal processing on samples having narrow audio data width (e.g., 8 bits), while other algorithms may perform better with a higher fidelity (e.g., 32 bits).

In some embodiments, an audio data path may be adjusted based on the sample rate of the audio data. For example, an application (e.g., an application that obtains audio data a few times a minute or a few times an hour, such as biometric monitoring) or an algorithm may use very low audio sample rates (e.g., 8 kHz), and thus, the audio data path may for applications or algorithms may use moderate sample rates (e.g., 48 kHz). In some embodiments, an application or an algorithm may use high sample rates (e.g., 192 kHz) or very high sample rates (e.g., 384 kHz). This may also include data streams that do not contain audio data, but instead contain other information such as sensor data that may also require very low latency signal processing, such as head tracking, or low data rates such as a temperature sensor. Combinations of all these data streams must be supported at multiple data rates.

In some embodiments, the properties of the audio data paths may be based on dynamic range.

In some embodiments, the development platform may have multiple audio data streams, and the framework may be programmed to synchronize the audio data streams. Without synchronization, the analysis, processing, and rendering of binaural sound signals may be inaccurate, especially when components are communicating wirelessly. When communicating wirelessly, timestamps may be used to facilitate with synchronization. Even with timestamps, the latency for the sound signals may not match. The system framework provides the mechanisms to ensure data streams can be synchronized as needed.

Additionally, the audio system may ensure data rates and jitter among the sound signals match. In some embodiments, the multiple audio data streams may be synchronized with a common data rate. One or more rater matchers 4412A or 4412B may be used. Furthermore, the audio system may perform matching on the sound signals communicated wirelessly separate from matching performed on sound signals communicated via wired connections (e.g., fixed path for local audio data streams). The development platform may synchronize the audio data streams and match the data rates, jitter, and latency. In addition, the development platform may include an initialization sequence that is synchronized for the sound signals to each of the user's ear. In this manner, the audio data path from the microphone to a speaker may have the same latency. For example, one audio data stream may be associated with a low latency path, and the other may not. The two audio data streams may be synchronized such that their latencies are matched to a certain fixed latency.

The development platform may provide the ability and/or may perform the synchronization for starting and stopping audio data streams into and out of an application. For example, the development platform may synchronize four audio data streams when capturing signals from four microphones 4404A and 4404B, two for each ear piece, to determine the spatial locations of the ambient sounds. The four audio data streams may be synchronized at 4406A and 4406B to ensure the phase delays of the sound signals arriving at each microphone accurately represent the properties of the ambient sounds. Additionally or alternatively, when synchronizing the audio data streams, the development platform may synchronize with head tracking information (e.g., determined by a sensor 4402) to determine properties (e.g., position, orientation, etc.) of the user's head. In some embodiments, the development platform may synchronize the audio data such that sound signals are rendered to the ear pieces at the same time.

In some embodiments, the multiple audio data streams may have one or more different properties, such as data rate, latency requirements, sizes, etc. As discussed in more detail below, a system may be programmed to processing individual audio data streams such that the properties match. The methods for processing the individual audio data streams may be stored in libraries and are interfaced and accessed through an API, such as a macro (not shown) in hardware, or as instructions within a DSP. Embodiments of the disclosure may include the development platform being capable of allowing the user to adjust one or more parameters for one or more audio data streams. In some embodiments, the parameter(s) for multiple data streams may be adjusted at the same time in a synchronous manner.

In some embodiments, the development platform may store one or more audio data streams at different memory locations 4414 or in different memory formats. In some embodiments, the audio data streams may have different data rates and may be stored based on data rates. For example, a first audio data stream (e.g., used for a first plugin that uses sample-based processing with reasonable latency) may have a first data rate (e.g., 48 kHz) and may be stored at a first memory location with a first memory format. A second plugin may use the same first audio data stream, but may have a longer window for data analysis. The second plugin may store audio data in a different memory format (e.g., buffer of blocks of 2048 samples).

Embodiments of the disclosure may include extracting audio data from an audio data stream by down sampling using a downsampler 4408. A plurality of audio data streams may be extracted from fewer (e.g., a single) audio data streams. For example, a first processing plugin may use an audio data stream having a sample rate of 48 kHz, a second plugin may use an audio data stream at a second rate of 16 kHz and a third plugin may use an audio data stream having a third data rate (e.g., 8 kHz). The multiple data streams may be produced from a single input data stream where the first audio data stream may be down sampled (e.g., at 48 kHz sample rate) such that the data can be used to extract the samples at the second data rate (16 kHz sample rate) and the third data rate (8 kHz sample rate).

In some embodiments, audio data from first audio data streams may be merged and/or mixed into fewer (e.g., a single, multiple, etc.) second audio data streams. The first audio data streams may include multiple audio data streams. Additionally, the first audio data streams may be from different sources. In some embodiments, the multiple audio data streams have different data rates. Embodiments of the disclosure include merging/mixing in the digital or analog domain. For example, one or more first audio data streams may include a very low latency audio data stream that has a data rate of 384 kHz, and one or more second audio data streams may be processing audio data at 48 kHz.

Digital signals are used in many different audio systems and have the flexibility of being capable of being used in different audio path configurations. Thus, the development platform may be coupled to a digital mixer. However, the digital mixer may use the audio data streams to have the same data rate. Down sampling the first audio data stream(s) may increase latency, which is undesirable. Up sampling the second audio data stream(s) may use a lot of signal processing and memory, which may reduce efficiency. Thus, embodiments of the disclosure may include mixing the first audio data stream(s) and the second audio data stream(s) in the analog domain, and then converting the mixed analog signal to the digital domain.

In some instances, depending on the clock used to create the audio data streams, the audio data streams may not match each other. Audio data streams may have the same or different data rates. For example, a system may receive a first audio data stream having a 48 kHz data rate (e.g., audio data from an electronic device, such as a mobile phone, using a Bluetooth radio link). At the same time, the audio system may be retrieving and processing a second audio data stream having the same data rate from local memory. The first audio data stream and the second audio data stream may not match due to a mismatch in the Bluetooth source clock and the local audio data playback clock. In some embodiments, the audio data streams may be matched by controlling and processing all incoming audio data streams to match the clock of the recipient system. In this example, the first audio data stream may be processed and analyzed to determine whether it is running faster or slower than the audio system clock. Rate adjustment is applied using resampling techniques to match the sample rate of the incoming data with the rest of the system.

The audio system may be programmed to adjust the data rate of the incoming first audio data stream to prevent the buildup of audio data in a buffer, or to prevent the buffer from running empty. In some embodiments, the audio system may be programmed to make data rate adjustments when latency is not a major concern. Additionally or alternatively, the buffer size may be increased to make room used for adjusting the data rate of the incoming first audio data stream. In some embodiments, the audio system may analyze the content of the audio data stream and make adjustments accordingly. In some embodiments, the analysis may involve determining the date rate mismatch and may be performed when the data rate mismatch is consistent. The adjustments may be made during periods of silence or low amplitude audio in the audio data stream, for example.

In some instances, the audio data stream received by the audio system may have a specific system playback time. For example, multiple loudspeakers or ear pieces may be connected via wireless communications 4408A and receiving audio data from an electronic device (e.g., mobile phone). In order to have sounds signals that are synchronized, each component may receive audio data streams having data rates that match. Embodiments of the disclosure include configuring the audio system (e.g., the component that is communicating with all other components) as the one that makes the adjustments to the data rates of the audio data streams such that playback for each component in the system is synchronized.

In some embodiments, the audio system may not receive audio data streams in a regular, continuous manner. For example, some components sending audio data streams via wireless communications may send audio data when a certain block size has been reached, and thus, the audio data sent may be not be sent at pre-determined times. In some embodiments, the audio system may be programmed to manage the flow of audio data streams. In some embodiments, to manage the flow of audio data streams, the audio system may pause the receipt of an audio data stream while audio data is being retransmitted. Additionally or alternatively, the audio system may stop receiving audio data packets due to a loss of connection.

In some embodiments, the audio system may receive data not included in an audio data stream that is continuously transmitted and may synchronize the audio data stream. For example, a component may send data to the audio system only when a trigger event occurs. Exemplary components may include a smart microphone that waits for a key word before sending data or a motion sensor that waits for detecting a certain type of movement before sending data. In some embodiments, the trigger event may be user driven, such as when a user adjusts the settings or parameters for processing the sound signals. For example, if the user is adjusting the amplitude of the sound signals, the audio system may synchronize the gain changes and apply them to the sound signals to each ear piece at the same time. That is, the audio system may synchronize adjustments made to the sound signals. The synchronization may involve applying the adjustments simultaneously, with a certain delay between different sound signals, etc. In some embodiments, the audio system may be programmed to apply parameter adjustments and programmed information to binaural audio data streams simultaneously.

The transfer and synchronization of data streams to multiple devices will use confirmation messaging to ensure that parameter updates happen correctly. For example, the user may change the level of a sound source on a GUI. This information is sent to the left and right ear devices that are completely wireless. It is important that each ear device responds that they have received the message to change the correct parameter and that the requested time for the parameter change to happen is still possible and has not already passed. The confirmation can be passed back to the connected device and also to each of the ear devices to ensure each component in the communications network is informed. In some cases the one or both of the ear device may not receive a parameter change request. The GUI on the control device can inform the user that parameter updates are not getting through. The system needs to avoid the situation where parameter updates are only getting to one ear device to create an imbalance between the ear devices for the listener.

In some embodiments, framework may include a hardware rate converter that converts between standard input data rates and a configurable output data rate or vice versa. The hardware rate converter may also provide internal coefficients and customizable coefficients that can be uploaded into memory.

Additionally or alternatively, framework may include a hardware rate matcher that can match the data rates by inserting or removing processes. The insertion or removal of processes can include resampling audio data based on a configurable frame size. For example, to increase or decrease the latency in a frame of audio data having 16 samples, the hardware rate matcher may resample the audio data to create 15 samples or 17 samples.

Exemplary Plugins

The embedded software may include one or more plugins, each adding specific functionality to an application. In some embodiments, a plugin may be managed by the audio OS, framework, or both. A plugin may use a certain interface and may use certain resources, such as processing resources and memory. To manage a plugin, the audio OS/framework may use additional resources such as audio data buffers, connectivity layer(s), rate matching control, framework signal processing, etc. In some embodiments, a plugin may be digitally signed in order to reduce the risk of the plugin being copied. In some embodiments, the plugin is digitally signed for use by an individual and for a single end point device and for a specific silicon platform.

In some embodiments, the embedded software may include a plugin manager (not shown). The plugin manager may be a controller that is associated with an application and may be linked to the audio OS. In some embodiments, the plugin manager may be programmed to handle the setup, execution, insertion, and/or removal of a plugin. In some embodiments, the plugin manager may be programmed to select the plugin to be used for a given application. The selection may be made based on latency requirements, or resource usage requirements, for example.

In some embodiments, the plugin manager may receive a notification message from a connected device, the user interface of the device, another active plugin, another hardware module, another software module in the system, to activate or deactivate a plugin.

In some embodiments, a plugin may include proprietary software, proprietary hardware, or both. A plugin may also receive audio data streams, in addition to other types of data (e.g., data from sensors), not limited to audio data. Exemplary plugins may include, but are not limited to, plugin NN condition detection 4416, plugin speech recognition 4418, plugin sound level exposure 4420, plugin ambient sound processor 4422, plugin intelligent noise cancellation 4424, plugin content enhancement 4426, 4428, and 4430, for user preference processing and device specific processing, etc.

FIG. 46 illustrates an exemplary audio processing plugin, according to some embodiments of the disclosure. The audio processing plugin 4506 may be part of a system application 4504, which may be included in an audio OS 4502. The audio processing plugin 4506 may be software that couples a main processor 4508, a left audio preparation 4510, a low latency processor 4514, left data preparation 4512, data 4516 and 4520, and parameter processor 4518. Data 4520 may receive input from a connected device 4522. In some embodiments, the connected device 4522 may include a plugin GUI 4524.

In some embodiments, the plugin may be processing multiple data streams. In other scenarios it may be processing only data for a single device, such as a left ear piece. In other scenarios, it may be processing data for left and right ear pieces simultaneously. In other scenarios, it may be a standalone endpoint device that is not processing audio or is processing audio and sensor data simultaneously. The plugin architecture within the system enables plugins to be configured to utilize and available data streams depending on the processing needs within the plugin.

One exemplary audio processing plugin 4506 may be an interface to control the audio data in and out of an application. For example, a plugin may receive one or more first audio data streams 4526 as input and may output one or more second audio data streams 4528. In some embodiments, the first audio data streams 4526 may be different from the second audio data 4528 streams in terms of number of audio data streams, data rates, data formats, etc. The audio processing plugin 4506 may be programmed to perform audio data stream synchronization and/or conversion to generate the second audio data streams from the first audio data streams 4526. For example, the audio processing plugin 4506 may receive a first number of audio data streams and may output as second number of audio data streams, where the audio processing plugin 4506 performs a conversion to change the first number of input audio data streams 4526 to the second number of output audio data streams 4528.

In some embodiments, a plugin may operate independently from one or more other plugins. For example, the plugins may operate on different time frames. A first plugin may be running in real-time, while a second plugin may not be. The second plugin may instead run background tasks and may operate infrequently.

As another example, plugins may operate with different latencies. A first plugin may transmit audio data as fast as possible, whereas a second plugin may transmit audio data at a slower rate. A plugin may also be programmed to change its processing based on latency information. For example, a plugin may switch from block-based frequency domain processing to sample-based time domain processing.

In some embodiments, audio OS 4502 may schedule tasks for a plugin (e.g., transfer of audio data to an output that is periodic, that is based on latency, or that is triggered by interrupts).

In some embodiments, the OS may manage all tasks within a plugin which removes the need for all plugins to schedule their own tasks and manage the data streams, which can add significant complexity and duplication of functionality. The plugin will register tasks, for example as process nodes, with the OS. The OS will schedule the tasks and manage the resources and handle the data streams for each task as part of the global operations of the system. This reduces the need for developers to understand the data flow and scheduling of the platform, instead the developers can focus on the algorithms and performance of the end user experience for a device.

In some embodiments, multiple plugins can be connected together. The plugins connected together may pass audio data to each other. The audio data may be transmitted directly. For example, plugin may write audio data into a buffer, and plugin may read audio data from the same buffer. In some embodiments, one plugin can write audio data into a buffer, and multiple plugins can read audio data from the same buffer. In some embodiments, multiple plugins can write audio data into the same buffer, processing "in place", or mixing and combining with samples in the buffer, for one or more plugins to read audio data from the buffer. In some embodiments, the block size of data transfers may be adjusted between plugins to ensure low latency throughput.

In some embodiments, a plugin may be used for transferring audio data. Audio data transfer plugins can be used to change properties of audio data in a buffer, such as changing the sample rate, mixing audio data streams, splitting audio data stream(s), etc.

In some embodiments, the user platform may manage (e.g., synchronize) audio data streams input to or output from multiple plugins. In some embodiments, the audio data streams may be synchronized before being mixed together. The user platform may provide information related to the management of the audio data streams. For example, the user platform may provide error information (e.g., not enough input audio data from audio data streams to create output audio data) to a user. The user platform may also provide profiling information to show processor usage over time. For example, the profiling information may include the worst case processing load and how much audio data is to be buffered to avoid or reduce audio data flow blockage.

Another example plugin may be one that determines the processing load of other plugins, applications, or the like. The plugin may provide information to the user so that potential areas of optimization may be identified. The information provided may be related to the processing load of each component, how much processing resources are needed over time including memory profiles, how much memory is used, where memory is allocated to, whether there are any memory leaks, the amount of audio data flowing through the audio system, and the like. Embodiments of the disclosure can include performing steps to determine how much processing resources are needed over time. For example, memory leaks can be detected by filling memory locations with a known pattern and overwriting when it is freed; such steps may be executed in association with this plugin. Processing MIPS over time may be determined by showing average and peak computing usage. The amount of audio data flow through the audio system can be determined by tracking buffer levels and/or latency.

Yet another plugin included in embodiments of the disclosure provides tools and analysis specific to binaural signal processing and hearing applications. For example, a plugin may be developed to provide the user with a graphic representing a 3D image or 2D representation of sound signals to the user. The graphic may display time domain signals for the left ear and right ear, along with an amplitude spectrogram and phase information for each ear. In some embodiments, the graphic may also provide information such as the change in amplitude and phase for one more sound signals. Additionally or alternatively, information such as the estimated location of sound sources (e.g., based on HRTF capture) can be provided. In some instances, the user may be allowed to simulate the processed sound signals by, e.g., relocating a sound source or changing the level of a specific sound source, and the plugin 420 may display the simulated results.

Another plugin can be downloaded, activated and included in the system to gather and process sensor data. For example, the plugin may connect to head tracking sensor, such as IMU, and heart rate sensors and temperature sensor. The information from the multiple sensors is processed by the plugin and relevant information is sent to the connected device for display to the user. Sensor information is gathered over time and stored locally in the ear device. The data can be protected and access only provided with user permission (through biometric authentication for example), and only sent to connected devices when allowed.

The plugins may use multiple layers of processing. One layer may include audio data transfer and routing of audio input to the designated plugins. Another layer of processing may include feature and analysis preparation for a plugin. In some embodiments, multiple parallel plugins may be used to extract the audio data and metrics being used in the NN. An additional layer of processing may involve the NN engine, using the processed metrics as inputs. The NN engines may use coefficients for a target application and can process the audio directly or may be programmed as an analyzer to create a set of coefficients. Furthermore, resynthesis of the audio data from the processed NN output, along with packing, mixing, equalization, etc. of the processed audio data to the output stream may be processing layers.

Additionally or alternatively, when processing multiple sound signals (e.g., two sound signals, one to each ear piece), a different processor or plugin may be used.

In some instances, the NN may be performing analysis and creation of coefficients. The analysis may include analyzing the signal content from the microphone, and then updating the coefficients in a filter bank or block of biquads. This additional processor or plugin could be running on a separate processor. For example, the processor may be dedicated to ultra-low latency processor. The plugin processing may be distributed across multiple processing cores within the system, as determined by the OS to achieve the optimal performance, efficiency, latency etc.

Embodiments of the disclosure may include a plugin developer. The plugin developer may allow a user to develop plugins in a language such as C, Python, or Matlab. Once developed, the plugin may be copied or transferred to the simulation environment and then onto target hardware. Example plugins may be provided to demonstrate pass through of audio samples and basic processing, such as equalization filters. Standard audio functions may be provided as a library that can be used, such as FFT and other analysis functions, min, max, etc. In some embodiments, the plugins may be selected and/or programmed using an external application, a UI, or the like. Configuring the plugins may include synchronizing the parameters for multiple plugins. In some embodiments, the parameters for multiple plugins may be programmed independently. The plugins may be programmed to ensure low latency data flow of audio data. The plugins can provide metrics for the plugin developer to analyze and monitor to determine the optimal configuration for the target application.

The simulation environment can use audio files for the audio data in and out of the simulation environment. The same audio files may be streamed to the audio system and then captured back for comparison with a reference instruction set. The simulation environment may allow multiple streams of audio data, whether from files or from real-time sources connected to the development platform.

In some embodiments, plugin parameters can be updated while the development platform is running. This allows the plugins to be deployed and evaluated for testing in real world scenarios with typical users of the system. Exemplary plugin parameters may include new coefficients for filters or gains for mixing. The plugin can generate metrics and debug information that can be extracted by the simulation software or the real-time running audio system. The plugin developer may allow the user to transmit and receive audio data into and out of the audio system for analysis. The plugin developer may also allow the user to interact with the audio system or the simulation software by, e.g., pressing buttons or other control inputs to cause updates and parameter changes. For example, the plugin developer may allow the user to change the output level or switch modes of operation.

Another type of plugin that may be included in the audio system is an audio enhancement plugin. The audio enhancement plugin may receive multiple input audio data streams and generate binaural, dual output audio data streams. In some embodiments, the audio enhancement plugin may receive multiple input audio data streams and spatialize the audio data streams into a 3D rendering. In some embodiments, the audio enhancement plugin may change one or more properties (e.g., frequency, phase, etc.) of the audio data stream to compensate for imperfections and variations in the acoustic components (e.g., microphones, loudspeakers, etc.) in the audio system. The input audio data streams may also be enhanced based one or more factors including, but not limited to, the acoustic capabilities of audio system, the user's preferences, the user's hearing profiles, the environmental conditions, the ambient sounds the user is exposed to, biometric information, sound level exposure, and the like. The enhancements may be performed dynamically. In some embodiments, the enhancements may be influenced and based on noise cancellation processing or other output adjustment processing that is applied downstream from the enhancements.

Exemplary Algorithms

Signal processing can include processing of passive signals from the scene and processing of active signals (e.g., delivered from or through electronic devices). Passive signals from the scene can include ambient sounds from weather (e.g., wind or rain), nature (e.g., birds tweeting, dogs barking, cars moving, etc.), and background noises (e.g., from other conversations, live music, etc.). Active signals can include signals delivered directly to the user, such as live streaming, notifications, voice assistant, phone calls, etc. Alternatively, the passive signals can be categorized as real world signals captured from the user's environment. The active signals can be categorized as virtual signals delivered from devices to the user's ears.

Passive signals may be processed differently from active signals. In some embodiments, both passive signals and active signals may be processed by the algorithms, but may be processed differently. The sound processing algorithms may perform sound processing on both types of signals simultaneously.

Embodiments of the disclosure may include one or more algorithms used to process sound signals: ambient sound processing enhancements, binaural signal processing, binaural scene analysis, binaural spatial intelligent active noise reduction, binaural signal processing for conversational speech (in-person), binaural signal processing for speech communications, binaural signal processing for speech enhancements, binaural signal processing for direct communications, binaural occlusion effect reduction, binaural rendering enhancements, binaural scene manipulation, binaural signal level processing, binaural spectral content processing, binaural hearing enhancements, binaural hearing profile processing, binaural hearing test, binaural tinnitus masking, binaural misophonia reduction, sound level exposure, hearing protection, acoustic shock protection, and NN-based hearing enhancements. Each algorithm is discussed in turn below.

Ambient sound processing enhancement algorithm: An ambient sound processing enhancement algorithm performs signal processing of sounds that a user is exposed to, where the sounds may originate from the auditory scene. In some embodiments, the ambient sound processing enhancement algorithm treats natural sounds differently from artificial or virtual sounds (e.g., sounds from an electronic device, such as music being played and audio from a phone call). The ambient sound processing enhancement algorithm is capable of performing signal processing on both natural sounds and artificial sounds simultaneously. Additionally, the ambient sound processing enhancement algorithm separates the sound signals transmitted to the left ear piece differently from the sound signals transmitted to the right ear piece, thereby delivering accurate sound signal representative of the properties of the sound source(s). The ambient sound processing enhancement algorithm can, for example, allow the user to adjust the level and spatial location of individual sounds in the ambient environment.

Binaural signal processing algorithm: A binaural signal processing algorithm performs signal processing of sound signals such that the sound signals reflect the properties (e.g., relative location of the sound source) of natural sounds. The binaural signal processing algorithm may be programmed to detect and modify auditory cues to improve the sounds experienced by a user. The modified auditory cues may represent the perceived spatial locations of the sound sources to increase the separation and content of sound signals. In some embodiments, modifications of the auditory cues applied to the sound signals delivered to the left ear piece is also applied to the sound signals delivered the right ear piece, although the modifications may not be identical. For example, for a sound source that may be located closer to the left ear, the sound signals to the left ear may be amplified more than the sounds signals to the right ear. The placement and adjustment of spatial location, which in turn leads to modification of the spatial cues, can be provided by user input from a connected device, or by other plugins within the system, or other external elements such as information from the ambient environment or other from other sensors.

The binaural signal processing algorithm may process audio data streams for the left ear piece and the right ear piece together or separately. In some embodiments, the processing of the audio data streams to the different ear pieces may occur simultaneously. The audio data streams may include sound signals transmitted to each ear piece (left ear and right ear) of a user. The audio data stream for each ear piece may include audio data from the respective microphone, for example. In some embodiments, the two audio data streams are used for HRTF capture, as discussed above.

The binaural signal processing algorithm of the present disclosure may synchronize the sound signals transmitted to each ear piece to avoid or reduce any mismatches in auditory cues. Mismatches in auditory cues to different ear pieces may lead to sounds that may be unnatural to the user and may cause confusion. For example, if a user is listening to a person speaking located closer to the user's left ear (than the user's right ear), any mismatch in auditory cues may cause the user's brain to believe the person speaking is located behind the user or to the user's right.

In some embodiments, the binaural signal processing algorithm includes processing the sound signals in the frequency domain and the time domain. The frequency domain and the time domain processing may be synchronized. The audio data from the frequency domain and time domain processing may be analyzed after being processed. In some embodiments, this audio data may be analyzed separately and then audio data tiles may be updated.

The capture, processing, and rendering of the two audio data streams may be such that the latency is reduced and synchronized, for example. The ITD is related to the localization of the sound signals. Different ITDs may lead to the human brain believing the sound source is at different locations. A sound signal with varying latency may cause the ITD to change unexpectedly. In some embodiments, the audio data stream(s) to each ear piece may be have a sound signal with fixed latency.

In some embodiments, the binaural signal processing algorithm may associate timestamps with each of the audio data streams. The timestamps may be the time at which the audio data stream is captured. This time may be related to the time of playback of the captured stream and other audio streams in the system, in some embodiments.

In some embodiments, the timestamp(s) for the audio data stream(s) to the left ear piece may include the same time as for the right ear piece. In some embodiments, the timestamp(s) are also associated with sensor data gathered within the system, such as for head tracking, temperature monitoring or heart rate information. In some embodiments, the timestamps may be associated with a target playback time, which may be based on the capture time and the targeted latency. In some embodiments, the capture, processing, and rendering of the two audio data streams may be such that the target playback time is met.

Figure 47:
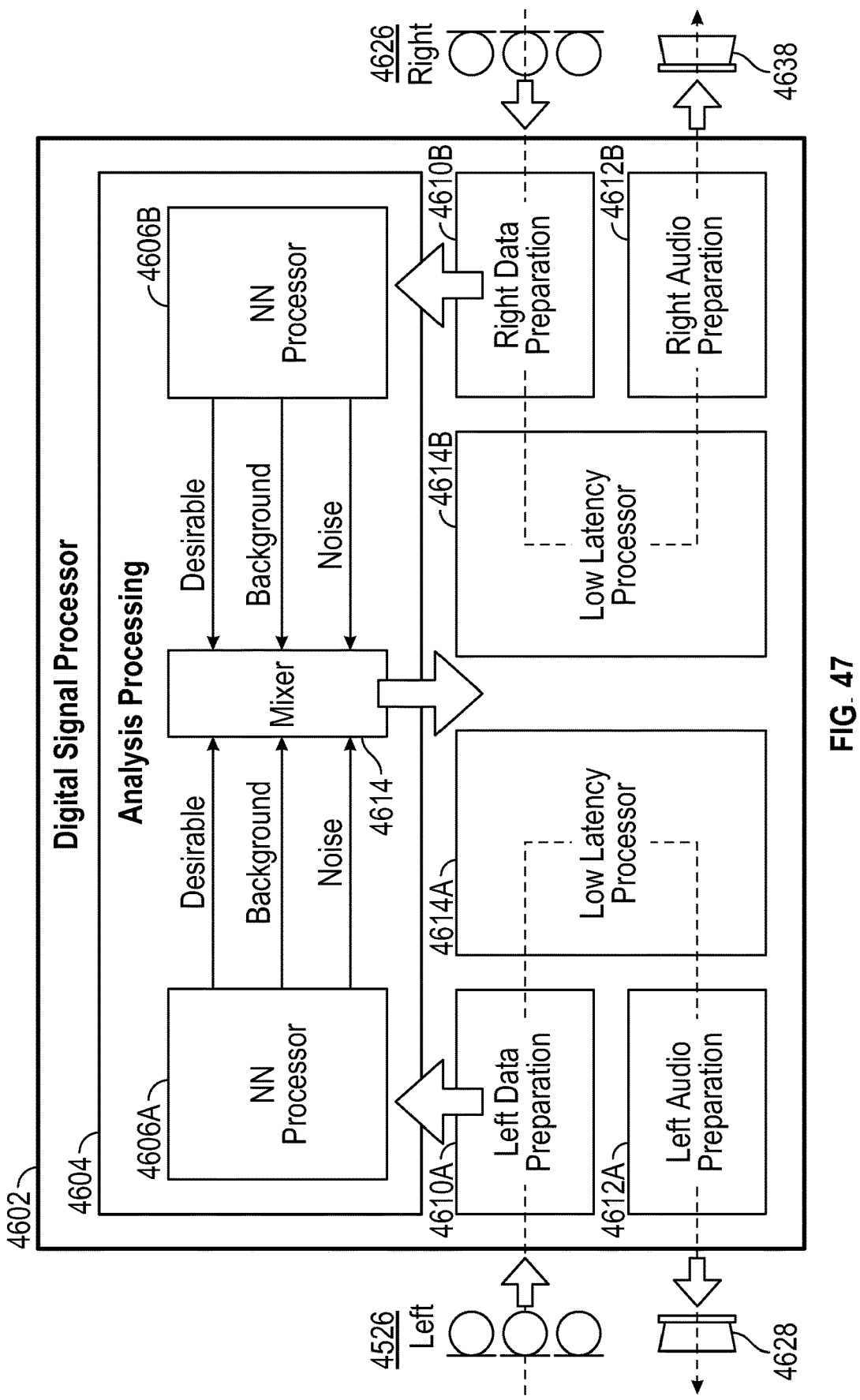
FIG. 47 illustrates a diagram showing exemplary binaural processing, according to some embodiments of the disclosure.

FIG. 47 illustrates a diagram showing exemplary binaural processing, according to some embodiments of the disclosure. A binaural scene analysis algorithm is used to determine the location of a sound source. In some embodiments, at least two audio data streams may be used to determine the dominant sounds within a mixture of sounds and their locations relative to the user. These audio data streams may be generated using at least one microphone device that is capable of providing at least 2 audio data streams with signal separation, or alternatively an array of at least 2 microphones. In some embodiments, the at least one microphone is included in at least one ear piece.

In some embodiments, multiple microphones may be used to determine the location of a sound source. The microphones 4526 and 4626 may be located such that ambiguities between the sound signals are removed or reduced. For example, the microphones 4526 and 4626 may be spaced apart (e.g., separated by the distance between the user's left ear piece 4628 and the right ear piece 4638, when worn appropriately) to create a time difference (phase and arrival time) and amplitude difference, between the sound signals from the microphones. As another example, the microphones 4526 and 4626 may be located such that there is an amplitude difference, for example between sound signals originating from the front of the user compared to behind the user. In some embodiments, a mechanical structure (e.g., a head worn device) may be used to locate at least one microphone in front of the user and at least one microphone behind the user.

In some embodiments, an ear piece may include two microphones, one located closer to the front of the user and one located to closer to the back of the user (e.g., rear microphone). The ear piece may also include an intentional acoustic barrier that introduces additional sheltering to the rear microphone for sound sources located in front of a user. This acoustic barrier may be used to help the two microphones capture sound signals to determine whether the sound source is located in front of the user or behind the user.

The relative locations of the sound source and the user may be determined with different levels of granularity. For example, the relative location may be based on approximate azimuth locations of sounds. In some embodiments, the binaural scene analysis algorithm may be capable of determining a relative distance between the sound source and the user based on the ratio of direct to reverberant sounds.

The binaural scene analysis algorithm may also use additional information measured by, e.g., a microphone and/or display of an electronic device to help with front and back ambiguities. Additionally or alternatively, the microphone on the left ear piece, right ear piece, or both may be used to differentiate between sounds having the same ITD and IID that originate from in front of or behind the user.

Figure 48A:
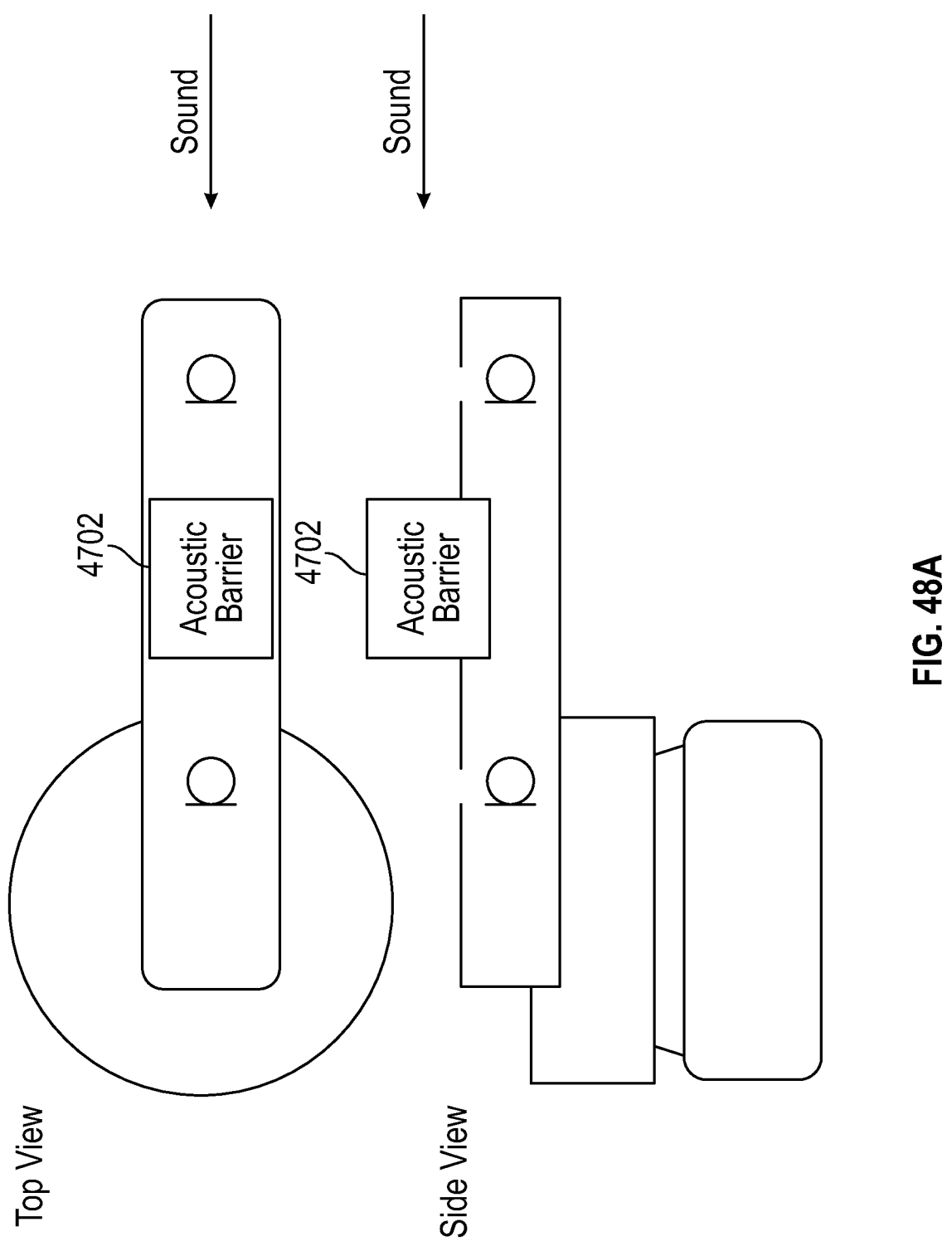
FIG. 48A illustrates an exemplary mechanical shield placed behind at least one of the microphones to increase the contrast between the sounds located in front of and behind the user, according to some embodiments of the disclosure.

In some embodiments, a mechanical shield may be placed behind at least one of the microphones to increase the contrast between the sounds located in front of and behind the user, as shown in FIG. 48A. For example, as shown in the figure, the ear piece may include an acoustic barrier 4702.

The measured audio data from the microphone and/or display may be communicated to an electronic device. The electronic device may analyze the measured audio data to determine the location of the sound source. In some embodiments, the location information may be provided to the user.

Figure 48B:
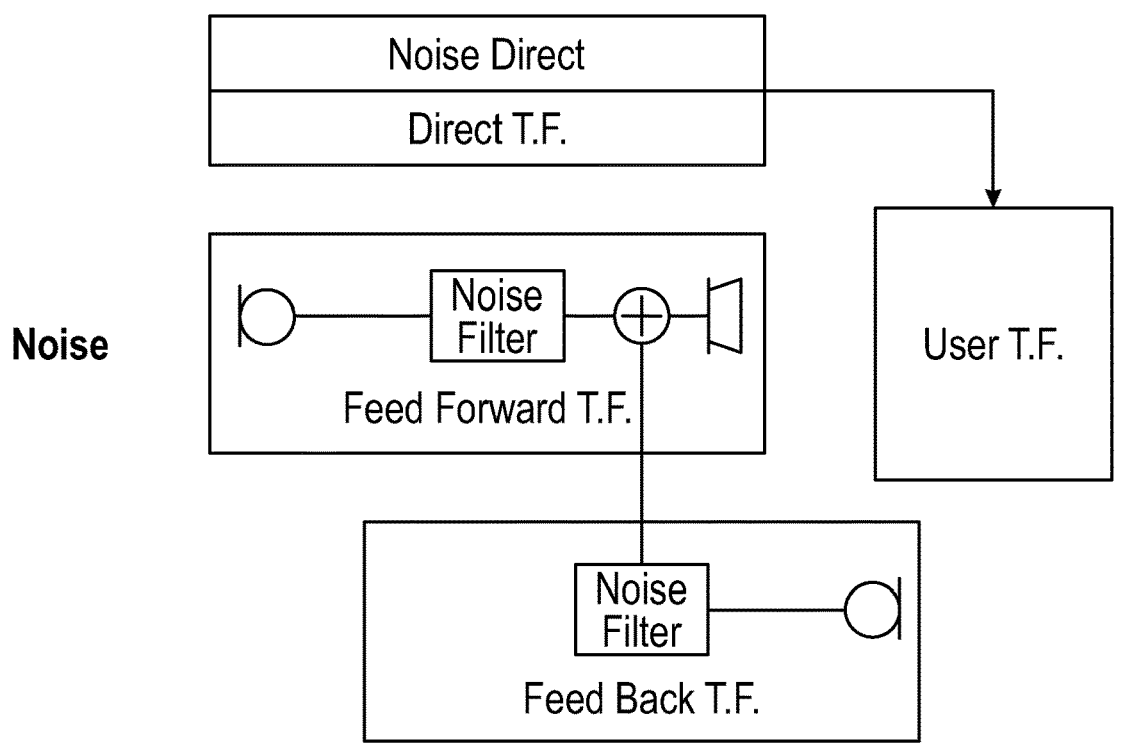
FIG. 48B illustrates an exemplary typical active noise cancellation algorithm for removing all natural or ambient sounds in the sound signals using very low latency signal processing, according to some embodiments of the disclosure.

Binaural (spatial) intelligent active noise control (ANC) algorithm: A typical active noise cancellation algorithm attempts to remove all natural or ambient sounds in the sound signals by using very low latency signal processing. The very low latency signal processing involves creating a signal that matches the amplitude of the signal representative of the external sounds (to be removed), but with an inverted phase. The sum of the two signals may theoretically cancel when acoustically combined inside the user's ear canal. However, in doing so, all sounds are canceled with no user control to keep some sounds and remove others. This is shown in FIG. 48B. This illustrates that there are multiple signal paths that are important along with some models of the acoustic transfer functions that need to be considered. When the user is wearing an ear worn device, it introduces a change in the ambient sound reaching the user's ear canal caused by the passive attenuation of sounds of the device itself. Depending on how the device fits onto or into the ear canal this can provide significant noise reduction. This can be classified as the direct transfer function. There is also a user transfer function, which is the description of how the sounds are altered by the physical properties of the user's ear canal and ear shape when the device is worn.

Transfer functions for the multiple signal paths through the system can be measured at the time of manufacture and stored as calibration data in the device. The transfer functions can also be measured by the user when the device has been purchased, for example by using a charging pod for storing ear buds, or a specific carrying case for headphones. This can be used to recalibrate the device. The device can also be calibrated while the user is wearing it. The multiple microphones and speakers are used to generate and capture test signals that inform the system of the changes in transfer functions between factory, storage and user modes of operation. Differences in the transfer functions can be used to inform the noise cancellation filters to improve their performance.

A feedforward microphone may be used to capture the external sounds (e.g., sounds located outside of the user's ear canal) to be removed. The feedforward noise cancellation is used to create the sound signal that will reduce and residual sounds that remain after the passive noise reduction. This is achieved by capturing the ambient noise signal and filtering it such that the new processed signal will combine with the residual noise signal and cancel it out, using a phase inversion. The feedforward signal path also has a transfer function based on the components in the headphone device.

A feedback microphone may be placed in the ear pieces to capture the sounds being heard by the user (e.g., representative of residual sound that may need to be removed). In some embodiments, a feedback microphone may be located in the user's ear canal such that it captures sounds that have passed through to the user's ear. A signal processing filter is designed to use the signal captured from the feedback microphone and create cancellation signal with the aim of reducing any residual noise even further. This signal path also has a transfer function from the feedback microphone to the loudspeaker The feedback microphone may be an internal microphone that measures the actual internal sound level for the binaural intelligent active noise control algorithm. The signals from the feedback microphone may be compared to the noise levels measured by the feedforward (e.g., external) microphone. The difference between the signals from the feedback microphone and the feedforward microphone may be used to determine the performance of the binaural intelligent active noise control algorithm. For example, a noise reduction metric can be used to indicate how much noise the binaural intelligent active noise control algorithm removes, and a playback reduction metric can be used to indicate how much content playback level has been reduced.

In some implementations the device may contain a vibration sensor or other form of sensor that is used to provide additional information to the noise cancellation processing component. For example, in some devices the external microphones are mounted on the device such they do not pick up vibrations caused by the loudspeaker in the system. This prevent echo feedback signals causing issues for noise cancellation and phone call use cases. However, a vibration sensor can be used to detect if the device is impacted by additional external signals, such as the vibration of the headrest on an airplane. This may not be detected by the microphones. The vibration signal can be captured and used to further reduce the sound entering the user's ear canal when wearing the device.

Signal processor filters may be used to match the spectral changes that occur between the location of the feedback microphone and the actual sounds in the user's ear canal. The filters are then used to reduce or remove the residual sound. However, in many typical implementations of active noise cancellation, these filters are static and not adaptable due to having pre-determined settings. The intelligent filters may include adaptive filters that track the sounds being cancelled, the analysis and update of the filters can be determined independently of the processing signal path.

Figure 48C:
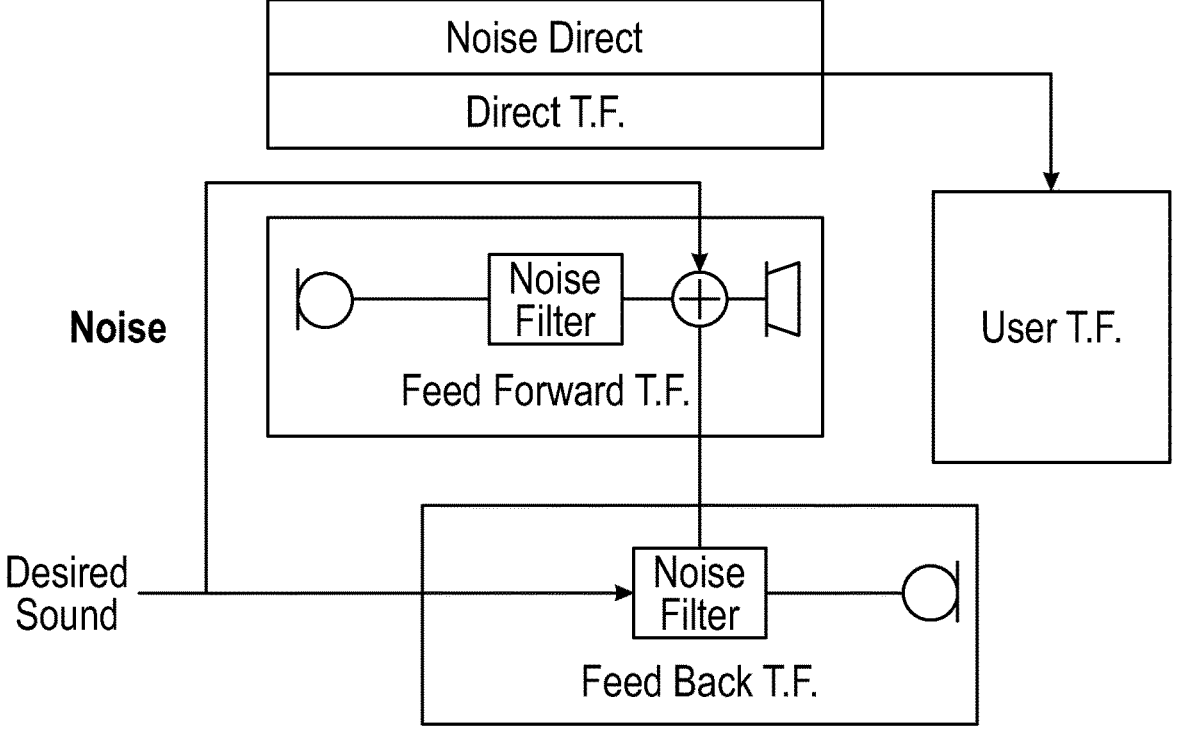
FIG. 48C illustrates an exemplary binaural intelligent active noise control algorithm controls the ambient sound signals that are transmitted to the ear pieces, according to some embodiments of the disclosure.

In some instances, the user may want to hear certain sounds. For example, the user may want to remove airplane noise from the ambient scene, but may still want to hear music playing through the ear pieces, or take part in a conversation with a person sat next to them. The binaural intelligent active noise control algorithm of the present disclosure controls the ambient sound signals (e.g., noise with desired signals) that are transmitted to the ear pieces. This is shown in FIG. 48C.

Embodiments of the disclosure include producing target sounds (e.g., music to be played), and then mixing the target sounds with a noise cancelling/reduction signal. Before mixing the target sounds, the signals may be pre-processed such that the inverse of the noise cancelling/reduction processing is applied to produce the combined desired signal and noise cancelling/reduction signal. The pre-processing can be applied to the desired signal, the feedback noise signal or a combination of both. The resultant mixed sound signals may be further processed such that it has certain properties (e.g., amplitude), based on user preference or other system metrics.

In some embodiments, a first hardware may be programmed to produce the target sounds, and a second hardware may be programmed to produce the noise cancelling/reduction signal. In some ear devices, there may be multiple speaker drivers used for improved output audio performance. For noise cancellation applications, the drivers can be used to produce independent sounds that are based on frequency bands or signal content. Devices may intentionally use multiple drivers to cope with noise cancellation applications. As an example, an ear piece may contain four independent speaker drivers. One for the low frequency desired signals, one for the low frequency noise reduction signals, one for the high frequency desired signals, one for the high frequency noise reduction signals. The outputs of the audio streams to the speakers will be mixed acoustically in the user's ear canal. The output signals can be independently controlled, analyzed and filtered to each independent speaker driver.

Pre-processing the target sounds may include applying a gain, and then applying noise cancellation/reduction filters, such that the amplitude of the resultant desired sound signal is not increased by a significant or noticeable amount. The intent of the pre-processing and any compensation gains that are applied is to ensure that the feedback noise reduction filter is able to create a processed signal using two or more input reference signals, such that the resulting signal reduces noise signals and maintains desired signals. The gain may be applied at low frequencies of the target sounds, determined by the effective bandwidth of the noise cancelling filters, which is typically limited by the latency of the system. After the noise cancellation/reduction filters are applied, the gain may be removed due to the noise cancelling processing, resulting in the desired signal being at the target output level. In some embodiments, parameters updates may be applied to both pre-processing and post-processing such that the parameter updates are synchronized.

The noise reduction system may use filter banks to apply different filtering and processing for different frequency bands. The filters may include time domain filter banks, frequency domain filter banks, or both. The type of filter banks used may depend on one or more requirements such as latency or processing accuracy or frequency resolution. For example, the time domain filter banks may be used to meet certain latency requirements. The time domain filter banks may be used for ultra-low latency processing of band separated signals. The frequency domain filter banks may be used for additional analysis of the signals. For example, an NN engine may use the time domain filter banks to separate sounds to determine which sound components are to be removed and which components should be passed through.

Figure 48D:
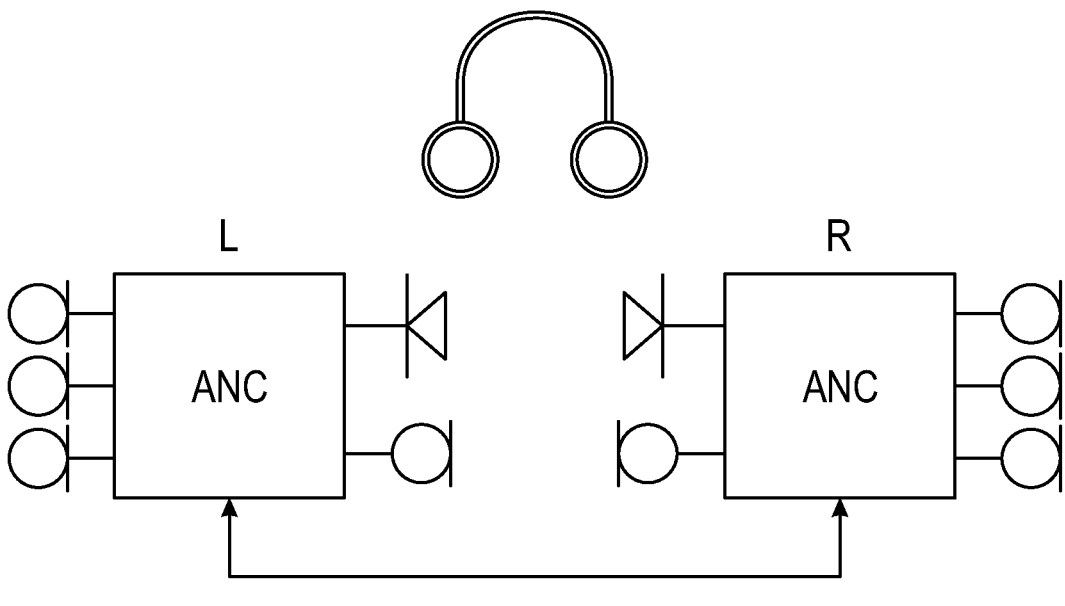
FIG. 48D illustrates exemplary binaural noise cancellation processing using the microphone signal and filter data at both ears to determine the desired noise reduction processing to be applied, according to some embodiments of the disclosure.

The binaural noise cancellation processing will use the microphone signal and filter data at both ears to determine the desired noise reduction processing to be applied. This is shown in FIG. 48D. This allows the noise reduction for the left ear to be informed about the noise reduction applied to the right ear and vice versa. This information is used to set the corresponding noise reduction levels at each ear to create a balanced and more natural residual noise. This can help to avoid spectral holes being perceived in one ear compared to the other ear.

In some embodiments, the binaural intelligent active noise control algorithm may remove all sounds and then mix in the target sounds. In some embodiments, the binaural intelligent active noise control algorithm may selectively remove individual time frequency components from the spatial mixture using, e.g., a time-frequency tile-based noise cancellation/reduction filter. The time-frequency tile-based noise cancellation/reduction filter may be adaptable to the desired and undesired spatial components. This can be considered a device that can be classified as smart ear plugs, where all sounds are blocked as much as possible and then only the desired target sounds are passed through based on user control and preference.

Figure 49A:
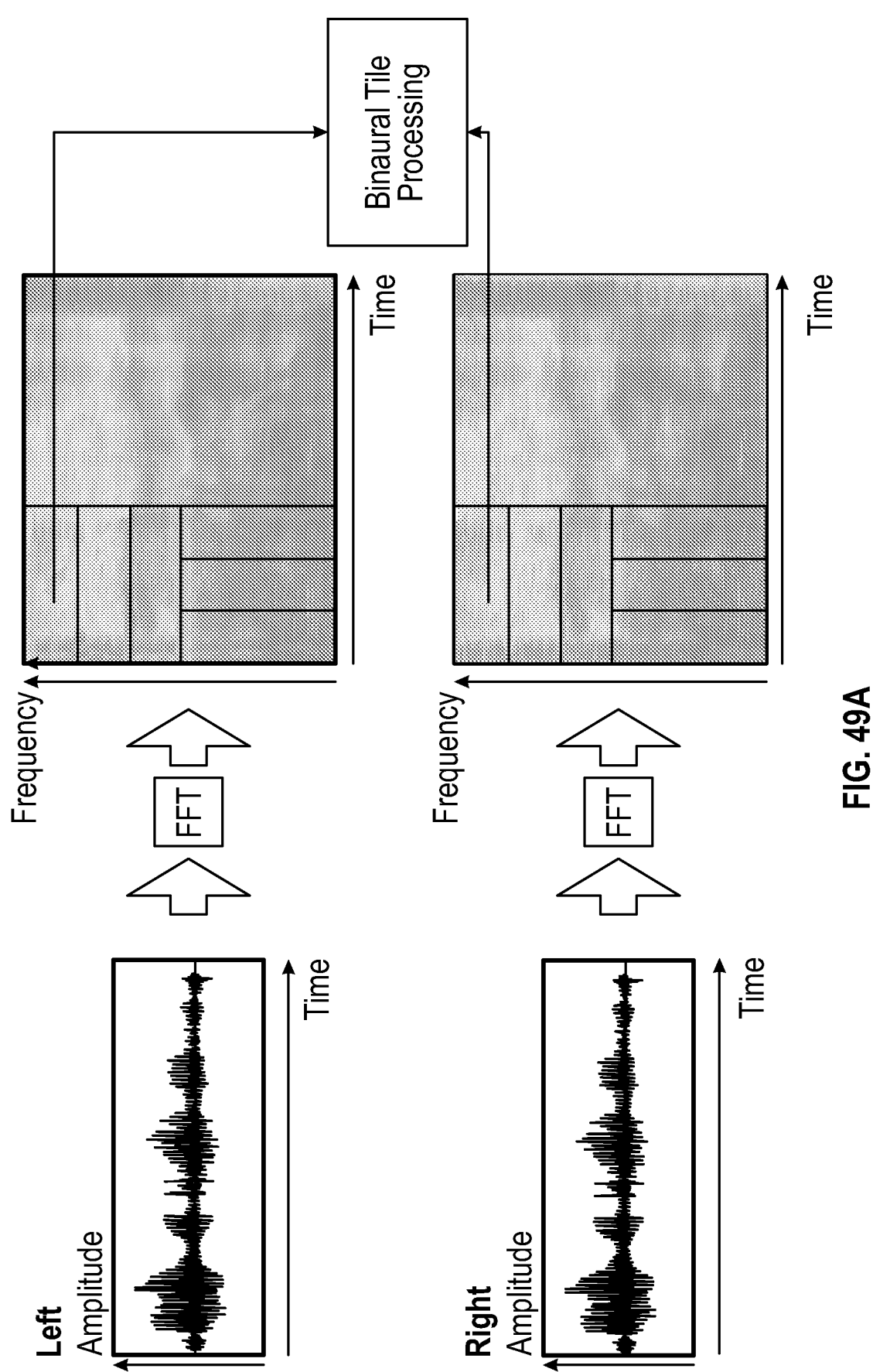
FIG. 49A illustrates exemplary time domain processing, according to some embodiments of the disclosure.
Figure 49B:
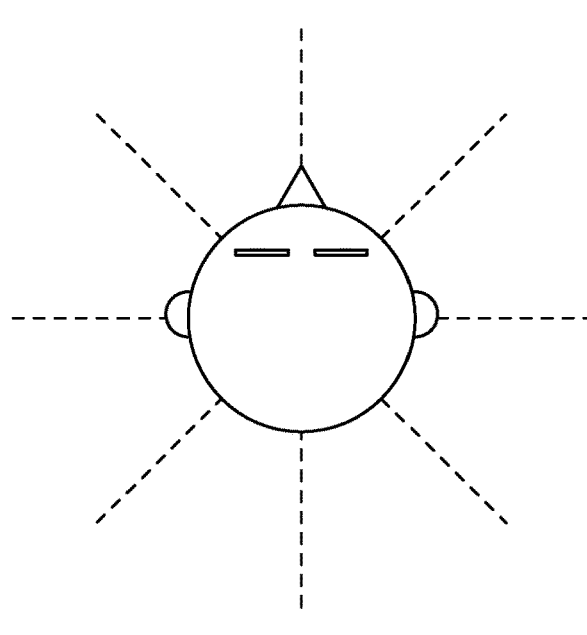
Figure 49C:
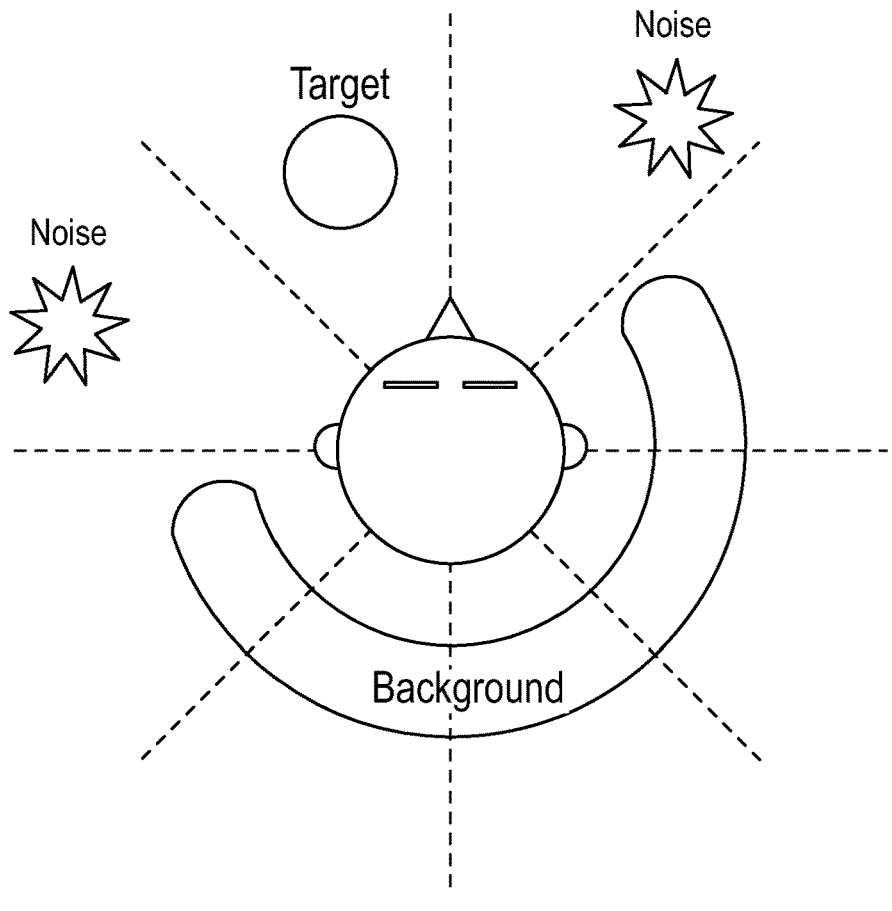
Figure 49D:
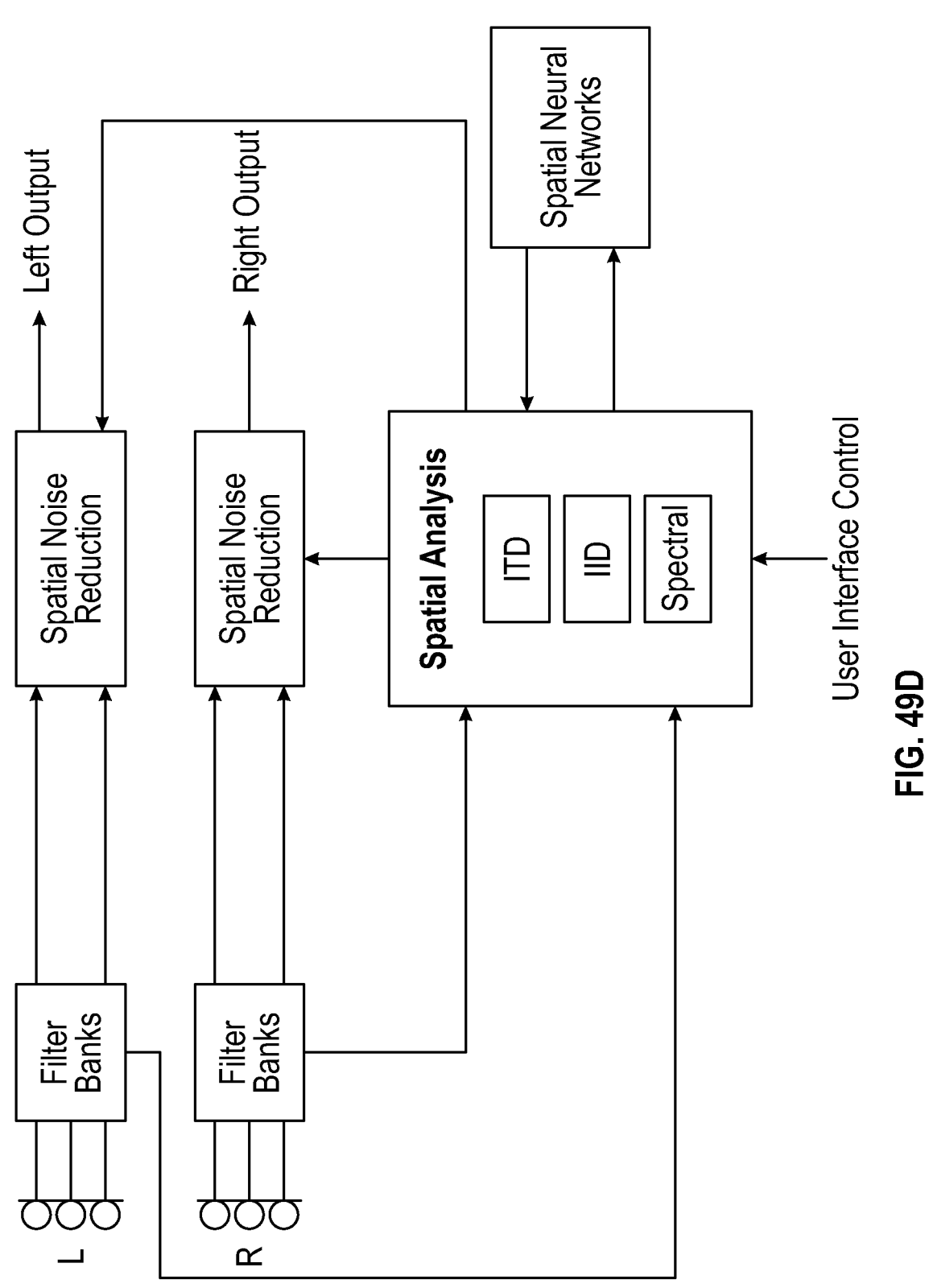

FIG. 49A illustrates exemplary time domain processing, according to some embodiments of the disclosure. This is an example of the time frequency tile processing and analysis that can provide guidance to the noise reduction filters. This is one form of spatial signal processing that can be used to inform the ultra-low latency filters which sounds should be maintained and which sounds should be removed. This is can be based on spatial regions around a listener. This is shown in FIG. 49B. This illustrates an example of 8 regions around a listener that will have distinct interaural time differences and interaural intensity differences that can be used to determine how the low latency filters for each filter bank should operate. Sound sources can be mapped to different regions around a listener. This is shown in FIG. 49C. This illustrates how a sound source or a spatial region, can be selected by a user to be kept or removed from the spatial scene. This information is passed to an analysis processing component in the system to identify the sound sources based on the spatial cues and then determine how to adapt the low latency filters. This can be using neural networks that are trained using spatial cue information for each frequency band to determine the appropriate filtering parameters to apply. An example is shown in FIG. 49D.

Embodiments of the disclosure also includes processing signals from the feedforward microphones by binaurally extracting the auditory cues from the target sounds and the auditory cues from noise coming from a non-target region (to be canceled or reduced). In some embodiments, this step may not affect the sounds from the target region. The extracted auditory cues may then be combined with the signals from the feedback microphones, which may be used for cancelling or reducing sounds heard by the user.

In some embodiments, the binaural intelligent active noise control algorithm may use only the feedforward microphone(s) (e.g., feedforward mode) for, e.g., music playback. In some embodiments, the binaural intelligent active noise control algorithm may dynamically switch to feedforward mode based on one or more factors such as the masking properties of the playback signal. For example, if the music is loud and covers a wide range of frequencies, then it may mask the ambient target noise that is being cancelled. As a result, the binaural intelligent active noise control algorithm may use only feedforward mode and not use the feedback mode. On the other hand, if the music is quiet or has one or more moments of silence, both feedforward and feedback microphones may be used. Using both feedforward and feedback microphones may avoid the movement of the amplitude of the perceived noise floor up and down during times when the binaural intelligent active noise control algorithm is switching modes.

In some embodiments, both a feedforward microphone and a feedback microphone may be used to determine a baseline level of leakage. This is the residual sound that is detected at the user's ear canal from the ambient sounds they are exposed to. Although an ear worn device may provide some passive isolation there will inevitably be some leakage, and in some conditions with some product designs the leakage is intentional. The baseline level of leakage may be mixed with the target sounds to be output to the user's ear pieces. In some embodiments, this mixture of the baseline level of leakage and target sounds may undo the effects of the device transfer function. In some embodiments, the binaural intelligent active noise control algorithm may compensate for the device transfer function of the microphones.

Additionally or alternatively the binaural intelligent active noise control algorithm may compensate for ear occlusion (e.g., the low frequency boost of a plugged ear canal). This can be user controlled based on user preference. Details are described later.

In some instances, the active noise control signal at each ear may be fixed, but reducing the amplitude of the sound to a minimum may cause binaural cue confusion. Embodiments of the disclosure may include preserving the phase and time information of the sound signals so that the binaural cues are not disrupted. The preserved phase and time information may be associated with some or all of the sounds the user wishes to hear. In some embodiments, the sound signals in each ear may be captured, and its information may be provided to the user using the UI. In some embodiments, the UI may provide information about some or all sounds that the user is exposed to, including the target sounds and the natural signals. An example is illustrated in the spatial regions in FIG. 49C. The user may be able to select which sounds to include in the sound signals transmitted to the ear pieces and/or how to process them. The user may select the sound source, the location, the region, the amplitude, or other metrics, for example. Additionally or alternatively, the user may be able to reduce or increase the perceived level of a selected group of sounds to be mixed in and included in the sound signals transmitted to the ear pieces.

The UI may allow the user to control the amount of external sounds included in the sound signals that the user hears through the audio system. In some embodiments, the sound signals that the user hears are generated using a first audio data stream and a second audio data stream. The first audio data stream may have a low latency audio data path and may be used for canceling residual sounds. The second audio data stream may be programmed to pass through the binaural intelligent active noise control algorithm without modification.

In some embodiments, the binaural intelligent active noise control algorithm may use head tracking information. The head tracking information may help lock on to sound sources and regions selected by the user. The head tracking information may be sent to the UI. The UI may display a graphic of a head and sounds around the head. The UI may allow the user to lock the head image such that the sounds image rotates as the head moves. The UI may also allow the user to lock the sounds images such that the head image rotates as the sounds move.

In some embodiments, the binaural intelligent active noise control algorithm may use DSP instructions to enable processing of the left channel and the right channel. The left sound signals and the right sound signals may be processed in parallel engines or processing cores to reduce the latency of switching between sound signals on each channel. The parameters used by each processing component can be updated using a separate processing core that is analyzing the multiple signals and then provides data to the ultra-low latency processing cores for each channel.

In some embodiments, dual processing engines may be used to separate sounds for tiny artificial intelligence (AI) applications. Additionally or alternatively, the features for the NNs may have ultra-low latency. In some embodiments, the features for the NNs may operate in the time domain, may use very limited history information, or both. The NNs may also operate on narrowband audio streams provided through a filter bank, either in the time domain or frequency domain, to allow short term or single sample analysis and processing, in addition to longer time frame analysis in parallel.

Signal processing instructions may be used to allow for low latency look back operations. If the history audio data is not available, a shorter time window may be used until a pre-determined number of audio data samples are available. In some embodiments, the signal processing instructions may be filled with zero audio data (representative of silence) while the history is being filled. A processed output sample may be generated for every new input sample. The lookback buffers may be used for each input audio stream, which can be the full band microphone signals or the output of a filter bank. Each input signal is processed using single sample processing.

In some embodiments, the binaural intelligent active noise control algorithm may cancel out only first sounds, where the first sounds are from a particular direction or region. Second sounds, from other directions or regions, may be included in the sound signals transmitted to the audio system. In some embodiments, second sounds may not be processed (e.g., have its amplitude increased or enhanced in another manner). For example, sounds from a sound source to the left of the user may be cancelled, while sounds from the right may not be processed and included in the sound signals, or may be enhanced separately.

In some embodiments, the steps performed by the binaural intelligent active noise control algorithm may be based on signal analysis, the specific user scenario, or both. For example, a first set of configurations may be downloaded and used when the user is located in a first scene. The binaural intelligent active noise control algorithm may switch to a second set of configuration when the user moves to a second scene. The first set of configurations may use less processing than the second set of configurations. The user may force the system to switch to a different set of parameters for a particular scenario, which requires a different user profile to be used for the noise cancellation.

The set of configurations used by the binaural intelligent active noise control algorithm may be based on one or more factors. For example, if the user is trying to sleep, then a set of configurations (e.g., complete or near complete removal of noise) specific to sleeping may be used. In some embodiments, the set of configurations used may be triggered by one or more steps and/or factors. For example, the audio system may detect that the user is sleeping using biometric information measured by the sensors in the ear pieces. When the biometric sensors indicate that the user has fallen asleep, the binaural intelligent active noise control algorithm may slowly or abruptly switch to not performing active noise control as the user is already in a sleep state. The system allows the functionality to be added that the noise cancellation can be automatically deactivated based on a trigger event, which can be a change in the acoustic environment, other sensors in the system or after a timeout duration.

As another example, the binaural intelligent active noise control algorithm can be triggered by external sounds. In some embodiments, a feedforward microphone may be used to determine when the snoring of the person sleeping next to the user starts and stops. The binaural intelligent active noise control algorithm may be performing one or more steps for active noise control when the person is snoring, but may switch to a low power mode to save power when the person is not snoring. In some embodiments, the binaural intelligent active noise control algorithm may block sounds (e.g., snoring) having a specific sound profile, but may not block other sounds (e.g., from a smoke alarm).

Figure 50A:
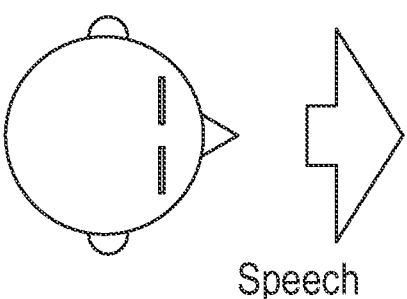
Figure 50A:
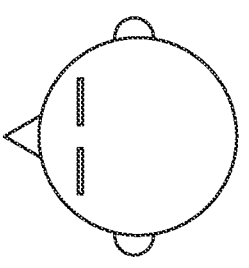
Figure 50B:
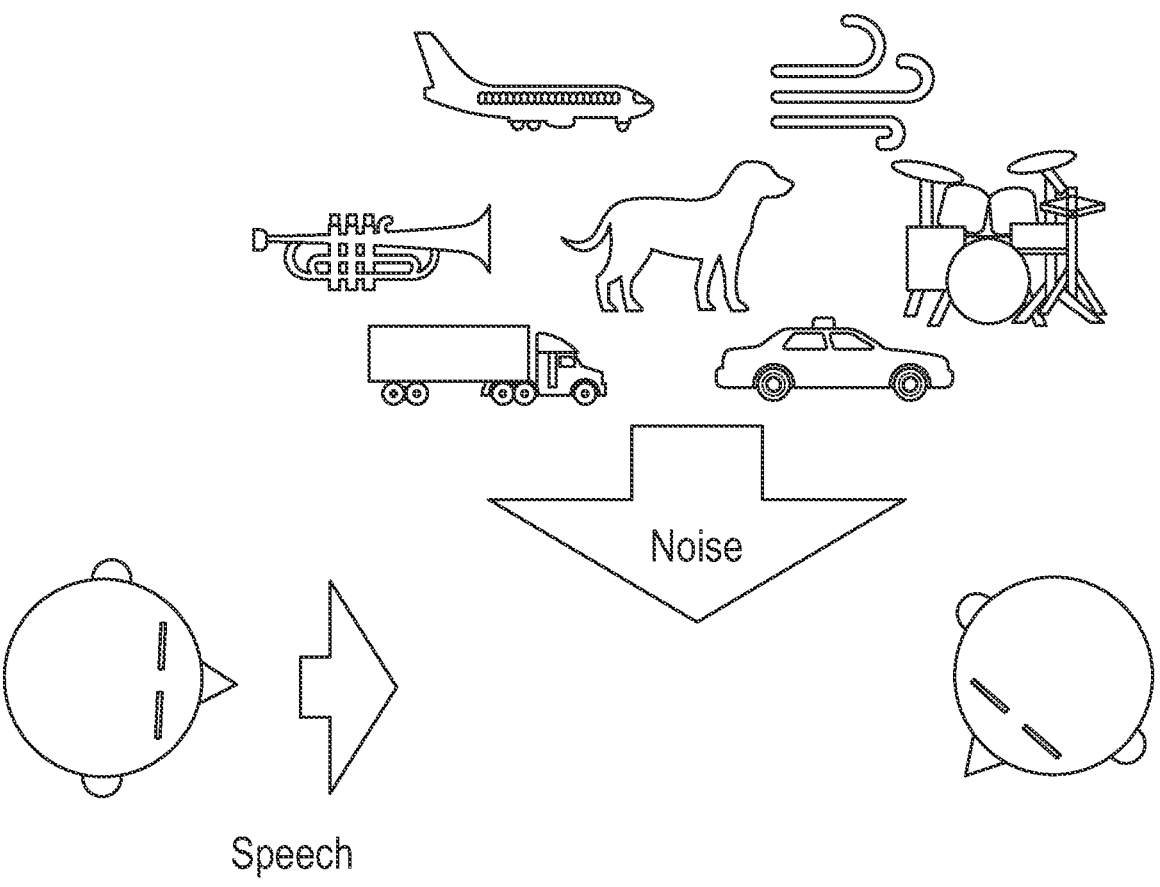

Binaural signal processing for in-person conversational speech algorithm: FIG. 50A illustrates a diagram of an exemplary normal conversation, according to some embodiments of the disclosure. In a quiet scene, humans with no hearing problems may not have a problem understanding conversational speech. However, it becomes more difficult to have a conversation when in a noisy scene. When a user is engaging in a conversation with another human, the user may have a difficult time understanding the conversation. The person speaking may speak louder and raise their voice to be above the amplitude of the scene sounds (e.g., noise). The listener may move the ears closer to the person speaking and/or rotate the head to decrease the distance between the ear and the speech coming from the speaker's mouth, as shown in FIG. 50B.

Typical active noise cancellation systems may reduce or completely remove the noise by blindly removing all sound signals within a certain frequency band. However, removing all sounds within the frequency band may reduce the amplitude of the desired conversational speech as well. This results in regular ANC implementations being unsuitable for many real world interaction scenarios.

A binaural signal processing for in-person conversational speech algorithm processes sounds associated with conversational speech differently than sounds associated with noise. In some embodiments, the amplitude of the sounds associated with conversational speech may be increased or maintained, while the amplitude of the sounds associated with the scene may be decreased or maintained. The processing of the sounds may depend on the sounds in the scene and/or the location of the sound source. For example, the amplitude of sounds may be reduced when the sound source includes noise. As another example, the amplitude of the sounds may be maintained when the sound source includes conversational speech. In this manner, intelligent noise cancellation/reduction and sound source separation are used to accentuate conversational speech and muffle natural sounds.

In some embodiments, the binaural signal processing for in-person conversational speech algorithm also adjusts the sounds associated with the conversational speech in order to account for the Lombard effect, where the amplitude of the sounds associated with the speaker's speech may need to be adjusted to prevent the person speaking from shouting when intending to talk. Reducing the amplitude of the sounds associated with the speaker's speech may reduce the occlusion effect.

The binaural signal processing for in-person conversational speech algorithm may use information or steps from one or more other algorithms, such as head tracking, location-based noise reduction, signal separation by region, signal separation by content, and intelligent active noise control.

In some embodiments, the binaural signal processing for in-person conversational speech algorithm may process the sound signals to the left ear piece differently than the sound signals to the right ear piece. For example, when the head tracking algorithm determines that the user is rotating the left ear closer to the person speaking, the sound signals to the left ear piece may be amplified more than to the right ear piece to preserve binaural cues.

Binaural (spatial) intelligent active noise reduction algorithm: The audio system 100 of the disclosure may use binaural sound signals, captured by each ear piece. The binaural sound signals may be input to the binaural scene analysis algorithm, for example. The binaural intelligent active noise reduction algorithm may analyze the binaural sound signals and create a representation of amplitude and phase for frequency bands and time windows. In some embodiments, the binaural amplitude and phase information may be analyzed to determine dominant sounds, the locations of the sounds relative to the user, or the like. The binaural intelligent active noise reduction information may change the binaural amplitude and phase information for individual frequency bands and time windows.

In some embodiments, externally captured binaural sound signals and internally captured monaural signals may be used in combination to determine the amplitude and phase processing to apply to individual time and frequency components. In this situation, the signals from the internally located microphones are informing the signal processing algorithms the sounds that have been captured from the ear canal of the listener.

The binaural intelligent active noise reduction algorithm may capture and analyze the monaural signals from each ear piece and may send the signal information to an electronic device (e.g., a mobile phone or charging pod), which may process audio data and provide information to the user. The monaural signals may be captured from each ear piece, and the raw signal information may be sent to the electronic device for further analysis.

In some embodiments, the binaural intelligent active noise reduction algorithm may capture, analyze, process, and/or render very low latency binaural sound signals. The very low latency binaural sound signals may be synchronized for each sound signal to each ear piece.

The binaural intelligent active noise reduction algorithm may use head tracking information to determine sound sources, locations, regions to be processed, or a combination thereof. The head tracking information may be determined and sent to an electronic device. The electronic device may provide information to the user related to the sound sources around the user.

The binaural intelligent active noise reduction algorithm may provide signal level and content information for sounds external to an electronic device and sounds internal to the electronic device (e.g., including a dosimeter).

In some embodiments, the binaural intelligent active noise reduction algorithm may adjust the very low latency processing configuration based on analysis of a similar latency signal or one with higher latency and larger buffers.

In some embodiments, the binaural intelligent active noise reduction algorithm may adjust the amount of low latency signal removal based on user input. Additionally or alternatively, the amount of low latency signal removal may be adjusted based on analysis of external sounds, where the amount of signal removed could be increased or decreased for individual sounds.

Binaural signal processing for speech communications: In some instances, it may be desirable for a user to hear only speech without having to receive sound signals related to other sounds. One example instance is for speech communications, where it may be easier for a user to understand what a person is saying when other sounds are removed or muffled.

Figure 51:
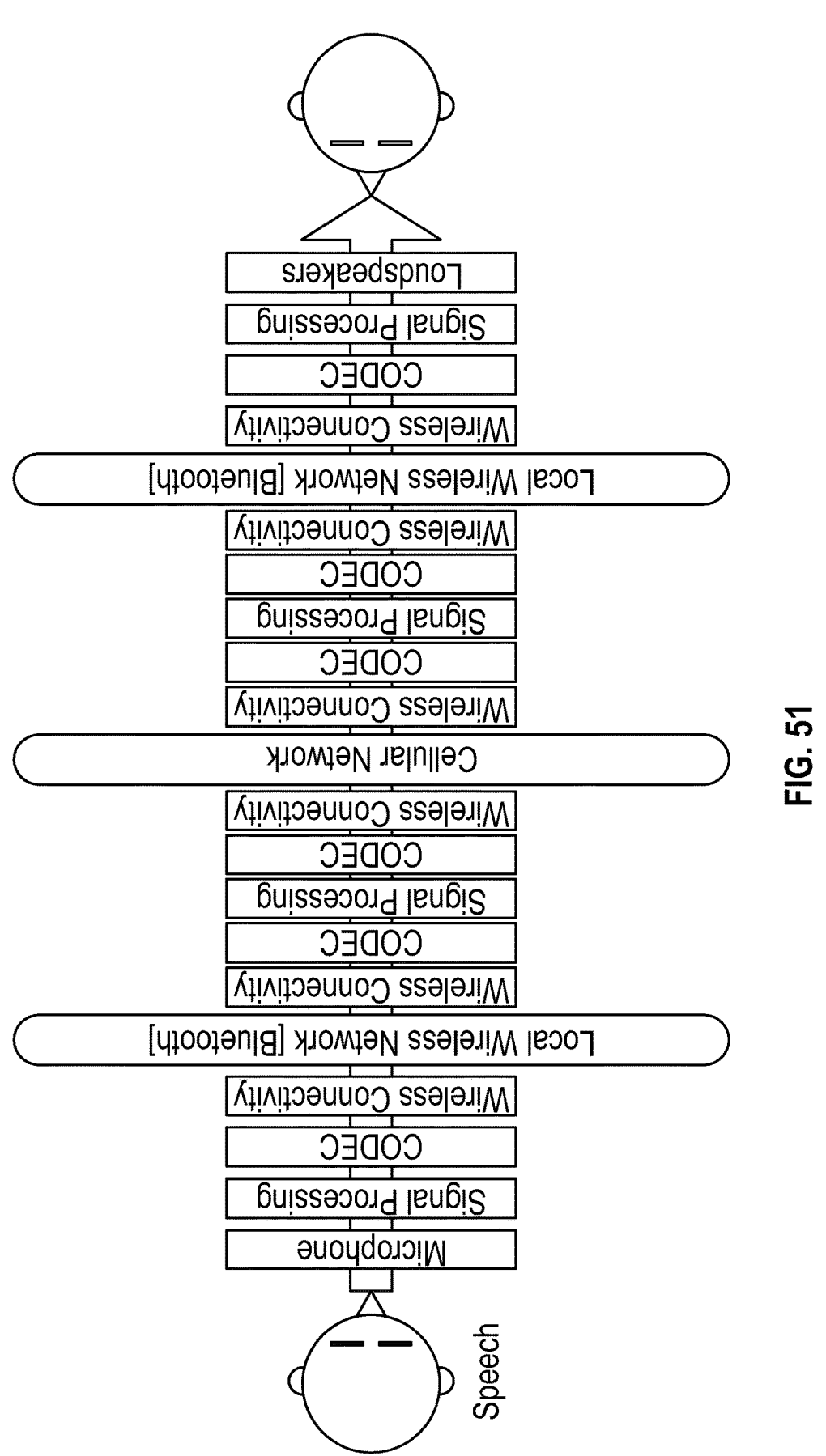

FIG. 51 illustrates an exemplary communications channel from the mouth of a person speaking to the ear of the user, according to some embodiments of the disclosure. A typical communications channel is mono and low bandwidth due to channel capacity limitations, where audio systems try to fit as many audio data streams into an existing communications channels as possible. The communications channel capabilities can be increased with wideband communication channels, encoding and decoding schemes, signal processing algorithms, and multichannel audio.

The binaural signal processing for speech communications algorithm may be capable of capturing, mixing, and rendering sound signals for multichannel audio data. The multichannel audio data may include binaural signal processing of speech communications between a listener and a mono single speaker, a mono multi speaker, a spatial single speaker, and a spatial multi speaker. Additionally or alternatively, the capture of speech communications between a speaker and a mono system or a spatial system are included in examples of the disclosure.

In some embodiments, the properties (e.g., amplitude, spectral content, and spatial information) of sound signals not associated with the speech may be adjusted. For example, wind noise may be removed from the sound signals received by the user's ear pieces. In some embodiments, the binaural signal processing for speech communications algorithm may use one or more steps from the NN-based processing.

The binaural signal processing for speech communications algorithm may include one or more steps for performing corrupted speech enhancement. To perform corrupted speech enhancement, NN-based speech correction may be used to fill in gaps due to audio data packets that have been lost (e.g., during communication). In some embodiments, the corrupted speech enhancement may be used to remove unwanted noises, such as buzzes and clicks, in real-time. In some embodiments, the corrupted speech enhancement may be performed by an enhancement engine to compensate for any latency due to the correction. In some implementations, the enhancement is performed by a separate processing core or signal processing component such that improved, corrected audio data is provided to other components in the system.

In some embodiments, the corrupted speech enhancement may include binaural information sharing and binaural active noise control. If a sound signal received at one of the user's ear pieces is corrupt (e.g., due to a poor communication link or another external factor or sound), the sound signal to the other ear piece may be used as backup or a replacement. If the corrupted speech is due to a loud sound that may cause significant impairment at a first ear (relative to a second ear), then the corrupted speech enhancement may switch the sound signals and send the sound signal intended for the second ear to the first ear to assist with sound signal separation. In switching the sound signals, the corrupted speech enhancement may preserve the location information in the sound signals. For example, the sound source may be located closer to the user's left ear, which means the amplitude of the sound signal is greater and the time delay is shorter relative to the right ear. The corrupted speech enhancement may make it such that sound signal to the left ear maintains these properties after the sound signals are switched in order to preserve binaural cues.

Binaural signal processing for speech enhancements algorithm: For real-time NN that is language-based, the NN processing for the binaural signal processing for speech enhancement algorithm may be trained and scored for a certain language. The noise separation, reduction and removal is most likely to be universal for certain sounds (e.g., sound from cars, air conditioning, airplanes, traffic, etc.). Different languages, on the other hand, may include different sounds and intonations. Embodiments of the disclosure may include using at least one language processor to categorize a sound (e.g., a lisp) as noise and then remove it, or alternatively to keep it as required by the specifics of the language being spoken. In some embodiments, language specific NN processing may be part of the overall configuration and setup of the device.

For real-time NN-based BWE, the binaural signal processing for speech enhancement algorithm may train an NN to take narrowband speech and create, apply, and/or resynthesize the best quality upper frequency bands based on the content of the lower frequency bands. The NN may be scored on subjective audio data and real wideband speech audio data to determine how well the signal has been matched in terms of signal matching, subjective quality, objective quality and intelligibility. The performance can also be based on language specific quality scores.

For real-time NN, the training of the NN can use standards-based objective measures. The standards-based objective measures may be limited to the types of noise that the testing model is able to quantify. Subjective test audio data may be scored and fed into the training so that there is broader coverage for different types of noise and for better NN performance. The subjective testing may be done offline, for example, and the scored audio data may be used as the training feedback. The NN may be updated while the device is in the field. This can be a complete NN processing upgrade and a parameter upgrade based on the new measurement training data.

For region-based speech enhancement, the binaural signal processing for speech enhancement algorithm may isolate a region of the spatial map. For example, the ITD and IID may be used to remove all sounds beyond +/−30 degrees from the 0 line directly in front of a listener. Only the sounds in front are passed to the NN for processing to extract the spatial cues, create mono, and then reapply the spatial cues. This is illustrated in terms of the region processing of sounds in FIG. 49C.

For direction-based signal separation, the binaural signal processing for speech enhancement algorithm may use narrow regions around a listener to create a narrow "wedge" of sounds. The wedge may be, for example, from 0 to 30 degrees, 30 degrees to 60 degrees, 60 degrees to 90 degrees, etc. Each wedge may be passed through the signal separation NN to extract the noise, the background sounds, and the target sounds. The sounds may then be removed or adjusted in a particular region. In some embodiments, only wedges that include dominant sounds may be passed to reduce processing. The use of binaural audio containing spatial cues in this configuration provides a spatial unmixing platform to separate sounds based on location (e.g., 30 degrees to the left), content (e.g., narrow band between 300 Hz and 12 kHz) and category (e.g., speech).

Binaural signal processing for direct communications algorithm: The binaural signal processing for direct communications algorithm may be an algorithm that processes signals for a direct communications channel (e.g., walkie talkie). A direct communications channel may include a combination of conversation mode and communications mode. The binaural signal processing for direct communications algorithm may capture speech, and then use active noise control to remove external sounds. In some embodiments, the active noise control algorithm can be programmed to differentiate between sound signals that include speech and sound signal that do not (e.g., using one or more microphones in the electronic device).

In some implementations, the binaural processing and signal separation and target signal extraction can be performed offline by a separate device or in the cloud as part of a communications network. In situations where latency is not a critical part of the signal processing chain, the algorithms can be performed using far greater processing resources (compute and memory). These systems can benefit from all the raw audio and sensor information captured from the ear worn devices, along with timestamps and synchronization information.

In some implementations, the binaural processing is performed offline based on a user request or system metric that indicates that poor performance has been experienced. For example, the user has participated in a conversation where they were unable to understand the speech in the noisy conditions, or another person was unable to understand the speech for the listener in their particular acoustic conditions. The complete audio capture can be sent to the offline processing and analysis component to determine what needs to be improved such that a better experience can be provided if similar conditions are presented to the system again. This can include retraining neural networks based on specific user requirements. This can include generating new processing parameters. This can include recalibrating audio components, such as microphones and speakers to better deal with the acoustic conditions. This can include requesting the user to return the device to the manufacturer for hardware upgrade or further analysis or for replacement with a new device.

Binaural occlusion effect reduction algorithm: The binaural occlusion effect reduction algorithm of the disclosure may reduce the occlusion effect using the sound signals to the ear pieces to cancel the natural sounds in the ear canal, such as the user's own voice and other body sounds.

When a user is talking and/or moving, the user's own voice, footsteps, and/or other body sounds (e.g., chewing) may sound different compared to if the ear canal is plugged. These sounds may be, at least partially, trapped in the ear canal, causing unnatural low frequency resonance sounds. Full cancellation of the sounds in the user's ear may sound unnatural. Instead, embodiments of the disclosure may reduce the sounds in the user's ear to a comfortable level for the listener. The user's comfort level may be controlled by the user, where the user's preferences may vary depending on the situation and other sounds. Internal and external microphones are used to capture the user's body sounds to determine which components of the sounds in the ear canal should be reduced or removed. Further classification of the sounds can be achieved using neural networks that are trained to identify sounds within the ear canal such as chewing, footsteps, breathing etc.

The binaural occlusion effect reduction algorithm may use low latency signal processing and may perform steps to control the active noise from the sounds in the user's ear canal. The binaural occlusion effect reduction algorithm may use the spectral shape and enclosed resonance of the user's ear canal to cancel or reduce its natural sounds. The spectral shape of the user's ear canal may be measured for each of the user's ear canal to provide a personalized noise reduction system.

In some embodiments, the binaural occlusion effect reduction algorithm may account for sounds that occur due to movement of the ear pieces while being worn by the user. The ear pieces may move slightly while being worn, where the movement may cause irritation and mechanical sounds that may be reduced by the binaural occlusion effect reduction algorithm.

Binaural rendering enhancements algorithm: The binaural rendering enhancements algorithm may process delivered content to enhance the user's experience. The processing may involve modification based on product and user preferences. In some embodiments, the binaural rendering enhancements algorithm may allow the user to determine how delivered content may be integrated with the ambient sounds the user is exposed to.

In some embodiments, the binaural rendering enhancements algorithm may render sound sources to different locations with HRTF (frequency domain) or HRIR (time domain) filter banks. In some embodiments, a single clock may be used to perform parallel computing. A parallel "MAX" function may be used to determine the time-frequency components that are relevant to a mix, where only the dominant component for each frequency band may be selected. The mix may be created from multiple sources across different spatial outputs. In some embodiments, all time domain signals for each band may be mixed.

In some embodiments, the binaural rendering enhancements algorithm may use a hardware macro for coefficient transitions. The transitions may be between a first audio data value and a second audio data value. An increment may be applied at each "sample" update. The increment may be calculated based on the delta between the first audio data value and the second audio data value, and the number of increments to be applied to create a smooth linear transition. A new coefficient may be written into an audio data buffer. Applied coefficients may be updated from the new coefficient location. Transitions are applied in a synchronized method so all filter coefficients are updated on the same sample. In some embodiments, an immediate transition may be implemented by using a flag set. Other types of smoothing can also be applied.

Additionally, a scaling factor on the delta could also be used for the coefficient transitions. A scaling factor may also be used for smoothing of gain coefficients for compression/ limiter/expander operations. The calculation of the gain to apply can be done at a slower block-based rate. The gain may be applied on every sample. The gain or single coefficient can be smoother between two levels by using the same hardware macro block. Transitions for each ear in a binaural audio system may be synchronized.

The binaural rendering enhancements algorithm may implement multi band compression to ensure the output sound signals are within audible levels. The binaural rendering enhancements algorithm may maintain level (and phase) differences between the user's ears to be used as binaural auditory cues. The relative level differences between incoming sounds may also be maintained. The user may be able to control the relative levels of sounds in the ambient sound field. In some embodiments, the user may be able to control levels, locations of notifications, and other rendering of augmented sounds into the audio system. The implementation of binaural multi-band compression may allow smooth gain changes and coefficient updates. The applied gains may be adjusted by the user within a range, or by other components in the system to maintain a desired output level.

Binaural scene manipulation algorithm: In most instances, a user is exposed to multiple sounds. A user may be exposed to noise conditions that have an impact on every day activities, for example. Some of these sounds can be loud, harsh, or even harmful to the user's ears. Noisy conditions may make it difficult or impossible to hear a sound that the user may not be able to pay attention to. For example, a user may have difficulty understanding a conversation in a busy city street with passing traffic, construction work, people walking by, etc.

The background noise may be reduced using an active noise control algorithm. The active noise control algorithm may operate by creating a level difference between the noise and the target sounds. In addition to a level difference, the user may be able to understand the target sound by creating a spatial separation (e.g., distance difference and/or time difference) between the sound sources. The spatial separation may create a quiet zone around the target sound. Background noise may be "moved away" so that it has a reduced level, allowing the user to still be aware of the background noise without completely canceling it.

Figure 52A:
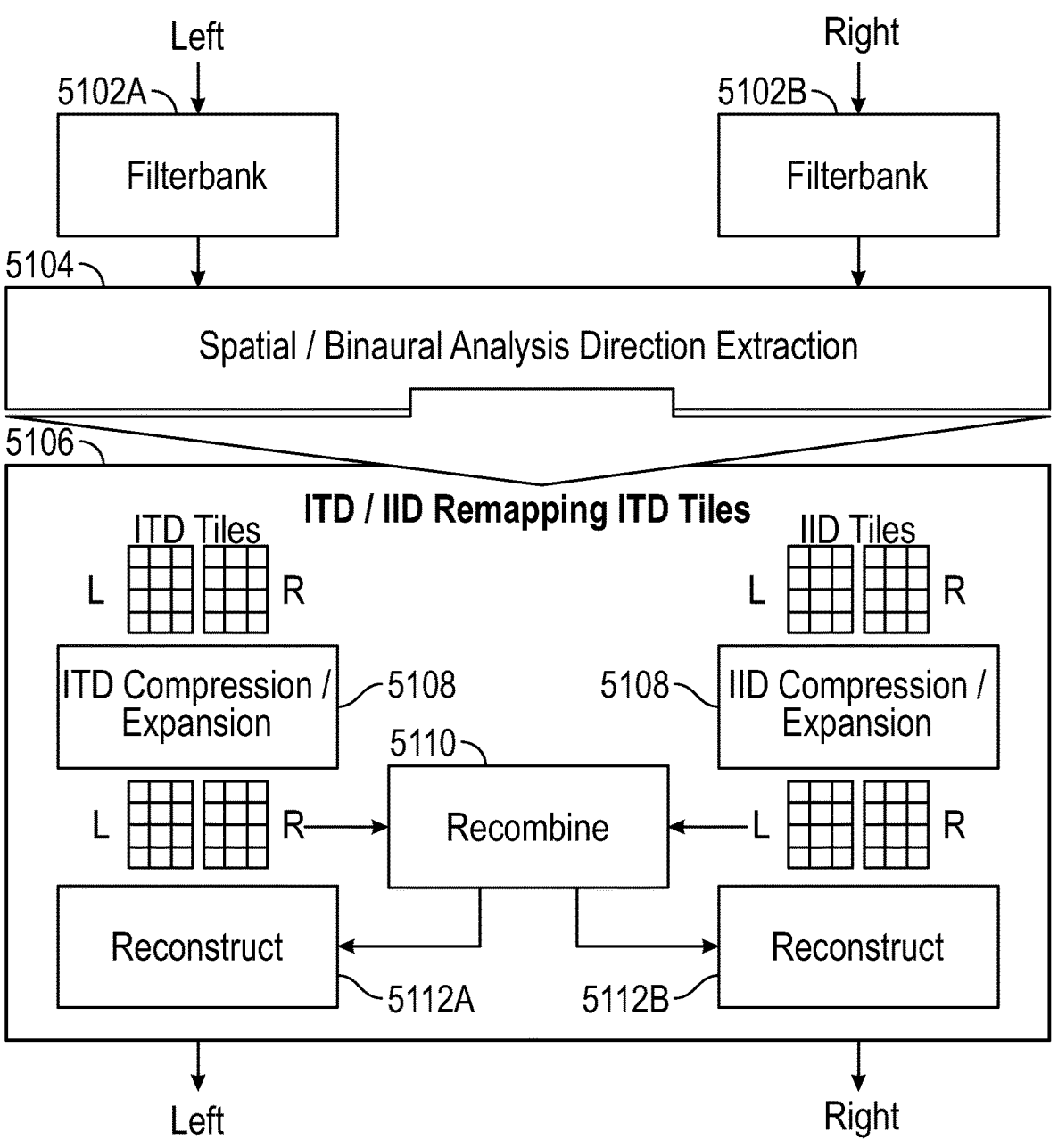

FIG. 52A illustrates a block diagram of exemplary signal processing for the manipulation of ITD and IID, according to some embodiments of the disclosure. The left and right audio signals may be received by one or more filter banks 5102A and 5102B. In some embodiments, a filter bank may be a bypass filter bank. The bypass filter bank may use a microDSP to perform single sample processing. In some embodiments, the main processor may enter a sleep mode while the microDSP is performing the single sample processing.

After filtering, the spatial/binaural analysis direction extraction 5104 may extract information for ITD/IID remapping ITD tiles. ITD tiles may be used for ITD compression/ expansion 5108. The compressed/expanded left and right signals may be recombined at 5110 and reconstructed at 5112A and 5112B.

In some embodiments, the signals within the binaural mix can be processed to adjust the spatial separation of the sounds. ITD and IID enhancement may be used to create greater separation of sounds away from target regions.

The binaural rendering enhancements algorithm may implement binaural mapping, such as ITD/IID remapping tiles 5106. With binaural mapping, objects in a spatial scene may be mapped differently. The time (or phase) and amplitude (or level) differences between sound sources may be adjusted, which may result in the sound "moving" to a new location. For example, a first sound at a first location may be moved to a second location. The first location and the second location may both be in the same general direction relative to the user (e.g., in front of the user). In some instances, there may be a region where the binaural rendering enhancements algorithm configures the sounds in a first region to stay still and the sounds in a second region to move. In such instances, a smooth transition may be used to avoid sounds from sounding as if they are leaping away as the sound crosses the threshold between the first and second regions.

Binaural mapping may also vertically separate sounds. As a sound moves vertically, there may be small spectral changes, but the ITD and IID may remain the same due to the cone of confusion. As a result, binaural mapping may include amplifying certain spectral changes caused by the pinna to give the user a sense of a vertical shift.

The binaural mapping may allow the user to send sounds to the back (e.g., move the sound far away) to be used for, e.g., confusing scenes. The perceived distance can be adjusted by adjusting the level and/or the reverberation. For example, a sound may be perceived as further away by lowering its level and using more reverberation. Even if a first sound and a target sound are from similar locations, using the binaural scene manipulation algorithm to "move" the first sound may still allow the user to be aware of the first sound, but it may not be as dominant as the target sound.

The binaural mapping may also spread sounds using spatial dithering. In some embodiments, spatial dithering may include introducing a small amount of randomness to the ITD and IID for a sound source to make the sound be less precise to the user. In some embodiments, a large amount of dither may be used to cause the sound to appear chaotic and random (e.g., for virtual applications such as gaming). In some embodiments, a small amount of dither may be used to make the sound appear to have very rapid and random movements within a small region. This is implemented by randomly changing the coefficients, by directly applying dither to them, within numerical boundaries set by adjacent location points where the spatialization coefficients are known.

In some embodiments, the spatial dithering may change and then merge into a central location (e.g., around the core of the dither adjustments) with some of the spreading extending out from the central location. This allows the system to set a target location with a region around it where the sound source will be moving within with random adjustments to create new interpolations of the spatialization coefficients. This is implemented by randomizing the target location, by applying dither to the location, within a region and recalculating the interpolated coefficients each time.

In some embodiments, the spatial dithering may be used to mask imperfections in the HRTF or HRIR data. For example, small random variations in the HRTF data may be introduced to reduce the amount of spectral nulls or unnatural gaps in a sound.

The binaural mapping may perform stereo image remapping to HRTFs. Standard stereo audio is designed primarily for speakers. Headphone listening, on the other hand, has a left sound signal that is received by the left ear piece and a right sound signal that is received by the right ear piece. For speakers, the left and right sound signals are received by both of the user's ears. The binaural mapping of the disclosure uses a stereo image and maps certain sounds to locations around the user's head using the user's HRTFs. The stereo image may be analyzed to determine the left and right time and amplitude differences for each time-frequency tile. Central sounds may be located in the middle, and other sounds may be panned to different locations in the stereo image. The spatial mapping may include sounds generated around the user from −90 degrees to +90 degrees in front of them.

In some instances, the user can control the width of the mapping to such that it is wider than the width of the stereo image. Additionally or alternatively, left and right speakers may be placed at fixed locations in the spatial map, and HRTFs may be used at locations relative to the user's head to create two angles for the sound to arrive at each of the user's ear. An extension is to use a virtual linear array of speaker locations that represent the panned audio locations within the stereo image. The stereo levels are analyzed in time windows, and or time/frequency bands, to determine where along the virtual speaker line the sound should be placed. Each time window is then processed using the appropriate HRTF or HRIR coefficients for that virtual speaker location relative to the listener.

In some embodiments, head tracking may be used. The locations of the speakers may be fixed, and the user may adjust the relative angles of movement for the speaker locations relative to the user's ears via head movement. In some embodiments, room impulse responses or room transfer functions may be used to include the reverberation and spectral characteristic of particular rooms. For example, the user may be given the illusion of hearing the sounds in a specific location, such as "Abbey Road—control room 1." In some embodiments, room impulse responses may be captured (e.g., using external microphones) so that the user perceives the sounds heard (using the ear pieces) as if transmitted on speakers.

In some embodiments, dual processors may be used to capture the ITD and IID for ear. The ITD and IID may be centrally manipulated and then reconstructed into two signals. The binaural mapping may allow the user to control the remapping parameters and the gains in each region and the central location of the region. In some embodiments, the remapping parameters may be performed in the frequency domain (e.g., FFT/IFFT) or in the time domain (e.g., through a parallel filter bank).

In some embodiments, the binaural scene mapping algorithm may include binaural auditory cue processing. The binaural auditory cue processing may be performed on less than all audio samples. The number of audio samples processed by the binaural auditory cue processing may be based on the minimum update rate. In some instances, the number of audio samples that undergo binaural auditory cue processing may be based on the time window. For example, fewer number of audio samples may be processed for larger time windows.

In some embodiments, the binaural scene manipulation algorithm may perform binaural auditory cue prediction. The binaural auditory cue prediction may predict which auditory cues may help with the processing of the real-time audio data in the sound signals. The prediction can be provided from neural networks that are trained to determine which spatial cues provide the optimal benefit to listeners based on the signal content. For example, the system may contain neural networks that are trained to categorize speech sounds and predict that the user prefers them located to the right of their hear, using their dominant right ear, and will provide the spatialization parameters that will enable the received audio from the sound source to be processed such that it is respatialized to the new desired location.

Embodiments of the disclosure may also include mono spatial mapping. In mono spatial mapping, machine learning may be used to identify the characteristics of a person's voice. Using the characteristics, the person's voice may be mapped to a spatial location for binaural rendering. When the mono spatial mapping hears a person's voice, it may associate the person's voice with a certain position. The mono spatial mapping may learn the person's voice characteristics (including background cues), and then use the voice characteristics to perform binaural scene manipulation. For example, mono spatial mapping may be performed when the user is on a conference call with multiple mono streams coming into an endpoint. Each person's voice may be associated with a central location so that the mono spatial mapping may learn the characteristics of each person's voice, the device the person is using, the channel for the audio data, or the like. In some embodiments, the mono spatial mapping may associate the person's voice characteristics with the person on a roster. Each of the received audio components can be extracted from the mono stream and then respatialized based on the user's preference.

In some embodiments, processing an NN with binaural inputs may include mapping time frequency tiles to specific locations and calculating the ITD and IID for each T-F unit. The left and right binaural signals may then be mixed into a mono stream, real-time NN processing may be applied, and then the output of the NN may be re-spatialized using the mapping information from the ITD and IID. These steps may be reapplied to the mono signals to generate the left and right audio signals.

In some embodiments, direct processing may be used to calculate the features for the left and right ears, which are input to the binaural NN. The NN is trained on binaural signals. The binaural signals may be combined (e.g., mixed) sound sources of target speech (or other target sounds), noise sounds, and background sounds. In some embodiments, at least two sound sources may be processed using a range of different HRTFs and angles (e.g., azimuth and elevation). The NN may extract the target sound, the noise sound, and the background, so that the user can control the level of the sounds. The directional information from the HRTFs may be preserved. In some embodiments, the noise and the background may be cancelled, and leave the dominant components of the target sounds at its spatial location. The cancellation of noise and background may be performed in real-time.

In some embodiments, the binaural NN may involve personalized training. The NN may be trained with the HRTFs for the target user, allowing for the NN to be customized for user's ITD, IID and spectral shape. In some embodiments, the sounds sources may be synthesized and processed using the user's personal HRTF information. The NN may be trained locally in the ear device when enabled by the user. The NN may be trained offline on a separate device (mobile phone, laptop), or in the cloud, based on a user request to stream the data to the training engine and receive back updated NN parameters.

In some embodiments, in NN processing for binaural signals, the left and right binaural signals captured may be converted into features (e.g., through FFT or a filter bank) to create a set of amplitudes and phases. The set of amplitudes and phases are passed into an NN that is able to identify sound categories with the advantage of the spatial separation of the signals. The NN may output the gains to apply to the FFT or filter bank signals, one output for each ear. The separation or categorization can be based on signal content combined with signal location. In some embodiments, diffuse sounds that do not have a strong specific direction may be classified as noise or background and can be assigned a lower gain. Sounds that have a strong direction and direct sound can be classified as target sounds. The adjustment of gains on a time or frequency basis can be fed into the redistribution processing.

Binaural signal level processing algorithm: When the levels in the sound signals transmitted to each ear are adjusted independently, the ILD may change, causing a perception that the sound location has changed or the sound is blurred if the auditory cues are broken. In some embodiments, the levels in the sounds may be adjusted to reduce amplitude overlap. The gaps in the amplitudes and spectral contents of the sounds are analyzed to determine whether there may be amplitude overlap. The brain can smooth over some of the inconsistencies to make sense of the new scene. For example, an interfering sound may be downward compressed into a narrower dynamic range and also reduced in level, allowing the user to still be aware of the sound, but the impact on the target sound may be reduced. As another example, a target sound may be upward compressed into a narrower dynamic range and also increased in level, making it easier for the user to hear the target sound, and the target sound may have less overlap with the interfering sound. The interfering sound and the target sound will maintain their ILD cues to ensure the perceived spatial locations are consistent. A neural network prediction system or other signal processing component, may be used to predict how much of the amplitude within a frequency band is allocated to the target sound or the interfering sound such that the appropriate amount of gain adjustment is performed. The gain adjustment should avoid create amplitude holes in target sounds or emphasizing interfering signals that should be reduced in level.

Binaural spectral content processing algorithm: In addition to controlling the spatial location and the level of sounds in an auditory scene, embodiments of the disclosure can include adjusting the spectral content. The spectral range of a sound source may be used as one way to separate sounds and reduce overlap. In some instances, moving the spectral range (e.g., shifting a person's voice by an octave up or down) may result in unnatural sounds. Small shifts in spectral range may enable separation to occur, for example by changing pitch as needed. An example could include changing the pitch of an alarm notification such that it has less impact on other audio streams that are the target in the particular scenario.

Alternatively, the binaural spectral content processing algorithm may reduce the spectral bandwidth of the interfering sound while preserving the full bandwidth of the target sound, which may reduce the overlap of the interfering and target sounds.

Figure 52B:
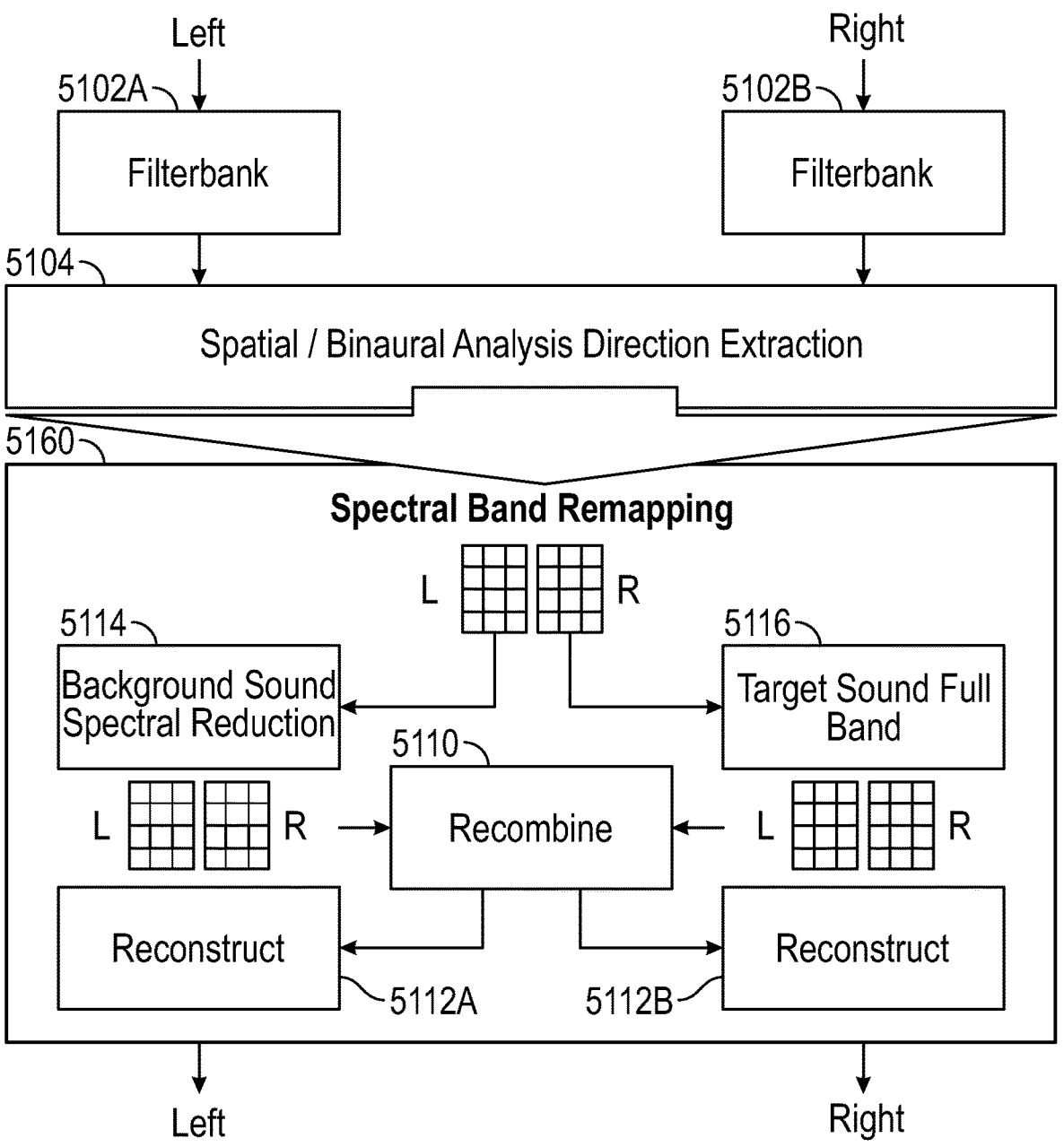

The spectral bandwidth of the interring sound could be compressed, such that frequencies are limited to a certain frequency range. The spectral bandwidth may be compressed for sound such as those having a frequency sweep (e.g., a siren from an ambulance, fire truck, police car, or for other emergency services). The reduced frequency may lead to the user still being aware of the interfering sound, but it may not overlap with target sounds In some embodiments, the interfering sound may be passed through a narrow bandpass filter to reduce its spectral energy and bandwidth. For example, as shown in FIG. 52B, the audio signal processing may include spectral band remapping 5160. The spectral band remapping 5160 may apply a background sound spectral reduction 5114 to a first signal, such as the left signal. The spectral band remapping may apply a target sound full band 5116 to a second signal, such as the right signal.

Binaural hearing enhancements algorithm: The audio system may include a binaural hearing enhancement algorithm. A binaural hearing system will significantly benefit from a hearing enhancement algorithm that doesn't only compensate for the user's hearing profile at each ear, but also emphasizes, restores and compensates for spatial information that the human hearing system needs. This can include intelligently handling noise conditions and providing consistent processing for each ear based on information from both ears.

Binaural hearing profile algorithm: The audio system may include a binaural hearing profile algorithm. The binaural hearing system and processing components can provide the necessary level, frequency and phase analysis and compensation operations to assist with restoring a user's hearing.

Intelligence can be included as part of the hearing restoration to work in conjunction with the hearing enhancement algorithms, such that target sounds are captured and processed to meet the target profile for the user's needs, but ensuring that noise and other sounds that the user does not want to hear are not passed through the same enhancements. Applying the hearing profile selectively and while maintaining binaural cues will provide far greater benefit than simply adjusting sounds to meet a loudness curve, or worse still to process the left and right ear signals completely independently.

Binaural hearing test: Include hearing tests on a specific device. The ear device can contain plugins and associated processing components that assist with hearing tests for a user. This includes capturing, analyzing and sharing information securely with other connected devices. The system can be programmed to regularly and frequently capture hearing profile information. This can be used to assist with setting target loudness settings that would benefit the user for their specific needs in different scenarios, as opposed to simply measuring hearing thresholds and determining the target loudness needs based on an average target profile that could be significantly different to the user's specific needs. The complete test procedure could be executed on the ear device with only the controls provided through a second connected device to provide a GUI to activate the test and display the resulting information. The ear device can capture an indication of the environmental noise conditions to inform the user whether the conditions meet ambient sound levels for a reliable hearing test. The ear device can compare the external and internal microphone signals that are captured to determine whether the ear device is fitted correctly or if there is leakage from the speaker out to external microphone and from ambient sound into the internal microphone. The hearing test can use the calibration information for each ear piece to determine the sound profile that is being presented to each ear of the listener. The internal microphone can also be used to capture the ear canal resonance of the listener as part of the listening test analysis. The listening test can also be programmed to work with an external loudspeaker in some cases. This will ensure that the full impact of the ear device is being considered, which includes the external microphones, as this would be missed as part of a hearing test that only uses the loudspeakers in the ear device. The use of an external loudspeaker, which is placed to present the test signals to the user wearing the ear devices, can also capture the benefit of any mechanical or acoustic advantages of the ear devices, such as their shape and number of microphones and the placement of microphones. The external speaker also captures the impact of the user's physical HRTFs. The external speaker may need to be a high quality reference speaker. The external speaker could be provided as part of the charging pod used for the ear devices.

Binaural tinnitus masking algorithm: The audio system may include a binaural tinnitus masking algorithm, which may mask sounds using the sound signals transmitted to the ear pieces. Any type of sound profile may be used as a masking sound. The masking sound may have a different amplitude and/or spectral shape than the target sounds. In some embodiments, the masking sound may be processed differently than the target sounds (e.g., music, phone call, movie sounds). Exemplary masking sounds may include noise, chimes, or tones; or sounds from a waterfall, fire, river, beach, etc. The masking sounds may be accessed via wireless communication, or it may be locally stored or synthesized.

The user may control the properties (e.g., type, level, spectral band, shape, etc.) of the masking sound using a UI on an electronic device. In some embodiments, the user may independently control the properties of the masking sound and the properties of other sounds. Additionally, the user may activate the binaural tinnitus masking algorithm using the UI of the electronic device or a voice activated interface. The properties of the masking sound may be controlled by the user and adjusted based on the user's preferences to mask the tinnitus. The user's preferences may be included in a profile stored in the audio system or electronic device. The adjusted level may be limited to within safe levels.

The binaural tinnitus masking algorithm allows the user to mix the masking sound with other sounds, such as a target sound or ambient sounds or other sounds delivered to the ear worn device. While the masking sound is being played, the user can also control the amount of ambient sound that is included in the sound signals, so that the user may still have some level of awareness of the outside world. For example, the user may be allowed to hear outside sounds when using the audio system while sleeping.

In some embodiments, sensor information (e.g., heart rate) may be used to determine the user's state (e.g., sleeping). The level of the masking sound included in the sound signals may be increased or decreased depending on the user's state and other sensor information.

Binaural misophonia reduction algorithm: Misophonia may be a stressful and emotional condition caused when a person hears certain trigger sounds. Exemplary trigger sounds include chewing, sniffing, gulping, yawning, breathing, crying, etc. The person can be very sensitive to the trigger sounds, which may cause immediate anxiety and stress. Although some ear plugs or noise cancelling headphones may be able to remove disturbing ambient sounds, they are unable to distinguish between different sounds.

The binaural misophonia reduction algorithm of the disclosure may classify certain ambient sounds as trigger sounds. The trigger sounds may be removed or have its levels reduced by the audio system. In some embodiments, the processing of the ambient sounds and trigger sounds may be performed in real-time. Additionally or alternatively, the binaural misophonia reduction algorithm may use machine learn to train NNs to remove target (e.g., offensive) sounds.

In some embodiments, the binaural misophonia reduction algorithm can be programmed to reduce or remove trigger sounds (or all sounds) originating from a particular direction or location. For example, a user may be riding a train, and the person seated behind the user may be inadvertently creating a trigger sound (e.g., sniffing or chewing). The user may activate the binaural misophonia reduction algorithm to remove all sounds originating from behind the user. In some embodiments, the trigger sound may be removed, but all other sounds may be included in the sound signals transmitted to the user. For example, the user may want to hear a ticket inspector approaching from behind the user and requesting to see the user's ticket.

An extension would be to provide masking sounds to cover the trigger sounds in addition to reducing the undesirable sounds in the spatial mixture. The masking sounds can be intentionally spatialized such that they are perceived at the location of the disturbing trigger sound to cause maximum masking. Location based masking sounds can also assist when the user is unable or unwilling to use ANC algorithms to maintain better awareness of other ambient sounds. Rather than simply increasing the level of music playback for example, a masking sound can be used at a particular location and with specific spectral content to cause maximum masking while maintaining some ambient awareness by mixing multiple streams of audio for the user's benefit.

Sound level exposure algorithm: It is becoming more common that humans are exposed to noise conditions that have an impact on every day activities. Some of these sounds can be loud, harsh or even harmful. Embodiments of disclosure may include a sound level exposure algorithm. The sound level exposure algorithm may monitor the sounds that the user's ears are exposed to. In some embodiments, the sound level exposure algorithm may be always on and/or taking measurements at periodic intervals (e.g., every second, minute, hour, day etc.). The sound level exposure algorithm may be implemented by an ultra-low power processing core, for example. The amount of sound level exposure may be tracked and used to inform the user. The sound level exposure information may be presented in the form of an audible signal or a graphical image on an electronic device (e.g., a mobile phone, smart watch, or wrist band). The graphical image may include a number or color coding representative of the determined sound level exposure. Tracking the amount of sound level exposure may include storing the sound level exposure information with a timestamp. Additionally or alternatively, the sound level exposure algorithm may determine when the sound level exposure exceeds a sound level threshold and may inform one or more components (e.g., processors, software, hardware, etc.) so that action can be taken.

The amount of sound exposure may be captured using one or more external microphones, one or more internal microphones, or both, included in one or more ear pieces. In some embodiments, the sound level exposure algorithm may use at least one microphone located in each ear piece to determine a binaural sound level exposure. In some embodiments, the sound level exposure algorithm may estimate the sound level exposure based on the proximity of the microphone relative to the user's ear canal. In some scenarios the listener's exposure to sound may not be identical at each ear, therefore requiring the need to have independent levels for each ear.

The external microphone may capture the potential natural exposure. The internal microphone may capture the actual internal exposure. The internal microphone may be located in the user's ear canal, for example. In some embodiments, the internal microphone may measure the internal exposure when the canal is open or occluded. The difference between the sounds measured by the external microphone and the sounds measured by the internal microphone may be used to determine how much protection the ear pieces are providing to the user. The difference may also provide an indication of how much of the sound the active noise control algorithm reduces or removes from the sound signals. The internal microphone may be exposed to certain sounds from the user (e.g., talking, shouting, singing, chewing, crunching, etc.) that may not affect the user's actual sound exposure. These user sounds may be removed from the sounds captured by the internal microphone to enhance the accuracy of the determined amount of sound exposure. In some cases, the user generated sounds, such as shouting, may have a significant impact on their exposure levels and should be included in the measurements. The impact of these user sounds may be reduced by the acoustic reflex, but may be increased due to the occlusion effect, both of which may be accounted for in the sound level exposure algorithm. The internal microphone may also capture the rendered sound from the speaker in the ear piece.

In some embodiments, the sound level exposure algorithm may take measurements at multiple microphone locations and compared to the measurements to a reference location in the ear canal.

In some embodiments, the sound level exposure algorithm may measure the amount of sound exposure only during times when the ear pieces are worn in the user's ears.

Since the human ear does not have flat or equal sensitivity across all frequencies, the sound level exposure algorithm may also distinguish between different frequency regions. The sound level exposure may be determined from sound level exposure information for multiple different frequency bands.

In some embodiments, the microphones may capture sound level exposure data when sound signals (e.g., music) are transmitted to the user's ear pieces. The ear device may be connected to multiple devices that are sending audio data to the user's ears. Therefore measuring sound exposure at the source device is not an accurate representation of sound exposure for the user's ears. Furthermore, many source devices are unaware of the sound level that the user has set when listening to the streamed audio content.

Hearing protection algorithm: Users may suffer from damaged hearing due to exposure to loud sounds for longer periods of time. One way to reduce the likelihood of damaging hearing is by controlling the sounds a user is exposed to. To control the sound, the audio system 100 may detect the sound level exposure, and then take action to help reduce the levels. The action taken may include providing the user with feedback so that the user can make choices that align with protecting the user's hearing.

In addition to measuring the sound level exposure, the audio system may determine how much hearing protection it has provided. This can be provided as a measure of benefit that owning and using a device has had on the user's hearing protection.

The audio system can use location information (e.g., GPS data) to identify where the user is located (e.g., next to a construction site, a factory, a busy street, rock concert, etc.) when exposed to particularly dangerous sounds. This information can be anonymously collected across multiple users to determine noise hotspots that other users may wish to avoid, or ensure that they are wearing their hearing protection system. Furthermore, the device may determine that a user is approaching a particularly noisy location and increase or adjust the sound protection algorithms and parameters to cope with the expected noise condition.

In some embodiments, the active noise control algorithm may reduce the sound level exposure. In addition to the active noise control algorithm, automatic gain control (AGC) may be used to ensure sound levels are not exceeded. AGC may include certain sounds (e.g., ambient sounds) in the sound signals transmitted to the user's ear pieces. In some embodiments, a "warning" may be provided to the user that loud sounds are coming as the signal is buffered in the audio system.

The AGC may use dynamic range compression to reduce the peak amplitude of the audio data stream, preventing the sound level from exceeding a target threshold or reducing the number of times it occurs. The dynamic range compression may be multiband dynamic range compression where the amplitude of the sounds is reduced in a specific frequency band. The multiband dynamic range compression may be applied to the sound signals transmitted to both ear pieces so that binaural auditory cues are preserved. By preserving the binaural auditory cues, ILD, ITD, and/or spectral changes may be maintained (e.g., is the same relative differences before and after the multiband dynamic range compression). As a result, differences in location, balance, delay, and phase may be consistent across frequencies between the sounds signals to each ear piece. Additionally, the spectral shape of sounds may be maintained, while the effect of flattening or equalization may be reduced.

In some embodiments, the hearing protection algorithm may reduce the sound level exposure based on single or multiple frequency bands. The sound level exposure may be reduced by the output amplification to the sound signals transmitted to the ear pieces. Additionally or alternatively, the sound levels for other audio sounds (e.g., music playback, ambient sounds, etc.) may also be reduced. Furthermore, the sound received from other sources may be limited in signal level and the user may be prevented from making them louder based on their recent sound exposure level.

In some embodiments, multiband dynamic range compression may be used to reduce the amplitude of the sounds in certain frequency bands, where the same reduction may be applied across adjacent frequency bands so that there is a consistent spectral reduction.

In some embodiments, the multiband dynamic range compression may increase the amplitude of quiet sounds such that the overall output amplitude of the audio system 100 may not be continually adjusted. As a result, the user may not have to increase the volume level for quiet songs and then reduce for loud songs, for example. In some embodiments, the multiband dynamic range compression may increase the amplitude of quiet sounds to a higher target level when the audio system determines that the user is located in a noisy scene. In some embodiments, the multiband dynamic range compression may increase the amplitude of quiet sounds to a lower target level when the audio system determines that the user is located in a noisy scene, but another algorithm (e.g., active noise control) reduces the level of loud sounds included in the sound signals to the user's ear pieces. The algorithms can work together to deliver a safe level of mixed sounds.

In some embodiments, the hearing protection algorithm may determine that the expected output level of the sound signals transmitted to the user's ear pieces could be at or near a pre-determined threshold. The hearing protection algorithm may slowly reduce the output level in small steps (e.g., fractions of a decibel over several seconds or minutes) so that the reduced output levels may not be noticeable to the user. Additionally or alternatively, the hearing protection algorithm may access an audio data stream and mix it with the sound signals transmitted to the user's ear pieces. In some embodiments, the level of the sound signals transmitted to the user's ear pieces before mixing may be reduced to allow head room for the mixed in audio data stream. In some embodiments, the audio data stream may be mixed in when the sound signals transmitted to the user's ear is sufficiently quiet to provide the head room. In this manner, the exposure level of the mixed audio data may not be at or exceed any sound exposure thresholds.

The hearing protection algorithm may allow the user to override one or more hearing protection functions. In some instances, the user may want to override the hearing protection functions temporarily to hear a sound having a louder level for a short period of time. For example, the user may want to hear the sounds from a siren, which may have a very high sound level.

Acoustic shock protection algorithm: The acoustic shock protection algorithm may be programmed to prevent or may reconfigure one or more loud sounds from being included in the sounds signals transmitted to the user's ear pieces. The loud sound(s) may be reconfigured by processing them. In some embodiments, the acoustic shock protection algorithm may ensure that the level of the sound signals transmitted to the user's ear pieces do not exceed a pre-determined sound level threshold.

In some embodiments, the acoustic shock protection algorithm may be triggered when there is a spike in the sound signals received from the ear pieces. The spike may be determined by the amplitude and the time gradient of the sound signals. In some embodiments, the acoustic shock protection algorithm may reduce the time between detection and reaction to these spikes.

In some embodiments, the acoustic shock protection algorithm may be triggered by an event that may be linked to high sound levels. This could be a user initiated trigger or a signal from another device, such as an object that is capable of creating very large levels of sound, for example a loud vehicle engine or a weapon, sending a wireless notification that a sound level is about to be transmitted to the user that is unexpected and may be at a high level.

NN-based algorithms for hearing applications: The audio system may include several NN-based algorithms for hearing applications. One NN-based algorithm may involve training a real-time NN using reduced data width coefficients. For example, 8-bit coefficients are much more efficient to implement in embedded processors with limited SIMD operations, than 32-bit or 16-bit coefficients. The reduced coefficient data width may not have a significant impact on output audio quality depending on the type of NN. But the reduced coefficient data may have an impact on reducing the overall processing load, leading to reduced power consumption. In some embodiments, the reduced data width coefficients algorithm may be implemented when operating in low power mode. Additionally or alternatively, the number of lanes for processing may be increased (e.g., use eight lane processing, instead of two or four lane processing) and the processor may switch to using different coefficients. In some instances the system may detect that some of the neural network coefficients are zero of very close to zero and therefore can be replaced by a NULL output operation to reduce the number of multiplication operations.

Another NN-based algorithm may create multiple NN models that can handle different potential acoustic scenarios. In some embodiments, the audio system may switch between different NNs. When switching, the audio system may implement a smooth transition having at least two NNs running in parallel for short period of time, while there is an audio (e.g., coefficient) crossfade between them. It may use a coefficient crossfade (if that is possible). Different NNs may be of different sizes and complexities. Some simple acoustic scenarios may use small NNs and short coefficients. Some complex acoustic scenarios may use bigger NNs. The DSP may be programmed to handle NNs having different sizes and complexities. In some embodiments, the management of the NN models maybe based on power consumption. The NNs (or other processing) could come from different suppliers and be part of different plugins. For example, a noise reduction plugin could be from a first manufacturer, a wind noise plugin could be from a second manufacturer, and a conversational enhancement plugin could be from a third manufacturer. The DSP may be programmed to run multiple plugins simultaneously and independently.

In some embodiments, a scenario identification algorithm may be used as a pre-processing NN to identify the type of scenario the user is in. Based on the categorization of the auditory scenario, a different processing NN may be selected to deal with the sounds (e.g., noise, multiple people talking around the user, background music, outside traffic, etc.). The scenario identification algorithm may determine the scenario and then load the appropriate NN for the scenario. In some embodiments, the scenario identification algorithm may transition between NNs.

Another NN-based algorithm may be the subjective training algorithm. Binaural audio scenarios may be scored by subjects (e.g., using standard methods for speech quality, noise quality, intelligibility, etc.). The results from the scoring may be used to train an NN so that it can reliably score new binaural auditory scenarios that were not part of the subjective tests. A second NN may be used to process, separate, and enhance binaural auditory scenarios. The output of the second NN may be scored using the first NN to determine the performance of the second. Multiple iterations of training can be used to improve the second NN. The second NN may be trained on a small subset of scenarios, rather than a huge set, to make a specialist NN for a particular auditory scenario. As more data becomes available, the second NN can be improved and also specialized for certain types of auditory scenarios. For example, the second or the specialist NN can be trained for evaluating factory noises and conversations in the presence of large machinery such as at construction sites. The evaluation of a scenario may be done as a complete audio clip and as short time slots of audio data in real-time. The results may be compared against the scores.

The NN mixing and transitions algorithm may include a method of transitioning between the coefficients of two NNs, a first NN and a second NN to enable a smooth user experience. In one embodiment, the transition may include stopping processing with the first NN, pause the input audio data stream, switch over all the coefficients to the second NN, and then restart. The mixing and the transitioning could happen in the time domain or the frequency domain on each frequency bin before reconstruction of the signal.

In some embodiments, the mixing and transitions between different NNs could be performed at the last layer of the NN.

Exemplary Drivers

The development platform may use drivers to connect and control a plurality of peripheral components. Additionally, the drivers may be used for interfaces and audio data stream access and communications between components (e.g., loudspeakers, light emitting diodes (LEDs), USB devices, Bluetooth devices, etc.) using drivers.

Figure 53:
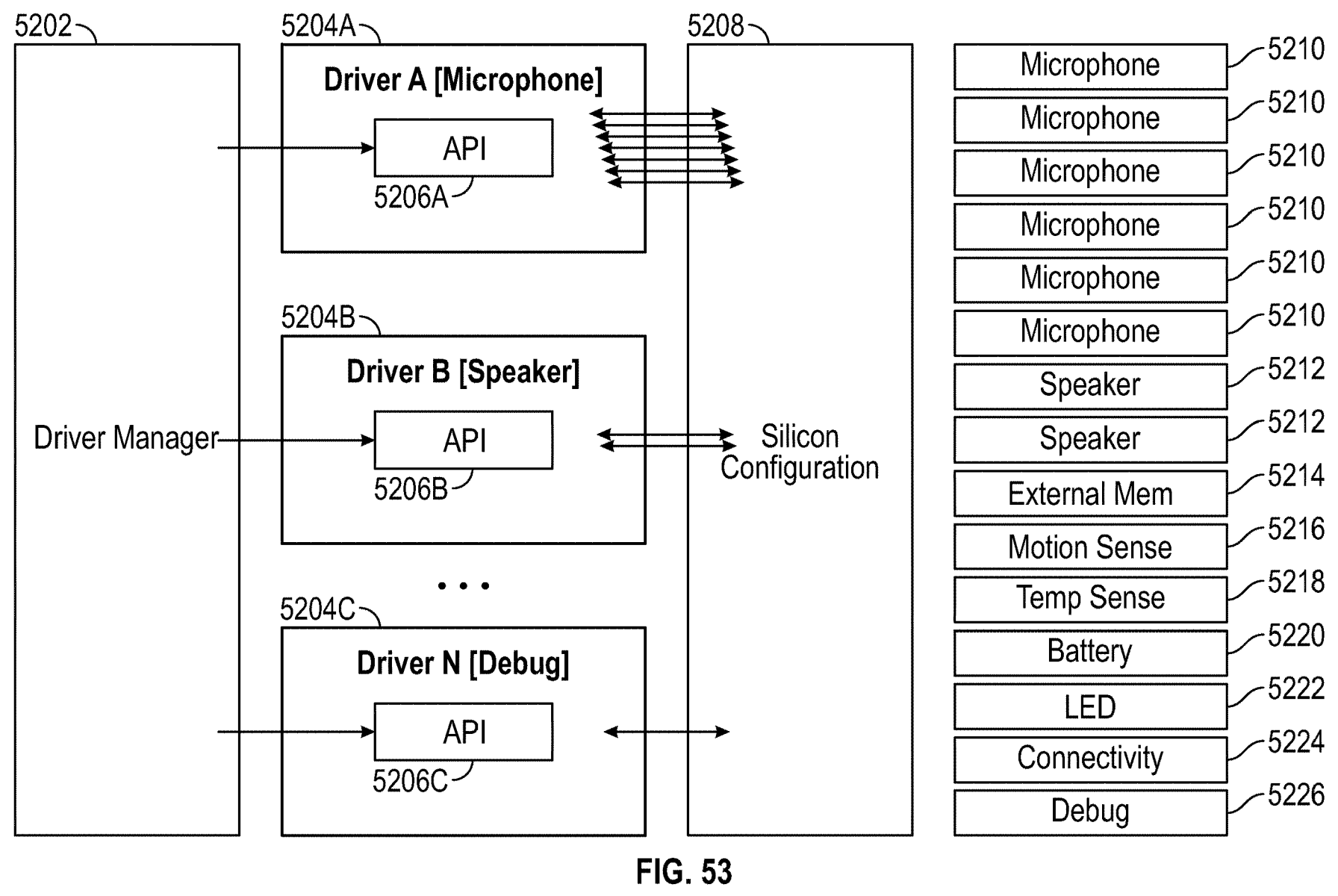

FIG. 53 illustrates a diagram of an exemplary connections associated with a driver manager 5202, according to some embodiments of the disclosure. Peripheral components may be capable of being connected and controlled by the development platform. Exemplary peripheral components may include, but are not limited to, microphones 5210, speakers 5212, sensors (e.g., temperature sensors 5218, motion sensors 5216, heart rate sensors, etc.), external memory 5214, transceivers, clocks, battery 5220, LED 5222, connectivity 5224, chargers and power supplies, debugging tools 5226, and controllers (e.g., mixing controllers).

The peripheral controllers may enhance the capabilities and performance of the development platform. For example, a mixing controller may allow the user to create a balance of the properties of the audio data streams to achieve a certain overall audio output. The user may be able to control (e.g., set the gains) audio data streams including certain sounds, control (e.g., mute) low latency audio data streams for cancelled sounds, and combine the two to achieve the overall audio output.

In some embodiments, the driver manager 5202 may interface with one or more APIs (APIs 5206A, 5206B, 5206C, etc.) included in one or more drivers (drivers 5204A, 5204B, 5204C, etc.) The drivers may be included in a silicon configuration 5208.

Exemplary System Data

Embodiments of the disclosure may include using a combination of hardware and software to execute many different applications and user experiences. The different applications and information for the user experiences may access and read or include data that is shared (e.g., system data) among the applications, functions, processes, etc. in the audio system 100. The applications may be executed simultaneously, for example.

The system data may be read, updated, or written by multiple applications, functions, and processes. Examples may include ones associated with microphones, temperature, heart rate, motion, head tracking, etc. In some embodiments, the audio OS may place limits on the size of system data written by a single plugin or process. The audio OS can manage the system data and control access.

In some embodiments, the OS may provide dedicated memory pools for system information. Plugins, processes, tasks, software modules, hardware modules and other functionality within the system may request system memory or access to existing system memory. The application within the device may manage the access of system functions and memory pools. For example, the application may store the sensor data for the device in system memory so that it can be shared with other components of the system. If the system memory is needed for other applications and plugins that the user is requesting, the OS may reduce the system memory pool to free more space for other components to use.

The applications may store the measurement and/or analysis in a shared memory space, for example. The system data may be stored locally (e.g., internal to the device) or externally. The system data may be provided to other applications, functions, and/or processors. The system data may include personal information and user preferences (e.g., sound level preferences, spectral shape preferences, etc.). The system data may additionally or alternatively include metrics. In some embodiments, system data may be provided to external devices or components (e.g., an electronic device, a network, etc.). In some instances, system data may be marked as personal (e.g., access by the user only) and/or private (e.g., encrypted). The system data may be different for each ear piece, in a binaural system, such as device specific configuration and calibration data.

The system data may be read, updated, or written at different time intervals, in some embodiments. In some embodiments, one or more portions of the system data may be read only. In some embodiments, one or more processors may be given read only access to the system data, and one or more processors may be given write only access. In some embodiments, a limit may be placed on the number, type, and/or selected processes that have access to system data.

Individual processes or plugins may have access to additional information. For example, a spatial renderer may alter the virtual locations of sound sources or signal processing enhancements when it has access to head tracking information or ambient sound levels. Another example could be an ambient sound processing plugin that adapts its processing based on the acoustic properties of audio system, given by the phase and amplitude response for different frequencies of the microphones and speakers in the audio system.

Another example could be the amount of signal processing a plugin may be adjusted depending on the current battery level of the product.

An example of an architecture that enables system information sharing is shown in FIG. 54. The system may communicate with one or more sensors 5302. One or more sensor data analysis plugins 5304A, 5304B, 5304C, 5304D, 5304E, 5304F, 5304G, 5304H, 5304I, and 5304J may provide the system data.

The system data may have different properties depending on the type of data in the system data pool 5326. For example, signal processing plugins 5330A, 5330B, 5330C, 5330D, 5330E, and 5330F may process sensor data at different time intervals (e.g., the user's temperature may be measured once every 20-30 minutes). Ambient sounds experienced by the user may be analyzed on a much shorter time window, such as every second. System acoustics may be calibrated once a day when the devices are charged and may not change significantly over time. Exemplary data may include, but are not limited to, battery level data 5306, user preference data 5308, temperature data 5310, HRTF data 5312, motion data 5314, heart rate data 5316, ambient sound data 5318, sound exposure data 5320, head tracking data 5322, and other data 5324.

The audio system also allows for metrics (e.g., sound level exposure, calibration information for microphones and speakers) to be captured, analyzed, and/or stored to monitor the performance of the ear pieces over time. The system can adapt processing to compensate for small deviations in performance. For example, the calibration information for microphones and speakers may be analyzed to determine whether the microphones and speakers are working properly. The system can notify the user when major component deviations or failures are detected. The system can automatically notify a manufacturer when a component or the audio system has failed and may be replaced. The system can determine that a user is exposed to a lot of loud sounds and make recommendations for signal processing upgrades or suggest periods of time to reduce exposure.

Exemplary Electronic Devices

The audio systems of the disclosure may communicate with an electronic device (e.g., smart phone, tablet, smart watch, laptop computer, etc.). In some embodiments, the electronic device may be a portable electronic device. The electronic device may allow the user to control, operate, and receive information from the audio system. In some embodiments, the user may control, operate, and receive information via a UI (e.g., GUI). For example, the UI may provide the user with information related to the status of the audio system, the processing used, and certain metrics.

The development platform may be programmed to connect to an electronic device. The electronic device may connect through a debug port, for example, to receive audio data from and transmit information to the development platform. In some embodiments, the development platform and the electronic device may communicate timestamps so that the two are synchronized (as discussed above).

When connected to the development platform, a user may be able to use the electronic device to simulate the sound signals being processed by the electronic device. To simulate and analyze the sound signals, the development platform and electronic device can communicate information to each other such as messages, settings, parameters, configuration information, performance information, etc.

Figure 55A:
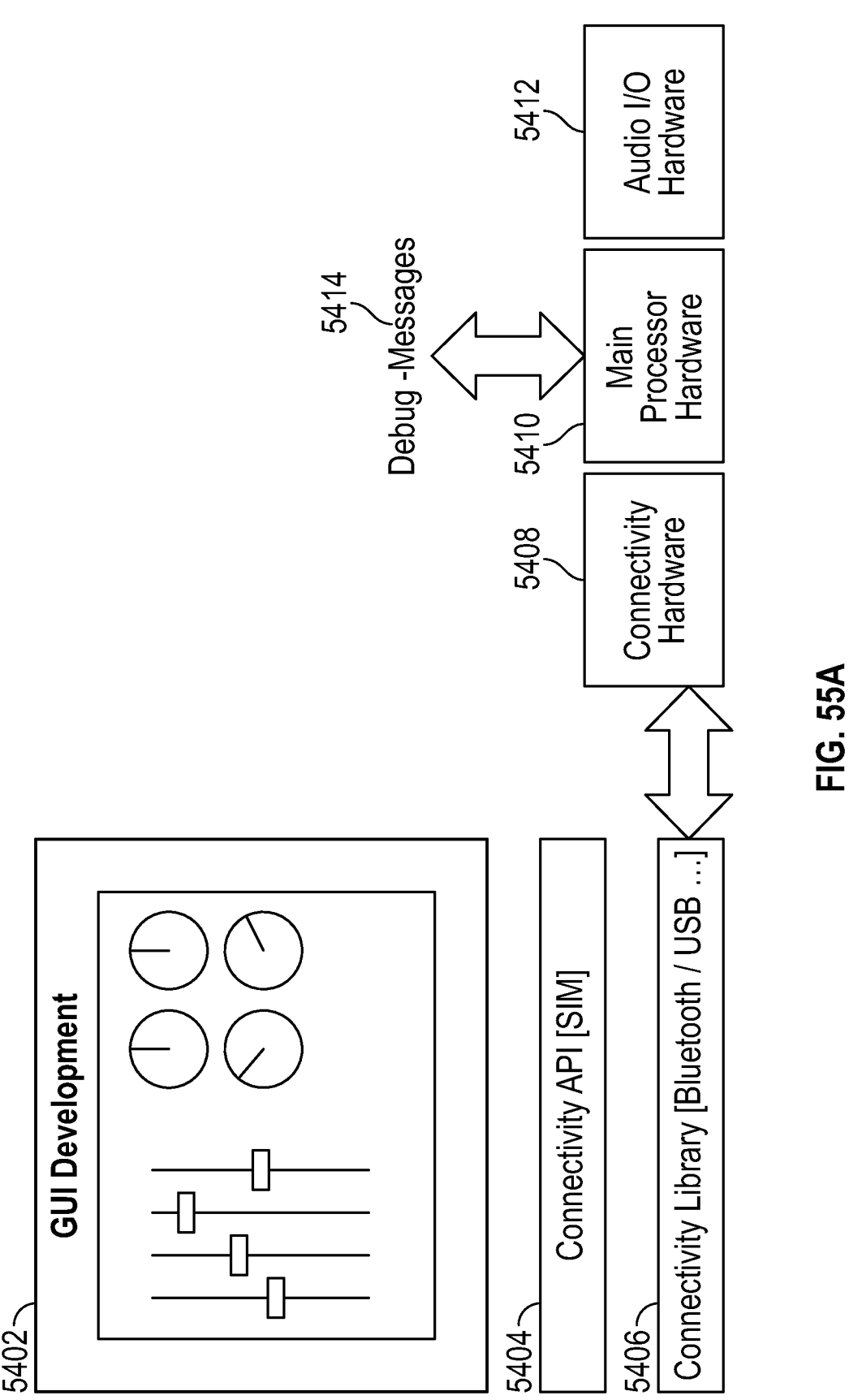

FIG. 55A illustrates a diagram of an exemplary GUI developed independently from connectivity, according to some embodiments of the disclosure. In this configuration, the developer is able to create a GUI that connects to the specific hardware that it is communicating with. This allows the GUI to be tested with real hardware that uses the communications protocols and has real time responses to messages. This allows the developer to create bidirectional data flows and test metrics to ensure the GUI is correctly representing the intent of the algorithm processing.

Figure 55B:
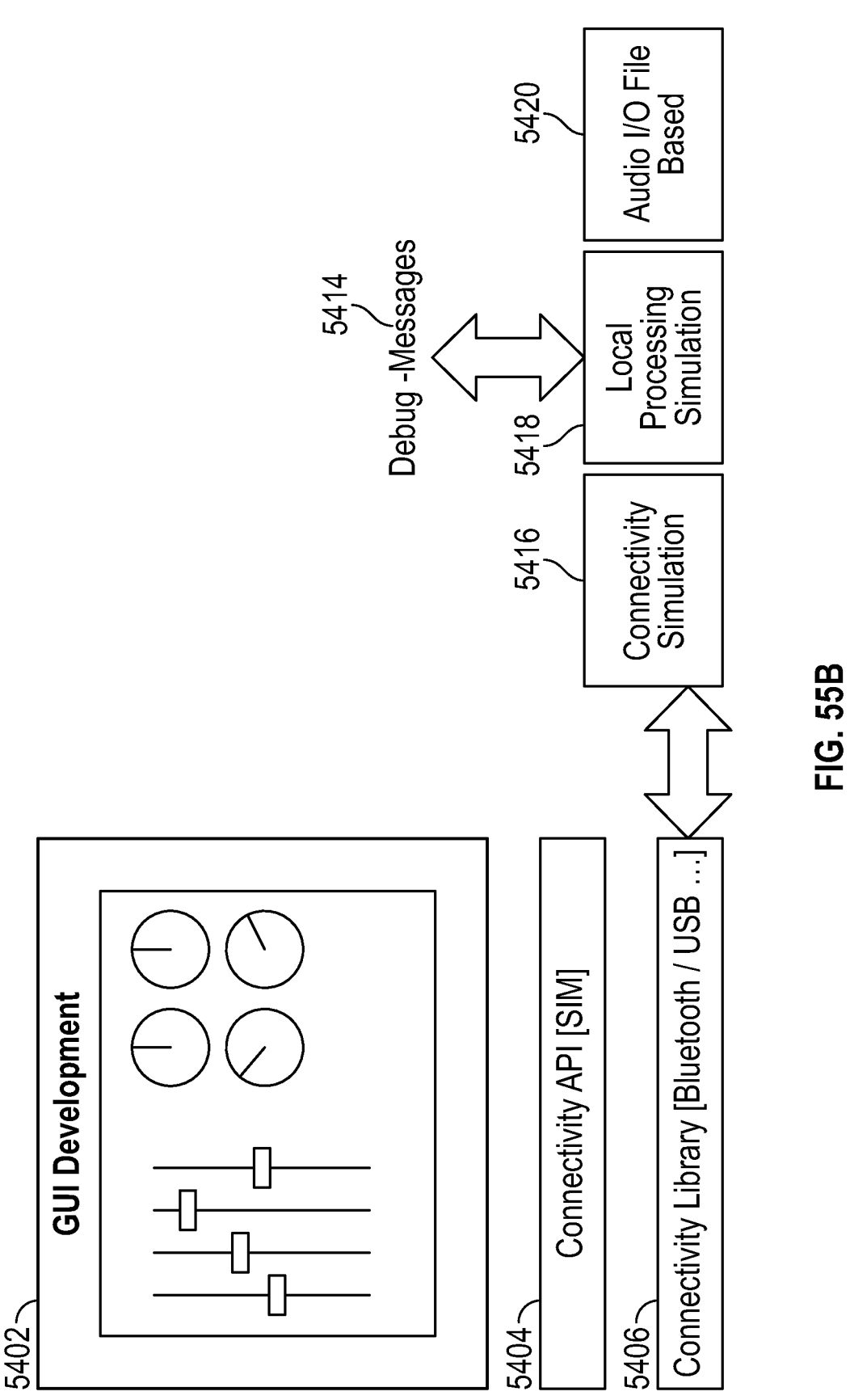

FIG. 55B illustrates a diagram of an exemplary GUI developed independently from connectivity, according to some embodiments of the disclosure. In this configuration, the developer is able to create a GUI without access to the specific hardware that it is communicating with. Instead a simulation of the hardware is provided to represent the communications protocols and responses to messages. This allows the developer to create bidirectional data flows and test metrics to ensure the GUI is correctly representing the intent of the algorithm processing.

The system allows developers to create a new skin or graphical interface for an application based on the plugins that are in the system without knowing exactly what the plugin user interface needs This allows a signal processing plugin developer to create public, protected and private APIs for their plugin. Public APIs can present a control parameter interface that allows an independent developer to create a controller for that parameter. For example, plugin developer A creates a plugin that requires a level to be set which is used by the processing algorithm to determine the target output level to be achieved based on the amplitude of the input signals. Application developer B can create an interface that sends control messages to the plugin to set the level, in the desired data format and within the desired data range, such as floating point number between 0 and 10. Application developer B can provide a graphical user interface on a device, such as a slider, a rotary knob, array of buttons etc. that provide controls that are mapped onto the level parameter in the audio processing plugin. The application may be running on a separate device where the parameter change messages are sent over a communications channel (such as wirelessly using Bluetooth or BLE, or USB, or as analog voltage changes on a cable). The receiving device passes the control data to the relevant plugin that is registered to receive those messages.

In some embodiments, the link between application interfaces and processing plugins can allow a system where multiple applications can control a single plugin—for example a graphical user interface on a phone can set the output level, in addition to a wearable device that has a different control interface such as a dial, for setting the same level in the plugin, in addition to a touch control surface on the ear worn device that can be used to set the same level for the plugin. A single application can control multiple plugins through a single interface, such as a control panel on a tablet. A single application can control multiple connected devices, which can also be a control panel on a tablet, for example if a teacher wants to pause audio streaming for a class room of students and activate their ambient listening mode so that they can hear what the teacher is saying, while receiving notifications directly from the teachers tablet.

Embodiments of the disclosure can include using the audio system to control (e.g., lock, unlock, declare as missing, deactivate, etc.) an electronic device. The user may also notify a manufacturer that the audio system is stole, broken, or missing. The manufacturer may be able to determine if the stolen/broken/missing device is being used, and if so, the account of the user that is using it. The audio system may be coupled to the electronic device a configuration tool through a standard interface such as USB, Lightning, Bluetooth, WiFi, etc.

The electronic device may be unlocked through biometric information, such as an ear print or voice command recognition. In some embodiments, the audio system may send the electronic device a command requesting that it be unlocked to allow the electronic device to be programmed with new parameters, software, resources. The user may wear the electronic device during the configuration. In some embodiments, the audio system may send an electronic device a command requesting configuration access and responds with configuration and resource information.

When the electronic device is coupled to the audio system (without the development platform), the electronic device may send real-time audio data or biometric data to the configuration tool in the dashboard. Exemplary audio data may include external acoustic audio data (e.g., noise level) and output sound level. Exemplary biometric data may include an ear print, a voice print, heart rate, temperature, and motion.

UI: In some embodiments, sound signals may be individually detected, processed, and enhanced, specific to a particular scenario. In some embodiments, the user may be allowed to customize the balance of sounds by controlling the properties of each sound signal via, e.g., a UI. The user may use an application that allows the users to select specific settings. The settings may enable the sound signals received by the user's ears to have properties specific to the user's scene. For example, a user may have a first setting for a first scene, such as a busy coffee shop. The first setting may enable the user to hear a conversation with higher amplitudes, while the background noises from the coffee shop may be filtered out (e.g., reduced amplitudes). The user may also have a second setting for a second scene, such as a quiet outdoor backyard. The second setting may enable the user to hear the audio from an audiobook, while also hearing outdoor noises (e.g., birds chirping).

In some embodiments, the settings may enable the sound signals received by the user's ears to have properties specific to the user's preferences. For example, a user may be located in a first scene, such as a busy coffee shop. A first setting may enable the user to hear a conversation with higher amplitudes, while the background noises from the coffee shop may be filtered out (e.g., reduced amplitudes). A second setting may enable the user to hear the background noises, for example, such as the music being played from the speakers at the coffee shop.

In some embodiments, the user may be able to dynamically (e.g., in real-time) switch between different settings or adjust the settings. Additionally or alternatively, the switch or adjustment may be based on pre-determined settings, pre-determined factors (e.g., a certain time of day or location), or both. The settings may be based on one or more factors such as the scene, user's preferences, monitored information (e.g., biometric information), and the like. In some embodiments, the audio system may automatically switch or adjust the settings. The automatic switch/adjustment may be based on natural sounds monitored by the audio system, an electronic device coupled to the audio system, or both.

In some embodiments, the settings may be based on ambient awareness. In some instances, removing all ambient sounds (e.g., active noise cancellation) may create an unnatural scene and usually leads to distortion of the sound source due to over processing. Complete isolation of active noise cancellation may be uncomfortable in some scenarios.

This discomfort and disconnection from the original ambient sounds may cause the user to use more effort to listen for long periods of time. Instead, a user may want to "turn down the world," and may do so via the customized settings.

There may be a range of ambient awareness, as shown in FIG. 56. At one end of the range, the user may want to enhance sounds, making the sound signals easier to hear. At another end of the range, the user may want to remove as much sound as possible. In between the two ranges, the user may want to pass through the sounds in a "transparent" manner, where the user may feel as if he or she is not wearing an audio system. Alternatively, the user may want to reduce, but not remove, the level of sounds and noise.

To adjust the settings of the sound signals based on ambient awareness, sound signals may be categories according to sound groups. In some embodiments, sound groups can be based on source of sound. A first sound group includes target sounds. The sound signals may be ones that the user is most interested, and thus wants to pay the most attention to. Example target sounds include, but are not limited to, a person or group of people talking where the user would like to participate in the conversation, music that the user wants to listen to, sounds related to a particular task (e.g., bubbling sounds from water boiling in a pot in a kitchen).

A second sound group includes background sounds. Background sounds may be sounds a user wants to be aware of so that the user can understand the scene. For example, the user may want to be aware of people talking to understand whether the scene is densely populated. As another example, a user may want to hear machine noises to understand whether machines in the scene are operating. And yet another example involves announcements made on public transport (e.g., a train that user is riding) that the user may want to hear so that the user does not miss the information.

A third sound group includes unwanted sounds. For some scenarios, a user may want to completely remove or reduce the noise sounds around the user. The cancellation or reduction of noise may allow the user to feel isolated from unwanted sounds.

In some embodiments, sound groups may be based on the sound's dynamics or rate of change. For example, some sounds may be constant noise, such as noise from airplane engines, cars traveling on the road, and air conditioning in an office. In some embodiments, the settings may be adjusted such that constant noise is not completely removed as subtle changes in constant background noise may provide the user with information to enhance the perception of the scene (e.g., the engine and road noise of a car may provide the user with information regarding the driving surface, the vehicle speed, etc.).

In some embodiments, sound groups may be based on specific tasks. For example, a user may be receiving verbal instructions from a work colleague in a busy kitchen. The user may also have to be able to hear other sounds, such as a timer alarm from an oven and additional verbal instructions from a second colleague, at the same time. The human brain has the ability to quickly switch attention to different sounds based on the dynamics of the auditory scene and the tasks the user is focused on. The audio system may not hamper this ability and may enhance the auditory cues to the user's brain.

Exemplary User Inputs

The audio system may include peripheral devices and external input sources that gives the user other ways to control the audio system. The peripheral devices and/or external input sources may simplify the UIs and inputs using the electronic device, the ear pieces, or both. For example, although the electronic device may include a UI that includes a combinations of buttons or a touch sensitive surface that accepts swipes and taps, the multitude of options may complicate the UI. Buttons with multiple clicks, or swipes, may be difficult for the user to remember and use effectively. User input on smaller electronic devices be even more difficult. Due to the location of the ear pieces, the user may not see them when being worn. Also, any physical contact with the ear piece may add sounds transmitted to the ears and additional pressure, where the ears may be sensitive. Configuring the ear pieces to receive user input may be an issue, especially for small ear pieces that are held in place in the ear canals.

Embodiments of the disclosure may include user inputs and a UI that does not involve or reduces the amount of the user touching the ear pieces to control the audio system. Exemplary ways to receive user inputs may include gestures, voice control, and electronic devices that are connected to the ear devices through a wired or wireless connection.

The user may use gestures, such as hand and head movements, to control the audio system. The gesture may be detected by sensors in the audio system, for example. The movements may be translated into specific commands to control the functions of the audio system. In some scenarios, gestures are a preferred form of UI since they do not require the user to touch the ear pieces or an electronic device and they do not require the user to make a sound. Exemplary gestures may include, but are not limited to, waving the user's left hand near the left ear piece to skip to the next track when streaming music, moving the user's right hand upwards near the right ear piece to increase volume, and moving the user's hand downwards to decrease volume.

The user may also use voice control. Voice control may include using spoken commands and other sounds to control the functions of the audio system, such as teeth clicks, tongue clicks, whistling etc.

Additionally or alternatively, the user may use the electronic device to control the audio system. The electronic device may be separate from the ear pieces. One example electronic device may be a pod embedded in a cable of the audio system, for example, to control volume, skip tracks, initiate a phone, or answer a phone call. Another example electronic device may be a wireless unit such (e.g., a wearable device such as a smart watch, smart bracelet, or neckband). Additionally or alternatively, the electronic device may include other wired or wireless electronic devices such as tablets, laptops, and mobile phones that can provide a detailed UI and a richer control surface.

The user input may be used for controlling the level of sounds. In some embodiments, sounds may be grouped into categories, such as target sounds, background sounds, and noise (e.g., unwanted) sounds. The audio system may provide controls for independently adjusting the level of each sound category.

The audio system may separate the sounds in the scene for each ear. The separate sounds may be then remixed together to create a new user defined scene. The user can select the level of the sound categories to be in the new user defined scene that meets the user's personal and scenario-based needs or wants.

In some embodiments, the user may control the levels of the sounds using separate controls. Exemplary controls may include sliders, dials, and buttons. The controls may be presented to the user via a UI on an electronic device (e.g., smart phone, tablet, or personal computer). Additionally or alternatively, the controls may be physical controls on an electronic device (e.g., wrist band, ring, smart watch, or other wearable computing device). A wearable computing device may allow the user with a discrete method to adjust the hearing conditions so that the user may better interact in different scenarios. For example, the user may temporarily reduce the background noises and unwanted sounds when ordering a beverage in a busy cafe.

FIG. 57A illustrates an exemplary electronic device programmed to receive user input for the audio system, according to some embodiments of the disclosure. Electronic device 5606D may include a plurality of control dials 5602 that may allow the user to control the sound levels. In some embodiments, a first control dial 5602 may be used to increase the sound levels, and a second control dial 5602 may be used to decrease the sound levels. The control dials 5602 may be continuously rotating components that allow the sound to be controlled. Electronic device 5606D may be a wristband, for example. In addition, the dials may be assigned a sound category, such as a first dial controls the level of target sounds, the second dial controls the level of background sounds and the third dial controls the level of noise. Rotating the dials will adjust the level, either increasing or decreasing the sound level for each sound category independently.

FIG. 57B illustrates an exemplary electronic device programmed to receive user input for the audio system, according to embodiments of the disclosure. Electronic device 5606E may include a plurality of control rings 5604 that may allow the user to control the sound levels. In some embodiments, a first control ring 5604 may be used to increase the sound levels, and a second control 5604 may be used to decrease the sound levels. The control rings 5604 may be continuously rotating components that allow the sound to be controlled. In some embodiments, the control rings 5604 can include limiters to limit the volume control to within a range (e.g., volume levels 1 to 10). Electronic device 5606E may be a wristband, for example. In addition, the control rings may be assigned a sound category, such as a first ring controls the level of target sounds, the second ring controls the level of background sounds and the third ring controls the level of noise. Rotating the rings will adjust the level, either increasing or decreasing the sound level for each sound category independently.

FIG. 57C illustrates an exemplary electronic device programmed to receive user input for the audio system, according to embodiments of the disclosure. The figure illustrates a portion, such as the display, of an electronic device 5606F, such as a smart watch. Electronic device 5606F may include a plurality of sliders 5606, which may be UI 5608 controls that allow the user to control the sound levels of the sounds in each of the sound categories. Although the figure illustrates three sliders 5606, examples of the disclosure may include any number of controls and any number of sound categories and more controls. For example, additional or alternative controls and sliders 5606 may be used to control the spectral shape and equalization of the sounds transmitted by the audio system.

In some embodiments, the UI 5608 for an electronic device 5606F may be used for controlling the focus region for the ear pieces, such as shown in FIG. 57D. Binaural signal processing allows for the spatial scene to be manipulated and controlled. The UI 5608 may allow the user to select which regions of a scene they would like to listen to and which regions of a scene they want to remove. The UI 5608 may implement the scene manipulation algorithm, for example, to apply certain signal processing in certain regions. The user may select the area around the graphical image of the head as the focus region using a first control. The focus region may be the entire circle, or a smaller region (e.g., 30 degrees from the center). The width of the region can be controlled using the UI 5608 on the electronic device 5606F (e.g., a smart watch, a wristband, or a ring).

The UI 5608 may include controls such as rotating wheels or a touch screen with dials or sliders on it. A second control could be used to adjust the center of the region of focus. The center may initially be in front of the user and then the user may rotate it using the second control. If the width of the region is 360, it might have no effect. Thus, the UI 5608 of the electronic device 5606F may provide the user the ability to define and control the region to hear sounds, and the audio system may implement the input information. For example, the binaural scene manipulation algorithm may create the quiet region based on the user defined focus region.

In some embodiments, the gain profile of the sounds may be applied to the center of the focus region. The audio system may amplify the sounds in the center, and then may gradually reduce the amplitude closer to the edges of the defined focus region. Outside of the focus region, the sounds may be reduced by the same amount, for example. The UI 5608 may also allow the user to control the sound levels in the focus region. Another control may include the sound levels outside the focus region. The sound levels outside of the focus region may be less than or more than the sound levels in the focus region.

As shown in FIG. 57E, the audio system may be programmed to create a smooth amplitude transition between the focus region and the regions outside of the focus region (e.g., the quiet regions). In this manner, sounds may not be perceived as abruptly changing in sound levels as the user moves their head, or the sound sources move.

Although the figures illustrate two regions, a focus region and a quiet region, examples of the disclosure may include any number of regions and other types of regions. The above disclosed signal processing algorithms may be used to independently configure the properties of each region. The properties may include more than just sound levels. For example, the user may want more noise reduction and target sound enhancement for a target region. A user may also want less noise reduction and a reasonably consistent ambient awareness of a non-target region. The audio system may allow user-controlled noise reduction by region, useful for multiple scenarios (e.g., workers in a noisy scene, such as a factory, that want to block out noise around them, but hear the sounds from their target region).

Exemplary Charging Pod

Embodiments of the disclosure may include a charging pod programmed to charge the ear pieces when coupled to the charging pod. The charging pod may be included in a case that houses the ear pieces. The charging pod may be acoustically isolated from external sound, for example. The charging pod may allow the ear pieces to rapidly charge. The charging pod may charge both ear pieces individually or simultaneously. The charging pod can also provide many other functions.

The charging pod can also act as a data gateway, as shown in FIG. 58A. This allows one or more devices to connect to the charging pod using data input 5702, which may have multiple different input data formats, standards, rates etc. The charging pod can then provide connections to multiple other devices such as ear buds and other devices 5708, acting as a connectivity converter. Multiple input and output formats can be supported by the conversion pod. One combination that this enables is that it that supports many different variations of the Bluetooth standard, for example. In some embodiments, the charging pod may enable a single wireless connectivity standard, such as the latest low power Bluetooth Low Energy version, to be implemented in the ear pieces. The charging pod can include a dual mode radio to couple with ear pieces having older or newer versions of the standard. The charging pod may convert the received data into the format for the new Bluetooth version and transmit it to the ear pieces using the format for the new Bluetooth version.

The charging pod may include a connectivity hub. In some embodiments, the charging pod may be programmed as a wired connection hub. For example, the charging pod may be programmed as a USB hub. A personal computer may connect to the charging pod to its soundcard and then stream high quality audio to the ear pieces, while simultaneously charging the battery for the ear pieces. In some embodiments, the charging pod may be connected through Lightning or other high speed data connections. In some embodiments, the charging pod may provide a Wi-Fi connection point to enable wireless streaming to the ear pieces.

The charging pod can also act as a connectivity gateway to enable industry standard connectivity formats, such as WiFi, Bluetooth, and USB to provide data to a custom connectivity interface that a manufacturer wishes to use for a performance advantage and to keep proprietary. Similarly, a device manufacturer, such as a smart speaker, smart watch, mobile phone, laptop or a proprietary data streaming device such as a USB dongle, may wish to implement a proprietary connectivity interface. For example, using lossless audio transfer over a wireless connection that is outside the specification of an industry standard wireless connectivity platform. This could allow a significant advantage for data streaming for high quality audio devices. The charging pod can receive this proprietary data stream and convert to a standard link that regular ear devices can connect to, even with reduced bandwidth and performance if needed.

In some embodiments, the charging pod may be used to transfer data into and out of the ear pieces. This is shown in FIG. 58B, where the ear buds are located in the charging pod for data transfers. The data transferred may include metrics and other performance information. In some embodiments, the audio system, charging pod, or both may provide recommendations to improve the performance.

The charging pod may also include a screen or touch screen with graphical user interface. This could be similar to that implemented for a smart watch or mobile phone device. The charging pod could use an industry standard operating system such as Android to enable access to the established ecosystem of applications. The system can support the concept of an application dashboard to remove the need for a mobile phone to be part of the ecosystem. The dashboard can provide access to all the user's plugins for the ear devices.

The charging pod can also be used across multiple users. For example person A has a charging pod that displays all of their settings and parameters. Person B does not have their charging pod with them, but wishes to charge and update their ear devices. The charging pod can accept another user's devices and provide the same services as if they were using their own charging pod. The Person B profiles are determined by the user identification information stored in the ear pieces. The charging pod can then connect to the relevant cloud database to temporarily access their information and then revert back to the Person A configurations when Person B has disconnected.

The charging pod could also include one or more external speakers so that audio data be sent to it, and it could play the audio data. FIG. 59 illustrates an exemplary charging pod, according to some embodiments of the disclosure. The charging pod could be programmed as a USB speaker to play audio, while the ear pieces are charging in the charging pod. In this configuration the charging pod contains internal and external loudspeakers. The internal speakers are used for calibration functions of the ear devices. The external speakers are used as notification and music playback speakers so that the charging pod can provide audio streaming when the ear pods are being charged. This can be connected through a wireless connection such as Bluetooth or a cable connection such as USB. This allows developers to create audio plugins for the charging pod, when used as a loudspeaker, in addition to developing plugins for the ear devices.

FIG. 58B (discussed above) illustrates an exemplary charging pod including an embedded loudspeaker for streaming audio data, according to some embodiments of the disclosure. In some embodiments, the audio is streamed to device for calibration using internal loudspeakers or using internally stored calibration specific audio files using internal memory storage within the charging pod. The internal memory can be updated using audio files that are streamed to the device as part of a manufacturers upgrade for example. This allows the manufacturer to provide specific plugins for the charging pod in addition to plugins for the ear devices.

Audio System Calibration: The charging pods may also be used to calibrate the audio system. In some instances, the ear pieces are placed in a charging pod at regular intervals to charge the batteries inside each of them. During at least one of these intervals, the charging pods may calibrate the audio system. Calibrating the audio system may help improve the performance of one or more applications such as the active noise control application that may benefit from the microphones and speakers being tuned.

In some embodiments, the user may be engaged when performing a calibration test. The charging pod may include at least one high quality reference mono loudspeaker, multiple loudspeakers, and/or microphones for the calibration test. The calibration test may be used to set the levels of external background noise, for example. The speaker in the charging pod may play a sound and then capture the sound at the microphones in the ear pieces. The audio system may analyze the captured sounds to determine whether one or more settings (e.g., frequency response) should be adjusted. Embodiments of the disclosure may also include updating internal calibration data.

The calibration test may include playing a test signal using the speakers in the ear pieces and using the ear piece's microphones to capture the played signal. The audio system may determine the response of the speakers to check if they are performing correctly. The calibration may also involve using the speakers in the ear pieces to generate test signals while they are located in the charging pod. The pod will contain microphones that analyze the sounds from the speakers using high quality reference microphones for example, and then provide information on the performance and updated calibration information for the ear device speaker drivers. Ear devices that contain multiple speaker drivers may be programmed and tested independently. Additional processing parameters such as crossover filters, fractional delays and level controls may be adjusted based on analysis of the captured signals. If the speakers are not performing correctly, the user may be notified of the problem and/or the calibration data may be updated. The notification may include one or more suggestions such as cleaning or replacing ear tips included in the ear pieces.

The calibration test may also be used to determine if there is a major fault, such as one of the microphones or loudspeakers not working. The audio system may notify the user and/or may request a replacement from the manufacturer.

In some embodiments, the charging pod may include redundant sensors that are used as calibration confirmation points for the ear pieces. For example, the charging pod can include microphones and speakers to test the performance of the ear pieces when coupled to the charging pod. The charging pod can also include temperature and motion sensors to use as a reference for the sensors included in the ear pieces. The user can be asked to gently shake the charging pod to check that all the motion sensors are responding in an expected way, for example.

In some embodiments, the calibration test may be used to determine if the output channels of the ear pieces are blocked or occluded (e.g., by wax/cerumen). The ear pieces may also play sounds using its speakers, and the microphone(s) in the charging pod may capture the sounds. The ear pieces may have multiple speakers in each ear piece, and the captured sounds can be analyzed to check the performance of the ear piece's speakers. In some embodiments, this calibration test can also be used to determine any compensation processing parameters for the audio system. Different responses can be captured for the left and right ear pieces, for example, to ensure binaural matching.

FIG. 59 illustrates an exemplary charging pod 5804, according to some embodiments of the disclosure. Sound signals may be from one or more sources, such as microphones 5806A and 5806B, ear pieces 5812A and 5812B, speakers 5808A and 5808B, and sensors 5802 may be used by a system calibration and test processor 5810. The sound signals can be analyzed and compared to ensure they are meeting the binaural matching necessary for the target use cases of the audio system.

In some embodiments, the measurement, analysis, and calibration data discussed above may be transmitted to the audio system, an electronic device, or a cloud based analysis system, or all of the above.

Extension, form factor for sound capture: Many ear worn devices are designed with a shape that represents a dome against the side of the head or at the entrance to the ear canal. This shape can cause sound to be reflected away from the device. The shape also creates a visual perception that the device is not intending for sound to enter it and the wearer is isolated from external sounds. This is sometimes a deliberate part of the design language for the product. An alternative is to design the ear piece with curvature of the component against the ear, or at the entrance to the ear canal shaped to capture the sound, like a satellite dish, and reflect sounds into microphone ports on the device. The shape of the device may also provide the impression that the wearer is wanting to capture sound and is wanting to hear what is going on around them and not be isolated. This may provide less of a barrier for other people wanting to communicate with the wearer. Additional indicators can also be used to provide information about the listening status of the device. For example, a red LED can be used to indicate that the wearer is in isolation mode. A green LED could be used to indicate that the wearer is in listening mode.

Extension, form factor for sound capture: The shape of the device may also provide the impression that the wearer is wanting to capture sound and is wanting to hear what is going on around them and not be isolated. The system can include multiple signal processing plugins. Each plugin can be developed, programmed, and used based on its core functionality. There are at least three categories of signal processing plugins for ear worn devices. A single plugin can cover more than one category. The three categories that the system supports at a minimum can be described as data, user and device. Plugins provide signal processing enhancements to one or more of these categories. The signal flow of the data through the system is defined to allow plugins to be placed into the system architecture without requiring intimate knowledge of other processors in the signal chain. An example of the types of categories that can be used in the system include, but are not limited to, encoded data stream 4202, decoder/decompression 4204, content enhancement 4206, user enhancement 4208, and device enhancement 4210, as shown in FIG. 60A.

Extension, form factor for binaural sound capture: Human ears are unique, including our left ears being different to our right ears. In addition, they are located asymmetrically on our heads. The ear device will benefit from being designed with some asymmetric enhancements to the physical and mechanical properties of the devices. This includes placing microphones in each ear bud or ear cup in different locations to each and not in symmetrical patterns, such as equally distributed nodes in an array. Also, ear cup or ear device should include some acoustic shaping that is different on each side. For example, the left ear may use vertical grooves and lines and the right ear device may use horizontal grooves and lines in the design.

Extension, asymmetric form factor for external and user voice capture: FIG. 60B illustrates modifications to the mechanical design of an earbud.

Typical earbuds 6000 tend to have a circular or oval shape on the outside 6000A and a tube that goes into the ear canal 6000B, as well as a foam or silicone tip 6000C on the end of the ear canal that is held in the ear canal itself. The proposed modification is a non-symmetrical earbud shape 6002 that has some properties similar to an ear, effectively a false pinna 201. The false pinna would be programmed such the mechanical design, shape and external contours are different at the left ear compared to the right ear. The shell may be shaped like a dish instead of a flat shape 203. This shape causes the sound to be reflected into the ear canal 204. The dish shape also reflects sound into microphones located within the surface of the dish. The dish shape and other curved shapes also provide a visual indication that the wearer is intending to capture and hear sounds. The proposed design modification of the non-symmetrical dish shape having some properties similar to an ear will enhance the sound capture of the ear bud inside the concha.

In addition to the dish shape 203 and the false pinna 201, the microphones within the false pinna are not equally spaced 205. Typically, the microphones, located on the external surface, or have ports from the external surface to internally mounted microphones, 6000A, are placed linearly, and are equally spaced, making it very difficult to ascertain sound differences if a sound is approaching from certain directions either side of a listener, or directly in front of a listener. For example, the microphones may be receiving almost identical signals when the sound source is in a particular orientation or direction, which reduces or completely removes the advantage of having multiple microphones. Accordingly, it is desirable to orient the microphones to point at the sound source of interest, which is normally the user's voice. Or in some scenarios to have microphones programmed to capture external sounds, such as a person the user is talking to.

For this application, not only is it important to capture the user's voice, but it is also important to capture all of the ambient sound to determine the direction of each sound. As such, the microphones are located to ensure that every sound creates a different pattern of arrival and amplitude at each microphone. The objective is to reduce any ambiguity about the direction of sound 6006. One option is to place the microphones in a spiral formation 207, so that the distance between each microphone gradually increases and is never the same. The microphone pattern at the left ear and the right ear should be different as well 6008, in order to discern the direction of the sound. For example, the microphone placement for the other ear could be a spiral in the other direction 209.

Form factor including display: In some examples of ear bud or headphone design, the earpiece may contain a micro display. The display is programmed and controlled by the ear computer to display information that the user wishes to display for other people to see. The location and orientation of the ear device makes it difficult for the user themselves to see what is being displayed (unless they are facing a mirror). The micro display could show information that informs other people that the user is busy and should not be disturbed. It may display a picture of a mobile phone to indicate they are listening to a conversation on their phone. It may display icons or graphics that indicate the user is actually fully listening and they are using the device as an enhancement so they can communicate more effectively and are not actually prevented from hearing at all. The display can be used by the user to display personally designed or personally selected "badges" or digital stickers that represent how they are feeling. The graphics could be a logo or other representation that indicates which application or plugin they are currently using, such as Facebook, or Zoom, or Spotify from their mobile phone. The device can also display emergency information if the wearer become incapacitated and first responders are looking for information about the person. Text can be scrolled across the display. The display can be used to inform other people that a request that has been made is in progress and the computer is working on an answer. For example if a second person has sent a request for the user to authenticate their identity using biometrics, it can show that the biometric information is being collected and will send it across to them. All of the images and graphics can be controlled through the dashboard application or other connected device such as the charging pod. The displays on each ear can show the same or different information to each other. The displays can show different information when the devices are removed from the user's ears and they are holding them, such as amount of battery left or charging status. When placed on a table, the device displays can show the user additional information such as someone is calling them or they have received a notification. The displays can show different information when they are placed in the charging pod. The displays could also be tiny touch sensitive displays that allow the user to adjust some controls of the system.

System architecture signal flow using plugins to provide data enhancements: The general functionality of a plugin or processor that could be considered a member of the data category is to take input data streams and provide enhanced data streams and additional information based on the content of those data streams that other plugins in the system can utilize. The data category is used for plugins that are manipulating, processing, and enhancing the raw data that is coming into the system. One example could be a music decompression decoder such MP3, AAC, SBC or LC3. This plugin may use a raw data stream that is provided by a connectivity component in the device, such as Bluetooth or USB, and then decode the raw bits into PCM samples at the specified sample rate. These samples are provided to other plugin components in the system. This architecture allows the system to independently provide signal processing enhancements for the data stream without a developer or manufacturer needing an understanding of the coding scheme used to compress the audio from a data source. This also allows a music compression codec to be upgraded, for example, with a more optimized version for lower power consumption or smaller memory footprint, without impacting the other signal processors in the system.

It also allows a device to upgrade with new compression and decompression codecs when the device is in the field. For example, the user may have purchased the device that includes a Bluetooth radio and is capable of receiving MP3 and SBC encoded audio streams. A plugin upgrade is provided from the user's phone using the dashboard that uploads a new decoder for AAC encoded audio streams. The user is now able to enjoy AAC audio streams from Bluetooth connected devices. All of their existing signal processors continue to work as before. Only the codecs that are required by the user are uploaded and stored in the devices, ready to be used, thereby reducing the memory overhead of maintaining multiple decoding plugins in the device. In some instances, the new decoding plugin can be uploaded to the ear devices on an as needed basis, for example, just before the audio stream is being sent to the device. A second example is the data handling of microphone captured signals into the system. This could be a noise reduction algorithm that cleans the microphone signals to provide only a target sound for the rest of the system to use. This could also be a beamforming algorithm that is provided to create a single output audio channel from multiple input signals. A third example is the data handling of sensor data into the system. This could be a neural network that is processing raw input data from a single or multiple sensors in the device and converting it into more meaningful categories of information. For example, the raw motion information from an inertial measurement unit (IMU) can be analyzed to determine whether the device is attached to a person that is walking, running, jumping etc. for sports applications.

System architecture signal flow using plugins to provide user enhancements: The general functionality of a plugin or processor that could be considered a member of the user category is to take signals and provide enhancements that are user specific to their needs and preferences rather than generic data analysis or device related processing. Examples of this could be plugins that provide equalization and loudness profiles that the user prefers for particular styles of music. This could also include a hearing profile that is a compensation profile that is specific to an individual user based on their hearing level within frequency bands at each ear. This could also include notifications, alarms and messages that the user configures to create a personalized sound experience by selecting the audio clip that is used for each one and the level they are played at and the spatial location they are rendered to. This could also include an ambient sound processing plugin that allows the user to adjust level of sounds around them and allocate sounds to different categories based on whether they want to hear them or not.

System architecture signal flow using plugins to provide device enhancements: The general functionality of a plugin or processor that could be considered a member of the device category is to enhance signals in a way that is specific to the device that is being used. This could be set by the manufacturer of the device, or a third party that specializes in tuning and configuring devices to achieve a good starting point for other plugins to benefit from it. This could include plugins that provide equalization and level control processing that target a sound profile to compensate for the specific loudspeakers that are in the device. Similarly this could be a sound profile that compensates for the specific microphones that are in the device. This could also be filter coefficients that are used for active noise cancellation processing that are specific to the acoustic properties of the device. The device calibration data could be provided by a manufacturer as public information in the system so that other plugin providers can use that as a basis for creating different experiences for the same specific hardware. This could include enabling third party companies to provide enhanced noise cancellation filters. It could also include plugins that provide a flatter frequency response for the loudspeakers using more advanced signal processing techniques such as more accurate equalization filters. In addition to the plugins that provide device specific processing, the manufacturer may be responsible for providing device driver components for all the components in the system. This could include the low level software components for the setup and configuration of the microphones and loudspeakers that have been selected for the device. It could also include the device driver components for other sensors and user interface hardware in the device. It could also include the device driver components for the connectivity functionality of the device such as communicating with a Bluetooth radio or USB port.

An extension to the basic core architecture of plugins that could be categorized as "data," "user" or "device," there is an additional category of "system." This could be a processor or plugin that is placed in the system to analyze data and information provided by other plugins to create system wide enhancements or notifications. One example could be an ambient sound analyzer that is monitoring sound levels or categories of sounds that a user is being exposed to and provides that information, perhaps through the noticeboard mechanism described above, for the benefit of other components. This is shown in FIG. 61 with ambient sound data stream 4212 being input into ambient sound compensation 4214. Ambient sound compensation 4214 sends signals to content enhancement 4206, user enhancement 4208, and device enhancement 4210.

FIG. 62 illustrates a further extension to the basic core architecture of plugins is the category of "external." Some components can be considered as external to the main processing of the system. These components can be physically located in the same chip or within the same software framework, but they are operating within their own application. One example is an active noise cancellation process that uses a noise cancellation compensation 4214 to analyze and filter very low latency audio signals (from a noise cancellation data stream 4212) through the device. This can be implemented as an external component with separate plugins. This could have an impact on the overall performance and experience of the device, which means the other components in the system could benefit from knowing what the external plugin is doing to the audio streams.

A further extension to the system architecture is to enable the update of parameters across multiple plugins and processors simultaneously using configuration and parameter data 4220, as shown in FIG. 63. For example, data from an inertial measurement unit (IMU) has detected that the user has moved their head, which means spatialized sounds could need to be re-rendered to new locations to maintain the perception of them being static in the virtual acoustic space. The user's head movement may also coincide with one of their ears now moving closer to a noise source. All of this information needs to be passed on to the plugins in the system that have registered to be updated with head movements. The content data streams may be respatialized based on the new head location. The user's preferences may be informed as this may use more aggressive noise reduction to be activated. The device plugins may be informed to ensure the output compression limits are not hit to ensure the louder noise sounds do not cause distortion. The simultaneous parameter updates 4222 ensure that the user has a more realistic experience without delays in the signal processing update components.

A further extension to the system architecture is to inform the plugins in the system when latency needs to be addressed to meet a particular signal processing chain accumulative delay target. FIG. 64 illustrates an exemplary diagram. For example, the addition of a new plugin into the system may introduce a slight increase in the end-to-end delay for the audio between the input and the output of the system. The latency monitoring plugin 4224 can detect changes in system latency based on the timestamps for each data transfer in the system. The system can inform all the plugin components in the system to attempt to reduce latency within their component. This could be by switching to a shorter processing frame, or reducing the size of processing buffers between processors. This may reduce the overall audio performance of a plugin as a result, in particular if the plugin has to use shorter buffers for signal analysis and decision making. The components and plugins may be updated simultaneously using latency parameter updates 4226.

An extension to the external category of plugins is to use physically distinct components in a system that are initiated, controlled, and integrated through the plugin framework and operating system. FIGS. 65A-65C illustrates exemplary system architectures and information transfers. This enables a developer to create a plugin that includes code and data for the main processor in the system, for an ear worn device, this could be an ear computer, and also include code and data for peripheral components in the system, such as a Bluetooth low energy radio chip, or an active noise cancellation chip. In addition to providing access to the peripheral components for targeted application software, the system may allow the firmware to be upgraded through a system update plugin which may be provided by the manufacturer as part of a firmware upgrade process. The main processor can be used to upgrade the firmware of peripheral components.

In some embodiments, the system may include plugins that are for external devices that use the same, or different, silicon platforms. In this scenario, a plugin may contain sub-plugins, or internal plugins, that are prepared for other components in an ecosystem. The additional plugin modules are transferred to other chips in a product or device, or they are sent to other devices. The plugins may be configured to send data between chips and devices to enhance the overall performance of a plugin.

Plugin data contents: The plugin binary data may include multiple chunks of information. This may include, licensing information, system requirements information, code and data for the target components in the system. The plugin information can be checked by the dashboard prior to loading into the connected ear worn device to ensure the target system has the necessary capabilities and includes all the required components for the plugin to run.

Plugin security and licensing: To protect the property of the developer or manufacturer, the plugin contents may be encoded and may only be decoded on the target platform if the license key is activated. Plugins can be locked or activated using a key mechanism that is linked to the hardware device and the specific processor in the device. Many configurations and combinations of key access can be supported to allow complete flexibility for manufacturers, developers and users. The plugin licensing mechanism can be controlled and managed through the audio operating system.

In some embodiments, the plugins may only be unlocked through a security system on another device. For example, the plugins on an ear device may only be unlocked if the system is activated by a secondary device such as a smart ring, smart watch, smart phone or other device that authenticates the user and confirms that the plugins can be activated. In some scenarios, multiple authentication steps may be needed to confirm that the devices are connected and are part of a single ecosystem.

Plugin licensing—trials: The plugin may be open and free to use for all systems that are capable of running the contents. An example could be a plugin that is produced as a free trial that has limited functionality or has a time limit or a restricted number of activations. This can be used to gather user feedback or to provide users an opportunity to experience a new product before purchasing it.

Plugin licensing—silicon: The plugin may be locked to a particular processor family or silicon variant. For example, the code is optimized for generation A of a target processor and although the functionality is compatible with other processors, the developer could prefer to limit the usage of the plugin to a particular restricted set of processors while they validate and optimize their code for other processors.

Plugin licensing—products and devices: The plugin may be locked to a particular manufacturer's devices or even a specific model of a manufacturer's products. This could allow a plugin developer to have an exclusivity arrangement with a manufacturer such that the plugin is only available on their product or range of products, such as only their gaming headphones.

Plugin licensing—users: A plugin can be locked to an individual user's devices. This could allow a user with multiple devices to use the same plugin on all their devices and only need to purchase the license once. This can be achieved through the user's profile and device registration. The plugin can also be locked to an individual's ear. For example, may only be compatible with that user's hearing profile and may include significant amplification that could cause damage if another user were to use the same device. The system can authenticate that the device is placed in the user's ears and only be unlocked by that user.

Plugin licensing—connected devices: A plugin can be locked to connected devices such as a specific phone or laptop that is providing content to the device. This could allow the manufacturer of other products to ensure that the plugin on the connected device is only activated when used in conjunction with other devices that are compatible within the ecosystem. This allows a manufacturer to provide additional features and services that are only available within their controlled environment.

Plugin licensing—applications: A plugin can be locked to a connected application, such as a streaming service or communications application or video content service. This allows applications on a device such as a mobile phone to push plugins out to the edge device that provide a specific enhancement that is only compatible with their application. For example, a music streaming service can create a plugin that is available when the service is running on the connected device to provide audio enhancements and additional features that are only supported by the host application. The enhancements could not be available for other applications to use, or perhaps only a basic set of features are available if other streaming applications are connected to the plugin. Another example could be a video chat or communications application that is running on a laptop and can push a plugin to the user's headset so that they can access an advanced experience using the microphones, speakers and sensors in the device rather than the components on the laptop.

Plugin licensing—location: A plugin can be locked to a specific location or region. For example, a developer may use that a plugin is only available for users that have purchased and use the device in Europe as part of an exclusivity agreement with the manufacturer. The plugin may also be locked to a particular build or space that is designated for the target application. For example a business may request their employees use a specific plugin for their work, but it is only available to them within a specific set of spaces. Similarly, a plugin can be prevented from being used within specific spaces, such as no streaming of music or video content when at school.

Plugin licensing—sensors and other hardware: A plugin can be locked to a specific piece of hardware within a device, such as a special microphone, or loudspeaker or sensor. The plugin may only be activated if the hardware component is detected as being present. The plugin may also depend on the hardware component being used, for example a spatial rendering processing component may only activate its functions when the head tracking sensor is detected and is being used by the listener.

Plugin remote activation: In addition to locking the usage of plugins to particular conditions based on the license, the plugins can also be activated based on specific conditions: user's ears, connected device, application on device, location, walking into a building, meeting another user with the same application, gesture, voice interface, system intervention, sensor data such as health monitoring or signal level, emergency calling, teeth clicking, etc.

Personalized location based sound drop: Notifications are placed at locations. They are provided to people through their ear buds if they have registered to receive them. Notifications can be enforced for certain conditions such as emergency announcements (without alerting everyone by using a loudspeaker system) such as broadcast. They can be enforced within a certain location or building for safety. Person A can leave a voice recording for person B at a specific location. For example, Person A leaves a voice message in the kitchen "I have prepared a meal for you, it is in the fridge." When person B enters the kitchen, the plugin is activated by the location based message so that they hear the recording. The recording is only activated by identifying person B, the target recipient, based on their ear authentication.

Personalized location based ear tracker: The ear device is used as a continuous authentication of a person's activity. This can be utilized in professional and amateur organized sports events, such as marathons and triathlons. This can also be used in other active games based on amount of activity such as duration or distance or exertion. Many organized events, such as marathons, use simple tracker tags that the athlete attaches to their body, usually their shoes that are coded with the athlete's number for the event. Mats are placed on the course to track when the tag crosses that location, which is used to determine the time the athlete reaches that point of the course. Photo and video information is also used to match the tag number to the athlete's bib number. Bibs and tags can be swapped with other athletes which allows faster runners to log times in the place of a slower runner. Continuous authentication of an athlete is challenging using facial recognition of thousands of athletes in an event. Other forms of identification such as finger print or iris scanning are impractical. An ear worn device can provide continuous authentication during an event. The location tag can be combined with an ear worn sensor to confirm that the person's ears have been tracked at regular intervals and locations of a course. Machine learning algorithms can be used to confirm that the athlete used an appropriate form of motion, such as walking or running in a marathon and did not use a bicycle or a car. The ear device can be open fit to ensure there is no acoustic occlusion and the athlete can hear normally.

Personalized location and activity based ear games: An extension to the location based ear tracker is to enable activity games. The ear device is used an authentication of user activity when linked to a connected device that includes location tracking, such as a mobile phone, smart watch or a charging pod. The ear device can also be used as an independent tracker if location tracking is available within the device itself. The user is authenticated at regular intervals to provide effectively continuous authentication. The ear device can also be used to provide notifications, alerts and other audio based information to the wearer. The ear device has the route uploaded to it so there is no need to have an additional connected device. The directions and messages related to the route may be played directly into the user's ear. Messages can be provided as part of the game to indicate where rewards are available, such as "100 yards ahead there are 1000 coins." When the user reaches the location of the virtual coins, the device may play a new notification so the user is aware the coins have been collected. In addition, the current total number of coins can be provided, "Well done you now have 17 thousand coins." The user may be given the opportunity to earn bonus coins at the target location, for example, "now do 10 pushups for a 500 coin bonus." The activities are categorized and confirmed using the sensors at the ear device (or other worn devices connected to the ear device), using neural networks and other processing for data analysis. Virtual coins are collected and registered in the earbud and authenticated with the specific user's ear. The virtual coins can be linked to additional apps that are connected to the ear device. For example, a sports equipment manufacturer may trust the user's authentication and achievements and may provide special offers, such as free clothing, on their online store, or in a real store. The coins can be used as a form of currency to make purchases.

Fitness tracking apps are unable to provide user specific benefits, advertising, notifications and other information without user identification and authentication. For example, a user can be rewarded if they achieve a certain fitness goal, such as covering a specified distance, or a specified duration of activity, or repeated an activity a specified number of times, within a certain time period. This could be running five 10 kilometer distances within 1 month. Based on the authentication of the user, they could be provided specific rewards, such as free branded clothing, such as a t-shirt "I did the 10 k challenge." To avoid people cheating this could only be available if the user is wearing the ear authentication device. As part of the experience, the user could be sent audio alerts to encourage them to do more activities or to go faster. Specific rewards and alerts could be placed at certain locations of a route.

An extension of the location tracking ear device with augmented reality visual device: Smart glasses can be used with an overlay image of the location of coins on a route so the user can see ahead to where coins are located. A virtual store can be placed on the route for the user to make purchases. This could be at the end of a marathon where different manufacturers can provide special offers that are purchased through the coins that have been collected along the marathon course. Additional bonuses can be provided for special achievements such as fastest runner in an age group. The virtual store could also be placed within a real store. The user can visit a sports store while wearing their ear buds and smart glasses and make purchases that are authenticated for that individual.

Ear device authentication of activity based on motion and other sensor information: The flexible plugin architecture allows for plugins to be developed that make use of multiple data streams and information within a product. In this example, the plugin is using data from multiple sensors such as motion detection from accelerometers, gyroscope, inertial measurement unit, etc. In addition, heart rate, pulse, oxygen level, breathing rate and temperature data are captured. Furthermore, microphones and ambient light sensors are used. All of this data is collected and fed into a processor that uses neural networks to make classifications of the information. Motion information can be used to determine the type of activity the user is performing, for example, running, walking, riding a bike, doing pushups, jumping, going up or down stairs, etc. Also, additional neural networks can be used to determine if the user is outside or in a vehicle such as a car, based on ambient light, reverberation of audio signals, wind noise, etc. Also a GPS device can be used to feed location information into the ear computer to determine the current location of the user and the speed they are moving. The temperature and heart rate data can be used to determine if the user is exerting themselves. In addition breathing rate and breathing noise can be captured to confirm that the user is using energy or alternatively is sitting still. The ear device may also be used to confirm the identity of the user to authenticate that the data being captured is specific to the user.

Ear device used for real time confirmation of activity: The multiple sources of information described above can be considered a multi-factor authentication of an activity for a specific user. This could allow an associated application to provide specific benefits and carry out transactions and provide access to other applications or physical devices. For example, the device confirms that user A has carried out activity B at time C. The activity could have been completed in a single location, such as treadmill in a gym, or in a chair in an office. The activity could have been carried out while moving under their own capacity, such as walking, running, riding a bike. Or the activity could be carried out while travelling in a vehicle such as a car, train, and plane. The multi factor authentication links the information of the activity classification from sensor data to the user identity. This can be achieved in a single device that the user is wearing. It can be extended to other worn devices or remote devices that are connected into the central processor to create the necessary feature data for neural networks and other types of processing to classify the user and the activity being performed.

Plugin using multiple data streams: Simple plugins may use a single data stream, such as blocks of encoded samples received from a Bluetooth radio connection for music streaming, and then process the samples based on the user's preference to create an output stream of audio samples. More advanced plugins may use multiple data streams which include many formats and types and content of data.

Some data streams may be time critical for the plugin to maintain a particular experience. For example, audio samples being available for processing such that the output playback buffers do not reach an empty level and cause a break or glitch in the audio. Some data streams may be informative or background information and are not time critical. The plugin developer can use all forms of data stream when creating a plugin. The data framework may control all the data streams for the plugin making it easy for developers and for cross platform compatibility. The plugin may declare which streams are time critical for its operation. The combination of data streams allows for more complex and creative applications for products.

Plugin using data analysis to instantiate other plugins: A plugin may detect a specific condition based on the data it has access to. This may cause the plugin to create a system alert that can cause another plugin in the system to receive an interrupt, notification or message from the operating system that it needs to wake up and start performing its specific operation. For example, a plugin may detect that the level of audio being passed to the output of the device has reached a level where some protection may be needed. The plugin may not know if there is a hearing protection plugin available in the system. It should not need intimate knowledge of other plugins that are available. Instead it sends a system message to the operating system. This message is sent to plugins that have registered with the operating system as being able to deal with that type of alert. This could be a plugin that automatically activates to deal with the condition. This could also be a notification handler plugin that plays a message to the user "the music is getting loud."

Plugin containers: The plugin binary information can be stored as a file that is transferred between different components in a system. The binary file is created by third party developers into a format that is common across target platforms. The file, or master container, may include chunks of information. An exemplary containers are shown in FIGS. 66A-66C. Each chunk can include public and private information. Public information can be read and interpreted by the target device to determine how to operate on the information included in the chunk. Private information can be encrypted to ensure that only the target device, user, etc., is able to access the information in the chunk. The container may provide information related to the system capabilities that are essential or helpful for the plugin to operate. For example, the plugin may use two microphones to perform its processing, but it could be helpful to have six microphones. If the target device does not include microphones then it cannot work and should not be loaded into the target device. The container can hold chunks of code and processing data for multiple targets. The dashboard may read the container data and information for each chunk to determine which chunks need to be delivered to the target devices that are connected. Some of the chunks may remain on the mobile device or tablet to form the graphical user interface of the plugin. Some of the chunks may include the code and data for the connected device, such as the signal processors, and may be transferred to the embedded device using the available connectivity link. Some of the chunks may not be used for this particular configuration. For example, the user has downloaded a plugin for their specific user profile which has recognized that they own multiple headphones. All the code and data for all their headphones has been provided in the plugin container. Only the code that is used for the device that is currently connected may be utilized. When one of their other devices is connected to the dashboard it can be updated with the relevant chunks in the plugin container as they may already be available in the dashboard application.

Plugin processing for anonymizing speech: The ear worn device or other audio device including microphones, such as a smart speaker, can be connected to a network or include an embedded processor that provides a voice assistant feature. The user may be concerned that their speech data is being used or can be exposed by the voice assistant provider. For example, the user may want to request sensitive information from their voice assistant such as financial or health data. The plugin within the device processes the captured speech data at the point of capture. The user can select that the plugin is located on a connected device such as a mobile phone or smart watch, or is part of a cloud application that manages their personal data. The plugin may process the speech such that all identification features such as pitch, intonation, word rate, and other speech related identifiers are all removed or manipulated such that the speech is completely intelligible but cannot be linked to the individual. An example could be speech processing that removes all pitch variation information to create a monotonous sound that is still intelligible for natural language speech recognition engines and other trigger word engines. Another variation could be to morph the user's captured speech to replace their speech characteristics with a virtual, synthetic voice such as a voice assistant voice. This could maintain the pitch variations but disguise the person's individual characteristics. An extreme example could be to convert the user's speech to sound completely synthetic, such as like a robot or a monster similar to systems used for movies. This could all occur in real time without the user hearing the obscured speech. The obscured speech could be sent to the relevant speech processing engine for word recognition. Another extension of the invention is to be used for real time voice calls through a communications network. This could allow a user to talk to another person on a telephone in real time, without the other person identifying them. Another extension of the invention could be to ensure the speech processing maintains the user's word cadence and allows real time processing that does not impact visual cues and lip synchronization. This can then be used for video calls where the user can choose to hide their voice characteristics or deliberately change them to create an interesting experience.

Plugin processing for tagging data at the edge: Speech or other audio data is captured by the device, such as during a podcast recording. The information within the captured data is valuable, for example, the people involved are discussing an important topic, or the people involved have a high public interest, such as a politician or celebrity. The information they are providing may also have a high value. The speech is captured in real time and tagged with a non-fungible token (NFT) or other similar unique identifier. The speech can also be watermarked or encrypted with a unique time and date stamp using the cryptographic engine in the capture device at the edge before the audio data is transferred to another device and could be tampered with. The OS allows this to be done in real time, in the hardware without interference from other devices in a network or user intervention. The owner of the captured content can now track where the data is being used and claim ownership and licensing and royalty compensation as needed.

Plugin processing for data analytics at the edge: Speech or other audio data is captured by the device. The data is analyzed locally at the device to determine if a particular song or audio clip has been captured and passed through to the user's ears. The analytics engine may be searching for people that have heard or been exposed to a particular audio based advertisement or a particular music track or segment of speech from a TV show or radio broadcast. The user may agree to install the plugin that is listening and analyzing the content they have been exposed to. The plugin may process the sound such that the user's speech is always eliminated and is not part of the analysis. The analytics data is captured and then sent to the requesting party either directly or through a secondary connected device, using standard network connections. The device can also determine if the user has activated other processing within the system that could prevent them from hearing the audio segment even though they have been exposed to it, such as active noise cancellation or streaming audio that could cause masking of the sound they have been exposed to.

Plugins for speech enhancement for communications applications: An ear device is often used for conversations using a communications network, for example, a phone call. This uses audio to be received and transmitted, which in turn uses two forms of audio processing and handling of data streams, one for the receive data and one for the send or transmit data. In addition to this, there can be an echo path between the received data and the send path, which may also need to be processed so that the person or people on the far end of the communications network do not hear an echo of the person talking coming back into the call. Many speech processing systems focus on the send path audio stream with the intent of removing background noise from the talker's environment that is picked up by the microphones and isolate their speech to be sent to the far end listeners. Another common area of processing focus is on the echo cancellation such that there is no leakage of received audio back into the call and at the same time the talkers voice can still be passed through so that natural conversations can be maintained, known as double talk. It is also highly desirable to enhance the received audio to provide a better experience for the listener. The combination of these processors is discussed above.

FIG. 67 illustrates an example of speech processing for a phone call. This identifies the noise reduction (NR) of the environmental sound for the talker, the equalization (EQ) and automatic gain control processing (AGC) to enhance the audio streams in each direction, and the acoustic echo cancellation (AEC) component. There are many extensions to this basic configuration that can be created and adapted based on the user's need through audio processing plugins using machine learning and advanced audio processing techniques. An example of how this can be improved is shown in FIG. 43B. The extensions are described separately.

Plugins for speech enhancement—single audio stream with spatial rendering based on user preference: In some use cases the user may wish to spatialize the mono audio stream that is presented to them from a communications network. Typically, mono audio streams are perceived as if the person is talking inside the listener's head. There is no spatial information. The user can place the mono audio source at a spatial location, using a GUI on a connected device, such that it is rendered to a virtual spatial location. The location can be anchored to a specific point in space, such that the audio source stays still even if the listener moves their head, by using head tracking data as part of the rendering processing. The rendering will utilize the listeners HRTF or HRIR data and their hearing preferences when creating the audio streams to each ear, allowing for a personalized experience. The user can change the location of the rendered sound based on other ambient sounds that are present in their environment, such as moving it away from a noise source or bringing the rendered sound closer to the listener. Other enhancements can be used to improve the quality of the mono audio stream, as described in other items.

Plugins for speech enhancement—multiple independent receive streams: In some use cases the ear device may receive multiple audio streams from the conferencing system. This may use significant data bandwidth and can be impractical in many of the current connectivity implementations. However, advanced encoding, decoding and data streaming for connectivity could enable a scenario where this is a viable architecture. In this scenario, the ear device may receive multiple audio streams from remote participants in a conference call or other multichannel audio streaming application. It could be expected that the communications system is optimized such that only the audio streams that are active are sent to the endpoints, meaning, if an audio stream is on mute or is not talking, their audio feed into the conference can be ignored. Each active stream that is received is allocated its own processing chain of plugins that the user can configure. The audio streams are then mixed based on the user's preference. This is particularly useful if the talkers within a conference call are talking at different levels and are at different distances from microphones creating significant differences in audio levels received by the listener. The plugin architecture could allow the listener to re-balance the levels of the talkers to create an auditory scene that works well for them. Many systems provide a global volume level that controls the output for the conferencing system or conference speaker of conference phone, which is inadequate for individual user preferences and multiple talkers at different levels.

Plugins for speech enhancement—single receive stream including complex mixed content from multiple sources that are unmixed: FIG. 68 illustrates an exemplary single receive stream, according to embodiments of the disclosure. The unmixing component allows a single data stream to be established between the source device and the ear device. This can make use of existing mono audio channels, which all communications networks provide. The unmix can be based on signal content that is passed into a processing component, such as a neural network, that is able to extract separate audio streams that are individually processed to enhance them. The unmixed streams are then recombined with a mixer to create a mono or binaural rendering of the received audio data. The unmixing of the received audio allows the user of the ear device to more easily identify who is talking as different processing can be applied to the individual streams. Furthermore the streams can then be rendered to different spatial locations around the listener. This may increase spatial separation of the talkers to help intelligibility and make the audio more pleasant to listen to rather than a plain mono signal that is perceived to be located in the middle of the listener's head. This is shown in FIG. 69. In some cases the conferencing service may not be able to distinguish between multiple talkers if they are all using a single endpoint in a single room, such as a conference room. For example, as shown in FIG. 70, multiple participants could use separate individual connections into a conference call, or all in a single room or any combination of these. In this scenario, the unmixing of the different talker streams from within the mono audio stream could be a very important feature for a user. An extension of this could be to place the unmixing signal processors in the endpoint to provide multiple separate audio streams to multiple listeners on a conference call, however, this can substantially increase the amount of network traffic and data throughput, which could mean there are multiple benefits in unmixing the audio information at the receiving endpoint based on the specific user's needs.

Plugins for speech enhancement—multi-stage unmixing: The unmixing of audio streams in real time uses multiple stages of processing. Neural networks can be implemented that are able to categorize different types of sounds and audio conditions. For example, a neural network can be trained to determine whether a block of audio data includes speech or not. If the block of data includes speech, a second neural network can be used to determine how many talkers are actively talking, specifically whether it is a single talker or multiple talkers. Blocks of audio categorized as only including one active talker are passed to the next processor where the features of that specific talker's speech and their environment are quantified. Example features could be the signal to noise ratio, the reverberation of the room they are in, the profile of the noise and whether it is dynamic or stationary, the pitch changes of their voice, word and syllable rates, etc. This information is stored locally in the device and is continually updated whenever that talker is identified as the most likely person actively talking for a frame of audio. If the frame of audio is identified as a potential new talker, using a talker matching network, that uses the talker features, the feature updates are reset and a new block of information is created. This continues while a single talker is active within a frame of audio data. The feature information is either updated based on the most recent information or it is used to create a new talker profile. When a talker is identified the audio stream is switched to a different path of processing for the downstream audio components. This can be a completely separate audio path in the system. This can also be the same audio path that includes metadata describing the talker profile and where to locate in memory the detailed information regarding the talker profile. This can also be a single audio path that is processed using different parameters based on the audio stream switch marking a new talker has been identified. Talker features and noise profiles and reverb profile, etc. can be used by the downstream processing to determine what type of processing is needed and how much processing is needed. For example, if the talker is in a very noisy environment, the noise profile can provide information to assist a noise reduction algorithm. An example of unmixing processing is shown in FIG. 71. Different talkers at different locations on a conference call may be experiencing different types of noise. The audio received from those connection points should be processed differently, rather than having a single processor that has to attempt to deal with changing noise conditions, talker loudness, room acoustics, etc. The plugin architecture allows for this switching of processing parameters based on content information. The processing updates are not limited to noise reduction. For example, the equalization and gain control for the specific talker in the conference call can be dynamically adjusted to enhance the audio content to create a more balanced sound for the listener. This may prepare the audio for the output rendering processing that can create a better scene of talkers for the listener to experience. An example of different processing paths for the receive audio is shown in FIG. 72. Embodiments of the disclosure may include unmixing processing to create multiple receive path audio streams.

Plugins for speech enhancement—using talker profiles: The talker profile information that is gathered in real time as described above can be stored and reused for a new call. For example, talker A could be identified as "Bob in his office." When the listener joins a new call, information could be shared in the conference system from the endpoints joining the call that identify each attendee and where they are talking for the call. This information could also be obtained by the camera capturing the environment that each talker is located in, even if the image shown within the call has the background obscured. The conference system may indicate that one of the attendees is indeed "Bob in his office." Alternatively, it may identify the attendee as "Bob in his car," which could include the same talker information, but may have different noise and reverberation profiles. This can inform the ear device of how it could be best to process Bob's voice for the benefit of the listener. Bob's profile can be preloaded as a preferred starting point for signal processing.

Plugins for speech enhancement—conference system integration: The conferencing platform that all attendees are using for a conference call can own the signal processing within each ear device. Additional metadata can be shared to enhance the signal processing for each attendee. For example, the active talker information can be passed to the end devices to simplify the talker profile information. The talker profile information could be collected within the conference server, or the connectivity application, such as an application running on a mobile phone or laptop, and then passed as a separate data stream to the ear device, to distribute the processing load across the system. The conference system can also identify when multiple people are actively talking at the same time and pass this information to the connected audio endpoint such as the ear device.

Plugins for speech enhancement—ambient awareness based speech enhancement: The speech enhancement of the received audio stream when communicating with one or more people over a communications link can use the ambient environmental sound to adjust what the listener is hearing. The plugin architecture and the processing macros in the silicon, for example, for binaural capture and binaural render, allow the processing to be separated and combined as needed. For example, the listener may be outside and is experiencing wind noise, or they are in a noisy café. This may use the output rendering processing to be reconfigured so that the user can still hear the content that is being streamed to the device from the far end, specifically using information gathered from their local environment.

Plugins for speech enhancement—ambient content based spatial rendering of received single or multi-channel audio streams: The audio streams that are received from the far end are spatialized and rendered to locations to allow for talker separation and improved intelligibility but also to locations that make sense based on the ambient sound conditions. For example, not placing a sound at a location where the listener is experiencing a significant noise source, such as a person sat next to them that is talking, or a source of music in a café, or passing traffic. The user can control the location of the received rendered sounds to virtual locations using a graphical user interface. The graphical user interface can show the locations of real ambient sounds that are causing noise or distractions and the user can place the received sounds to gaps in the ambient scene that provide them the greatest ability to hear what is going on and based on their personal preference. This is shown in FIG. 73.

Plugins for speech enhancement—local conversations with far end conversations with multiple participants: The plugin architecture and multi-channel audio processing allows for the independent processing of audio streams. This is particularly useful for the scenario where a listener is participating in a conference call or video conference with multiple attendees from remote locations in addition to a room of people that are in the same acoustic environment as the listener. The scenario combines the talkers in the same room as the listener with the talkers from the remote locations that are presented through the conferencing system. There may also been sources of noise at each of the remote locations and also in the room that the listener is sitting in. The listener may be using their ear device to better understand the people in the room. They may be using plugins to reduce ambient noise so that they can focus on the target sounds, which are the other talkers in the room. They may also be receiving personal notifications from their own connected devices. The remote participants may be presented to the listener through a room audio system using loudspeakers, or a centrally located conference phone, or by a direct wireless connection to their ear device. An example configuration of a graphical user interface that the listener may use to configure the processing and locations of sounds is shown in FIG. 73. The architecture of the ear computer allows the audio paths to be independently processed with separate audio streams using different latency management of tasks. This allows low latency processing to be applied to the ambient sounds which must reach the listeners without introducing lip sync mismatch with the people in the room. The processing of the remote talkers may tolerate longer latency and more intense processing.

An example of this multipath processing is shown in FIG. 74. This highlights that the multiple microphone signals are capturing the ambient sound to create a binaural representation of the audio streams. These signals are then passed to the noise reduction (NR) processing algorithm as part of the send processing plugin. This algorithm can take advantage of the multiple microphone signals and the binaural metrics that have been provided to identify the user's voice, which is sent to the other end, and then classify everything else as "noise". Simultaneously, the microphone signals and binaural analysis data is passed to the user processing plugin for ambient sound control. This may use a lower latency configuration of signal processing than the algorithms used in the send processing plugin, as this audio is going to be rendered into the speakers of the ear devices so the user is aware of ambient sounds. The user can independently control what they hear separately from the audio that is sent to the far end of a telephone call or conference call.

An example of this separate processing path architecture with a corresponding user control application is shown in FIG. 75.

Plugins for speech enhancement—separate processing for user benefit and far end benefit: The ability to independently process sounds from the user's environment and the sounds that are received from other connected devices may not be implemented in the headsets built for communications purposes. They are primarily focused on sending clean speech from the user to the far end, and ensuring there is no echo leakage. The plugin architecture allows the simple combination of multiple processing paths in the system to provide the listener with a much improved experience. The system architecture is shown in FIG. 76. This shows that for a scenario where the listener is on a phone call and would like to be aware of their ambient surroundings, there are a number of processors. The ambient sound processing for the processing of the captured sound at the microphones at each ear. These processed signals go to at least two separate signal processing paths. One for the send path processing that extracts the user's speech for the far end listeners. One for the processing of the ambient sounds based on the user's preference. This could include analysis of the ambient sound signals to send information to a connected device with a graphical user interface that allows the user greater control and a visual representation of the sounds they are experiencing. Another signal path is the receive path processing from the communications link, which may include the audio from the other talkers on the phone call. The receive path audio and the user's processed ambient sounds are then combined and mixed with the output rendering processing. There is then a post processor that provides the device specific processing for the ear device the user is wearing. Each of the processing paths can include independent processors and plugins.

Plugins for speech enhancement—rendering with sensor data: The binaural rendering engine may be programmed by the user to keep the virtual sound sources at fixed locations in their virtual space, or have the virtual sound sources move with the user. For the virtual sound sources to be placed at optimal locations in an auditory scene and remain in those locations, such as away from other talkers in the actual room and noise sources, the user must activate head tracking in the ear device. This allows the spatial rendering engine to adjust the HRTF or HRIR data used for the rendering of the virtual sound sources such that they stay in a fixed position when the user moves their head. This is shown as item 4322 in FIG. 44B (discussed above).

Plugins for speech enhancement—room matching: When rendering a virtual sound source into the acoustic space that the listener is location in it is important to match the acoustic cues of the environment. This uses removing any acoustic cues that are specific to the source audio capture, for example, the room that the remote talker is in. Their speech should be cleaned to create a raw mono audio stream. For the mono audio streams to be placed into the real acoustic environment of the listener to create an augmented reality experience, the sound source needs to be spatialized and be processed with the room acoustics that the listener is experiencing. A simple estimate is to use reverberation that is a close match to the room and process the audio stream with a reverberation plugin as is used in many audio processing applications. The user may want to adjust the reverberation to more closely match the environment and their preferences. This can be done using some complex controls, if the user is knowledgeable, or some predefined estimates, such as small conference room, large conference room, huddle room, etc. A more complex solution is to have the user capture a test signal, such as them saying a test sentence and capturing the signals at the ears to determine the reverberation of the room. Some applications may be enhanced if reverberation parameters are provided by the facilities that are then downloaded into the processing component. For example, the building manager may determine that creating reverberation profiles provides a significant benefit to the users of the building and may provide them for people to use. An additional example could be for the conference system application use the conference equipment in the room to play a configuration signal at the start of the conference call so that all the attendees in the room can capture the room acoustic information for their specific location in the room. This can be analyzed and processed to determine the room acoustics for the conference call.

Plugins for speech enhancement—advanced binaural echo cancellation: A simple and typical echo canceller component is included in most ear worn devices for communication applications. This is due to the microphones in the device being active to capture the user's voice when they are talking. This also means that the microphones are capturing noise for the user's environment, which uses a noise reduction component. This also means the microphones are capturing the sound that is being played into the loudspeakers of the device, which is the audio from the far end of a phone call, conference call, video call, etc. For most echo cancellation applications an adaptive filter is used to remove the audio that is being played to the loudspeakers so that it is not sent back in the transmit path into the communications network and therefore creating an echo. For a binaural device where there are multiple microphones active, which be external facing or internal facing (in the ear canal) on the device, uses a more complex echo cancellation processor. Also, the audio that is presented to each ear is going to be different. In traditional ear worn devices, the received mono stream is presented as a diotic signal, meaning identical signals are presented to each ear. This creates the uncomfortable mono experience of the sound being perceived as located in the middle of the head. When the mono audio stream is spatialized, to create potentially multiple virtual locations of the sound source, the sounds at each ear may be different. Furthermore they may be significantly different to the mono signal that is received into the ear bud. Traditional echo cancellers may struggle to cope with these complex signals. A binaural echo canceller is used, that can use multiple input microphones and at least two reference signals, one for each ear. This is illustrated in FIG. 44B (discussed above), where component 4306 is receiving two reference streams from the rendering engine.

Plugins data sharing—benefit sharing of audio processing between devices for multiple connected users: User A is using device A that has an ear computer and multiple plugins. User B has a basic headphone device with simple wireless or wired connectivity. Device A has the ability to share processed audio with device B through a wired or wireless connection such that it acts as an audio source for device B. The connection could be a cable with a standard connector, a wireless audio stream using a standard connection such as Bluetooth Classic, Bluetooth Low Energy or WiFi, for example. The user of device A configures the audio processing such that the content processing and any general benefits are used to create a separate audio stream that is sent to the sharing connection. User A selects which plugins are used for the sharing audio streams. These can be content processing, or user processing. Device processing may not be specific to the device used by User B. User B could just use the headphones of user A, but these are programmed specifically for user A's preference and their ears. This could be like lending someone a pair of shoes, they may not fit and be comfortable and they have a bad experience, even though the shoes are good. In the audio scenario, user B has a device that they like and are used to its sound. They would like to experience what the plugins can do on their own headphone. User A shares the processed audio with them by sending the processed audio stream through the connectivity link to device B. This allows user B to try plugins before they purchase them and without having to purchase a device that includes the necessary ear computer to execute the plugin code. This scenario can be used to provide a benefit when listening to music where the content has been enhanced using plugins within device A. It can also provide a benefit when listening to a conference call where the participants have been spatially separated by the plugins used in device A. This is illustrated in FIG. 77A.

Plugins sharing and evaluation: An extension to sharing the processed audio streams between two or more devices is to provide the signal processing for general enhancements in a connected device. For example, the content enhancements and some user preference enhancements can be processed on a charging pod device, or other device that is capable of performing the necessary operations as plugins within the ecosystem, such as a smart watch or mobile phone application. User A allows User B to connect to their source device, such as a charging pod. User B can connect using a standard wireless protocol, or USB connection or other standard interface such as a stereo analog connection. User B cannot access the signal processing plugins on the charging pod and try out the processing enhancements that User A has access to. This allows them to try a limited set of processing enhancements that can be provided on a connected device and do not need be located in the ear worn device. The charging pod device may be able to support multiple simultaneous connections such that User A and User B can enjoy the plugin processing on the charging pod at the same time. This can be extended to multiple users if the charging pod has the interfaces to support it.

Plugin sharing—sending plugins and associated data: The plugin architecture allows new experiences to be downloaded to a controlling application and then provide a GUI and processing components that are sent to a connected device to do the signal processing. The GUI framework allows plugins to be selected and then allow the user to perform system level operations. For example, the user can select a plugin and through a menu option, or other simple interface within the plugin framework for the GUI, they are able to copy a link for the plugin they are using. This link can be shared with other users of similar devices that are capable of downloading audio plugins. The link can be sent to other users as a text message, email, or post on social media or on a web site etc. The users receiving this message will be able to click on the link to the plugin and download the plugin to their device. This allows users, developers and manufacturers to rapidly share access to plugins.

Plugin sharing—sending plugin data and profiles: An extension to sharing the plugin access is to also share settings and parameters associated with a plugin. For example User A has created a parameter set that they like to use when listening to a particular type of music. This could be a musician that has recorded a new piece of music and has programmed their audio device to create a sound that they prefer. User A can share their settings and parameters for other users to access, download and try out on their devices. User B can then try the settings and parameters that User A has provided to determine if they also like their profile. The settings and parameters may be simple configuration data such as levels and frequency content.

Advanced use cases would enable the use of plugins that provide a completely different listening experience. For example, the audio data for the music files can be delivered in spatial audio format that provides individual sound objects. These objects can be rendered to specific locations to provide an immersive experience. An audio processing plugin can be used to create a rendering based on the encoded audio data that matches the intent of the original audio recording. The audio processing plugin may be enabled such that the rendering can be changed by a user to adjust the spatialization of the audio to create a different immersive experience. User A can provide a parameter set that is their preferred way of spatializing the audio objects that are contained in the music track. This can be different from the original intent of the music track. User B can use the parameters provided by User A so that they can also experience the spatialization preferences of User A.

In addition to the parameter sharing, User A may also provide additional plugins that they use to enhance the experience. These additional plugins and parameters can also be provided and shared (as described above), to create a complete system.

Additional plugins may contain processing that add or mix multiple audio streams together including locally generated or synthesized sounds which create a "re-mix" of the audio experience. User B can download and entire system experience that contains all the necessary plugins and parameters to recreate the audio that User A has created. The personalized layers of processing and plugin enhancements and the device specific layers of processing and plugin enhancements would remain as User B has programmed them as they are specific to User B's hearing profile, preferences and device they are using.

FIG. 77B illustrates user profile sharing. The objective of this feature is to allow for the sharing of a set of parameters or configurations between two users with access to their own earbuds. One possible method of achieving this is by user A 700 storing their configuration parameters and sending the data directly to user B 701. This can be accomplished using text message 703 or using airdrop 7704, or through some other direct link communications channel 7702 between the two users since they would be within close proximity.

Another objective is to allow user A 700 to publish their setup for their particular product with others, such as through a cloud-based social media channel like Facebook 705. Thus, a user could post their configuration for others to access and download to their devices. For example, a famous musician may have a particular configuration on their device and may want to allow others to hear their music in the same way.

However, a user may not have all of the necessary apps to accomplish this. For example, user A 700 may have three specific apps or plugins that that user B 701 doesn't have. When user B 701 attempts to download user A 700's configuration, an error message 7706 will appear that states, for example, "You're missing one of the essential apps, if you want to replicate what this other person has . . . " and the message will identify the missing application and allow user B 701 to access it in an online store 707.

Hardware optimized OS functions: The operating system is designed to provide maximum simplicity and flexibility for developers when creating applications and plugins and other software components. It is also designed to provide access to multiple hardware components in the silicon without the involvement of the very large developer community. To be specific, the intent is to provide an API within the operating system for functions that can have multiple implementations that are selected by the operating system depending on system requirements, user requirements or other factors. The performance metrics may include, reducing latency, reducing power consumption, reducing system resources, reducing communications with other peripheral components, reducing code size, reducing complexity. For example the operating system may have an API for a multiplication operation that consists of many parallel data components and specific weighting options for each of the coefficients in the operation.

There are multiple implementations of this. It can be provided as a simple software library. This can also be provided as a specific hardware macro in the silicon. This can also be provided as a function call to an external processor or separate hardware component in the system, such as a peripheral chip. This can also be provided as an override function that a third party has provided to allow the specific operation to be modified or optimized for their specific use case. This allows a single API to support multiple implementations within a system. This is shown in FIG. 77C.

The code transfer to multiple components is specific to performance and resource targeted metrics of the operating system. This allows code to be transferred to many locations. FIG. 77D illustrates various code transfers.

The objective of this improvement is to discretely move code within the chip to different processing cores so that the developer does not need to build for different cores, while the user receives the benefit of having faster hardware in the system.

Typically, the developer must know which core will be in the product, so that they can write their code accordingly. They typically use a tool chain to create the correct binary with all the operational codes, and then save it for that specific processor. The proposed improvement starts at this point 800 and allows developers to process their code through a particular instruction set. For example, the instruction set may be a simple set of operations that are implementing a filter, and those operations run on the general processing core.

Multicore systems may add a new chip having a second core 802 identical to the first core 801. As such, the same code is able to run on either of these processing engines because the instruction sets are identical. This is how multicore systems typically distribute code through the chip to optimize and run things in parallel. This improvement goes a step further by adding hardware macros 7705 that are available to the code itself. These will be recognized by the operating system and identified as capabilities of the system.

To avoid requiring developers to rebuild their code every time there is a new variant of the silicon, the code undergoes a validation process 803 by the operating system. The operating system examines these operations and verifies that they actually work on the processor. The processor recognizes that operation codes will be the same for Core A and Core B because they are identical cores. In some instances, core C may be available that is optimized for specific operations that the target device needs, for example neural network processing. The operating system can send processing components to core C to take advantage of its improved processing capabilities, or extended memory, or access to special interfaces to external components, such as a sensor.

To obtain access to the hardware accelerator 805, the operating system recognizes that the operations, which could be a sequence of multipliers and accumulates 7707, for example, can actually run in parallel using the hardware accelerator. The developer is unaware of this capability, but it nevertheless is recognized by the operating system, which runs them as one instruction 807 instead of four within that hardware accelerator, for example. As such, the instructions are run faster, more efficiently, and are offloaded from the main processor unbeknownst to the user or the developers.

Performance optimized operating system configuration: Some systems require that an operating system is embedded to bring the software applications onto multiple hardware platforms and manage the resources to ensure simple development and deployment of software technology. The ear computer uses such an operating system to ensure that a broad developer community can easily bring their software into products. This requires that the operating system can dynamically adapt how it manages resources based on system metrics, external control or other information. This can mean the operating system is programmed to optimize, for example, latency through the system or power consumption.

FIG. 77E illustrates an ear operating system running in real time audio to achieve very low latency.

A typical operating system running in real time 7701 takes multiple different processes or tasks 7700 and prioritizes them based on individual task priority. Then, it switches between the processes so that every task receives some amount of processing at a certain point in time. This is unhelpful for achieving low latency 7712A, because when priorities are set the same, a task that requires low latency may be scheduled after a task that does not require low priority, resulting in a high latency 7701A.

Accordingly, the objective of the improved operating system is to run the priority task with the lowest latency requirement first 7712. In order to avoid a scenario where the low latency process is scheduled after one that does not require low priority 7701, the priority and the latency should be used as a basis to schedule the tasks. This is accomplished using time nodes 7703.

Time nodes 7703 determine the start time for a particular process 7714 and the expected duration 7715, which is updated by the process after it runs. This results in an accurate measure of the actual time taken for the processing being used and the latency target 7716, so that when completion of the process is desired, the priority of that process 7717 relative to all the others in the system will also be accurate. The priority and order of nodes can be updated to reflect the time needed for the processing to complete.

Time nodes 7703 can also include a link, such as a pointer to a memory location, or an address where the information can be found, to the process node 7718, which has information about the processing that a task must complete, as well as any dependencies 7709. As such, the process that runs may depend on other processes in the system running first before it may begin. Another process may need to finish in order to create the required data for a subsequent process.

The process node 7718 attempts to achieve its own latency 7718A. The operating system uses this information to determine where to place the subsequent process in the rest of the chip. The operating system may determine that there is sufficient bandwidth available on the main processing core and allow the process to run as normal, or it may determine that the process is better placed on a separate or faster core to achieve this latency requirement.

The operating system determines the amount of process cycles required 7718B, which is updated depending on the core to which the process is allocated and the processing resources available. The operating system also determines the amount of memory required 7718C, which contributes to the allocation of the process to a core based on the amount of memory other processes are using. The operating system notes the dependencies of other processes in the stack 7718D to determine whether or not a process should be run before others are completed. The processing block size 7718E is the amount of data required by the process at the beginning and the amount produced in the end, which may differ. As such, the core on which the process will run is selected 110.

The operating system maintains a timestamp for all the start and end times of the processing components. The operating system can also capture additional processing metrics, such as whether a process has been stalled due to memory accesses, or is waiting for another process to provide the data it needs, or whether a process has received multiple interrupts from another process that are not typical, such as from a sensor or a user interface.

Hardware and software accelerators 111 may be allocated based on the chip itself, and may differ from chip to chip. Thus, the operating system determines the capabilities of each chip, whether an accelerator may be used, and any data and parameter dependencies 112 between each of the cores in the system. It is undesirable to add any additional overhead to obtain this data.

This results in an operating system the dynamically adjusts where processing components are placed to achieve resource loading, latency, power and maximum throughput for a system and can be adjusted while it is running to achieve different priorities of performance and metrics, such as responding to a low battery condition.

All of these components are an advancement of a typical real-time operating system 7701, which blindly switches between processes, normally on a round-robin system. As such, a typical real-time operating system 7701 will allocate portions of process resources to each process, and if it has not completed a process, it will commence a context switch to a new process. Instead, this improved operating system commences this switch based on latency and system requirements and resource availability 7712.

In some applications, the ears for the system are synthetic and are located on an artificial head or an object that represents a head. The system may involve drones, robots or other objects that can be remotely controlled where ambient sounds are important and need to be captured binaurally, as if the operator were at the remote location. FIG. 77F illustrates synthetic ears for applications such as robots and drones. Microphones 7750 are placed in asymmetric locations that differ in each ear. There are two manufactured ear shapes 7751 and 7752 on a pretend or "dummy" head that can be attached to a device such as a robot or a drone. As such, the operator hears spatial information that the device experiences remotely, without being physically present. Thus, the synthetic ears allow the device to capture spatial information to be relayed back to the operator, and the operator can control the device accordingly. This includes devices where the "head" is actually just an object where the synthetic ears can be placed a representative distance apart.

Spatial intelligent noise control (SINC): Embodiments of the disclosure may include an SINC for allowing the user to select which sounds around them are heard and which ones are removed.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An operating system for an audio system, the operating system comprising:
  one or more processing cores, wherein processing for the audio system is distributed across the one or more processing cores,
  wherein the operating system is programmed to:
  manage resource loading for the one or more processing cores;
  manage processing of one or more data streams, the management of the processing of the one or more data streams comprising:
  identifying one or more processing resources as not meeting one or more criteria, and
  reconfiguring corresponding one or more data streams when the one or more processing resources do not meet the one or more criteria;
  manage data communication within the audio system; and
  manage tasks according to a specified order.

2. The operating system of claim 1, wherein the one or more criteria comprise the one or more processing resources as being one or more of: unavailable, untimely, incapable, or having lower performance than another processing resource.

3. The operating system of claim 1, wherein the operating system is further capable of switching one or more processes from software to hardware, hardware to software, hardware to hardware-software, or software to hardware-software.

4. The operating system of claim 1, wherein the one or more processing cores comprise at least two processing cores programmed to handle dedicated functions.

5. The operating system of claim 1, wherein the operating system is programmed to manage a noticeboard, wherein the noticeboard stores information posted by one or more plugins.

6. The operating system of claim 1, wherein the management of the data communication within the audio system is performed by a transfer manager, the transfer manager programmed to receive, initiate, or prioritize data transfer operations through an audio bus of the audio subsystem.

7. The operating system of claim 1, wherein the operating system is capable of dynamically changing the management of the resource loading for the one or more processing cores.

8. The operating system of claim 1, wherein the one or more processing cores are assigned to different circuits.

9. The operating system of claim 1, wherein the one or more processing cores comprise at least two processing cores having the same processing functions, wherein the at least two processing cores are distinct and independent from each other, or the at least two processing cores communicate one or more data streams between each other.

10. The operating system of claim 9, wherein the at least two processing cores are included in separate devices.

11. The operating system of claim 1, wherein the operating system is capable of being dynamically reprogrammed to perform or no longer perform one or more processing functions.

12. The operating system of claim 11, wherein the dynamically reprogramming the operating system to no longer perform the one or more processing functions causes one or more resources to become available.

13. The operating system of claim 1, wherein the operating system is capable of managing a plurality of processing functions,
  wherein the processing functions comprise one or more of: applications, plugins, data processing algorithms, neural network processing algorithms, drivers, software functions, or hardware functions,
  wherein at least two of the plurality of processing functions are processed concurrently.

14. The operating system of claim 1, wherein the operating system is further programmed to:
  assign the management of one or more of: the resource loading, the processing of the one or more data streams, the data communication to another system or subsystem of the audio system, or the tasks.

15. The operating system of claim 1, wherein the operating system is further programmed to:
  assign or manage one or more applications to another system or subsystem of the audio system.

16. The operating system of claim 1, wherein the management of the resource loading comprises:
  monitoring and tracking resource usage of processing functions; and
  assigning the processing functions based on the resource usage and available resources.

17. The operating system of claim 1, wherein the processing of the one or more data streams comprises:

one or more processing steps performed by an activation function logic, a gating function logic, a bypass function logic, or a muting function logic.

18. The operating system of claim 1, wherein the management of the data communication comprises communications that are accessible using application programming interfaces (APIs).

19. The operating system of claim 1, wherein the management of the tasks comprises dynamically adjusting the specified order of the tasks based on at least relative properties of the tasks.

\* \* \* \* \*